US010263848B2

(12) United States Patent
Wolting

(10) Patent No.: US 10,263,848 B2
(45) Date of Patent: Apr. 16, 2019

(54) COMPILER FOR AND METHOD FOR SOFTWARE DEFINED NETWORKS

(71) Applicant: WOLTING HOLDING B.V., Huizen (NL)

(72) Inventor: Simon Wolting, Huizen (NL)

(73) Assignee: WOLTING HOLDING B.V., Huizen (NL)

( * ) Notice: Subject to any disclaimer, the term of this patent is extended or adjusted under 35 U.S.C. 154(b) by 185 days.

(21) Appl. No.: 14/778,836

(22) PCT Filed: Mar. 20, 2014

(86) PCT No.: PCT/EP2014/055640
§ 371 (c)(1),
(2) Date: Sep. 21, 2015

(87) PCT Pub. No.: WO2014/147197
PCT Pub. Date: Sep. 25, 2014

(65) Prior Publication Data

US 2016/0173338 A1 Jun. 16, 2016

(30) Foreign Application Priority Data

Mar. 20, 2013 (EP) .................................... 13160228
Jul. 12, 2013 (EP) .................................... 13176404
(Continued)

(51) Int. Cl.
*H04L 12/24* (2006.01)
*H04L 29/08* (2006.01)
(Continued)

(52) U.S. Cl.
CPC ............ *H04L 41/12* (2013.01); *H04L 41/145* (2013.01); *H04L 45/64* (2013.01); *H04L 45/74* (2013.01);
(Continued)

(58) Field of Classification Search
CPC ... H04L 41/145; H04L 41/12; H04L 67/1097; H04L 45/74; H04L 45/64; H04L 45/586; H04L 45/123
See application file for complete search history.

(56) References Cited

U.S. PATENT DOCUMENTS

2008/0219272 A1 9/2008 Novello et al.
2013/0058215 A1 3/2013 Koponen et al.
(Continued)

FOREIGN PATENT DOCUMENTS

WO 2010/115060 A2 10/2010
WO 2012/082988 A1 6/2012
WO 20121090996 A1 7/2012

OTHER PUBLICATIONS

International Search Report, dated Jul. 29, 2014, from corresponding PCT application.

*Primary Examiner* — Abdulkader M Alriyashi
(74) *Attorney, Agent, or Firm* — Young & Thompson

(57) ABSTRACT

Method of and a compiler for controlling a network based on a logical network model. The network has physical nodes and virtual nodes. The physical nodes are interconnected by physical links in accordance with a physical network layout. The logical network model has logical nodes indicated with a logical node name which refers to at least one physical or at least one virtual node in the network. The method uses a physical forwarding point-of-attachment relation defining physical paths of the physical network in dependence on a physical forwarding policy, a first mapping relation defining how the virtual nodes and the physical nodes are mapped to one another, and a second mapping relation defining how the logical nodes are mapped to the physical nodes and the virtual nodes. The method also includes transforming paths in the physical network to paths between the physical nodes and the virtual nodes.

25 Claims, 179 Drawing Sheets

(30) Foreign Application Priority Data

| | | | |
|---|---|---|---|
| Aug. 30, 2013 | (EP) | .................................... | 13182460 |
| Oct. 9, 2013 | (EP) | .................................... | 13187942 |
| Nov. 4, 2013 | (EP) | .................................... | 13191433 |
| Feb. 28, 2014 | (EP) | .................................... | 14157352 |

(51) Int. Cl.

| | |
|---|---|
| ***H04L 12/741*** | (2013.01) |
| ***H04L 12/715*** | (2013.01) |
| *H04L 12/713* | (2013.01) |
| *H04L 12/721* | (2013.01) |

(52) U.S. Cl.
CPC ........ *H04L 67/1097* (2013.01); *H04L 45/123* (2013.01); *H04L 45/586* (2013.01)

(56) References Cited

U.S. PATENT DOCUMENTS

| | | | | |
|---|---|---|---|---|
| 2013/0282867 | A1 | 10/2013 | Otake | |
| 2013/0286844 | A1* | 10/2013 | Ishizuka ................. | H04L 45/64 370/235 |
| 2014/0122683 | A1* | 5/2014 | Zhao ....................... | H04L 45/64 709/223 |

* cited by examiner

| NODE TYPE | SWITCH | HOST | NIC |
|---|---|---|---|
| SEND SOURCE PACKET | X | X | |
| RECEIVE DESTINATION PACKET | X | X | |
| FORWARD INCOMING PACKET TO ANY OUTPUT PORT | X | | |
| PERFORM OPTIONAL OPERATION ON PACKET | X | | |
| FORWARD PACKET TO FIXED OUTPUT PORT | | | X |
| DROP PACKET | X | X | X |
| ENCAPSULATE AND REDIRECT PACKET TO SDN COMPILER (OPTIONAL) | X | X | X |
FIG. 2H
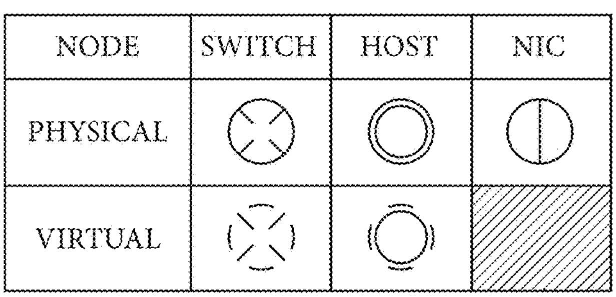
FIG. 2I
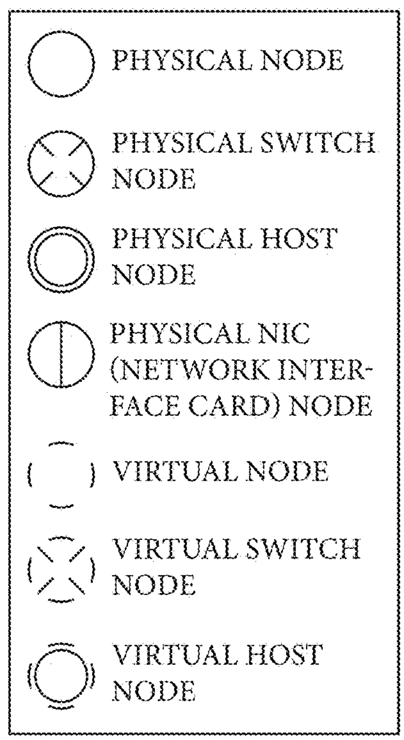
FIG. 2J

☐ POINT-OF-ATTACHMENT (POA)

| | RD | RE | RC | ... |
|---|---|---|---|---|
| RA | OUTPUT PORT (INPUT PORT) ... ⋮ | OUTPUT PORT (INPUT PORT) ... ⋮ | OUTPUT PORT (INPUT PORT) ... ⋮ | ... |
| RB | OUTPUT PORT (INPUT PORT) ... ⋮ | OUTPUT PORT (INPUT PORT) ... ⋮ | OUTPUT PORT (INPUT PORT) ... ⋮ | ... |
| RC | OUTPUT PORT (INPUT PORT) ... ⋮ | OUTPUT PORT (INPUT PORT) ... ⋮ | OUTPUT PORT (INPUT PORT) ... ⋮ | ... |
| ⋮ | ⋮ | ⋮ | ⋮ | |

FIG. 21A

| | RD | RE | RF | ... |
|---|---|---|---|---|
| RA | COST VALUE ⋮ | COST VALUE ⋮ | COST VALUE ⋮ | ... |
| RB | COST VALUE ⋮ | COST VALUE ⋮ | COST VALUE ⋮ | ... |
| RC | COST VALUE ⋮ | COST VALUE ⋮ | COST VALUE ⋮ | ... |
| ⋮ | ⋮ | ⋮ | ⋮ | |

FIG. 21B

| | RK | RL | RM | ... |
|---|---|---|---|---|
| RG | MAPPING STATEMENT | MAPPING STATEMENT | MAPPING STATEMENT | ... |
| RH | MAPPING STATEMENT | MAPPING STATEMENT | MAPPING STATEMENT | ... |
| RJ | MAPPING STATEMENT | MAPPING STATEMENT | MAPPING STATEMENT | ... |
| ⋮ | ⋮ | ⋮ | ⋮ | |

FIG. 22A

| | RO | RP | RQ | ... |
|---|---|---|---|---|
| RN | MAPPING STATEMENT | MAPPING STATEMENT | MAPPING STATEMENT | ... |

FIG. 22B

| | RU | RV | RW |
|---|---|---|---|
| RR | sa | sb | sc |
| RS | sd | se | sf |
| RT | sg | sh | sj |

FIG. 23A

| |
|---|
| $sa_1$ |
| $sa_2$ |
| . . . |
| $sa_q$ |

FIG. 23B

| |
|---|
| $sb_1$ |
| $sb_2$ |
| . . . |
| $sb_r$ |

FIG. 23C

| |
|---|
| $sc_1$ |
| $sc_2$ |
| . . . |
| $sc_s$ |

FIG. 23D

| | RX | RY | RZ |
|---|---|---|---|
| RU | sk | sl | sm |
| RV | sn | sp | sq |
| RW | sr | ss | st |

FIG. 23E

| |
|---|
| $sk_1$ |
| $sk_2$ |
| . . . |
| $sk_t$ |

FIG. 23F

| |
|---|
| $sn_1$ |
| $sn_2$ |
| . . . |
| $sn_u$ |

FIG. 23G

| |
|---|
| $sr_1$ |
| $sr_2$ |
| . . . |
| $sr_w$ |

FIG. 23H

| | RX | RY | RZ |
|---|---|---|---|
| RR | sa ** sk<br>sb ** sn<br>sc ** sr | sa ** sl<br>sb ** sp<br>sc ** ss | sa ** sm<br>sb ** sq<br>sc ** st |
| RS | sd ** sk<br>se ** sn<br>sf ** sr | sd ** sl<br>se ** sp<br>sf ** ss | sd ** sm<br>se ** sq<br>sf ** st |
| RT | sg ** sk<br>sh ** sn<br>sj ** sr | sg ** sl<br>sh ** sp<br>sj ** ss | sg ** sm<br>sh ** sq<br>sj ** st |

FIG. 24A

| | RX | RY | RZ |
|---|---|---|---|
| RR | sa ++ sk<br>sb ++ sn<br>sc ++ sr | sa ++ sl<br>sb ++ sp<br>sc ++ ss | sa ++ sm<br>sb ++ sq<br>sc ++ st |
| RS | sd ++ sk<br>se ++ sn<br>sf ++ sr | sd ++ sl<br>se ++ sp<br>sf ++ ss | sd ++ sm<br>se ++ sq<br>sf ++ st |
| RT | sg ++ sk<br>sh ++ sn<br>sj ++ sr | sg ++ sl<br>sh ++ sp<br>sj ++ ss | sg ++ sm<br>sh ++ sq<br>sj ++ st |

FIG. 24E

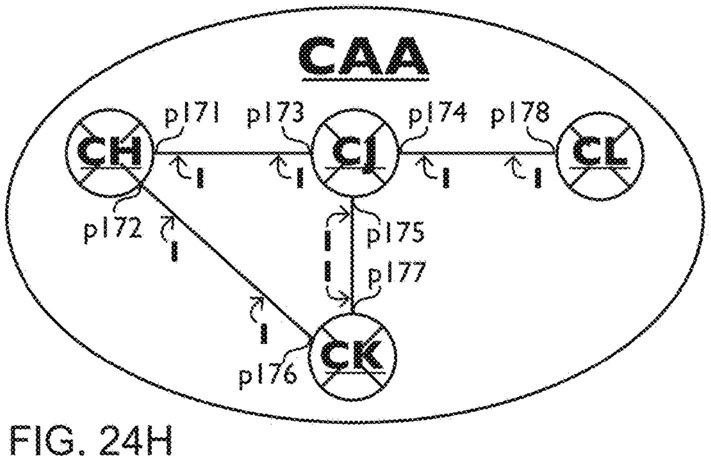
FIG. 24H
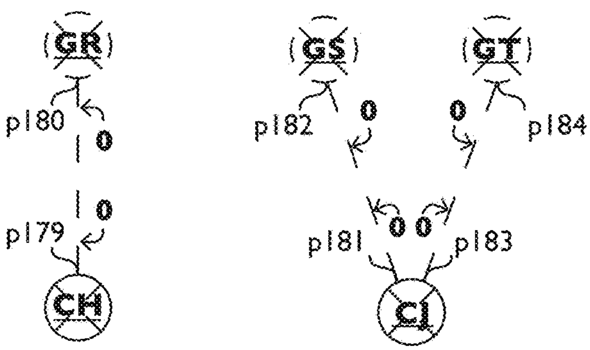
FIG. 24I
| | CH | CJ | CK | CL |
|---|---|---|---|---|
| CH | 0 | p171(p173) | p172(p176) | 0 |
| CJ | p173(p171) | 0 | p175(p177) | p174(p178) |
| CK | p176(p172) | p177(p175) | 0 | 0 |
| CL | 0 | p178(p174) | 0 | 0 |
FIG. 24J

| | CH | CJ | CK | CL |
|---|---|---|---|---|
| CH | 1 | p171(p173) | p172(p176)<br>p171(p173)p175(p177) | p171(p173)p174(p178) |
| CJ | p173(p171) | 1 | p175(p177) | p174(p178) |
| CK | p176(p172)<br>p177(p175)p173(p171) | p177(p175) | 1 | p177(p175)p174(p178) |
| CL | p178(p174)p173(p171) | p178(p174) | p178(p174)p175(p177) | 1 |

FIG. 24K

| | CH | CJ | CK | CL |
|---|---|---|---|---|
| GR | p180(p179) | 0 | 0 | 0 |
| GS | 0 | p182(p181) | 0 | 0 |
| GT | 0 | p184(p183) | 0 | 0 |

FIG. 24L

| | CH | CJ | CK | CL |
|---|---|---|---|---|
| GR | p180(p179) | p180(p179)p171(p173) | p180(p179)p172(p176)<br><br>p180(p179)p171(p173)-p175(p177) | p180(p179)p171(p173)-p174(p178) |
| GS | p182(p181)p173(p171) | p182(p181) | p182(p181)p175(p177) | p182(p181)p174(p178) |
| GT | p184(p183)p173(p171) | p184(p183) | p184(p183)p175(p177) | p184(p183)p174(p178) |

FIG. 24M

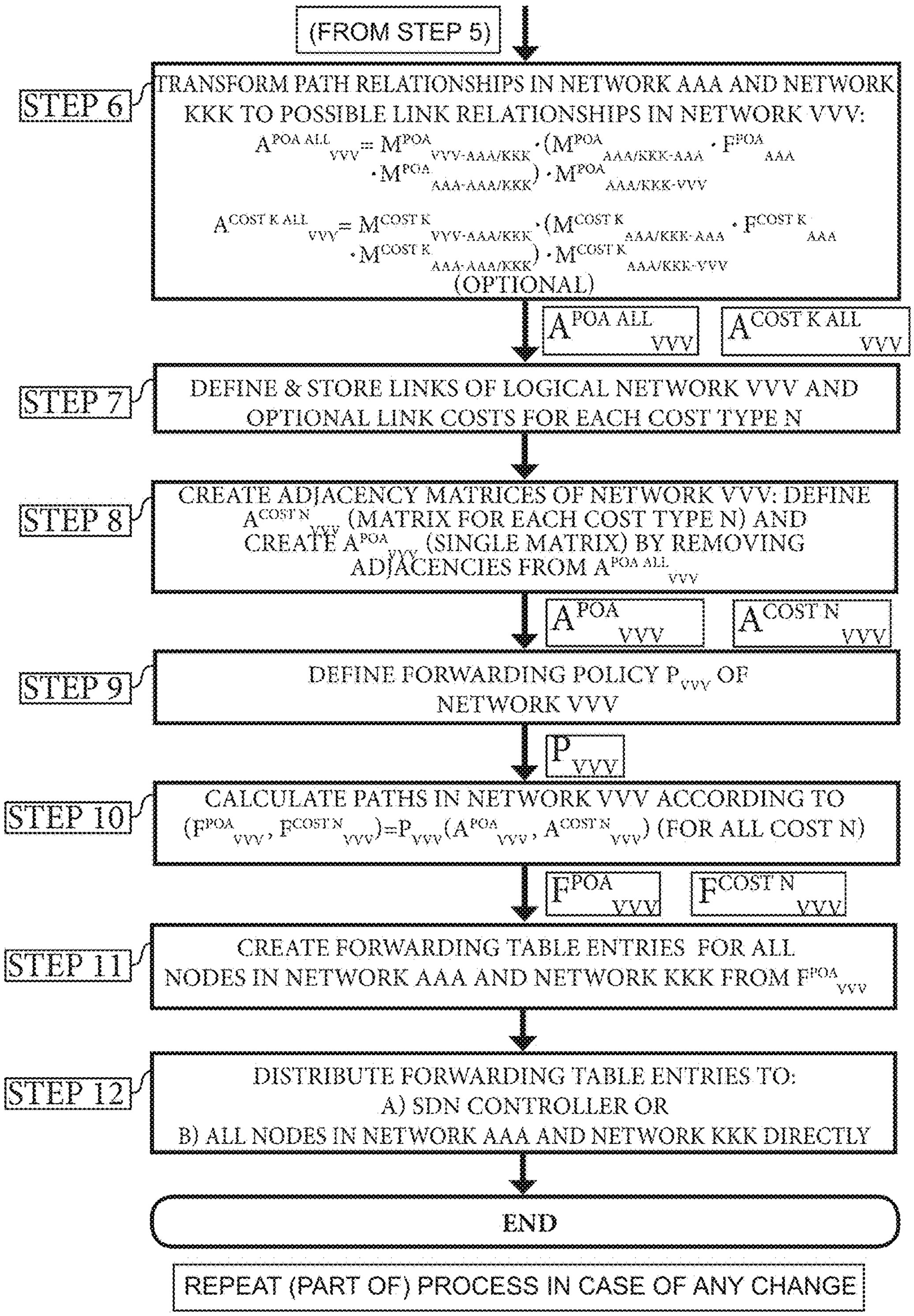
FIG. 25 (2)

| | DA | DB | DC | DD | DE | DF | DG | DE' | DF' | DG' |
|---|---|---|---|---|---|---|---|---|---|---|
| DAA | 1 | 1 | 1 | 1 | 1 | 1 | 1 | 1 | 1 | 1 |

FIG. 27A

| | DA | DB | DC | DD | DE | DF | DG | DE' | DF' | DG' |
|---|---|---|---|---|---|---|---|---|---|---|
| DA | 0 | 0 | 0 | 0 | p72(p81) | p71(p79) | 0 | 0 | 0 | 0 |
| DB | 0 | 0 | p75(p77) | p74(p78) | 0 | 0 | 0 | 0 | p73(p80) | 0 |
| DC | 0 | p77(p75) | 0 | 0 | 0 | 0 | 0 | p76(p82) | 0 | 0 |
| DD | 0 | p78(p74) | 0 | 0 | 0 | 0 | 0 | 0 | 0 | p83(p84) |
| DE | 0 | 0 | p82(p76) | 0 | 0 | 0 | 0 | 0 | 0 | 0 |
| DF | 0 | p80(p73) | 0 | 0 | 0 | 0 | 0 | 0 | 0 | 0 |
| DG | 0 | 0 | 0 | p84(p83) | 0 | 0 | 0 | 0 | 0 | 0 |
| DE' | p81(p72) | 0 | 0 | 0 | 0 | 0 | 0 | 0 | 0 | 0 |
| DF' | p79(p71) | 0 | 0 | 0 | 0 | 0 | 0 | 0 | 0 | 0 |
| DG' | 0 | 0 | 0 | 0 | 0 | 0 | 0 | 0 | 0 | 0 |

FIG. 27B

| | DA | DB | DC | DD | DE | DF | DG | DE' | DF' | DG' |
|---|---|---|---|---|---|---|---|---|---|---|
| DA | ∞ | ∞ | ∞ | ∞ | 0 | 0 | ∞ | ∞ | ∞ | ∞ |
| DB | ∞ | ∞ | 1 | 1 | ∞ | ∞ | ∞ | ∞ | 1 | ∞ |
| DC | ∞ | 1 | ∞ | ∞ | ∞ | ∞ | ∞ | 1 | ∞ | ∞ |
| DD | ∞ | 1 | ∞ | ∞ | ∞ | ∞ | ∞ | ∞ | ∞ | 1 |
| DE | ∞ | ∞ | 1 | ∞ | ∞ | ∞ | ∞ | ∞ | ∞ | ∞ |
| DF | ∞ | 1 | ∞ | ∞ | ∞ | ∞ | ∞ | ∞ | ∞ | ∞ |
| DG | ∞ | ∞ | ∞ | 1 | ∞ | ∞ | ∞ | ∞ | ∞ | ∞ |
| DE' | 0 | ∞ | ∞ | ∞ | ∞ | ∞ | ∞ | ∞ | ∞ | ∞ |
| DF' | 0 | ∞ | ∞ | ∞ | ∞ | ∞ | ∞ | ∞ | ∞ | ∞ |
| DG' | ∞ | ∞ | ∞ | ∞ | ∞ | ∞ | ∞ | ∞ | ∞ | ∞ |

FIG. 27C

| | DA | DB | DC | DD | DE |
|---|---|---|---|---|---|
| DA | 1 | p71(p79)p80(p73) | p72(p81)p82(p76) | p71(p79)p80(p73)-p74(p78) | p72(p81) |
| DB | p73(p80)p79(p71) | 1 | p75(p77) | p74(p78) | p73(p80)p79(p71)-p72(p81) |
| DC | p76(p82)p81(p72) | p77(p75) | 1 | p77(p75)p74(p78) | p76(p82)p81(p72)-p72(p81) |
| DD | p78(p74)p73(p80)-p79(p71) | p78(p74) | p78(p74)p75(p77) | 1 | p78(p74)p73(p80)-p79(p71)p72(p81) |
| DE | p82(p76)p76(p82)-p81(p72) | p82(p76)p77(p75) | p82(p76) | p82(p76)p77(p75)-p74(p78) | 1 |
| DF | p80(p73)p73(p80)-p79(p71) | p80(p73) | p80(p73)p75(p77) | p80(p73)p74(p78) | p80(p73)p73(p80)-p79(p71)p72(p81) |
| DG | p84(p83)p78(p74)-p73(p80)p79(p71) | p84(p83)p78(p74) | p84(p83)p78(p74)-p75(p77) | p84(p83) | p84(p83)p78(p74)-p73(p80)p79(p71)-p72(p81) |
| DE' | p81(p72) | p81(p72)p71(p79)-p80(p73) | p81(p72)p72(p81)-p82(p76) | p81(p72)p71(p79)-p80(p73)p74(p78) | p81(p72)p72(p81) |
| DF' | p79(p71) | p79(p71)p71(p79)-p80(p73) | p79(p71)p72(p81)-p82(p76) | p79(p71)p71(p79)-p80(p73)p74(p78) | p79(p71)p72(p81) |
| DG' | 0 | 0 | 0 | 0 | 0 |

FIG. 27D (1)

| | DF | DG | DE' | DF' | DG' |
|---|---|---|---|---|---|
| (DA) | p71(p79) | 0 | p72(p81)p82(p76)-p76(p82) | p71(p79)p80(p73)-p73(p80) | p71(p79)p80(p73)-p74(p78)p83(p84) |
| (DB) | p73(p80)p79(p71)-p71(p79) | 0 | p75(p77)p76(p82) | p73(p80) | p74(p78)p83(p84) |
| (DC) | p76(p82)p81-(p72)p71(p79) | 0 | p76(p82) | p77(p75)p73(p80) | p77(p75)p74(p78)-p83(p84) |
| (DD) | p78(p74)p73(p80)-p79(p71)p71(p79) | 0 | p78(p74)p75(p77)-p76(p82) | p78(p74)p73(p80) | p83(p84) |
| (DE) | p82(p76)p76(p82)-p81(p72)p71(p79) | 0 | p82(p76)p76(p82) | p72(p76)p77(p75)-p73(p80) | p82(p76)p77(p75)-p74(p78)p83(p84) |
| (DF) | 1 | 0 | p80(p73)p75(p77)-p76(p82) | p80(p73)p73(p80) | p80(p73)p74(p78)-p83(p84) |
| (DG) | p84(p83)p78(p74)-p73(p80)p79(p71)-p71(p79) | 1 | p84(p83)p78(p74)-p75(p77)p76(p82) | p84(p83)p78(p74)-p73(p80) | p84(p83)p83(p84) |
| (DE') | p81(p72)p71(p79) | 0 | 1 | p81(p72)p71(p79)-p80(p73)p73(p80) | p81(p72)p71(p79)-p80(p73)p74(p78)-p83(p84) |
| (DF') | p79(p71)p71(p79) | 0 | p79(p71)p72(p81)-p82(p76)p76(p82) | 1 | p79(p71)p71(p79)-p80(p73)p74-(p78)p83(p84) |
| (DG') | 0 | 0 | 0 | 0 | 1 |

FIG. 27D (2)

| | DA | DB | DC | DD | DE | DF | DG | DE' | DF' | DG' |
|---|---|---|---|---|---|---|---|---|---|---|
| DA | 0 | 1 | 1 | 2 | 0 | 0 | ∞ | 2 | 2 | 3 |
| DB | 1 | 0 | 1 | 1 | 1 | 1 | ∞ | 2 | 1 | 2 |
| DC | 1 | 1 | 0 | 2 | 1 | 1 | ∞ | 1 | 2 | 3 |
| DD | 2 | 1 | 2 | 0 | 2 | 2 | ∞ | 3 | 2 | 1 |
| DE | 2 | 2 | 1 | 3 | 0 | 2 | ∞ | 2 | 3 | 4 |
| DF | 2 | 1 | 2 | 2 | 2 | 0 | ∞ | 3 | 2 | 3 |
| DG | 3 | 2 | 3 | 1 | 3 | 3 | 0 | 4 | 3 | 2 |
| DE' | 0 | 1 | 1 | 2 | 0 | 0 | ∞ | 0 | 2 | 3 |
| DF' | 0 | 1 | 1 | 2 | 0 | 0 | ∞ | 2 | 0 | 3 |
| DG' | ∞ | ∞ | ∞ | ∞ | ∞ | ∞ | ∞ | ∞ | ∞ | 0 |

FIG. 27E

| | HA | HB | HA' |
|---|---|---|---|
| HAA | 1 | 1 | 1 |

FIG. 28A

| | DA | DB | DC | DD | DE | DF | DG | DE' | DF' | DG' |
|---|---|---|---|---|---|---|---|---|---|---|
| DA | 1 | 0 | 0 | 0 | 0 | 0 | 0 | 0 | 0 | 0 |
| DB | 0 | 1 | 0 | 0 | 0 | 0 | 0 | 0 | 0 | 0 |
| DC | 0 | 0 | 1 | 0 | 0 | 0 | 0 | 0 | 0 | 0 |
| DD | 0 | 0 | 0 | 1 | 0 | 0 | 0 | 0 | 0 | 0 |
| DE | 0 | 0 | 0 | 0 | 1 | 0 | 0 | 0 | 0 | 0 |
| DF | 0 | 0 | 0 | 0 | 0 | 1 | 0 | 0 | 0 | 0 |
| DG | 0 | 0 | 0 | 0 | 0 | 0 | 1 | 0 | 0 | 0 |
| DE' | 0 | 0 | 0 | 0 | 0 | 0 | 0 | 1 | 0 | 0 |
| DF' | 0 | 0 | 0 | 0 | 0 | 0 | 0 | 0 | 1 | 0 |
| DG' | 0 | 0 | 0 | 0 | 0 | 0 | 0 | 0 | 0 | 1 |
| HA | p86(p85) | 0 | 0 | 0 | 0 | 0 | 0 | 0 | 0 | 0 |
| HB | p88(p87) | 0 | 0 | 0 | 0 | 0 | 0 | 0 | 0 | 0 |
| HA' | 0 | 0 | 0 | 0 | 0 | 0 | 0 | 0 | 0 | 0 |

FIG. 28B

| | DA | DB | DC | DD | DE | DF | DG | DE' | DF' | DG' | HA | HB | HA' |
|---|---|---|---|---|---|---|---|---|---|---|---|---|---|
| DA | 1 | 0 | 0 | 0 | 0 | 0 | 0 | 0 | 0 | 0 | 0 | p87(p88) | p85(p86) |
| DB | 0 | 1 | 0 | 0 | 0 | 0 | 0 | 0 | 0 | 0 | 0 | 0 | 0 |
| DC | 0 | 0 | 1 | 0 | 0 | 0 | 0 | 0 | 0 | 0 | 0 | 0 | 0 |
| DD | 0 | 0 | 0 | 1 | 0 | 0 | 0 | 0 | 0 | 0 | 0 | 0 | 0 |
| DE | 0 | 0 | 0 | 0 | 1 | 0 | 0 | 0 | 0 | 0 | 0 | 0 | 0 |
| DF | 0 | 0 | 0 | 0 | 0 | 1 | 0 | 0 | 0 | 0 | 0 | 0 | 0 |
| DG | 0 | 0 | 0 | 0 | 0 | 0 | 1 | 0 | 0 | 0 | 0 | 0 | 0 |
| DE' | 0 | 0 | 0 | 0 | 0 | 0 | 0 | 1 | 0 | 0 | 0 | 0 | 0 |
| DF' | 0 | 0 | 0 | 0 | 0 | 0 | 0 | 0 | 1 | 0 | 0 | 0 | 0 |
| DG' | 0 | 0 | 0 | 0 | 0 | 0 | 0 | 0 | 0 | 1 | 0 | 0 | 0 |

FIG. 28C

| | DA | DB | DC | DD | DE | DF | DG | DE' | DF' | DG' |
|---|---|---|---|---|---|---|---|---|---|---|
| DA | 0 | ∞ | ∞ | ∞ | ∞ | ∞ | ∞ | ∞ | ∞ | ∞ |
| DB | ∞ | 0 | ∞ | ∞ | ∞ | ∞ | ∞ | ∞ | ∞ | ∞ |
| DC | ∞ | ∞ | 0 | ∞ | ∞ | ∞ | ∞ | ∞ | ∞ | ∞ |
| DD | ∞ | ∞ | ∞ | 0 | ∞ | ∞ | ∞ | ∞ | ∞ | ∞ |
| DE | ∞ | ∞ | ∞ | ∞ | 0 | ∞ | ∞ | ∞ | ∞ | ∞ |
| DF | ∞ | ∞ | ∞ | ∞ | ∞ | 0 | ∞ | ∞ | ∞ | ∞ |
| DG | ∞ | ∞ | ∞ | ∞ | ∞ | ∞ | 0 | ∞ | ∞ | ∞ |
| DE' | ∞ | ∞ | ∞ | ∞ | ∞ | ∞ | ∞ | 0 | ∞ | ∞ |
| DF' | ∞ | ∞ | ∞ | ∞ | ∞ | ∞ | ∞ | ∞ | 0 | ∞ |
| DG' | ∞ | ∞ | ∞ | ∞ | ∞ | ∞ | ∞ | ∞ | ∞ | 0 |
| HA | 0 | ∞ | ∞ | ∞ | ∞ | ∞ | ∞ | ∞ | ∞ | ∞ |
| HB | 0 | ∞ | ∞ | ∞ | ∞ | ∞ | ∞ | ∞ | ∞ | ∞ |
| HA' | ∞ | ∞ | ∞ | ∞ | ∞ | ∞ | ∞ | ∞ | ∞ | ∞ |

FIG. 28D

| | DA | DB | DC | DD | DE | DF | DG | DE' | DF' | DG' | HA | HB | HA' |
|---|---|---|---|---|---|---|---|---|---|---|---|---|---|
| DA | 0 | $\infty$ | $\infty$ | $\infty$ | $\infty$ | $\infty$ | $\infty$ | $\infty$ | $\infty$ | $\infty$ | $\infty$ | 0 | 0 |
| DB | $\infty$ | 0 | $\infty$ | $\infty$ | $\infty$ | $\infty$ | $\infty$ | $\infty$ | $\infty$ | $\infty$ | $\infty$ | $\infty$ | $\infty$ |
| DC | $\infty$ | $\infty$ | 0 | $\infty$ | $\infty$ | $\infty$ | $\infty$ | $\infty$ | $\infty$ | $\infty$ | $\infty$ | $\infty$ | $\infty$ |
| DD | $\infty$ | $\infty$ | $\infty$ | 0 | $\infty$ | $\infty$ | $\infty$ | $\infty$ | $\infty$ | $\infty$ | $\infty$ | $\infty$ | $\infty$ |
| DE | $\infty$ | $\infty$ | $\infty$ | $\infty$ | 0 | $\infty$ | $\infty$ | $\infty$ | $\infty$ | $\infty$ | $\infty$ | $\infty$ | $\infty$ |
| DF | $\infty$ | $\infty$ | $\infty$ | $\infty$ | $\infty$ | 0 | $\infty$ | $\infty$ | $\infty$ | $\infty$ | $\infty$ | $\infty$ | $\infty$ |
| DG | $\infty$ | $\infty$ | $\infty$ | $\infty$ | $\infty$ | $\infty$ | 0 | $\infty$ | $\infty$ | $\infty$ | $\infty$ | $\infty$ | $\infty$ |
| DE' | $\infty$ | $\infty$ | $\infty$ | $\infty$ | $\infty$ | $\infty$ | $\infty$ | 0 | $\infty$ | $\infty$ | $\infty$ | $\infty$ | $\infty$ |
| DF' | $\infty$ | $\infty$ | $\infty$ | $\infty$ | $\infty$ | $\infty$ | $\infty$ | $\infty$ | 0 | $\infty$ | $\infty$ | $\infty$ | $\infty$ |
| DG' | $\infty$ | $\infty$ | $\infty$ | $\infty$ | $\infty$ | $\infty$ | $\infty$ | $\infty$ | $\infty$ | 0 | $\infty$ | $\infty$ | $\infty$ |

FIG. 28E

| | UU | UV | UW | UX | UY | UZ | UU' | UZ' |
|---|---|---|---|---|---|---|---|---|
| UUU | 1 | 1 | 1 | 1 | 1 | 1 | 1 | 1 |

FIG. 28F

| | DA | DB | DC | DD | DE | DF | DG | DE' | DF' | DG' | HA | HB | HA' |
|---|---|---|---|---|---|---|---|---|---|---|---|---|---|
| UU | 0 | 0 | 0 | 0 | 0 | 0 | 1 | 0 | 0 | 0 | 0 | 0 | 0 |
| UV | 0 | 0 | 0 | 0 | 0 | 0 | 0 | 0 | 0 | 0 | 0 | 1 | 0 |
| UW | 0 | 1 | 0 | 0 | 0 | 0 | 0 | 0 | 0 | 0 | 0 | 0 | 0 |
| UX | 0 | 0 | 1 | 0 | 0 | 0 | 0 | 0 | 0 | 0 | 0 | 0 | 0 |
| UY | 0 | 0 | 0 | 1 | 0 | 0 | 0 | 0 | 0 | 0 | 0 | 0 | 0 |
| UZ | 0 | 0 | 0 | 0 | 0 | 0 | 0 | 0 | 0 | 0 | 1 | 0 | 0 |
| UU' | 0 | 0 | 0 | 0 | 0 | 0 | 0 | 0 | 0 | 1 | 0 | 0 | 0 |
| UZ' | 0 | 0 | 0 | 0 | 0 | 0 | 0 | 0 | 0 | 0 | 0 | 0 | 1 |

FIG. 28G

| | UU | UV | UW | UX | UY | UZ | UU' | UZ' |
|---|---|---|---|---|---|---|---|---|
| DA | 0 | 0 | 0 | 0 | 0 | 0 | 0 | 0 |
| DB | 0 | 0 | 1 | 0 | 0 | 0 | 0 | 0 |
| DC | 0 | 0 | 0 | 1 | 0 | 0 | 0 | 0 |
| DD | 0 | 0 | 0 | 0 | 1 | 0 | 0 | 0 |
| DE | 0 | 0 | 0 | 0 | 0 | 0 | 0 | 0 |
| DF | 0 | 0 | 0 | 0 | 0 | 0 | 0 | 0 |
| DG | 1 | 0 | 0 | 0 | 0 | 0 | 0 | 0 |
| DE' | 0 | 0 | 0 | 0 | 0 | 0 | 0 | 0 |
| DF' | 0 | 0 | 0 | 0 | 0 | 0 | 0 | 0 |
| DG' | 0 | 0 | 0 | 0 | 0 | 0 | 1 | 0 |
| HA | 0 | 0 | 0 | 0 | 0 | 1 | 0 | 0 |
| HB | 0 | 1 | 0 | 0 | 0 | 0 | 0 | 0 |
| HA' | 0 | 0 | 0 | 0 | 0 | 0 | 0 | 1 |

FIG. 28H

| | DA | DB | DC | DD | DE | DF | DG | DE' | DF' | DG' | HA | HB | HA' |
|---|---|---|---|---|---|---|---|---|---|---|---|---|---|
| UU | ∞ | ∞ | ∞ | ∞ | ∞ | ∞ | 0 | ∞ | ∞ | ∞ | ∞ | ∞ | ∞ |
| UV | ∞ | ∞ | ∞ | ∞ | ∞ | ∞ | ∞ | ∞ | ∞ | ∞ | ∞ | 0 | ∞ |
| UW | ∞ | 0 | ∞ | ∞ | ∞ | ∞ | ∞ | ∞ | ∞ | ∞ | ∞ | ∞ | ∞ |
| UX | ∞ | ∞ | 0 | ∞ | ∞ | ∞ | ∞ | ∞ | ∞ | ∞ | ∞ | ∞ | ∞ |
| UY | ∞ | ∞ | ∞ | 0 | ∞ | ∞ | ∞ | ∞ | ∞ | ∞ | ∞ | ∞ | ∞ |
| UZ | ∞ | ∞ | ∞ | ∞ | ∞ | ∞ | ∞ | ∞ | ∞ | ∞ | 0 | ∞ | ∞ |
| UU' | ∞ | ∞ | ∞ | ∞ | ∞ | ∞ | ∞ | ∞ | ∞ | 0 | ∞ | ∞ | ∞ |
| UZ' | ∞ | ∞ | ∞ | ∞ | ∞ | ∞ | ∞ | ∞ | ∞ | ∞ | ∞ | ∞ | 0 |

FIG. 28I

| | UU | UV | UW | UX | UY | UZ | UU' | UZ' |
|---|---|---|---|---|---|---|---|---|
| DA | ∞ | ∞ | ∞ | ∞ | ∞ | ∞ | ∞ | ∞ |
| DB | ∞ | ∞ | 0 | ∞ | ∞ | ∞ | ∞ | ∞ |
| DC | ∞ | ∞ | ∞ | 0 | ∞ | ∞ | ∞ | ∞ |
| DD | ∞ | ∞ | ∞ | ∞ | 0 | ∞ | ∞ | ∞ |
| DE | ∞ | ∞ | ∞ | ∞ | ∞ | ∞ | ∞ | ∞ |
| DF | ∞ | ∞ | ∞ | ∞ | ∞ | ∞ | ∞ | ∞ |
| DG | 0 | ∞ | ∞ | ∞ | ∞ | ∞ | ∞ | ∞ |
| DE' | ∞ | ∞ | ∞ | ∞ | ∞ | ∞ | ∞ | ∞ |
| DF' | ∞ | ∞ | ∞ | ∞ | ∞ | ∞ | ∞ | ∞ |
| DG' | ∞ | ∞ | ∞ | ∞ | ∞ | ∞ | 0 | ∞ |
| HA | ∞ | ∞ | ∞ | ∞ | ∞ | 0 | ∞ | ∞ |
| HB | ∞ | 0 | ∞ | ∞ | ∞ | ∞ | ∞ | ∞ |
| HA' | ∞ | ∞ | ∞ | ∞ | ∞ | ∞ | ∞ | 0 |

FIG. 28J

| | DA | DB | DC | DD |
|---|---|---|---|---|
| DA | 1 | p71(p79)p80(p73) | p72(p81)p82(p76) | p71(p79)p80(p73)-p74(p78) |
| DB | p73(p80)p79(p71) | 1 | p75(p77) | p74(p78) |
| DC | p76(p82)p81(p72) | p77(p75) | 1 | p77(p75)p74(p78) |
| DD | p78(p74)p73(p80)-p79(p71) | p78(p74) | p78(p74)p75(p77) | 1 |
| DE | p82(p76)p76(p82)-p81(p72) | p82(p76)p77(p75) | p82(p76) | p82(p76)p77(p75)-p74(p78) |
| DF | p80(p73)p73(p80)-p79(p71) | p80(p73) | p80(p73)p75(p77) | p80(p73)p74(p78) |
| DG | p84(p83)p78(p74)-p73(p80)p79(p71) | p84(p83)p78(p74) | p84(p83)p78(p74)-p75(p77) | p84(p83) |
| DE' | p81(p72) | p81(p72)p71(p79)-p80(p73) | p81(p72)p72(p81)-p82(p76) | p81(p72)p71(p79)-p80(p73)p74(p78) |
| DF' | p79(p71) | p79(p71)p71(p79)-p80(p73) | p79(p71)p72(p81)-p82(p76) | p79(p71)p71(p79)-p80(p73)p74(p78) |
| DG' | 0 | 0 | 0 | 0 |
| HA | p86(p85) | p86(p85)p71(p79)-p80(p73) | p86(p85)p72(p81)-p82(p76) | p86(p85)p71(p79)-p80(p73)p74(p78) |
| HB | p88(p87) | p88(p87)p71(p79)-p80(p73) | p88(p87)p72(p81)-p82(p76) | p88(p87)p71(p79)-p80(p73)p74(p78) |
| HA' | 0 | 0 | 0 | 0 |

FIG. 28K (1)

| | DE | DF | DG | DE' |
|---|---|---|---|---|
| (DA) | p72(p81) | p71(p79) | 0 | p72(p81)p82(p76)-p76(p82) |
| (DB) | p73(p80)p79(p71)-p72(p81) | p73(p80)p79(p71)-p71(p79) | 0 | p75(p77)p76(p82) |
| (DC) | p76(p82)p81(p72)-p72(p81) | p76(p82)p81-(p72)p71(p79) | 0 | p76(p82) |
| (DD) | p78(p74)p73(p80)-p79(p71)p72(p81) | p78(p74)p73(p80)-p79(p71)p71(p79) | 0 | p78(p74)p75(p77)-p76(p82) |
| (DE) | 1 | p82(p76)p76(p82)-p81(p72)p71(p79) | 0 | p82(p76)p76(p82) |
| (DF) | p80(p73)p73(p80)-p79(p71)p72(p81) | 1 | 0 | p80(p73)p75(p77)-p76(p82) |
| (DG) | p84(p83)p78(p74)-p73(p80)p79(p71)-p72(p81) | p84(p83)-p78(p74)p73(p80)-p79(p71)p71(p79) | 1 | p84(p83)p78(p74)-p75(p77)p76(p82) |
| (DE') | p81(p72)p72(p81) | p81(p72)p71(p79) | 0 | 1 |
| (DF') | p79(p71)p72(p81) | p79(p71)p71(p79) | 0 | p79(p71)p72(p81)-p82(p76)p76(p82) |
| (DG') | 0 | 0 | 0 | 0 |
| (HA) | p86(p85)p72(p81) | p86(p85)p71(p79) | 0 | p86(p85)p72(p81)-p82(p76)p76(p82) |
| (HB) | p88(p87)p72(p81) | p88(p87)p71(p79) | 0 | p88(p87)p72(p81)-p82(p76)p76(p82) |
| (HA') | 0 | 0 | 0 | 0 |

FIG. 28K (2)

| | DF' | DG' | HA | HB | HA' |
|---|---|---|---|---|---|
| (DA) | p71(p79)p80(p73)-p73(p80) | p71(p79)p80(p73)-p74(p78)p83(p84) | 0 | p87(p88) | p85(p86) |
| (DB) | p73(p80) | p74(p78)p83(p84) | 0 | p73(p80)p79(p71)-p87(p88) | p73(p80)p79(p71)-p85(p86) |
| (DC) | p77(p75)p73(p80) | p77(p75)p74(p78)-p83(p84) | 0 | p76(p82)p81(p72)-p87(p88) | p76(p82)p81(p72)-p85(p86) |
| (DD) | p78(p74)p73(p80) | p83(p84) | 0 | p78(p74)p73(p80)-p79(p71)p87(p88) | p78(p74)p73(p80)-p79(p71)p85(p86) |
| (DE) | p82(p76)p77(p75)-p73(p80) | p82(p76)p77(p75)-p74(p78)p83(p84) | 0 | p82(p76)p76(p82)-p81(p72)p87(p88) | p82(p76)p76(p82)-p81(p72)p85(p86) |
| (DF) | p80(p73)p73(p80) | p80(p73)p74-(p78)p83(p84) | 0 | p80(p73)p73(p80)-p79(p71)p87(p88) | p80(p73)p73(p80)-p79(p71)p85(p86) |
| (DG) | p84(p83)p78(p74)-p73(p80) | p84(p83)p83(p84) | 0 | p84(p83)p78(p74)-p73(p80)p79(p71)-p87(p88) | p84(p83)p78(p74)-p73(p80)p79(p71)-p85(p86) |
| (DE') | p81(p72)p71(p79)-p80(p73)p73(p80) | p81(p72)p71(p79)-p80(p73)p74(p78)-p83(p84) | 0 | p81(p72)p87(p88) | p81(p72)p85(p86) |
| (DF') | 1 | p79(p71)p71(p79)-p80(p73)p74-(p78)p83(p84) | 0 | p79(p71)p87(p88) | p79(p71)p85(p86) |
| (DG') | 0 | 1 | 0 | 0 | 0 |
| (HA) | p86(p85)p71(p79)-p80(p73)p73(p80) | p86(p85)p71(p79)-p80(p73)p74(p78)-p83(p84) | 1 | p86(p85)p87(p88) | p86(p85)p85(p86) |
| (HB) | p88(p87)p71(p79)-p80(p73)p73(p80) | p88(p87)p71(p79)-p80(p73)p74(p78)-p83(p84) | 0 | 1 | p88(p87)p85(p86) |
| (HA') | 0 | 0 | 0 | 0 | 1 |

FIG. 28K (3)

| | UU | UV | UW | UX | UY | UZ | UU' | UZ' |
|---|---|---|---|---|---|---|---|---|
| UU | 0 | p84(p83)p78(p74)-p73(p80)p79(p71)-p87(p88) | p84(p83)p78(p74) | p84(p83)p78(p74)-p75(p77) | p84(p83) | 0 | p84(p83)p83(p84) | p84(p83)p78(p74)-p73(p80)p79(p71)-p85(p86) |
| UV | 0 | 0 | p88(p87)p71(p79)-p80(p73) | p88(p87)p72(p81)-p82(p76) | p88(p87)p71(p79)-p80(p73)p74(p78) | 0 | p88(p87)p71(p79)-p80(p73)p74(p78)-p83(p84) | p88(p87)p85(p86) |
| UW | 0 | p73(p80)p79(p71)-p87(p88) | 0 | p75(p77) | p74(p78) | 0 | p74(p78)p83(p84) | p73(p80)p79(p71)-p85(p86) |
| UX | 0 | p76(p82)p81(p72)-p87(p88) | p77(p75) | 0 | p77(p75)p74(p78) | 0 | p77(p75)p74(p78)-p83(p84) | p76(p82)p81(p72)-p85(p86) |
| UY | 0 | p78(p74)p73(p80)-p79(p71)p87(p88) | p78(p74) | p78(p74)p75(p77) | 0 | 0 | p83(p84) | p78(p74)p73(p80)-p79(p71)p85(p86) |
| UZ | 0 | p86(p85)p87(p88) | p86(p85)p71(p79)-p80(p73) | p86(p85)p72(p81)-p82(p76) | p86(p85)p71(p79)-p80(p73)p74(p78) | 0 | p86(p85)p71(p79)-p80(p73)p74(p78)-p83(p84) | p86(p85)p85(p86) |
| UU' | 0 | 0 | 0 | 0 | 0 | 0 | 0 | 0 |
| UZ' | 0 | 0 | 0 | 0 | 0 | 0 | 0 | 0 |

FIG. 28L

| | DA | DB | DC | DD | DE | DF | DG | DE' | DF' | DG' | HA | HB | HA' |
|---|---|---|---|---|---|---|---|---|---|---|---|---|---|
| DA | 0 | 1 | 1 | 2 | 0 | 0 | ∞ | 2 | 2 | 3 | ∞ | 0 | 0 |
| DB | 1 | 0 | 1 | 1 | 1 | 1 | ∞ | 2 | 1 | 2 | ∞ | 1 | 1 |
| DC | 1 | 1 | 0 | 2 | 1 | 1 | ∞ | 1 | 2 | 3 | ∞ | 1 | 1 |
| DD | 2 | 1 | 2 | 0 | 2 | 2 | ∞ | 3 | 2 | 1 | ∞ | 2 | 2 |
| DE | 2 | 2 | 1 | 3 | 0 | 2 | ∞ | 2 | 3 | 4 | ∞ | 2 | 2 |
| DF | 2 | 1 | 2 | 2 | 2 | 0 | ∞ | 3 | 2 | 3 | ∞ | 2 | 2 |
| DG | 3 | 2 | 3 | 1 | 3 | 3 | 0 | 4 | 3 | 2 | ∞ | 3 | 3 |
| DE' | 0 | 1 | 1 | 2 | 0 | 0 | ∞ | 0 | 2 | 3 | ∞ | 0 | 0 |
| DF' | 0 | 1 | 1 | 2 | 0 | 0 | ∞ | 2 | 0 | 3 | ∞ | 0 | 0 |
| DG' | ∞ | ∞ | ∞ | ∞ | ∞ | ∞ | ∞ | ∞ | ∞ | 0 | ∞ | ∞ | ∞ |
| HA | 0 | 1 | 1 | 2 | 0 | 0 | ∞ | 2 | 2 | 3 | 0 | 0 | 0 |
| HB | 0 | 1 | 1 | 2 | 0 | 0 | ∞ | 2 | 2 | 3 | ∞ | 0 | 0 |
| HA' | ∞ | ∞ | ∞ | ∞ | ∞ | ∞ | ∞ | ∞ | ∞ | ∞ | ∞ | ∞ | 0 |

FIG. 28M

| | UU | UV | UW | UX | UY | UZ | UU' | UZ' |
|---|---|---|---|---|---|---|---|---|
| UU | ∞ | 3 | 2 | 3 | 1 | ∞ | 2 | 3 |
| UV | ∞ | ∞ | 1 | 1 | 2 | ∞ | 3 | 0 |
| UW | ∞ | 1 | ∞ | 1 | 1 | ∞ | 2 | 1 |
| UX | ∞ | 1 | 1 | ∞ | 2 | ∞ | 3 | 1 |
| UY | ∞ | 2 | 1 | 2 | ∞ | ∞ | 1 | 2 |
| UZ | ∞ | 0 | 1 | 1 | 2 | ∞ | 3 | 0 |
| UU' | ∞ | ∞ | ∞ | ∞ | ∞ | ∞ | ∞ | ∞ |
| UZ' | ∞ | ∞ | ∞ | ∞ | ∞ | ∞ | ∞ | ∞ |

FIG. 28N

| | UU | UV | UW | UX | UY | UZ | UU' | UZ' |
|---|---|---|---|---|---|---|---|---|
| UU | ∞ | ∞ | ∞ | ∞ | 1 | ∞ | ∞ | ∞ |
| UV | ∞ | ∞ | 2 | 1 | ∞ | ∞ | ∞ | 1 |
| UW | ∞ | 2 | ∞ | ∞ | 1 | ∞ | ∞ | ∞ |
| UX | ∞ | 1 | ∞ | ∞ | 1 | ∞ | ∞ | ∞ |
| UY | ∞ | ∞ | 1 | 1 | ∞ | ∞ | 1 | ∞ |
| UZ | ∞ | 1 | ∞ | ∞ | ∞ | ∞ | ∞ | ∞ |
| UU' | ∞ | ∞ | ∞ | ∞ | ∞ | ∞ | ∞ | ∞ |
| UZ' | ∞ | ∞ | ∞ | ∞ | ∞ | ∞ | ∞ | ∞ |

FIG. 29A

| | UU | UV | UW | UX | UY | UZ | UU' | UZ' |
|---|---|---|---|---|---|---|---|---|
| UU | 0 | 0 | 0 | 0 | p84(p83) | 0 | 0 | 0 |
| UV | 0 | 0 | p88(p87)p71(p79)-p80(p73) | p88(p87)p72(p81)-p82(p76) | 0 | 0 | 0 | p88(p87)p85(p86) |
| UW | 0 | p73(p80)p79(p71)-p87(p88) | 0 | 0 | p74(p78) | 0 | 0 | 0 |
| UX | 0 | p76(p82)p81(p72)-p87(p88) | 0 | 0 | p77(p75)p74(p78) | 0 | 0 | 0 |
| UY | 0 | 0 | p78(p74) | p78(p74)p75(p77) | 0 | 0 | p83(p84) | 0 |
| UZ | 0 | p86(p85)p87(p88) | 0 | 0 | 0 | 0 | 0 | 0 |
| UU' | 0 | 0 | 0 | 0 | 0 | 0 | 0 | 0 |
| UZ' | 0 | 0 | 0 | 0 | 0 | 0 | 0 | 0 |

FIG. 29B

| | UU | UV | UW | UX | UY | UZ | UU' | UZ' |
|---|---|---|---|---|---|---|---|---|
| UU | 1 | p84(p83)p78(p74)-p75(p77)p76(p82)-p81(p72)p87(p88) | p84(p83)p78(p74) | p84(p83)p78(p74)-p75(p77) | p84(p83) | 0 | p84(p83)p83(p84) | p84(p83)p78(p74)-p75(p77)p76(p82)-p81(p72)p87(p88)-p88(p87)p85(p86) |
| UV | 0 | 1 | p88(p87)p71(p79)-p80(p73) | p88(p87)p72(p81)-p82(p76) | p88(p87)p72(p81)-p82(p76)p77(p75)-p74(p78) | 0 | p88(p87)p72(p81)-p82(p76)p77(p75)-p74(p78)p83(p84) | p88(p87)p85(p86) |
| UW | 0 | p73(p80)p79(p71)-p87(p88) | 1 | p74(p78)p78(p74)-p75(p77) | p74(p78) | 0 | p74(p78)p83(p84) | p73(p80)p79(p71)-p87(p88)p88(p87)-p85(p86) |
| UX | 0 | p76(p82)p81(p72)-p87(p88) | p77(p75)p74(p78)-p78(p74) | 1 | p77(p75)p74(p78) | 0 | p77(p75)p74(p78)-p83(p84) | p76(p82)p81(p72)-p87(p88)p88(p87)-p85(p86) |
| UY | 0 | p78(p74)p75(p77)-p76(p82)p81(p72)-p87(p88) | p78(p74) | p78(p74)p75(p77) | 1 | 0 | p83(p84) | p78(p74)p75(p77)-p76(p82)p81(p72)-p87(p88)p88(p87)-p85(p86) |
| UZ | 0 | p86(p85)p87(p88) | p86(p85)p87(p88)-p88(p87)p71(p79)-p80(p73) | p86(p85)p87(p88)-p88(p87)p72(p81)-p82(p76) | p86(p85)p87(p88)-p88(p87)p72(p81)-p82(p76)p77(p75)-p74(p78) | 1 | p86(p85)p87(p88)-p88(p87)p72(p81)-p82(p76)p77(p75)-p74(p78)p83(p84) | p86(p85)p87(p88)-p88(p87)p85(p86) |
| UU' | 0 | 0 | 0 | 0 | 0 | 0 | 1 | 0 |
| UZ' | 0 | 0 | 0 | 0 | 0 | 0 | 0 | 1 |

FIG. 29C

| | UU | UV | UW | UX | UY | UZ | UU' | UZ' |
|---|---|---|---|---|---|---|---|---|
| UU | 0 | 3 | 2 | 2 | 1 | ∞ | 2 | 4 |
| UV | ∞ | 0 | 2 | 1 | 2 | ∞ | 3 | 1 |
| UW | ∞ | 2 | 0 | 2 | 1 | ∞ | 2 | 3 |
| UX | ∞ | 1 | 2 | 0 | 1 | ∞ | 2 | 2 |
| UY | ∞ | 2 | 1 | 1 | 0 | ∞ | 1 | 3 |
| UZ | ∞ | 1 | 3 | 2 | 3 | 0 | 4 | 2 |
| UU' | ∞ | ∞ | ∞ | ∞ | ∞ | ∞ | 0 | ∞ |
| UZ' | ∞ | ∞ | ∞ | ∞ | ∞ | ∞ | ∞ | 0 |

FIG. 29D

| | UU | UV | UW | UX | UY | UZ |
|---|---|---|---|---|---|---|
| UU | I | p84(p83)p78(p74)-p75(p77)p76(p82)-p81(p72)p87(p88) | p84(p83)p78(p74) | p84(p83)p78(p74)-p75(p77) | p84(p83) | p84(p83)p78(p74)-p75(p77)p76(p82)-p81(p72)p87(p88)-p88(p87)p85(p86) |
| UV | p88(p87)p72(p81)-p82(p76)p77(p75)-p74(p78)p83(p84) | I | p88(p87)p71(p79)-p80(p73) | p88(p87)p72(p81)-p82(p76) | p88(p87)p72(p81)-p82(p76)p77(p75)-p74(p78) | p88(p87)p85(p86) |
| UW | p74(p78)p83(p84) | p73(p80)p79(p71)-p87(p88) | I | p74(p78)p78(p74)-p75(p77) | p74(p78) | p73(p80)p79(p71)-p87(p88)p88(p87)-p85(p86) |
| UX | p77(p75)p74(p78)-p83(p84) | p76(p82)p81(p72)-p87(p88) | p77(p75)p74(p78)-p78(p74) | I | p77(p75)p74(p78) | p76(p82)p81(p72)-p87(p88)p88(p87)-p85(p86) |
| UY | p83(p84) | p78(p74)p75(p77)-p76(p82)p81(p72)-p87(p88) | p78(p74) | p78(p74)p75(p77) | I | p78(p74)p75(p77)-p76(p82)p81(p72)-p87(p88)p88(p87)-p85(p86) |
| UZ | p86(p85)p87(p88)-p88(p87)p72(p81)-p82(p76)p77(p75)-p74(p78)p83(p84) | p86(p85)p87(p88) | p86(p85)p87(p88)-p88(p87)p71(p79)-p80(p73) | p86(p85)p87(p88)-p88(p87)p72(p81)-p82(p76) | p86(p85)p87(p88)-p88(p87)p72(p81)-p82(p76)p77(p75)-p74(p78) | I |

FIG. 29E

| | UU | UV | UW | UX | UY | UZ |
|---|---|---|---|---|---|---|
| UU | 0 | 3 | 2 | 2 | 1 | 4 |
| UV | 3 | 0 | 2 | 1 | 2 | 1 |
| UW | 2 | 2 | 0 | 2 | 1 | 3 |
| UX | 2 | 1 | 2 | 0 | 1 | 2 |
| UY | 1 | 2 | 1 | 1 | 0 | 3 |
| UZ | 4 | 1 | 3 | 2 | 3 | 0 |

FIG. 29F

| SOURCE | DESTINATION | INPUT PORT | OUTPUT PORT |
|---|---|---|---|
| UU | UV | p72 | p87 |
| UU | UZ | p72 | p87 |
| UU | UZ | p87 | p85 |
| UV | UU | p87 | p72 |
| UV | UW | p87 | p71 |
| UV | UX | p87 | p72 |
| UV | UY | p87 | p72 |
| UV | UZ | p87 | p85 |
| UW | UV | p71 | p87 |
| UW | UZ | p71 | p87 |
| UW | UZ | p87 | p85 |
| UX | UV | p72 | p87 |
| UX | UZ | p72 | p87 |
| UX | UZ | p87 | p85 |
| UY | UV | p72 | p87 |
| UY | UZ | p72 | p87 |
| UY | UZ | p87 | p85 |
| UZ | UU | p85 | p87 |
| UZ | UV | p85 | p87 |
| UZ | UW | p85 | p87 |
| UZ | UX | p85 | p87 |
| UZ | UY | p85 | p87 |
| UZ | UU | p87 | p72 |
| UZ | UW | p87 | p71 |
| UZ | UX | p87 | p72 |
| UZ | UY | p87 | p72 |

FIG. 30A

| SOURCE | DESTINATION | INPUT PORT | OUTPUT PORT |
|---|---|---|---|
| UU | UV | p74 | p75 |
| UU | UW | p74 | LOCAL |
| UU | UX | p74 | p75 |
| UU | UZ | p74 | p75 |
| UV | UU | p75 | p74 |
| UV | UY | p75 | p74 |
| UV | UW | p73 | LOCAL |
| UW | UU | LOCAL | p74 |
| UW | UX | LOCAL | p74 |
| UW | UY | LOCAL | p74 |
| UW | UV | LOCAL | p73 |
| UW | UZ | LOCAL | p73 |
| UW | UX | p74 | p75 |
| UX | UU | p75 | p74 |
| UX | UW | p75 | p74 |
| UX | UW | p74 | LOCAL |
| UX | UY | p75 | p74 |
| UY | UV | p74 | p75 |
| UY | UW | p74 | LOCAL |
| UY | UZ | p74 | p75 |
| UY | UX | p74 | p75 |
| UZ | UU | p75 | p74 |
| UZ | UY | p75 | p74 |
| UZ | UW | p73 | LOCAL |

FIG. 30B

| SOURCE | DESTI-NATION | INPUT PORT | OUTPUT PORT |
|---|---|---|---|
| UU | UV | p77 | p76 |
| UU | UX | p77 | LOCAL |
| UU | UZ | p77 | p76 |
| UV | UU | p76 | p77 |
| UV | UX | p76 | LOCAL |
| UV | UY | p76 | p77 |
| UW | UX | p77 | LOCAL |
| UX | UU | LOCAL | p77 |
| UX | UV | LOCAL | p76 |
| UX | UW | LOCAL | p77 |
| UX | UY | LOCAL | p77 |
| UX | UZ | LOCAL | p76 |
| UY | UV | p77 | p76 |
| UY | UX | p77 | LOCAL |
| UY | UZ | p77 | p76 |
| UZ | UU | p76 | p77 |
| UZ | UX | p76 | LOCAL |
| UZ | UY | p76 | p77 |

FIG. 30C

| SOURCE | DESTI-NATION | INPUT PORT | OUTPUT PORT |
|---|---|---|---|
| UU | UV | p83 | p78 |
| UU | UW | p83 | p78 |
| UU | UX | p83 | p78 |
| UU | UZ | p83 | p78 |
| UU | UY | p83 | LOCAL |
| UV | UU | p78 | p83 |
| UV | UY | p78 | LOCAL |
| UW | UU | p78 | p83 |
| UW | UX | p78 | p78 |
| UW | UY | p78 | LOCAL |
| UX | UU | p78 | p83 |
| UX | UW | p78 | p78 |
| UX | UY | p78 | LOCAL |
| UY | UU | LOCAL | p83 |
| UY | UV | LOCAL | p78 |
| UY | UW | LOCAL | p78 |
| UY | UX | LOCAL | p78 |
| UY | UZ | LOCAL | p78 |
| UZ | UU | p78 | p83 |
| UZ | UY | p78 | LOCAL |

FIG. 30D

| SOURCE | DESTI-NATION | INPUT PORT | OUTPUT PORT |
|---|---|---|---|
| UU | UV | p82 | p81 |
| UU | UZ | p82 | p81 |
| UV | UU | p81 | p82 |
| UV | UX | p81 | p82 |
| UV | UY | p81 | p82 |
| UX | UV | p82 | p81 |
| UX | UZ | p82 | p81 |
| UY | UV | p82 | p81 |
| UY | UZ | p82 | p81 |
| UZ | UU | p81 | p82 |
| UZ | UX | p81 | p82 |
| UZ | UY | p81 | p82 |

FIG. 30E

| SOURCE | DESTI-NATION | INPUT PORT | OUTPUT PORT |
|---|---|---|---|
| UV | UW | p79 | p80 |
| UW | UV | p80 | p79 |
| UW | UZ | p80 | p79 |
| UZ | UW | p79 | p80 |

FIG. 30F

| SOURCE | DESTI-NATION | INPUT PORT | OUTPUT PORT |
|---|---|---|---|
| UU | UV | LOCAL | p84 |
| UU | UW | LOCAL | p84 |
| UU | UX | LOCAL | p84 |
| UU | UY | LOCAL | p84 |
| UU | UZ | LOCAL | p84 |
| UV | UU | p84 | LOCAL |
| UW | UU | p84 | LOCAL |
| UX | UU | p84 | LOCAL |
| UY | UU | p84 | LOCAL |
| UZ | UU | p84 | LOCAL |

FIG. 30G

| SOURCE | DESTI-NATION | INPUT PORT | OUTPUT PORT |
|---|---|---|---|
| UU | UZ | p86 | LOCAL |
| UV | UZ | p86 | LOCAL |
| UW | UZ | p86 | LOCAL |
| UX | UZ | p86 | LOCAL |
| UY | UZ | p86 | LOCAL |
| UZ | UU | LOCAL | p86 |
| UZ | UV | LOCAL | p86 |
| UZ | UW | LOCAL | p86 |
| UZ | UX | LOCAL | p86 |
| UZ | UY | LOCAL | p86 |

FIG. 30H

| SOURCE | DESTI-NATION | INPUT PORT | OUTPUT PORT |
|---|---|---|---|
| UU | UV | p88 | LOCAL |
| UU | UZ | p88 | p88 |
| UV | UU | LOCAL | p88 |
| UV | UW | LOCAL | p88 |
| UV | UX | LOCAL | p88 |
| UV | UY | LOCAL | p88 |
| UV | UZ | LOCAL | p88 |
| UW | UV | p88 | LOCAL |
| UW | UZ | p88 | p88 |
| UX | UV | p88 | LOCAL |
| UX | UZ | p88 | p88 |
| UY | UV | p88 | LOCAL |
| UY | UZ | p88 | p88 |
| UZ | UU | p88 | p88 |
| UZ | UV | p88 | LOCAL |
| UZ | UW | p88 | p88 |
| UZ | UX | p88 | p88 |
| UZ | UY | p88 | p88 |

FIG. 30I

| | TD | TE | TF | ... |
|---|---|---|---|---|
| TA | $M_{TA-TD}$ | $M_{TA-TE}$ | $M_{TA-TF}$ | ... |
| TB | $M_{TB-TD}$ | $M_{TB-TE}$ | $M_{TB-TF}$ | ... |
| TC | $M_{TC-TD}$ | $M_{TC-TE}$ | $M_{TC-TF}$ | ... |
| ⋮ | ⋮ | ⋮ | ⋮ | |

FIG. 36A

| | TA | TB | TC | ... |
|---|---|---|---|---|
| TA | $M_{TA-TA}$ | $M_{TA-TB}$ | $M_{TA-TC}$ | ... |
| TB | $M_{TB-TA}$ | $M_{TB-TB}$ | $M_{TB-TC}$ | ... |
| TC | $M_{TC-TA}$ | $M_{TC-TB}$ | $M_{TC-TC}$ | ... |
| ⋮ | ⋮ | ⋮ | ⋮ | |

FIG. 36B

| | TD | TE | TF | ... |
|---|---|---|---|---|
| TA | $F_{TA-TD}$ | $F_{TA-TE}$ | $F_{TA-TF}$ | ... |
| TB | $F_{TB-TD}$ | $F_{TB-TE}$ | $F_{TB-TF}$ | ... |
| TC | $F_{TC-TD}$ | $F_{TC-TE}$ | $F_{TC-TF}$ | ... |
| ⋮ | ⋮ | ⋮ | ⋮ | |

FIG. 36C

| | TA | TB | TC | ... |
|---|---|---|---|---|
| TA | $F_{TA-TA}$ | $F_{TA-TB}$ | $F_{TA-TC}$ | ... |
| TB | $F_{TB-TA}$ | $F_{TB-TB}$ | $F_{TB-TC}$ | ... |
| TC | $F_{TC-TA}$ | $F_{TC-TB}$ | $F_{TC-TC}$ | ... |
| ⋮ | ⋮ | ⋮ | ⋮ | |

FIG. 36D

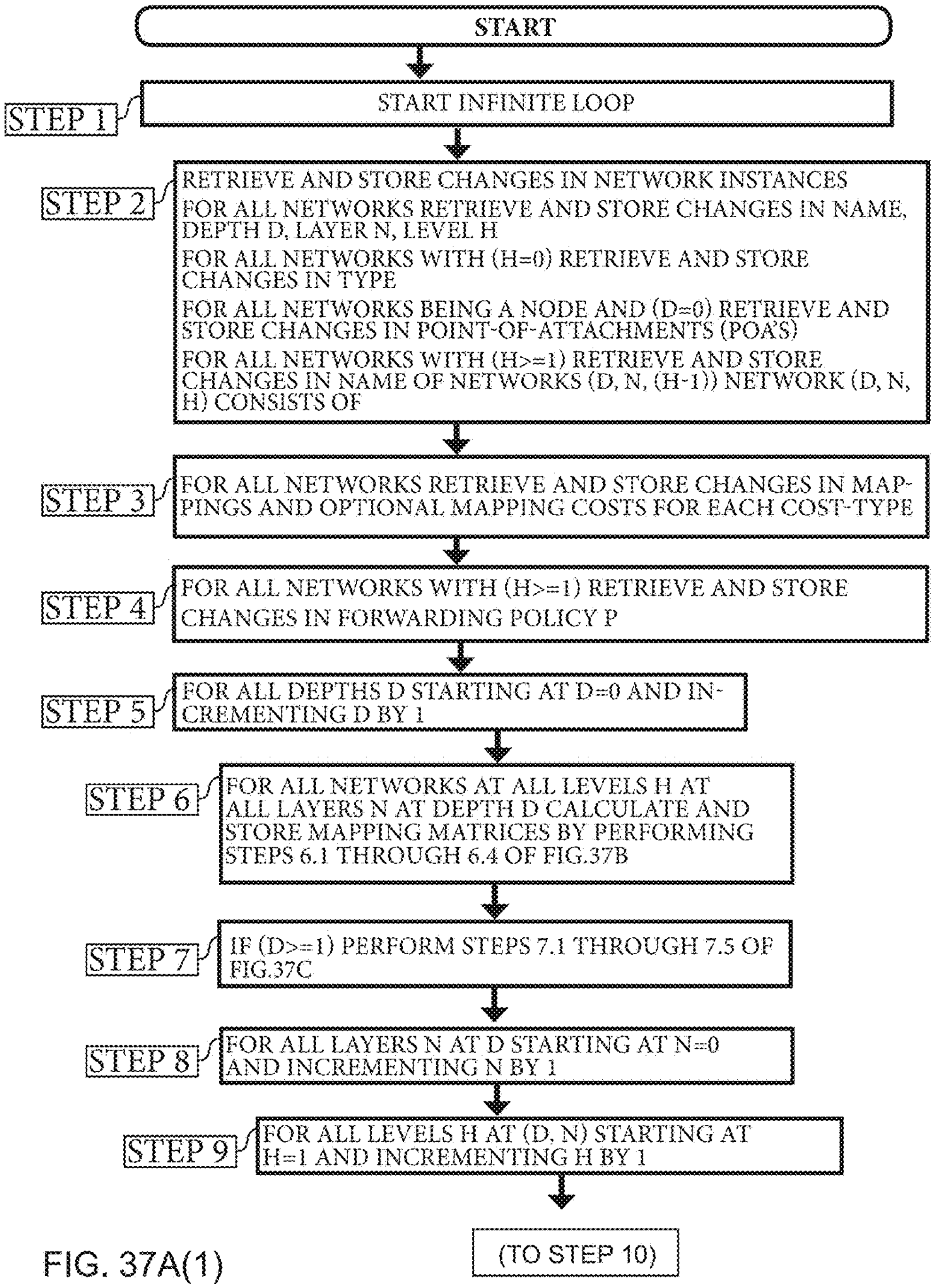
FIG. 37A(1)

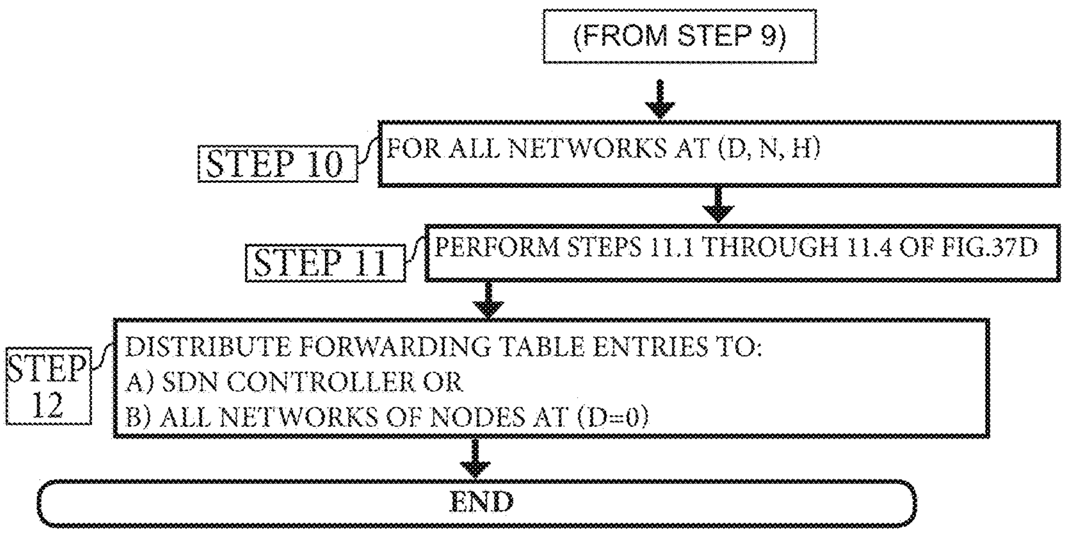
FIG. 37A(2)

| FIG.25 | FIG.37A, 37B, 37C, 37D |
|---|---|
| 1 | 2 3 6.1 |
| 2 | 6.2 |
| 3 | 4 |
| 4 | 11.2 |
| 5 | 2 3 6.1 6.4 |
| 6 | 7.4 |
| 7 | 6.2 |
| 8 | 7.4 |
| 9 | 4 |
| 10 | 11.2 |
| 11 | 11.4 |
| 12 | 12 |

FIG. 37E

| D | N | H | STEP MATRIX TYPE | MATRICES CREATED | STEP FIG.25 |
|---|---|---|---|---|---|
| 0 | 0 | 1 | 6.1 LEVEL-MAPPING | $M_{DAA}$ $M_{HAA}$ | 1, 5 |
| 0 | 0 | 1 | 6.2 TOPOLOGY-MAPPING | $M_{DAA-DAA}$ $M_{DAA-HAA}$ $M_{HAA-DAA}$ $M_{HAA-HAA}$ | 2 |
| 0 | 0 | 1 | 11.2 TOPOLOGY-FORWARDING | $F_{DAA-DAA}$ $F_{DAA-HAA}$ $F_{HAA-DAA}$ $F_{HAA-HAA}$ | 4 |
| 1 | 0 | 1 | 6.1 LEVEL-MAPPING | $M_{UUU}$ | 5 |
| 1 | 0 | 1 | 6.2 TOPOLOGY-MAPPING | $M_{UUU-UUU}$ | 8 |
| 1 | 0 | 1 | 6.4 DEPTH-MAPPING | $M_{DAA-UUU}$ $M_{UUU-DAA}$ $M_{HAA-UUU}$ $M_{UUU-HAA}$ | 5 |
| | | | 7.1 FORWARDING | $F_{TUUU-TUUU}$ $F^{3}_{TUUU-TUUU}$ | |
| 1 | 0 | 1 | 7.4 TOPOLOGY-MAPPING | $M_{UUU-UUU}$ | 6, 8 |
| 1 | 0 | 1 | 11.2 TOPOLOGY-FORWARDING | $F_{UUU-UUU}$ | 10 |

FIG. 37F

| | PH | PJ | PK |
|---|---|---|---|
| PH | I | p19(p21) | p20(p24) |
| PJ | p21(p19) | I | p22(p25) |
| PK | p24(p20) | p25(p22) | I |

FIG. 38N

| | YD | YE | YF |
|---|---|---|---|
| YD | I | p19(p21) | p20(p24) |
| YE | p21(p19) | I | p21(p19)-p20(p24) |
| YF | p24(p20) | p24(p20)-p19(p21) | I |

FIG. 38O

| | XA | XB | XC | XD | XE | XF |
|---|---|---|---|---|---|---|
| XA | – | p202(201)-p19(p21)-p205(p206) | p202(201)-p20(p24)-p209(p210) | p202(201)-p203(p204) | p202(201)-p19(p21)-p207(p208) | p202(201)-p20(p24)-p211(p212) |
| XB | p206(205)-p21(p19)-p201(p202) | – | p206(205)-p22(p25)-p209(p210) | p206(205)-p21(p19)-p203(p204) | p206(205)-p207(p208) | p206(205)-p22(p25)-p211(p212) |
| XC | p210(p209)-p24(p20)-p201(p202) | p210(p209)-p25(p22)-p205(p206) | – | p210(p209)-p24(p20)-p203(p204) | p210(p209)-p25(p22)-p207(p208) | p210(p209)-p211(p212) |
| XD | p204(p203)-p201(p202) | p204(p203)-p19(p21)-p205(p206) | p204(p203)-p20(p24)-p209(p210) | – | p204(p203)-p19(p21)-p207(p208) | p204(p203)-p20(p24)-p211(p212) |
| XE | p208(p207)-p21(p19)-p201(p202) | p208(p207)-p205(p206) | p208(p207)-p22(p25)-p209(p210) | p208(p207)-p21(p19)-p203(p204) | – | p208(p207)-p22(p25)-p211(p212) |
| XF | p212(p211)-p24(p20)-p201(p202) | p212(p211)-p25(p22)-p205(p206) | p212(p211)-p209(p210) | p212(p211)-p24(p20)-p203(p204) | p212(p211)-p25(p22)-p207(p208) | – |

FIG. 38P

| | ZA | ZB | ZC |
|---|---|---|---|
| ZA | 1 | p202(201)-p19(p21)-p205(p206) | p202(201)p203(p204)-p204(p203)p20(p24)-p209(p210) |
| ZB | p206(205)-p21(p19)-p201(p202) | 1 | p206(205)-p21(p19)p20(p24)-p209(p210) |
| ZC | p210(p209)p24(p20)-p203(p204)p204(p203)-p201(p202) | p210(p209)p24(p20)-p19(p21)p205(p206) | 1 |
| ZD | p204(p203)-p201(p202) | p204(p203)p201(p202)-p202(201)p19(p21)-p205(p206) | p204(p203)-p20(p24)-p209(p210) |
| ZE | 0 | 0 | 0 |
| ZF | 0 | 0 | 0 |

FIG. 38Q(1)

| | ZD | ZE | ZF |
|---|---|---|---|
| (ZA) | p202(201)-p203(p204) | 0 | 0 |
| (ZB) | p206(205)p21(p19)-p201(202)p202(201)-p203(p204) | 0 | 0 |
| (ZC) | p210(p209)-p24(p20)-p203(p204) | 0 | 0 |
| (ZD) | 1 | 0 | 0 |
| (ZE) | 0 | 1 | p208(p207)p21(p19)-p20(p24)p211(p212) |
| (ZF) | 0 | p212(p211)p24(p20)-p19(p21)p207(p208) | 1 |

FIG. 38Q(2)

| PHY./ VIRT. NODE | LOGICAL SOURCE NETWORK | LOG. SRC PORT | LOGICAL DESTINATION NETWORK | LOG. DESTIN. PORT | PHY./ VIRT. INPUT PORT | PHY./ VIRT. OUTPUT PORT | SOURCE POA IN OUTGOING PACKET | DESTIN. POA IN OUTGOING PACKET |
|---|---|---|---|---|---|---|---|---|
| XA | YYYY.YWW.YD | ZA | YYYY.YWW.YE | ZB | LOCAL | p202 | NONE | NONE |
| PH | YYYY.YWW.YD | ZA | YYYY.YWW.YE | ZB | p201 | p19 | p19 | p21 |
| PJ | YYYY.YWW.YD | ZA | YYYY.YWW.YE | ZB | p21 | p205 | NONE | NONE |
| XB | YYYY.YWW.YD | ZA | YYYY.YWW.YE | ZB | p206 | LOCAL | NONE | NONE |
| XA | YYYY.YWW.YD | ZA | YYYY.YWW.YF | ZC | LOCAL | p202 | NONE | NONE |
| PH | YYYY.YWW.YD | ZA | YYYY.YWW.YF | ZC | p201 | p203 | NONE | NONE |
| XD | YYYY.YWW.YD | ZA | YYYY.YWW.YF | ZC | p204 | p204 | NONE | NONE |
| PH | YYYY.YWW.YD | ZA | YYYY.YWW.YF | ZC | p203 | p20 | p20 | p24 |
| PK | YYYY.YWW.YD | ZA | YYYY.YWW.YF | ZC | p24 | p209 | NONE | NONE |
| XC | YYYY.YWW.YD | ZA | YYYY.YWW.YF | ZC | p210 | LOCAL | NONE | NONE |
| XA | YYYY.YWW.YD | ZA | YYYY.YWW.YD | ZD | LOCAL | p202 | NONE | NONE |
| PH | YYYY.YWW.YD | ZA | YYYY.YWW.YD | ZD | p201 | p203 | NONE | NONE |
| XD | YYYY.YWW.YD | ZA | YYYY.YWW.YD | ZD | p204 | LOCAL | NONE | NONE |

FIG. 38R

| PHY./ VIRT. NODE | LOGICAL SOURCE ADDRESS | LOGICAL DESTI-NATION ADDRESS | PHY./ VIRT. INPUT PORT | PHY./ VIRT. OUTPUT PORT | SOURCE POA IN OUTGOING PACKET | DESTIN. POA IN OUTGOING PACKET | CHAN-NEL IN | CHAN-NEL OUT |
|---|---|---|---|---|---|---|---|---|
| KG | LKK.LK.LG | LKK.LP.LJ | LOCAL | p424 | N/A | N/A | N/A | N/A |
| KK | LKK.LK.LG | LKK.LP.LJ | p423 | p407 | p407 | p408 | N/A | N/A |
| KL | LKK.LK.LG | LKK.LP.LJ | p408 | p409 | p409 | p410 | N/A | N/A |
| KM | LKK.LK.LG | LKK.LP.LJ | p410 | p411 | p411 | p412 | N/A | N/A |
| KN | LKK.LK.LG | LKK.LP.LJ | p412 | p413 | p413 | p414 | N/A | N/A |
| KP | LKK.LK.LG | LKK.LP.LJ | p414 | p425 | N/A | N/A | N/A | N/A |
| KH | LKK.LK.LG | LKK.LP.LJ | p426 | p426 | N/A | N/A | N/A | N/A |
| KP | LKK.LK.LG | LKK.LP.LJ | p425 | p415 | p415 | p416 | N/A | N/A |
| KQ | LKK.LK.LG | LKK.LP.LJ | p416 | p417 | p417 | p418 | N/A | N/A |
| KR | LKK.LK.LG | LKK.LP.LJ | p418 | p419 | p419 | p420 | N/A | N/A |
| KS | LKK.LK.LG | LKK.LP.LJ | p420 | p421 | p421 | p422 | N/A | N/A |
| KT | LKK.LK.LG | LKK.LP.LJ | p422 | p427 | N/A | N/A | N/A | N/A |
| KJ | LKK.LK.LG | LKK.LP.LJ | p428 | LOCAL | N/A | N/A | N/A | N/A |

FIG. 40C

| PHY./ VIRT. NODE | LOGICAL SOURCE ADDRESS | LOGICAL DESTI-NATION ADDRESS | PHY./ VIRT. INPUT PORT | PHY./ VIRT. OUTPUT PORT | SOURCE POA IN OUTGOING PACKET | DESTIN. POA IN OUTGOING PACKET | CHAN-NEL IN | CHAN-NEL OUT |
|---|---|---|---|---|---|---|---|---|
| KG | LGG.LG | LGG.LJ | LOCAL | p424 | p424 | p426 | N/A | N/A |
| KK | N/A | N/A | p423 | p407 | N/A | N/A | N/A | C1 |
| KL | N/A | N/A | p408 | p409 | N/A | N/A | C1 | C2 |
| KM | N/A | N/A | p410 | p411 | N/A | N/A | C2 | C3 |
| KN | N/A | N/A | p412 | p413 | N/A | N/A | C3 | C4 |
| KP | N/A | N/A | p414 | p425 | N/A | N/A | C4 | N/A |
| KH | LGG.LG | LGG.LJ | p426 | p426 | p426 | p428 | N/A | N/A |
| KP | N/A | N/A | p425 | p415 | N/A | N/A | N/A | C5 |
| KQ | N/A | N/A | p416 | p417 | N/A | N/A | C5 | C6 |
| KR | N/A | N/A | p418 | p419 | N/A | N/A | C6 | C7 |
| KS | N/A | N/A | p420 | p421 | N/A | N/A | C7 | C8 |
| KT | N/A | N/A | p422 | p427 | N/A | N/A | C8 | N/A |
| KJ | LGG.LG | LGG.LJ | p428 | LOCAL | N/A | N/A | N/A | N/A |

FIG. 40D

| PHY./ VIRT. NODE | LOGICAL SOURCE ADDRESS | LOGICAL DESTI-NATION ADDRESS | PHY./ VIRT. INPUT PORT | PHY./ VIRT. OUTPUT PORT | SOURCE POA IN OUTGOING PACKET | DESTIN. POA IN OUTGOING PACKET |
|---|---|---|---|---|---|---|
| QA | NAAA.NAA.NA | NAAA.NEE.* | LOCAL(NA) | p431 | p431 | p432 |
| QB | NAAA.NAA.NA | NAAA.NEE.* | p432 | p433 | p433 | p434 |
| QC | NAAA.NAA.* | NAAA.NEE.* | p434 | p435 | p435 | p436 |
| QD | NAAA.NAA.* | NAAA.NEE.* | p436 | p437 | p437 | p438 |
| QE | NAAA.NAA.* | NAAA.NEE.NF | p438 | p439 | p439 | p440 |
| QF | NAAA.NAA.* | NAAA.NEE.NF | p440 | LOCAL(NF) | N/A | N/A |

FIG. 42K

FIRST EDGE-NAME = FIRST NETWORK - (FIRST MAPPING-TYPE FIRST POA : : SECOND POA) -> SECOND NETWORK

FIG. 51A

SECOND EDGE-NAME = SECOND NETWORK - (SECOND MAPPING-TYPE THIRD POA : : FOURTH POA) -> THIRD NETWORK

FIG. 51B

THIRD EDGE-TYPE THIRD EDGE-NAME = FIRST EDGE-NAME / THIRD EDGE-NAME + SECOND EDGE-NAME / THIRD EDGE-NAME

FIG. 51C

THIRD EDGE-TYPE THIRD EDGE-NAME =
FIRST NETWORK - (FIRST MAPPING-TYPE FIRST POA : FIRST SET OF EDGE-RELATIONSHIPS : SECOND POA) ->
SECOND NETWORK - (SECOND MAPPING-TYPE THIRD POA : SECOND SET OF EDGE-RELATIONSHIPS : FOURTH POA) ->
THIRD NETWORK

FIG. 51D

```
L5 = KA-(topmap p701::p702)->KB
L6 = KB-(topmap p702::p701)->KA

L7 = KC-(laymap p704::p703)->KA
L8 = KA-(laymap p703::p704)->KC
L9 = KD-(laymap p706::p705)->KB
L10 = KB-(laymap p705::p706)->KD

L12 = LA-(depmap)->KA
L13 = KB-(depmap)->LB
L15 = KA-(depmap)->LA
L16 = LB-(depmap)->KB
L17 = LC-(depmap)->KC
L18 = KD-(depmap)->LD
L24 = KC-(depmap)->LC
L25 = LD-(depmap)->KD
```

FIG. 51E

```
toppath L11 = L5/L11
topmap L14 = L12/L14+L11/L14+L13/L14
laymap L19 = L17/L19+L7/L19+L15/L19
laymap L20 = L16/L20+L10/L20+L18/L20
toppath L21 = L14/L21
topmap L22 = L19/L22+L21/L22+L20/L22
toppath L23 = L22/L23
```

FIG. 51F

| | |
|---|---|
| Step 1 | toppath L23 = L22/L23 = |
| Step 2 | L19/L22/L23+L21/L22/L23+L20/L22/L23 = |
| Step 3 | L19/L22/L23+L14/L21/L22/L23+L20/L22/L23 = |
| Step 4 | L17/L19/L22/L23+L7/L19/L22/L23+L15/L19/L22/L23+<br>L12/L14/L21/L22/L23+L11/L14/L21/L22/L23+<br>L13/L14/L21/L22/L23+L16/L20/L22/L23+L10/L20/L22/L23+<br>L18/L20/L22/L23 = |
| Step 5 | L17/L19/L22/L23+L7/L19/L22/L23+L15/L19/L22/L23+<br>L12/L14/L21/L22/L23+L5/L11/L14/L21/L22/L23+<br>L13/L14/L21/L22/L23+L16/L20/L22/L23+L10/L20/L22/L23+<br>L18/L20/L22/L23 = |
| Step 6 | LC-(depmap L17/L19/L22/L23)-><br>KC-(laymap p704:L7/L19/L22/L23:p703)-><br>KA-(depmap L15/L19/L22/L23)-><br>LA-(depmap L12/L14/L21/L22/L23)-><br>KA-(topmap p701:L5/L11/L14/L21/L22/L23:p702)-><br>KB-(depmap L13/L14/L21/L22/L23)-><br>LB-(depmap L16/L20/L22/L23)-><br>KB-(laymap p705:L10/L20/L22/L23:p706)-><br>KD-(depmap L18/L20/L22/L23)->LD |

FIG. 51G

```
L71 = EN-(topmap p618::p620)->EP
L72 = EQ-(topmap p627::p628)->ER
L73 = ER-(topmap p629::p630)->ES
L74 = ES-(topmap p631::p632)->ET

L75 = EU-(laymap p634::p633)->EN
L76 = EP-(laymap p635::p636)->EV
L77 = EV-(laymap p638::p637)->EQ
L78 = ET-(laymap p639::p640)->EW
L90 = EX-(laymap p642::p641)->EU
L91 = EW-(laymap p643::p644)->EY

L81 = EU-(depmap)->VU
L82 = VU-(depmap)->EU
L83 = EV-(depmap)->VV
L84 = VV-(depmap)->EV
L85 = EW-(depmap)->VW
L86 = VW-(depmap)->EW
L92 = VX-(depmap)->EX
L93 = EY-(depmap)->VY
L98 = EX-(depmap)->VX
L99 = VY-(depmap)->EY
```

FIG. 52C

```
topmap L79 = L75/L79+L71/L79+L76/L79
topmap L80 = L77/L80+L72/L80+L73/L80+L74/L80+L78/L80
topmap L87 = L82/L87+L79/L87+L83/L87
topmap L88 = L84/L88+L80/L88+L85/L88
toppath L89 = L87/L89+L88/L89
laymap L94 = L92/L94+L90/L94+L81/L94
laymap L95 = L86/L95+L91/L95+L93/L95
topmap L96 = L94/L96+L89/L96+L95/L96
toppath L97 = L96/L97
```

FIG. 52D toppath L97 =
VX-(depmap L92/L94/L96/L97)->
EX-(laymap p642:L90/L94/L96/L97:p641)->
EU-(depmap L81/L94/L96/L97)->
VU-(depmap L82/L87/L89/L96/L97)->
EU-(laymap p634: L75/L79/L87/L89/L96/L97:p633)->
EN-(topmap p618: L71/L79/L87/L89/L96/L97:p620)->
EP-(laymap p635: L76/L79/L87/L89/L96/L97:p636)->
EV-(depmap L83/L87/L89/L96/L97)->
VV-(depmap L84/L88/L89/L96/L97)->
EV-(laymap p638: L77/L80/L88/L89/L96/L97:p637)->
EQ-(topmap p627: L72/L80/L88/L89/L96/L97:p628)->
ER-(topmap p629: L73/L80/L88/L89/L96/L97:p630)->
ES-(topmap p631:L74/L80/L88/L89/L96/L97:p632)->
ET-(laymap p639: L78/L80/L88/L89/L96/L97:p640)->
EW-(depmap L85/L88/L89/L96/L97)->
VW-(depmap L86/L95/L96/L97)->
EW-(laymap p643: L91/L95/L96/L97:p644)->
EY-(depmap L93/L95/L96/L97)->VY

FIG. 52E

| EDGE-NAME | SWITCHING-IDENTIFIER | D | N | H |
|---|---|---|---|---|
| L71 | SOURCE p618, DESTINATION p620 | 0 | 0 | 0 |
| L72 | SOURCE p627, DESTINATION p628 | 0 | 0 | 0 |
| L73 | SOURCE p629, DESTINATION p630 | 0 | 0 | 0 |
| L74 | SOURCE p631, DESTINATION p632 | 0 | 0 | 0 |
| L89 | SOURCE VU, DESTINATION VW TCP | 1 | 1 | 0 |
| L97 | SOURCE VX, DESTINATION VY | 1 | 2 | 0 |

FIG. 52F

| EQUIPMENT | | NODE | INPUT PORT | OUTPUT PORT | RELEVANT INCOMING SET OF EDGE-RELATIONSHIPS | RELEVANT OUTGOING SET OF EDGE-RELATIONSHIPS |
|---|---|---|---|---|---|---|
| FIRST COMPUTING EQUIPMENT | | EX | NONE | p642 | NONE | L97 (SRC VX, DST VY) |
| | | EU | p641 | p634 | NONE | L89 (SRC VU, DST VW; TCP) |
| | | EN | p633 | p618 | NONE | L71 (SRC p618, DST p620) |
| FIRST PACKET FORWARDING SYSTEM | | EP | p620 | p635 | L71 (SRC p618, DST p620) | NONE |
| | | EV | p636 | p638 | L89 (SRC VU, DST VW; TCP) | L89 (SRC VU, DST VW; TCP) |
| | | EQ | p637 | p627 | NONE | L72 (SRC p627, DST p628) |
| SECOND COMPUTING EQUIPMENT | | ER | p628 | p629 | L72 (SRC p627, DST p628) | L73 (SRC p629, DST p630) |
| | VSWITCH | ES | p630 | p631 | L73 (SRC p629, DST p630) | L74 (SRC p631, DST p632) |
| | FIRST VIRTUAL MACHINE | ET | p632 | p639 | L74 (SRC p631, DST p632) | NONE |
| | | EW | p640 | p643 | L89 (SRC VU, DST VW; TCP) | NONE |
| | | EY | p644 | NONE | L97 (SRC VX, DST VY) | NONE |

FIG.52G

| EQUIPMENT | | INPUT PORT | OUTPUT PORT | RELEVANT INCOMING SET OF EDGE-RELATIONSHIPS | RELEVANT OUTGOING SET OF EDGE-RELATIONSHIPS |
|---|---|---|---|---|---|
| FIRST COMPUTING EQUIPMENT | | NONE | p618 | NONE | L97 (SRC VX, DST VY)<br>L89 (SRC VU, DST VW; TCP)<br>L71 (SRC p618, DST p620) |
| FIRST PACKET FORWARDING SYSTEM | | p620 | p627 | L71 (SRC p618, DST p620)<br>L89 (SRC VU, DST VW; TCP) | L72 (SRC p627, DST p628)<br>L89 (SRC VU, DST VW;TCP) |
| SECOND COMPUTING EQUIPMENT | | p628 | p629 | L72 (SRC p627, DST p628) | L73 (SRC p629, DST p630) |
| | VSWITCH | p630 | p631 | L73 (SRC p629, DST p630) | L74 (SRC p631, DST p632) |
| | FIRST VIRTUAL MACHINE | p632 | NONE | L74 (SRC p631, DST p632)<br>L89 (SRC VU, DST VW; TCP)<br>L97 (SRC VX, DST VY) | NONE |

FIG.52H

| EDGE-NAME | SUBNET-IDENTIFIER | D | N | H |
|---|---|---|---|---|
| L87 | 111.111.111/24 | 1 | 1 | 0 |
| L88 | 111.111.112/24 | 1 | 1 | 0 |

| EDGE-NAME | SWITCHING-IDENTIFIER | D | N | H |
|---|---|---|---|---|
| L71 | SOURCE p618, DESTINATION p620 | 0 | 0 | 0 |
| L72 | SOURCE p627, DESTINATION p628 | 0 | 0 | 0 |
| L73 | SOURCE p629, DESTINATION p630 | 0 | 0 | 0 |
| L74 | SOURCE p631, DESTINATION p632 | 0 | 0 | 0 |
| L89 | SOURCE 111.111.111.10<br>DESTINATION 111.111.112.13 1 | 1 | 1 | 0 |
| L97 | SOURCE PORT=80<br>DESTINATION PORT=80 | 1 | 2 | 0 |

| EDGE-NAME | TRANSPORT-IDENTIFIER | D | N | H |
|---|---|---|---|---|
| L89 | PROTOCOL=6 | 1 | 1 | 0 |

```
J1 = QA-(topmap p431::p432)->QB
J2 = QB-(topmap p433::p434)->QC
J3 = QC-(topmap p435::p436)->QD
J4 = QD-(topmap p437::p438)->QE
J5 = QE-(topmap p439::p440)->QF

J6 = NA-(depmap)->QA
J7 = QB-(depmap)->NB
J8 = NB-(depmap)->QB
J9 = QC-(depmap)->NC
J10 = NC-(depmap)->QC
J11 = QD-(depmap)->ND
J12 = ND-(depmap)->QD
J13 = QE-(depmap)->NE
J14 = NE-(depmap)->QE
J15 = QF-(depmap)->NF

J16 = NA-(levmap)->NAA
J17 = NAA-(levmap)->NB
J18 = NC-(levmap)->NCC
J19 = NCC-(levmap)->ND
J20 = NE-(levmap)->NEE
J21 = NEE-(levmap)->NF
J22 = NAA-(levmap)->NAAA
J23 = NAAA-(levmap)->NEE
```

FIG. 53E

```
topmap J24 = J6/J24 +J1/J24+J7/J24
topmap J25 = J8/J25+J2/J25+J9/J25
topmap J26 = J10/J26+J3/J26+J11/J26
topmap J27 = J12/J27+J4/J27+J13/J27
topmap J28 = J14/J28+J5/J28+J15/J28
toppath J29 = J25/J29
topmap J30 = J17/J30+J29/J30+J18/J30
topmap J31 = J19/J31+J27/J31+J20/J31
```

FIG. 53F

| |
|---|
| levpath J32 = J22/J32+J23/J32 |

FIG. 53G

| | |
|---|---|
| Step 1 | levpath J32 = J22/J32+J23/J32 = |
| Step 2 | J30/J32+J31/J32 = |
| Step 3 | (J17/J30+J29/J30+J18/J30)/J32+<br>(J19/J31+J27/J31+J20/J31)/J32 = |
| Step 4 | (J17/J30+J25/J29/J30+J18/J30)/J32+<br>(J19/J31+J27/J31+J20/J31)/J32 = |
| Step 5 | J17/J30/J32+J25/J29/J30/J32+J18/J30/J32+<br>J19/J31/J32+J27/J31/J32+J20/J31/J32 = |
| Step 6 | J17/J30/J32+J25/J29/J30/J32+J26/J32+J27/J31/J32+<br>J20/J31/J32 = |
| Step 7 | J17/J30/J32+(J8/J25+J2/J25+J9/J25)/J29/J30/J32+<br>(J10/J26+J3/J26+J11/J26)/J32+(J12/J27+J4/J27+<br>J13/J27)/J31/J32+J20/J31/J32 = |
| Step 8 | J17/J30/J32+J8/J25/J29/J30/J32+J2/J25/J29/J30/<br>J32+J9/J25/J29/J30/J32+J10/J26/J32+J3/J26/J32+J11/<br>J26/J32+J12/J27/J31/J32+J4/J27/J31/J32+J13/J27/J31/<br>J32+J20/J31/J32 = |
| Step 9 | NAA-(levmap J17/J30/J32)-><br>NB-(depmap J8/J25/J29/J30/J32)-><br>QB-(topmap p433: J2/J25/J29/J30/J32:p434)-><br>QC-(depmap J9/J25/J29/J30/J32)-><br>NC-(depmap J10/J26/J32)-><br>QC-(topmap p435: J3/J26/J32:p436)-><br>QD-(depmap J11/J26/J32)-><br>ND-(depmap J12/J27/J31/J32)-><br>QD-(topmap p437: J4/J27/J31/J32:p438)-><br>QE-(depmap J13/J27/J31/J32)-><br>NE-(levmap J20/J31/J32)->NEE |

FIG. 53H

| |
|---|
| levpath J32 = J22/J32+J23/J32<br>levpath J33 = J16/J33+J32/J33 |

FIG. 53I

| | |
|---|---|
| Step 1 | levpath J33 = J16/J33+J32/J33 = |
| Step 2 | J16/J33+(J22/J32+J23/J32)/J33 = |
| Step 3 | J16/J33+(J30/J32+J31/J32)/J33 = |
| Step 4 | J16/J33+((J17/J30+J29/J30+J18/J30)/J32+<br>(J19/J31+J27/J31+J20/J31)/J32)/J33 = |
| Step 5 | J16/J33+((J17/J30+J25/J29/J30)/J32)/J33 = |
| Step 6 | J16/J33+J17/J30/J32/J33+J25/J29/J30/J32/J33 = |
| Step 7 | J24/J33+J25/J29/J30/J32/J33 = |
| Step 8 | (J6/J24 +J1/J24+J7/J24)/J33+(J8/J25+J2/J25+<br>J9/J25)/J29/J30/J32/J33 = |
| Step 9 | J6/J24/J33+J1/J24/J33+J7/J24/J33+<br>J8/J25/J29/J30/J32/J33+J2/J25/J29/J30/J32/J33+<br>J9/J25/J29/J30/J32/J33 = |
| Step 10 | NA-(depmap J6/J24/J33)-><br>QA-(topmap p431:J1/J24/J33:p432)-><br>QB-(depmap J7/J24/J33)-><br>NB-(depmap J8/J25/J29/J30/J32/J33)-><br>QB-(topmap p433:J2/J25/J29/J30/J32/J33:p434)-><br>QC-(depmap J9/J25/J29/J30/J32/J33) |

FIG. 53J

| EDGE-NAME | SWITCHING-IDENTIFIER |
|---|---|
| J1 | SRC p431, DST p432 |
| J2 | SRC p433, DST p434 |
| J3 | SRC p435, DST p436 |
| J4 | SRC p437, DST p438 |
| J5 | SRC p439, DST p440 |
| J32 | SRC NAAA.NAA,<br>DST NAAA.NEE |
| J33 | SRC NAAA.NAA.NA,<br>DST NAAA.NEE |
| J34 | SRC NAAA.NAA,<br>DST NAAA.NEE.NF |

FIG. 53K

| EQUIPMENT | NODE | INPUT PORT | OUTPUT PORT | RELEVANT INCOMING SET OF EDGE-RELATIONSHIPS | RELEVANT OUTGOING SET OF EDGE-RELATIONSHIPS |
|---|---|---|---|---|---|
| THIRD COMPUTING EQUIPMENT | QA | NONE | p431 | NONE | J1 (SRC p431, DST p432) / J33 |
| SECOND PACKET FORWARDING SYSTEM | QB | p432 | p433 | J1 (SRC p431, DST p432) / J33 | J2 (SRC p433, DST p434) / J32 / J33 |
| THIRD PACKET FORWARDING SYSTEM | QC | p434 | p435 | J2 (SRC p433, DST p434) / J32 | J3 (SRC p435, DST p436) / J32 |
| FOURTH PACKET FORWARDING SYSTEM | QD | p436 | p437 | J3 (SRC p435, DST p436) / J32 | J4 (SRC p437, DST p438) / J32 |
| FIFTH PACKET FORWARDING SYSTEM | QE | p438 | p439 | J4 (SRC p437, DST p438) / J32 / J34 | J5 (SRC p439, DST p440) / J34 |
| FOURTH COMPUTING EQUIPMENT | QF | p440 | NONE | J5 (SRC p439, DST p440) / J34 | NONE |

FIG. 53L

| CHANGED FIRST EDGE | IMPACTED SECOND EDGE |
|---|---|
| L5 | L11 |
| L6 | NONE |
| L7 | L19 |
| L8 | NONE |
| L9 | NONE |
| L10 | L20 |
| L11 | L14 |
| L12 | L14 |
| L13 | L14 |
| L14 | L21 |
| L15 | L19 |
| L16 | L20 |
| L17 | L19 |
| L18 | L20 |
| L19 | L22 |
| L20 | L22 |
| L21 | L22 |
| L22 | L23 |
| L23 | NONE |

FIG. 54

| SDN COMPILER INPUT | USER | SDN CONTROLLER | DATABASE |
|---|---|---|---|
| CREATE NETWORK | YES | YES | NO |
| DELETE NETWORK | YES | YES | NO |
| CREATE MAPPING | YES | YES | NO |
| DELETE MAPPING | YES | YES | NO |
| RECALCULATE MAPPING | YES | NO | YES |
| OPTIMIZE MAPPING | YES | NO | NO |
| CREATE PATH | YES | NO | NO |
| DELETE PATH | YES | NO | NO |
| RECALCULATE PATH | YES | NO | YES |
| OPTIMIZE PATH | YES | NO | NO |
| MODIFY | YES | YES | NO |
| GET | YES | NO | NO |

FIG. 58

```
K1 = EC-(topmap p801::p802)->ED
K2 = EE-(topmap p803::p804)->EF
K3 = EG-(topmap p805::p806)->EH

K4 = EJ-(laymap p808::p807)->EC
K5 = ED-(laymap p809::p810)->EK
K6 = EK-(laymap p812::p811)->EE
K7 = EF-(laymap p813::p814)->EL
K8 = EL-(laymap p816::p815)->EG
K9 = EH-(laymap p817::p818)->EM

K13 = VJ-(depmap)->EJ
K14 = EK-(depmap)->VK
K15 = VK-(depmap)->EK
K16 = EM-(depmap)->VM
```

FIG. 59C

```
topmap K10 = K4/K10+K1/K10+K5/K10
topmap K11 = K6/K11+K2/K11+K7/K11
topmap K12 = K8/K12+K3/K12+K9/K12
topmap K17 = K13/K17+K10/K17+K14/K17
topmap K18 = K15/K18+K11/K18+K12/K18+K16/K18
toppath K19 = K17/K19+K18/K19
```

FIG. 59D

```
VJ-(depmap K13/K17/K19)->
EJ-(laymap p808:K4/K10/K17/K19:p807)->
EC-(topmap p801:K1/K10/K17/K19:p802)->
ED-(laymap p809:K5/K10/K17/K19:p810)->
EK-(depmap K14/K17/K19)->
VK-(depmap K15/K18/K19)->
EK-(laymap p812:K6/K11/K18/K19:p811)->
EE-(topmap p803:K2/K11/K18/K19:p804)->
EF-(laymap p813:K7/K11/K18/K19:p814)->
EL-(laymap p816:K8/K12/K18/K19:p815)->
EG-(topmap p805:K3/K12/K18/K19:p806)->
EH-(laymap p817:K9/K12/K18/K19:p818)->
EM-(depmap K16/K18/K19)->VM
```

FIG. 59E

| EDGE-NAME | SWITCHING-IDENTIFIER | D | N | H |
|---|---|---|---|---|
| K10 | 195.70 | 0 | 1 | 0 |
| K11 | 195.70 | 0 | 1 | 0 |
| K12 | 195.80 | 0 | 1 | 0 |

FIG. 59F

| EQUIPMENT | NODE | INPUT PORT | OUTPUT PORT | RELEVANT INCOMING SET OF EDGE-RELATIONSHIPS | RELEVANT OUTGOING SET OF EDGE-RELATIONSHIPS |
|---|---|---|---|---|---|
| FIRST WDM | EJ | NONE | p808 | NONE | K10 (195.70) |
| MULTIPLEXER | EC | p807 | p801 | NONE | NONE |
| FIRST | ED | p802 | p809 | NONE | NONE |
| WDM | EK | p810 | p812 | K10 (195.70) | K11 (195.70) |
| OADM | EE | p811 | p803 | NONE | NONE |
| SECOND | EF | p804 | p813 | NONE | NONE |
| WDM | EL | p814 | p816 | K11 (195.70) | K12 (195.80) |
| OADM | EG | p815 | p805 | NONE | NONE |
| SECOND WDM | EH | p806 | p817 | NONE | NONE |
| MULTIPLEXER | EM | p818 | NONE | K12 (195.80) | NONE |

FIG.59G

| EQUIPMENT | INPUT PORT | OUTPUT PORT | RELEVANT INCOMING SET OF EDGE-RELATIONSHIPS | RELEVANT OUTGOING SET OF EDGE-RELATIONSHIPS |
|---|---|---|---|---|
| FIRST WDM MULTIPLEXER | NONE | p801 | NONE | K10 (195.70) |
| FIRST WDM OADM | p802 | p803 | K10 (195.70) | K11 (195.70) |
| SECOND WDM OADM | p804 | p805 | K11 (195.70) | K12 (195.80) |
| SECOND WDM MULTIPLEXER | p806 | NONE | K12 (195.80) | NONE |

FIG.59H

```
J1 = QA-(topmap p431::p432)->QB
J2 = QB-(topmap p433::p434)->QC
J3 = QC-(topmap p435::p436)->QD
J4 = QD-(topmap p437::p438)->QE
J5 = QE-(topmap p439::p440)->QF

J6 = NA-(depmap)->QA
J7 = QB-(depmap)->NB
J8 = NB-(depmap)->QB
J9 = QC-(depmap)->NC
J10 = NC-(depmap)->QC
J11 = QD-(depmap)->ND
J12 = ND-(depmap)->QD
J13 = QE-(depmap)->NE
J14 = NE-(depmap)->QE
J15 = QF-(depmap)->NF
```

FIG. 61C

```
topmap J24 = J6/J24 +J1/J24+J7/J24
topmap J25 = J8/J25+J2/J25+J9/J25
topmap J26 = J10/J26+J3/J26+J11/J26
topmap J27 = J12/J27+J4/J27+J13/J27
topmap J28 = J14/J28+J5/J28+J15/J28
toppath J51 = J26/J51+J27/J51
toppath J52 = J24/J52+J25/J52+J51/J52+J28/J52
```

FIG. 61D

```
NA-(depmap6/J24/J52)->
QA-(topmap p431:J1/J24/J52:p432)->
QB-(depmap J7/J24/J52)->
NB-(depmap J8/J25/J52)->
QB-(topmap p433:J2/J25/J52:p434)->
QC-(depmap J9/J25/J52)->
NC-(depmap J10/J26/J51/J52)->
QC-(topmap p435:J3/J26/J51/J52:p436)->
QD-(depmap J11/J26/J51/J52)->
ND-(depmap J12/J27/J51/J52)->
QD-(topmap p437:J4/J27/J51/J52:p438)->
QE-(depmap J13/J27/J51/J52)->
NE-(depmap J14/J28/J52)->
QE-(topmap p439:J5/J28/J52:p440)->
QF-(depmap J15/J28/J52)->NF
```

FIG. 61E

| EDGE-NAME | SWITCHING-IDENTIFIER |
|---|---|
| J1 | SOURCE p431, DESTINATION p432 |
| J2 | SOURCE p433, DESTINATION p434 |
| J3 | SOURCE p435, DESTINATION p436 |
| J4 | SOURCE p437, DESTINATION p438 |
| J5 | SOURCE p439, DESTINATION p440 |
| J51 | SOURCE NC, DESTINATION NE |
| J52 | SOURCE NA, DESTINATION NF |

FIG. 61F

| NODE | IPV4 ADDRESS |
|---|---|
| NA | 200.200.200.1 |
| NB | 200.200.200.2 |
| NC | 200.200.200.3 |
| ND | 200.200.200.4 |
| NE | 200.200.200.5 |
| NF | 200.200.200.6 |

| CASE | RELEVANT INCOMING SET OF ER | RELEVANT OUTGOING SET OF ER | ACTION TO BE PERFORMED |
|---|---|---|---|
| 1 | NONE | NONE | NONE |
| 2 | NONE | PRESENT | ADD NETWORK |
| 3 | PRESENT | PRESENT | FWD ON NETWORK |
| 4 | PRESENT | NONE | REMOVE NETWORK |

FIG. 62B

| PHYISCAL NODE | RELEVANT INCOMING SET OF ER | RELEVANT OUTGOING SET OF ER | ACTION TO BE PERFORMED |
|---|---|---|---|
| QA | NONE | NONE | NONE |
| QB | NONE | NONE | NONE |
| QC | NONE | J51 | ADD NETWORK |
| QD | J51 | J51 | FWD ON NETWORK |
| QE | J51 | NONE | REMOVE NETWORK |
| QF | NONE | NONE | NONE |

FIG. 62C

```
J1 = QA-(topmap p431::p432)->QB
J2 = QB-(topmap p433::p434)->QC
J3 = QC-(topmap p435::p436)->QD
J4 = QD-(topmap p437::p438)->QE
J5 = QE-(topmap p439::p440)->QF

J6 = NA-(depmap)->QA
J7 = QB-(depmap)->NB
J8 = NB-(depmap)->QB
J9 = QC-(depmap)->NC
J10 = NC-(depmap)->QC
J61 = QD-(depmap)->NZ
J62 = QE-(depmap)->NZ
J63 = QF-(depmap)->NZ
```

FIG. 63B

```
topmap J24 = J6/J24 +J1/J24+J7/J24
topmap J25 = J8/J25+J2/J25+J9/J25
topmap J64 = & (J10/J64+J3/J64+J61/J64)
             & (J10/J64+J3/J64+J4/J64+J62/J64)
             & (J10/J64+J3/J64+J4/J64+J5/J64+J63/J64)
toppath J65 = J24/J65+J25/J65+J64/J65
```

FIG. 63C

```
FOURTH EDGE-TYPE FOURTH EDGE-NAME =
& (FIRST CONCATENATION)
& (SECOND CONCATENATION)
. . .
```

FIG. 63D

```
NA-(depmap J6/J24/J65)->
QA-(topmap p431:J1/J24/J65:p432)->
QB-(depmap J7/J24/J65)->
NB-(depmap J8/J25/J65)->
QB-(topmap p433:J2/J25/J65:p434)->
QC-(depmap J9/J25/J65)->
&
(NC-(depmap J10/J64/J65)->
QC-(topmap p435:J3/J64/J65:p436)->
QD-(depmap J61/J64/J65)->NZ)
&
(NC-(depmap J10/J64/J65)->
QC-(topmap p435:J3/J64/J65:p436)->
QD-(topmap p437:J4/J64/J65:p438)->
QE-(depmap J62/J64/J65)->NZ)
&
(NC-(depmap J10/J64/J65)->
QC-(topmap p435:J3/J64/J65:p436)->
QD-(topmap p437:J4/J64/J65:p438)->
QE-(topmap p439:J5/J64/J65:p440)->
QF-(depmap J63/J64/J65)->NZ)
```

FIG. 63E

| EQUIPMENT | NODE | INPUT PORT | OUTPUT PORT | RELEVANT INCOMING SET OF EDGE-RELATIONSHIPS | RELEVANT OUTGOING SET OF EDGE-RELATIONSHIPS |
|---|---|---|---|---|---|
| THIRD COMPUTING EQUIPMENT | QA | NONE | p431 | NONE | J1 (SRC p431, DST p432) / J65 (SRC NA, DST NZ) |
| SECOND PACKET FORWARDING SYSTEM | QB | p432 | p433 | J1 (SRC p431, DST p432) / J65 (SRC NA, DST NZ) | J2 (SRC p433, DST p434) / J65 (SRC NA, DST NZ) |
| THIRD PACKET FORWARDING SYSTEM | QC | p434 | p435 | J2 (SRC p433, DST p434) / J65 (SRC NA, DST NZ) | J3 (SRC p435, DST p436) / J65 (SRC NA, DST NZ) |
| FOURTH PACKET FORWARDING SYSTEM | QD | p436 | p437 | J3 (SRC p435, DST p436) / J65 (SRC NA, DST NZ) | J4 (SRC p437, DST p438) / J65 (SRC NA, DST NZ) |
| | | p436 | NONE | J3 (SRC p435, DST p436) / J65 (SRC NA, DST NZ) | NONE |
| FIFTH PACKET FORWARDING SYSTEM | QE | p438 | p439 | J4 (SRC p437, DST p438) / J65 (SRC NA, DST NZ) | J5 (SRC p439, DST p440) / J65 (SRC NA, DST NZ) |
| | | p438 | NONE | J4 (SRC p437, DST p438) / J65 (SRC NA, DST NZ) | NONE |
| FOURTH COMPUTING EQUIPMENT | QF | p440 | NONE | J5 (SRC p439, DST p440) / J65 (SRC NA, DST NZ) | NONE |

FIG.63F

COMPILER FOR AND METHOD FOR SOFTWARE DEFINED NETWORKS

TECHNICAL FIELD

The present invention relates to communication networks and computing equipment. Such networks may be packet switched. In particular, the present invention relates to a method for configuring packet forwarding devices, computing equipment, virtual switches and virtual machines in physical and virtual networks.

BACKGROUND INFORMATION

Recent developments in the field of Packet Switched Networking (PSN) and Computing have lead to the notion of Software Defined Networking (SDN). Within the context of this invention we consider Software Defined Networking as the capability to define a network in a high-level specification (such as, but not limited to, a high-level programming or scripting language) and through an automated process instruct the appropriate physical and virtual networking and computing resources in accordance with this specification.

Such recent developments can be found in WO2010115060 "Method and apparatus for implementing and managing virtual switches" and WO2012082988 "Methods for configuring network switches".

Recently, it has become possible to instruct packet forwarding devices with the desired forwarding behavior using an open interface through a standardized protocol. The current leading protocol for this is OpenFlow, but the present invention is not limited or bound to the OpenFlow protocol, but generic in nature and could work with future protocols that provide programmatic access to forwarding table(s) of packet forwarding devices. The forwarding table(s) contains the information against which information from the incoming packet and input port is matched, providing the desired output port(s) to forward the packet out to.

We will refer to 'packet forwarding device' as 'switch' throughout the remainder of this document, referencing to any device performing packet forwarding, not limited to Open Systems Interconnection (OSI) Layer 2. Besides the forwarding functionality a switch might provide additional operation(s) on the packet, such as but not limited to monitoring and/or recording and/or buffering and/or modifying of the incoming packet header and/or payload before forwarding the packet to one or more of it's output ports. The switch might also not forward (block) the packet. These type of devices performing additional operation(s) on the packet other than packet switching are typically referred to as middleboxes and are included in the definition of a switch used in this document.

Recently, interest has grown to perform switching and middlebox functions in virtual machines running on virtualized physical servers, typically referred to as Network Functions Virtualization (NFV), to allow for greater flexibility and agility in deploying network functionality and to potentially reduce cost. An SDN Compiler, as described and claimed in the present invention, should have the capability to create forwarding instructions for these virtual machines.

The distribution of these forwarding tables to switches is typically done by a so-called 'SDN controller'. The SDN controller is functionally a central place (implementations are typically redundant) at which the centrally specified forwarding tables are distributed among the typically geographically distributed switches in the network. Further, the SDN controller provides at its northbound interface a centralized view of the physical and/or virtual network resources, e.g. switches in the network, their topology, status of individual links.

The above outlines an important difference between SDN and traditional networking: the forwarding tables for the switches in the network are calculated in a centralized manner, as opposed to the distributed manner traditional networks operate which is based on a large variety of networking control protocols. This allows the user of the SDN network (user in the broadest sense: e.g. but not limited to network operator, IT operator, operations system, application, other network, other SDN Compiler) to centrally specify the desired behavior of the network, greatly enhancing the control over the network. Further, with the introduction of the Cloud Computing, a tight integration between and centralized control over both computing and networking resources has become a mandatory requirement.

Currently, the networking industry is focused on programmatic access to forwarding table(s) of packet forwarding devices. In order to create a tight integration between networking and computing, however, there is a need to provide instructions to physical hosts, virtual hosts and physical NICs as well. E.g. a host could be instructed over which interface to send a packet to a particular destination node. E.g. a host could be instructed which packets to accept and which to drop. E.g. a NIC could be instructed which packets to forward and which to drop. This requires a holistic approach to Software Defined Networking including physical and virtual networking and computing resources.

In the field of computing it has become common practice to virtualize physical servers into one or more virtual machines, resulting in aforementioned Cloud Computing. The process of server virtualization creates a logical abstraction of physical computing resources. Given today's tight integration between computing and networking a need has arisen for logical abstraction of physical and virtual networking resources.

US 2013/058215 discloses a virtualizer for managing a plurality of managed switching elements that forward data through a network. The virtualizer comprises a first set of tables for storing input logical forwarding plane data and a second set of tables for storing output physical control plane data. It also includes a table mapping engine for mapping the input logical forwarding plane data in the first set of tables to output physical control plane data in the second set of tables by performing a set of database join operations on the input logical forwarding plane data in the first set of tables. In some embodiments, the physical control plane data is subsequently translated into physical forwarding behaviors that direct the forwarding of data by the managed switching elements. In this prior art document a managed switch converts this physical control plane data to physical forwarding plane data that specifies the forwarding behavior of the managed switch (cf. [0197]), having the disadvantage of placing a requirement on physical nodes to perform this conversion and using resources in said physical nodes. The prior art presented in US2013/044641 creates an overlay virtual network, in terminology of this application a logical network, based on tunnels in an underlay, typically IP-based network. This approach has the disadvantage of operating both the virtual overlay network and the underlay network complicating operations. Moreover, the prior art according to US2013/044641 models a virtual node, in terminology of this application a logical node, after a physical node, having the disadvantage of continuing to configure and manage networks based on network element operations rather than network services.

SUMMARY OF THE INVENTION

It is an object of the present invention to provide a method and a compiler that address the above mentioned tight integration between computing and networking, and need for logical abstraction of physical and virtual networking resources.

To that end, the present invention provides a method as disclosed in the specification.

Thus, the present invention provides a method for translating or compiling a high-level network specification into a set of instructions for the appropriate physical and/or virtual networking and/or computing resources. These instructions state which actions to perform on incoming packets such as forwarding, receiving, dropping incoming packets as well as how to send packets from a source node.

The invention also relates to a SDN compiler arranged to perform such a method.

In order to accomplish this task, the SDN compiler retains a model of each logical network that is defined through a high-level network specification. Also, the SDN compiler retains a model of physical and/or virtual networking and/or computing resources. Both models as well as their relationship are represented in a set of relations, such as matrices. The logical network comprises logical nodes. The forwarding path between each logical source and logical destination node is determined through operations performed on these matrices resulting in a list of Points-of-Attachments (e.g. but not limited to an Ethernet Media Access Control (MAC) Address) of physical and virtual resources. From these forwarding paths stored in matrices the above mentioned appropriate instructions are derived. The above approach allows for definition and creation of multiple simultaneous logical networks on the same physical and virtual resources.

In case matrix relations are used, by means of a hierarchical naming structure for the logical nodes and networks, the size of the matrices is kept within reasonable limits to allow current computing hardware and software to calculate these matrices in a reasonable timeframe Further, the vast majority of the above mentioned matrices are independent from each other allowing for parallel computation speeding up the computation process. Also, the hierarchical naming structure results in a reasonable size of the forwarding tables even for very large production-networks, which can be supported in current hardware and software implementations. The described method can be applied to currently available OpenFlow-based products, but is not limited to OpenFlow and could work with future protocols that provide programmatic access to forwarding table(s) of packet forwarding devices. The described method can be applied to currently widely used identifiers of Point-of-Attachment, such as Ethernet MAC Addresses. The described method can be applied to IPv4 and IPv6 naming and packet formats.

Enhancements to the usage of IPv4 and IPv6 naming are proposed to provide further benefits in deployment of the proposed method.

The described invention does not require any conversion in a physical node, creating forwarding entries that can directly be used for making forwarding decisions on incoming packets, allowing for less complex forwarding hardware and software forwarding implementations. The described invention does not require an underlay network, simplifying operations, by compiling a logical network using a logical namespace to physical networking resources. The described invention uses a network abstraction based on a directed graph allowing a user of an SDN Compiler to specify network services based on declarative request, and an SDN Compiler to implement and maintain said network services, simplifying operations and allowing for specifying, implementing and maintaining complex network services.

Other independent aspects of the invention are claimed in the independent claims.

BRIEF DESCRIPTION OF DRAWINGS

The invention will be explained in detail with reference to some drawings that are only intended to show embodiments of the invention and not to limit the scope. The scope of the invention is defined in the annexed claims and by its technical equivalents. I.e., a person skilled in the art will understand that features, components, elements, etc. explicitly used to explain the invention can be substituted by technical equivalents unless otherwise stated. Moreover, separate features of different embodiments can be combined, even if not explicitly shown in the drawings or explained in the specification, unless such combination is physically impossible.

The drawings show:

FIG. 2H is a diagram depicting the functionality of 3 types of nodes: Switch node, Host node, NIC node FIG. 2I is a table depicting the various physical and virtual nodes types: physical switch node, physical host node, physical NIC node, virtual switch node, virtual host node FIG. 2J is a diagram depicting a functional representation and symbols used for physical and virtual nodes of various node types

FIG. 21A is a diagram of a generic representation of a PoA-type Adjacency and Forwarding matrix consisting of an arbitrary number of rows and columns FIG. 21B is a diagram of a generic representation of a Cost-type Adjacency and Forwarding matrix consisting of an arbitrary number of rows and columns FIG. 22A is a diagram of a generic representation of a PoA-type and Cost-type mapping matrix consisting of an arbitrary number of rows and columns FIG. 22B is a diagram of a generic representation of a network-mapping-type matrix consisting of a single row and an arbitrary number columns FIG. 23A shows matrix RRA used to explain matrix multiplication between PoA-type matrices and used to explain matrix multiplication between Cost-type matrices FIG. 23B shows the elements of row 1 through q of 'sa', 'sa' being the value of element (RR,RU) of Matrix RRA FIG. 23C shows the elements of row 1 through r of 'sb', 'sb' being the value of element (RR,RV) of Matrix RRA FIG. 23D shows the elements of row 1 through s of 'sc', 'sc' being the value of element (RR,RW) of Matrix RRA FIG. 23E shows matrix RRB used to explain matrix multiplication between PoA-type matrices and used to explain matrix multiplication between Cost-type matrices FIG. 23F shows the elements of row 1 through t of 'sk', 'sk' being the value of element (RU,RX) of Matrix RRB FIG. 23G shows the elements of row 1 through u of 'sn', 'sn' being the value of element (RU,RY) of Matrix RRB FIG. 23H shows the elements of row 1 through w of 'sr', 'sr' being the value of element (RU,RZ) of Matrix RRB FIG. 24A shows PoA-type matrix RRC, resulting from matrix multiplication of PoA-type matrices RRC=RRA·RRB FIG. 24E shows Cost-type matrix RRD, resulting from matrix multiplication of Cost-type matrices RRD=RRA·RRB FIG. 24H is a diagram showing a functional representation of physical network CAA comprising of nodes CH, CJ, CK, CL with PoAs p171 through 178 and cost value of all links in both directions being one.

FIG. 24I is a diagram showing a functional representation of mapping from physical node CH to virtual node GR and from physical node CJ to virtual nodes GS and GT, with PoAs p179 through p184 and cost value of all mappings in both directions being zero.

FIG. 24J shows Adjacency Matrix PoA Network CAA ($A^{PoA}_{CAA}$) of example network CAA FIG. 24K shows Forwarding Matrix PoA Network CAA ($F^{PoA}_{CAA}$) of example network CAA FIG. 24L shows PoA-type Mapping Matrix from virtual nodes GR, GS, GT to physical nodes CH, CJ, CK, CL ($M^{PoA}_{GAA-CAA}$) of mapping depicted in FIG. 24I.

FIG. 24M shows result of matrix multiplication $M^{PoA}_{GAA-CAA} \cdot F^{PoA}_{CAA}$ providing all paths from a virtual node (GR, GS, GT) to a physical node (CH, CJ, CK, CL)

FIG. 27A shows Network-Mapping Matrix of Network DAA ($M_{DAA}$) of example network DAA, HAA, UUU (physical example network DAA, virtual example network HAA, logical example network UUU) resulting from step 1 of the flowchart of FIG. 25.

FIG. 27B shows Adjacency Matrix PoA Network DAA ($A^{PoA}_{DAA}$) of example network DAA, HAA, UUU resulting from step 2 of the flowchart of FIG. 25.

FIG. 27C shows Adjacency Matrix Cost1 Network DAA ($A^{Cost1}_{DAA}$) of example network DAA, HAA, UUU resulting from in step 2 of the flowchart of FIG. 25.

FIG. 27D shows Forwarding Matrix PoA Network DAA ($F^{PoA}_{DAA}$) of example network DAA, HAA, UUU resulting from step 4 of the flowchart of FIG. 25.

FIG. 27E shows Forwarding Matrix Cost1 Network DAA ($F^{Cost1}_{DAA}$) of example network DAA, HAA, UUU resulting from step 4 of the flowchart of FIG. 25.

FIG. 28A shows Network-Mapping Matrix HAA ($M_{HAA}$) of example network DAA, HAA, UUU resulting from step 5 of the flowchart of FIG. 25.

FIG. 28B shows PoA-type Mapping Matrix DAA/HAA to DAA ($M^{PoA}_{DAA/HAA-DAA}$) of example network DAA, HAA, UUU resulting from step 5 of the flowchart of FIG. 25.

FIG. 28C shows PoA-type Mapping Matrix DAA to DAA/HAA ($M^{PoA}_{DAA-DAA/HAA}$) of example network DAA, HAA, UUU resulting from step 5 of the flowchart of FIG. 25.

FIG. 28D shows Cost-type Mapping Matrix Cost1 DAA/HAA to DAA ($M^{Cost1}_{DAA/HAA-DAA}$) of example network DAA, HAA, UUU resulting from step 5 of the flowchart of FIG. 25.

FIG. 28E shows Cost-type Mapping Matrix Cost1 DAA to DAA/HAA ($M^{Cost1}_{DAA-DAA/HAA}$) of example network DAA, HAA, UUU resulting from step 5 of the flowchart of FIG. 25.

FIG. 28F shows Network-Mapping Matrix Network UUU ($M_{UUU}$) of example network DAA, HAA, UUU resulting from step 5 of the flowchart of FIG. 25.

FIG. 28G shows PoA-type Mapping Matrix UUU to DAA/HAA ($M^{PoA}_{UUU-DAA/HAA}$) of example network DAA, HAA, UUU resulting from step 5 of the flowchart of FIG. 25.

FIG. 28H shows PoA-type Mapping Matrix DAA/HAA to UUU ($M^{PoA}_{DAA/HAA-UUU}$) of example network DAA, HAA, UUU resulting from step 5 of the flowchart of FIG. 25.

FIG. 28I shows Cost-type Mapping Matrix Cost1 UUU to DAA/HAA ($M^{Cost1}_{UUU-DAA/HAA}$) of example network DAA, HAA, UUU resulting from step 5 of the flowchart of FIG. 25.

FIG. 28J shows Cost-type Mapping Matrix Cost1 DAA/HAA to UUU ($M^{Cost1}_{DAA/HAA-UUU}$) of example network DAA, HAA, UUU resulting from step 5 of the flowchart of FIG. 25.

FIG. 28K shows the intermediate step calculation of Matrix $A^{PoA\ ALL}_{UUU}$ of example network DAA, HAA, UUU resulting from step 6 of the flowchart of FIG. 25.

FIG. 28L shows Adjacency Matrix PoA ALL network UUU ($A^{PoA\ ALL}_{UUU}$) of example network DAA, HAA, UUU resulting from step 6 of the flowchart of FIG. 25.

FIG. 28M shows the intermediate step calculation of Matrix $A^{Cost1\ ALL}_{UUU}$ of example network DAA, HAA, UUU resulting from step 6 of the flowchart of FIG. 25.

FIG. 28N shows Adjacency Matrix Cost1 ALL network UUU ($A^{Cost1\ ALL}_{UUU}$) of example network DAA, HAA, UUU resulting from step 6 of the flowchart of FIG. 25.

FIG. 29A shows Adjacency Matrix Cost2 network UUU ($A^{Cost2}_{UUU}$) of example network DAA, HAA, UUU resulting from step 8 of the flowchart of FIG. 25.

FIG. 29B shows Adjacency Matrix PoA network UUU ($A^{PoA}_{UUU}$) of example network DAA, HAA, UUU resulting from step 8 of the flowchart of FIG. 25.

FIG. 29C shows Forwarding Matrix PoA network UUU ($F^{PoA}_{UUU}$) of example network DAA, HAA, UUU resulting from step 10 of the flowchart of FIG. 25.

FIG. 29D shows Forwarding Matrix Cost2 network UUU ($F^{Cost2}_{UUU}$) of example network DAA, HAA, UUU resulting from step 10 of the flowchart of FIG. 25.

FIG. 29E shows Forwarding Matrix PoA Table network UUU ($F^{PoA\ Table}_{UUU}$) of example network DAA, HAA, UUU resulting from step 11 of the flowchart of FIG. 25.

FIG. 29F shows Forwarding Matrix Cost2 Table network UUU ($F^{Cost2\ Table}_{UUU}$) of example network DAA, HAA, UUU resulting from step 11 of the flowchart of FIG. 25.

FIG. 30A presents the forwarding table for physical switch node DA with PoAs p71, p72, p85, p87 of example network DAA, HAA, UUU resulting from step 11 of the flowchart of FIG. 25.

FIG. 30B presents the forwarding table for physical switch node DB with PoAs p73, p74, p75 of example network DAA, HAA, UUU resulting from step 11 of the flowchart of FIG. 25.

FIG. 30C presents the forwarding table for physical switch node DC with PoAs p76, p77 of example network DAA, HAA, UUU resulting from step 11 of the flowchart of FIG. 25.

FIG. 30D presents the forwarding table for physical switch node DD with PoAs p78, p83 of example network DAA, HAA, UUU resulting from step 11 of the flowchart of FIG. 25.

FIG. 30E presents the forwarding table for physical NIC node DE with PoAs p81, p82 of example network DAA, HAA, UUU resulting from step 11 of the flowchart of FIG. 25.

FIG. 30F presents the forwarding table for physical NIC node DF with PoAs p79, p80 of example network DAA, HAA, UUU resulting from step 11 of the flowchart of FIG. 25.

FIG. 30G presents the forwarding table for physical host node DG with PoA p84 of example network DAA, HAA, UUU resulting from step 11 of the flowchart of FIG. 25.

FIG. 30H presents the forwarding table for virtual host node HA with PoA p86 of example network DAA, HAA, UUU resulting from step 11 of the flowchart of FIG. 25.

FIG. 30I presents the forwarding table for virtual switch node HB PoA p88 of example network DAA, HAA, UUU resulting from step 11 of the flowchart of FIG. 25.

FIG. 36A is a diagram showing a generic representation of a PoA-type or Cost-type mapping matrix for a network at level (h>=1)

FIG. 36B is a diagram showing a generic representation of a PoA-type or Cost-type mapping matrix for a network at level (h>=1), in which the column and rows are indexed by the same set of networks in the same sequence FIG. 36C is a diagram showing a generic representation of a PoA-type or Cost-type forwarding matrix for a network at level (h>=1)

FIG. 36D is a diagram showing a generic representation of a PoA-type or Cost-type forwarding matrix for a network at level (h>=1), in which the column and rows are indexed by the same set of networks in the same sequence FIG. 37A is a flowchart of a detailed example of a SDN Compiler method for an arbitrary network.

FIG. 37E is a diagram comparing the SDN Compiler method of a single physical network, a single virtual network, a single logical network of FIG. 25 to the SDN Compiler method of an arbitrary network of FIGS. 37A, 37B, 37C, 37D.

FIG. 37F is a diagram showing which matrices are created at the various steps of a detailed example of a SDN Compiler method for example networks DAA at (d=0, n=0, h=1), HAA at (d=0, n=10, h=1), UUU at (d=1, n=0, h=1) from d=0, n=0, h=1, step 6.1 through d=1, n=0, h=1, step 11.2. Network DAA is shown in FIGS. 13A and 13B, network HAA is shown in FIG. 14B, network UUU is shown in FIGS. 15A and 15B.

FIG. 38N is a diagram showing PoA-type topology-forwarding matrix $F^{PoA}_{PBB\text{-}PBB}$ FIG. 38O is a diagram showing PoA-type topology-forwarding matrix $F^{PoA}_{YWW\text{-}YWW}$ FIG. 38P is a diagram showing PoA-type topology-forwarding matrix $F^{PoA}_{XBB\text{-}XBB}$ FIG. 38Q is a diagram showing PoA-type topology-forwarding matrix $F^{PoA}_{ZWW\text{-}ZWW}$ FIG. 38R is a diagram showing forwarding table entries derived from $F^{PoA}_{ZWW\text{-}ZWW}$ for logical source node ZA.

FIG. 40C is a diagram showing forwarding instructions for physical or virtual nodes KG, KK, KL, KM, KN, KP, KH, KQ, KR, KS, KT, KJ for a path from logical source node LG to logical destination node LJ in the set of networks of FIG. 40A in which networks KKK, KGG, LKK, LGG are Packet Switched Networks (PSNs).

FIG. 40D is a diagram showing forwarding instructions for physical or virtual nodes KG, KK, KL, KM, KN, KP, KH, KQ, KR, KS, KT, KJ for a path from logical source node LG to logical destination node LJ in the set of networks of FIG. 40A in which networks KKK and LKK are Circuit Switched Networks (CSNs) and networks KGG and LGG are Packet Switched Networks (PSNs).

FIG. 42A also shows the topology-mappings between networks at (d, n, h).

FIG. 42A also shows the level-mappings between networks at (d, n) as well as the topology-mappings between networks at (d, n, h).

FIG. 42D is also showing a topology-mapping from network NCC to network NEE being replaced by a concatenation of a level-mapping from network NCC to network ND, a topology-path from network ND to network NE and a level-mapping from network NE to network NEE in order to calculate the cost of the topology-mapping from network NCC to network NEE.

FIG. 42F is also showing a topology-mapping from network NCC to network NEE being replaced by a concatenation of a level-mapping from network NCC to network ND, a topology-path from network ND to network NE and a level-mapping from network NE to network NEE.

FIG. 42K is a diagram showing forwarding for physical or virtual nodes QA, QB, QC, QD, QE, QF for a path from logical source network NA to logical destination network NF in the set of networks of FIG. 42A.

FIG. 47B is a diagram showing networks ADD, AGG, AKK, AMM, APP, AD, AE, AF, AG, AH, AJ, AK, AL, AM, AN, AP and AR and applying steps 1 through 5 of the 'method with depth-mappings' to a path from source network AP to destination network AR.

FIG. 48 is a diagram showing a flowchart of an example SDN Compiler method responding to changes in a non-hierarchical network FIG. 49 is a diagram showing a flowchart of a method for the creation of a mapping.

Figure 50A:
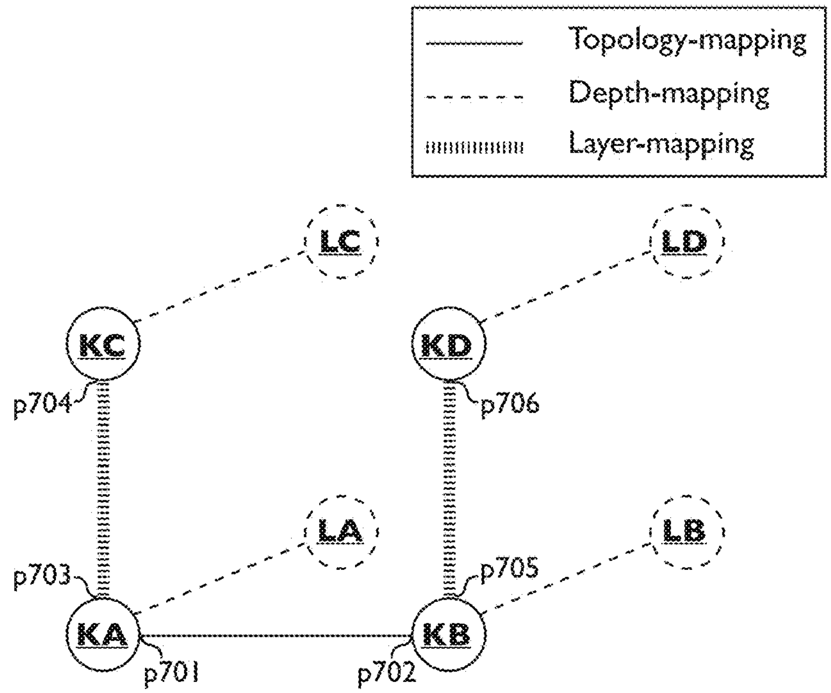

FIG. 50A is a diagram showing networks KA, KB, KC, KD, LA, LB, LC, LD and a topology-mapping between network KA and network KB, a layer-mapping between network KA and network KC, a layer-mapping between network KB and network KD, a depth-mapping between network KA and network LA, a depth-mapping between network KB and network LB, a depth-mapping between network KC and network LC, and a depth-mapping between network KD and network LD. Also the PoAs of the topology-mapping and layer-mappings are shown.

Figure 50B:
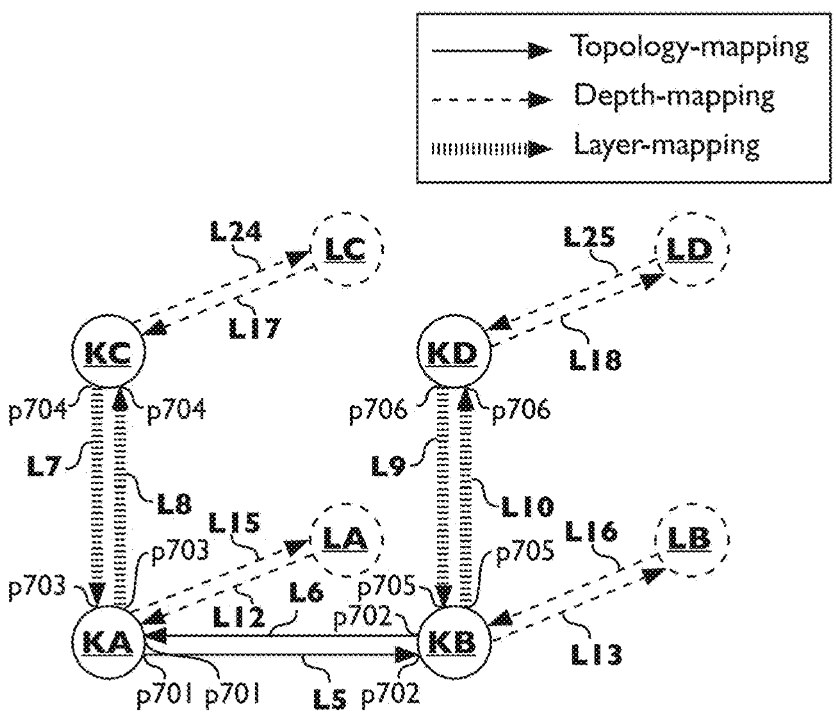

FIG. 50B is a diagram showing networks KA, KB, KC, KD, LA, LB, LC, LD and named topology-mappings, layer-mappings and depth-mappings. Also the PoAs of the topology-mappings and layer-mappings are shown.

Figure 50C:
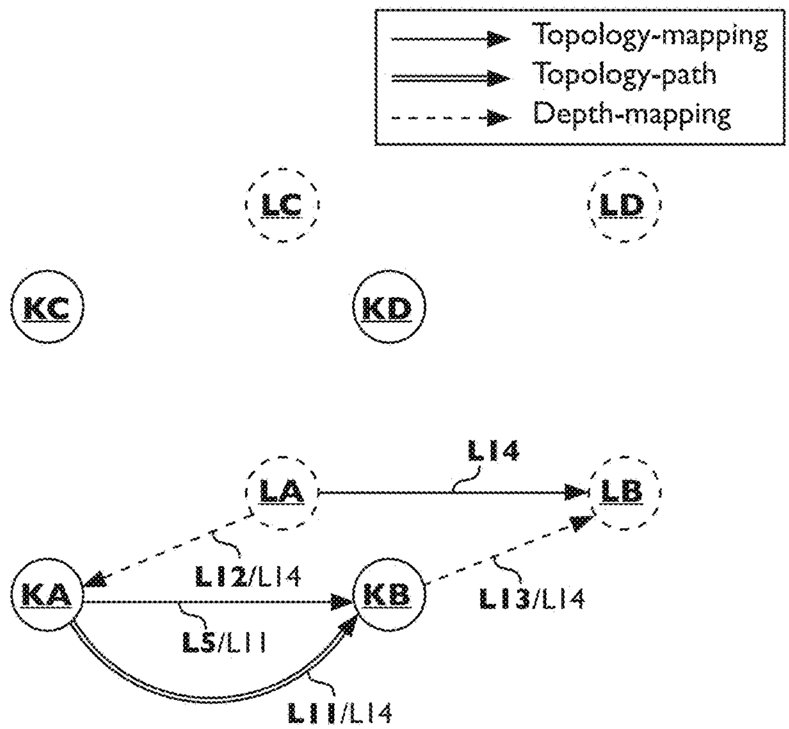
Figure 50D:
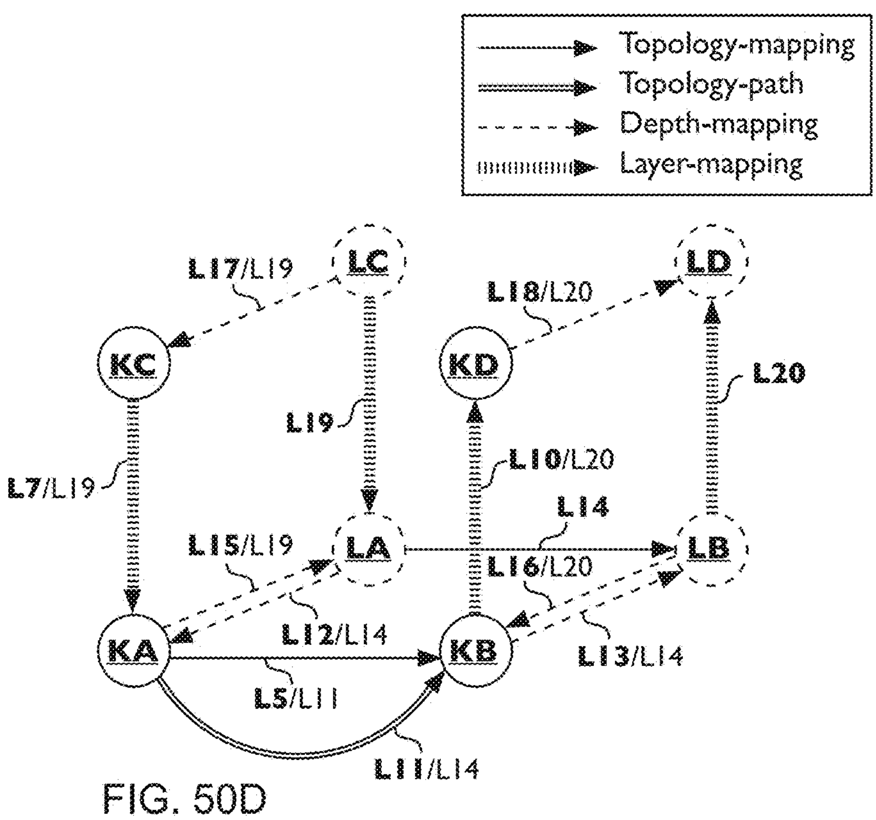

FIG. 50C is a diagram showing networks KA, KB, KC, KD, LA, LB, LC, LD and calculating and storing a topology-mapping named L14 from network LA to network LB as a concatenation of a depth-mapping named L12 from network LA to network KA, a topology-path named L11 from network KA network KB and a depth-mapping named L13 from network KB to network LB, the topology-path named L11 being a single topology-mapping named L5 from network KA to network KB FIG. 50D is a diagram showing networks KA, KB, KC, KD, LA, LB, LC, LD and additional to FIG. 50C calculating and storing a layer-mapping named L19 from network LC to network LA as a concatenation of a depth-mapping named L17 from network LC to network KC, a layer-mapping named L7 from network KC network KA and a depth-mapping named L15 from network KA to network LA and calculating and storing a layer-mapping named L20 from network LB to network LD as a concatenation of a depth-mapping named L16 from network LB to network KB, a layer-mapping named L10 from network KB network KD and a depth-mapping named L18 from network KD to network LD.

Figure 50E:
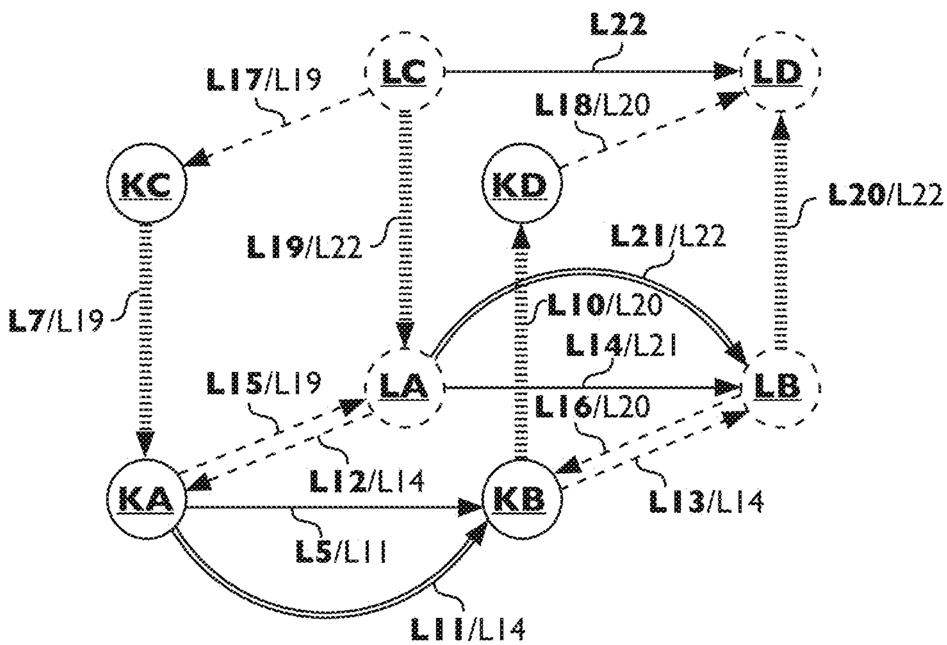

FIG. 50E is a diagram showing networks KA, KB, KC, KD, LA, LB, LC, LD and additional to FIG. 50D calculating and storing a topology-mapping named L22 from network LC to network LD as a concatenation of a layer-mapping named L19 from network LC to network LA, a topology-path named L21 from network LA network LB and a layer-mapping named L20 from network LB to network LD, the topology-path named L21 being a single topology-mapping named L14 from network LA to network LB.

Figure 50F:
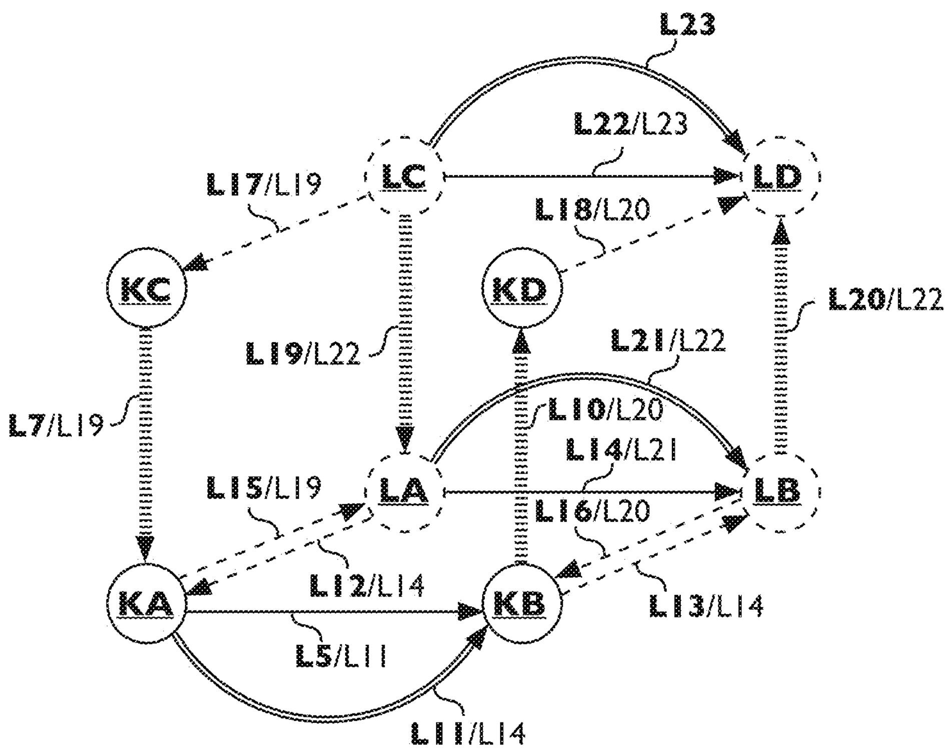

FIG. 50F is a diagram showing networks KA, KB, KC, KD, LA, LB, LC, LD and additional to FIG. 50E calculating and storing a topology-path named L23 from network LC to network LD as a single topology-mapping named L22 from network LC to network LD.

Figure 50G:
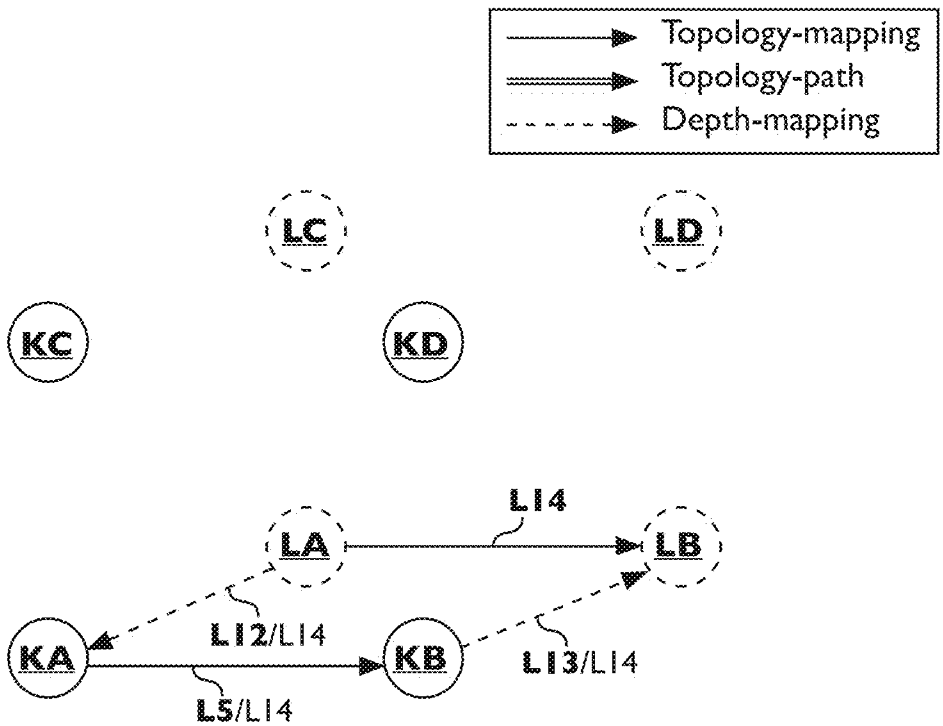

FIG. 50G is a diagram showing networks KA, KB, KC, KD, LA, LB, LC, LD and calculating and storing a topology-mapping named L14 from network LA to network LB as a concatenation of a depth-mapping named L12 from network LA to network KA, a topology-mapping named L5 from network KA network KB and a depth-mapping named L13 from network KB to network LB.

FIG. 51A is a diagram showing the notation used for a first mapping of a first mapping-type with a first mapping-name from a first network to a second network.

FIG. 51B is a diagram showing the notation used for a second mapping of a second mapping-type with a second mapping-name from a second network to a third network.

FIG. 51C is a diagram showing the notation used for a third edge of a third edge-type with a third edge-name being a concatenation of a first edge with a first edge-name and a second edge with a second edge-name.

FIG. 51D is a diagram showing the notation used for a third edge of a third edge-type with a third edge-name being a concatenation of a first mapping with a first set of edge-relationships and a second mapping with a second set of edge-relationships.

FIG. 51E is a diagram showing topology-mappings L5 and L6, layer-mappings L7, L8, L9 and L10 and depth-mappings L12, L13, L15, L16, L17, L18, L24 and L25.

FIG. 51F is a diagram showing topology-mappings L14 and L22, layer-mappings L19 and L20 and topology-paths L11, L21 and L23.

FIG. 51G is a diagram showing in step 1 a topology-path named L23 from network LC to network LD and in step 6 the recursive-path of the topology-path named L23 from network LC to network LD, using the notation of FIG. 51E, step 2 through step 5 being intermediate steps of the calculation.

Figure 52A:
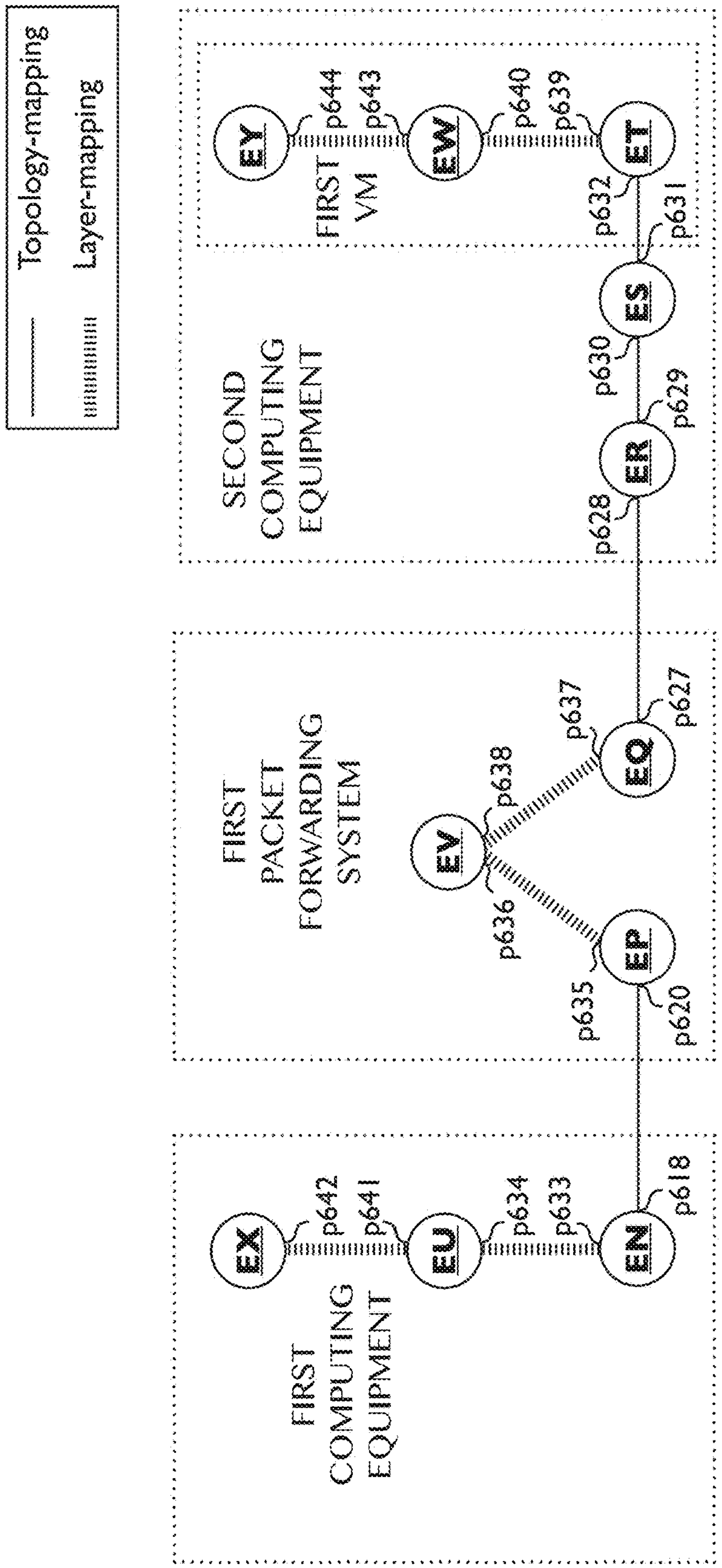
Figure 52B:
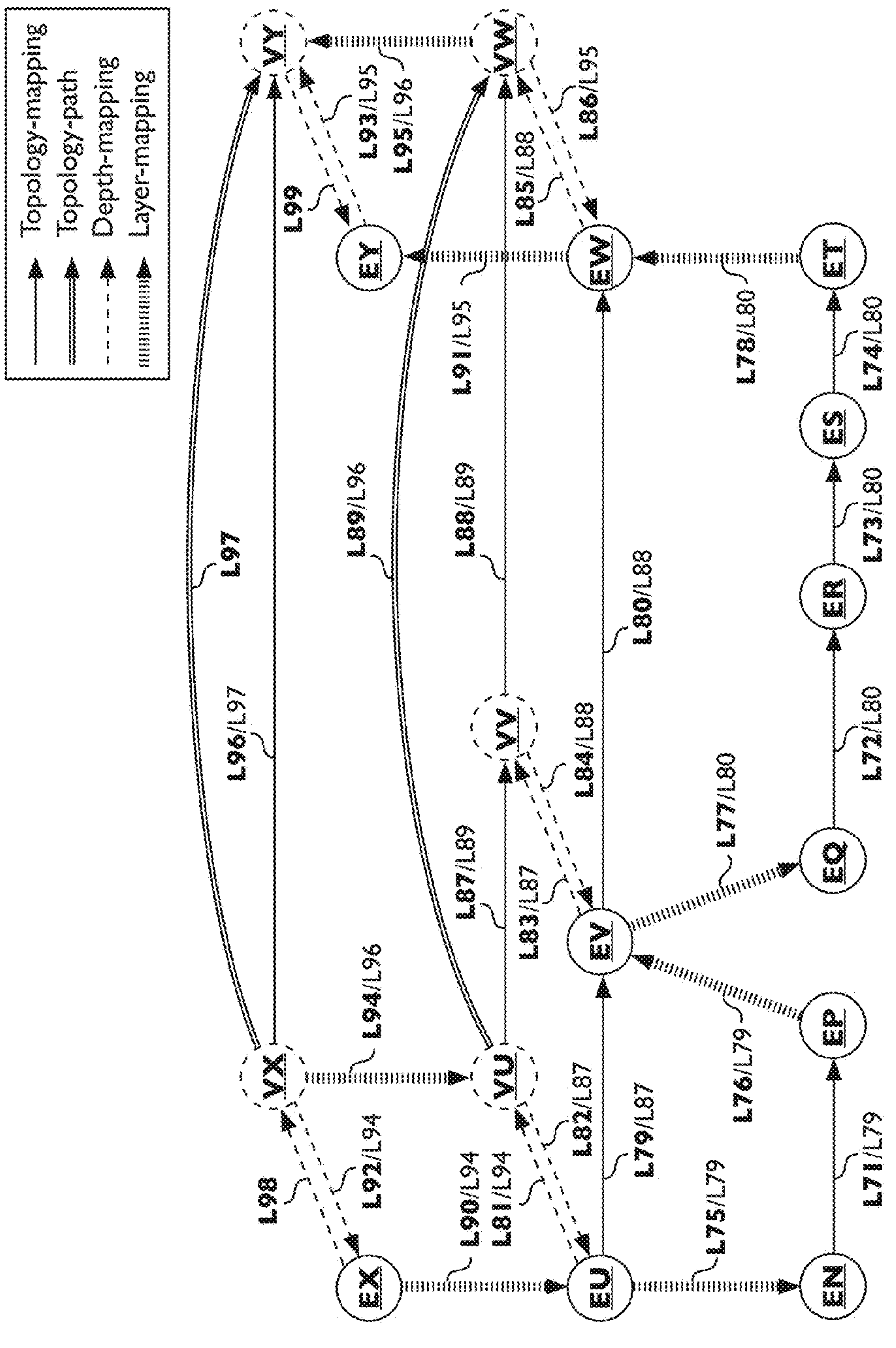

FIG. 52A is a diagram showing a first computing equipment comprising of physical nodes EN, EU, EX, a second computing equipment comprising of physical nodes ER, ES, ET, EW, EY and a first packet forwarding system comprising of physical nodes EP, EV and EQ FIG. 52B is a diagram showing physical nodes EN, EU, EX, ER, ES, ET, EW, EY, EP, EV, EQ and logical nodes VU, VX, VW, VY, VV and topology-mappings, depth-mappings, layer-mappings and topology-paths represented as directed edges in a graph.

FIG. 52C is a diagram showing physical topology-mappings, physical layer-mappings and depth-mappings per the notation of FIG. 51A.

FIG. 52D is a diagram showing created topology-mappings, layer-mappings and topology-paths FIG. 52E is a diagram showing the recursive-path of the topology-path L97.

FIG. 52F is a diagram showing switching-identifiers for the edges named L71, L72, L73, L74, L89, L97

FIG. 52G is a diagram showing for each physical node in the recursive-path calculated from the requested topology-path named L97 an input port, an output port, relevant incoming set of edge-relationships and relevant outgoing set of edge-relationships.

FIG. 52H is a diagram showing for the first computing equipment, the first packet forwarding system and the second computing equipment an input port, an output port, relevant incoming set of edge-relationships and relevant outgoing set of edge-relationships as calculated from the requested topology-path named L97.

Figures 52I, 52J, 52K, 52L:
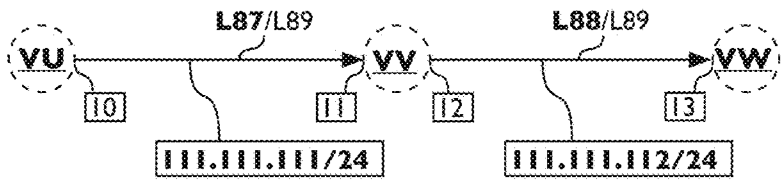

FIG. 52I is a diagram showing logical nodes VU, VV, VW, topology-mapping named L87 with subnet-identifier 111.111.111/24, topology-mapping named L88 with subnet-identifier 111.111.112/24 and PoAs 10, 11, 12, 13.

FIG. 52J is a diagram showing subnet-identifiers for the edges named L87 and L88

FIG. 52K is a diagram showing switching-identifiers for the edges named L71, L72, L73, L74, L89, L97

FIG. 52L is a diagram showing a transport-identifier for the edge named L89.

Figure 52M:
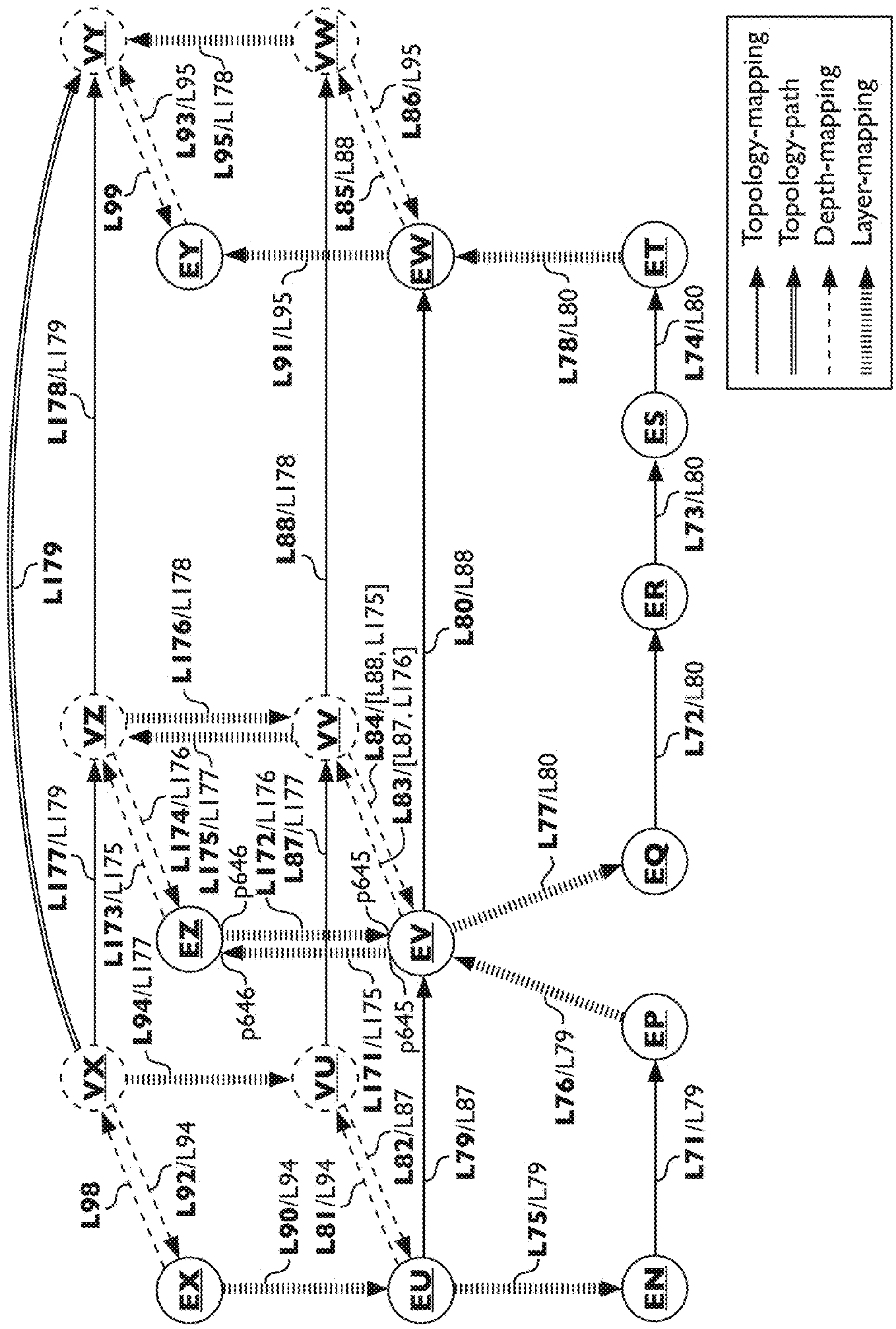

FIG. 52M is a diagram showing physical nodes EN, EU, EX, ER, ES, ET, EW, EY, EP, EV, EQ, EZ and logical nodes VU, VX, VW, VY, VV, VZ and topology-mappings, depth-mappings, layer-mappings and topology-paths represented as directed edges in a graph.

Figure 52N:
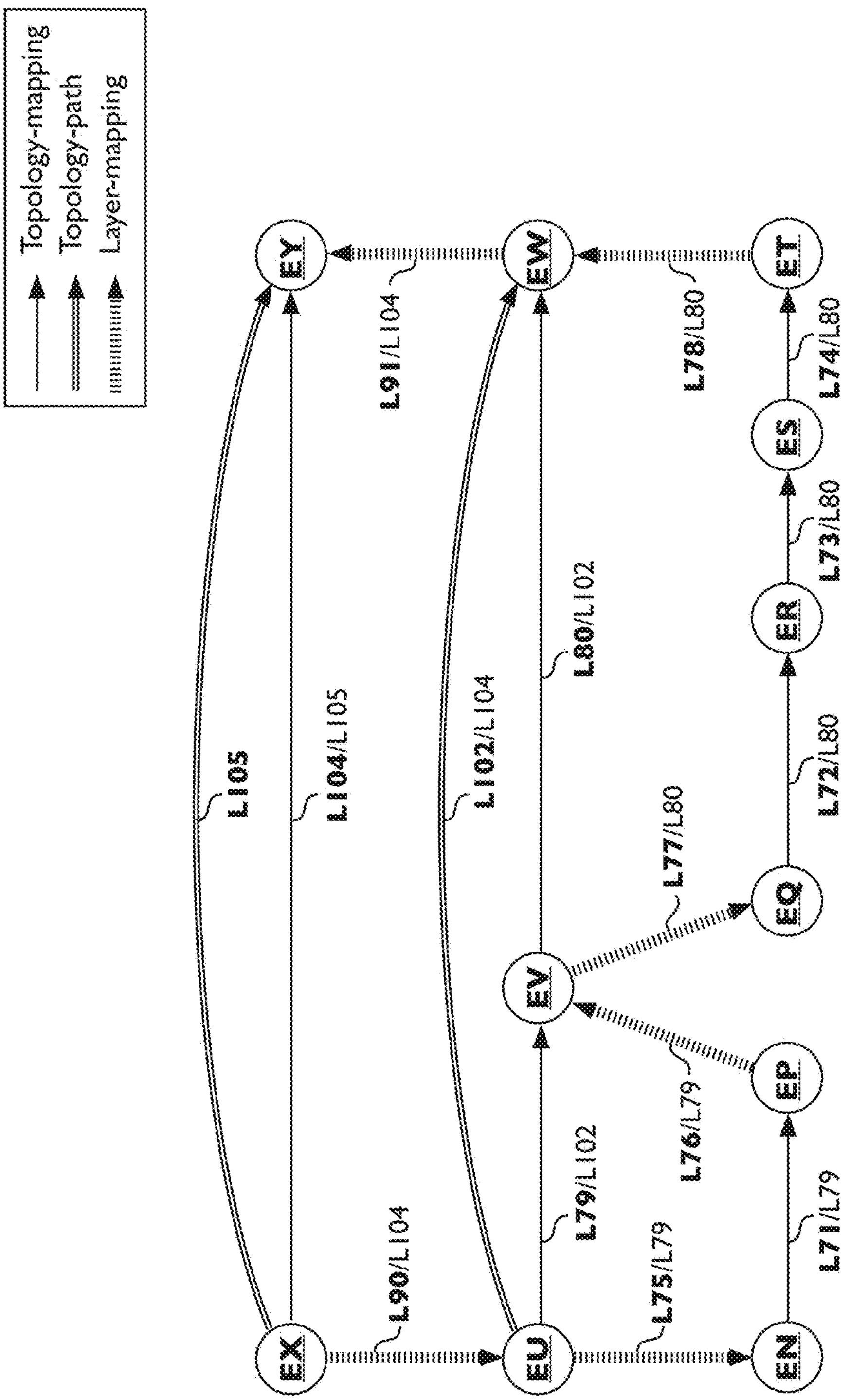

FIG. 52N is a diagram showing physical nodes EN, EU, EX, ER, ES, ET, EW, EY, EP, EV, EQ and topology-mappings, layer-mappings and topology-paths represented as directed edges in a graph.

Figure 53A:
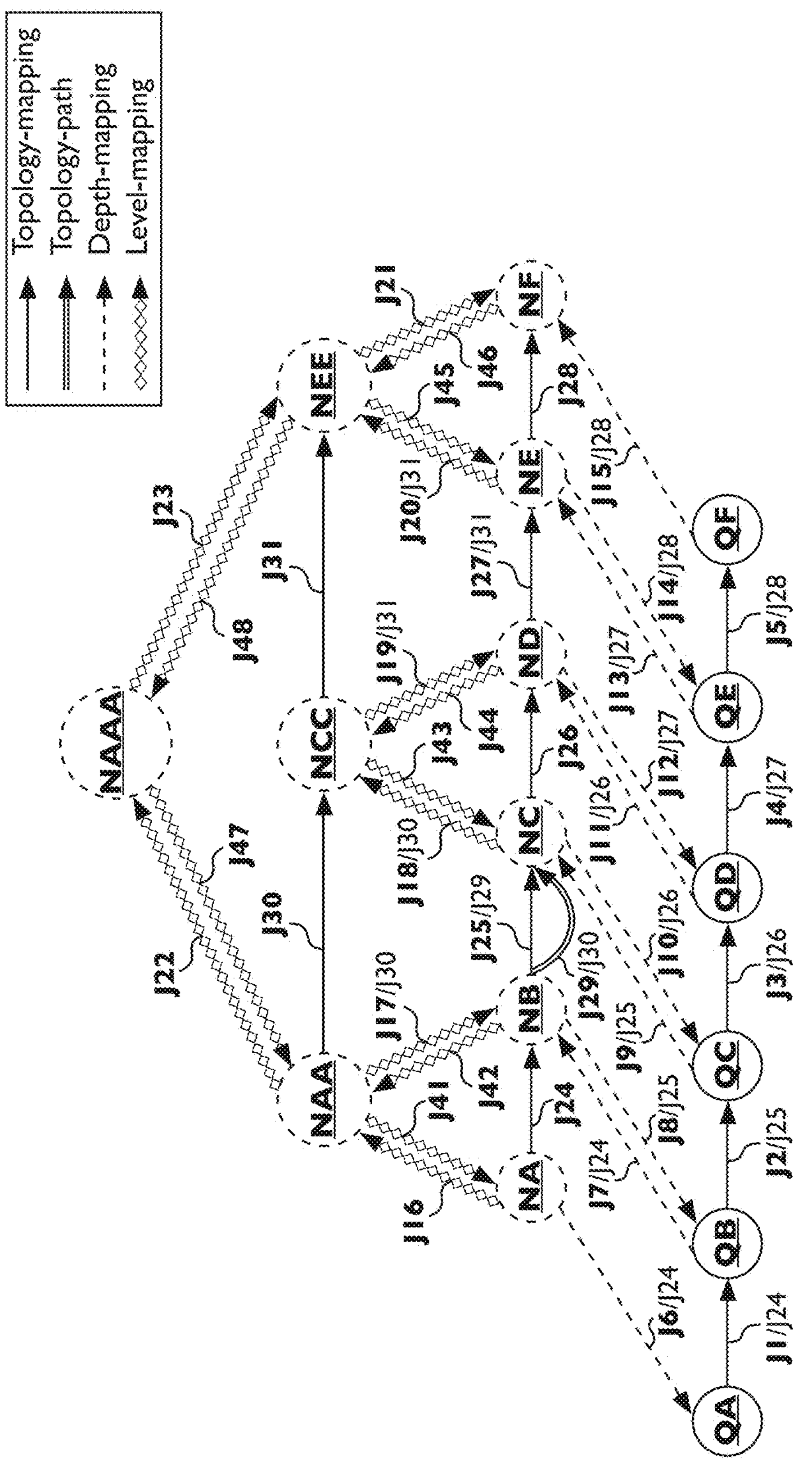

FIG. 53A is a diagram showing logical network NAAA at (d=1, n=0, h=2) consisting of logical networks NAA, NCC and NEE at (d=1, n=0, h=1). Logical Network NAA consisting of networks logical networks NA and NB at (d=1, n=0, h=0). Logical Network NCC consisting of logical networks NC and ND at (d=1, n=0, h=0). Logical network NEE consisting of networks NE and NF at (d=1, n=0, h=0). FIG. 53A also shows physical networks QA, QB, QC, QD, QE and QF at (d=0, n=0, h=0). FIG. 53A also shows the topology-mappings, depth-mapping, level-mappings and topology-path between networks, as well as the name of each topology-mapping, level-mapping and topology-path and edge-relationships.

Figure 53B:
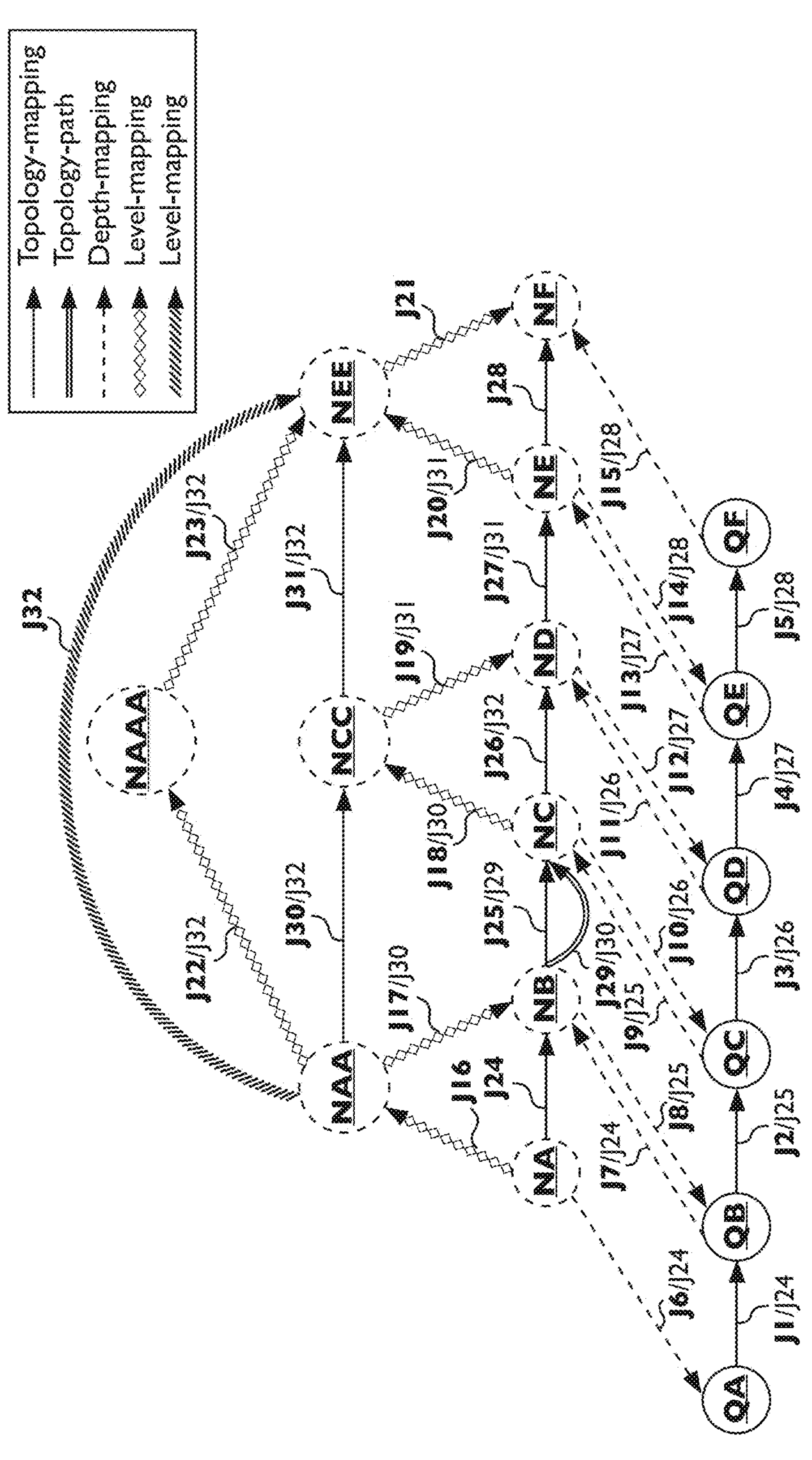

FIG. 53B is a diagram showing logical networks NAAA, NAA, NCC, NEE, NA, NB, NC, ND, NE, NF and physical networks QA, QB, QC, QD, QE, QF, the topology-mappings, topology-path, depth-mapping, level-mappings, a level-path named J32, as well as the name of each edge.

Figure 53C:
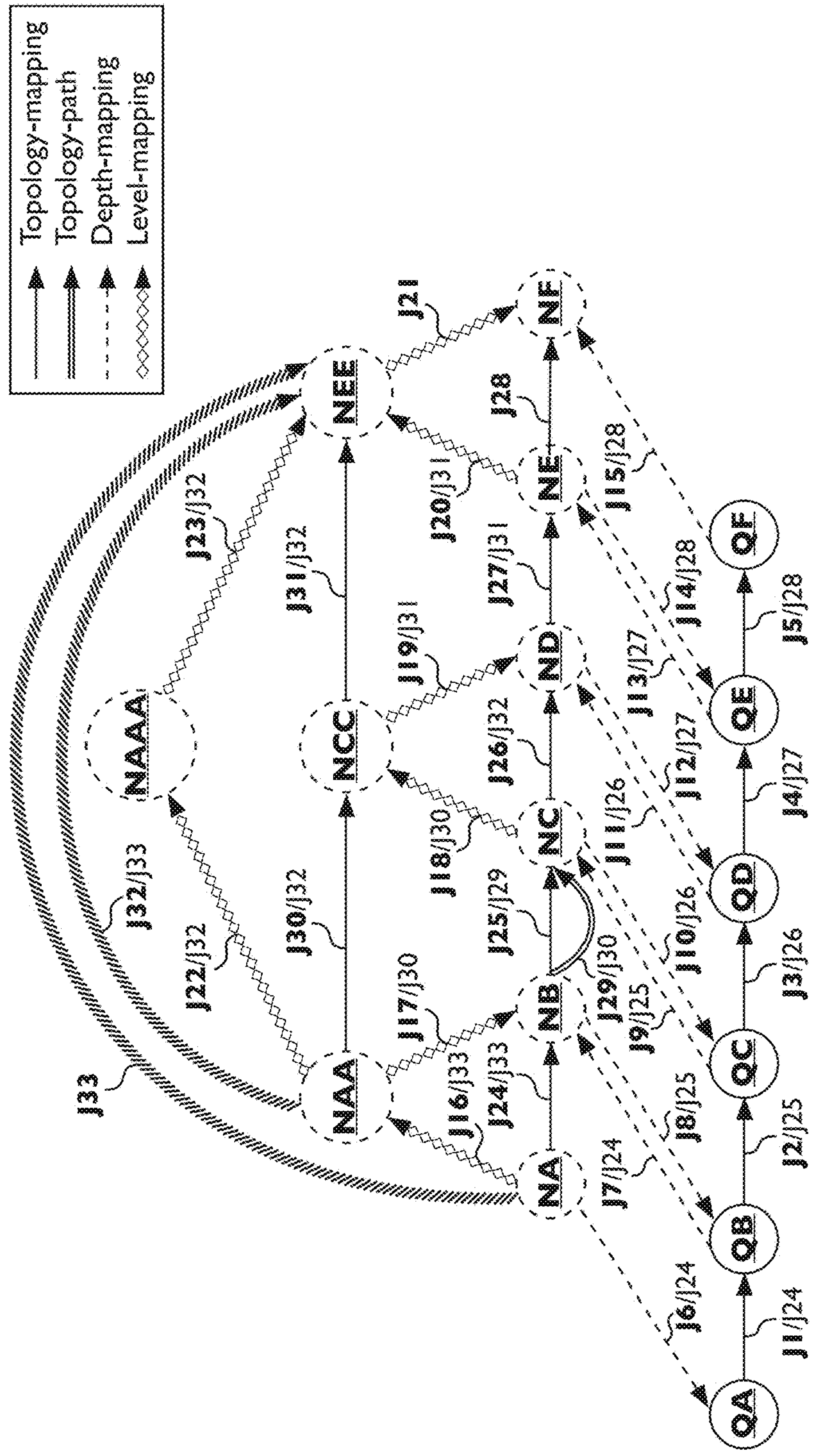

FIG. 53C is a diagram showing logical networks NAAA, NAA, NCC, NEE, NA, NB, NC, ND, NE, NF and physical networks QA, QB, QC, QD, QE, QF, the topology-mappings, topology-path, depth-mapping, level-mappings, a level-path named J32 and a level-path named J33, as well as the name of each edge.

Figure 53D:
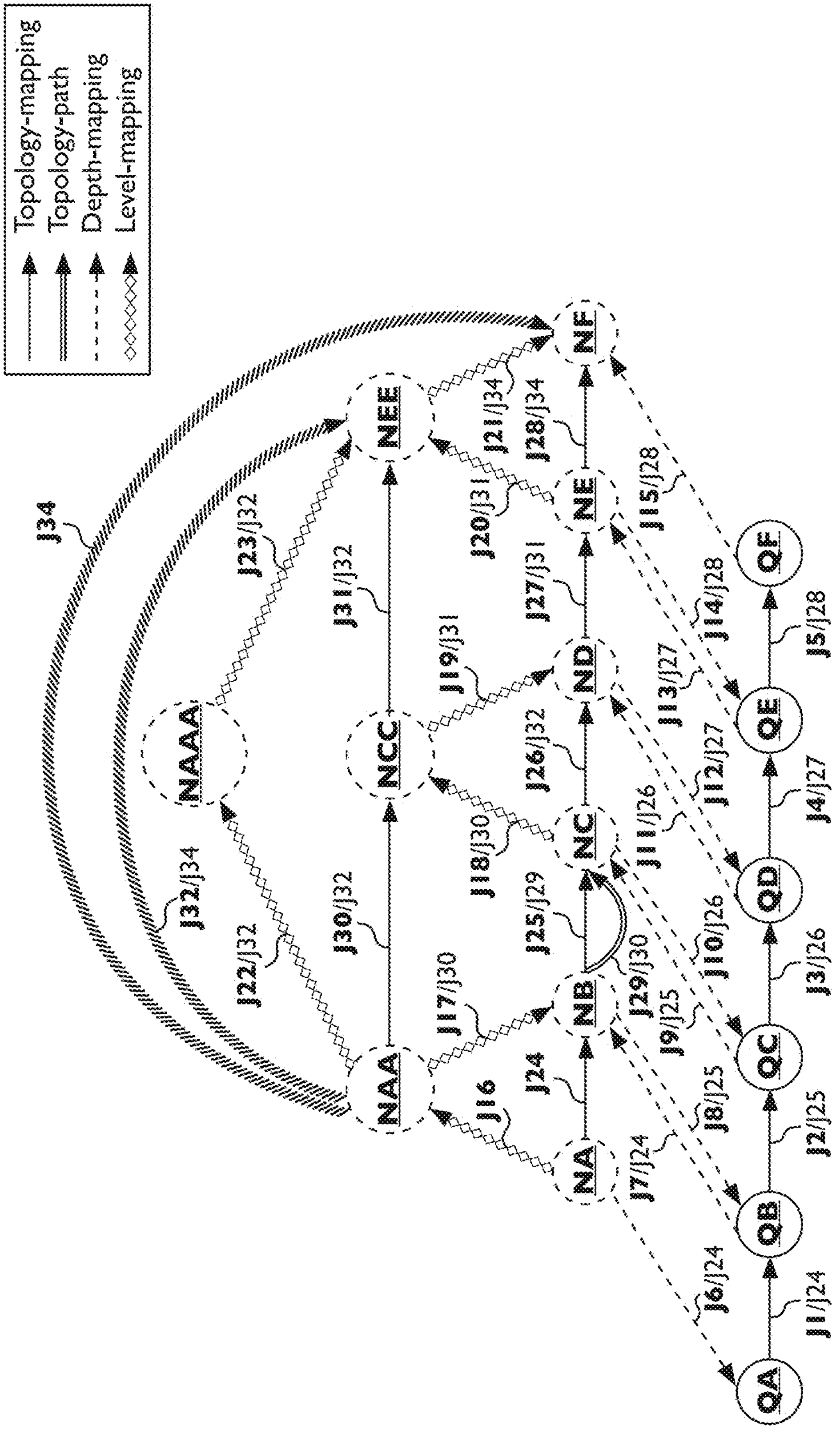

FIG. 53D is a diagram showing logical networks NAAA, NAA, NCC, NEE, NA, NB, NC, ND, NE, NF and physical networks QA, QB, QC, QD, QE, QF, the topology-mappings, topology-path, depth-mapping, level-mappings, a level-path named J32 and a level-path named J34, as well as the name of each edge.

FIG. 53E is a diagram showing physical topology-mappings, depth-mappings and level-mappings per the notation of FIG. 51A.

FIG. 53F is a diagram showing created topology-mappings and topology-path.

FIG. 53G is a diagram showing a created level-path named J32

FIG. 53H is a diagram shows steps 1 through 9 of the calculation of the recursive-path of the level-path named L32.

FIG. 53I is a diagram showing created level-paths named J32 and J33

FIG. 53J is a diagram shows steps 1 through 10 of the calculation of the recursive-path of the level-path named J33.

FIG. 53K is a diagram showing switching-identifiers for the edges named J1, J2, J3, J4, J5, J32, J33 and J34.

FIG. 53L is a diagram showing for the third computing equipment, the second packet forwarding system, the third packet forwarding system, the fourth packet forwarding system, the fifth packet forwarding system and the fourth computing equipment an input port, an output port, relevant incoming set of edge-relationships and relevant outgoing set of edge-relationships as calculated from the requested level-paths named J32, J33 and J34.

FIG. 54 is a diagram showing the relationships between a changed first edge and an impacted second edge.

Figure 55A:
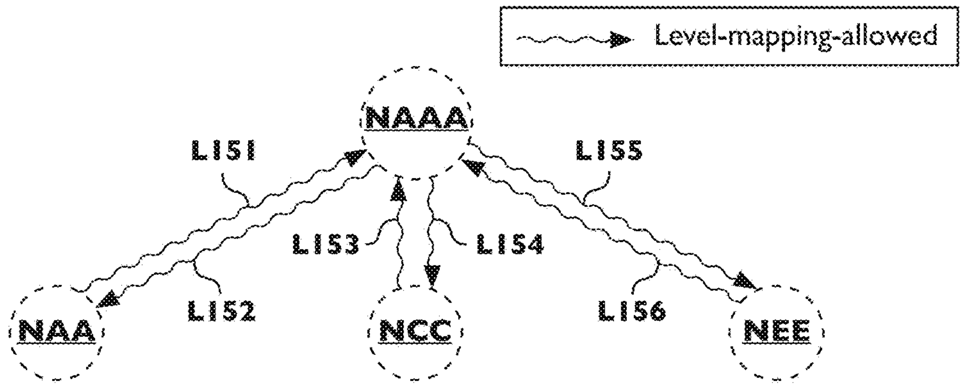

FIG. 55A is a diagram showing logical network NAAA at (d=1, n=0, h=2) consisting of logical networks NAA, NCC and NEE at (d=1, n=0, h=1) and also shows level-mapping-allowed edges L151 through L156.

Figure 55B:
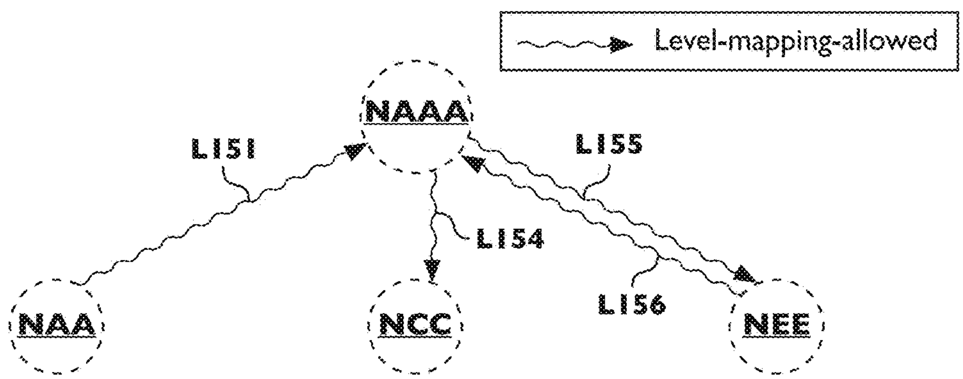

FIG. 55B is a diagram showing logical networks NAAA, NAA, NCC, NEE and level-mapping-allowed L151, L154, L155, L156.

Figure 55C:
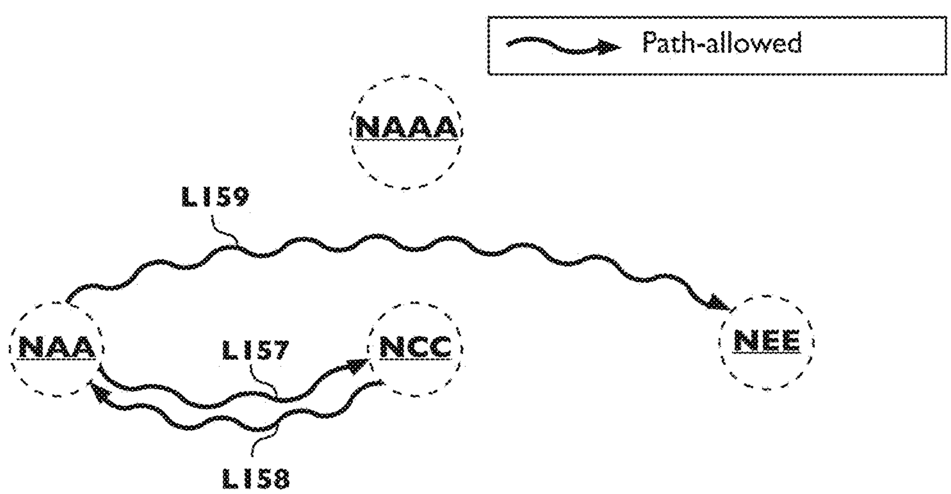

FIG. 55C is a diagram showing logical networks NAAA, NAA, NCC, NEE and path-allowed edges L157, L158, L159.

Figure 55D:
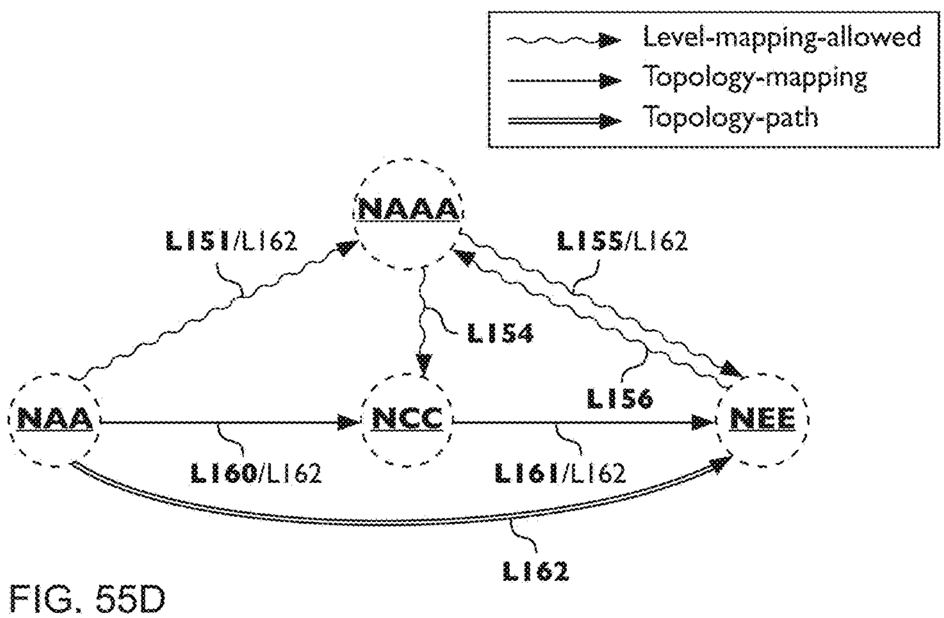

FIG. 55D is a diagram showing logical networks NAAA, NAA, NCC, NEE and level-mapping-allowed edges L151, L154, L155, L156, topology-mappings L160 and L161 and topology-path L162.

Figure 55E:
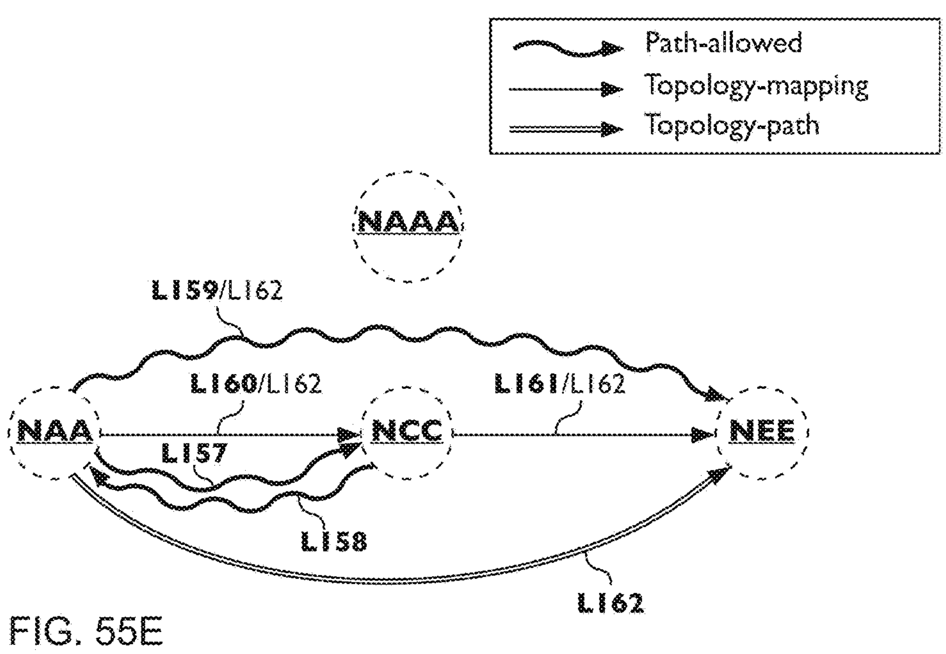

FIG. 55E is a diagram showing logical networks NAAA, NAA, NCC, NEE and path-allowed edges L157, L158, L159, topology-mappings L160 and L161 and topology-path L162.

Figure 56:
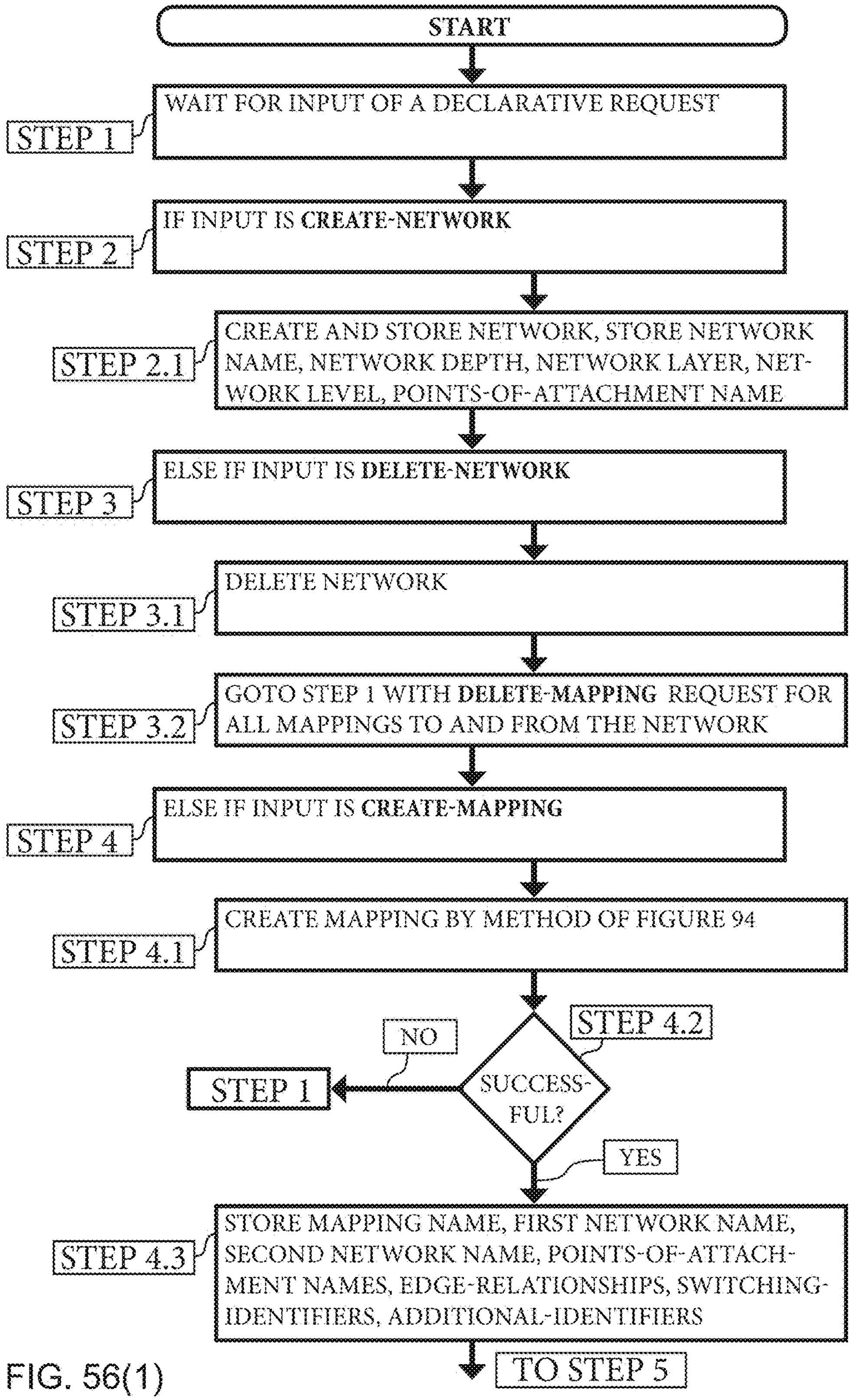
Figure 56:
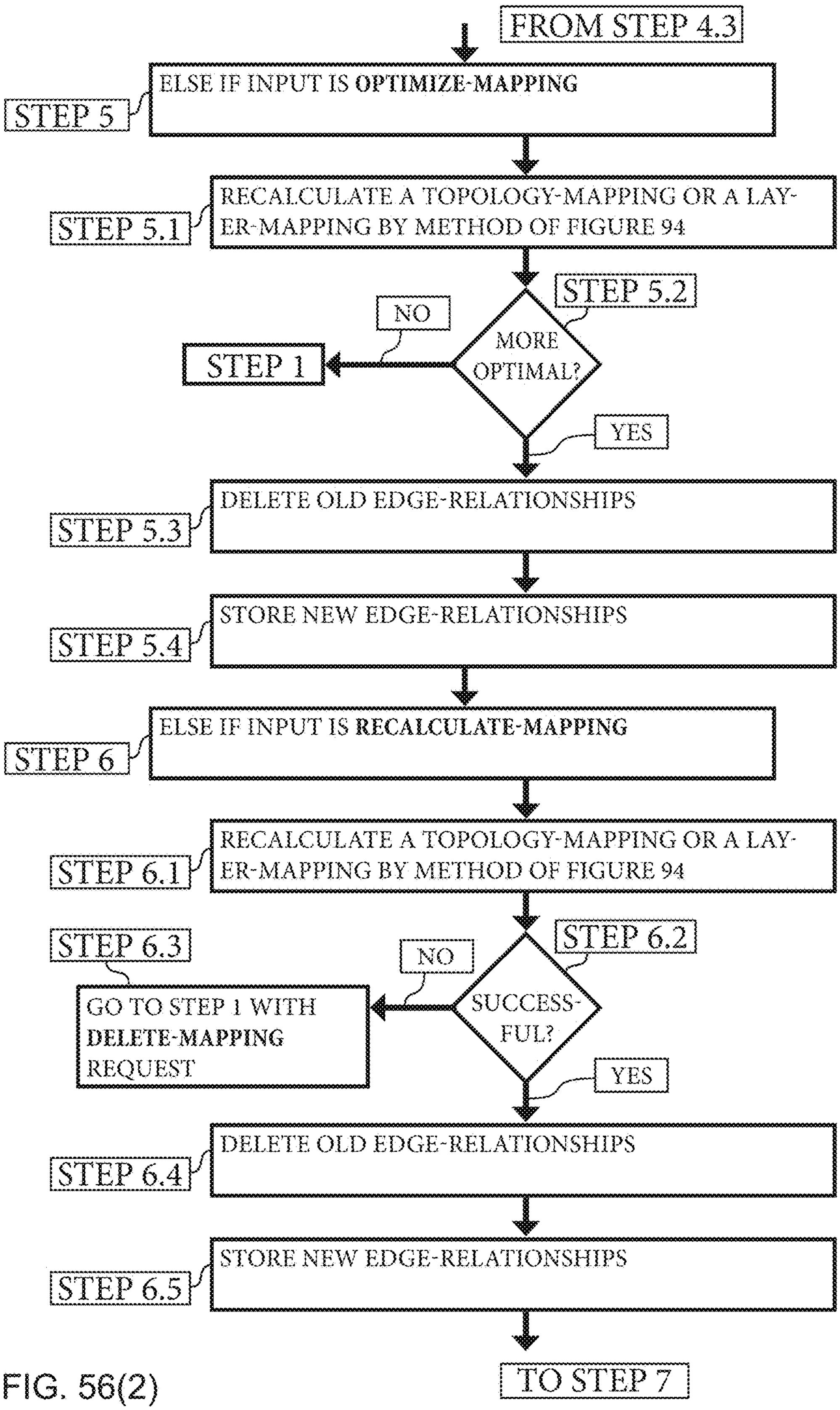
Figure 56:
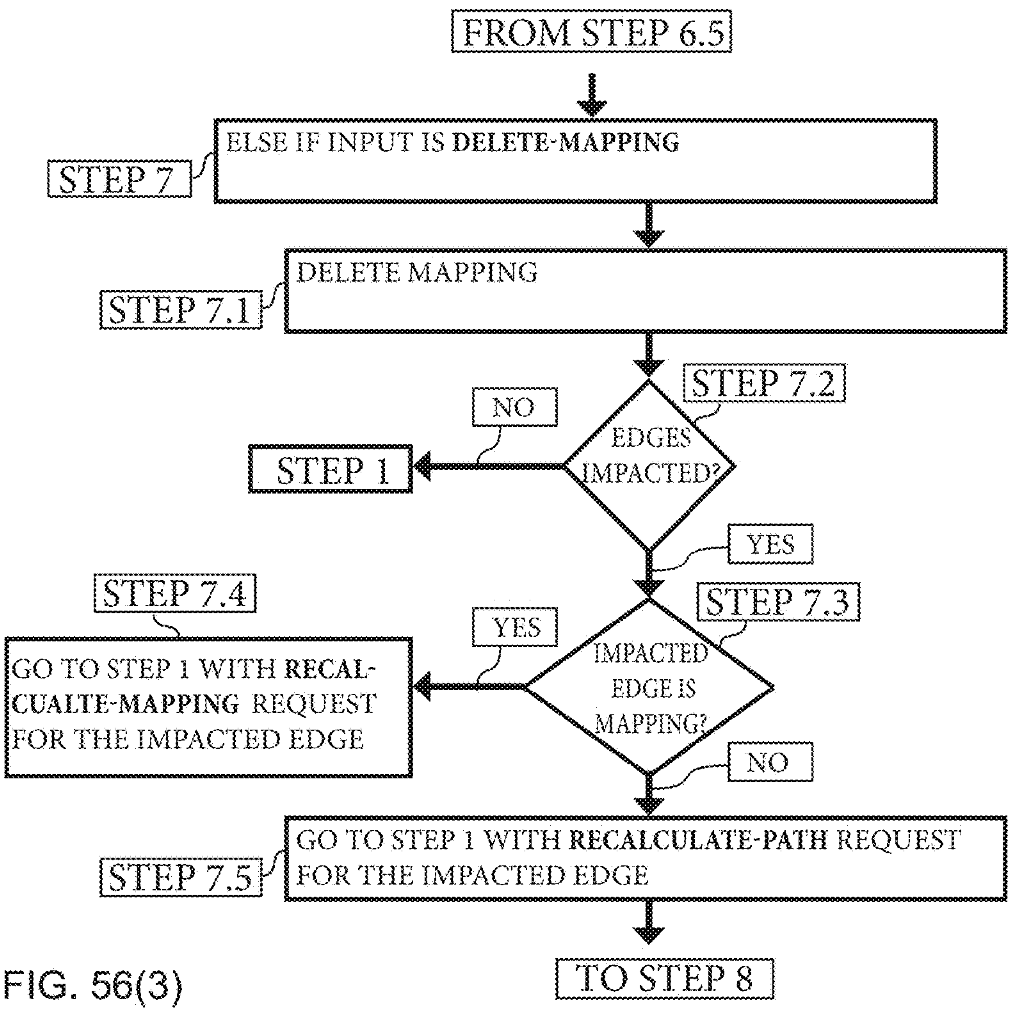
Figure 56:
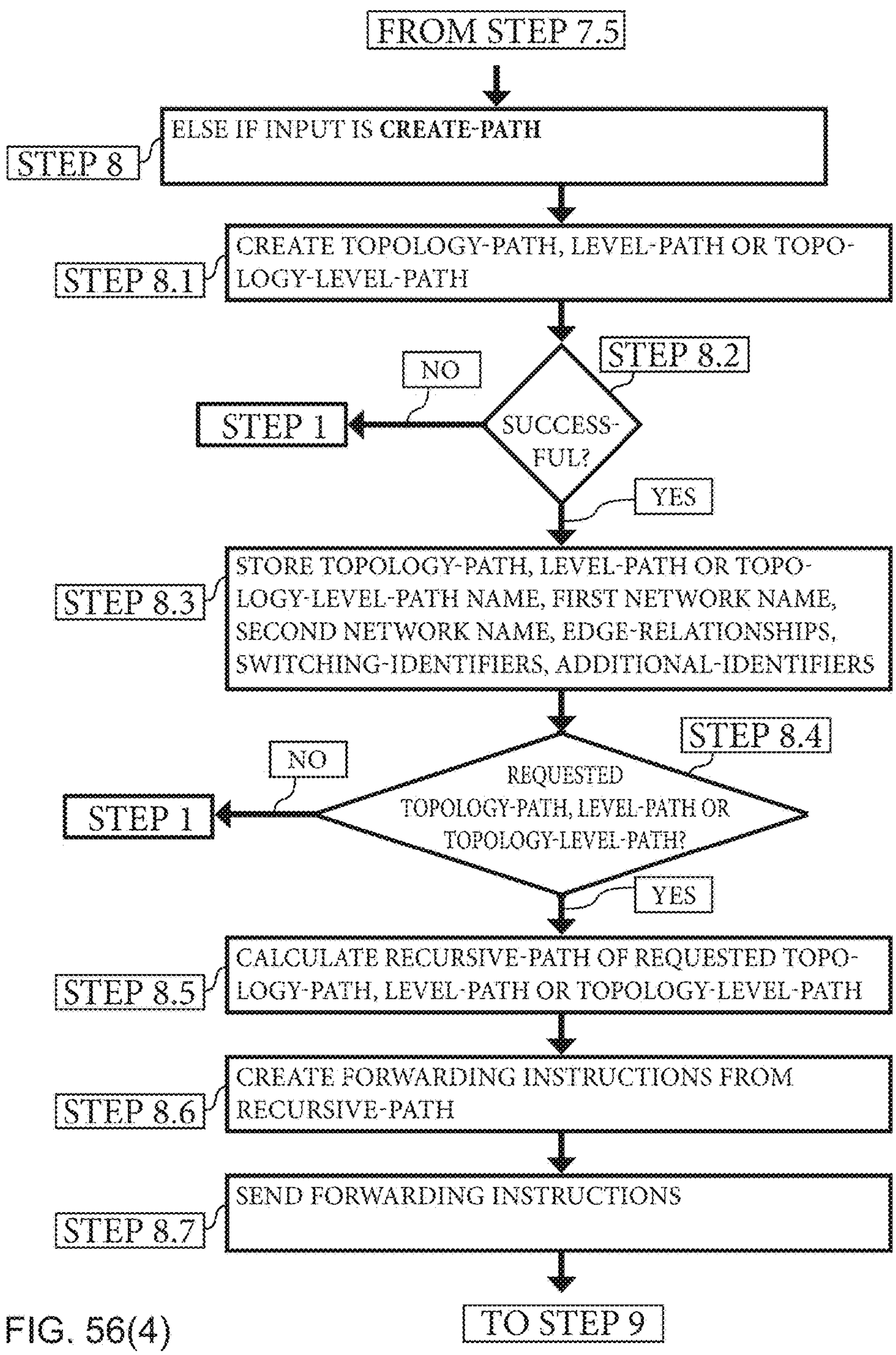
Figure 56:
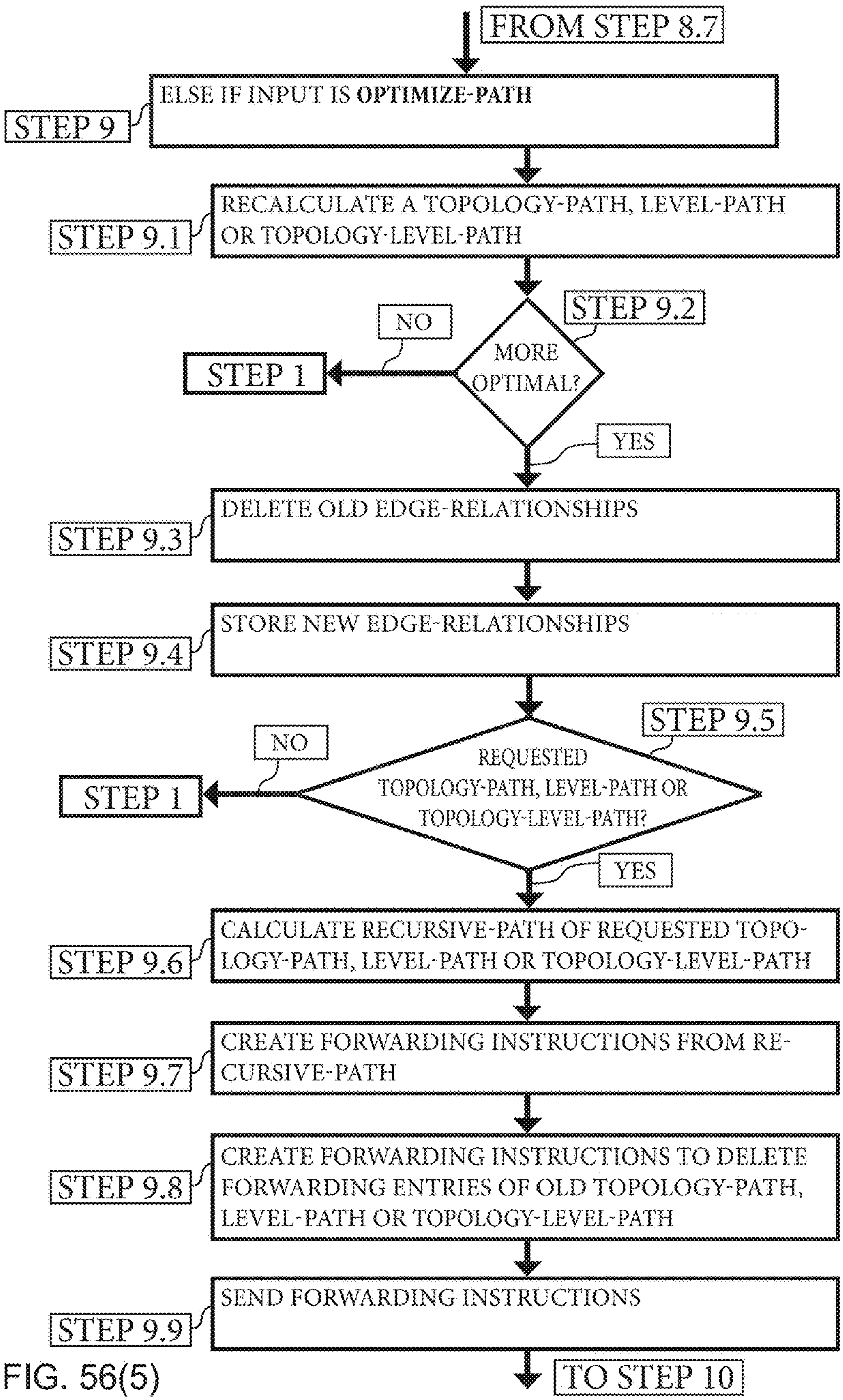
Figure 56:
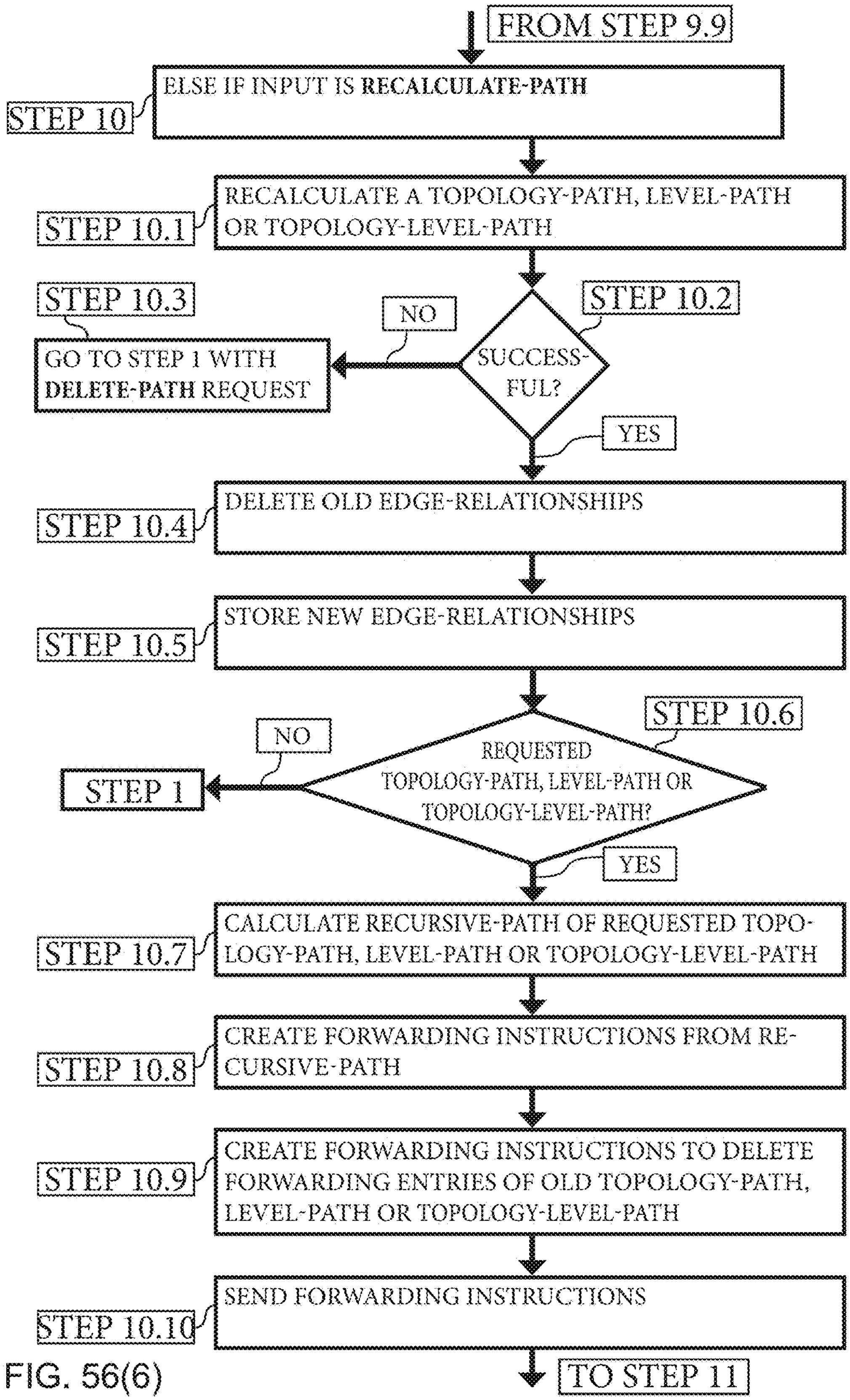
Figure 56:
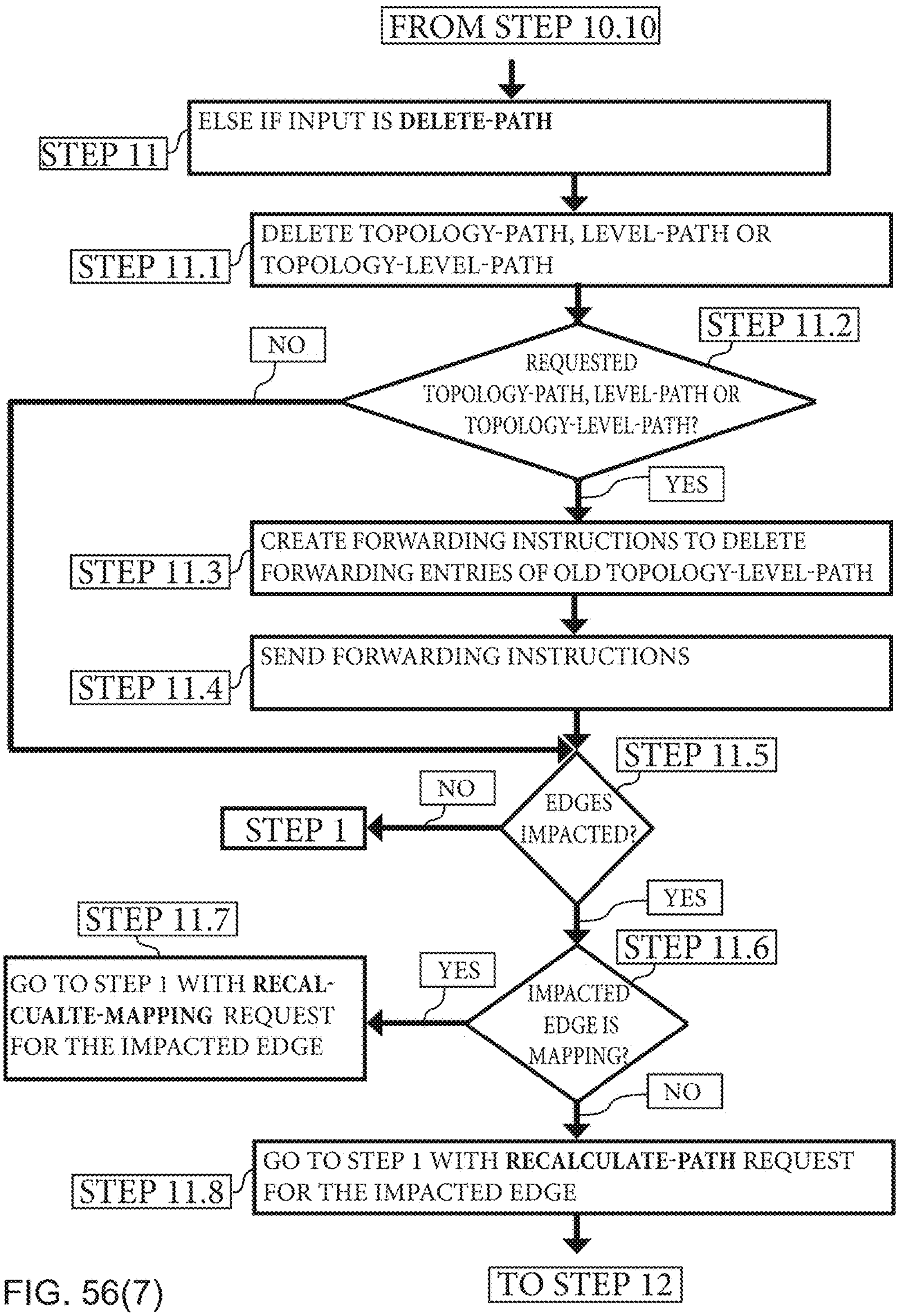
Figure 56:
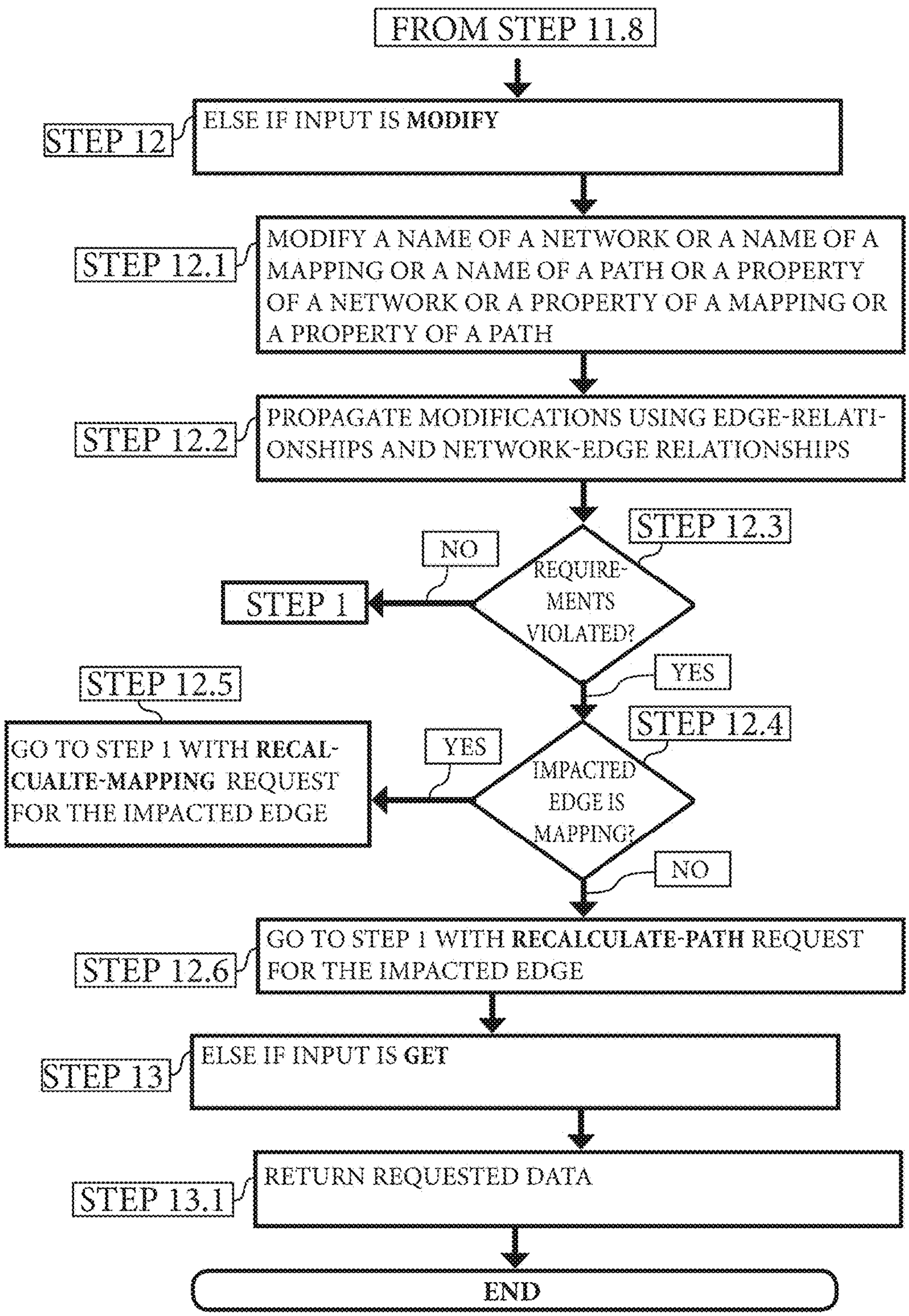
Figure 57:
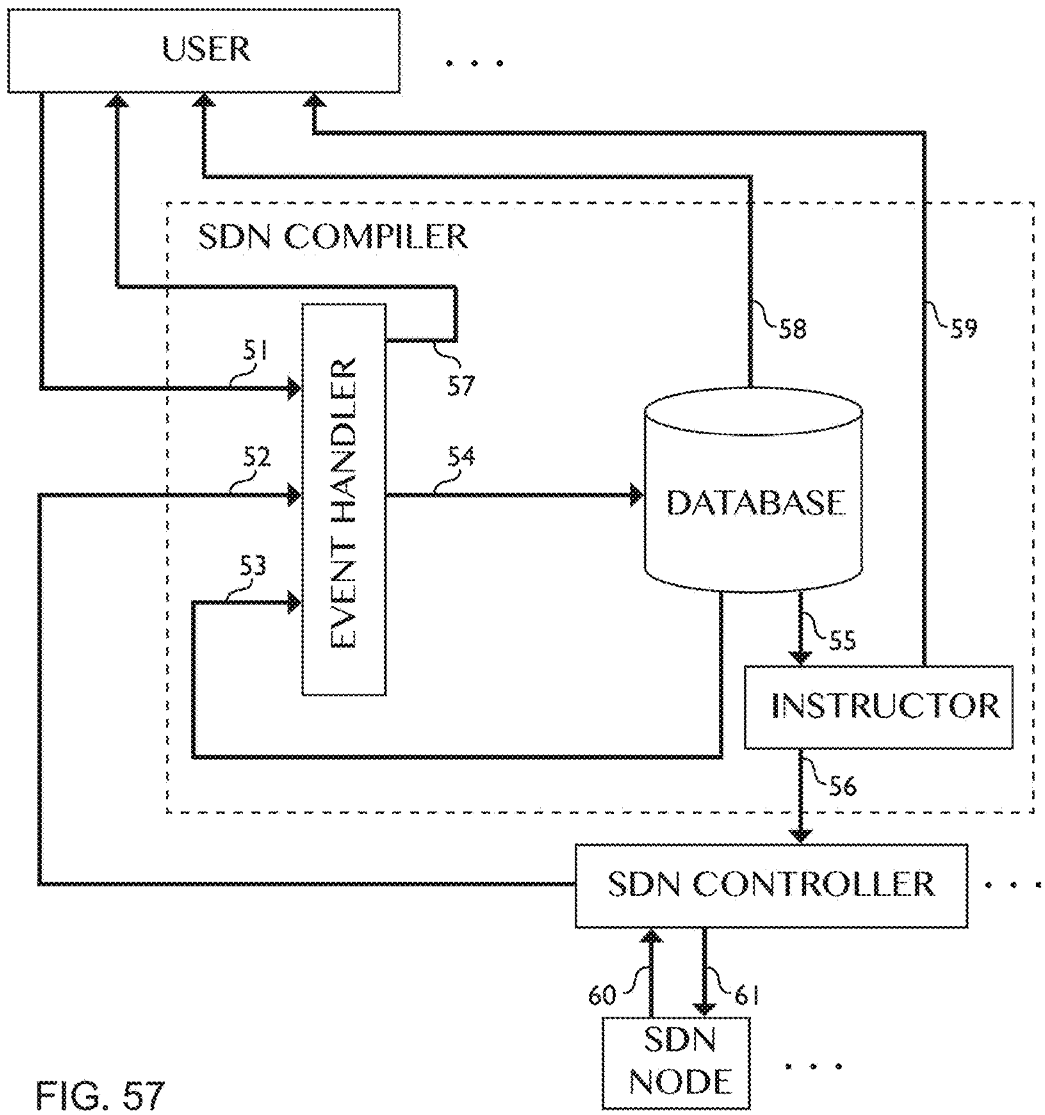

FIG. 56 is a diagram showing a flowchart of a SDN Compiler method based on 12 inputs: CREATE-NETWORK, DELETE-NETWORK, CREATE-MAPPING, DELETE-MAPPING, RECALCULATE-MAPPING, OPTIMIZE-MAPPING, CREATE-PATH, DELETE-PATH, RECALCULATE-PATH, OPTIMIZE-PATH, MODIFY, GET FIG. 57 is a diagram showing an example SDN Compiler apparatus comprising of a Database, an Event Handler and an Instructor. FIG. 57 als shows a User and SDN Controller and an SDN Node and message flows 51 through 61.

FIG. 58 is a diagram showing a set of 12 inputs and which input is used by a user of the SDN Compiler, by the SDN Controller and by the Database of the SDN Compiler.

Figure 59A:
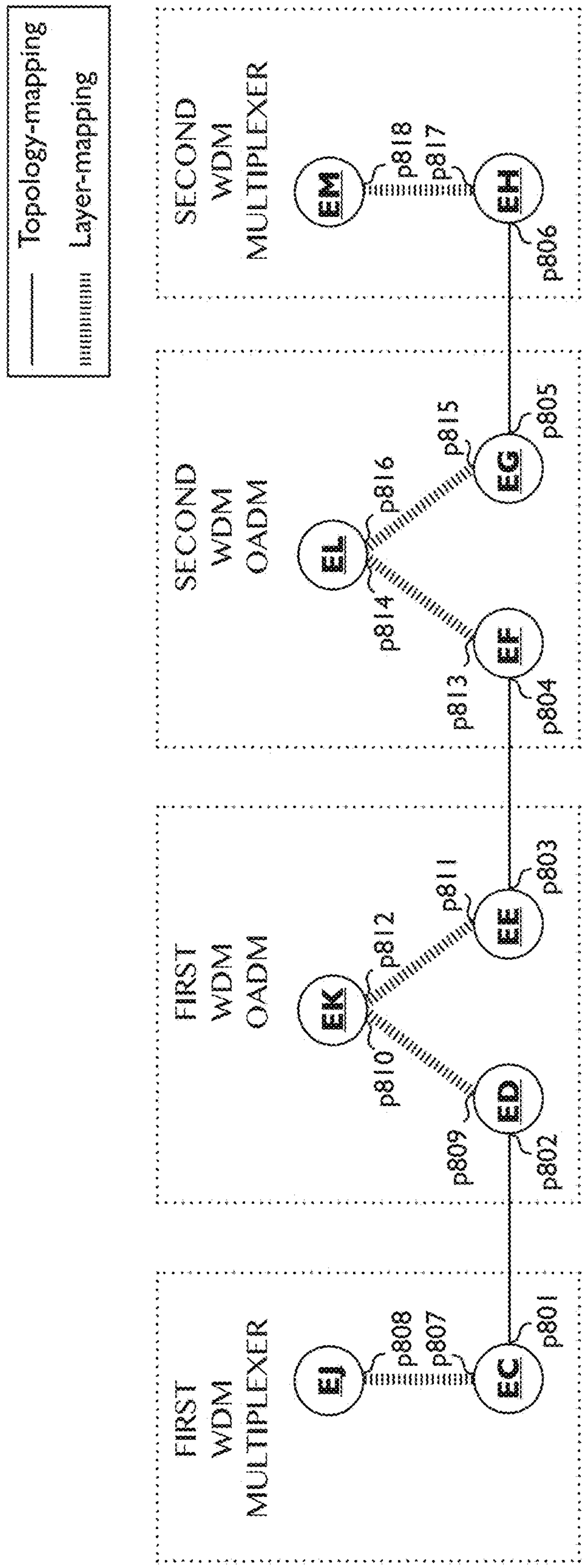

FIG. 59A is a diagram showing a first WDM multiplexer comprising of physical nodes EC, EJ, a first WDM OADM comprising of physical nodes ED, EE and EK, a second WDM OADM comprising of physical nodes EF, EG and EL and a second WDM multiplexer comprising of physical nodes EH, EM.

Figure 59B:
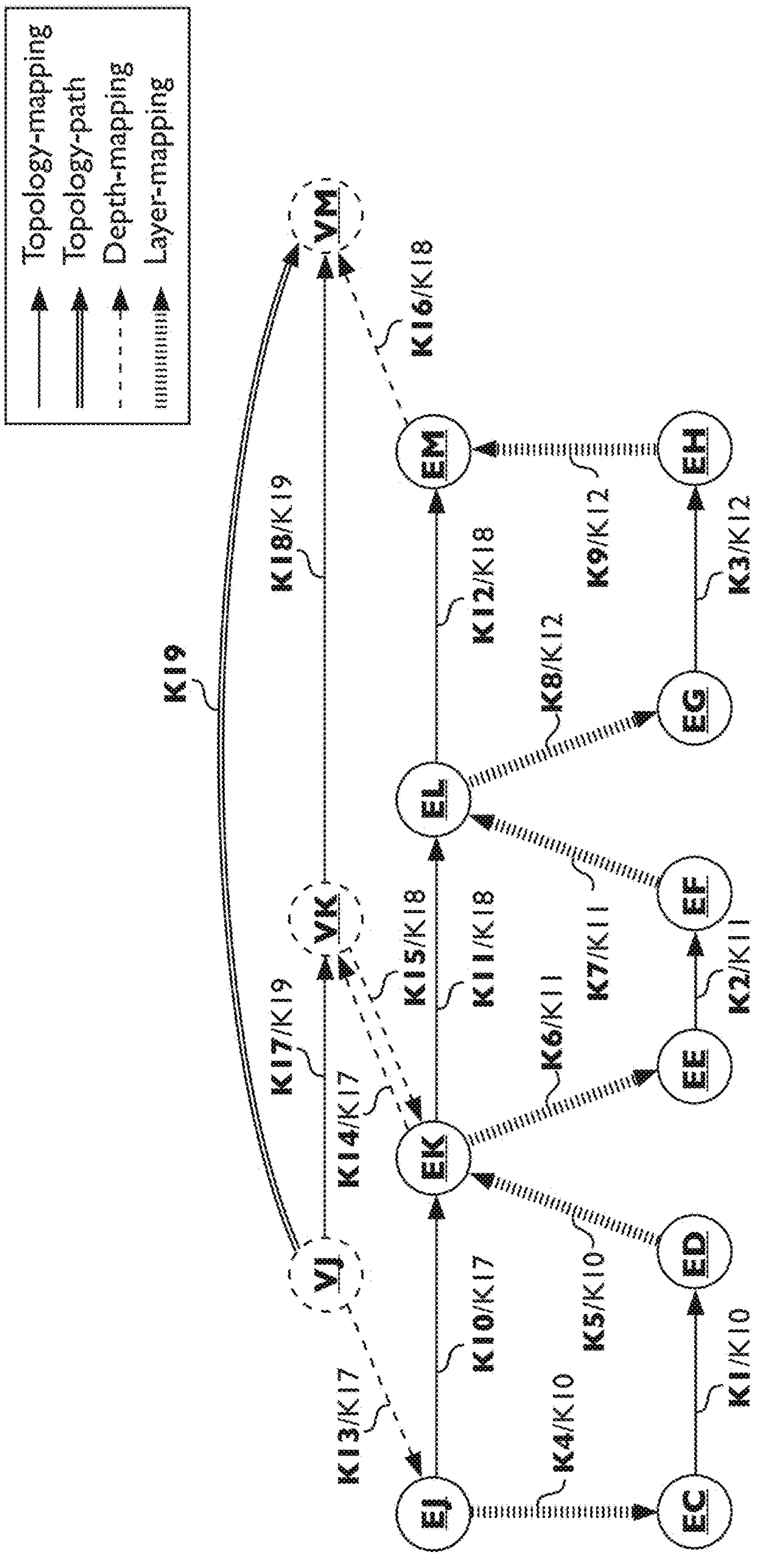

FIG. 59B is a diagram showing physical nodes EC, EJ, ED, EE, EK, EF, EG, EL, EH, EM and logical nodes VJ, VK, VM and topology-mappings, layer-mappings, depth-mappings and a topology-path represented as directed edges in a graph.

FIG. 59C is a diagram showing physical topology-mappings and physical layer-mappings per the notation of FIG. 51A.

FIG. 59D is a diagram showing created topology-mappings and a created topology-path FIG. 59E is a diagram showing the recursive-path of the topology-path K19

FIG. 59F is a diagram showing switching-identifiers for the edges named K10, K11 and K12

FIG. 59G is a diagram showing for each physical node in the recursive-path calculated from the requested topology-path named K19 an input port, an output port, relevant incoming set of edge-relationships and relevant outgoing set of edge-relationships.

FIG. 59H is a diagram showing the first WDM multiplexer, the first WDM OADM, the second WDM OADM and the second WDM multiplexer an input port, an output port, relevant incoming set of edge-relationships and relevant outgoing set of edge-relationships as calculated from the requested topology-path named K19.

Figure 60A:
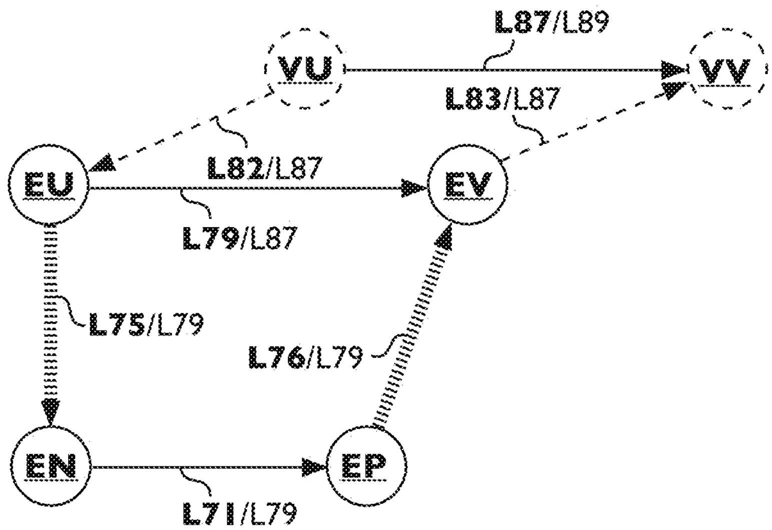

FIG. 60A is a diagram showing physical nodes EN, EP, EU, EV and logical nodes VU and VV that are shown in FIG. 52B, as well as the topology-mappings named L71, L79, L87, layer-mappings L75, L76 and depth-mappings L82, L83.

Figure 60B:
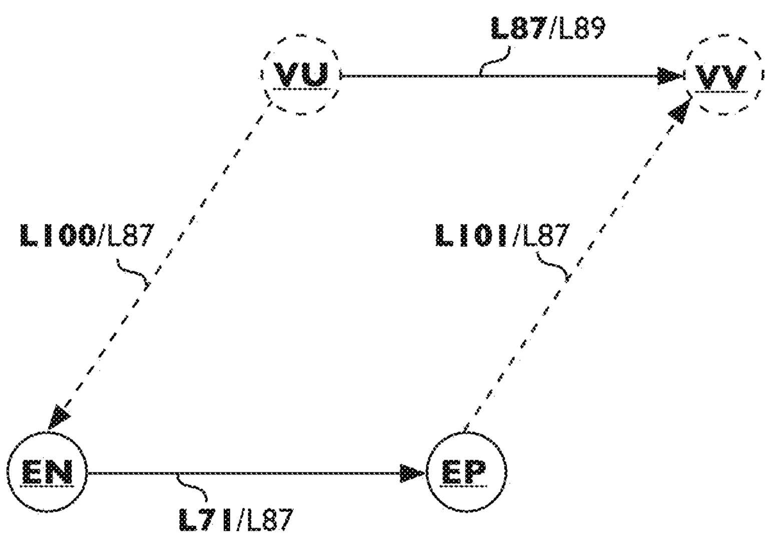

FIG. 60B is a diagram showing physical nodes EN, EP and logical nodes VU, VV that are shown in FIG. 52B, as well as the topology-mappings named L71, L87, and depth-mappings L100, L101.

Figure 61A:
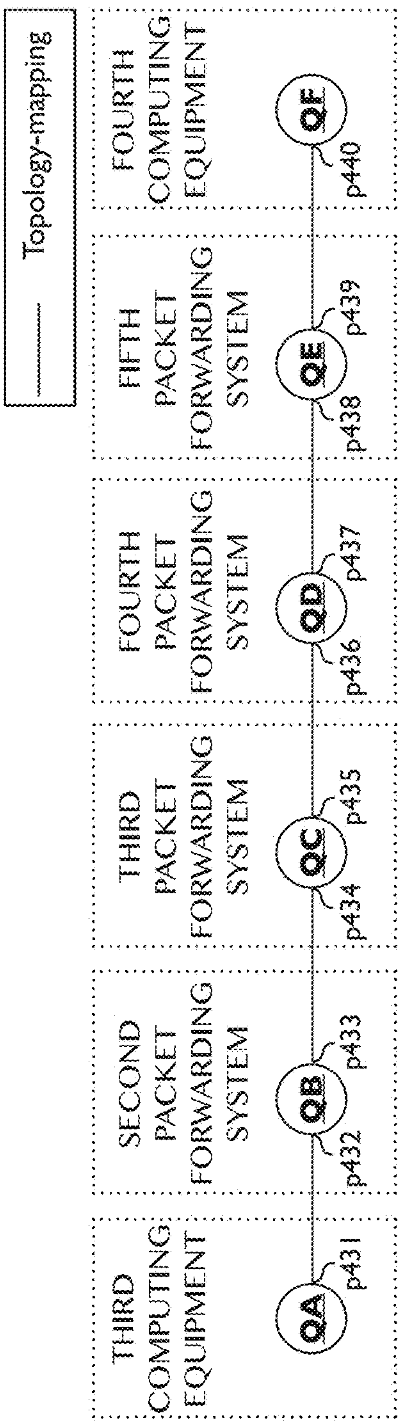

FIG. 61A is a diagram showing a third computing equipment, a second packet forwarding system, a third packet forwarding system, a fourth packet forwarding system, a fifth packet forwarding system and a fourth computing equipment interconnected by physical links.

Figure 61B:
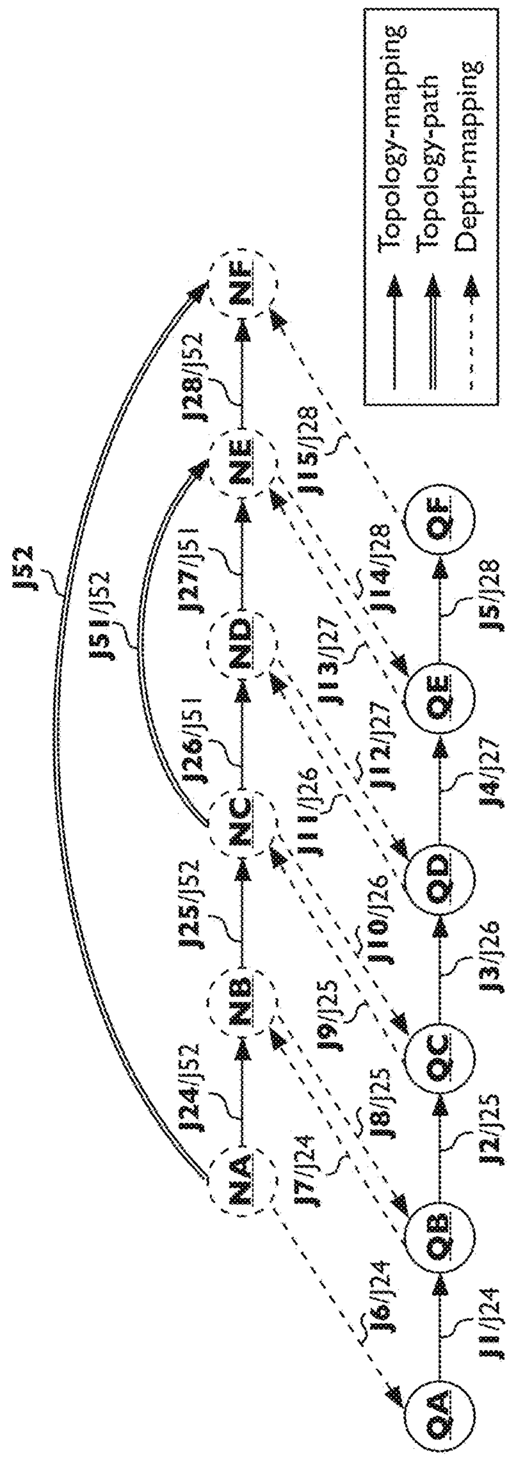

FIG. 61B is a diagram showing physical nodes QA, QB, QC, QD, QE, QF and logical nodes NA, NB, NC, ND, NE, NF, depth-mappings, topology-mappings and topology-paths.

FIG. 61C is a diagram showing physical topology-mappings and depth-mappings per the notation of FIG. 51A.

FIG. 61D is a diagram showing created topology-mappings and created topology-paths FIG. 61E is a diagram showing the recursive-path of the topology-path named J52

FIG. 61F is a diagram showing switching-identifiers for the edges named J1 through J5, J51, J52

Figure 61G:
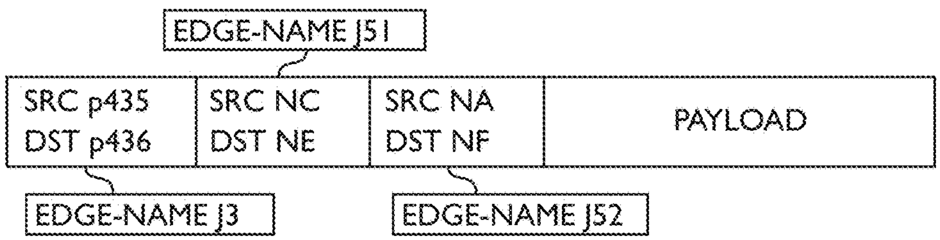

FIG. 61G is a diagram showing a packet overhead of the topology-mapping named J3 being a physical link in case of a tunneling example.

Figure 61H:
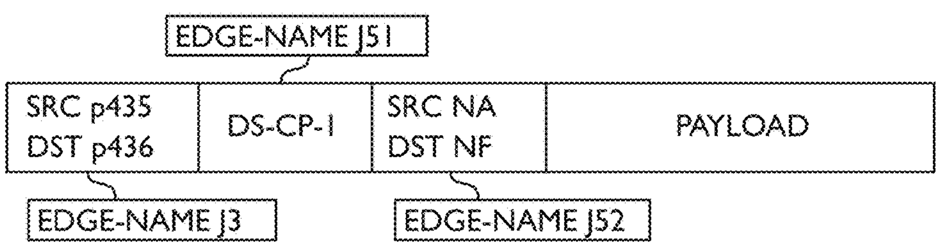

FIG. 61H is a diagram showing a packet overhead of the topology-mapping named J3 being a physical link in case of a Differentiated Services example.

Figure 61I:
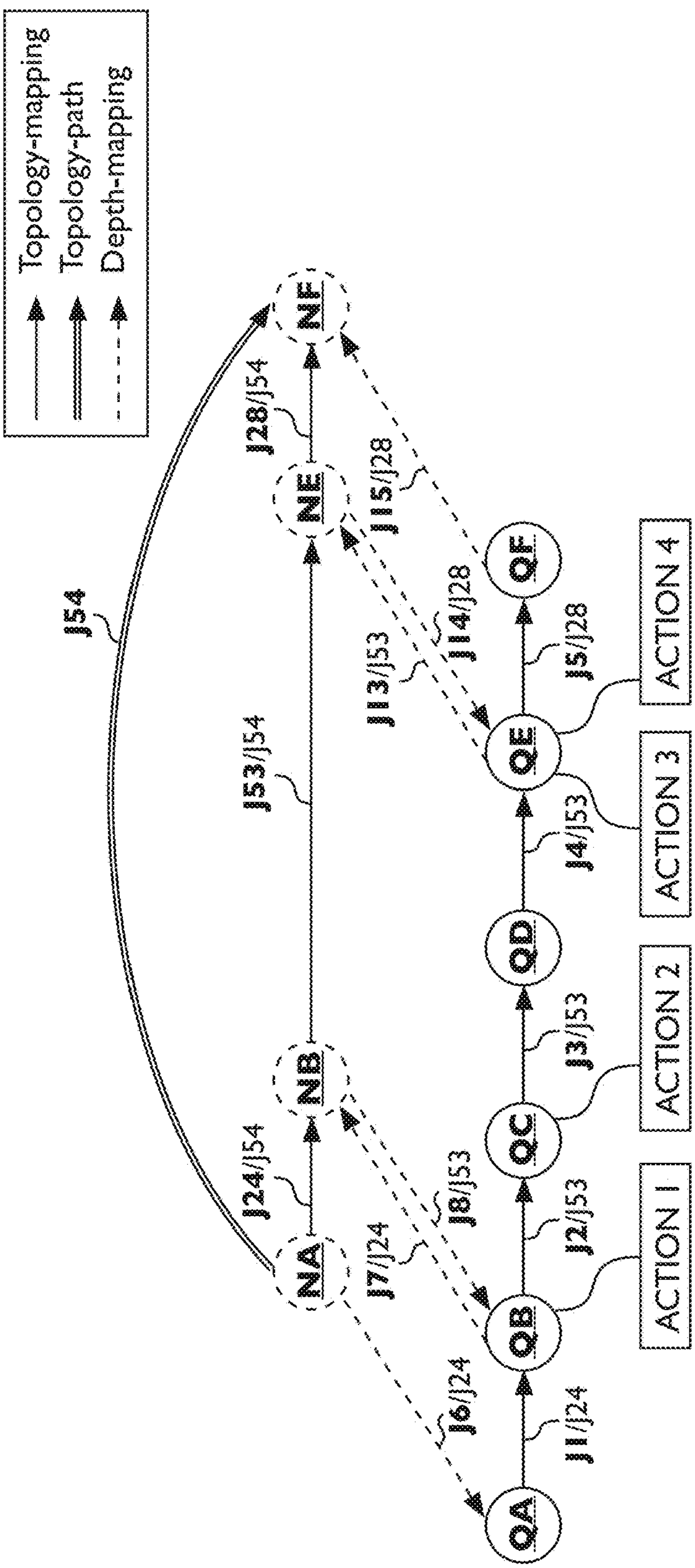

FIG. 61I is a diagram showing physical nodes QA, QB, QC, QD, QE, QF and logical nodes NA, NB, NE, NF, depth-mappings, topology-mappings and topology-paths. Physical node QB performs action 1, physical node QC performs action 2, physical node QE performs action 3 and action 4.

Figure 62A:
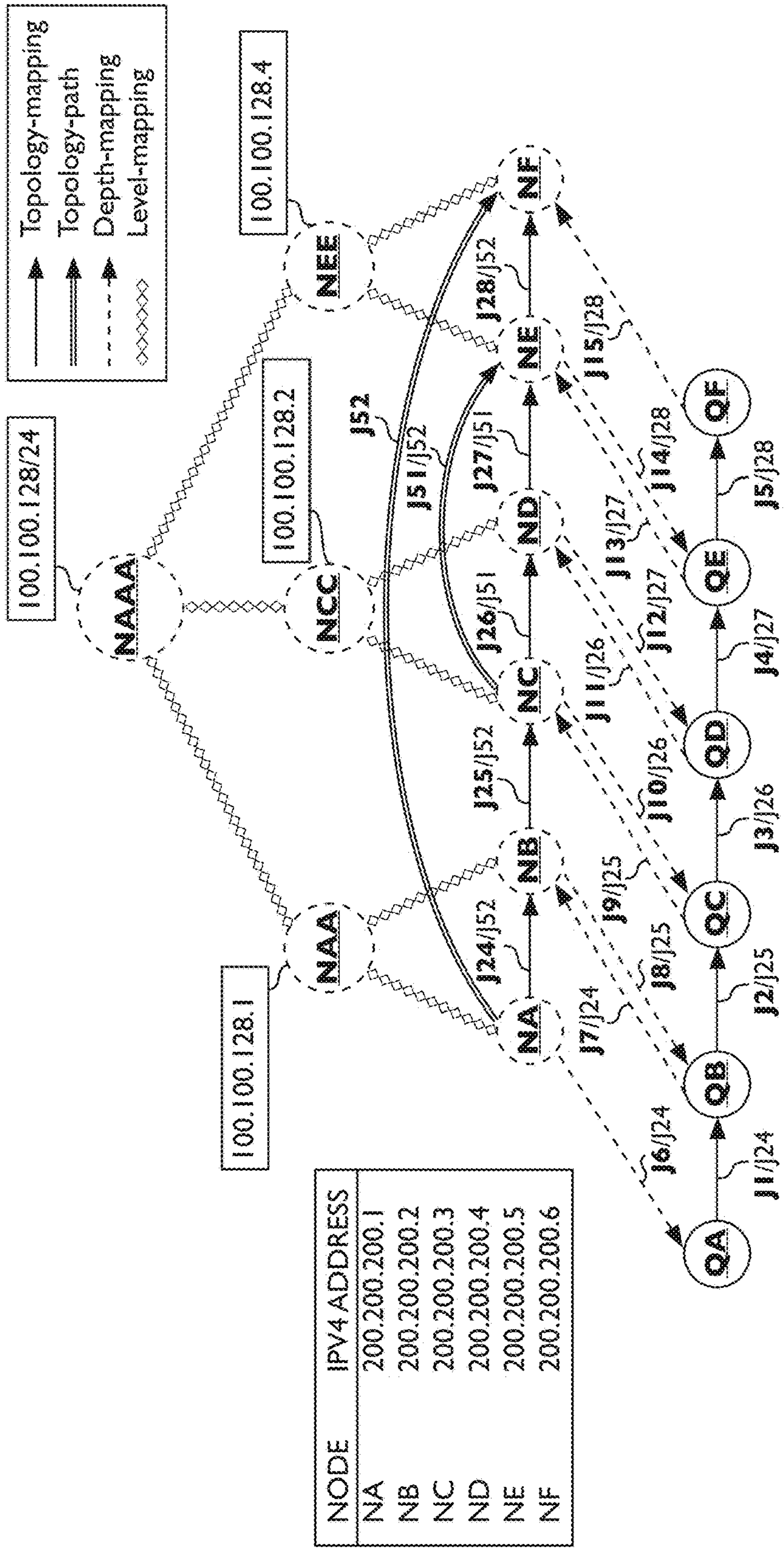

FIG. 62A is a diagram showing logical networks NAAA, NAA, NCC, NEE, NA, NB, NC, ND, NE, NF and physical nodes QA, QB, QC, QD, QE, QF and IPv4 addresses assigned to each logical network.

Figure 63A:
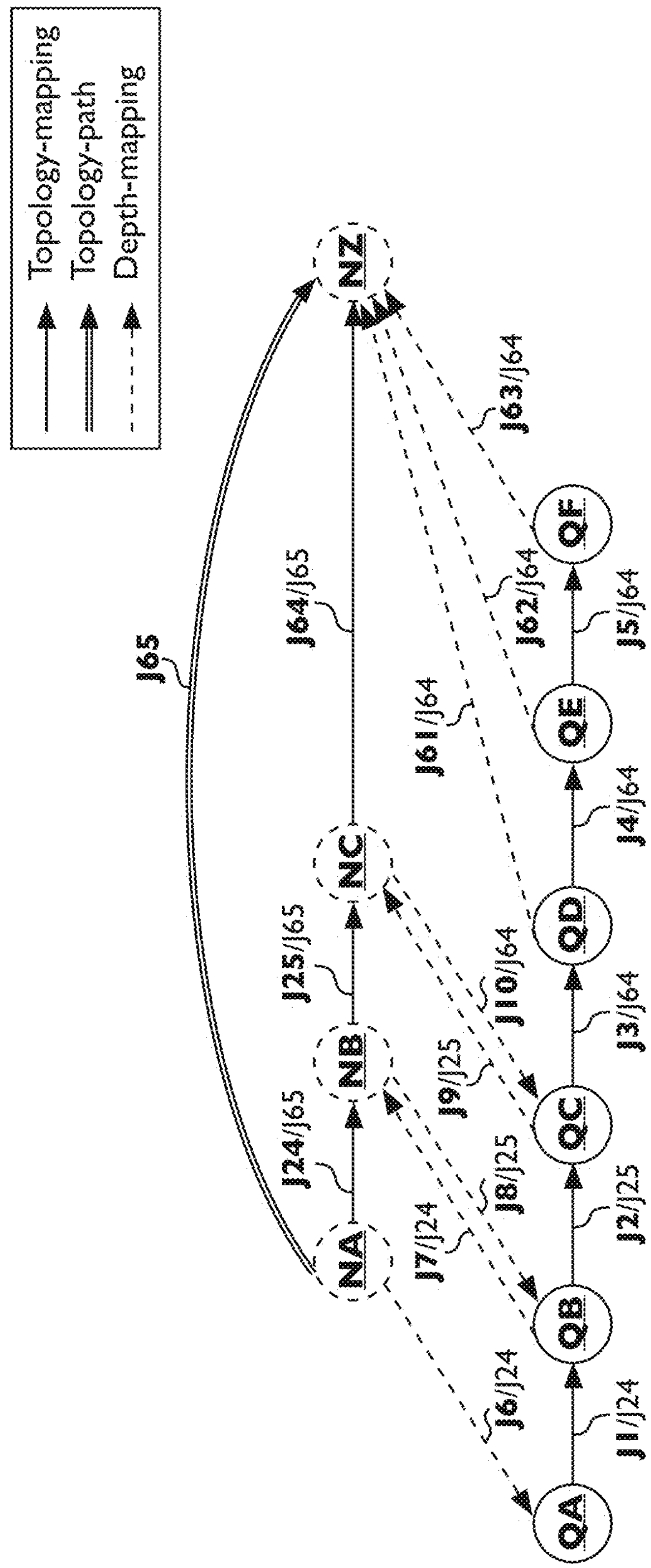

FIG. 62B is a diagram showing four cases of relevant incoming set of edge-relationships and relevant outgoing set of edge-relationships and an action to be performed FIG. 62C is a diagram showing physical nodes QA, QB, QC, QD, QE, QF, relevant incoming set of edge-relationships, relevant outgoing set of edge-relationships and an action to be performed FIG. 63A is a diagram showing physical nodes QA, QB, QC, QD, QE, QF and logical nodes NA, NB, NC, NZ, depth-mappings, topology-mappings and topology-paths.

FIG. 63B is a diagram showing topology-mappings J1 through J5 and depth-mappings J6 through J10, J61, J62, J63 using the notation of FIG. 51A.

FIG. 63C is a diagram showing created topology-mappings named J24, J25, J64 and topology-path named J65.

FIG. 63D is a diagram showing the notation used for a fourth edge with a fourth edge name, the fourth edge being of a fourth edge-type, and comprising of a first concatenation and a second concatenation in parallel, as denoted by the "&" sign.

FIG. 63E is a diagram showing the recursive path of a requested topology-path named J65.

FIG. 63F is a diagram showing for each physical node in the recursive-path calculated from the requested topology-path named J65 an input port, an output port, relevant incoming set of edge-relationships and relevant outgoing set of edge-relationships.

DETAILED DESCRIPTION OF THE INVENTION AND PREFERRED EMBODIMENT

Figure 1:
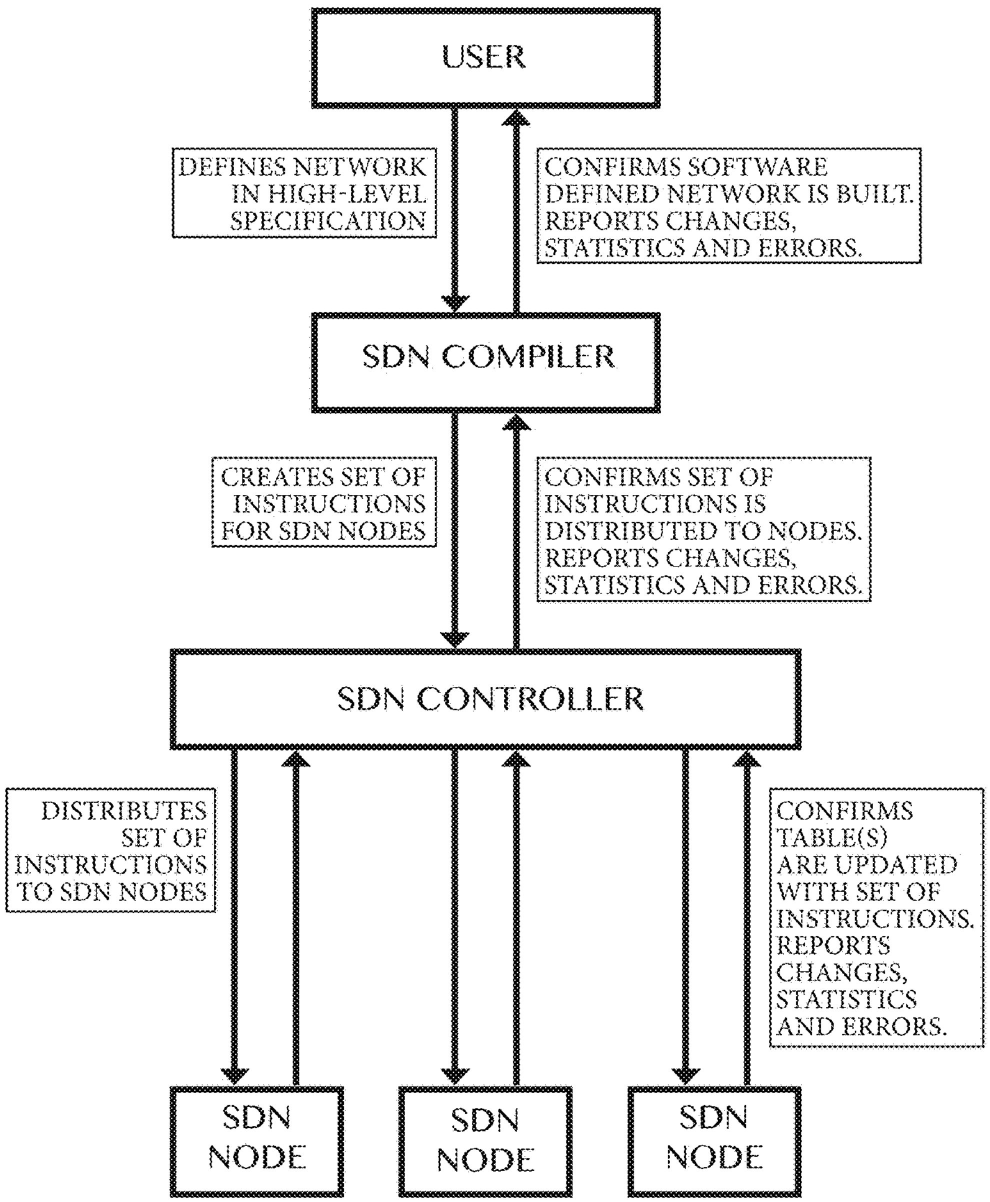
FIG. 1 is a diagram depicting the various components of a Software Defined Network

The definition of SDN as given in the introduction above, has lead the inventor of the present invention to a system comprising the following components, as depicted in FIG. 1.

1. A User defining a network in a high-level network specification.
2. A SDN Compiler translating the high-level network specification into a set of instructions for physical and virtual networking and computing resources.
3. A SDN Controller distributing this set of instructions to physical and virtual networking and computing resources.
4. Physical and virtual networking and computing resources performing an action on an incoming packet in accordance with the received set of instructions. In FIG. 1, they are indicated with the term "SDN node".

Figure 31:
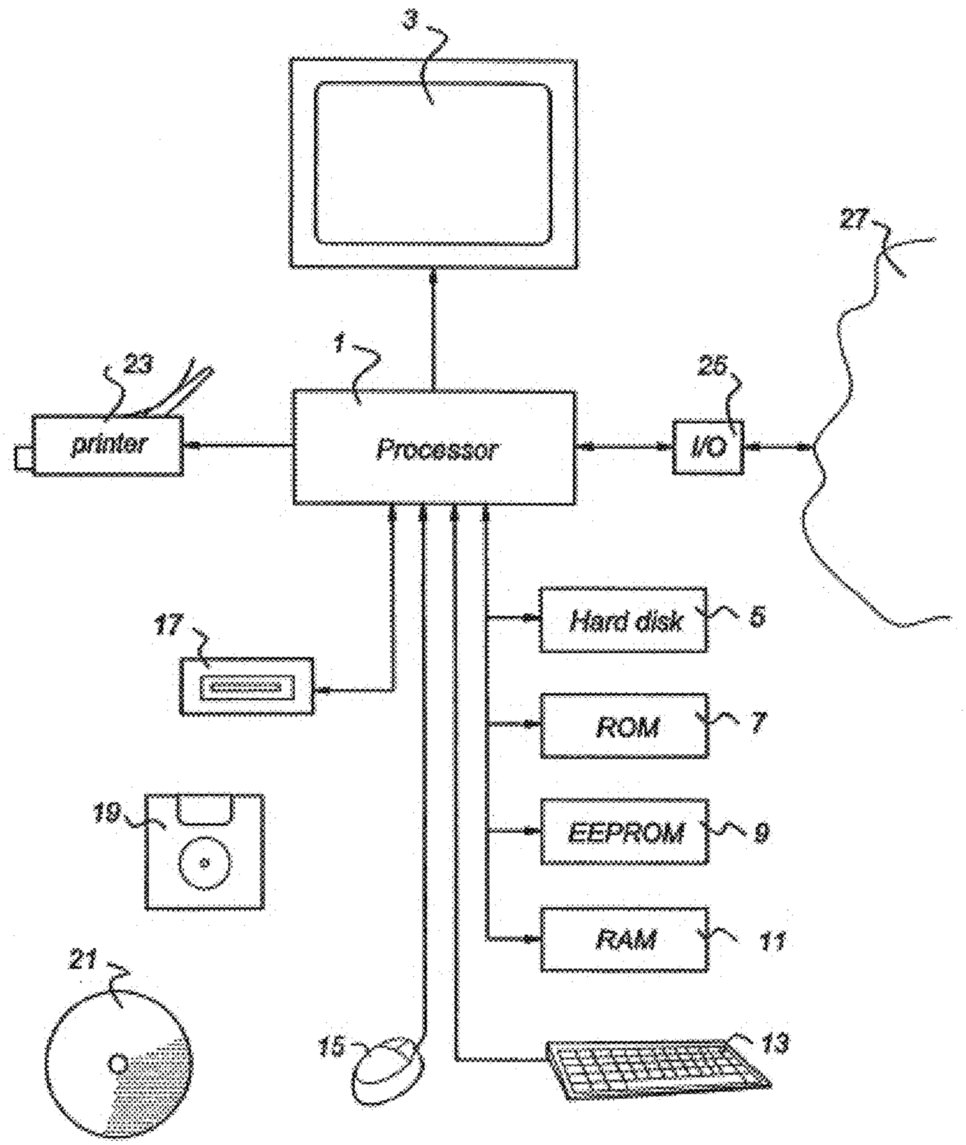
FIG. 31 is a diagram of a general outline of a computer arrangement

A user mentioned at point 1 above could be, but is not limited to, a person, a network management system, a cloud management system, an application, another SDN Compiler. So, a User may refer to "user equipment", i.e., any suitable computer equipment like a computer work station that may be stand-alone or part of a larger network. An example of such a computer equipment is shown in FIG. 31 and will be described later.

In FIG. 1, in the direction from bottom to top, the various components report on their northbound interface that particular tasks have been performed and report changes, statistics and errors.

The resources mentioned at point 4 comprise typical networking and computing resources such as, but not limited to:

- Physical packet forwarding devices (such as, but not limited to, layer 2 switch, layer 3 router, firewall, deep packet inspection device, caching node, or other type of middleboxes).
- Physical devices acting as network host, such as but not limited to physical server, personal computer, laptop, tablet, mobile phone.
- Physical Network Interface Cards (NICs).
- Virtual switches in virtualized physical servers.
- Virtual machines in virtualized physical servers.

The specification of this logical network abstraction is the 'high-level network specification' inputted by the user and mentioned at point 1 above. Ideally, this specification specifies an arbitrary logical network, consisting of an arbitrary number of logical nodes in an arbitrary topology with an arbitrary forwarding policy, determining the forwarding paths, the logical nodes being mapped to arbitrary physical and virtual network and computing resources. Multiple logical networks can be defined and created simultaneously on the same physical and virtual networking and computing resources.

Point 2 above refers to 'Translation of the high-level network specification into a set of instructions for networking and computing resources'. In case of a switch, these instructions are the forwarding table entries of that switch according to which packets should be forwarded. In case of a host, these instructions are the filter table entries according to which packets should be accepted or dropped and instructions to which output port to send packets originating from that host node to a particular destination node. In case of a NIC these instructions are the filter table entries according to which packets should be forwarded or dropped. Point 2 referred to above provides the translation or compilation from a high-level network specification into a set of instructions for the appropriate physical and virtual networking and computing resources. We have termed this process an 'SDN Compiler' process in analogy with compilers used in computing, translating a high-level language into lower-level instructions. Please note that the above process should provide instructions to both the physical and virtual networking and computing resources, in contrast to so-called 'overlay' virtual networks (such as proposed e.g. by Nicira/VMWare) which essentially create a virtual tunnel on top of the physical network, without configuring the physical switches, except for the tunnel in- and egress switches. The desired SDN Compiler method should provide an integral approach including both the virtual and physical resources, including the entire physical network. Further, the desired SDN Compiler method should also instruct non-switching network devices, referred to above, with the required instructions. Moreover, as current OpenFlow implementations are available in software (e.g. Open vSwitch providing a Virtual Switch running in a virtualized physical server) as well as in hardware (e.g. NEC ProgrammableFlow PF5240 Switch), there is a need to determine the aforementioned instructions across virtual and physical networking and computing resources. In an implementation, functionality of the 'SDN Compiler', or at least part of it, and functionality of the 'SDN Controller', or at least part of it, could be combined into a single system.

The 'SDN Compiler' process should allow for reasonably fast calculation of these instructions when any change in the logical network definition or physical or virtual resources occurs. E.g. a reasonable time might be in the order of 10's of milliseconds. Also, the list of forwarding or filter tables should be kept within reasonable limits for production-scale networks to be supported by current hardware and software implementations. E.g. a reasonable number order entries might be in the order of 5000 forwarding table entries.

Figure 2A:
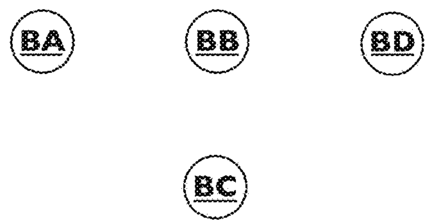
FIG. 2A is a diagram showing a functional representation of physical nodes BA, BB, BC and BD
Figure 2B:
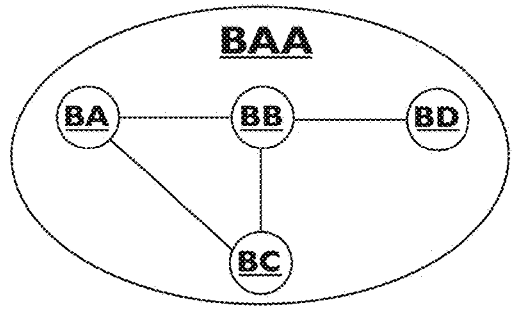
FIG. 2B is a diagram showing a functional representation of physical network BAA, consisting of physical nodes BA, BB, BC and BD interconnected by links.

We will now first describe the physical and virtual resources for which the SDN compiler creates the appropriate instructions, using a functional representation. FIGS. 2A-2G depict the components of a physical network. Example physical nodes are shown in FIG. 2A and are considered physical resources onto which a logical network is created. As such the name of the physical node (BA through BD in FIG. 2A) is only used to identify the physical resource and not used to make any forwarding decision upon. As depicted in FIG. 2B, we define a physical network (identified with BAA in FIG. 2B) as a collection of physical nodes. Physical nodes are interconnected by physical links (denoted by a solid line).

In case a physical link is bidirectional, a physical link creates a pair of adjacencies between a pair of physical nodes, one adjacency in each direction. In case a physical link is unidirectional, a physical link creates a single adjacency between a pair of physical nodes. The physical link can be any physical medium, including but not limited to, fiber optic cable, copper cable, air. The physical link can also be a path provided by another networking technology, such as but not limited to an optical wavelength, a Time Division Multiplexing (TDM) circuit, a multi protocol label switching (MPLS) path. The set of physical nodes combined with the set of physical links determines the physical topology of the network. The physical network can consist of an arbitrary number of nodes, with arbitrary links, resulting in an arbitrary topology.

Figure 2C:
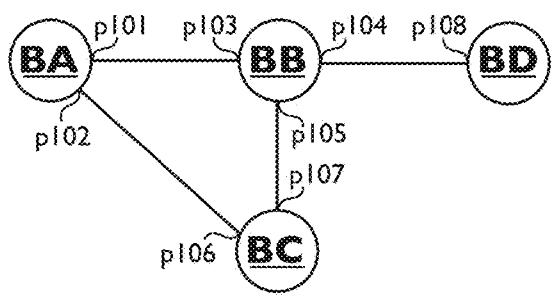
FIG. 2C is a diagram showing a functional representation of physical nodes BA, BB, BC, BD interconnected by links, of which the interconnection between a physical node and a physical link is denoted by a physical Point-of-Attachment (PoA), p101 through p108

As depicted in FIG. 2C, the interface between the physical node and the physical link is referred to as Physical 'Point-of-Attachment' (PoA), indicated by p101 to p108. A typical example of a Physical PoA identifier in currently deployed networks is an Ethernet Media Access Control (MAC) Address, but our invention is not limited to this. The PoA identifier has to be unique within the collection of networks that is under control of the SDN Compiler. The PoA identifies both the 'Input Port' of a node when a packet is received by a node and the 'Output Port' of a node when a packet is sent from a node.

Figure 2D:
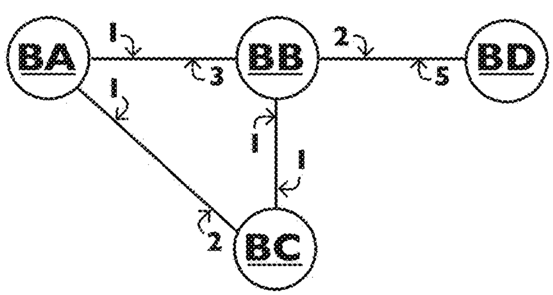
FIG. 2D is a diagram showing a functional representation of physical nodes BA, BB, BC, BD interconnected by physical links, of which the cost of the physical link in each direction of the physical link is shown
Figure 2E:
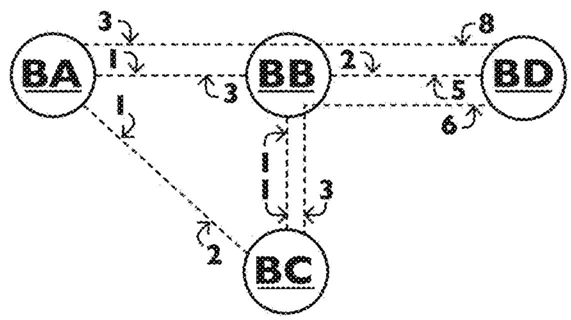
FIG. 2E is a diagram showing a functional representation of physical nodes BA, BB, BC, BD interconnected by physical links, of which the cost of the physical path in each direction of the path is shown

As depicted in FIG. 2D, each physical link has one or multiple cost types and a cost value(s) associated with each cost type in each direction. A typical cost type used in physical networks is the delay of the link, with cost values typically expressed in milliseconds, but any type of cost can be used. Each bidirectional physical link has 2 cost values, one for each direction. Each unidirectional physical link has 1 cost value for each cost type. The cost value of a physical link in a particular direction is shown closest to the physical node from which the packets originate for that particular direction. E.g. the link from BA to BB has a cost value of 1. The link from BB to BA has a cost value of 3.

While a physical link denotes the adjacency-relationship(s) between a pair of physical nodes, a physical path denotes a physical route a packet follows from a physical source node to a physical destination node, in case of unicast networking. This is illustrated by some example paths in FIG. 2E. In case of multicast or broadcast networking there are physical path relationships between a single physical source node and multiple physical destination nodes. Physical paths can have multiple cost types in each direction with typically a cost value equal to the sum of the cost values of that particular cost type in that particular direction of the physical links it consists of. A physical path is a sequence of physical PoAs through which the packet traverses from source node to destination node. Alternative terminology for a 'path' is a 'flow', e.g. the OpenFlow specification uses the terminology 'flow'.

Figure 2F:
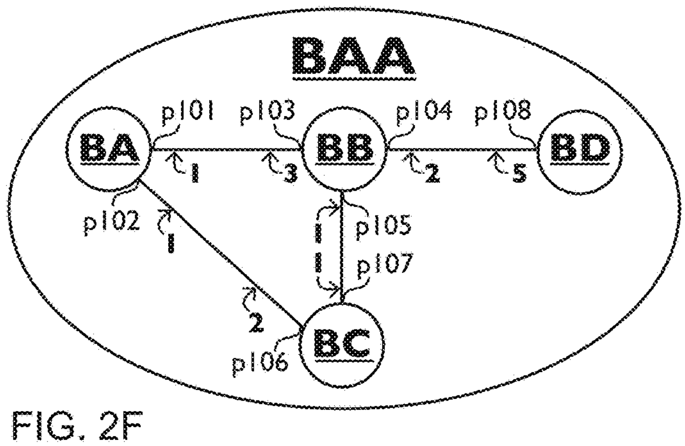
FIG. 2F is a diagram showing a functional representation of physical network BAA, consisting of physical nodes BA, BB, BC and BD interconnected by physical links, of which the interconnection between a physical node and a physical link is denoted by a physical Point-of-Attachment (PoA), p101 through p108, of which the cost of the physical link in each direction of the physical link is shown

Putting the above elements together, a typical representation of a physical network is illustrated in FIG. 2F showing the physical network BAA, physical nodes BA through BD, physical PoAs p101 through p108 and cost values for each physical link.

Figure 2G:
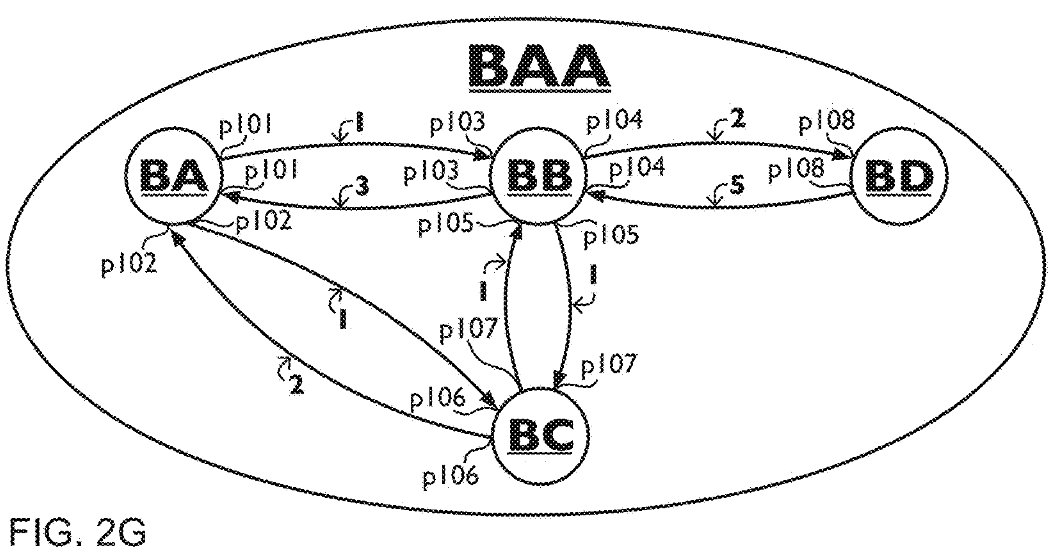
FIG. 2G is a diagram showing a weighted directed graph representation of physical network BAA, consisting of vertices (nodes) BA, BB, BC and BD interconnected by edges, of which the interconnection between a vertex and an edge is denoted by a physical Point-of-Attachment (PoA), p101 through p108, of which the cost of each edge is shown

In order to be able to apply a forwarding policy (e.g. but not limited to Shortest-Path First) we represent the network also as a weighted directed graph. The weighted directed graph of network BAA is given in FIG. 2G, showing the vertices (nodes) BA through BD and the directed edges that connect pairs of vertices. When represented as a directed graph, a bi-directional physical link between two vertices is represented by 2 edges. Each edge corresponds to an adjacency.

As depicted in FIG. 2H we distinguish between 3 types of physical nodes:

Physical switch node, with the following functionality:

a) Send packet of which it is the source node b) Receive packet of which it is the destination node c) Forward an incoming packet received on any of the input ports to any of the output ports (including the port on which it was received)

d) Optionally provide operation(s) on the packet, such as but not limited to monitoring and/or recording and/or buffering and/or modifying of the incoming packet header and/or payload before forwarding the packet to one or more of it's output ports. Also, not forwarding (blocking) the packet.
e) Drop packet
f) Encapsulate and redirect packet to SDN Compiler (optional)

Physical host node, with the following functionality:
a) Send packet of which it is the source node
b) Receive packet of which it is the destination node
c) Drop packet
d) Encapsulate and redirect packet to SDN Compiler (optional)

Physical Network Interface Card (NIC), with the following functionality:
a) Forward an incoming packet received on a particular input port to a particular output port (fixed relationship between input and output ports)
b) Drop packet
c) Encapsulate and redirect packet to SDN Compiler (optional)

Physical Switch, Host and NIC nodes are represented by the symbols shown in FIG. 2I. Virtual nodes will be explained hereafter.

In order to be able to create the appropriate instructions by the SDN Compiler for the physical and virtual nodes, we will now model physical and virtual equipment typically deployed in current networks.

Figure 3A:
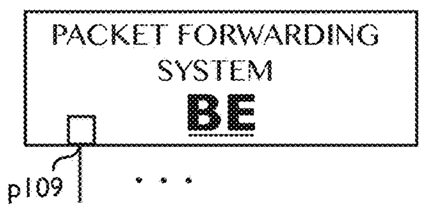
FIG. 3A is a diagram showing a physical representation of a Packet Forwarding System

FIG. 3A depicts a physical packet forwarding system BE (e.g., but not limited to, physical layer 2 switch, physical layer 3 router, firewall, deep packet inspection device, caching node, or other type of middleboxes). A physical packet forwarding system has one or more PoAs p109.

Figure 3B:
FIG. 3B is a diagram showing a functional representation of a Packet Forwarding System
Figure 3C:
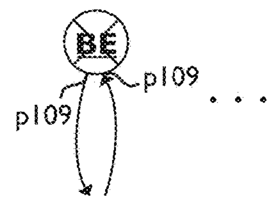
FIG. 3C is a diagram showing a directed graph representation of a Packet Forwarding System

A physical packet forwarding system is represented as a physical switch node, as depicted by the functional representation given in FIG. 3B. The corresponding directed graph is given in FIG. 3C.

Figure 4A:
FIG. 4A is a diagram showing a physical representation of Non-Virtualized Computing Equipment

FIG. 4A depicts non-virtualized computing equipment BF (e.g., but not limited to, physical server, personal computer, laptop, tablet, mobile phone). Non-virtualized computing equipment has one or more PoAs p110.

Figure 4B:
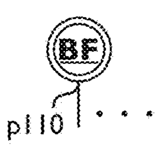
FIG. 4B is a diagram showing a functional representation of Non-Virtualized Computing Equipment
Figure 4C:
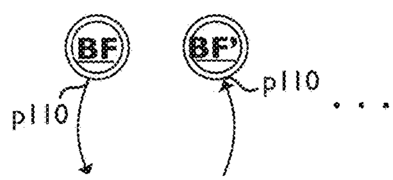
FIG. 4C is a diagram showing a directed graph representation of Non-Virtualized Computing Equipment

Non-virtualized computing equipment is typically in use as a physical host node, as depicted by the functional representation given in FIG. 4B. The corresponding directed graph is given in FIG. 4C. Host node BF has been split into 2 nodes: node BF in FIG. 4C is representing a sending host, while node BF' in FIG. 4C is representing a receiving host. This distinction is made as a host node is not allowed to forward any incoming packets, as per FIG. 2H. The functionality of the host node of sending source packets and receiving destination packets is represented by node BF and BF', respectively, in FIG. 4C.

Figure 5A:
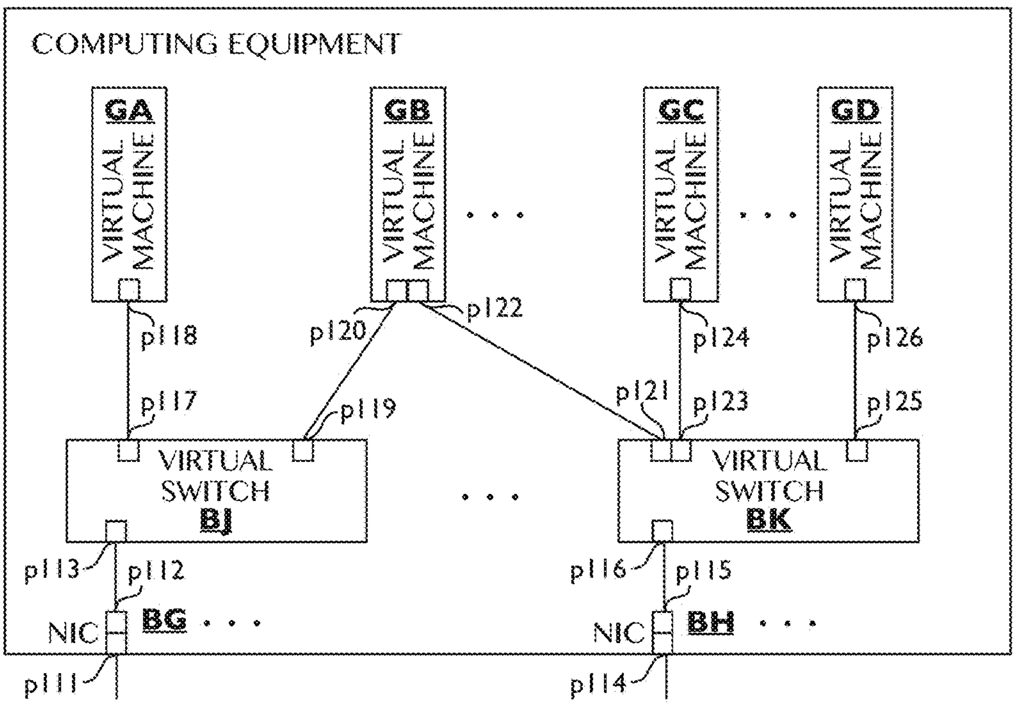
FIG. 5A is a diagram showing a physical representation of Virtualized Computing Equipment
Figure 5B:
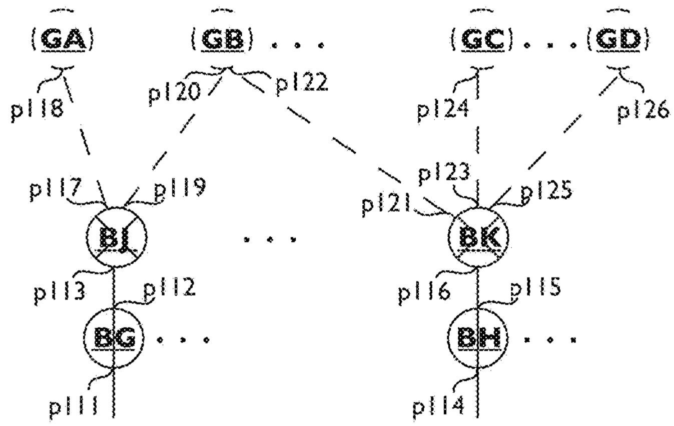
FIG. 5B is a diagram showing a functional representation of Virtualized Computing Equipment

FIG. 5A depicts virtualized computing equipment, e.g., but not limited to, a virtualized physical server or a virtualized blade server, in which an arbitrary number of virtual machines GA-GD are created, connected to an arbitrary number of virtual switches, using virtualization techniques. Virtualized computing equipment has PoAs p111, p112, p114, p115 on so-called Network Interface Cards (NICs) BG, BH, providing connectivity from the virtual switches BJ, BK to nodes outside the computing equipment. A virtual switch BJ, BK can be connected to one or multiple NICs BG, BH. A single virtual machine GA-GD can be connected to a single virtual switch (illustrated by virtual machine GA and virtual switch BJ). Multiple virtual machines can be connected to a single virtual switch, as illustrated by virtual machines GC and GD and virtual switch BK. A single virtual machine can be connected to multiple virtual switches, as illustrated by virtual machine GB and virtual switches BJ and BK. We will refer to this as 1:1, 1:N, N:1 physical to virtual mapping respectively. The functional model of virtualized computing equipment shown in FIG. 5A is depicted in FIG. 5B. A physical NIC BG, BH is represented by the symbol defined in FIG. 2I. Please note that virtual switches BJ, BK are represented as physical switch nodes and represented by the physical switch node symbol as defined in FIG. 2I, as virtual switches BJ, BK are functionally equivalent to physical forwarding equipment. The difference is in implementation as virtual switches BJ, BK are typically implemented in software rather than hardware. The physical to virtual mapping is denoted by a dashed line with virtual PoAs p117-p126 identifying the point-of-attachment of the virtual switch BJ, BK and of the virtual machine GA-GD. In typical implementations these PoAs p117-p126 are typically referred to as virtual NICs or vNICs, but other terminology can be used as well. The virtual PoAs p117-p126 identify the point-of-attachments of a physical node (virtual switch) and of a virtual node (virtual machine) of a physical to virtual mapping.

Figures 6A, 6B, 6C:
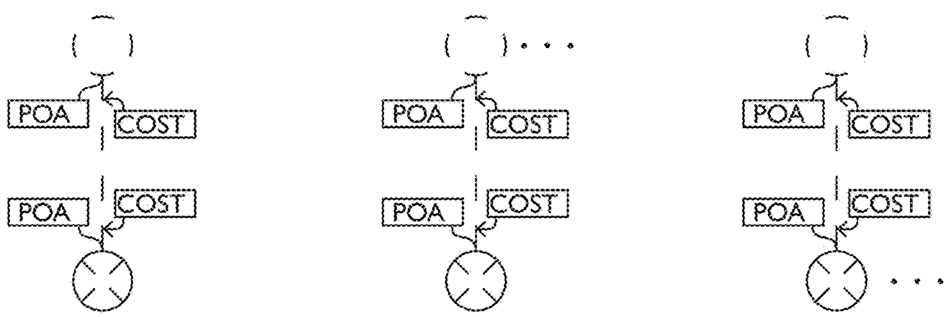
FIG. 6A is a diagram showing a functional representation of 1:1 Physical to Virtual Mapping with virtual PoA at physical node and virtual PoA at virtual node and with cost value in each direction of the mapping
FIG. 6B is a diagram showing a functional representation of 1:N Physical to Virtual Mapping with virtual PoA at physical node and virtual PoA at virtual node and with cost value in each direction of the mapping
FIG. 6C is a diagram showing a functional representation of N:1 Physical to Virtual Mapping with virtual PoA at physical node and virtual PoA at virtual node and with cost value in each direction of the mapping

FIGS. 6A-6C show the functional representation of 1:1, 1:N and N:1 physical to virtual mapping. FIG. 6A depicts 1:1 physical to virtual mapping, FIG. 6B depicts 1:N physical to virtual mapping, FIG. 6C depicts N:1 physical to virtual mapping. A physical to virtual mapping can have an optional cost value for each direction of the mapping. In case of physical server virtualization typically reference is made to 1:1, 1:N, N:1 virtualization, referring to the ratio of number of physical servers to virtual machines. Please note that in the physical to virtual mapping introduced above the ratio 1:1, 1:N, N:1 is referring to the ratio of number of virtual switches to virtual machines.

As depicted in FIG. 2H we distinguish between 2 types of virtual nodes, both being virtual machines:

Virtual switch node, with the following functionality:
a) Send packet of which it is the source node
b) Receive packet of which it is the destination node
c) Forward an incoming packet received on any of the input ports to any of the output ports (including the port on which it was received)
d) Optionally provide operation(s) on the packet, such as but not limited to monitoring and/or recording and/or buffering and/or modifying of the incoming packet header and/or payload before forwarding the packet to one or more of it's output ports. Also, not forwarding (blocking) the packet.
e) Drop packet
f) Encapsulate and redirect packet to SDN Compiler (optional)

The above mentioned virtual switch node allows for Network Functions Virtualization (NFV): a virtual switch node is implemented in a virtual machine through which traffic is forwarded. Typically, the virtual switch node would perform optional operations on the packet as mentioned at d) above.

Virtual host node, with the following functionality:
a) Send packet of which it is the source node
b) Receive packet of which it is the destination node
c) Drop packet
d) Encapsulate and redirect packet to SDN Compiler (optional)

In analogy with the physical network, we define a virtual network as a collection of virtual nodes. It is observed that we refer to 'virtual switch node' when referring to a virtual machine that has the above properties of a switch, while we refer to a 'physical switch node' when referring to the virtual switch in the virtualized physical server.

It is also observed that the virtual machines depicted in FIG. 5B and FIGS. 6A, 6C can either be a virtual switch node or a virtual host node. As such, the crosses symbol representing a switch and the circle symbol representing a host node are omitted in these figures.

Virtual machine GH, virtual switches BR, BS, and NICs BP, BQ are accommodated in one computing equipment. Virtual switch BU, and NIC BT are accommodated in another computing equipment. Virtual machine GJ is accommodated in both instances of computing equipment. Examples of connections are shown via links between respective PoAs p133-p153.

Figure 7A:
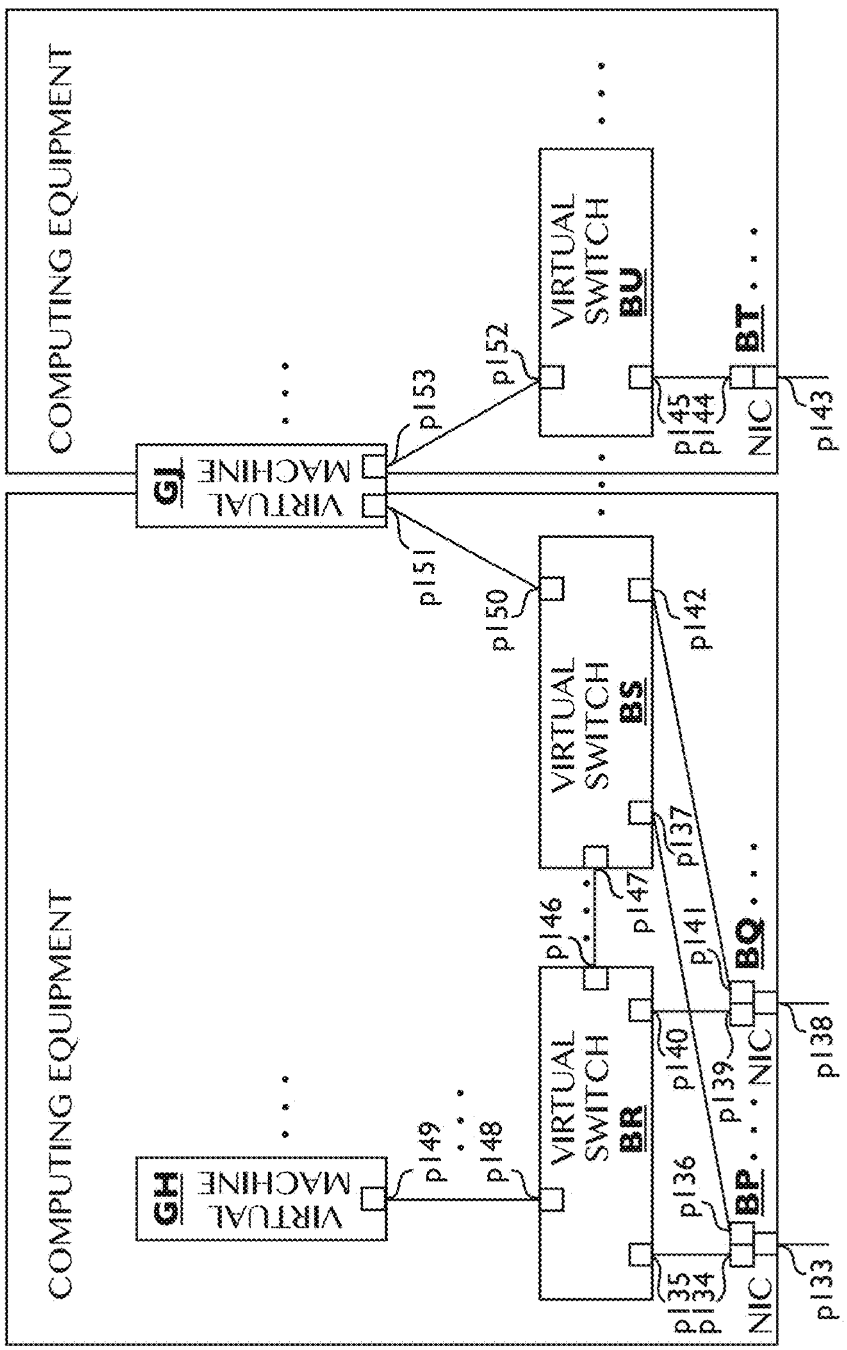
FIG. 7A is a diagram showing a physical representation of Virtualized Computing Equipment, illustrating additional aspects

FIG. 7A illustrates some additional properties of virtualized computing equipment. FIG. 7A shows two virtual machines GH, GJ, three virtual switches BR, BS, BU, and three NICs BP, BQ, BT. As illustrated by PoAs p146 and p147, virtual switches can be interconnected, represented by a physical link in FIG. 7B. Note this interconnection is represented by a physical link as a virtual switch is represented by a physical switch node. As illustrated by virtual machine GJ, a virtual machine can be connected to multiple virtual switches each residing in different computing equipment instances. For redundancy purposes virtual switches are typically connected to multiple NICs. To make efficient use of the NIC resources and physical links to other computing equipment or packet forwarding systems, multiple virtual switches can be connected to a single NIC. The NIC now acts as a coupler/splitter forwarding packets from multiple input ports (identified by multiple PoAs) to a single output port (identified by a single PoA), and from a single input port to multiple output ports. In FIG. 7A the physical NIC nodes BP and BQ provide this coupler/splitter functionality: they are both connected to two virtual switches BR, BS. We refer to this type of NIC as 'NIC coupler/splitter'.

Figure 7B:
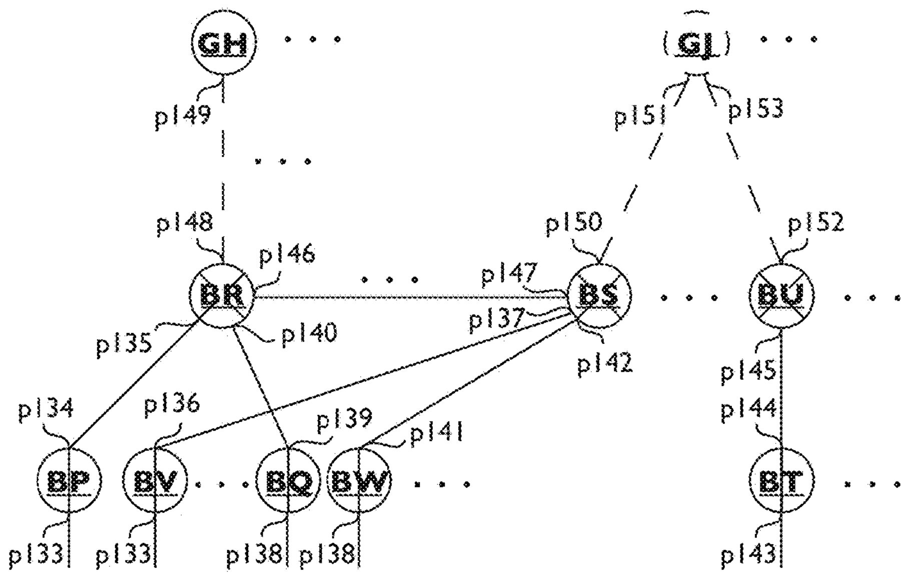
FIG. 7B is a diagram showing a functional representation Virtualized Computing Equipment, illustrating additional aspects

FIG. 7B depicts a functional representation of the virtualized computing equipment shown in FIG. 7A. The functional representation of NIC coupler/splitter is explained below. it is observed that the NIC has no switching capability, but provides a fixed relationship between input port(s) and output port(s). This is depicted in FIGS. 8A-8C and 9A-9C.

Figure 8A:
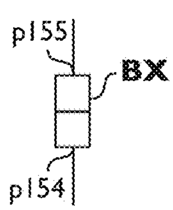
FIG. 8A is a diagram showing a physical representation of a Network Interface Card (NIC)
Figure 8B:
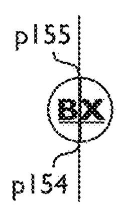
FIG. 8B is a diagram showing a functional representation of a NIC
Figure 8C:
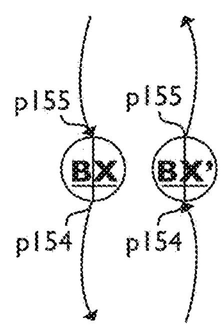
FIG. 8C is a diagram showing a directed graph representation of a NIC

FIG. 8A shows a NIC BX with PoAs p154 and p155. The functional model is shown in FIG. 8B. Incoming packets at PoA p154 are forwarded to PoA p155 and incoming packets at PoA p155 are forwarded to PoA p154. The representation in a directed graph of a NIC is given in FIG. 8C. NIC Node BX has been split into 2 nodes BX and BX' in FIG. 8C to represent its functionality: the NIC node is forwarding packets from a fixed input port to a fixed output port in either direction.

Figure 9A:
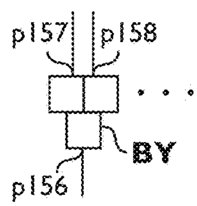
FIG. 9A is a diagram showing a physical representation of a NIC Coupler/Splitter
Figure 9B:
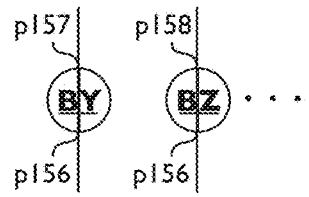
FIG. 9B is a diagram showing a functional representation of a NIC Coupler/Splitter
Figure 9C:
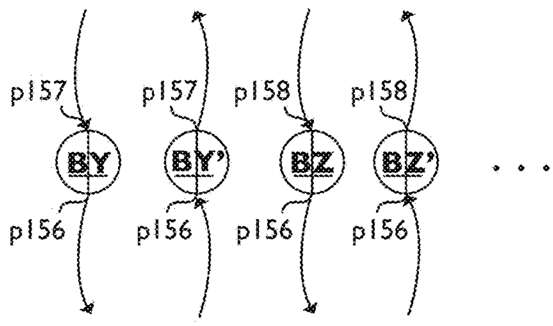
FIG. 9C is a diagram showing a directed graph representation of a NIC Coupler/Splitter

The NIC acting as a coupler/splitter is depicted in FIGS. 9A-9C. FIG. 9A shows a 1:2 NIC coupler/splitter BY with three PoAs p156, p157 and p158. Incoming packets at PoA p156 are forwarded to both PoA p157 and PoA p158, incoming packets at PoA p157 are forwarded to PoA p156, incoming packets at PoA p158 are forwarded to PoA p156. We model this as 2 nodes BY and BZ in the functional model in FIG. 9B, each providing a one-to-one forwarding relationship between PoA p156, PoA p157 and PoA p156, PoA p158 respectively. A 1:N NIC coupler/splitter will result in N individual nodes in the functional model. NIC coupler/splitter nodes BP and BQ are represented by nodes BP, BV and BQ, BW in the functional representation of FIG. 7B. In case a Network Interface Card would be used that provides switching capabilities it would be modeled as a physical switch node. The NIC is situated at the boundary of the computing equipment and provides connectivity between the resources outside the computing equipment and resources within the computing equipment. As explained in FIG. 2H, the NIC is never a source or destination node of packets. The directed graph of a NIC acting as a coupler/splitter is given in FIG. 9C. Similar to the NIC of FIG. 8A, the NIC acting as coupler/splitter of FIG. 9A represented by nodes BY and BZ is now represented by nodes BY, BY', BZ, BZ'. In FIGS. 2G, 3C, 4C, 8C, 9C a directed graph representation of physical nodes is shown. The exact same representation in directed graphs applies to virtual and logical nodes as well, with this exception that virtual and logical nodes are not NIC-type nodes.

The virtual switch node capability described above to optionally provide operation(s) on the packet, such as but not limited to monitoring and/or recording and/or buffering and/or modifying of the incoming packet header and/or payload before forwarding the packet to one or more of it's output ports, as well as not forwarding (blocking) the packet. Today, this functionality is typically provided by dedicated hardware devices, referred to as middle-boxes, such as but not limited to firewalls, deep packet inspection devices and caching nodes. Realizing this functionality in a virtual switch node will create benefits for example but not limited to reduced equipment costs, reduced operational costs, faster provisioning of network services. In the industry this is referred to as Network Functions Virtualization (NFV). The SDN compiler provides the relevant instructions to the virtual switch node. The NFV functions could be realized in a virtual switch node implemented in virtualized computing equipment.

As mentioned above, we consider Software Defined Networking as the capability to define a network in a high-level specification (such as, but not limited to, a high-level programming or scripting language) and through an automated process instructing the appropriate physical and virtual networking and computing resources in accordance with this specification. By now, we have provided a functional model of the physical and virtual networking and computing resources. Now, to illustrate the present invention, we consider a logical network that can be defined in a high-level specification and is independent from physical and virtual resources.

Figure 10A:
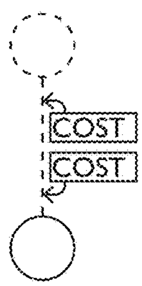
FIG. 10A is a diagram showing a functional representation of 1:1 Physical to Logical Mapping with cost value in each direction of the mapping
Figure 10B:
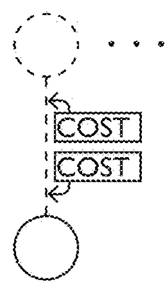
FIG. 10B is a diagram showing a functional representation of 1:N Physical to Logical Mapping with cost value in each direction of the mapping
Figure 10C:
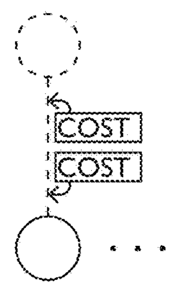
FIG. 10C is a diagram showing a functional representation of N:1 Physical to Logical Mapping with cost value in each direction of the mapping
Figure 10D:
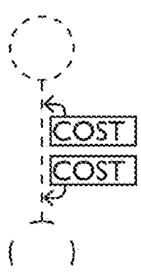
FIG. 10D is a diagram showing a functional representation of 1:1 Virtual to Logical Mapping with cost value in each direction of the mapping
Figure 10E:
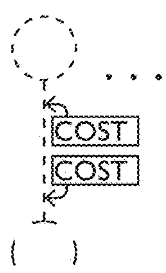
FIG. 10E is a diagram showing a functional representation of 1:N Virtual to Logical Mapping with cost value in each direction of the mapping
Figure 10F:
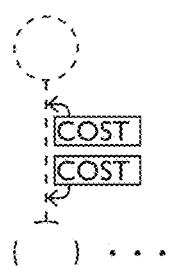
FIG. 10F is a diagram showing a functional representation of N:1 Virtual to Logical Mapping with cost value in each direction of the mapping
Figure 10G:
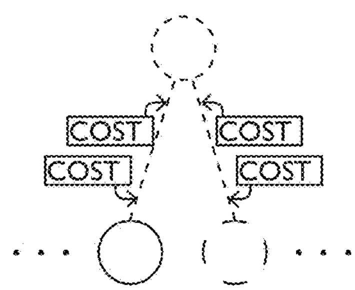
FIG. 10G is a diagram showing a functional representation of N:1 Physical and Virtual to Logical Mapping with cost value in each direction of the mapping

The logical network is defined by specifying:

1. Name of the logical network
2. Name of the logical nodes of which the logical network consists
3. Adjacencies between logical nodes
4. One or more Cost Types of the logical network
5. Cost(s) of logical adjacencies between logical nodes for each Cost Type
6. Forwarding policy of logical network, which will be explained below
7. Mapping from physical and/or virtual nodes to logical nodes The physical and/or virtual nodes as explained above are mapped to logical nodes using a 1:1, 1:N or N:1 mapping. This is depicted in FIGS. 10A-10G, as follows:

FIG. 10A: 1:1 physical to logical mapping
FIG. 10B: 1:N physical to logical mapping
FIG. 10C: N:1 physical to logical mapping
FIG. 10D: 1:1 virtual to logical mapping
FIG. 10E: 1:N virtual to logical mapping FIG. 10F: N:1 virtual to logical mapping FIG. 10G: N:1 physical and virtual to logical mapping The functional representation of a logical node is a dashed circle, as depicted in FIG. 11B. A physical/virtual to logical mapping can have an optional cost value for each direction of the mapping.

The user of the SDN Compiler defines the logical network. The user could be, but is not limited to, a person, a network management system, a cloud management system, an application, another SDN Compiler. The logical network can consist of an arbitrary number of logical nodes, with arbitrary logical adjacencies, resulting in an arbitrary logical topology. As an example the logical network could be specified as a graph in a high-level programming language, with the physical and/or virtual node(s) to which the logical node has been mapped being an attribute of each logical node.

For the logical nodes, we use a logical name space that is independent from the namespace of the physical and virtual resources. The logical network can now be defined in terms of logical node names, which may be expressed in any suitable form with any suitable number of unique characters and are mapped to the appropriate virtual and physical resources as required. By changing this mapping, the logical network can be re-mapped to other virtual and physical resources.

1:N physical to logical mapping allows for naming a single physical resource with multiple logical names. 1:N virtual to logical mapping allows for naming a single virtual resource with multiple logical names. Please note that the logical network is independent from the physical network and virtual resources, of course with the constraint a path exists between physical and virtual resources, and as such provides an abstraction of the physical network and virtual resources.

Figure 11A:
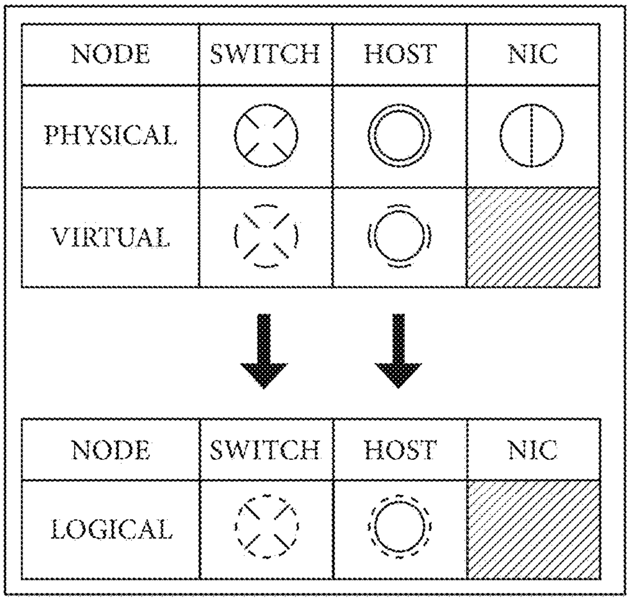
FIG. 11A is a table depicting the mapping of physical and virtual switch node to logical switch node, mapping of physical and virtual host node to logical host node
Figure 11B:
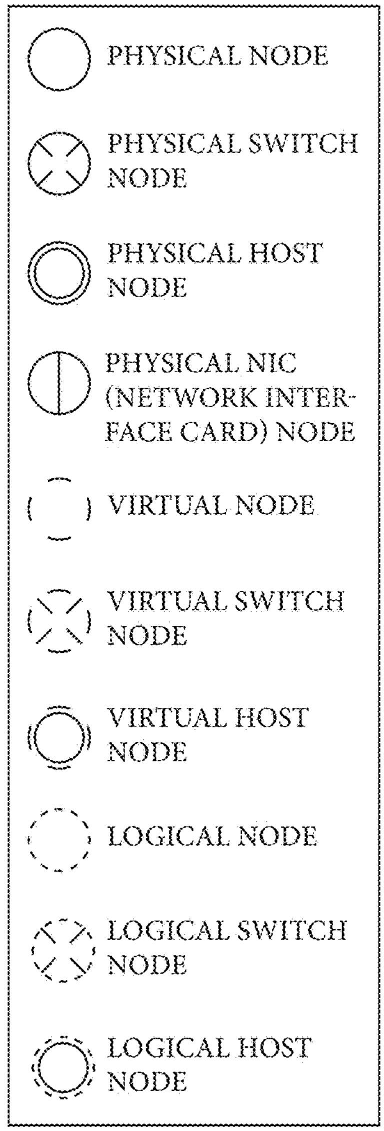
FIG. 11B is a diagram depicting the functional representation and symbols used for physical, virtual and logical nodes of various node types

As depicted in FIG. 11A we distinguish between 2 types of logical nodes:

- Logical switch node, with the same functionality of the physical and/or virtual switch node it is mapped to.
- Logical host node, with the same functionality of the physical and/or virtual host node it is mapped to.

As depicted in FIG. 11A, a logical switch node is the result of a mapping of physical and/or virtual switch node(s) to a logical node. A logical host node is the result of a mapping of physical and/or virtual host node(s) to a logical node. A physical NIC is not mapped to an entity in the logical network. The complete list of node types and symbols is summarized in FIG. 11B.

Figure 12:
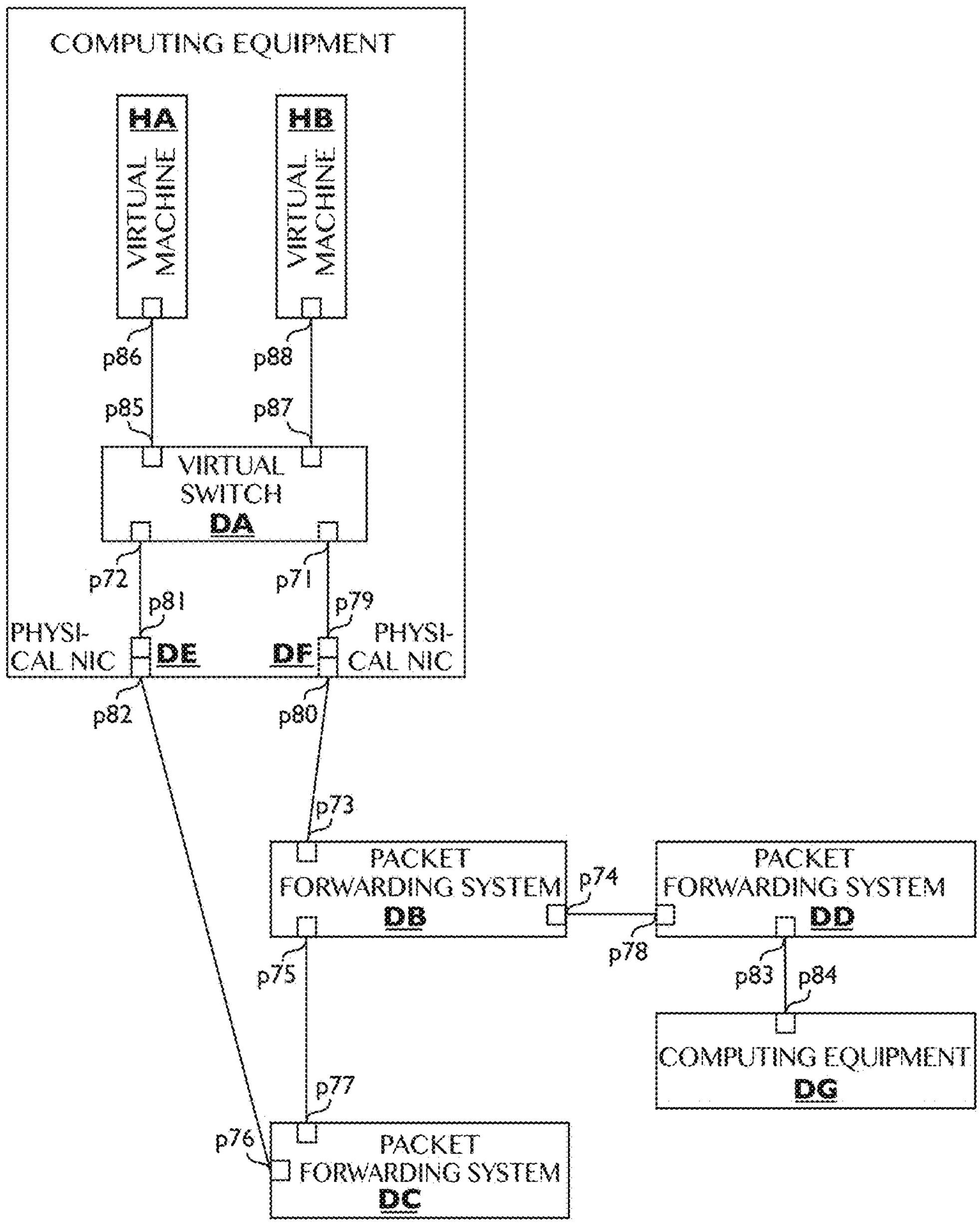
FIG. 12 is a diagram showing a physical representation of an example network

The above modeling of nodes is illustrated by the modeling of the network shown in FIG. 12, consisting of 3 packet forwarding systems DB, DC, DD, one virtualized computing equipment with virtual switch DA, NICs DE and DF and virtual machines HA and HB and one non-virtualized computing equipment DG.

Packet forwarding system DB is connected via a link at a PoA p75 to a PoA p77 at packet forwarding system DC, and via a link at a PoA p74 to a PoA p78 at packet forwarding system DD. Packet forwarding system DB is connected via a link at a PoA p73 to a PoA p80 of a physical NIC DF of the computing equipment. Packet forwarding system DC is connected via a link at a PoA p76 to a PoA p82 of a physical NIC DE of the computing equipment.

Packet forwarding system DD is connected via a link at a PoA p83 to a PoA p84 at computing equipment DG.

The virtual switch DA is connected via a link at a PoA p72 to a PoA p81 at physical NIC DE. The virtual switch DA is also connected via a link at a PoA p71 to a PoA p79 at physical NIC DF.

The virtual machine HA is connected via a link at a PoA p86 to a PoA p85 at virtual switch DA. The virtual machine HB is connected via a link at a PoA p88 to a PoA p87 at virtual switch DA.

Figure 13A:
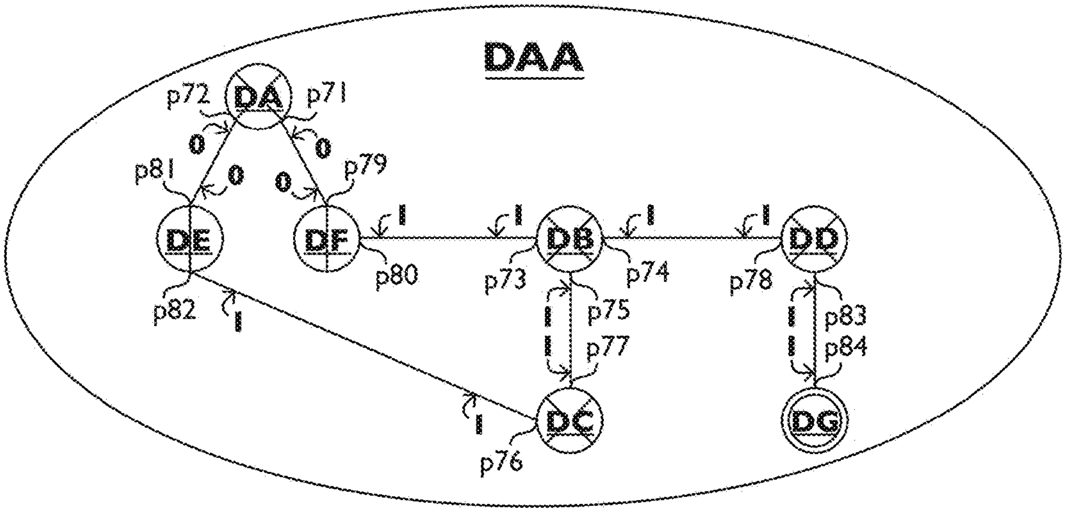
FIG. 13A is a diagram showing a functional representation of physical network DAA

The functional representation of all physical nodes is shown in FIG. 13A, according to the approach explained above. In FIG. 13A, the weights of the various links have been added for each direction of the bi-directional link. The collection of these physical nodes is referred to as physical network DAA. Note that the virtual switch DA is a physical switch node in the functional representation of FIG. 13A. The weighted directed graph representation of the network of FIG. 13A is given in FIG. 13B. FIG. 14A depicts the physical to virtual mapping between physical node DA and virtual nodes HA and HB, which is the only physical to virtual mapping in network DAA. Note that PoAs p85 through p88 are virtual PoAs. Also note that the cost of both mappings is zero in both directions. In the example here, virtual machine HA provides functionality of a virtual host node, while virtual machine HB provides functionality of a virtual switch node. We refer to the collection of virtual nodes HA and HB as virtual network HAA, as depicted in FIG. 14B. We will use this example to explain the mapping of a logical network onto the virtual and physical resources.

Figure 15A:
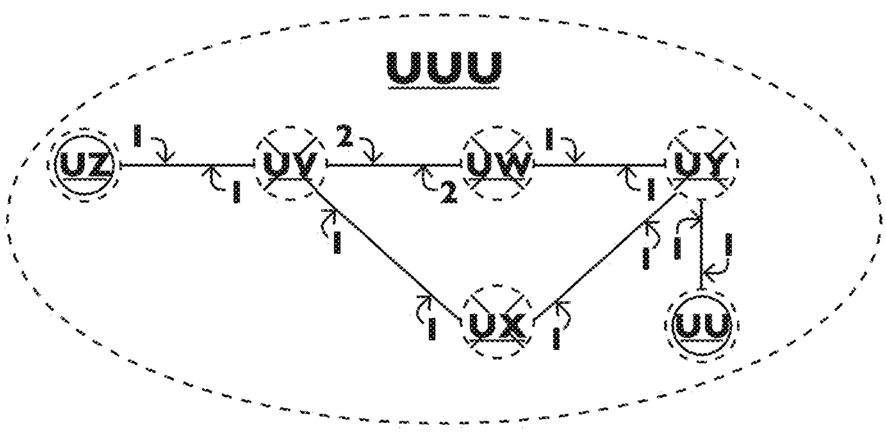
FIG. 15A is a diagram showing a functional representation of logical network UUU

FIG. 15A depicts an example logical network UUU, consisting of logical nodes UU, UV, UW, UX, UY and UZ. The name of the logical node is used to make forwarding decisions upon. Please note that the logical node itself is named, not its interfaces. In analogy with the physical network, we define a logical network (identified with UUU in FIG. 15A) as a collection of logical nodes. Logical nodes are interconnected by logical links (denoted by a solid line). In case a logical link is bidirectional, a logical link creates a pair of adjacencies between a pair of logical nodes. In case a logical link is unidirectional, a logical link creates a single adjacency between a pair of physical nodes. The set of logical nodes combined with the set of logical links determines the logical topology of the network. Each logical link has one or multiple cost types and cost value(s) associated with each cost type. Each bidirectional logical link has 2 cost values for each cost type, one for each direction. Each unidirectional logical link has 1 cost value for each cost type. The cost value of a logical link in a particular direction is shown closest to the logical node from which the packets originate for that particular direction.

While a logical link denotes the adjacency-relationship(s) between a pair of logical nodes, a logical path denotes a logical route a packet follows from a logical source node to a logical destination node, in case of unicast networking. In case of multi-cast or broadcast networking there are logical path relationships between a single logical source node and multiple logical destination nodes. Logical paths can have multiple cost types in each direction with typically a cost value equal to the sum of the cost values of that particular cost type in that particular direction of the logical links it consists of.

Figure 15B:
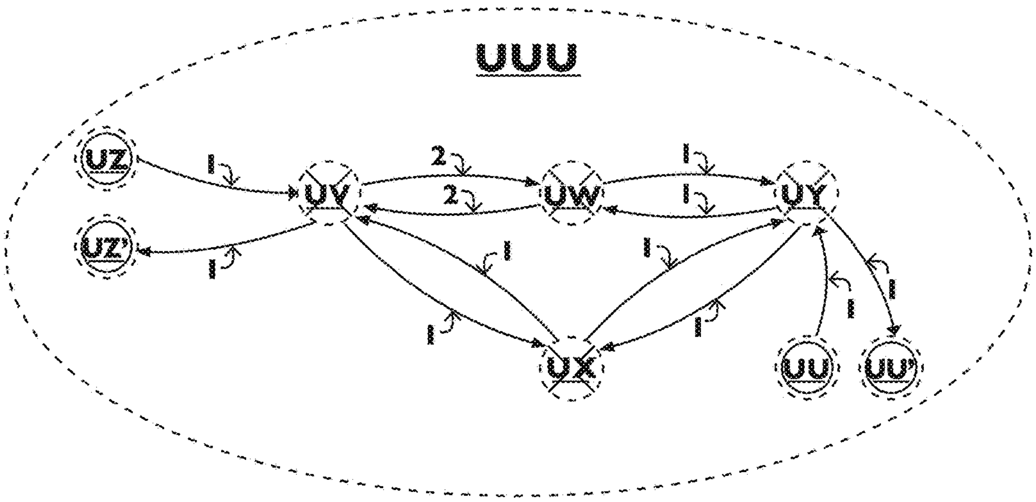
FIG. 15B is a diagram showing a weighted directed graph representation of logical network UUU
Figure 15C:
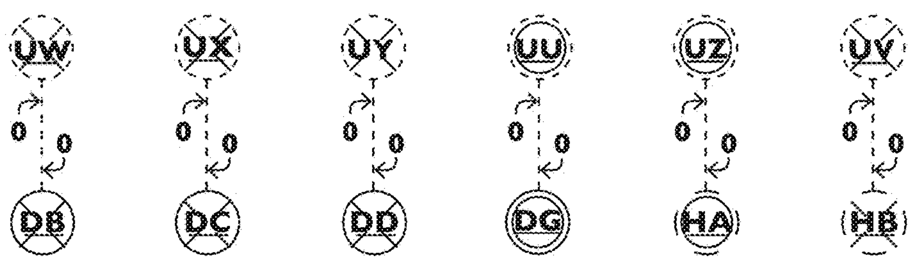
FIG. 15C is a diagram showing a functional representation of mapping from physical nodes in network DAA and virtual nodes in network HAA to logical nodes in network UUU with mapping cost value of zero for all mappings in both directions

A logical path is a sequence of physical PoAs and/or virtual PoAs through which the packet traverses from logical source node to logical destination node. Here we have arrived at an important relationship: a relationship between logical source and logical destination nodes and a path described in terms of physical and virtual PoA's. This will allow us to define a network in logical node names and translate (compile) the defined network into instructions in terms of physical and/or virtual PoAs for the physical and/or virtual networking and/or computing resources. The weighted directed graph representation of logical network UUU is shown in FIG. 15B. The mapping between physical and virtual nodes to logical nodes is depicted in FIG. 15C. Please note that the cost of all mappings between the physical/virtual nodes and the logical nodes is zero.

Figure 16:
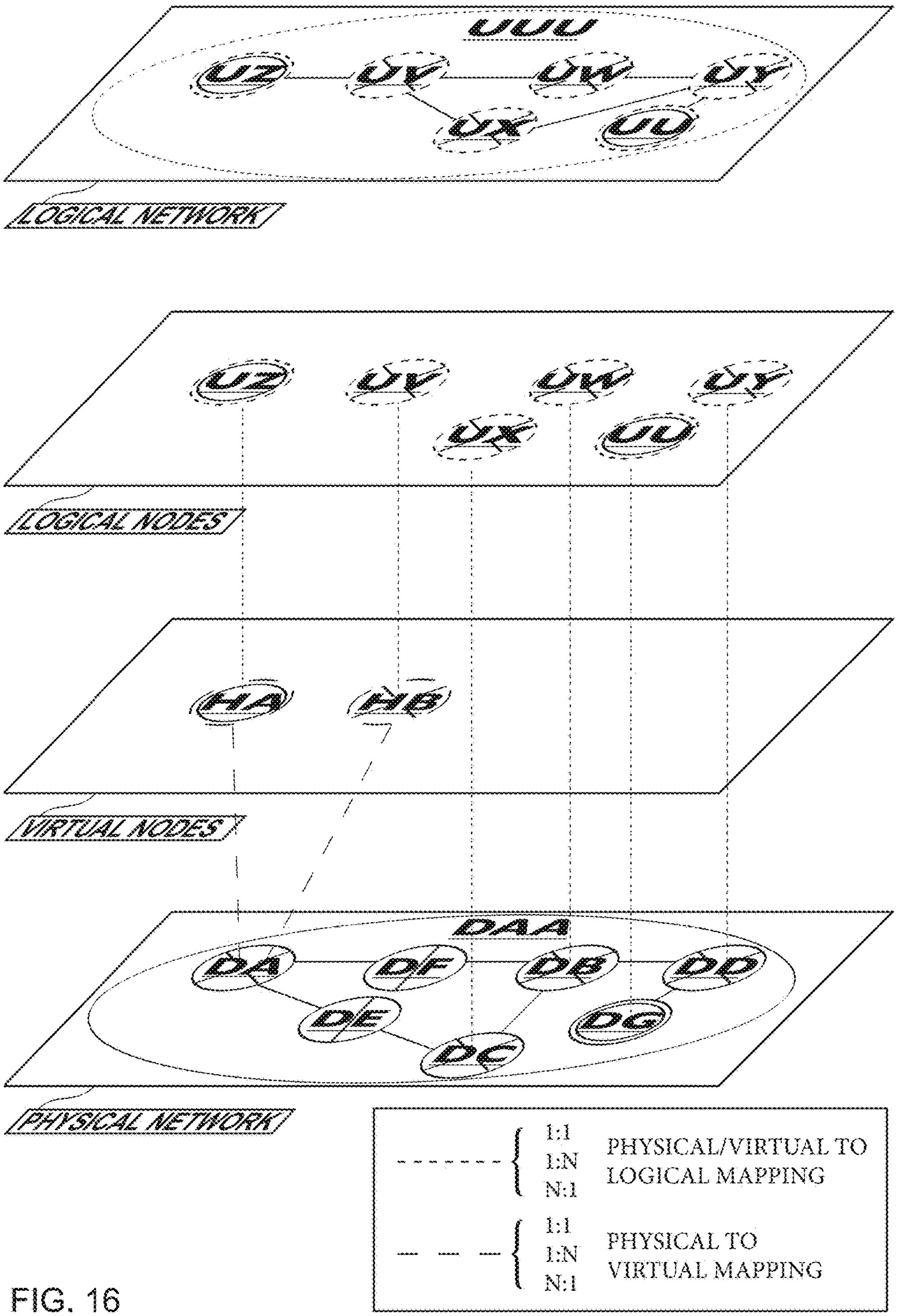
FIG. 16 is a diagram showing a functional representation of physical nodes DA through DG, physical network DAA, virtual nodes HA and HB, logical nodes UU through UZ and logical network UUU as well as the mapping from physical to virtual nodes and physical/virtual to logical nodes

FIG. 16 summarizes the relationship between physical, virtual, logical nodes and physical and logical networks for the example given in FIGS. 12, 13A, 13B, 14A, 14B and 15A-15C. At the bottom of FIG. 16 physical network DAA is shown. The physical network DAA comprises the nodes DA through DG with their physical links and physical PoAs as shown. Two virtual machines named HA (virtual host node) and HB (virtual switch node) are mapped to physical node DA (1:2 physical to virtual mapping). Logical nodes UU, UV, UW, UX, UY, UZ are mapped to respectively physical node DG, virtual node HB, physical nodes DB, DC, DD and virtual node HA through a 1:1 physical and/or virtual to logical mapping. We will refer to physical and/or virtual to logical mapping as 'physical/virtual to logical mapping'. The logical network UUU comprises the logical nodes UU through UZ with the logical links as shown in FIG. 15.

As physical NIC nodes do not send packets of which it is the source node or receiving packets of which it is the destination node (see FIG. 2H), no physical/virtual to logical mapping can be done on NIC nodes. Hence, node DE and node DF being physical NIC nodes, no physical/virtual to logical mapping is done for node DE and node DF. Please note that no physical/virtual to logical mapping is done on physical node DA. This is a choice for this particular example, there could also have been a physical/virtual to logical mapping on physical node DA. This illustrates that also a physical/virtual to logical mapping need not necessarily be done on a physical or virtual switch or host node. This example only shows 1:1 physical/virtual to logical mapping to keep the example relatively simple. In a similar way 1:N or N:1 physical/virtual to logical mapping could have been used. In general, the number of nodes in a logical network is independent from the number physical and virtual nodes it was mapped to. Note that the topology of logical network UUU differs from the topology of physical network DAA even between nodes that are mapped with a 1:1 physical/virtual to logical mapping. E.g. in logical network UUU there is no link between logical node UW and logical node UX, while there is a link between physical node DB and physical node DC in physical network DAA, while logical node UW is mapped to physical node DB and logical node UX is mapped to physical node DC. Also, in logical network UUU there is a link between logical node UX and logical node UY, while there is no link between physical node DC and physical node DD in physical network DAA, while logical node UX is mapped to physical node DC and logical node UY is mapped to physical node DD. This illustrates an important property of a logical network: the links in the logical network are independent from the links in the physical network and the mapping from physical to virtual nodes.

Furthermore, the cost of the adjacencies in the logical network can differ from the cost of the same adjacencies in the physical network. This allows for forwarding of packets along a particular path in the logical network that is different from the forwarding policy specified in the physical network. This is illustrated by using a cost value of 2 in both directions on the link between logical node UV and logical node UW (cf. FIG. 15B). The ability to forward packets along a particular path in the logical network that is different from the forwarding policy specified in the physical network is very useful when virtual machines acting as virtual switch nodes are used to provide operation(s) on the packet, such as but not limited to monitoring and/or recording and/or buffering and/or modifying of the incoming packet header and/or payload, or not forwarding (blocking) the packet. By selecting the appropriate cost values for the adjacencies in the logical network and applying a forwarding policy within the logical network, paths can be created between logical source and logical destination nodes that traverse particular virtual machine acting as virtual switch nodes performing certain functions other than forwarding on the packet.

For completeness, we summarize the physical, virtual and logical elements.

Physical Elements:
Physical network
Physical switch node
Physical host node
Physical NIC node
Physical PoA
Physical link
Physical path
Virtual Elements:
Virtual network
Virtual switch node
Virtual host node
Virtual PoA
Logical Elements:
Logical network
Logical switch node
Logical host node
Logical link
Logical path The relationship between the adjacencies in a network and the paths in a network is determined by the forwarding policy of the particular network. In essence, the forwarding policy of a network provides a translation of the adjacencies in the network to a set of forwarding paths. Examples of typical policies, but not limited to, used in networking are:

Shortest Path First (SPF)
Firewall (no path allowed)
Specified Path (specifying all nodes in a path)
Load-Balancing Multiple policies can be combined into an overall policy.

As we define the network in terms of logical components, packet forwarding decisions will be based on logical node names. Physical and virtual nodes are named solely for the purpose of identifying physical and virtual resources. Never is the physical or virtual node name used in a forwarding decision.

Figure 17:
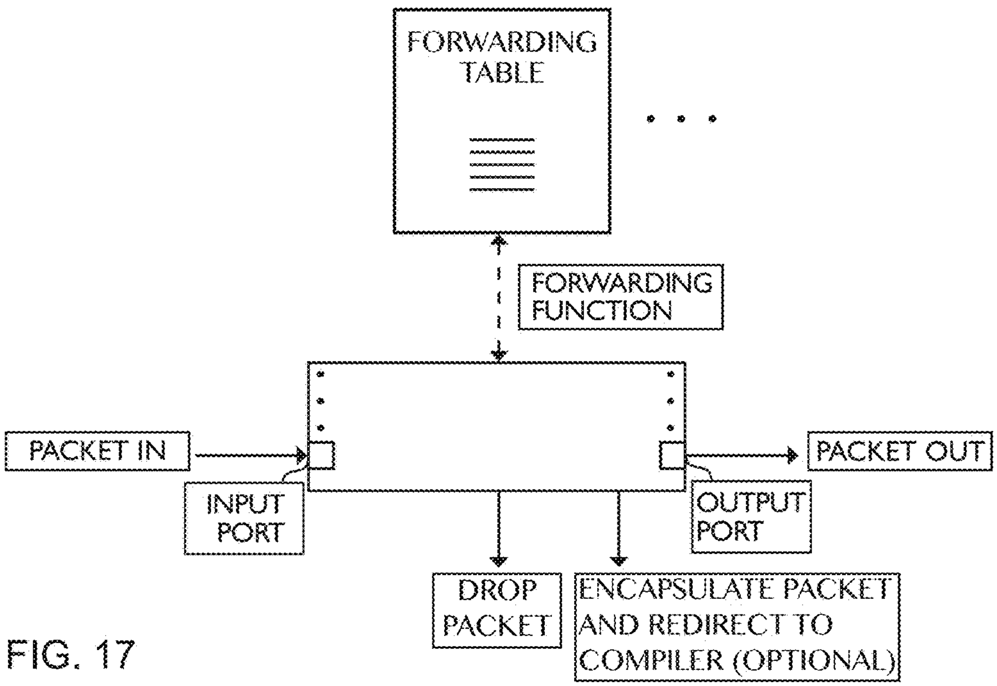
FIG. 17 is a diagram depicting packet forwarding

FIG. 17 depicts packet forwarding in a packet forwarding system. Packet forwarding is described by:

output port=forwarding function f (logical source node, logical destination node, input port, load-balancing identifier)

in which:

Forwarding function f: Local forwarding function provided by a lookup against the forwarding table(s)

Logical source node: Logical node from which the packet is originating, as stated in the header of the incoming packet.

Logical destination node: Logical node for which the packet is destined, as stated in the header of the incoming packet.

Input Port: Physical or virtual PoA at which the packet enters the forwarding node Output Port: Physical or virtual PoA to which the packet is forwarded to.

Load-Balancing identifier: optional identifier for load-balancing purposes.

Each entry in the forwarding table contains: logical source node, logical destination node, input port, optional load-balancing identifier, output port. In case a particular element is not relevant for the forwarding decision (e.g. logical source node) a '*' (asterisk) is used as a wildcard symbol. Alternative terminology for a 'forwarding table' is a 'flow table', e.g. the OpenFlow specification uses the terminology 'flow table'.

In case of a unicast each entry specifies a single output port to which the packet is forwarded. In case of multicast or broadcast the incoming packet is forwarded to multiple output ports.

The local forwarding function f provides the relationship between logical node names (logical source node, logical destination node) and the physical and/or virtual output port to forward to. This relationship is crucial as it allows for the definition and creation of a network in terms of logical components, translating into physical and virtual output ports. Also, packets can be dropped or can optionally be encapsulated and redirected to the SDN Compiler.

Figure 18A:
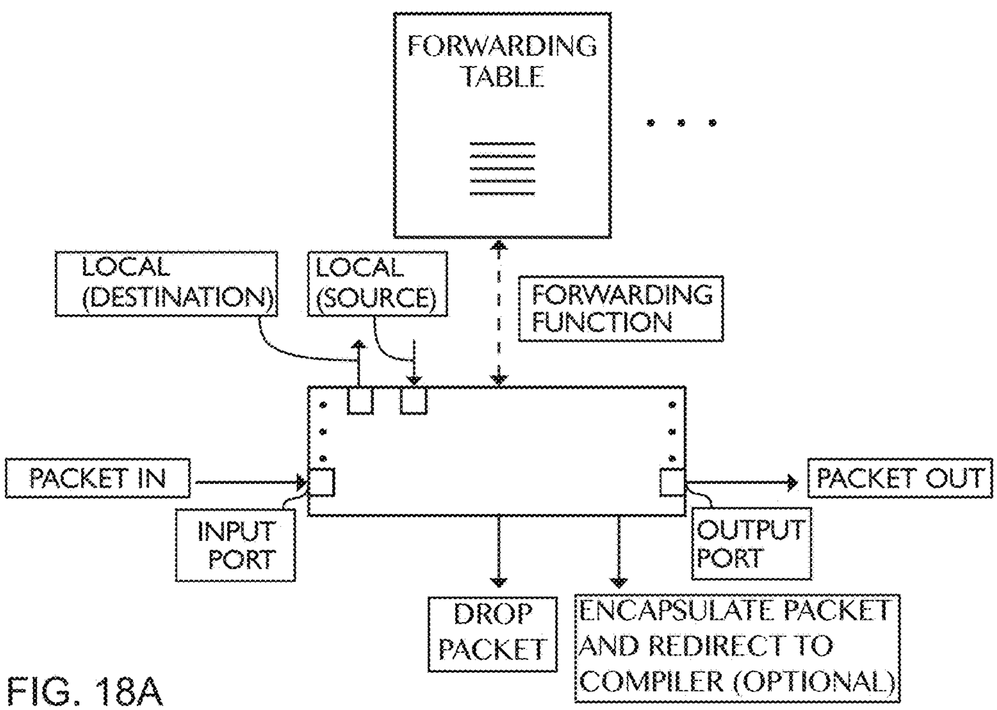
FIG. 18A is a diagram of a switch node performing only a packet forwarding function

The forwarding behavior of the three different types of nodes we have considered, i.e. switch node, host node and NIC node, are depicted in FIGS. 18A, 18B, 19, 20A-20C respectively. FIG. 18A depicts a physical or virtual switch node with the capability to:

a) Send packets of which it is the source node to any of the output ports based on the forwarding function f b) Receive packets of which it is the destination node based on the forwarding function f c) Forward an incoming packet received on any of the input ports to any of the output ports (including the port on which it was received) based on the forwarding function f.

Figure 18B:
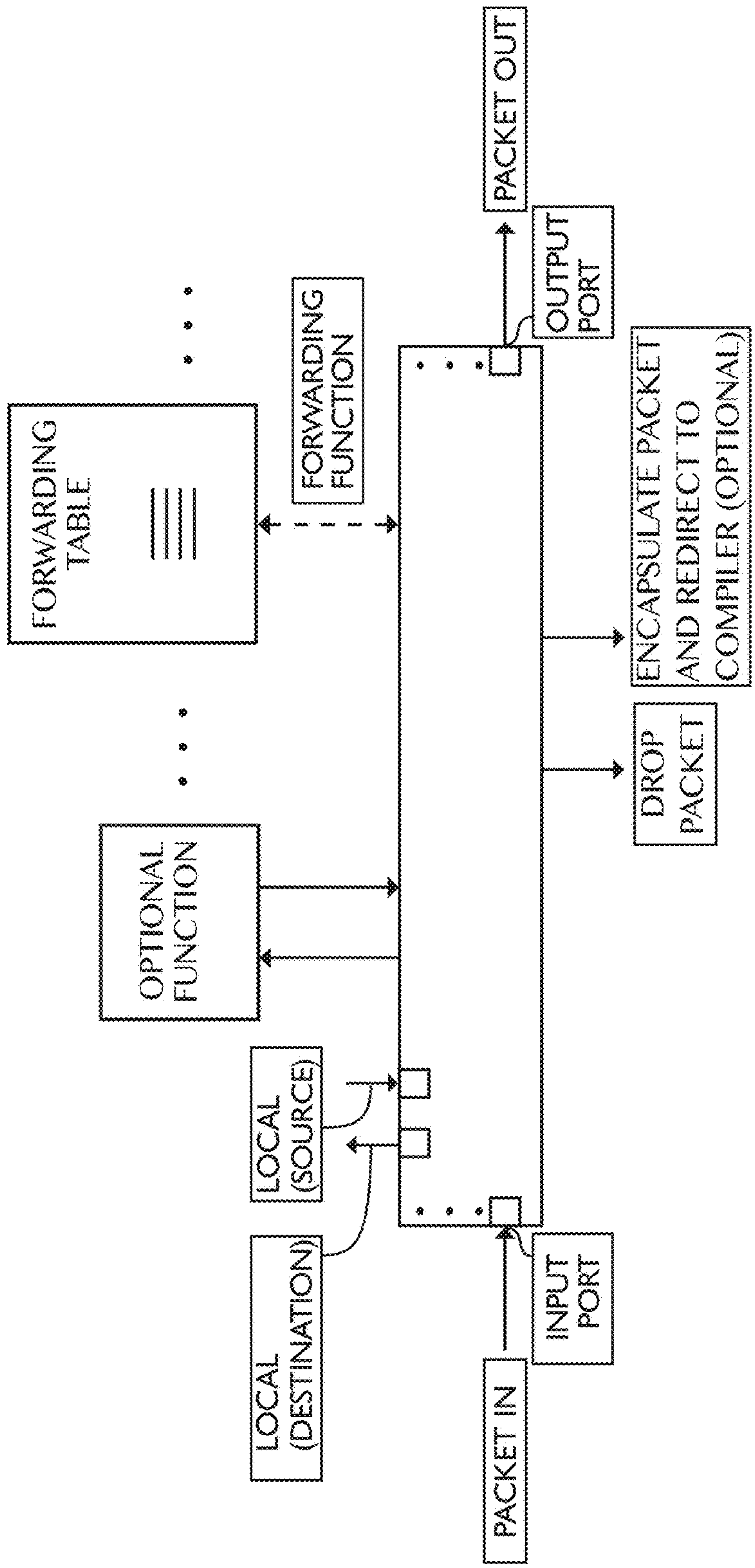
FIG. 18B is a diagram of a switch node performing a packet forwarding function as well as optional function(s)

In case no match is found in the forwarding table lookup the packet is dropped and/or optionally encapsulated and redirected to the SDN compiler. FIG. 18B depicts a switch node providing the capabilities of the switch node of FIG. 18A and additionally the ability to:

d) Optionally provide operation(s) on the packet, such as but not limited to monitoring and/or recording and/or buffering and/or modifying of the incoming packet header and/or payload before forwarding the packet to one or more of it's output ports or not forwarding (blocking) the packet. This is referred to as an 'optional function' in FIG. 18B. A switch node can perform multiple optional functions.

Please note although at a) and b) above packets are not forwarded, we still refer to a 'forwarding function', to have a single function to refer to.

Figure 19:
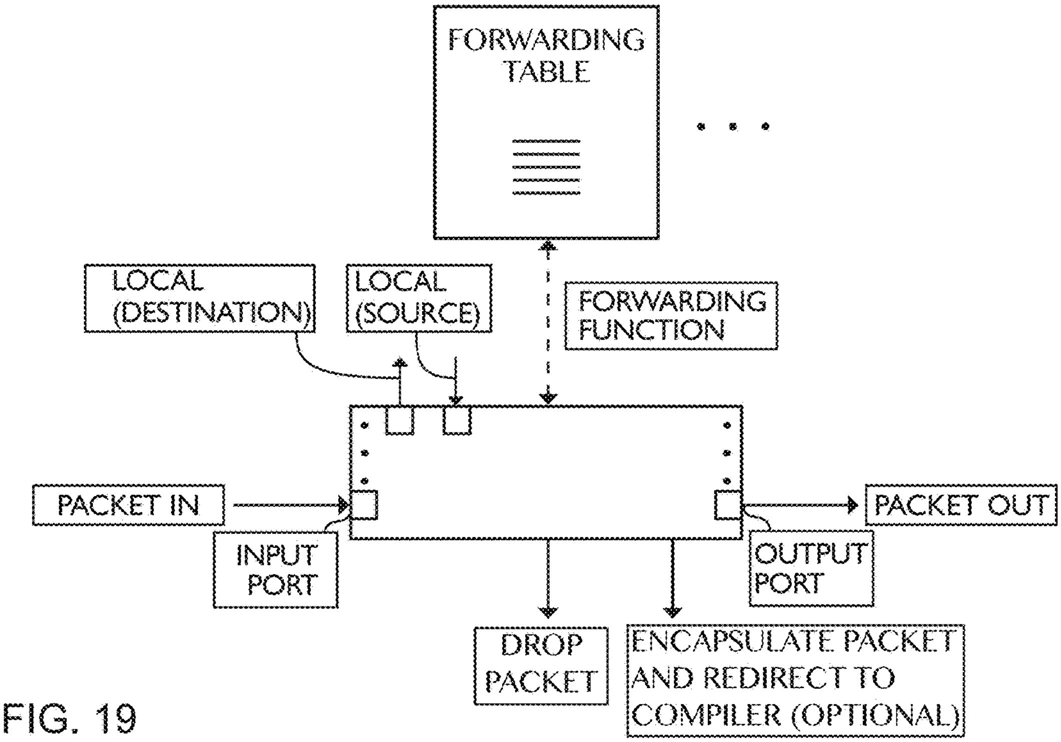
FIG. 19 is a diagram of a host node

FIG. 19 depicts a physical or virtual host node with the capability to:

a) Send packets of which it is the source node to any of the output ports based on the forwarding function f b) Receive packets of which it is the destination node based on the forwarding function f In case no match is found in the forwarding table lookup the packet is dropped and/or optionally encapsulated and redirected to the SDN compiler. The physical or virtual host node does not provide any forwarding of packets. We will however refer to the function f as a forwarding function also in case of a host node to be consistent in naming of this function irrespective of node type. In case of a host node the forwarding function f specifies to which output port packets originating from the host node destined for a particular node should be sent. Also it specifies whether incoming packets should be received or dropped.

Figure 20A:
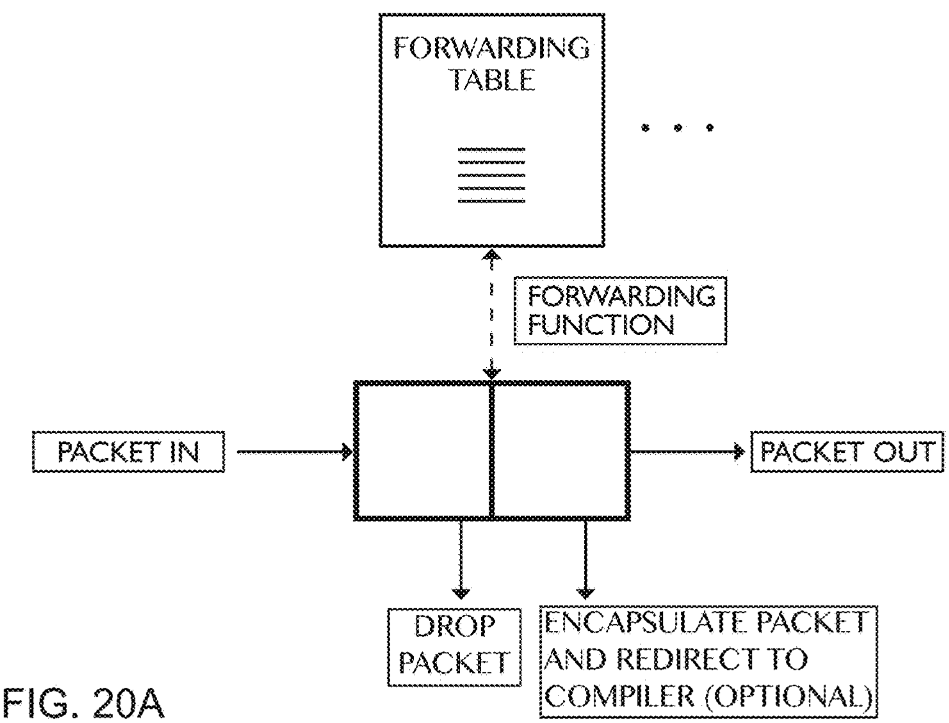
FIG. 20A is a diagram of a NIC node, showing a 1:1 relationship between input and output port
Figure 20B:
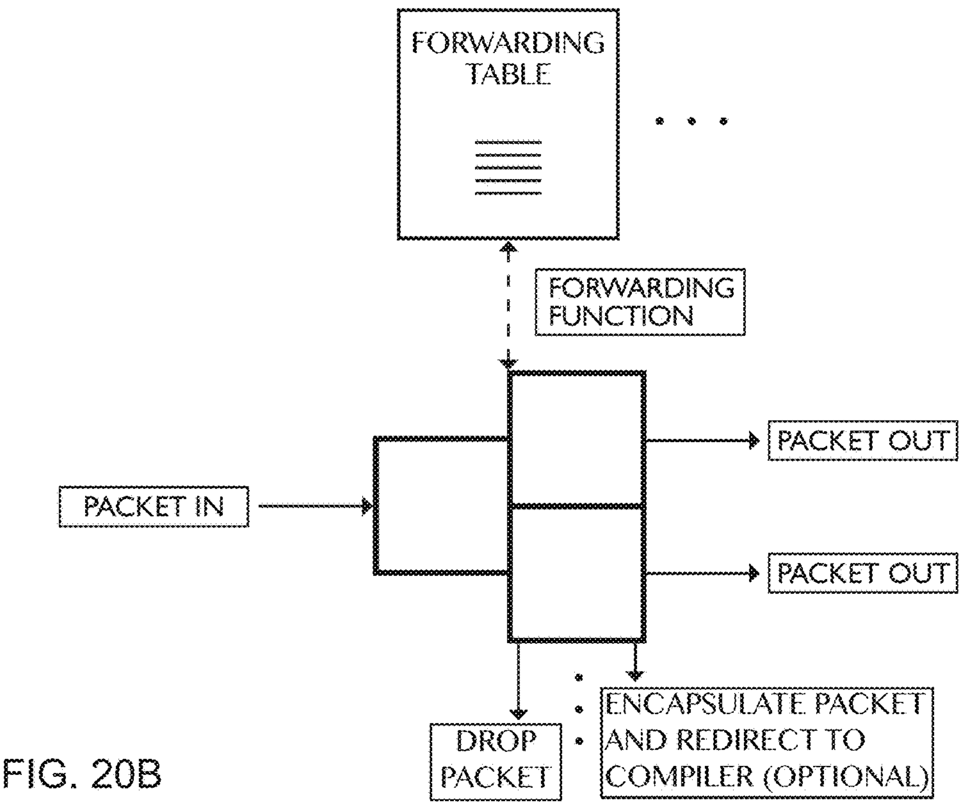
FIG. 20B is a diagram of a NIC Coupler/Splitter node with packet forwarding from single input to multiple outputs, showing a 1:N relationship between input port and output ports
Figure 20C:
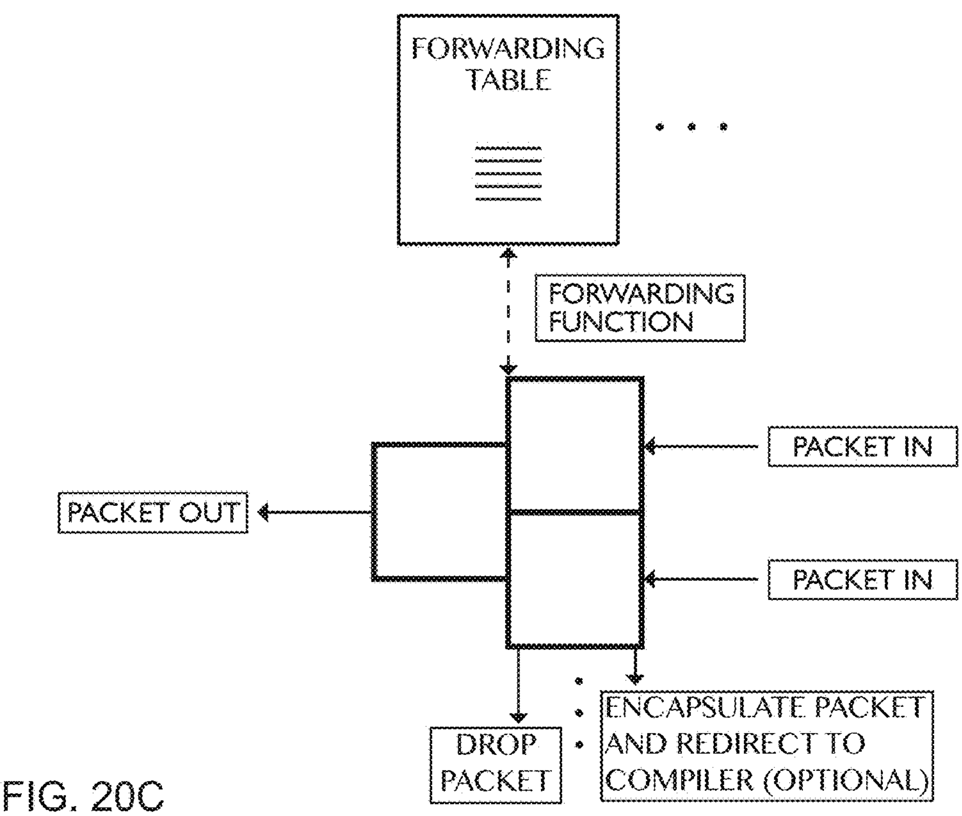
FIG. 20C is a diagram of a NIC Coupler/Splitter node with packet forwarding from multiple inputs to single output, showing a N:1 relationship between input ports and output port

FIGS. 20A, 20B, 20C depict a physical NIC node forwarding an incoming packet received on a particular input port to a particular output port, in a fixed relationship between input and output ports. FIG. 20A shows a 1:1, FIG. 20B a 1:N and FIG. 20C a N:1 relationship. Packets are forwarded according to the forwarding table, which is essentially a filter table in case of a NIC. Also, packets can be dropped or can optionally be encapsulated and redirected to the SDN Compiler.

In an implementation, some nodes might be limited in functionality. As an example a NIC might not have the ability to encapsulate the packet and redirect it to the SDN Compiler. Although this provides less functionality in the overall system, this is a working implementation. Also as an example, a NIC might not have the ability to filter packets and will forward all packets irrespective of the source address in the packet header, the destination address in the packet header, the input port and/or the optional load balancing identifier. Although this results in less security, this is a working implementation. Also, as an example a host might not support a forwarding table created by the SDN Compiler at all, but receive all incoming traffic and send all traffic out on a single output port (PoA). Modeling this host with this single PoA in the SDN Compiler, results in a working implementation.

In order to create a method to be performed by the SDN compiler, the above model is now described in terms of matrices. We distinguish between the following 6 matrix types:

Adjacency matrices with PoA denoted by $A^{PoA}$: describing adjacency relationships between nodes expressed in PoAs Forwarding matrices with PoA denoted by $F^{PoA}$: describing forwarding (path) relationships between nodes expressed in PoAs Mapping matrices with PoA denoted by $M^{PoA}$: describing mapping relationships between nodes expressed in PoAs Adjacency matrices with cost value denoted by $A^{Cost}$: describing adjacency relationships between nodes expressed in adjacency cost value Forwarding matrices with cost value denoted by $F^{Cost}$: describing forwarding (path) relationships between nodes expressed in path cost value Mapping matrices with cost value denoted by $M^{Cost}$: describing mapping relationships between nodes expressed in mapping cost value We refer to the first three matrices as PoA-type matrices. We refer to the last three matrices as Cost-type matrices.

All matrices have rows and columns and are indexed by node names in both the row (index i) and the column (index j) direction. Index i indicates the source node while index j indicates the destination node in the adjacency, path or mapping relationship the matrix represents. In case of an adjacency matrix and in case of a forwarding matrix the rows and columns are indexed by the same set of nodes. The order of the nodes indexing the rows can be different than the order of the nodes indexing the columns however. In case of a mapping matrix the set of nodes indexing the rows can either be different from or be identical to the set of nodes indexing the columns. A generic representation of a PoA-type adjacency and forwarding matrices is depicted in FIG.

21A. Each element of the matrix contains one or more rows, with on each row a sequence of PoAs of the form 'Output Port (Input Port) . . . ' of arbitrary length. In case of a PoA-type adjacency matrix, this sequence of PoAs denotes the adjacency from the node indexed by row i to the node indexed by column j. Multiple adjacencies between node i and node j result in multiple rows in element i, j, each representing an adjacency. In case no adjacency exists between node i and node j, the value of element i,j in a PoA-type adjacency matrix is 0 (zero). In case a node has no adjacency with itself, the value of the corresponding element of the PoA-type adjacency matrix is 0 (zero).

In case of a PoA-type forwarding matrix, this sequence of PoAs denotes the path from source node i to destination node j. Multiple paths between node i and node j result in multiple rows in element i, j, each representing a path. In case no path exists between node i and node j, the value of element i,j is 0 (zero). As there is no path needed for a node to get to itself, the corresponding value of cell i,j in case index i and index j identify the same node of a PoA-type forwarding matrix has value 1 (one), indicating no output port (input port) is needed. Examples of adjacency PoA-type matrix are shown in FIGS. 27B and 29B. Examples of forwarding PoA-type matrix are shown in FIGS. 27D and 29C.

A generic representation of a PoA-type mapping matrix is given in FIG. 22A. The mapping statement contains either one of the following values:

- one or more rows, with on each row a sequence of PoAs of the form 'Output Port (Input Port) . . . ' of arbitrary length.
- 1 (one)
- 0 (zero)

The value 'Output Port (Input Port) . . . ' indicates a mapping between the node indexed by row i and the node indexed by column j, with 'Output Port' of node i and 'Input Port' of node j. The value '1' indicates a mapping between the node indexed by row i and the node indexed by column j, without any specified PoAs. The value '0' indicates no mapping between the node indexed by row i and the node indexed by column j. Examples of PoA-type mapping matrices are shown in FIGS. 28B, 28C, 28G, 28H. The PoA-type matrices are accompanied by Cost-type matrices. The indexing of the rows and columns of the Cost-type matrix is identical to the indexing of rows and columns of the corresponding PoA-type matrix. A generic representation of Cost-type adjacency and forwarding matrices is depicted in FIG. 21B. The adjacency cost matrix contains the cost values of the adjacencies specified in adjacency PoA matrix it accompanies. Each PoA-type adjacency matrix can have one or more accompanying Cost-type adjacency matrices each representing a particular Cost Type. In case no adjacency exists between node i and node j, the value of element i,j in a Cost-type adjacency matrix is ∞ (infinity). Multiple adjacencies between node i and node j result in multiple rows in element i, j each representing a cost value corresponding to the particular row in element i, j of the PoA-type adjacency matrix it accompanies. In case a node has no adjacency with itself, the value of the corresponding element of the Cost-type adjacency matrix is ∞ (infinity).

The forwarding Cost matrix contains the cost values of the paths specified in the forwarding PoA matrix it accompanies. Each PoA-type forwarding matrix can have one or more accompanying Cost-type forwarding matrices each representing a particular Cost Type. In case no path exists between node i and node j, the value of element i,j in a Cost-type forwarding matrix is ∞ (infinity).

Multiple paths between node i and node j result in multiple rows in element i, j, each representing a cost value corresponding to the particular row in element i, j of the PoA-type forwarding matrix it accompanies. As there is no path needed for a node to get to itself, the corresponding element of a Cost-type forwarding matrix is 0 (zero), indicating a cost of zero. Examples of adjacency Cost-type matrix are shown in FIGS. 27C and 29A. Examples of forwarding Cost-type matrix are shown in FIGS. 27E and 29D.

A generic representation of a Cost-type mapping matrix is given in FIG. 22A. Each PoA-type mapping matrix can have one or more accompanying Cost-type mapping matrices each representing a particular Cost Type. The mapping statement contains either one of the following values:

- one or more rows, with on each row a cost value
- ∞ (infinity)

The Cost value indicates a mapping between the node indexed by row i and the node indexed by column j, with Cost value being the cost value of the particular cost type the particular Cost-mapping matrix represents. The cost value cannot be infinity. The Cost-mapping statement value '∞' (infinity) indicates no mapping between the node indexed by row i and the node indexed by column j.

Examples of Cost-type mapping matrices are shown in FIGS. 28D, 28E, 28I, 28J.

Another type of mapping matrix is introduced as well providing a mapping between nodes and networks. A generic representation of this type of mapping matrix is given in FIG. 22B. The single row of this type of matrix is indexed by a network name and the columns (index j) are indexed by one or more node names. The value of element i,j is:

- 1 (one) in case the node indexed by j is part of network i
- 0 (zero) in case the node indexed by j is not part of network i We will refer to this matrix as network-mapping matrix. The network-mapping matrix is a PoA-type matrix. Examples of mapping matrices between a network and nodes are shown in FIGS. 27A, 28A 28F.

The main operation that will be performed on the above matrices is matrix multiplication. The operation bears similarities to standard matrix multiplication, in which the elements of a row of the first matrix are multiplied with the corresponding elements in a column of the second matrix. The matrix multiplication on PoA-type and Cost-type matrices is explained in FIGS. 23A-23H and 24A-24M. The matrices involved in the matrix multiplication need to be of the same type, either PoA-type or Cost-type matrices.

We first consider matrix multiplication for PoA-type matrices. Two matrices RRA and RRB are defined in FIGS. 23A and 23C respectively. For the purpose of explaining matrix multiplication these matrices are 3 by 3 matrices, however in general matrices of arbitrary number of rows and columns can be used. The columns of the first matrix and the rows of the second matrix in the matrix multiplication should be equal in number and be indexed by the same set of nodes in the same order. Matrix RRA is a PoA-type matrix, and matrix RRB is a PoA-type matrix. Each element of RRA consists of one or more rows as depicted in FIG. 23B for element 'sa' consisting of q rows, as depicted in FIG. 23C for element 'sb' consisting of r rows, as depicted in FIG. 23D for element 'sc' consisting of s rows. Each element of RRB consists of one or more rows as depicted in FIG. 23F for element 'sk' consisting oft rows, as depicted in FIG. 23G for element 'sn' consisting of u rows, as depicted in FIG. 23H for element 'sr' consisting of w rows. In case an element consists of two or more rows, the value of any of these rows cannot be 0 (zero).

Figure 24B:
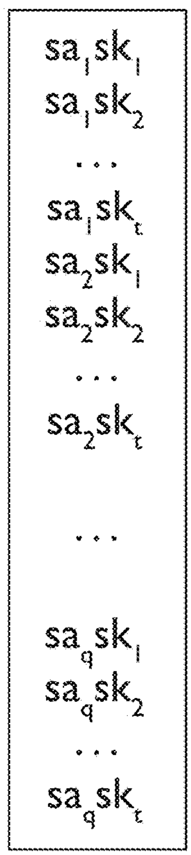
FIG. 24B shows result of 'sask', 'sask' being the first row of element (RR,RX) of matrix RRC
Figure 24C:
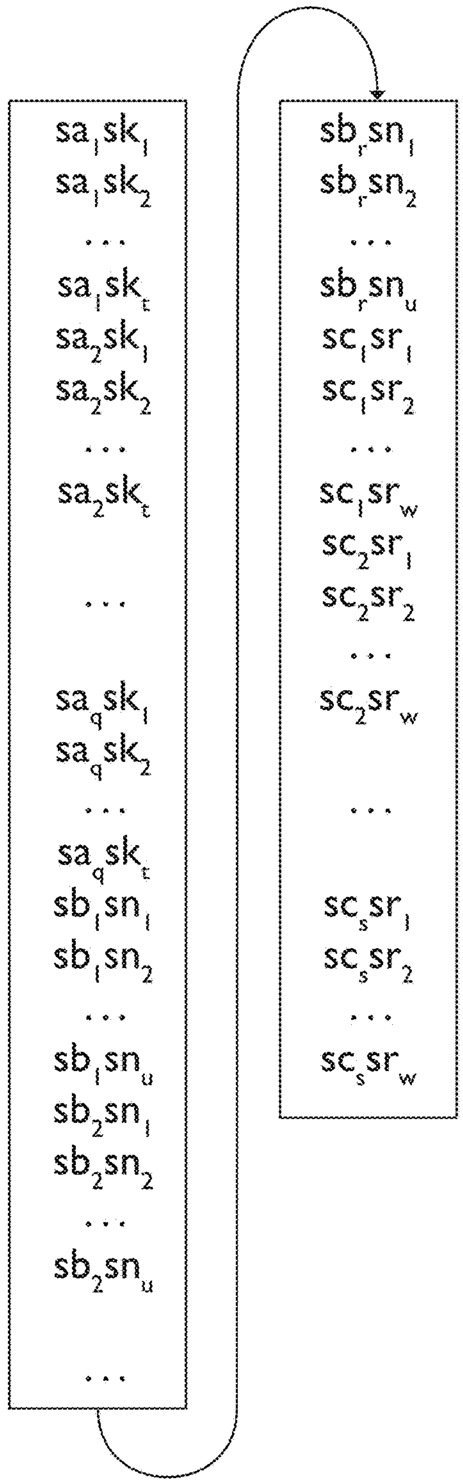
FIG. 24C shows value of element (RR,RX) of matrix RRC

Matrix multiplication RRC=RRA·RRB (in which · denotes the matrix multiplication operation as defined in this section) results in matrix RRC depicted in FIG. 24A. Basically, the standard matrix multiplication process is used in which the elements of a row of the first matrix are multiplied with the corresponding elements in a column of the second matrix, but a multiplication of elements resulting from the standard matrix multiplication operation is changed to a '' operation and a summation of elements resulting from the standard matrix operation is resulting in a new row. In matrix RRC the first row of element (RR,RX) is 'sask'. The operation 'sask' is resulting in the row elements depicted in FIG. 24B. In essence, the sequence of PoAs of the various rows of 'sa' are appended by the sequence of PoAs of the various rows of 'sk' in all possible combinations. In the same way, the second row 'sbsn' and the third row 'scsr' of element (RR,RX) of RRC are calculated. The resulting rows of 'sask', sbsn' and 'scsr' are combined into a single element consisting of all the rows, as depicted in FIG. 24C for element (RR,RX) of matrix RRC.

In case a matrix element of RRA or RRB contains the value 0 (zero), one of the operands in the '' operation involving this matrix element is 0 (zero). When one of the operands in the '' operation is 0 (zero), the '**' operation results in a single row with value 0 (zero). All values 0 (zero) are removed from the matrix resulting from the matrix multiplication, unless the resulting matrix element consists of one or more rows with value 0 (zero) in all these rows, in which case the matrix element is set to a single row with value 0 (zero).

In case a matrix element of RRA or RRB contains the value 1 (one), one of the operands in the '' operation involving this matrix element is 1 (one). When one of the operands in the '' operation is 1 (one), the '**' operation results in the value of the other operand.

Figure 24D:
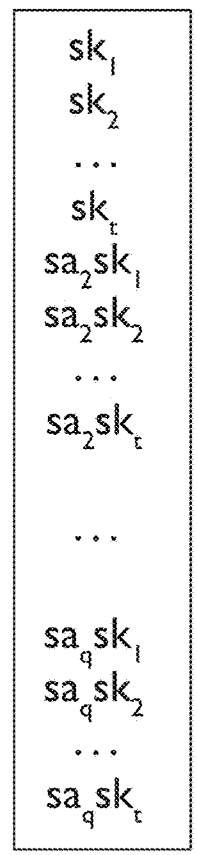
FIG. 24D shows result of 'sask' in case $sa_1$ equals 1 (one), 'sask' being the first row of element (RR,RX) of matrix RRC
Figure 24F:
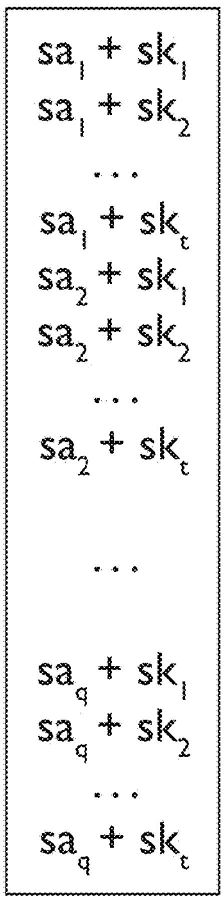
FIG. 24F shows result of 'sa++sk', 'sa++sk' being the first row of element (RR,RX) of matrix RRD

For any row of 'sa' with value 1 (one), the resulting value of 'sask' involving that row equals the value of the respective rows of 'sk'. For any row of 'sk' with value 1 (one), the resulting value of 'sask' involving that row equals the value of the respective rows of 'sa'. This is illustrated in FIG. 24D in case '$sa_1$' has value 1 (one).

The matrix multiplication operation performed on the Cost-type matrices is explained in FIGS. 23A-23H and 24E, 24F, 24G. Matrices RRA and RRB in FIGS. 23A and 23C respectively are now Cost-type matrices. For the purpose of explaining matrix multiplication these matrices are 3 by 3 matrices, however, in general matrices of arbitrary number of rows and columns can be used. The columns of the first matrix and the rows of the second matrix in the matrix multiplication should be equal in number and be indexed by the same set of nodes in the same order. Matrix RRA is a Cost-type matrix, and matrix RRB is a Cost-type matrix. Each element of RRA consists of one or more rows as depicted in FIG. 23B for element 'sa' consisting of q rows, as depicted in FIG. 23C for element 'sb' consisting of r rows, as depicted in FIG. 23D for element 'sc' consisting of s rows. Each element of RRB consists of one or more rows as depicted in FIG. 23F for element 'sk' consisting oft rows, as depicted in FIG. 23G for element 'sn' consisting of u rows, as depicted in FIG. 23H for element 'sr' consisting of w rows. In case an element consists of two or more rows, the value of any of these rows cannot be ∞ (infinity).

Figure 24G:
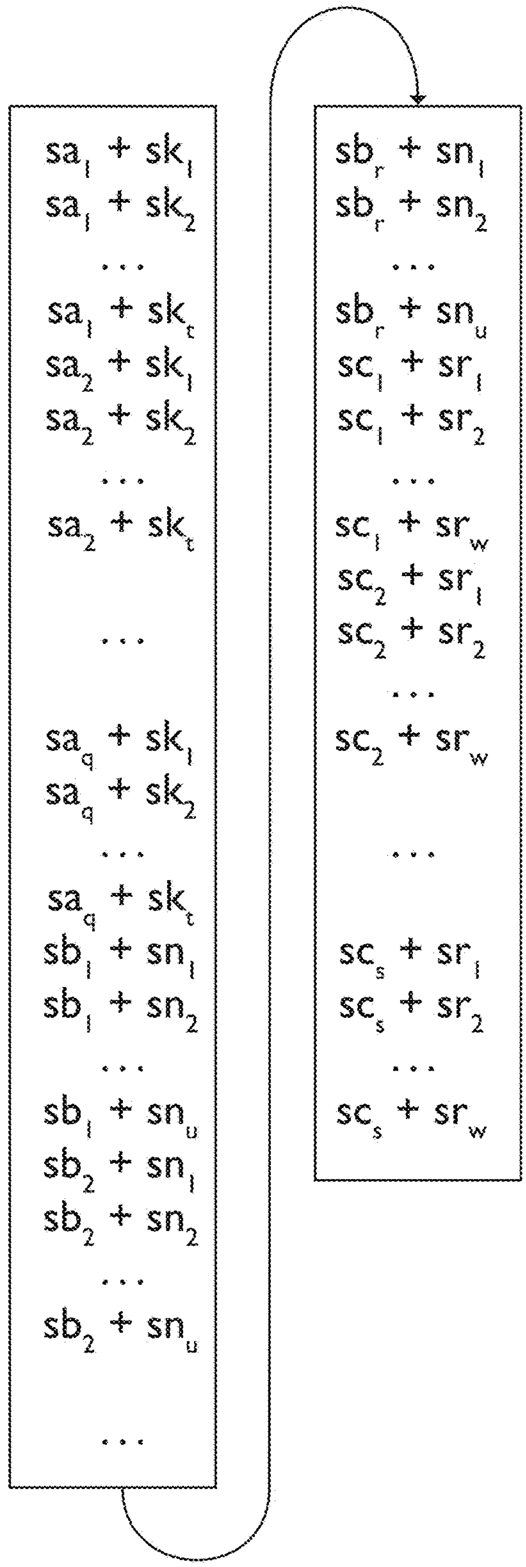
FIG. 24G shows value of element (RR,RX) of Matrix RRD

Matrix multiplication RRD=RRA·RRB (in which · denotes the matrix multiplication operation described in this section) results in matrix RRD depicted in FIG. 24E. Basically, the standard matrix multiplication process is used in which the elements of a row of the first matrix are multiplied with the corresponding elements in a column of the second matrix, but a multiplication of elements resulting from the standard matrix multiplication operation is changed to a '++' operation and a summation of elements resulting from the standard matrix operation is resulting in a new row. In matrix RRD the first row of element (RR,RX) is 'sa++sk'. The operation 'sa++sk' is resulting in the row elements depicted in FIG. 24F. In essence, the cost values of various rows of 'sa' are added to the cost values of the various rows of 'sk' in all possible combinations. In the same way, the second row 'sb++sn' and the third row 'sc++sr' of element (RR,RX) of RRD are calculated. The resulting rows of 'sa++sk', 'sb++sn' and 'sc++sr' are combined into a single element consisting of all the rows, as depicted in FIG. 24G for element (RR,RX) of matrix RRD.

In case a matrix element of RRA or RRB contains the value ∞ (infinity), one of the operands in the '++' operation involving this matrix element is ∞ (infinity). When one of the operands in the '++' operation is ∞ (infinity), the '++' operation results in a single row with value ∞ (infinity). All values ∞ (infinity) are removed from the matrix resulting from the matrix multiplication, unless the resulting matrix element consists of one or more rows with value ∞ (infinity) in all rows, in which case the matrix element is set to a single row with value ∞ (infinity).

We illustrate matrix multiplication using the example physical network of FIG. 24H. The physical network CAA consists of physical switch nodes CH, CJ, CK, CL. The virtual network GAA consists, in this example, of virtual switch nodes GR, GS, GT. As depicted in FIG. 24I physical switch node CH is mapped to virtual switch node GR, while physical switch node CJ is mapped to virtual switch nodes GS and GT. The adjacency matrix of physical network CAA is given in FIG. 24J, which we refer to as $A^{PoA}_{CAA}$ The forwarding matrix of physical network CAA is given in FIG. 24K, which we refer to as $F^{PoA}_{CAA}$.

First a Shortest-Path First (SPF) Policy has been applied using the adjacency cost values depicted in FIG. 24H. Second, additional paths have been created from node CH to node CK through node CJ and from node CK to node CH through node CJ. These additional paths result in a second row in element (CH, CK) and element (CK, CH) of the forwarding matrix of CAA respectively. A PoA-type mapping matrix from virtual nodes GR, GS, GT to physical nodes CH, CJ, CK, CL which we refer to as $M^{PoA}_{GAA-CAA}$ is shown in FIG. 24L. Applying matrix multiplication $M^{PoA}_{GAA-CAA} \cdot F^{PoA}_{CAA}$ results into the matrix shown in FIG. 24M. This matrix provides all paths from a virtual node (GR, GS, GT) to a physical node (CH, CJ, CK, CL). Note that the two paths between physical nodes CH and CK results in two paths between virtual node GR and physical node CK. The '-' symbol in cells (GR, CK) and (GR, CL) denotes that the sequence of PoAs continues on the next line. Essentially, matrix multiplication of PoA-type matrices is creating paths within the network expressed in terms of PoAs. Matrix multiplication of the associated Cost-type matrices is creating the cost of that path for the particular cost type the Cost-type matrix represents.

Figure 25:
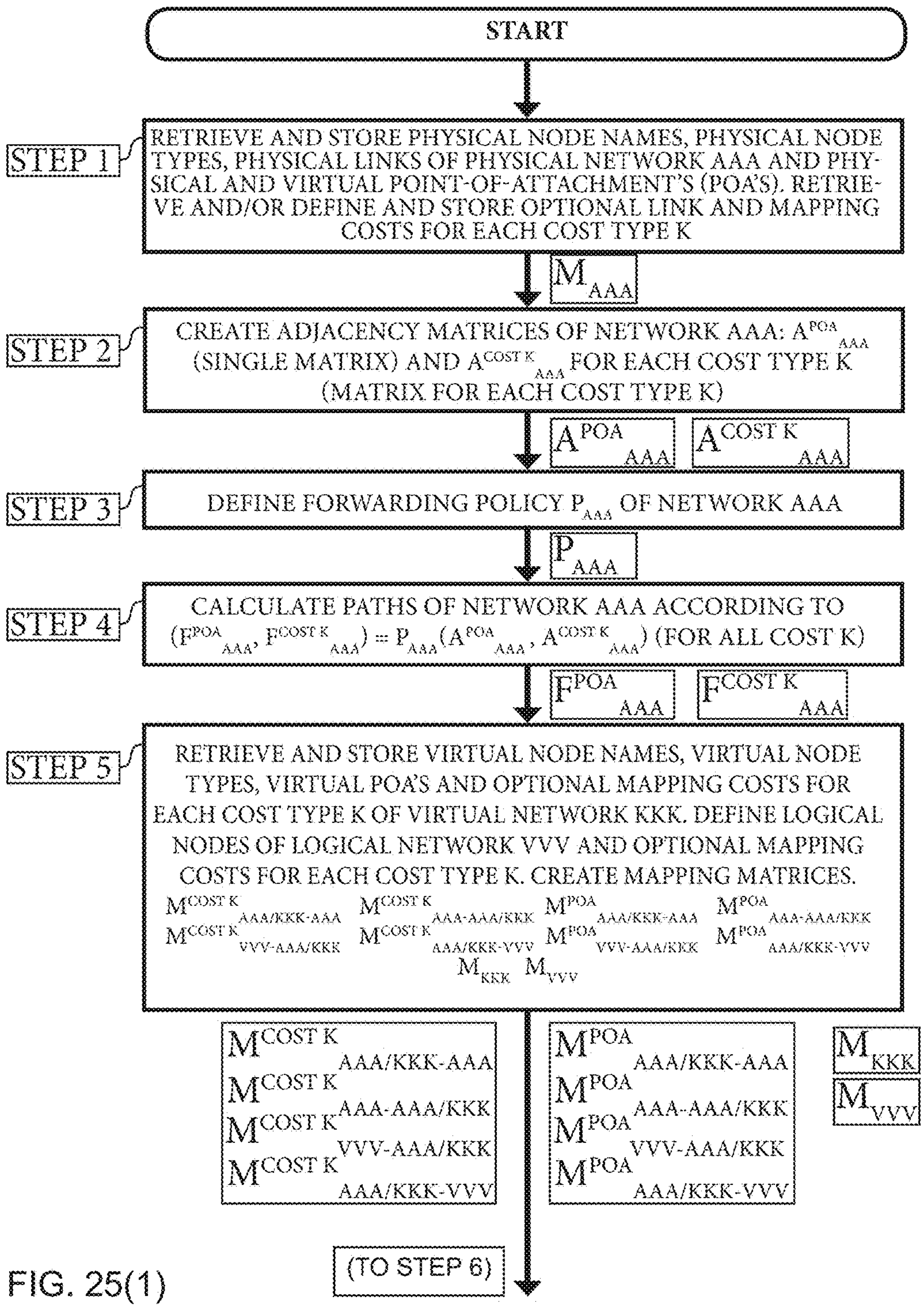
FIG. 25 is a flowchart of a detailed example of a SDN Compiler method for a single physical network, a single virtual network and a single logical network

A detailed example of a SDN Compiler method for a single physical network, a single virtual network and a single logical network is depicted in FIG. 25.

Step 1:

Network AAA is a physical network comprising physical switch nodes, host nodes and NIC nodes interconnected by physical links. The physical node names, physical node types (switch, host, NIC), physical links, physical PoAs, optionally physical link costs for each cost type k, virtual PoAs, optionally cost of physical to virtual mapping in the direction from physical node to virtual node for each cost type k are retrieved and stored for physical network AAA. Depending on the implementation this information could be retrieved from a SDN controller, the nodes directly, a network management system, a network operations system, a cloud management system, other means or a combination of the above. In case the cost type is 'latency', its value is typically retrieved from measurement. In case of other cost types, its value is typically defined in an operations system. We define a network-mapping matrix $M_{AAA}$ providing the relationship between network AAA and the nodes network AAA contains. $M_{AAA}$ is consisting of a single row i indexed by network AAA and one or multiple columns j indexed by the nodes of AAA in which we use the nodes as they are represented in the weighted directed graph representation. Therefore, in $M_{AAA}$ a NIC is represented by 2 nodes: a NIC and NIC' node. In $M_{AAA}$ a host is represented by 2 nodes: a host (representing a sending host) and a host' (representing a receiving host). The value of all matrix elements of $M_{AAA}$ is 1 (one). An example of a network-mapping matrix for the network DAA of FIG. 16 is given in FIG. 27A.

Step 2:

Based on the information retrieved in step 1, a single PoA-type adjacency matrix $A^{PoA}_{AAA}$ of physical network AAA is created. One or more accompanying Cost-type adjacency matrices $A^{Cost\ k}_{AAA}$ are created, one for each Cost Type k. Examples of PoA-type adjacency matrix and Cost-type adjacency matrix, respectively, for the network DAA of FIG. 16 are given in FIGS. 27B and 27C, respectively.

Step 3:

As mentioned above, the relationship between the adjacencies in a network and the paths in a network is determined by the forwarding policy of the particular network. We define a Forwarding Policy $P_{AAA}$ of Network AAA, essentially a function providing a translation of the adjacencies in network AAA to a set of forwarding paths in network AAA. Examples of typical forwarding policies are given in the description of step 4 below.

Step 4:

A single forwarding PoA matrix $F^{PoA}_{AAA}$ of physical network AAA is created, containing all the paths within physical network AAA expressed in terms of physical PoAs. An example for network DAA of FIG. 16 is shown in FIG. 27D. One or more accompanying forwarding Cost matrices $F^{Cost\ k}_{AAA}$ are created (see example for network DAA of FIG. 16 in FIG. 27D), one for each Cost Type k. $F^{PoA}_{AAA}$ and $F^{Cost\ k}_{AAA}$ are calculated by:

$$(F^{PoA}_{AAA}, F^{Cost\ k}_{AAA}) = P_{AAA}(A^{PoA}_{AAA}, A^{Cost\ k}_{AAA})$$

In essence, the forwarding policy function P of a network provides a translation of the adjacencies in the network (represented by matrices $A^{PoA}$ and one or more $A^{Cost}$ of that particular network) to a set of forwarding paths in the network (represented by matrices $F^{PoA}$ and one or more $F^{Cost}$ of that particular network). We will now describe examples of the forwarding policy function, based on typical currently used forwarding policies, such as:

Shortest Path First (SPF)

Firewall (no path allowed)

Specified Path (specifying all PoAs in a path)

Load-Balancing

In general, the forwarding policy function P can take any form, therefore our invention is not limited to the above mentioned policies. Further, multiple policies can also be combined into an overall policy. E.g. one could first apply a SPF policy to the network and then apply a firewall policy to specific nodes in the network. When applying forwarding policy, the specific type of the physical node, being physical switch node, physical host node or physical NIC as depicted in FIGS. 2H and 2I should be taken into account.

A SPF policy, such as e.g. Dijkstra's algorithm, can be applied to the Adjacency Matrices used in our model, which represent a weighted directed graph. The PoA-type matrix contains the PoAs and can be used to calculate the sequence of PoAs denoting the path, while the Cost-type matrix contains the cost value of a particular cost type for each adjacency.

A firewall policy does not allow certain paths within the network. In $F^{PoA}$ this is represented by a 0 (zero), while in $F^{Cost}$ this is represented by ∞ (infinity). So, in terms of the used forwarding matrices, a firewall policy is applied by setting the respective value of the path between source node (index row i of the forwarding matrix) and the destination node (index column j of the forwarding matrix) to 0 (zero) in $F^{PoA}$ and to co (infinity) in $F^{Cost}$.

A Specified Path policy is an explicitly stated sequence of PoAs from source node to destination node. It is implemented by explicitly stating particular elements (i,j) of $F^{PoA}$ and $F^{Cost}$. In $F^{PoA}$ the sequence of PoAs is stated, while the associated cost of a particular cost type is stated in $F^{Cost}$ of that particular cost type.

The next policy we consider is load-balancing. Load-balancing is the ability to utilize multiple paths between a source and a destination node simultaneously. Typically, a load-balancing policy is used to split network traffic among multiple paths. Applying load-balancing can increase bandwidth between source and destination node. Applying Load-balancing can also improve the availability of the network through redundancy of paths, as in case of failing node(s) and/or link(s) some path(s) between source node and destination node might still be available. As depicted in FIGS. 21A and 21B and associated description above, $F^{POA}$ and $F^{Cost}$ can contain multiple paths in a particular element (i,j,) of the matrix, providing the ability to load-balance traffic.

Any forwarding loops resulting from the applied policy $P_{AAA}$ are detected by scanning each row of element i,j of matrix $F^{PoA}_{AAA}$ for any duplicate input ports. Forwarding loops are not allowed by the SDN Compiler as they would result in a packet being forwarded in a loop. In case a forwarding loop is detected, any or more of the following possible actions or other appropriate actions can be taken:

The forwarding loop is removed from the path by removing the sequence of PoAs in between the duplicate input ports as well as the first occurrence of this duplicate input port.

A different path is calculated based on an alternative policy specified

The user of the SDN Compiler is notified

As an alternative to performing steps 1 through 4 in the SDN Compiler, the information contained in $F^{PoA}_{AAA}$ and $F^{Cost\ k}_{AAA}$ could also be retrieved and/or calculated externally outside the SDN Compiler and be inputted into the SDN Compiler.

Step 5:

Virtual switching nodes and/or virtual host nodes are mapped to physical switching nodes of physical network AAA. The name of each virtual node, its node type (virtual switch node or virtual host node), its virtual PoAs, a physical to virtual mapping in the direction from virtual node to physical node and optionally cost of the mapping for each cost type k are retrieved and stored. Optionally, no virtual nodes are mapped to physical network AAA. We define virtual network KKK as a set of virtual nodes. We define a network-mapping matrix $M_{KKK}$ providing the relationship between network KKK and the nodes network KKK contains. $M_{KKK}$ is consisting of a single row i indexed by network KKK and zero or more columns j indexed by the nodes of KKK in which we use the nodes as they are represented in the weighted directed graph representation. Therefore, in $M_{KKK}$ a host is represented by 2 nodes: a host node (representing a sending host) and a host' node (representing a receiving host). The value of all matrix elements of $M_{KKK}$ is 1 (one). Note there are no adjacencies between the nodes of network KKK, basically network KKK is just a collection of virtual nodes. An example of a network-mapping matrix $M_{HAA}$ for network HAA of FIG. 14B is shown in FIG. 28A.

We define a set of two PoA-type mapping matrices describing the 1:1, 1:N or N:1 physical to virtual mapping depicted in FIGS. 6A-6C and 16 and explained above. The rows i of PoA-type mapping matrix $M^{PoA}_{AAA/KKK\text{-}AAA}$ are indexed by the nodes of physical network AAA and the nodes of virtual network KKK, while the columns j are indexed by the nodes of physical network AAA. The PoA-type mapping matrix contains value zero in all cells, representing 'no mapping', with exception of the following cells:

- cell i,j contains value of 1 (one) in case index i and index j identify the same physical node,
- cell i,j contains 'output port (input port)' in case virtual node i is mapped to physical node j, with the output port being a PoA of virtual node i and the input port being a PoA of physical node j.

An example physical/virtual to physical PoA-type mapping matrix $M^{PoA}_{DAA/HAA\text{-}DAA}$ is shown in FIG. 28B.

The rows i of PoA-type mapping matrix $M^{PoA}_{AAA\text{-}AAA/KKK}$ are indexed by the nodes of physical network AAA, while the columns j are indexed by the nodes of physical network AAA and the nodes of virtual network KKK. The PoA-type mapping matrix contains zeros, representing 'no mapping', with exception of the following cells:

- cell i,j contains value of 1 (one) in case index i and index j identify the same physical node
- cell i,j contains 'output port (input port)' in case physical node i is mapped to virtual node j, with the output port being a PoA of physical node i and the input port being a PoA of virtual node j.

An example physical to physical/virtual PoA-type mapping matrix $M^{PoA}_{DAA\text{-}DAA/HAA}$ is shown in FIG. 28C.

We define a set of two Cost-type mapping matrices describing the 1:1, 1:N or N:1 physical to virtual mapping depicted in FIGS. 6A-6C and 16 and explained above for cost type k. The rows i of Cost-type mapping matrix $M^{Cost\ k}_{AAA/KKK\text{-}AAA}$ are indexed by the nodes of physical network AAA and the nodes of virtual network KKK, while the columns j are indexed by the nodes of physical network AAA. The Cost-type mapping matrix contains value ∞ (infinity) in all cells, representing 'no mapping', with exception of the following cells:

- cell i,j contains value of 0 (zero) in case index i and index j identify the same physical node
- cell i,j contains 'cost value' in case virtual node i is mapped to physical node j, with the cost value in the direction from virtual node i to physical node j.

An example physical/virtual to physical cost-type mapping matrix cost1 ($M^{Cost1}_{DAA/HAA\text{-}DAA}$) is shown in FIG. 28D.

The rows i of Cost-type mapping matrix $M^{Cost\ k}_{AAA\text{-}AAA/KKK}$ are indexed by the nodes of physical network AAA, while the columns j are indexed by the nodes of physical network AAA and the nodes of virtual network KKK. The Cost-type mapping matrix contains value ∞ (infinity) in all cells, representing 'no mapping', with exception of the following cells:

- cell i,j contains value of 0 (zero) in case index i and index j identify the same physical node
- cell i,j contains 'cost value' in case physical node i is mapped to virtual node j, with the cost value in the direction from physical node i to virtual node j.

An example physical to physical/virtual ost-type mapping matrix cost1 ($M^{Cost1}_{DAA\text{-}DAA/HAA}$) is shown in FIG. 28E.

We define logical nodes and name each logical node with a logical name. We define network VVV as a set of logical nodes. We define a network-mapping matrix $M_{VVV}$ providing the relationship between network VVV and the nodes network VVV contains. $M_{VVV}$ is consisting of a single row i indexed by network VVV and one or multiple columns j indexed by the nodes of VVV. The value of all matrix elements of $M_{VVV}$ is 1 (one). An example network-mapping matrix $M_{UUU}$ for the logical network UUU (FIGS. 15A, 15B) is given in FIG. 28F.

We define a second set of two PoA-type mapping matrices describing the 1:1, 1:N or N:1 physical/virtual to logical mapping depicted in FIG. 12 and explained above. The rows i of PoA-type mapping matrix $M^{PoA}_{VVV\text{-}AAA/KKK}$ are indexed by the nodes of logical network VVV while the columns j are indexed by the nodes of physical network AAA and the nodes of virtual network KKK. The PoA-type mapping matrix contains value 0 (zero) in all cells, representing 'no mapping', with exception of the following cells:

- cell i,j contains value of 1 (one) in case logical node i is mapped to physical or virtual node j.

Note that a logical host node (sending host) is mapped to physical or virtual host node(s) and the corresponding logical host' (receiving host) node is mapped to physical or virtual host' node(s).

The rows i of PoA-type mapping matrix $M^{PoA}_{AAA/KKK\text{-}VVV}$ are indexed by the nodes of physical network AAA and the nodes of virtual network KKK, while the columns j are indexed by the nodes of logical network VVV. The PoA-type mapping matrix contains value 0 (zero) in all cells, representing 'no mapping', with exception of the following cells:

- cell i,j contains value of 1 (one) in case physical or virtual node i is mapped to logical node j.

Note that a physical or virtual host node is mapped to logical host node(s) (sending host) and the corresponding physical or virtual host' node is mapped to logical host' (receiving host) node(s).

An example logical to physical/virtual PoA-type mapping matrix $M^{PoA}_{UUU\text{-}DAA/HAA}$ is shown in FIG. 28G. An example physical/virtual to logical PoA-type mapping matrix $M^{PoA}_{DAA/HAA\text{-}UUU}$ is shown in FIG. 28H.

We define a second set of two Cost-type mapping matrices describing the cost of the 1:1, 1:N or N:1 physical/virtual to logical mapping depicted in FIG. 12 and explained above for cost type k. The rows i of Cost-type mapping matrix $M^{Cost\ k}_{VVV\text{-}AAA/KKK}$ are indexed by the nodes of logical network VVV while the columns j are indexed by the nodes of physical network AAA and the nodes of virtual network KKK. The Cost-type mapping matrix contains value ∞ (infinity) in all cells, representing 'no mapping', with exception of the following cells:

- cell i,j contains 'cost value' in case logical node i is mapped to physical or virtual node j, with the cost value in the direction from logical node i to physical or virtual node j.

An example of a logical to physical/virtual cost-type mapping matrix $M^{Cost1}_{UUU\text{-}DAA/HAA}$ is shown in FIG. 28I.

Note that a logical host node (sending host) is mapped to physical or virtual host node(s) and the corresponding logical host' (receiving host) node is mapped to physical or virtual host' node(s).

The rows i of physical/virtual to logical cost-type mapping matrix $M^{Cost\ k}_{AAA/KKK\text{-}VVV}$ are indexed by the nodes of physical network AAA and the nodes of virtual network KKK, while the columns j are indexed by the nodes of logical network VVV. The Cost-type mapping matrix contains value ∞ (infinity) in all cells, representing 'no mapping', with exception of the following cells:

- cell i,j contains 'cost value' in case physical or virtual node i is mapped to logical node j, with the cost value in the direction from physical or virtual node i to logical node j.

An example of a physical/virtual to logical cost-type mapping matrix $M^{Cost1}_{DAA/HAA\text{-}UUU}$ is shown in FIG. 28J.

Note that a physical or virtual host node is mapped to logical host node(s) (sending host) and the corresponding physical or virtual host' node is mapped to logical host' (receiving host) node(s).

The calculation of the Cost-type mapping matrices $M^{Cost\ k}_{VVV\text{-}AAA/KKK}$, $M^{Cost\ k}_{AAA/KKK\text{-}VVV}$, $M^{Cost\ k}_{AAA/KKK\text{-}AAA}$ and $M^{Cost\ k}_{AAA\text{-}AAA/KKK}$ is optional.

The specific type of the logical node, being logical switch node or logical host node is determined by and identical to the specific type of physical or virtual node it is mapped to as depicted in FIG. 11A, 11B. Please note that a logical network does not contain any NIC and corresponding NIC' nodes as per FIG. 11A.

As the above mapping matrices will typically be sparse matrices, usual formats for storing sparse matrices can be used for efficient storage of the matrices and efficient matrix multiplication operations.

Step 6:

The forwarding (path) relationships in physical network AAA are now transformed to, preferably all, possible adjacency relationships between all logical nodes of logical network VVV by:

$$A^{PoA\ ALL}_{VVV}=M^{PoA}_{VVV\text{-}AAA/KKK}\cdot(M^{PoA}_{AAA/KKK\text{-}AAA}\cdot F^{PoA}_{AAA}\cdot M^{PoA}_{AAA\text{-}AAA/KKK})\cdot M^{PoA}_{AAA/KKK\text{-}VVV}$$

in which after $(M^{PoA}_{AAA/KKK\text{-}AAA}\cdot F^{PoA}_{AAA}\cdot M^{PoA}_{AAA\text{-}AAA/KKK})$ the value of cell i,j is set to value 1 (one) in case index i and index j identify the same node. In which preferably after the complete operation the value of cell i,j is set to value 0 (zero) in case index i and index j identify the same node. An example of such a matrix $A^{PoA\ ALL}_{UUU}$ for logical network UUU is shown in FIG. 28L, while an intermediate step for the calculation is shown in FIG. 28K.

The term $(M^{PoA}_{AAA/KKK\text{-}AAA}\cdot F^{PoA}_{AAA}\cdot M^{PoA}_{AAA\text{-}AAA/KKK})$ with the value of cell i,j set to value 1 (one) in case index i and index j identify the same node represents the paths between all physical and virtual nodes.

The matrix $A^{PoA\ ALL}_{VVV}$ contains possible adjacency relationships between all logical nodes of logical network VVV. Note that the paths between physical and virtual nodes of networks AAA and KKK respectively, have been translated to possible adjacency relationships between all logical nodes of logical network VVV.

The corresponding Cost-type adjacency-matrix $A^{Cost\ k\ ALL}_{VVV}$ for Cost-type k is calculated by:

$$A^{Cost\ k\ ALL}_{VVV}=M^{Cost\ k}_{VVV\text{-}AAA/KKK}\cdot(M^{Cost\ k}_{AAA/KKK\text{-}AAA}\cdot F^{Cost\ k}_{AAA}\cdot M^{Cost\ k}_{AAA\text{-}AAA/KKK})\cdot M^{Cost\ k}_{AAA/KKK\text{-}VVV}$$

In which after $M^{Cost\ k}_{AAA/KKK\text{-}AAA}\cdot F^{Cost\ k}_{AAA}\cdot M^{Cost\ k}_{AAA\text{-}AAA/KKK})$ the value of cell i,j is set to value 0 (zero) in case index i and index j identify the same node. In which preferably after the complete operation the value of cell i,j is set to value ∞ (infinity) in case index i and index j identify the same node. An example of such a matrix $A^{Cost1\ ALL}_{UUU}$ for logical network UUU is shown in FIG. 28N, while an intermediate step in the calculation is shown in FIG. 28M.

The term $(M^{Cost\ k}_{AAA/KKK\text{-}AAA}\cdot F^{Cost\ k}_{AAA}\cdot M^{Cost\ k}_{AAA\text{-}AAA/KKK})$ with the value of cell i,j set to value 0 (zero) in case index i and index j identify the same node represents the cost of the paths between all physical and virtual nodes.

The matrix $A^{Cost\ k\ ALL}_{VVV}$ contains the cost of possible adjacency relationships between all logical nodes of logical network VVV, based on the cost in the physical network, the cost of physical to virtual mapping and the cost of physical/virtual to logical mapping. The calculation of the $A^{Cost\ k\ ALL}_{VVV}$ is optional. Its values could be used to define the costs of adjacencies in the logical network VVV.

It is observed that this step 6 can be summarized as performing two sub-steps:

a) transforming paths in the physical network to paths between a set of nodes comprising the physical nodes and virtual nodes in dependence on the physical forwarding point-of-attachment relation and on a first mapping relation, as well as b) transforming paths between the set of physical nodes and virtual nodes to possible link relationships between the logical nodes in dependence on the paths between the set of physical nodes and virtual nodes and on a second mapping relation.

Here, the first mapping relation defines how the virtual nodes and the physical nodes are mapped to one another, and the second mapping relation defines how the logical nodes are mapped to the physical nodes and the virtual nodes.

Actually this first sub-step reflects the calculation of $(M^{PoA}_{AAA/KKK\text{-}AAA}\cdot F^{PoA}_{AAA}\cdot M^{PoA}_{AAA\text{-}AAA/KKK})$, and the second sub-step reflects the remainder of the calculation of matrix $A^{PoA\ ALL}_{VVV}$.

Step 7:

From possible adjacency relationships resulting from step 6, we define the adjacencies of logical network VVV and optionally a Cost for each adjacency for each Cost Type n. A cost of value infinity (∞) denotes there is no adjacency between two nodes. The cost type and cost values of logical network VVV are completely independent from the cost type and cost value of physical network AAA, the cost of physical to virtual mapping and the cost of physical/virtual to logical mapping. The cost in the logical network can be based on, or identical to the cost in the physical network however, which is stored in matrix $F^{Cost\ k}_{AAA}$. The cost in the logical network can be based on the cost stored in matrix $A^{Cost\ k\ ALL}_{VVV}$.

Step 8:

Based on the adjacencies defined in step 7, a single adjacency PoA matrix $A^{PoA}_{VVV}$ of logical network VVV is created. An example adjacency matrix $A^{PoA}_{UUU}$ for network UUU is shown in FIG. 29B. One or more accompanying adjacency cost matrices $A^{Cost\ n}_{VVV}$ are created, one for each Cost Type n. An example adjacency cost matrix $A^{Cost2}_{UUU}$ for network UUU is shown in FIG. 29A.

$A^{PoA}_{VVV}$ is derived from $A^{PoA\ ALL}_{VVV}$ according to:

$A^{PoA}_{VVV}(i,j)=0$ if $A^{Cost\ n}_{VVV}(i,j)$ equals ∞ (infinity)

$A^{PoA}_{VVV}(i,j)=A^{PoA\ ALL}_{VVV}(i,j)$ if $A^{Cost\ n}_{VVV}(i,j)$ does not equal ∞ (infinity)

A cost of value infinity (∞) denotes there is no adjacency between two nodes, irrespective of the particular cost type used. Hence any of the cost types can be used in the above statement to determine $A^{PoA}_{VVV}(i,j)$. In case the value of $A^{PoA}_{VVV}(i,j)$ equals 1 (one), representing an adjacency defined by the user of the SDN Compiler, and $A^{PoA\ ALL}_{VVV}(i,j)$ is not a sequence of PoAs, the user of the SDN Compiler is notified with an error message, indicating that the specified adjacency can not be created.

Step 9:

We define a Forwarding Policy $P_{VVV}$ of Network VVV, essentially a function providing a translation of the adjacencies in network VVV to a set of forwarding paths in network VVV. When applying forwarding policy, the specific type of the logical node, being logical switch node or logical host node as depicted in FIG. 13 should be taken into account. Examples of various forwarding policies were given in the description of step 4 above for the physical network. The same examples apply to the forwarding policy of the logical network.

Step 10:

A single forwarding PoA matrix $F^{PoA}_{VVV}$ of logical network VVV is created, containing all the paths within logical network VVV expressed in terms of physical and virtual PoAs. An example forwarding matrix $F^{PoA}_{UUU}$ for network UUU is shown in FIG. 29C.

One or more accompanying forwarding cost matrices $F^{Cost\ n}_{VVV}$ are created, one for each Cost Type n. $F^{PoA}_{VVV}$ and $F^{Cost\ n}_{VVV}$ are calculated by:

$$(F^{PoA}_{VVV},F^{Cost\ n}_{VVV})=P_{VVV}(A^{PoA}_{VVV},A^{Cost\ n}_{VVV})$$

An example forwarding cost matrix $F^{Cost2}_{UUU}$ for network UUU is shown in FIG. 29D.

Any forwarding loops resulting from the applied policy $P_{VVV}$ are detected by scanning each row of element i,j of forwarding matrix $F^{PoA}_{VVV}$ for any duplicate input ports. Forwarding loops are not allowed by the SDN Compiler as they would result in a packet being forwarded in a loop. In terms of forwarding entries created by the SDN compiler in step 11, they would result in multiple forwarding entries with identical logical source, logical destination and physical or virtual input ports. In case a forwarding loop is detected, any or more of the following possible actions or other appropriate actions can be taken:

- The forwarding loop is removed from the path by removing the sequence of PoAs in between the duplicate input ports as well as the first occurrence of this duplicate input port.
- A different path is calculated based on an alternative policy specified
- The user of the SDN Compiler is notified It is observed that forwarding matrices $F^{PoA}_{VVV}$ and $F^{Cost\ n}_{VVV}$ (output of step 10) can be used as a starting point for Step 5 again, creating recursion. In this case a logical network represented by forwarding matrix $F^{PoA}_{VVV}$, $F^{Cost\ n}_{VVV}$ would be input to Step 5, creating another logical network SSS by following steps 5 through 10. Please note that in that case matrices $M_{AAA/KKK-AAA}$ and $M_{AAA-AAA/KKK}$ created in step 5 and used in steps 6 are both Identity Matrices I with size identical to the size of forwarding matrix $F^{PoA}_{VVV}$. This would reduce the transformation step of step 6 to:

$$A^{PoA\ ALL}_{SSS}=M^{POA}_{SSS-VVV}\cdot F^{PoA}_{VVV}\cdot M^{PoA}_{VVV-SSS}$$

And optionally:

$$A^{Cost\ n\ ALL}_{SSS}=M^{Cost\ n}_{SSS-VVV}\cdot F^{Cost\ n}_{VVV}\cdot M^{Cost\ n}_{VVV-SSS}$$

Forwarding matrix $F^{PoA}_{VVV}$ contains the ‘network state’, being all forwarding paths between a particular logical source node and a particular logical destination node expressed in physical and virtual PoAs. Here we use the term ‘state’ as typically used in computing. Forwarding matrix $F^{PoA}_{VVV}$ determines the forwarding behavior of the physical and virtual nodes in a deterministic way. Also, as forwarding matrix $F^{PoA}_{VVV}$ contains the ‘network state’, forwarding matrix $F^{PoA}_{VVV}$ can be used for further analysis either in the SDN Compiler or outside of the SDN Compiler. As an example, forwarding matrix $F^{PoA}_{VVV}$ could be checked against path traces (e.g. traceroute information) reported by physical and virtual nodes identified by logical node names to verify consistency. Also, the ‘network state’ contained in forwarding matrix $F^{PoA}_{VVV}$ could be stored at particular moments (e.g. after each change in forwarding matrix $F^{PoA}_{VVV}$ or at regular intervals), to restore that particular ‘network state’ when needed.

Step 11:

In order to be able to calculate the corresponding forwarding table entries, the separation between host and host' in forwarding matrix $F^{PoA}_{VVV}$ and $F^{Cost\ n}_{VVV}$ is removed according to the below process:

—Start

- Step 1: Create a forwarding matrix table $F^{PoA\ Table}_{VVV}$ identical to $F^{PoA}_{VVV}$. An example forwarding matrix table $F^{PoA\ Table}_{UUU}$ for network UUU is shown in FIG. 29E.
- Step 2: Create a forwarding cost matrix table $F^{Cost\ n\ Table}_{VVV}$ identical to $F^{Cost\ n}_{VVV}$. An example forwarding cost matrix table $F^{Cost2\ Table}_{UUU}$ for network UUU is shown in FIG. 29F.
- Step 3: Remove each row in forwarding matrix table $F^{PoA\ Table}_{VVV}$ and $F^{Cost\ n\ Table}_{VVV}$ indexed by a host' node
- Step 4: For each column in forwarding matrix table $F^{PoA\ Table}_{VVV}$ and forwarding cost matrix table $F^{Cost\ n\ Table}_{VVV}$ indexed by a host' node, copy values of matrix elements to column indexed by corresponding host node for all rows, except for the row indexed by host.
- Step 5: Remove each column in forwarding matrix table $F^{PoA\ Table}_{VVV}$ and forwarding cost matrix table $F^{Cost\ n\ Table}_{VVV}$ indexed by a host' node —End The host nodes are now identified by a single node in matrices forwarding matrix table $F^{PoA\ Table}_{VVV}$ and forwarding cost matrix table $F^{Cost\ n\ Table}_{VVV}$.

For each output port in forwarding matrix table $F^{PoA\ Table}_{VVV}$ create a forwarding entry for physical or virtual node to whom the output port belongs, with the following items:

- Logical source node: row index i of element in forwarding matrix table $F^{PoA\ Table}_{VVV}$ in which the output port occurs
- Logical destination node: column index j of element in forwarding matrix table $F^{PoA\ Table}_{VVV}$ in which the output port occurs Input port: input port at position (h−1) for output port at position h in the sequence of PoAs or "local" in case output port is the first PoA in the sequence of PoAs.

Optional load-balancing identifier

Output Port: output port

For each input port that is the last PoA in a sequence of PoAs in forwarding matrix table $F^{PoA\ Table}_{VVV}$ create a forwarding entry for physical or virtual node to whom the input port belongs, with the following items:

Logical source node: row index i of element in forwarding matrix table $F^{PoA\ Table}_{VVV}$ in which input port occurs Logical destination node: column index j of element in forwarding matrix table $F^{PoA\ Table}_{VVV}$ in which the input port occurs Input Port: input port Optional load-balancing identifier Output Port: "local"

A forwarding entry with input port value "local" denotes a source node, hence the packet should be sent by that node. A forwarding entry with output port value "local" denotes a destination node, hence the packet should be received by that node.

An optional load-balancing identifier can be used in case multiple paths exist between a logical source and a logical destination node in network VVV. In case multiple paths exist between a logical source and a logical destination node the corresponding element of forwarding matrix $F^{PoA}_{VVV}$ contains multiple rows, each containing a particular sequence of PoAs denoting a path. As an example the load-balancer identifier could be stored in a load-balancing matrix with the same dimensions and indexing as forwarding matrix $F^{PoA}_{VVV}$, with the element value being a particular load-balancing identifier associated with that path. Similar to the process above for forwarding matrix table $F^{PoA\ Table}_{VVV}$ the separation between host and host' in this matrix can be removed to create a load-balancing matrix with the same dimensions as forwarding matrix table $F^{PoA\ Table}_{VVV}$.

Similarly, the SDN Compiler could maintain a matrix containing backup path(s) that could be used in case the path currently in use cannot be used. This will allow for fast restoration of service, avoiding recalculation of (part of) the process of FIG. 25. The usability of the backup path obviously depends on the exact cause that makes the path currently in use unusable. The backup path(s) might be unusable as well, in which case a new path to be used will result from recalculation of the process as described below.

Also, higher-layer identifiers, such as but not limited to an Application Port identifier, could be used to select a particular path from multiple possible paths in forwarding matrix $F^{PoA}_{VVV}$ between a logical source node and logical destination node for that particular Application Port. This allows for forwarding traffic for a particular application along a particular path. As an example TCP and UDP port numbers could be used as Application Port identifiers.

As an alternative to the above process to create $F^{PoA\ Table}_{VVV}$ and $F^{Cost\ n\ Table}_{VVV}$, and calculate forwarding table entries from $F^{PoA\ Table}_{VVV}$, forwarding table entries can also be calculated directly from $F^{PoA}_{VVV}$, using the process described above and:

in case a column is indexed by a host', use the name of the corresponding host in the forwarding entry instead of host' ignore cells indexed by (host,host')

As rows indexed by host' and columns indexed by host do not contain PoAs, no iteration is needed over rows indexed by host' and columns indexed by host. Note that this approach is functionally equivalent to the approach described above using $F^{PoA\ Table}_{VVV}$.

Step 12:

The forwarding table entries are now sent to the 'SDN Controller' responsible for the distribution of the forwarding table entries to the physical and virtual nodes of network AAA and/or KKK respectively. Alternatively, depending on the implementation, the 'SDN Compiler' could also send the forwarding entries directly to the physical nodes of network AAA and/or virtual nodes of network KKK.

Note that said forwarding table entries can be used directly by the physical or virtual nodes and do not require translation by the physical or virtual nodes.

Repeat Process:

The process as described above may be, in whole or partly, be repeated when any change takes place in any physical, virtual or logical network or mapping, such as:

Physical Node, physical node type (switch node, host node, NIC node), physical network, physical link, physical PoA, physical link cost type, physical link cost value, physical forwarding policy Virtual node, virtual node type (switch node, host node), virtual network, virtual PoA Logical node, logical node type (switch node, host node), logical network, logical link, logical link cost type, logical link cost value, logical forwarding Policy Mapping between physical and virtual nodes, mapping between physical/virtual and logical nodes In the above flowchart of FIG. 25, we have made a distinction between the various types of nodes: switch, host and NIC. We introduced NIC'-type and host'-type nodes in the matrices used to be able to apply the appropriate forwarding policy (e.g. SPF) in the physical network and logical network. Alternatively, we could choose not to make a distinction between the various types of nodes and not introduce the NIC'-type and host'-type nodes in the matrices used. The same process described in the flowchart of FIG. 25 could be applied, but when applying Forwarding Policy (in step 4 and step 10) additional information would have to be added identifying the particular node type: switch, host or NIC.

In the above flowchart of FIG. 25, we have used PoA-type matrices of the format specified in FIG. 21A. Alternatively, the 'input port' (which is indicated between brackets) could be omitted in the PoA-type matrices. During step 11 of the flowchart of FIG. 25, the appropriate physical or virtual 'input port' could be added after each physical or virtual output port in the sequence of PoAs or alternatively in the forwarding table entry. The values of the physical input port corresponding to a particular physical output port could be obtained from the appropriate physical PoA-type adjacency matrix. The values of the virtual input port corresponding to a particular virtual output port could be obtained from the appropriate PoA-type mapping matrices representing the corresponding physical to virtual mapping.

Note that the rows and columns of the defined matrices could be interchanged, which is mathematically equivalent.

Figure 26:
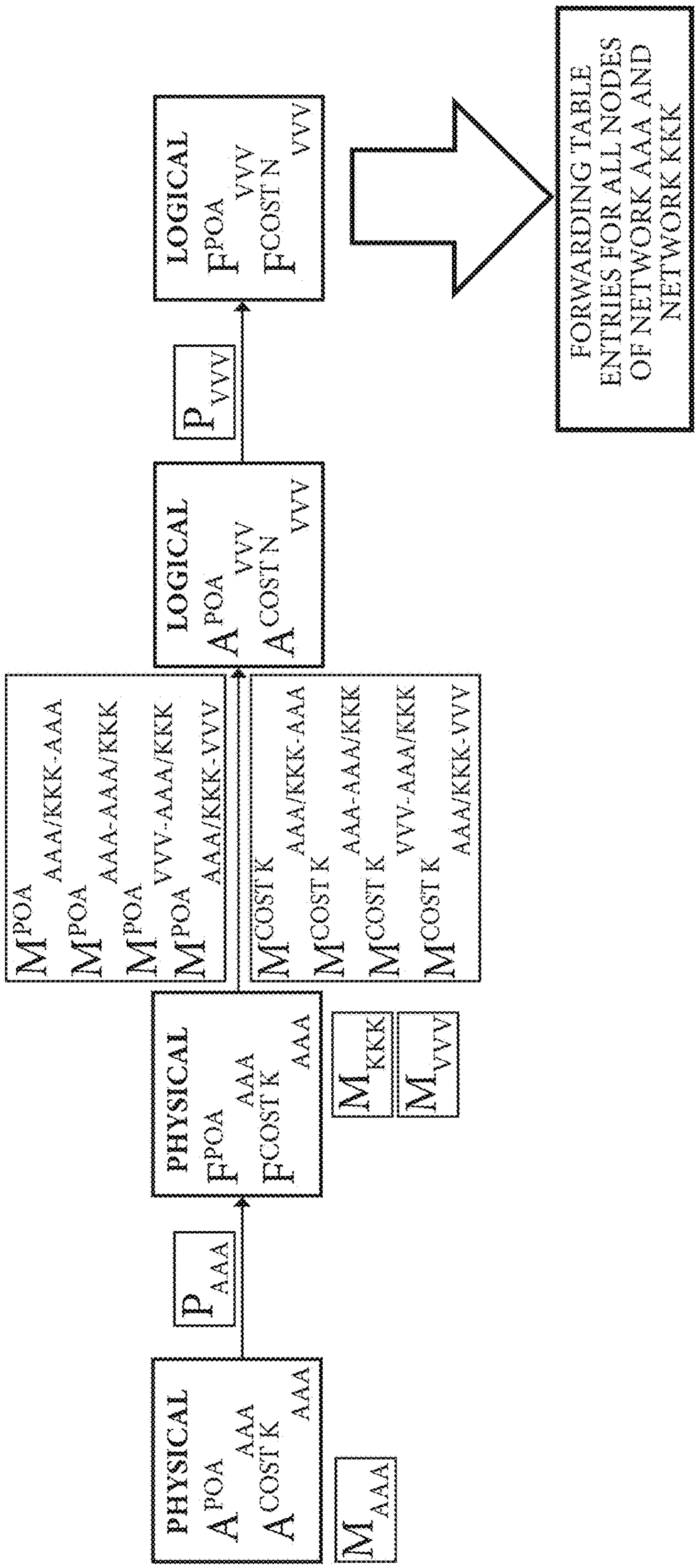
FIG. 26 is a diagram outlining various matrices involved in a detailed example of a SDN Compiler method for a single physical network, a single virtual network and a single logical network

The process described in the flowchart of FIG. 25 is summarized in the diagram of FIG. 26. The process starts with adjacency matrices (PoA-type and Cost-type) of physical network AAA, onto which forwarding policy P of physical network AAA is applied, resulting in forwarding matrices (PoA-type and Cost-type) of physical AAA. Using the 4 PoA-type mapping matrices describing the physical to virtual mapping and the physical/virtual to logical mapping an adjacency matrix of logical network VVV is created containing possible adjacencies (not shown in diagram).

Optionally, the 4 Cost-type mapping matrices describing the cost of the physical to virtual mapping and the physical/virtual to logical mapping can be used to calculate the cost values of cost type k of possible adjacencies of network VVV. Based on the adjacencies defined for logical network VVV, the adjacency matrices (PoA-type and Cost-type) of logical network VVV are created. Forwarding policy $P_{VVV}$ of logical network VVV is applied to these adjacency matrices of VVV, resulting in forwarding matrices (PoA-type and Cost-type) of logical network VVV. The PoA-type forwarding matrix of logical network VVV contains all the paths between all logical nodes in logical network VVV, expressed in terms of physical and virtual PoAs, from which the forwarding tables for all physical and virtual nodes of physical network AAA and virtual network KKK are derived. The matrices $M_{AAA}$, $M_{KKK}$, $M_{VVV}$ define the relationship between the nodes and the network for respectively physical network AAA, virtual network KKK and logical network VVV.

In the above process depicted in FIG. 25, typically the user of the SDN Compiler defines (inputs) the following items:

1. Name of the logical network
2. Name of the logical nodes of which the logical network consists
3. Adjacencies between logical nodes
4. One or more Cost Types of the logical network
5. Cost of logical adjacencies between logical nodes for each Cost Type
6. Forwarding policy of logical network
7. Mapping from physical and/or virtual nodes to logical nodes and optional mapping cost value The following items would typically be specified and/or reported by a SDN Controller, a Server Management System or Cloud Management System or a combination of these:

1. Name of virtual nodes (resources)
2. Name of virtual network (collection of virtual nodes)
3. Virtual node type (switch node, host node)
4. Virtual PoAs
5. Mapping from physical nodes to virtual nodes and optional mapping cost value
6. Optional function(s) performed by the virtual node The following items would typically be specified and/or reported by a SDN Controller or a Network Management System, a Server Management System or a combination of these:

1. Name of the physical network
2. Name of the physical nodes (resources) of which the physical network consists
3. Physical node type (switch node, host node, NIC node)
4. Physical PoAs
5. Adjacencies between physical nodes
6. One or more Cost Types of the physical network
7. Cost of physical adjacencies between physical nodes for each Cost Type
8. Forwarding policy of physical network
9. Optional function(s) performed by the physical node By now, we have reached our objective for a Software Defined Network. The logical network can now entirely be defined in software by the user of the SDN Compiler and can be compiled against arbitrary physical and virtual networking and computing resources, resulting in the instructions for these resources. Multiple logical networks can be defined and created simultaneously on the same physical and/or virtual networking and/or computing resources. Furthermore, our method provides a tight integration with and control over the virtual networking and computing resources, creating instructions for both networking and computing resources. It extends the creation of forwarding tables to physical host nodes, physical NIC nodes, virtual switch nodes and virtual host nodes, beyond the usual creation of forwarding tables for physical switch nodes. Furthermore, the SDN Compiler could request the SDN Controller, a Server Management System and/or Cloud Management System to create, modify, delete and/or move (to a different physical resource) virtual resources in case this is required to meet the requirements of the user of the SDN Compiler. Furthermore, the SDN Compiler could request the SDN Controller or a Network Management System to modify properties of the physical network that can be modified, e.g. request to modify the links between physical nodes in case an optical network consisting of Remote Optical Add/Drop Multiplexers (ROADMs) or Optical Cross Connects is used to interconnect the nodes of the packet switching network. As such, the SDN Compiler becomes the central component that can optimize physical and virtual networking and computing resources based on the needs of the user(s) of the SDN Compiler such as e.g. applications.

The paths in the network can be instantiated in various ways:

Proactive path instantiation—The SDN Compiler calculates the forwarding paths upfront between all logical source and logical destination nodes in the network (as far as forwarding policy allows for these paths) and distributes all the resulting forwarding entries to the physical and/or virtual nodes either through the SDN Controller or directly.

Reactive path instantiation—When a packet is received by a physical or virtual node that does not match against a forwarding entry, a request is made by the physical or virtual node to the SDN Compiler to provide the relevant forwarding entry.

Hybrid path instantiation—A combination of proactive path instantiation and reactive path instantiation for different paths.

The described SDN Compiler method may be arranged to support all 3 above methods of path instantiation.

As an example, in a typical implementation the Ethernet MAC Address could be used as the PoA identifier to identify physical and virtual PoAs. The Ethernet MAC Address is globally unique, has sufficient length (48 bits) to provide a large number of addresses, is used to identify both physical and virtual PoAs and is in widespread use.

In our method, we are naming both the network and the node with a logical name. As an example, in a typical implementation the subnet part of an IPv4 address could be used to identify the logical network and the host part of an IPv4 address could be used to identify the logical node. As an example, alternatively, an IPv6 address Global Routing Prefix+Subnet Identifier could be used to identify the logical network, while the Interface Identifier could be used to identify the logical node.

In current networks the IPv4 and IPv6 address denotes an interface not the node. This is creating well-known limitations in IP-networking such as the multi-homing issue. This can be dealt with in 2 ways:

a) Use the IP address to denote a node. As a Software Defined Network will not require any control protocols between nodes dependency on control protocols that expect the IP address to denote an interface is removed.

b) In case this is not possible, a 1:N physical/virtual to logical mapping could be used to create multiple logical nodes for a single physical or virtual node. Each logical node would be given an IP address, resulting in multiple IP-addresses for a single physical or virtual node.

We now consider the naming of the logical nodes and networks. In order to make the proposed approach scalable, we introduce hierarchy in the logical naming of networks and nodes of the following form:

. . . Network-of-Networks-of-Networks. Network-of-Networks. Network. Node

The dot symbol "." separates the different elements the logical name consists of We will refer to Network-of-Networks-of-Networks as NoNoNs and to Network-of-Networks as NoNs. The above naming structure introduces hierarchy in a recursive way:

A Network is a collection of Nodes

A NoNs is a collection of Networks

A NoNoNs is a collection of NoNs

And so on, as indicated by ' . . . ' in the above definition of the used naming form.

This creates an arbitrary number of hierarchy-levels in the network, obviously in a deployment limited to practical constraints.

Using the above structure a Node is located by:

. . . Network-of-Networks-of-Networks. Network-of-Networks. Network. Node

Similarly, a Network is located by:

. . . Network-of-Networks-of-Networks. Network-of-Networks. Network

Similarly, a NoNs is located by:

. . . Network-of-Networks-of-Networks. Network-of-Networks

And so on for various levels in the hierarchy.

This provides a means to locate the node, through it's address, within a hierarchical network. Further, the above approach abstracts every network to a node at its particular level in the naming hierarchy. E.g. A NoNs is consisting of a collection of Networks with adjacencies between Networks, in the same way as a Network is consisting of a collection of Nodes with adjacencies between nodes. Inter-Domain Nodes (IDNs) provide interconnection between various Networks, NoNs's, NoNoNs's, etc. Following the hierarchy of the naming structure, we can distinguish between the following types of IDNs:

IDNs between Networks: the adjacency/adjacencies between a pair of IDNs crosses the borders of 2 networks.

IDNs between NoNs's: the adjacency/adjacencies between a pair of IDNs crosses the borders of 2 NoNs IDNs between NoNoNs's: the adjacency/adjacencies between a pair of IDNs crosses the borders of 2 NoNoNs And so on for various levels in the hierarchy.

Now, we can apply the method of the SDN Compiler to a network consisting of IDNs, and apply the process of the flowchart of FIG. 25 to the network consisting of IDNs. The resulting forwarding table entries depict the forwarding between IDNs. The PoA-type forwarding matrix of the network consisting of IDNs also contains the forwarding behavior for one or more nodes within the network within which the IDN resides. In this way forwarding table entries can be created for interconnection between networks, NoNs, NoNoNs, etc depending on the hierarchy level the IDNs provides interconnectivity for.

Note that within the network of IDNs policy can be applied, determining the forwarding path(s) between networks, NoNs, NoNoNs, etc depending on the network hierarchy level the IDNs provide interconnectivity for.

Using the above approach, for a NoNs the forwarding is decomposed to:

a) Forwarding from source node to IDN in source network b) Forwarding from IDN in source network to IDN in destination network c) Forwarding from IDN in destination network to destination node The forwarding table entries for a) are derived from the PoA-type forwarding matrix of the network of the source node. The forwarding table entries for c) are derived from the PoA-type forwarding matrix of network of the destination node. The forwarding entries for b) are derived from the PoA-type forwarding matrix of the network of IDNs.

The same process can be repeated for each level in the hierarchy in a recursive manner. The above approach can be extended to IDNs between NoNs's, IDNs between NoNoNs's etc. Note that by using the above recursive naming structure, the Adjacency, Forwarding and Mapping matrices explained above can be kept to a reasonable size, allowing for fast computation of the matrices, while the size of the network can scale to a very large number of nodes. Also the size of the forwarding tables can be kept within reasonable limits by forwarding traffic of a collection of nodes between networks through a limited set of paths between IDNs, determined by the forwarding policy of the network of IDNs.

As stated above, as an example, but not limited to, in a typical implementation consisting of a single logical network, the subnet part of an IPv4 address could be used to identify the logical network and the host part of an IPv4 address could be used to identify the logical node. When using the logical naming hierarchy presented above to support a hierarchy of networks, as an example, but not limited to, a host part of an IPv4 address could be used to identify the logical node, while a network, NoNs, NoNoNs, etc could be denoted by Classless Inter-Domain Routing (CIDR) notation of the subnet of the IPv4 address.

As stated above, as an example, but not limited to, in a typical implementation consisting of a single logical network, an IPv6 address Global Routing Prefix+Subnet Identifier could be used to identify the logical network, while the Interface Identifier could be used to identify the logical node. When using the logical naming hierarchy presented above to support a hierarchy of networks, the Interface Identifier of an IPv6 address could be used to identify the logical node, while a network, NoNs, NoNoNs, etc could be denoted by subnetting of the IPv6 Global Routing Prefix and/or Subnet Identifier address.

In order to support mobility of logical nodes within the network(s) controlled by the SDN Compiler, the logical node should be identified by a name unique within the network(s) being controlled by the SDN Compiler, or be globally unique to support global mobility. As an example, but not limited to, this can be realized in any of the followings ways:

a) Splitting the IPv6 address space into a part that denotes the network, NoNs, NoNoNs, etc. and a part that denotes the node b) Splitting the IPv4 address space into a part that denotes the network, NoNs, NoNoNs, etc. and a part that denotes the node c) Introducing an IPv4 or IPv6 address to denote the node and a second IPv4 or IPv6 address to denote the network, NoNs, NoNoNs.

The SDN compiler method for a single physical network, a single virtual network and a single logical network as depicted in the flowchart in FIG. 25 is now applied to the example network depicted in FIGS. 12, 13A, 13B, 14A, 14B, 15A-15C, 16. FIGS. 27A-27E, 28A-28N, 29A-29F depict the various matrices and FIGS. 30A-30I depicts the forwarding tables for different nodes DA-DG, and HA, HB.

Figure 13B:
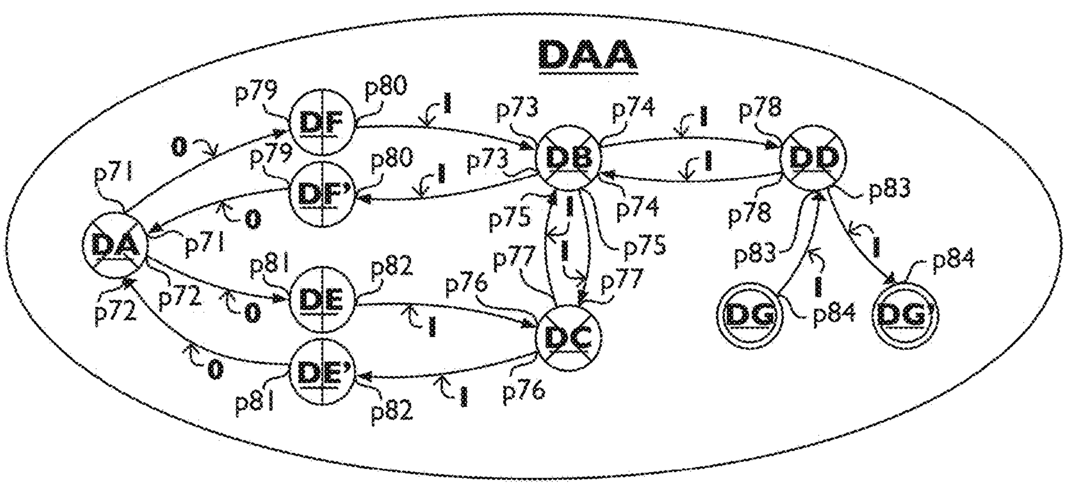
FIG. 13B is a diagram showing a weighted directed graph representation of physical network DAA
Figure 14A:
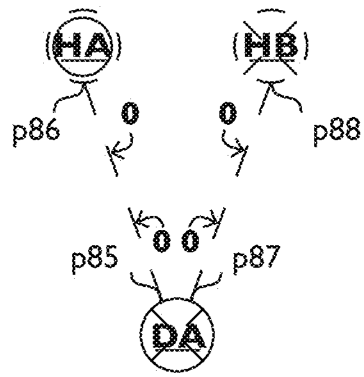
FIG. 14A is a diagram showing a functional representation of mapping from physical node DA to virtual nodes HA and HB
Figure 14B:
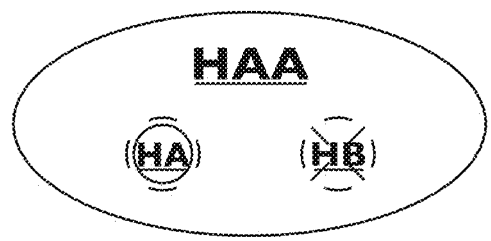
FIG. 14B is a diagram showing a functional representation of virtual network HAA

The physical nodes of FIG. 12 are depicted in the functional model of FIG. 13A and in the weighted directed graph of FIG. 13B. We define physical network DAA as the collection of physical nodes DA, DB, DC, DD, DE, DF, DG, DE', DF', DG' represented in matrix $M_{DAA}$ shown in FIG. 27A. The adjacencies in network DAA are represented in matrix $A^{PoA}_{DAA}$ (FIG. 27B) containing the PoAs of the adjacencies and matrix $A^{Cost1}_{DAA}$ (FIG. 27C) containing the cost values of cost type 'Cost1' of the adjacencies. Applying a Shortest-Path-First Forwarding Policy $P_{DAA}$ using cost type 'Cost1' results in forwarding matrices $F^{PoA}_{DAA}$ (FIG. 27D) containing the PoAs of the paths and matrix $F^{Cost1}_{DAA}$ (FIG. 27E) containing the cost values of cost type 'Cost1' of the paths.

We define virtual network HAA as the collection of virtual nodes HA, HB and HA' represented in network-mapping matrix $M_{HAA}$ shown in FIG. 28A. Please note $M_{HAA}$ is merely a collection of nodes, as there are no links between the virtual machines HA and HB as shown in FIGS. 12 and 14A. We now define the first mapping, between physical network DAA and virtual network HAA. $M^{PoA}_{DAA/HAA-DAA}$ provides the mapping from network DAA and HAA (represented as DAA/HAA) to network DAA (FIG. 28B), while $M^{PoA}_{DAA-DAA/HAA}$ provides the mapping from network DAA to network DAA and HAA (represented as DAA/HAA) (FIG. 28C). The dashed lines in FIGS. 14A and 16 depict this mapping which is a 1:2 mapping between physical node DA and virtual nodes HA and HB. $M^{Cost1}_{DAA/HAA-DAA}$ provides the cost of the mapping from network DAA and HAA (represented as DAA/HAA) to network DAA (FIG. 28D), while $M^{Cost1}_{DAA-DAA/HAA}$ provides the cost of the mapping from network DAA to network DAA and HAA (represented as DAA/HAA) (FIG. 28E). The mapping cost value is zero for all mappings between physical nodes and virtual nodes in this example.

The logical network UUU is depicted in FIG. 15A (functional representation) and FIG. 15B (graph representation). We define logical network UUU as the collection of logical nodes UU, UV, UW, UX, UY, UZ, UU', UZ' represented in network-mapping matrix $M_{UUU}$ shown in FIG. 28F. We now define a second mapping, between physical network DAA/virtual network HAA and logical network UUU. $M^{PoA}_{UUU-DAA/HAA}$ provides the mapping from network UUU to network DAA and HAA (DAA/HAA) (FIG. 28G), while $M^{PoA}_{DAA/HAA-UUU}$ provides the mapping from network DAA and HAA (DAA/HAA) to network UUU (FIG. 28H). $M^{Cost1}_{UUU-DAA/HAA}$ provides the cost of the mapping from network UUU to network DAA and HAA (DAA/HAA) (FIG. 28I), while $M^{Cost1}_{DAA/HAA-UUU}$ provides the cost of the mapping from network DAA and HAA (DAA/HAA) to network UUU (FIG. 28J). The mapping cost value is zero for all mappings between all physical/virtual nodes and logical nodes in this example.

In this example a 1:1 mapping between nodes DG, HB, DB, DC, DD, HA, DG', HA' and UU, UV, UW, UX, UY, UZ, UU', UZ' respectively is used as depicted by the dotted line in FIG. 15C. In general 1:N or N:1 mapping can also be applied. Please note that the physical, virtual and logical host nodes are split in a host (sending host) and host' (receiving host) node. A physical or virtual host node is mapped to a logical host node, while a physical or virtual host' node is mapped to a logical host' node.

The forwarding (path) relationships in physical network DAA are now transformed to possible adjacency relationships between all logical nodes of logical network UUU by:

$$A^{PoA\ ALL}_{UUU}=M^{PoA}_{UUU\text{-}DAA/HAA}\cdot(M^{PoA}_{DAA/HAA\text{-}DAA}\cdot F^{PoA}_{DAA}\cdot M^{PoA}_{DAA\text{-}DAA/HAA})\cdot M^{PoA}_{DAA/HAA\text{-}UUU}$$

In which after $(M^{PoA}_{DAA/HAA\text{-}DAA}\cdot F^{PoA}_{DAA}\cdot M^{PoA}_{DAA\text{-}DAA/HAA})$ the value of cell i,j is set to value 1 (one) in case index i and index j identify the same node. In which preferably after the complete operation the value of cell i,j is set to value 0 (zero) in case index i and index j identify the same node.

The intermediate step in the calculation $(M^{PoA}_{DAA/HAA\text{-}DAA}\cdot F^{PoA}_{DAA}\cdot M^{PoA}_{DAA\text{-}DAA/HAA})$ with the value of cell i,j set to value 1 (one) in case index i and index j identify the same node is shown in FIG. 28K. $A^{PoA\ ALL}_{UUU}$ is shown in FIG. 28L and contains possible adjacency relationships between all logical nodes of logical network UUU.

The cost of cost type 'Cost1' of the possible adjacency relationships between all logical nodes of logical network UUU is given by:

$$A^{Cost1\ ALL}_{UUU}=M^{Cost1}_{UUU\text{-}DAA/HAA}\cdot(M^{Cost1}_{DAA/HAA\text{-}DAA}\cdot F^{Cost1}_{DAA}\cdot M^{Cost1}_{DAA\text{-}DAA/HAA})\cdot M^{Cost1}_{DAA/HAA\text{-}UUU}$$

In which after $(M^{Cost1}_{DAA/HAA\text{-}DAA}\cdot F^{Cost1}_{DAA}\cdot M^{Cost1}_{DAA\text{-}DAA/HAA})$ the value of cell i,j is set to value 0 (zero) in case index i and index j identify the same node. In which preferably after the complete operation the value of cell i,j is set to value ∞ (infinity) in case index i and index j identify the same node.

The intermediate step in the calculation $(M^{Cost1}_{DAA/HAA\text{-}DAA}\cdot F^{Cost1}_{DAA}\cdot M^{Cost1}_{DAA\text{-}DAA/HAA})$ with the value of cell i,j set to value 0 (zero) in case index i and index j identify the same node is shown in FIG. 28M. $A^{Cost1\ ALL}_{UUU}$ is shown in FIG. 28N and contains the cost of cost type 'Cost1' of possible adjacency relationships between all logical nodes of logical network UUU.

According to the links and link cost values of a particular cost type of network UUU defined in FIG. 15A and FIG. 15B we create $A^{Cost2}_{UUU}$ with 'Cost2' being the cost type used (FIG. 29A). Cost of value infinity (∞) denotes there is no adjacency between two nodes. The cost type Cost2 and its cost values of logical network UUU is completely independent from cost type Cost1 and its cost values. However, one can choose to use cost values that were used in $F^{Cost1}_{DAA}$ and/or $A^{Cost1\ ALL}_{UUU}$.

A single adjacency PoA matrix $A^{PoA}_{UUU}$ of logical network UUU is created based on $A^{Cost2}_{UUU}$ and $A^{PoA\ ALL}_{UUU}$ as shown in FIG. 29B. Applying a Shortest-Path-First Forwarding Policy $P_{UUU}$ using cost type 'Cost2' results in forwarding matrices $F^{PoA}_{UUU}$ (FIG. 29C) containing the PoAs of the paths and matrix $F^{Cost2}_{UUU}$ (FIG. 29D) containing the cost values of cost type 'Cost2' of the paths.

In order to be able to calculate the corresponding forwarding table entries, the separation between host and host' in $F^{PoA}_{UUU}$ and $F^{Cost}_{UUU}$ is removed according to the process explained in step 11 of the flowchart of FIG. 25. The resulting host nodes are now identified by a single node in matrices $F^{PoA\ Table}_{UUU}$ and $F^{Cost2\ Table}_{UUU}$ shown in FIG. 29E and FIG. 29F respectively.

The resulting forwarding tables are shown in FIG. 30. For each output port in $F^{PoA\ Table}_{UUU}$ a forwarding entry is created for physical nodes (DA, DB, DC, DD, DE, DF, DG) or virtual nodes (HA, HB) to whom output port belongs, with the following items:

Logical source node: row index i of element in $F^{PoA\ Table}_{UUU}$ in which output port occurs Logical destination node: column index j of element in $F^{PoA\ Table}_{UUU}$ in which output port occurs Input port: input port at position (h−1) for output port at position h in the sequence of PoAs or "local" in case output port is the first PoA in the sequence of PoAs.

Output Port: output port

For each input port that is the last PoA in a sequence of PoAs in $F^{PoA\ Table}_{UUU}$ a forwarding entry for physical or virtual node to whom input port belongs is created for physical (nodes DA, DB, DC, DD, DE, DF, DG) or virtual nodes (HA, HB) to whom output port belongs, with the following items:

Logical source node: row index i of element in $F^{PoA\ Table}_{UUU}$ in which input port occurs Logical destination node: column index j of element in $F^{PoA\ Table}_{UUU}$ in which input port occurs Input Port: input port Output Port: "local"

An optional load-balancing identifier is not used in this example.

The forwarding table entries can now be sent to the 'SDN Controller' responsible for the distribution of the forwarding table entries or alternatively directly to the physical and virtual nodes, depending on the implementation. When any change takes place in any physical, virtual or logical network or mapping (part of) the process depicted in FIG. 25 is repeated. The equivalent of the various matrices used in this example are also shown in the diagram of FIG. 26.

The forwarding tables shown in FIGS. 30A-30I of the physical and virtual nodes reflect the node type of the particular node:

Physical switch nodes DA,DB,DC,DD: Logical nodes UW,UX,UY were mapped to physical switch nodes DB,DC,DD, hence the forwarding tables of nodes DB,DC,DD contain forwarding entries for traffic with source or destination of their respective logical node. As DB,DC,DD are switch nodes traffic originating from or destined for other nodes is forwarded. Please note that no logical node was mapped to switch node DA, hence traffic only originating from or destined for other nodes is forwarded (no forwarding entries with input port or output port value 'local').

Physical host node DG: forwarding table contains only forwarding entries depicting logical node UU as source or destination node. As per desired behavior, no forwarding takes place in the host node DG.

Physical NIC nodes DE, DF: no logical nodes can be mapped to a NIC node, therefore NIC nodes DE, DF only provide forwarding of packets originating from other nodes. Please note the fixed forwarding relationship between ports p81 and p82 and ports p79 and p80 in node DE and node DF respectively.

Virtual switch node HB: Logical switch node UV was mapped to virtual switch node HB, hence the forwarding table of node HB contains forwarding entries for traffic with source or destination UV. As HB is a switch node traffic originating from or destined for other nodes is forwarded.

Virtual host node HA: forwarding table contains only forwarding entries depicting logical node UZ as source or destination node. As per desired behavior, no forwarding takes place in host node HA.

Virtual switch node HB illustrates Network Functions Virtualization (NFV): a virtual switch node implemented in a virtual machine is introduced in a physical network DAA, through which traffic is forwarded. Typically, the virtual switch node would perform optional operations such as but not limited to monitoring and/or recording and/or buffering and/or modifying of the incoming packet header and/or payload before forwarding the packet to one or more of it's output ports. Virtual switch node HB might also not forward (block) the packet.

A method with a minimum set of actions to be performed by an SDN compiler in accordance with the present invention can be defined as follows (between brackets references are made to the above steps relating to FIG. 25, however, the actions as defined here worded more generally):

method of controlling a network by a compiler based on a logical network model, the network comprising a first number of physical nodes and a second number of virtual nodes, said first number being equal to or larger than one, said second number being equal to or larger than zero, but said first and second numbers being such that their sum is at least two, the physical nodes being interconnected by physical links in accordance with a physical network layout, the logical network model comprising a third number of logical nodes, each logical node being indicated with a logical node name, each logical node name referring to at least one physical or at least one virtual node in the network, the method as performed by the compiler comprising the following actions:

a) Storing physical node names, each physical node name being an unique identifier of one physical node, and storing point-of-attachment names of said physical nodes, each of the point-of-attachment names of a physical node concerned being an unique identifier of a point-of-attachment between the certain physical node concerned and a physical link connecting the physical node concerned to another physical node [cf. step 1 and 2 of FIG. 25];

b) Storing a physical forwarding point-of-attachment relation defining physical paths of said physical network in dependence on a physical forwarding policy of said physical network, on said physical node names, and on said point-of-attachment names of said physical nodes, a physical path denoting a physical route a packet follows from a physical source node to a physical destination node [cf. steps 3 and 4 of FIG. 25];

c) Storing virtual node names, storing a first mapping relation defining how said virtual nodes and said physical nodes are mapped to one another, and storing a second mapping relation defining how said logical nodes are mapped to the physical nodes and the virtual nodes [cf. step 5 of FIG. 25];

d) Transforming paths in said physical network to paths between a set of nodes comprising said physical nodes and virtual nodes in dependence on said physical forwarding point-of-attachment relation and on said first mapping relation, as well as transforming paths between said set of physical nodes and virtual nodes to possible link relationships between said logical nodes in dependence on said paths between said set of physical nodes and virtual nodes and on said second mapping relation [cf. step 6 of FIG. 25];

e) Storing logical node names for said logical nodes and a set of logical links between said logical nodes; [cf. step 7 of FIG. 25]

f) Calculating a logical forwarding point-of-attachment relation defining logical paths in said logical network in dependence on a logical forwarding policy of said logical network, on said logical node names, and on said set of logical links between said logical nodes, a logical path denoting a logical route a packet follows from a logical source node to a logical destination node, [cf. step 8, 9 and 10 of FIG. 25]

g) Creating forwarding table entries for said physical nodes and said virtual nodes from said logical forwarding point-of-attachment relation; [cf. step 11 of FIG. 25]

h) Sending said forwarding table entries, either directly or indirectly, to selected physical nodes and selected virtual nodes. [cf. step 12 of FIG. 25]

In the above specification, reference has been made to many different kinds of units, like controller, compiler, node, virtual machine, NIC, etc. As will be apparent to persons skilled in the art, the functionality of such units is performed by at least one of hardware and software running on a processing unit. Such hardware may be any known type of hardware (now and in the future) arranged to perform the claimed functions. FIG. 31 shows a schematic diagram of a computer arrangement that can perform such functions. FIG. 31 shows a kind of "complete" picture: it will be evident that some components (like a printer) may not be used for many of the units specified in the present document.

The arrangement shown in FIG. 31 comprises a processor 1 for carrying out arithmetic operations.

The processor 1 is connected to a plurality of memory components, including a hard disk 5, Read Only Memory (ROM) 7, Electrically Erasable Programmable Read Only Memory (EEPROM) 9, and Random Access Memory (RAM) 11. Not all of these memory types need necessarily be provided. Moreover, these memory components need not be located physically close to the processor 1 but may be located remote from the processor 1.

The processor 1 is also connected to units for inputting instructions, data etc. by a user, like a keyboard 13, and a mouse 15. Other input units, such as a touch screen, a track ball and/or a voice converter, known to persons skilled in the art may be provided too.

A reading unit 17 connected to the processor 1 is provided. The reading unit 17 is arranged to read data from and possibly write data on a data carrier like a floppy disk 19 or a CDROM 21. Other data carriers may be tapes, DVD, Blu Ray disks, Compact Flash (CF), Secure Digital (SD), Micro SD, Mini SD, Extreme Digital (xD), and memory sticks, etc. as is known to persons skilled in the art. The data carrier may be provided with a computer program product comprising instructions and data arranged to be read by the processor 1 and, after being read, allowing the processor 1 to perform a method in accordance with the invention. Such a computer program product may then be loaded in one of the memory components 5, 7, 9, 11. However, such computer program product may, alternatively, be downloaded via the telecommunication network 27.

The processor 1 may be connected to a printer 23 for printing output data on paper, as well as to a display 3, for instance, a monitor or LCD (Liquid Crystal Display) screen, a plasma display panel, an Organic Light Emitting Diode (OLED), an Active Matrix OLED (AMOLED) or any other type of display known to persons skilled in the art.

The processor 1 may be connected to a communication network 27, for instance, the Public Switched Telephone Network (PSTN), a Local Area Network (LAN), a Wide Area Network (WAN), the Internet, etc. by means of an I/O unit 25. The processor 1 may be arranged to communicate with other communication arrangements through the network 27.

The processor 1 may be implemented as stand alone system, or as a plurality of parallel operating processors each arranged to carry out subtasks of a larger computer program, or as one or more main processors with several sub-processors. Parts of the functionality of the invention may even be carried out by remote processors communicating with processor 1 through the network 27.

Thus far we have considered a SDN Compiler method for a single physical network, a single virtual network and a single logical network. As mentioned above, the present invention provides a method for translating or compiling a high-level network specification into a set of instructions for the appropriate physical and/or virtual networking and/or computing resources. In order to make deployment of large-scale networks based on this method feasible, we extend our method to an arbitrary network having the following properties:

a) The combined physical and virtual network is consisting of one or more layers. At each layer nodes can be interconnected through physical and/or virtual links. The physical link can be any physical medium, including but not limited to, fiber optic cable, copper cable, air. The physical link can also be a path provided by another networking technology, such as but not limited to an optical wavelength, a Time Division Multiplexing (TDM) circuit, a Multi Protocol Label Switching (MPLS) path. The physical link can also be a tunnel provided by another networking technology such as but not limited to a GRE-tunnel [GRE=Generic Routing Encapsulation], NVGRE-tunnel [NVGRE=Network Virtualization using Generic Routing Encapsulation], VXLAN tunnel [VXLAN=Virtual Extensible Local Area Network]. The virtual link can be a virtual connection, including but not limited to, virtual links between virtual switches and virtual machines, virtual links between virtual machines, network sockets.

b) A layer might provide services to a higher layer and might consume services from a lower layer.

c) Physical and/or virtual nodes in each of the above mentioned layers are either packet-switching or circuit-switching nodes. Example packet-switching nodes are, but not limited to IPv4-capable routers, IPv6-capable routers, MPLS-switches [MPLS=Multi Protocol Label Switching], application processes providing packet-switching. Besides the forwarding functionality a switch might provide additional operation(s) on the packet, such as but not limited to monitoring and/or recording and/or buffering and/or modifying of the incoming packet header and/or payload before forwarding the packet to one or more of it's output ports. The switch might also not forward (block) the packet. Examples of circuit-switching nodes are, but not limited to, Fiber Cross-Connects cross-connecting optical fibers, Remote-Optical Add/Drop Multiplexers (ROADMs) or Optical Cross-Connects cross-connecting optical wavelengths, Synchronous Digital Hierarchy (SDH) multiplexers or Synchronous Optical NETwork (SONET) multiplexers cross-connecting time-slots. For both packet-switching nodes and circuit-switching nodes a set of instructions is created by the SDN Compiler. In case of a packet-switching node, these instructions comprise forwarding table entries. In case of a circuit-switching node, these instructions comprise cross-connect settings.

d) The lowest packet-switching layer provides for Media-Access Control (MAC)

e) Each layer consists of an arbitrary number of sub-networks within a hierarchy of sub-networks with arbitrary number of hierarchy-levels f) The logical network is consisting of one or more layers g) Logical layers are mapped to either packet-switching or circuit-switching physical, virtual and/or combined physical/virtual layers h) Each logical layer consists of an arbitrary number of sub-networks within a hierarchy of sub-networks with arbitrary number of hierarchy-levels We extend our method by modeling an arbitrary network as follows:

A network consists of nodes interconnected by links. Within the domain of a network consisting of nodes the method described thus far applies.

Figure 32A:
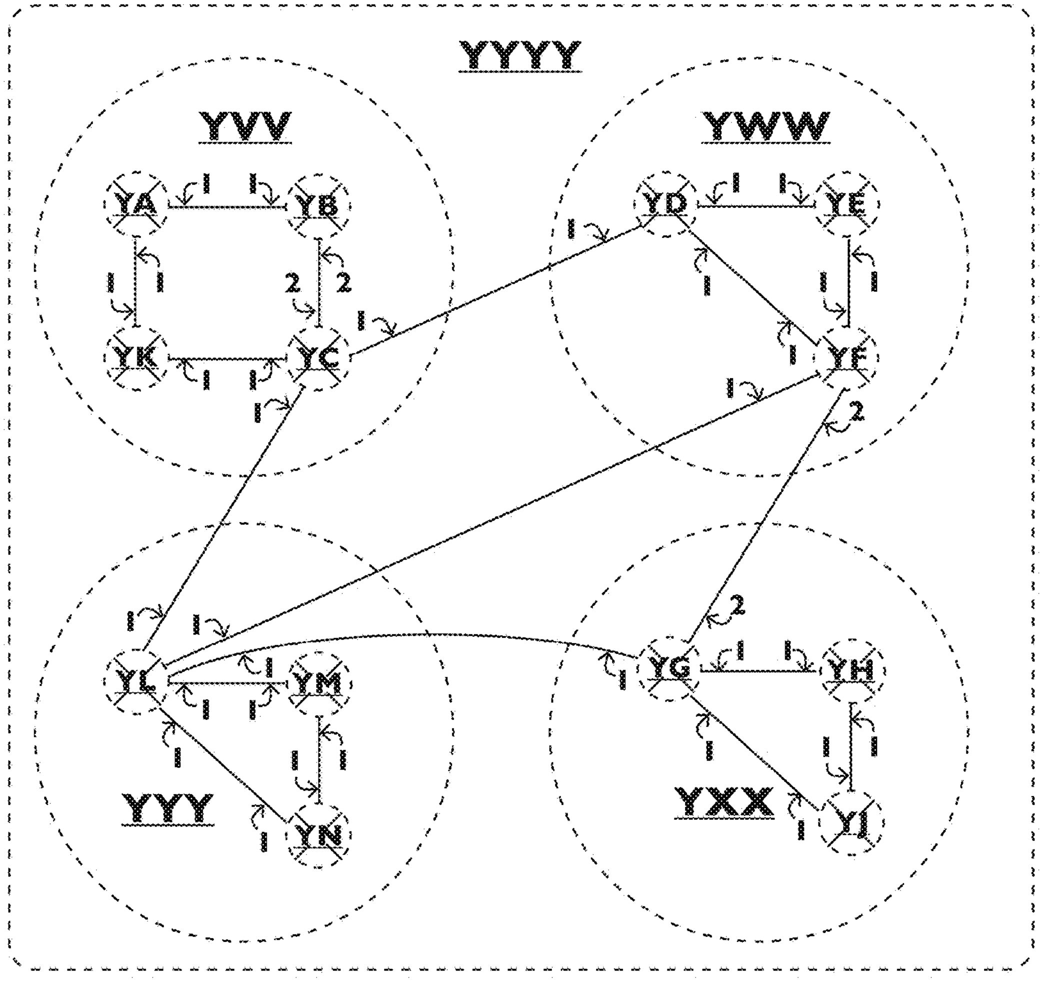
FIG. 32A is a diagram showing a functional representation of an example logical network-of-networks-of-nodes YYYY consisting of example logical network-of-nodes YVV, YWW, YXX, YYY. Logical network-of-nodes YVV consists of logical nodes YA, YB, YC, YK. Logical network-of-nodes YWW consists of logical nodes YD, YE, YF. Logical network-of-nodes YXX consists of logical nodes YG, YH, YJ. Logical network-of-nodes YYY consists of logical nodes YL, YM, YN.
Figure 32B:
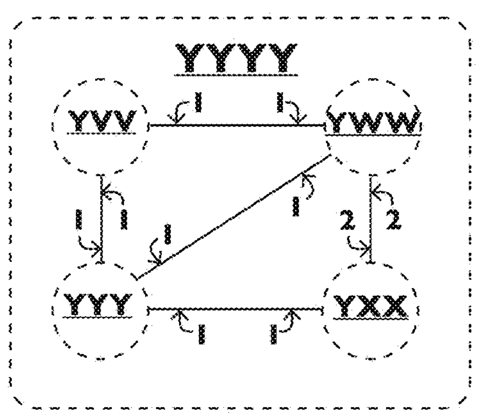
FIG. 32B is a diagram illustrating how logical network-of-nodes YVV, YWW, YXX, YYY are abstracted to logical nodes.

A network can be abstracted to a node and can become a node within another network. This is illustrated in FIGS. 32A and 32B. FIG. 32A shows a functional representation of an example logical network-of-networks-of-nodes YYYY consisting of example logical network-of-nodes YVV, YWW, YXX, YYY. Logical network-of-nodes YVV consists of logical nodes YA, YB, YC, YK. Logical network-of-nodes YWW consists of logical nodes YD, YE, YF. Logical network-of-nodes YXX consists of logical nodes YG, YH, YJ. Logical network-of-nodes YYY consists of logical nodes YL, YM, YN. FIG. 32B illustrates how logical network-of-nodes YVV, YWW, YXX, YYY are abstracted to logical nodes.

In order to avoid any ambiguity, hereafter we will reference to a network at level h consisting of networks at level (h−1). This applies to physical networks, virtual networks and logical networks. Using this terminology, logical network YYYY at level h consists of logical network YVV, YWW, YXX, YYY at level (h−1). Logical network YVV at level (h−1) consists of logical networks YA, YB, YC, YK at level (h−2). Logical network YWW at level (h−1) consists of logical networks YD, YE, YF at level (h−2). Logical network YXX at level (h−1) consists of logical networks YG, YH, YJ at level (h−2). Logical network YYY at level (h−1) consists of logical networks YL, YM, YN at level (h−2). We number h with positive integer starting at 0 (zero). A network with lowest h within a hierarchy of networks is equal to a 'node' referred to thus far.

An overall network consists of layers. We refer to a particular layer as layer n, with n being a positive integer starting at 0 (zero). We refer to layer n=0 as the 'lowest layer'. Examples of layers in current networks are, but not limited to, physical medium layer, frequency- or wavelength-division multiplexing layer, time-division multiplexing layer, data link layer, network layer, transport layer, application layer. Within an overall network a layer n provides services to a layer (n+1) and a layer (n+1) consumes services provided by layer n.

As per the SDN Compiler process described thus far a logical network can be created from a physical network, a virtual network or a combined physical/virtual network. Also, as described above, a logical network can be created from another logical network as forwarding matrices $F^{PoA}{}_{VVV}$ and $F^{Cost\ n}{}_{VVV}$ (output of step 10 of the flowchart of FIG. 25) can be used as a starting point for step 5 of the flowchart of FIG. 25 again, creating recursion. In order to avoid any ambiguity, hereafter we will reference to a network at depth d created from a network at depth (d−1). We refer to a particular depth as depth d, with d being a positive integer starting at 0 (zero). Depth d=0 is equal to a physical or virtual network referred to thus far. Depth d>=1 is equal to a logical network referred to thus far.

Figure 33A:
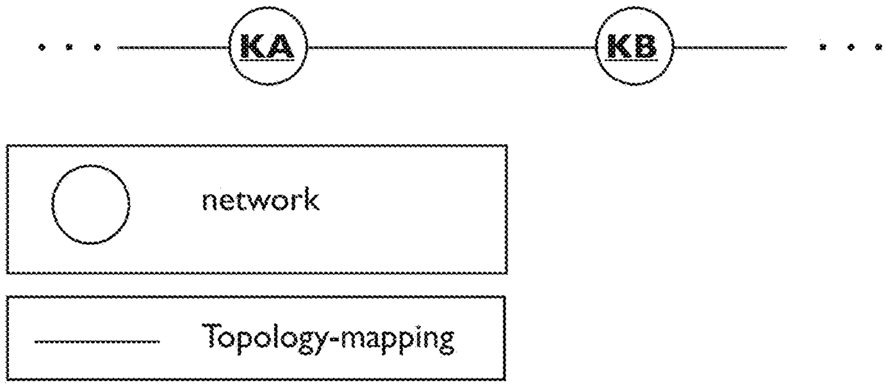
FIG. 33A is a diagram showing networks KA and KB and their topology-mapping relationships.
Figure 33B:
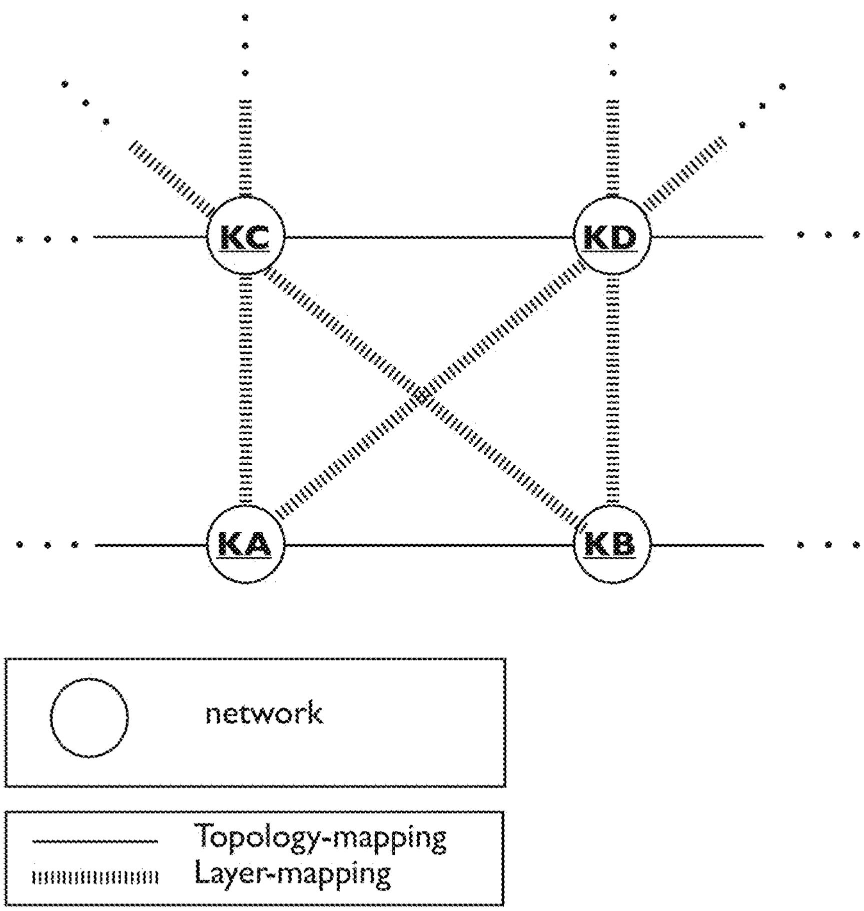
FIG. 33B is a diagram showing networks KA, KB, KC, KD and their mapping relationships either being a topology-mapping or a layer-mapping.
Figure 33C:
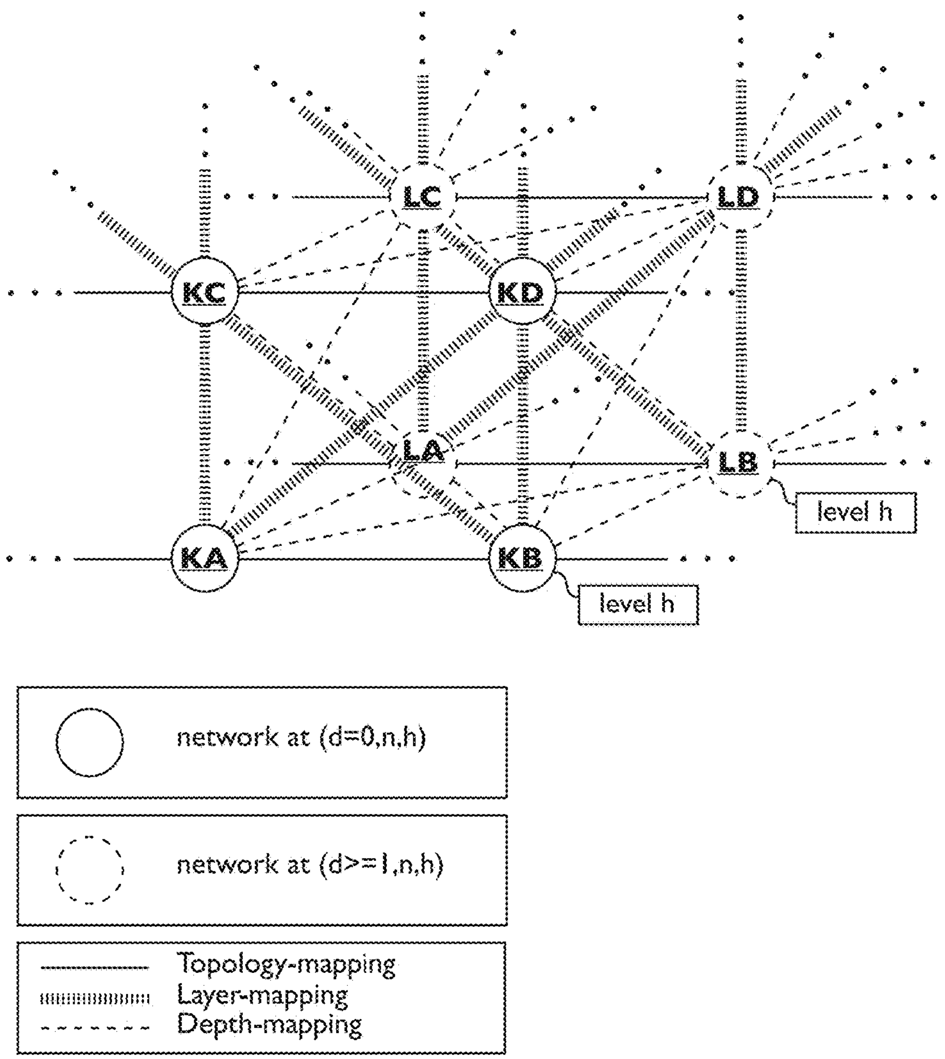
FIG. 33C is a diagram showing networks KA, KB, KC, KD, LA, LB, LC, LD and their mapping relationships either being a topology-mapping, a layer-mapping or a depth-mapping.

The above is illustrated in FIGS. 33A, 33B, 33C. FIG. 33A depicts networks KA and KB being at the same level h and being interconnected by a link. As indicated in FIG. 33A, network KA and network KB could be interconnected to other networks as well. The relationships between networks are referred to as mappings. In order to have a consistent naming for the various mappings that will be introduced hereafter, we will reference to a topology-mapping rather than an adjacency in the modeling of a link in the text below. In case a link is bi-directional, a link creates a pair of topology-mappings between a pair of networks. In case a link is unidirectional, a link creates a single topology-mapping between a pair of networks. A topology-mapping is a mapping from a first network to a second network, the first and second network being at the same depth d and same layer n.

FIG. 33B depicts networks KA, KB, KC, KD being at the same level h. Networks KA and KB are interconnected by links, represented as a topology-mapping. Networks KA and KC are interconnected by links, represented as a layer-mapping. Networks KB and KC are interconnected by links, represented as a layer-mapping. A layer-mapping is a mapping from a first network to a second network, the first and second network being at different layers n.

In FIG. 33C networks KA, KB, KC, KD, LA, LB, LC, LD are shown. Within this diagram each network has the same level h. In case the hierarchy level starts at h=0, a network at h=0 in FIG. 33C is equal to a 'node' referred to thus far, in case h=1 a network in FIG. 33C is equal to a 'network-of-nodes' referred to thus far, in case h=2 a network in FIG. 33 is equal to a 'network-of-networks-of-nodes' referred to thus far, etc. Each network is situated at a particular depth d and layer n. When networks KA and KB are at depth d, layer n, networks KC and KD are at depth d, layer (n+1), networks LA and LB are at depth (d+1), layer n, networks LC and LD are at depth (d+1), layer (n+1).

We distinguish between 3 types of mappings between networks at a particular level h:

Topology-mappings are adjacencies between networks with the same depth d and layer n. Note that an adjacency is a mapping. FIG. 33C shows only topology-mappings between 2 networks (KA and KB, KC and KD, LA and LB, LC and LD) as our illustration is limited to 3 dimensions. In general topology-mappings can exist between an arbitrary number of networks and are typically presented as a 2-dimensional layout and are supported by the SDN Compiler method presented here. Topology-mappings are shown as solid lines. Physical to virtual mappings are a special type of topology-mappings between physical and virtual nodes.

Layer-mappings are relationships between networks at different layers n and same depth d. Layer-mappings are shown as stripes.

Depth-mappings are relationships between networks at different depths d. The physical to logical mapping or virtual to logical mapping referred to thus far are examples of depth-mappings. Depth-mappings are shown as dashed lines. Hereafter we will reference to a network at depth d=0, layer n, level h=0 rather than a physical or virtual node. Hereafter we will reference to a network at depth d>=1, layer n, level h=0 rather than a logical node.

In FIG. 33C depth-mappings between network KA and network LD, between network KB and network LC, between network KC and network LB, between network KD and network LA are not shown to keep the figure relatively simple. In FIG. 33C topology-, layer- and depth-mappings are shown that are connected to only a single network KA, KB, KC, KD, LA, LB, LC or LD and are open-ended with '. . . ' on the other side. These layer-mappings illustrate that layer-mappings can be extended to an arbitrary number of layers. The depth-mappings connected to only a single network illustrate that depth-mappings can be extended to an arbitrary number of depths. The topology-mappings connected to only a single network at level h depict topology-mappings at level (h+1) as will be explained below.

Between networks at different levels we regard level-mappings:

Level-mappings are relationships between networks at different levels and same depth d and same layer n. An example of a level-mapping is a network at level (h+1) consisting of networks at level h. An example of a level-mapping matrix is the network-mapping matrix shown in FIG. 28F.

Figure 34A:
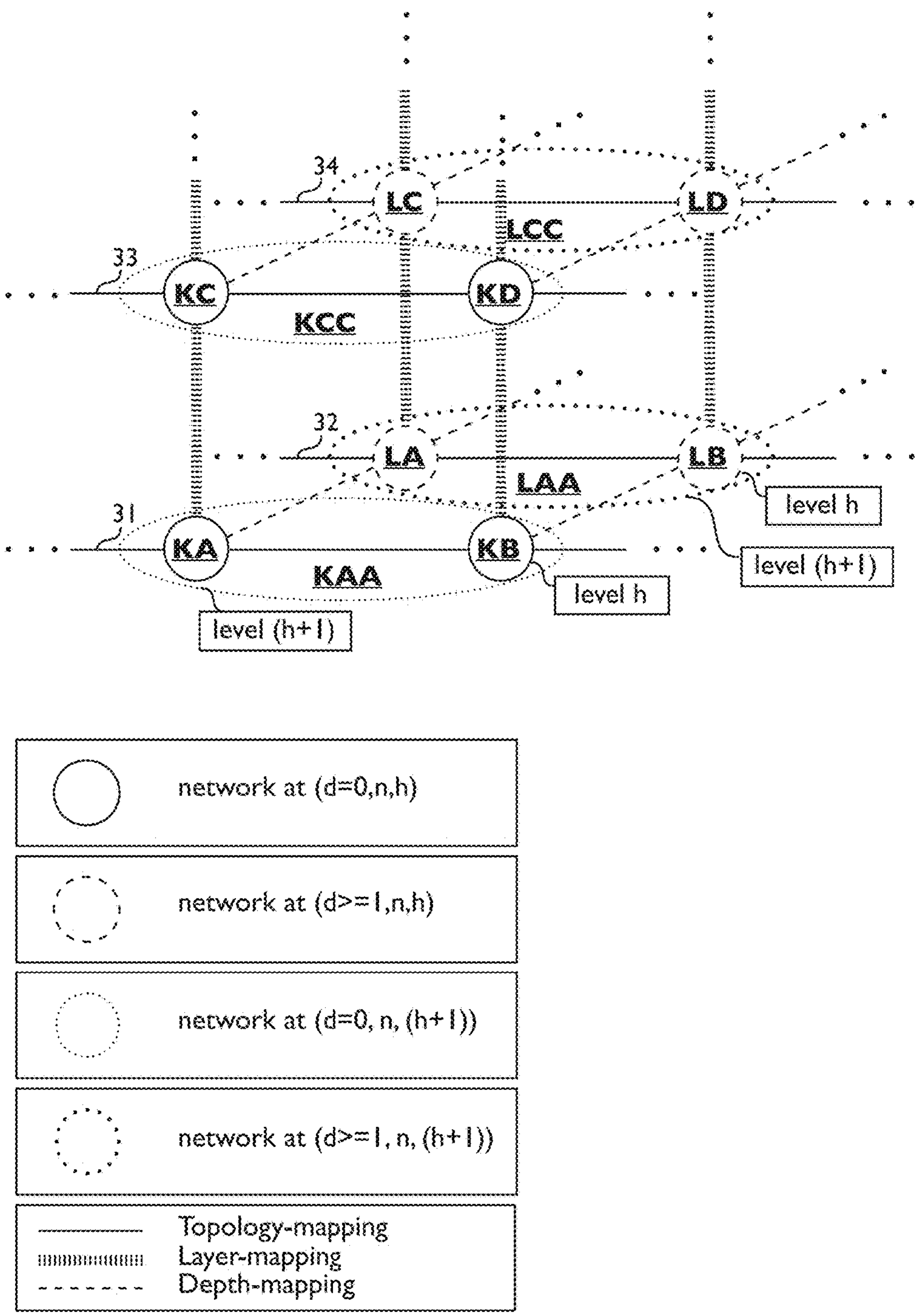
FIG. 34A is a diagram showing networks KA, KB, KC, KD, LA, LB, LC, LD at level h and their mapping relationships as well as networks KAA, KCC, LAA, LCC at level (h+1). Network KAA at (d,n,h+1) contains networks KA and KB both at (d,n,h). Network KCC at (d,n+1,h+1) contains networks KC and KD both at (d,n+1,h). Network LAA at (d+1,n,h+1) contains networks LA and LB both at (d+1,n,h). Network LCC at (d+1,n+1,h+1) contains networks LC and LD both at (d+1,n+1,h). Diagonal layer-mappings between nodes KA and KD, KB and KC, LA and LD, LB and LC which where shown in FIG. 33C have been omitted in this figure to simplify the figure. Diagonal depth-mappings between nodes KA and LA, KB and LA, KC and LD, KD and LC, KA and LC, KC and LA, KB and LD, KD and LB which where shown in FIG. 33C have been omitted in this figure to simplify the figure.

A level-mapping is illustrated in FIG. 34A. FIG. 34A shows networks KA, KB, KC, KD, LA, LB, LC, LD at level h and their topology-mapping, layer-mapping and depth-mapping relationships. Diagonal layer-mappings between nodes KA and KD, KB and KC, LA and LD, LB and LC which were shown in FIG. 33C have been omitted in this figure to simplify the figure. Diagonal depth-mappings between nodes KA and LA, KB and LA, KC and LD, KD and LC, KA and LC, KC and LA, KB and LD, KD and LB which were shown in FIG. 33C have been omitted in this figure to simplify the figure. FIG. 34A also shows networks KAA, KCC, LAA, LCC at level (h+1). Network KAA at (d,n,h+1) contains networks KA and KB both at (d,n,h), in other words network KAA is mapped through a level-mapping to networks KA and KB. Network KCC at (d,n+1,h+1) contains networks KC and KD both at (d,n+1,h), in other words network KCC is mapped through a level-mapping to networks KC and KD. Network LAA at (d+1,n,h+1) contains networks LA and LB both at (d+1,n,h), in other words network LAA is mapped through a level-mapping to networks LA and LB. Network LCC at (d+1,n+1,h+1) contains networks LC and LD both at (d+1,n+1,h), in other words network LCC is mapped through a level-mapping to networks LC and LD.

A topology-mapping (including physical to virtual mapping), layer-mapping, depth-mapping or level-mapping from a first network to a second network can be a 1:1, 1:N or N:1 mapping (first network:second network).

Figure 34B:
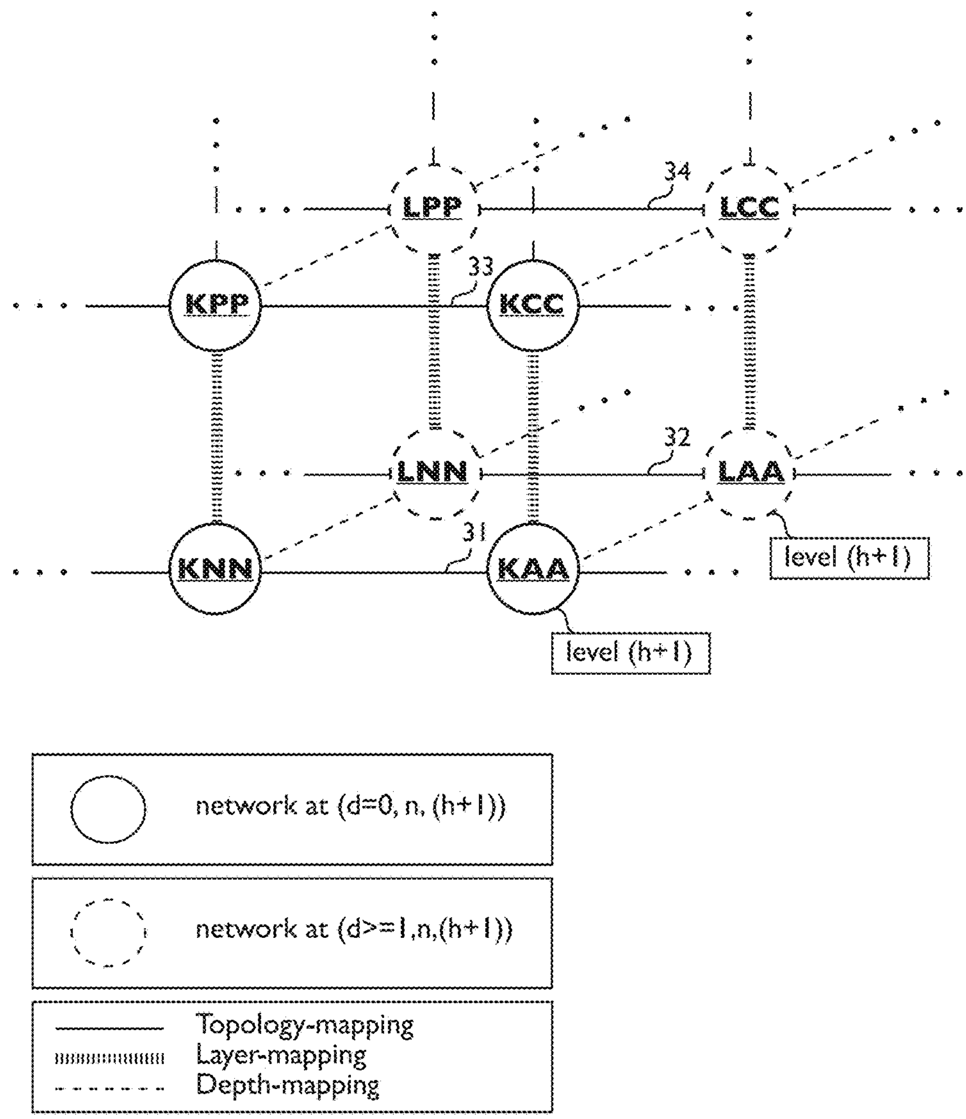
FIG. 34B is a diagram showing networks KAA, KCC, LAA, LCC as well as networks KNN, KPP, LNN, LPP at level (h+1) and their mapping relationships. Diagonal layer-mappings and diagonal depth-mappings have been omitted in this figure to simplify the figure.

We can now represent networks KAA, KCC, LAA, LCC in a similar diagram as FIG. 34A. FIG. 34B shows networks KAA, KCC, LAA, LCC which were shown in FIG. 34A as well as networks KNN, KPP, LNN, LPP and their mapping relationships. Diagonal layer-mappings and diagonal depth-mappings have been omitted in this figure to simplify the figure. Within this diagram each network has the same level (h+1). The topology-mappings connected to only a single network at level h in FIG. 34A, referenced to by 31, 32, 33, 34, depict topology-mappings level (h+1) in FIG. 34B, referenced to by 31, 32, 33, 34.

Figure 35A:
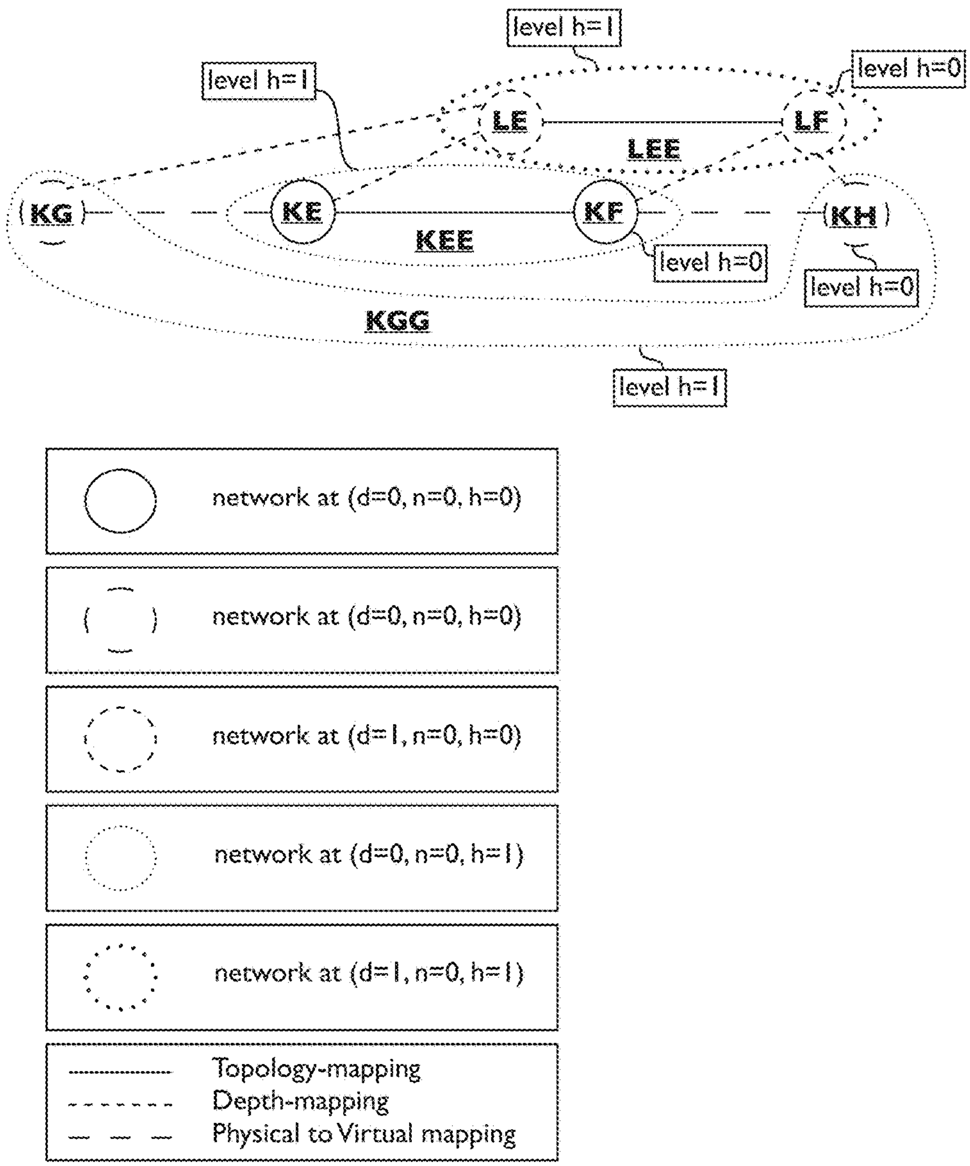
FIG. 35A is a diagram showing networks KE, KF, KG, KH at (d=0, n=0, h=0) and LE, LF at (d=1, n=0, h=0) and their physical to virtual mapping and topology-mapping relationships.
Figure 35B:
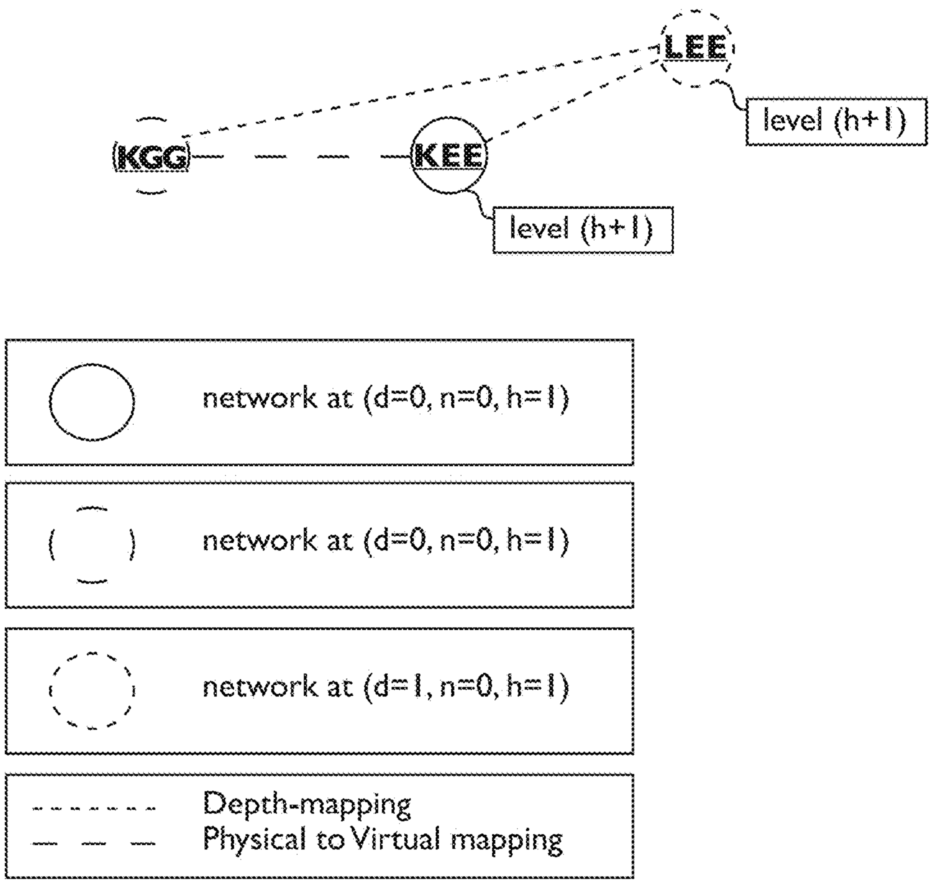
FIG. 35B is a diagram showing networks KEE, KGG at (d=0, n=0, h=1) and LEE LF at (d=1, n=0, h=1) and their physical to virtual mapping and topology-mapping relationships.

In FIG. 35A we illustrate the SDN Compiler method for a single physical network, a single virtual network and a single logical network we have considered thus far. FIG. 35A shows networks KE, KF, KG, KH, LE, LF and their mapping relationships. All networks are at level h=0 as we have only considered a network of nodes thus far. Networks KE and KF at depth d=0, layer n=0, level h=0 were referred to as physical nodes thus far. Networks KG and KH at depth d=0, layer n=0, level h=0 were referred to as virtual nodes thus far. Networks LE and LF at depth d=1, layer n=0, level h=0 were referred to as logical nodes thus far. The topology-mapping between network KE and network KF was referred to as a physical link thus far. The topology-mapping between network LE and network LF was referred to as a logical link thus far. No topology-mapping between network KG and network KH was considered thus far, as there are no links between virtual machines, modeled as virtual nodes, directly. There can be situations however in which there is a topology-mapping between virtual nodes. The topology-mapping between network KE and network KG was referred to as a physical to virtual mapping. The topology-mapping between network KF and network KH was referred to as a physical to virtual mapping. The depth-mapping between network KE and network LE was referred to as a physical to logical mapping. The depth-mapping between network KF and network LF was referred to as a physical to logical mapping. The depth-mapping between network KG and network LE was referred to as a virtual to logical mapping. The depth-mapping between network KH and network LF was referred to as a virtual to logical mapping. FIG. 35B shows networks KEE, KGG, LEE at level h=1 and their mapping relationships. Network KEE at depth d=0, layer n=0, level h=1 was referred to as physical network thus far. Network KGG at depth d=0, layer n=0, level h=1 was referred to as virtual network thus far. Network LEE at depth d=1, layer n=0, level h=1 was referred to as logical network thus far. Hence, and further explained below, the SDN Compiler method for a single physical network, a single virtual network and a single logical network we have considered thus far is a subset of the general SDN Compiler method explained hereafter.

The above generalizes the definition of matrices as follows. We distinguish between the following 4 matrix types:

- PoA-type mapping matrices denoted by $M^{PoA}$ describing mapping relationships between networks expressed in PoAs
- PoA-type forwarding matrices denoted by $F^{PoA}$ describing forwarding (path) relationships between networks expressed in PoAs
- Cost-type mapping matrices denoted by $M^{Cost}$ describing mapping relationships between networks expressed in mapping cost value
- Cost-type forwarding matrices denoted by $F^{Cost}$: describing forwarding (path) relationships between networks expressed in path cost value All matrices have rows and columns and are indexed by network names in both the row (index i) and the column (index j) direction. Index i indicates the source network while index j indicates the destination network in the mapping or path relationship the matrix represents. Note that adjacency matrices are mapping matrices in which rows and columns are indexed by the same set of indices. Therefore, and to limit the number of matrix types used, we will not refer to adjacency matrices below, but to mapping matrices with rows and columns indexed by the same set of indices instead. As an example the PoA-type adjacency matrix of network AAA referred to as $A^{PoA}{}_{AAA}$ thus far will be referred to as the PoA-type mapping matrix $M^{PoA}{}_{AAA\text{-}AAA}$, hereafter.

The 4 mapping types described above are represented in the following mapping matrices:

- PoA-type topology-mapping matrix
- PoA-type layer-mapping matrix
- PoA-type depth-mapping matrix
- PoA-type level-mapping matrix
- Cost-type topology-mapping matrix
- Cost-type layer-mapping matrix
- Cost-type depth-mapping matrix Note that the PoA-type level-mapping matrix was referred to as network-mapping matrix before. In order to refer to the type of mapping more clearly we will refer to PoA-type level-mapping matrix hereafter. Note that no Cost-type level-mapping matrix is used.

Thus far, we have only considered forwarding paths within a particular network represented by a forwarding matrix. Note that a forwarding matrix can also represent paths from a first network to a second network. In this case the row and column indices of the forwarding matrix will be two different sets of indices. In analogy with mapping matrices we will refer to a forwarding matrix representing paths from a first network to a second network as $F_{FIRST\ NETWORK\text{-}SECOND\ NETWORK}$. In case a forwarding matrix is representing forwarding paths within a particular first network we will refer to $F_{FIRST\ NETWORK\text{-}FIRST\ NETWORK}$. As an example the PoA-type forwarding matrix of network AAA, referred to as $F^{PoA}{}_{AAA}$ thus far, will be referred to as PoA-type forwarding matrix $F^{PoA}{}_{AAAA\text{-}AAA}$, hereafter. We will refer to paths from a first network at layer n and depth d to a second network at the same layer n and depth d as topology-paths. Note that as a path is a concatenation of mappings a path can consist of a mixture of topology-mappings, layer-mappings and depth-mappings. We refer to such a path simply as a path.

The paths described above are represented in the following path matrices:

- PoA-type topology-forwarding matrix, representing topology-paths
- PoA-type forwarding matrix, representing paths
- Cost-type topology-forwarding matrix, representing topology-paths
- Cost-type forwarding matrix, representing paths The hierarchy of networks referenced to above is represented by nested matrices, in which an element of a matrix is a matrix itself representing a network. This approach provides an elegant method to describe hierarchical networks as well as the relationship between networks. It provides a compact way to store the network structure and allows the SDN compiler method to quickly respond to any changes in physical, virtual or logical networks and calculate any resulting changes in forwarding table entries.

Also, this approach provides a uniform approach to forwarding policy: a forwarding policy can be specified and applied for any network at any level h. As a network can be abstracted to a node, a policy can be applied at any level h in the same way. As an example but not limited to, a Shortest-Path First (SPF) policy could be applied on hierarchy level h=1 of network YVV (shown in FIG. 32A) representing a networks-of-nodes. The SPF policy could as an example be applied to the cost values given in FIG. 32A. In the same way, a Shortest-Path First (SPF) policy could be applied on hierarchy level h=2 of network YYYY (shown in FIGS. 32A and 32B) representing a network-of-networks-of-nodes, one of the network-of-nodes being YVV. The SPF policy could as an example be applied to the cost values given in FIG. 32B. Specifying a forwarding policy at every network at every level h results in scalability of the network as policy can be applied to a large number of networks or nodes at a lower hierarchy level. Also, it allows for operating a network through policies rather than managing each node individually.

A generic representation of a mapping matrix of a network at level h, with h>=1, is depicted in FIG. 36A. Rows i and columns j of this matrix are indexed by networks at level (h−1). We distinguish between a PoA-type and a Cost-type mapping matrix:

- In case of a PoA-type mapping matrix, each element of the matrix contains a PoA-type mapping-matrix of a network at level (h−1). In case no mapping exists from network i to network j, the value of element i,j is 0 (zero).
- In case of a Cost-type mapping matrix, each element of the matrix contains a Cost-type mapping-matrix of a network at level (h−1). In case no mapping exists from network i to network j, the value of element i,j is ∞ (infinity).

The PoA-type mapping matrix at the lowest hierarchy level h is a PoA-type mapping matrix indexed by only nodes, as defined in FIG. 22A and the description above. The Cost-type mapping matrix at the lowest hierarchy level h is a Cost-type mapping matrix indexed by only nodes, as defined in FIG. 22A and the description above.

Based on the generic representation of a mapping matrix at level h, with h>=1, as depicted in FIG. 36A, a mapping matrix in which the rows and columns are indexed by the same set of nodes in the same sequence takes the form depicted in FIG. 36B.

A generic representation of a forwarding matrix of a network at level h, with h>=1, is depicted in FIG. 36C. Rows i and columns j of this matrix are indexed by networks at level (h−1). We distinguish between a PoA-type and a Cost-type forwarding matrix:

- In case of a PoA-type forwarding matrix, each element of the matrix contains a PoA-type forwarding matrix of a network at level (h−1). In case no path exists from network i to network j, the value of element i,j is 0 (zero).
- In case of a Cost-type forwarding matrix, each element of the matrix contains a Cost-type forwarding matrix of a network at level (h−1). In case no path exists from network i to network j, the value of element i,j is ∞ (infinity).

The PoA-type forwarding matrix at the lowest hierarchy level h is a PoA-type forwarding matrix indexed by only nodes, as defined in FIG. 21A and the description above. The Cost-type forwarding matrix at the lowest hierarchy level h is a Cost-type forwarding matrix indexed by only nodes, as defined in FIG. 21B and the description above.

Based on the generic representation of a mapping forwarding at level h, with h>=1, as depicted in FIG. 36A, a forwarding matrix in which the rows and columns are indexed by the same set of nodes in the same sequence takes the form depicted in FIG. 36D.

The above definition of mapping-matrices and forwarding matrices introduces recursive matrices, reflecting the recursive nature of a hierarchy of networks at various levels h.

As described above, a network can be abstracted to a node, allowing for policy to be applied at any level h in the same way. When specifying the cost of mapping relationships of a network consisting of networks that are abstracted to nodes, the cost is stored in a cost-type mapping matrix as defined in FIG. 22A, as the matrix is not nested.

As an example nested matrices at each level h can be created as follows.

First, mapping and forwarding matrices are created for each network of nodes, as per the description of the SDN-compiler method for a single physical network, a single virtual network and a single physical network.

Second, starting at the hierarchy level of a network-of-networks-of-nodes and iterating to the highest hierarchy level:

- A PoA-type mapping matrix is initialized with value 0 (zero) at all matrix elements, representing no mapping between networks. When a mapping from network i to network j exists, the value of element (i,j) is set to the name of the PoA-type mapping matrix $M^{PoA}_{i\text{-}j}$ A Cost-type mapping matrix is initialized with value ∞ (infinity) at all matrix elements, representing no mapping between networks. When a mapping from network i to network j exists, the value of element (i,j) is set to the name of PoA-type mapping matrix $M^{Cost}_{i\text{-}j}$.

A PoA-type forwarding matrix is initialized with value 0 (zero) at all matrix elements, representing no paths between networks. When a path from network i to network j exists, the value of element (i,j) is set to the name of PoA-type mapping matrix $F^{PoA}_{i\text{-}j}$.

A Cost-type forwarding matrix is initialized with value ∞ (infinity) at all matrix elements, representing no forwarding between networks. When a path from network i to network j exists, the value of element (i,j) is set to the name of PoA-type forwarding matrix $F^{Cost}_{i\text{-}j}$.

Note that in the above description the name of the PoA-type or Cost-type mapping or forwarding matrix is stored at each matrix element. This provides an economical way of storing mappings and paths of the network.

Multiplication of matrices in which the value of each element is the name of a PoA-type or Cost-type mapping or forwarding matrix is carried out by standard matrix multiplication, using the following rules:

The result of a matrix multiplication is a sum of matrix multiplications at each element of the resulting matrix, as names of nested matrices are multiplied.

Each element of this sum of matrix multiplications resulting is stored in a separate row at the element of the resulting matrix.

In case any of the operands in the matrix multiplication of PoA-type mapping and/or forwarding matrices is 0 (zero) the result of the matrix multiplication is 0 (zero).

In case any of the operands in the matrix multiplication of Cost-type mapping and/or forwarding matrices is ∞ (infinity) the result of the matrix multiplication is ∞ (infinity).

We will reference to a network within a hierarchy of networks as follows:

we will reference to a network SAAAA at the highest level h=hmax as 'SAAAA' we will reference to a network SAAA at level h=(hmax−1) within network SAAAA as '(SAAAA,SAAA)' we will reference to a network SA at level h=(hmax−2) within network SAAA within network SAAAA as '(SAAAA, SAAA, SAA)' and so on till the lowest hierarchy level h is reached.

Figure 37B:
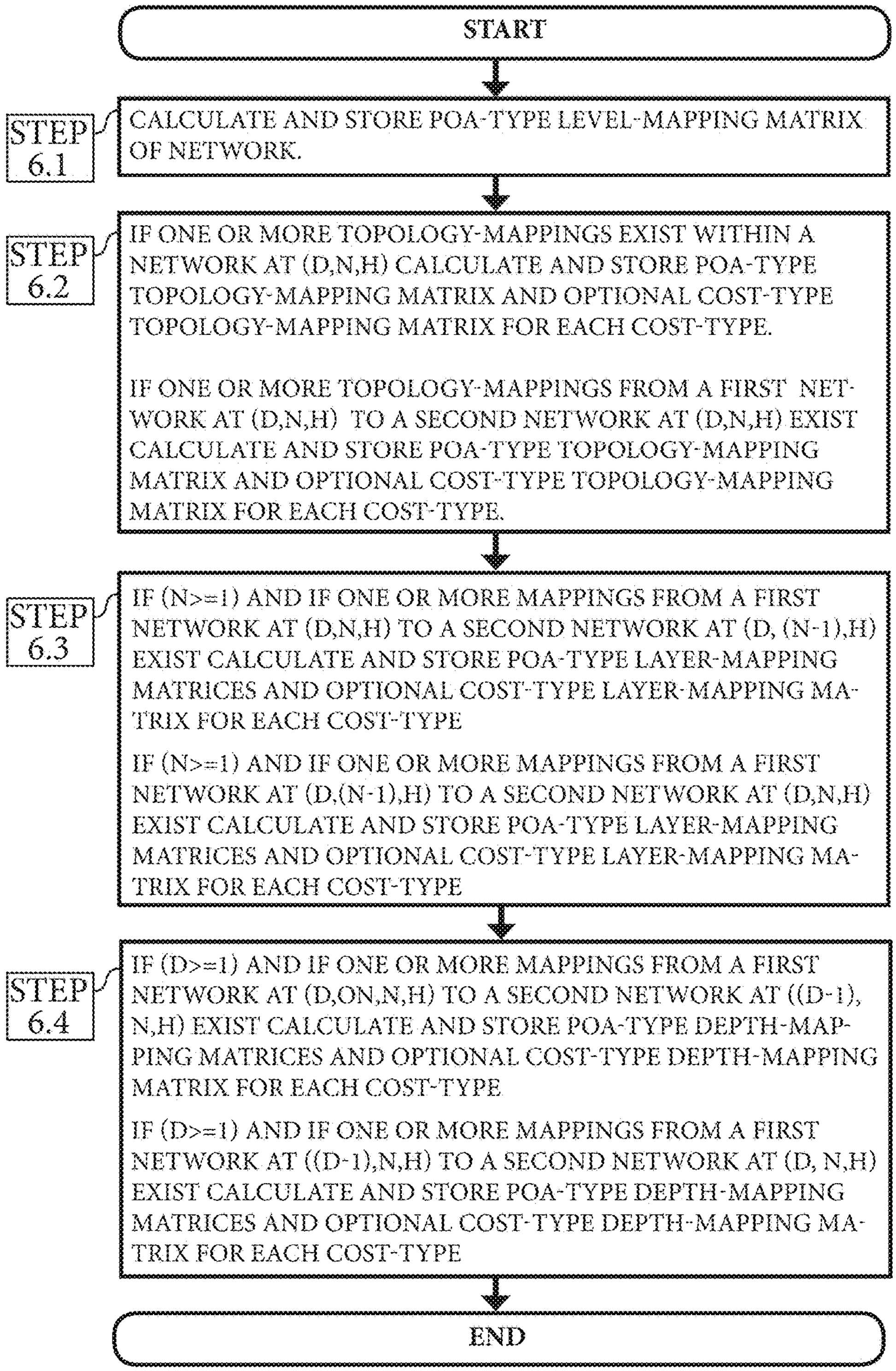
FIG. 37B is a flowchart of sub-steps 6.1 through 6.4 of a detailed example of a SDN Compiler method for an arbitrary network.
Figure 37C:
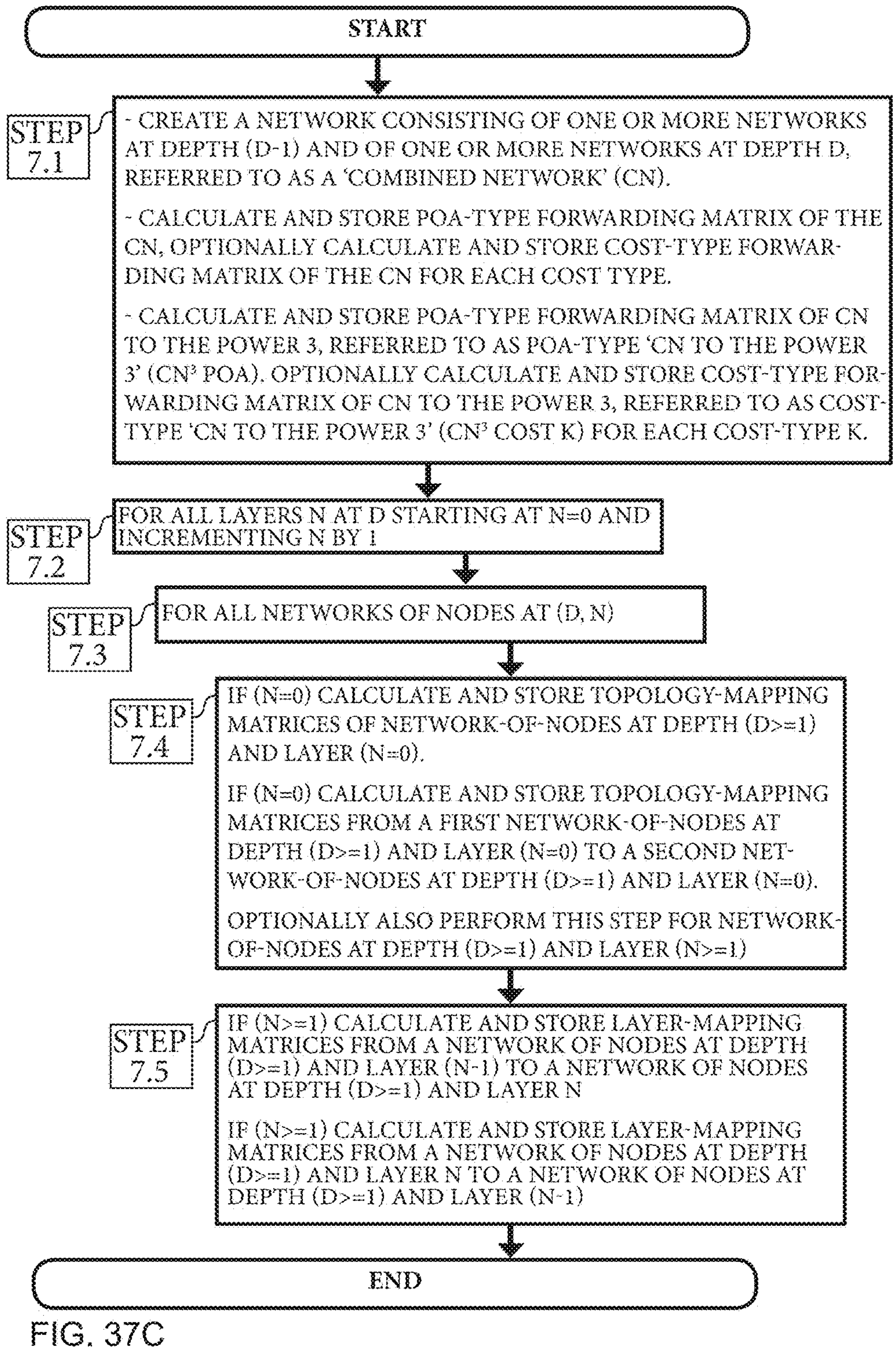
FIG. 37C is a flowchart of sub-sub-steps 7.1 through 7.5 of a detailed example of a SDN Compiler method for an arbitrary network.
Figure 37D:
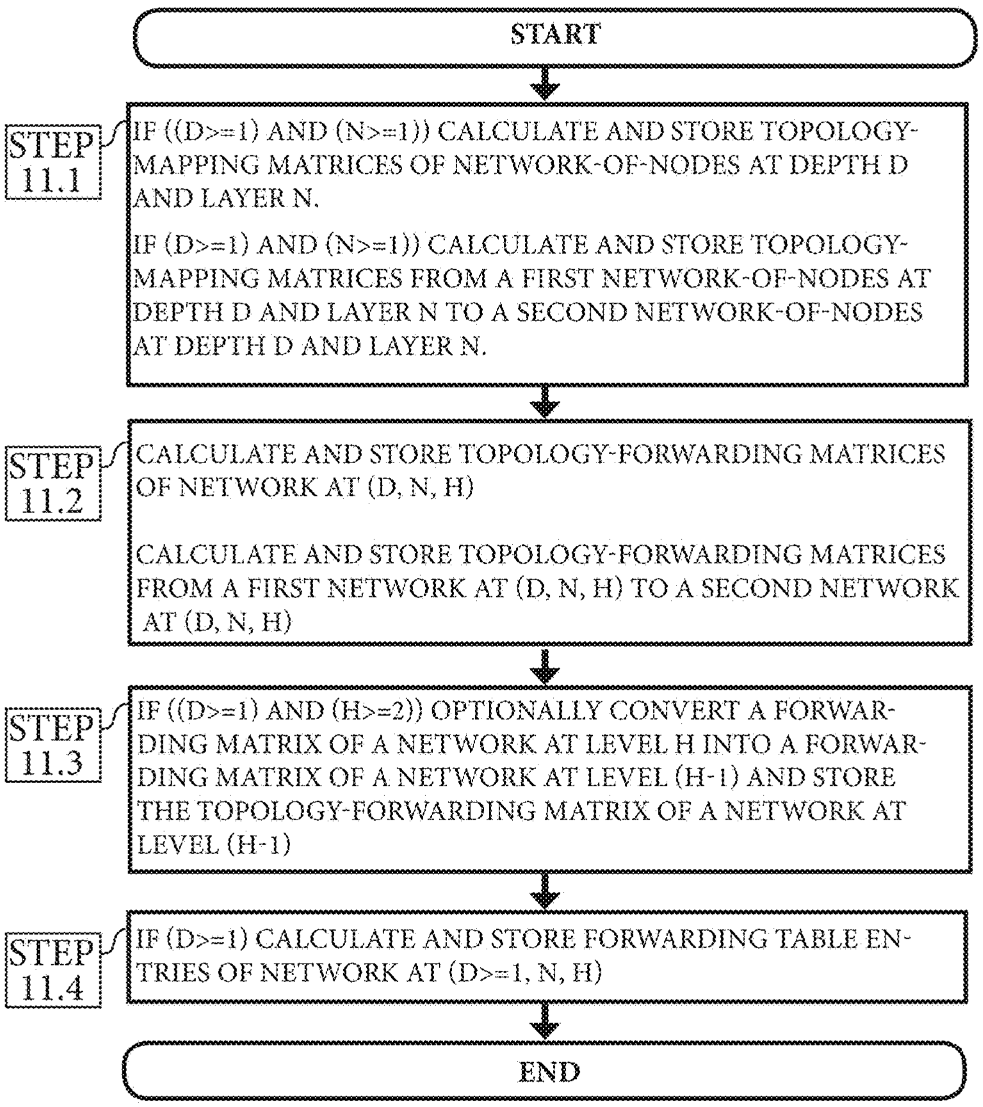
FIG. 37D is a flowchart of sub-steps 11.1 through 11.4 of a detailed example of a SDN Compiler method for an arbitrary network.

FIGS. 37A through 37D depict flowcharts of a detailed example of a SDN Compiler method for an arbitrary network. Step 6 of the flowchart of FIG. 37A refers to sub-steps 6.1 through 6.4, which are shown in FIG. 37B. Step 7 of the flowchart of FIG. 37A refers to sub-steps 7.1 through, 7.5 which are shown in FIG. 37C. Step 12 of the flowchart of FIG. 37A refers to sub-steps 11.1 through 11.4, which are shown in FIG. 37D. Each step is described below.

FIG. 37E compares the SDN Compiler method of a single physical network, a single virtual network, a single logical network as shown in the flowchart of FIG. 25 to the SDN Compiler method of an arbitrary network of as shown in the flowchart of FIGS. 37A through 37D.

Step 1:

An infinite loop is created to ensure new forwarding table entries representing a particular 'network state' are created and distributed when changes are made to any of the below retrieved and stored elements. This is equivalent to the statement at the bottom of the flowchart of FIG. 25 "repeat (part of) process in case of any change". The indentation in the flowchart depicts the scope of this loop.

Steps 2 through 4:

In steps 2 through 4 information is retrieved and stored. This information relates both to status information of the networks and to changes in that status. In case depth d=0 the information retrieved and stored in steps 2 through 4 is retrieved from the physical network directly or indirectly. In case depth d>=1 this information is defined by the user of the SDN Compiler. So, the SDN Compiler receives this information from the user. In case depth d=0 depending on the implementation this information could be retrieved from, but is not limited to, a SDN controller, the nodes directly, a network management system, a network operations system, a cloud management system, other means or a combination of the above.

Step 2:

Retrieve and store changes in network instances, including creation and deletion of networks.

For all networks retrieve and store changes in name of network, depth d, layer n, level h.

For all networks with (h=0) retrieve and store changes in type. This is equivalent to storing the 'node type' in the terminology used in step 1 (physical node type) and step 5 (virtual node type) of the flowchart of FIG. 25.

For all networks being a node and at (d=0) retrieve and store changes in Point-of-Attachments (PoA's). This is equivalent to storing the Point-of-Attachments (PoA's) in step 1 (physical PoA's) and step 5 (virtual PoA's) of the flowchart of FIG. 25.

For all networks with (h>=1) retrieve and store changes in name of networks (d,n,(h−1)) network (d,n,h) consists of. For (h=1) this is equivalent to storing the node names of a network in step 1 (physical network and nodes) and step 5 (virtual network and nodes, logical network and nodes) of the flowchart of FIG. 25.

Optionally store additional information

The 'changes in' referenced to above include initialization as well as changes in properties after initialization.

Step 3:

For all networks changes in mappings and optional mapping Costs for each Cost are retrieved and stored for the 4 (four) types of mappings described above:

Level-mappings

Topology-mappings

Layer-mappings

Depth-mappings

In case the cost type is 'latency', its value is typically retrieved from measurement. In case of other cost types, its value is typically defined in an operations system.

Step 4:

For all networks with (h>=1) changes to forwarding policies are retrieved and stored. As mentioned above, the relationship between the adjacencies in a network and the paths in a network is determined by the forwarding policy of the particular network. Examples of typical forwarding policies were given in the description of step 4 of the flowchart of FIG. 25 and apply to all networks with (h>=1). Note that policy is applied to every network at every depth d, at every layer n, at every level h providing a network-wide rather than per-node based approach to policy.

Step 5:

Step 5 starts at depth d=0 and iterates over the total number of depths d, incrementing d by 1 (one) at each step of the loop. The indentations in the flowchart of FIG. 37A depict the scope of each loop.

In this example 'for loops' are used, alternatively, other types of loops such as but not limited to 'while loops', 'do-while loops', 'for-each loops' could be used.

Step 6:

Step 6 of this flowchart iterates over all networks at all levels h at all layers n at depth d and calculates and stores all mapping matrices for all of these networks. Step 6 refers to sub-steps 6.1 through 6.4, which are shown in FIG. 37B and are described below. The PoA-type and Cost-type matrices are created for the four mapping types being level-mappings, topology-mappings, layer-mappings, depth-mappings described above as described in steps 6.1 through 6.4 of the flowchart of FIG. 37B.

Step 7:

Step 7 is performed if (d>=1) and refers to sub-steps 7.1 through 7.5, which are shown in FIG. 37C and are described below.

Step 8:

Step 8 starts at layer n=0 and iterates over the total number of layers n at a particular depth d, incrementing n by 1 (one) at each step of the loop.

Step 9:

Step 9 starts at level h=1 and iterates over the total number of levels h at a particular layer n, at a particular depth d, incrementing h by 1 (one) at each step of the loop.

Step 10:

Step 10 iterates over all the networks at a particular level h, at a particular layer n, at a particular depth d. We refer to this network as being at (d, n, h). Optionally, we refer to a particular network name for a network at (d, n, h).

Step 11:

In step 11.1, PoA-type topology-mapping matrices are re-calculated for a network at (d, n, h), based on layer-mappings between the network at (d, n, h) and a network at (d, (n−1), h) and the topology-forwarding matrix of the network at (d,(n−1),h). In step 11.2 topology-forwarding matrices are calculated for a network at (d, n, h). In step 11.4 the forwarding table entries resulting from the topology-forwarding matrices calculated at step 11.2 are calculated for a network at (d, n, h). Step 11 of this flowchart refers to sub-steps 11.1 through 11.4, which are shown in FIG. 37D and are described below.

Step 12:

The calculated forwarding table entries are sent to the 'SDN Controller' responsible for the distribution of the forwarding table entries to all nodes at depth d=0, being physical or virtual nodes. Alternatively, depending on the implementation, the 'SDN Compiler' could also send the forwarding entries directly to all nodes at depth d=0, being physical or virtual nodes. This step is equivalent to step 12 of the flowchart of FIG. 25.

Now, reference is made to FIG. 37B.

Step 6.1 (Level-Mapping):

For each network GA at level (h>=1) calculate and store a PoA-type level-mapping matrix consisting of a single row indexed by network GA at (d, n, h) and columns indexed by network(s) at (d, n, (h−1)) that network GA at (d, n, h) consists of. The value of all cells is 1 (one). This matrix is referred to as $M^{PoA}_{GA}$. Examples of level-mapping matrices for networks at level (h=1) are given in FIGS. 27A, 28A, 28F. An example of a level-mapping matrix for a network at (h=2) is given in FIG. 43A.

Step 6.2 (Topology-Mapping):

- If one or more topology-mappings (above referred to as adjacencies) exist within a network GA at (d,n,h) calculate and store a PoA-Type topology-mapping matrix $M^{PoA}_{GA-GA}$.
- If one or more topology-mappings (above referred to as adjacencies) from network GA to network GB exist calculate and store a PoA-type topology-mapping matrix $M^{PoA}_{GA-GB}$.
- Optionally for each Cost-type k if one or more topology-mappings (above referred to as adjacencies) exist within a network GA at (d,n,h) calculate and store a Cost-type topology-mapping matrix $M^{Cost\ k}_{GA-GA}$.
- Optionally for each Cost-type k if one or more topology-mappings (above referred to as adjacencies) from network GA to network GB exist Cost-type topology-mapping matrix $M^{Cost\ k}_{GA-GB}$.

Examples of a topology-mapping matrices for a network-of-nodes at (h=1) are given in FIGS. 46A, 46B, 47A, 47B. Examples of topology-mapping matrices for a network-of-networks at (h=2) are given in FIG. 43B.

Step 6.3 (Layer-Mapping):

- For each network GA at (d=0) and at layer (n>=1) and each network GC at (d=0) and at layer (n−1) when one or more mappings from network GA to network GC exists create a PoA-type layer mapping matrix $M^{PoA}_{GA-GC}$
- For each network GA at layer (n>=1) and each network GC at layer (n−1) when one or more mappings from network GC to network GA exist create a PoA-type layer-mapping matrix $M^{PoA}_{GC-GA}$
- Optionally for each Cost-type k for each network GA at layer (n>=1) and each network GC at layer (n−1) when one or more mappings from network GA to network GC exist create a Cost-type layer-mapping matrix $M^{Cost\ k}_{GA-GC}$
- Optionally for each Cost-type k for each network GA at layer (n>=1) and each network GC at layer (n−1) when one or more mappings from network GC to network GA exist create a Cost-type layer-mapping matrix $M^{Cost\ k}_{GC-GA}$ Step 6.4 (Depth-Mapping):

- For each network GA at depth (d>=1) and each network GD at depth (d−1) when one or more mappings from network GA to network GD exists create a PoA-type depth-mapping matrix $M^{PoA}_{GA-GD}$
- For each network GA at depth (d>=1) and each network GD at depth (d−1) when one or more mappings from network GD to network GA exists create a PoA-type depth-mapping matrix $M^{PoA}_{GD-GA}$
- Optionally for each Cost-type k for each network GA at depth (d>=1) and each network GD at depth (d−1) when one or more mappings from network GA to network GD exists create a Cost-type mapping matrix $M^{Cost\ k}_{GA-GD}$
- Optionally for each Cost-type k for each network GA at depth (d>=1) and each network GD at depth (d−1) when one or more mappings from network GD to network GA exists create a Cost-type mapping matrix $M^{Cost\ k}_{GD-GA}$ An example of a depth-mapping matrix for a network at (h=1) is given in FIGS. 28G and 28H. An example of a depth-mapping matrix for a network at (h=2) is given in FIG. 46C.

Now, steps 7.1 through 7.5 are described as shown in FIG. 37C.

Step 7.1:

The objective of step 7 is to find:

a) paths from a first network-of-nodes at depth d and layer n, the path traversing a second network at depth (d−1), to the first network-of-nodes at depth d and layer n. These paths will become possible topology-mapping relationships.

b) paths from a first network-of-nodes at depth d and layer n, the path traversing a second network at depth (d−1), to a third network-of-nodes at depth d and layer n. These paths will become possible topology-mapping relationships.

c) paths from a first network-of-nodes at depth d and layer n, the path traversing a second network at depth (d−1), to a third network-of-nodes at depth d and layer (n−1). These paths will become possible layer-mapping relationships.

d) paths from a first network-of-nodes at depth d and layer (n−1), the path traversing a second network at depth (d−1), to a third network-of-nodes at depth d and layer n. These paths will become possible layer-mapping relationships.

An example, but not limited to, of a topology-mapping using method a) above is a topology-mapping from network LA to network LB calculated as a concatenation of a depth-mapping from network LA to network KA, a path comprising of a topology-mapping from network KA to network KB and a depth-mapping from network KB to network LB, in the set of networks shown in FIG. 34A. Another example, but not limited to, of a topology-mapping calculated using a) above is the topology-mapping from network LE at (d=1, n=0, h=0) to network LF at (d=1, n=0, h=0) in the set of networks of FIG. 35A as described above.

In case a) above we are looking for matrix relationships of the form:

$$(F^{PoA}_{\text{FIRST NETWORK AT DEPTH D-SECOND NETWORK AT DEPTH (D-1)}} \cdot F^{PoA}_{\text{SECOND NETWORK AT DEPTH (D-1)-SECOND NETWORK AT DEPTH (D-1)}} \cdot F^{PoA}_{\text{SECOND NETWORK AT DEPTH (D-1)-FIRST NETWORK AT DEPTH D}})$$

In cases b) through d) above we are looking for matrix relationships of the form:

$$(F^{PoA}_{\text{FIRST NETWORK AT DEPTH D-SECOND NETWORK AT DEPTH (D-1)}} \cdot F^{PoA}_{\text{SECOND NETWORK AT DEPTH (D-1)-SECOND NETWORK AT DEPTH (D-1)}} \cdot F^{PoA}_{\text{SECOND NETWORK AT DEPTH (D-1)-THIRD NETWORK AT DEPTH D}})$$

The following method is used to accomplish this objective:

- If (d>=1) create a network consisting of one or more networks at depth (d−1) and of one or more networks at depth d, referred to as a 'Combined Network' (CN).
- If (d>=1) Calculate and store PoA-type forwarding matrix of the CN, optionally calculate and store Cost-type forwarding matrix of the CN for each cost type. The calculation of a forwarding matrix is explained in more detail in the description of step 11.2.
- If (d>=1) Calculate and store PoA-type forwarding matrix of CN to the power 3, referred to as PoA-type 'CN to the power 3' ($CN^{3\ PoA}$). Optionally calculate and store Cost-type forwarding matrix of CN to the power 3, referred to as Cost-type 'CN to the power 3' ($CN^{3\ Cost\ k}$) for each Cost-type k.

As an example, but not limited to, CN could consist of all networks at all levels h at all layers n at depth (d−1) and all networks at all levels h at all layers n at depth d. CN could also consist of a subset of these networks.

Note that by calculating $CN^{3\ PoA}$ we calculate possible paths consisting of a concatenation of 3 paths, each of the 3 paths being either:

- a path traversing a network at depth (d−1)
- a path traversing a network at depth d
- a path from a network at depth (d−1) to a network at depth d
- a path from a network at depth d to a network at depth (d−1)

As per our objective, from $CN^{3\ PoA}$ we select and store all matrix relationships that take the form:

$$(F^{PoA}_{\text{FIRST NETWORK AT DEPTH D-SECOND NETWORK AT DEPTH (D-1)}} \cdot F^{PoA}_{\text{SECOND NETWORK AT DEPTH (D-1)-SECOND NETWORK AT DEPTH (D-1)}} \cdot F^{PoA}_{\text{SECOND NETWORK AT DEPTH (D-1)-FIRST NETWORK AT DEPTH D}})$$

Now possible paths have been stored from a first network at depth d to a first network at depth d traversing a second network at depth (d−1). Now, as the matrices are nested, the required mapping relationships are found at level h of a network-of-nodes.

The same process can be followed for Cost-type matrices of Cost-type k that accompany the PoA-type forwarding matrices used in above method.

The method can be applied to an arbitrary number of hierarchy levels due to it's recursive nature.

Step 7.2:

Step 7.2 starts at layer n=0 and iterates over the total number of layers n at a particular depth d, incrementing n by 1 (one) at each step of the loop.

Step 7.3:

Step 7.3 iterates over all the networks of nodes at a particular layer n at a particular depth d.

Step 7.4:

If (n=0) calculate and store topology-mapping matrices of network-of-nodes at depth (d>=1) and layer (n=0).

If (n=0) calculate and store topology-mapping matrices from a first network-of-nodes at depth (d>=1) and layer (n=0) to a second network-of-nodes at depth (d>=1) and layer (n=0).

Optionally perform this step at (n>=1) as well:

- Optionally, if (n>=1) calculate and store topology-mapping matrices of network-of-nodes at depth (d>=1) and layer (n>=1).
- Optionally, if (n>=1) calculate and store topology-mapping matrices from a first network-of-nodes at depth (d>=1) and layer (n>=1) to a second network-of-nodes at depth (d>=1) and layer (n>=1).

In step 6.2 topology-mapping matrices have been defined for each network. In case of a network-of-nodes at depth (d>=1) these topology-mapping matrices contain a 1 (one) in case of topology-mapping. In this step we will re-calculate these topology-mapping matrices with a sequence of PoAs denoting a path within a network at (d=0) for the elements that contain a 1 (one) denoting a topology-mapping.

Using $CN^{3\ PoA}$ as calculated in step 7.1 and the method of step 7.1 we calculate and store the following paths referenced to with a) and b) at step 7.1:

a) paths from a first network-of-nodes at depth d and layer (n=0), the path traversing a second network at depth (d−1), to the first network-of-nodes at depth d and layer (n=0). These paths become possible topology-mapping relationships.

b) paths from a first network-of-nodes at depth d and layer (n=0), the path traversing a second network at depth (d−1), to a third network-of-nodes at depth d and layer (n=0). These paths become possible topology-mapping relationships.

As explained in step 7.1 above in case a) the resulting matrix relationships take the form:

$$(F^{PoA}_{\text{FIRST NETWORK AT DEPTH D-SECOND NETWORK AT DEPTH (D-1)}} \cdot F^{PoA}_{\text{SECOND NETWORK AT DEPTH (D-1)-SECOND NETWORK AT DEPTH (D-1)}} \cdot F^{PoA}_{\text{SECOND NETWORK AT DEPTH (D-1)-FIRST NETWORK AT DEPTH D}})$$

As explained in step 7.1 above in case a) the resulting matrix relationships take the form:

$$(F^{PoA}_{FIRST\ NETWORK\ AT\ DEPTH\ D\text{-}SECOND\ NETWORK\ AT\ DEPTH\ (D\text{-}1)} \cdot F^{PoA}_{SECOND\ NETWORK\ AT\ DEPTH\ (D\text{-}1)\text{-}SECOND\ NETWORK\ AT\ DEPTH\ (D\text{-}1)} \cdot F^{PoA}_{SECOND\ NETWORK\ AT\ DEPTH\ (D\text{-}1)\text{-}THIRD\ NETWORK\ AT\ DEPTH\ D})$$

For each element (i,j) of the topology-mapping matrix of the network-of-nodes that contains a 1 (one) we calculate the above relationships and store the result in element (i, j) of the topology-mapping matrix in case the result is a sequence of PoAs. In case the value of matrix element (i,j) of the topology-mappings matrix is 1 (one), representing a topology-mapping defined by the user of the SDN Compiler, and a path, represented by a sequence of PoA's, is not present at matrix element (i,j) of any of the calculated matrices, the user of the SDN Compiler is notified with an error message, indicating that the specified topology-mapping can not be created.

The same process can be followed for Cost-type matrices of Cost-type k that accompany the PoA-type topology-mapping matrices.

As an example, but not limited to, this can be done in the following ways:

1) Calculate the resulting topology-mapping matrix containing possible topology-mappings for all matrix elements (i,j) and copy the topology-mappings to the elements containing the value 1 (one).
2) Only calculate the value of above relationship for element (i,j), being potentially a much faster method as only the topology-mappings that have been defined by the user of the SDN-compiler are calculated rather than possible paths for all matrix elements.

As an example, but not limited to, approach 2) could be realized as follows. The path relationship is typically given by a multiplication of 3 matrices, as per above generalized relationship. The value of cell (i,j) for a multiplication of 3 matrices M1, M2, M3 can be calculated by multiplying the following matrices:

row i of matrix M1
matrix M2
column j of matrix M3

MR2 now contains the value of cell (i, j) of (M1·M2·M3), resulting in much improved calculation speed compared to overall multiplication of 3 matrices. When the number of topology-mappings defined by the user of the SDN-compiler is much smaller than possible paths for all matrix cells, which is typically the case, this approach results in a much faster calculation.

Note that this step is performed at (n=0), being the lowest layer, at a particular depth d. As all other layers (n>=1) at a particular depth d utilize services from layer (n−1), possible paths at these layers (n>=1) depend on layer (n−1) and are calculated by performing a transformation of path relationships in a first network to possible link relationships in a second network, where the first and second networks are at different layers. This is performed at step 11.1 and described below. An example, but not limited to, is a topology-mapping from network LC to network LD calculated as a concatenation of a layer-mapping from network LC to network LA, a path comprising of a topology-mapping from network LA to network LB and a layer-mapping from network LB to network LD, in the set of networks shown in FIG. 34A.

Alternatively, this step can be performed for an arbitrary layer n at depth d, in case the forwarding policy of network(s) at layers below layer n at depth d are not used, but forwarding policies of network(s) at depth (d−1) are used.

Using $CN^{3\ PoA}$ as calculated in step 7.1 and the method of step 7.1 we calculate and store the following paths referenced to with a) and b) at step 7.1:

a) paths from a first network-of-nodes at depth d and layer n, the path traversing a second network at depth (d−1), to the first network-of-nodes at depth d and layer n. These paths become possible topology-mapping relationships.

b) paths from a first network-of-nodes at depth d and layer n, the path traversing a second network at depth (d−1), to a third network-of-nodes at depth d and layer n. These paths become possible topology-mapping relationships.

Note that this step was performed in step 6 of the flowchart of FIG. 25 as well for a single physical network, single virtual network single logical network, at which we calculated:

$$A^{PoA\ ALL}_{VVV} = M^{PoA}_{VVV\text{-}AAA/KKK} \cdot (M^{PoA}_{AAA/KKK\text{-}AAA} \cdot F^{PoA}_{AAA} \cdot M^{PoA}_{AAA\text{-}AAA/KKK}) \cdot M^{PoA}_{AAA/KKK\text{-}VVV}$$

The term between brackets in step 6 of the flowchart of FIG. 25 being $(M^{PoA}_{AAA/KKK\text{-}AAA} \cdot F^{PoA}_{AAA} \cdot M^{PoA}_{AAA\text{-}AAA/KKK})$ represents all paths within network AAA/KKK and is therefore $F^{PoA}_{AAA/KKK\text{-}AAA/KKK}$.

Therefore, step 6 of the flowchart of FIG. 25 can be written as:

$$A^{PoA\ ALL}_{VVV} = M^{PoA}_{VVV\text{-}AAA/KKK} \cdot F^{PoA}_{AAA/KKK} \cdot M^{PoA}_{AAA/KKK\text{-}VVV}$$

As $F^{PoA}_{VVV\text{-}AAA/KKK} \cdot M^{PoA}_{VVV\text{-}AAA/KKK}$ and $F^{PoA}_{AAA/KKK\text{-}VVV} \cdot M^{PoA}_{AAA/KKK\text{-}VVV}$, as will be explained in detail in step 11.2, this can be written as:

$$A^{PoA\ ALL}_{VVV} = F^{PoA}_{VVV\text{-}AAA/KKK} \cdot F^{PoA}_{AAA/KKK} \cdot F^{PoA}_{AAA/KKK\text{-}VVV}$$

As explained above, adjacency matrices are now referred to as topology-mappings. As explained above, a forwarding matrix representing paths within a network is written as: $F_{First\ Network\text{-}First\ Network}$. Apply this yields:

$$M^{PoA\ ALL}_{VVV\text{-}VVV} = F^{PoA}_{VVV\text{-}AAA/KKK} \cdot F^{PoA}_{AAA/KKK\text{-}AAA/KKK} \cdot F^{PoA}_{AAA/KKK\text{-}VVV}$$

in which:

network of nodes AAA/KKK is a combined network, combining a physical network AAA and a virtual network KKK, being at depth d=0.

network of nodes VVV is a logical network, being at depth d=1.

This relationship is identical to the relationship given in step 7.1:

$$(F^{PoA}_{FIRST\ NETWORK\ AT\ DEPTH\ D\text{-}SECOND\ NETWORK\ AT\ DEPTH\ (D\text{-}1)} \cdot F^{PoA}_{SECOND\ NETWORK\ AT\ DEPTH\ (D\text{-}1)\text{-}SECOND\ NETWORK\ AT\ DEPTH\ (D\text{-}1)} \cdot F^{PoA}_{SECOND\ NETWORK\ AT\ DEPTH\ (D\text{-}1)\text{-}FIRST\ NETWORK\ AT\ DEPTH\ D})$$

Therefore, the relation performed in step 6 of the flowchart of FIG. 25 would result from the generalized approach presented.

Step 7.5

If (n>=1) calculate and store layer-mapping matrices from a network of nodes at depth d>=1 and layer (n−1) to a network of nodes at depth (d>=1) and layer n.

If (n>=1) calculate and store layer-mapping matrices from a network of nodes at depth d>=1 and layer n to a network of nodes at depth (d>=1) and layer (n−1).

In step 6.3 layer-mapping matrices have been defined for each network. In case of a network-of-nodes at depth (d>=1) these layer-mapping matrices contain a 1 (one) in case of layer-mapping. In this step we will re-calculate these layer-mapping matrices with a sequence of PoAs denoting a path within a network at (d=0) for the elements that contain a 1 (one) denoting a layer-mapping.

Using $CN^{3\ PoA}$ as calculated in step 7.1 and the method of step 7.1 we calculate and store the following paths referenced to with c) and d) at step 7.1:

c) paths from a first network-of-nodes at depth d and layer n, the path traversing a second network at depth (d−1), to a third network-of-nodes at depth d and layer (n−1). These paths become possible layer-mapping relationships.

d) paths from a first network-of-nodes at depth d and layer (n−1), the path traversing a second network at depth (d−1), to a third network-of-nodes at depth d and layer n. These paths become possible layer-mapping relationships.

An example, but not limited to, of a layer-mapping using method c) above is a layer-mapping from network LC to network LA calculated as a concatenation of a depth-mapping from network LC to network KC, a layer-mapping from network KC to network KA and a depth-mapping from network KA to network LA, in the set of networks shown in FIG. 34A. An example, but not limited to, of a layer-mapping using method d) above is a layer-mapping from network LB to network LD calculated as a concatenation of a depth-mapping from network LB to network KB, a layer-mapping from network KB to network KD and a depth-mapping from network KD to network LD, in the set of networks shown in FIG. 34A. For each element (i,j) of the layer-mapping matrix created at step 6.3 of the network-of-nodes that contains a 1 (one) we calculate the above relationships and store the result in element (i,j) of the layer-mapping matrix in case the result is a sequence of PoAs. In case the value of matrix element (i,j) of $M^{PoA}$ is 1 (one), representing a layer-mapping defined by the user of the SDN Compiler, and a path, represented by a sequence of PoA's, is not present at matrix element (i,j) of any of the calculated matrices, the user of the SDN Compiler is notified with an error message, indicating that the specified layer-mapping can not be created.

Note that the one or more layers n at depth (d−1) and the one or more layers n at depth d in the calculation of the 'Combined Network' (CN) at step 7.1 determine which layer-mappings at depth d can be re-calculated. As an example, but not limited to, in case all layer-mappings need to be re-calculated at depth d, all layers at depth d and all layers at depth (d−1) that are mapped to these layers at depth d are selected to be part of the CN.

The same process can be followed for Cost-type matrices of Cost-type k that accompany the PoA-type layer-mapping matrices.

As an example methods given in the description of step 7.4 can be applied here as well, including the calculation of a single matrix element (i, j) of multiplication of 3 matrices.

Now, steps 11.1 through 11.4 are described as shown in FIG. 37D.

Step 11.1

If ((d>=1) and (n>=1)) calculate and store topology-mapping matrices of network-of-nodes at depth d and layer n.

If (d>=1) and (n>=1)) calculate and store topology-mapping matrices from a first network-of-nodes at depth d and layer n to a second network-of-nodes at depth d and layer n.

In step 6.2 topology-mapping matrices have been defined for each network. In case of a network-of-nodes at depth (d>=1) these topology-mapping matrices contain a 1 (one) in case of topology-mapping. In this step we will re-calculate these topology-mapping matrices with a sequence of PoAs denoting a path within a network at (d=0) for the elements that contain a 1 (one) denoting a topology-mapping.

The following method is used:

- If (n>=1) create a network consisting of all networks at all levels h at layer (n−1) and of all networks at all levels h at layer n, referred to as a 'Combined Network' (CN).
- If (n>=1) Calculate PoA-type forwarding matrix of the CN, optionally calculate Cost-type forwarding matrix of the CN for each cost type. The calculation of a forwarding matrix is explained in more detail in the description of step 11.2.
- If (n>=1) Calculate PoA-type forwarding matrix of CN to the power 3, referred to as PoA-type 'CN to the power 3' ($CN^{3\ PoA}$). Optionally calculate Cost-type forwarding matrix of CN to the power 3, referred to as Cost-type 'CN to the power 3' ($CN^{3\ Cost\ k}$) for each Cost-type k.

As an example, but not limited to, CN could consist of all networks at all levels h at layer (n−1) and all networks at all levels h at layer n. CN could also consist of a subset of these networks.

Note that this approach is similar to the approach taken in step 7.1. In step 11.1 the CN is consisting of one or more networks at layer n and one or more networks at layer (n−1) at the same depth d, while in step 7.1 the CN is consisting of one or more networks at depth d, possibly at different layers n, and one or more networks at depth (d−1), possibly at different layers n.

Note that by calculating $CN^{3\ PoA}$ we calculate possible paths consisting of a concatenation of 3 paths, each of the 3 paths being either:

- a path traversing the network at layer (n−1)
- a path traversing the network at layer n
- a path from the network at layer (n−1) to the network at layer n
- a path from the network at layer n to the network at layer (n−1)

We select and store all matrix relationships that take the form:

$$(F^{PoA}_{FIRST\ NETWORK\ AT\ LAYER\ N\text{-}SECOND\ NETWORK\ AT\ LAYER\ (N\text{-}1)} \cdot F^{PoA}_{SECOND\ NETWORK\ AT\ LAYER\ (N\text{-}1)\text{-}SECOND\ NETWORK\ AT\ LAYER\ (N\text{-}1)} \cdot F^{PoA}_{SECOND\ NETWORK\ AT\ LAYER\ (N\text{-}1)\text{-}FIRST\ NETWORK\ AT\ LAYER\ N})$$

Now possible paths have been stored from the first network at layer n to the first network at layer n traversing the second network at layer (n−1). Now, as the matrices are nested, the required mapping relationships are found at level h of a network-of-nodes.

For each element (i,j) of the topology-mapping matrix of the network-of-nodes that contains a 1 (one) we calculate the above relationships and store the result in element (i, j) of the topology-mapping matrix in case the result is a sequence of PoAs. In case the value of matrix element (i,j) of the topology-mappings matrix is 1 (one), representing a topology-mapping defined by the user of the SDN Compiler, and a path, represented by a sequence of PoA's, is not present at matrix element (i,j) of any of the calculated matrices, the user of the SDN Compiler is notified with an error message, indicating that the specified topology-mapping can not be created.

The same process can be followed for Cost-type matrices of Cost-type k that accompany the PoA-type topology-mapping matrices.

As an example methods given in the description of step 7.4 can be applied here as well, including the calculation of a single matrix element (i,j) of multiplication of 3 matrices.

Step 11.2

Calculate and store topology-forwarding matrices of network at (d, n, h).

Calculate and store topology-forwarding matrices from a first network at (d, n, h) to a second network at (d, n, h).

We distinguish between 2 types of topology-forwarding matrices:

a) topology-forwarding matrices representing paths within a network at (d, n, h), which take the form $F_{FIRST\ NETWORK\text{-}FIRST\ NETWORK}$ b) topology-forwarding matrices representing paths from a first network at (d, n, h) to a second network at (d, n, h), which take the form $F_{FIRST\ NETWORK\text{-}SECOND\ NETWORK}$ We first consider the calculation of topology-forwarding matrices of type a) above, starting at the lowest hierarchy level h, a network-of-nodes.

PoA-type and Cost-type topology-forwarding matrices of a network-of-nodes AAA at (d, n, h) are calculated according to:

$$(F^{PoA\ Policy\ r}_{AAA\text{-}AAA}, F^{Cost\ k\ Policy\ r}_{AAA\text{-}AAA}) = P^{Policy\ r}_{AAA}(M^{PoA}_{AAA\text{-}AAA}, M^{Cost\ k}_{AAA\text{-}AAA})$$

In which $P^{Policy\ r}_{AAA}$ is a policy function of network AAA with policy r. Examples of typical policies, but not limited to, that can be applied to a network at level h are:

Shortest Path First (SPF)

Firewall (no path allowed)

Specified Path (specifying networks to traverse in a path)

Load-Balancing

In general, the forwarding policy can take any form, therefore our invention is not limited to the above mentioned policies. Further, multiple policies can also be combined into an overall policy.

Note that this step was also performed at step 4 and step 10 of the flowchart of FIG. 25. Note the following differences:

a) In this step forwarding policy is applied to a topology-mapping matrices, while in step 4 and step 10 of the flowchart of FIG. 25 policy was applied to adjacency matrices. As explained above, these matrices are equivalent.

b) In the forwarding matrices resulting from this step we have included the applied policy, in this case being policy r. As multiple forwarding matrices can be created for a single network by applying various policies it is useful to include the policy in the resulting forwarding matrix F.

Figure 38A:
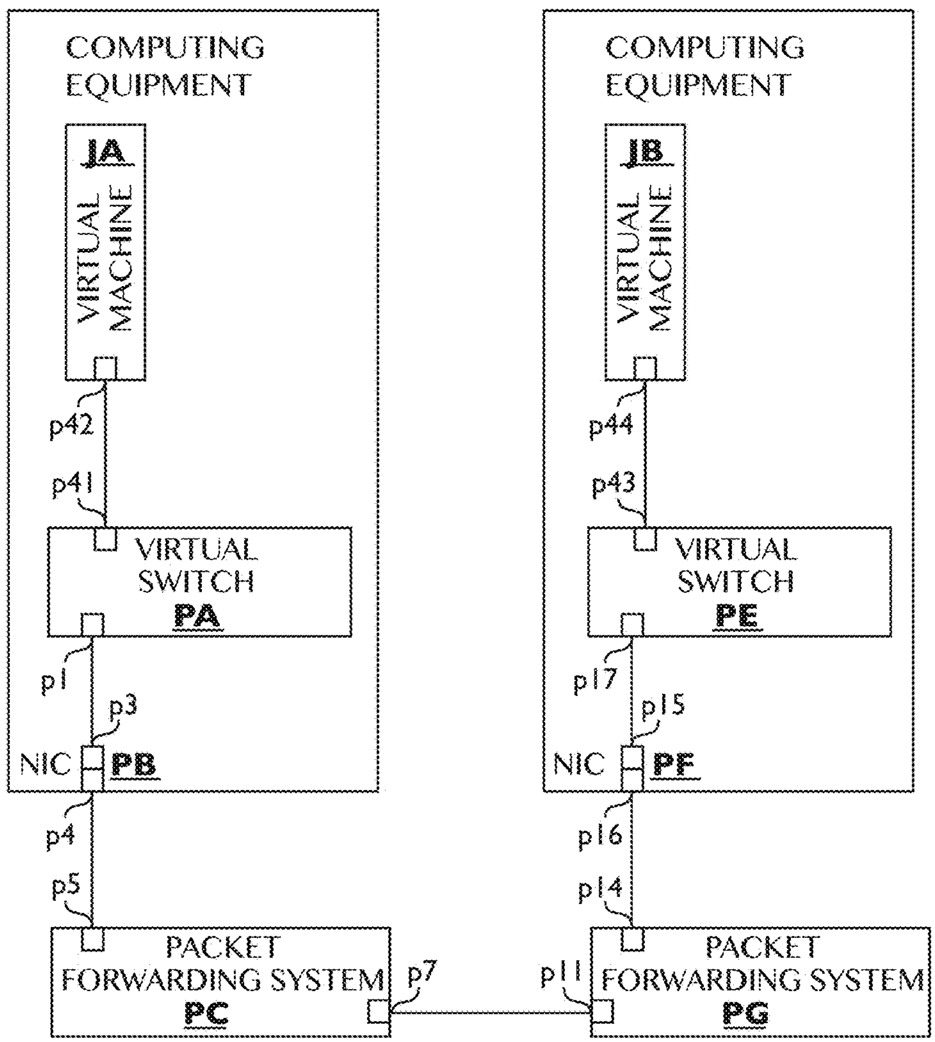
FIG. 38A is a diagram showing a physical representation of an example network

An example of a PoA-type topology-forwarding matrix $F^{PoA}_{PBB\text{-}PBB}$ representing paths within a network-of-nodes PBB is given in FIG. 38N.

An example of a PoA-type topology-forwarding matrix $F^{PoA}_{YWW\text{-}YWW}$ representing paths within a network-of-nodes YVV is given in FIG. 38O.

The calculation of topology-forwarding matrices from a first network at (d, n, h) to a second network at (d, n, h), referenced to as type b) above is included by reference P6044764EP1.

Step 11.3

This optional step is included by reference P6044764EP1.

Step 11.4

For a PoA-type forwarding matrix indexed by nodes the forwarding entries are calculated as per step 11 of the flowchart of FIG. 25 described above.

Calculating forwarding table entries from the nested topology-forwarding matrices that have been calculated at step 11.2 and optionally have been calculated at step 11.3 are included by reference P6044764EP1.

Above, we have introduced hierarchy in the logical naming of networks and nodes of the following form:

. . . Network-of-Network-of-Networks. Network-of-Networks. Network. Node

As mentioned above this provides a means to locate the node within a hierarchical network. Therefore, we can use " . . . Network-of-Network-of-Networks. Network-of-Networks. Network. Node" as the address of a node, we can use " . . . Network-of-Network-of-Networks. Network-of-Networks. Network" as the address of a network-of-nodes, and so on. We will refer to such addressing structure as 'single-layer addressing structure'.

Note that each dot symbol "." represents a level-mapping, therefore the address structure follows exactly the hierarchical structure of a network as represented by level-mappings. Note that also within a physical network hierarchical naming can be used.

We now extend the address to the following form:

. . . Network-of-Network-of-Networks. Network-of-Networks. Network. Node. Sub-identifier 1. Sub-identifier 2 . . . .

In which each dot symbol "." within " . . . Network-of-Network-of-Networks. Network-of-Networks. Network" represents a level-mapping and in which each dot symbol "." within "Node. Sub-identifier 1. Sub-identifier 2 . . . " represents a layer-mapping. The " . . . " before "Network-of-Network-of-Networks" identifies that the hierarchical naming can be extended to an arbitrary number of levels. The " . . . " after "Sub-identifier 2" identifies that the address can include an arbitrary number of layers. A sub-identifier is a node. A sub-identifier at layer n provides a service to layer (n+1).

An example but not limited to such a service is a multiplexing service. Using this approach logical naming of various layers can be combined into a single logical address-space. This makes it possible to perform forwarding using a logical address-space spanning multiple layers.

As a sub-identifier is a node and a node is a network, the above presented logical addressing takes the form:

network (d>0, n=psn_nmin, h=hmax) . . . network (d>0, n=psn_nmin, h=0) . . . network (d>0, n=psn_nmax, h=0)

In which:

psn_nmin is the lowest layer n providing packet switching psn_nmax is the highest layer n providing packet switching hmax is the highest level h We will refer to this logical address structure as 'multi-layer logical address structure'.

As an example, but not limited to, a sub-identifier could identify a port, such as for example, but not limited to a TCP or UDP well known-port. As an example, but not limited to, a sub-identifier could also be a layer 4 identifier, offering layer 4 services to various layer 7 entities such as processes. Such layer 4 identifier is not existing in a TCP/IP stack. A person skilled in the art will understand that a much richer set of naming is possible using the above approach compared to the naming used in current networks. Below an example will be given in which the logical naming of a logical network of nodes YWW at (d=1, n=0, h=1) will be combined with the logical naming of a logical network of nodes ZWW at (d=1, n=1, h=1) into a single logical address-space.

When combining logical naming of various layers, represented by logical layer-mappings, and calculating the forwarding entries from a PoA-type topology-forwarding matrix indexed by the logical naming of the highest layer, the logical naming of lower layer(s) should be included in the forwarding table. This is illustrated by the example forwarding entries shown in FIG. 38R.

As described above in step 11.2 topology-forwarding matrices at arbitrary level h for a particular well-known source and/or destination port can be calculated in step 11.2. The resulting forwarding entries should include the logical source network(s) at various levels h and the logical destination network(s) at various levels h, as well as the logical source port and/or the logical destination port for which the topology-forwarding matrix has been calculated.

To illustrate the steps and resulting matrices of above detailed example of a SDN Compiler method, we apply the above SDN-Compiler method for an arbitrary network to example networks DAA at (d=0, n=0, h=1), HAA at (d=0, n=0, h=1), UUU at (d=1, n=0, h=1). Physical network DAA is shown in FIGS. 13A and 13B, virtual network HAA is shown in FIG. 14B, logical network UUU is shown in FIGS. 15A and 15B. The resulting matrices for each value of depth d, layer n, level h at each step of the flowchart of FIGS. 37A through 37D is shown in FIG. 37F. For each matrix shown a single PoA-type matrix and optionally a Cost-type matrix is created for each cost type. We have omitted the 'PoA' and 'Cost' superscripts as both types of matrices are calculated. FIG. 37F shows the corresponding steps of the flowchart of FIG. 25 as well. The flowchart of FIG. 37F applied to an example network comprising of 3 hierarchy levels is included by reference P6044764EP1.

By using logical naming at various layers traffic-engineering can be performed on a per-application-type basis based on well-known-ports. As an example, but not limited to, a user of the SDN Compiler (such as for example, nut not limited to, a cloud provider or a services provider) could specify within a particular network a particular forwarding-policy for video streaming traffic from a particular network using RTSP (Real Time Streaming Protocol), allowing for a much more granular as well as policy-based approach to traffic-engineering than today's common practise. An even more sophisticated approach to networking at layers above layer 3 compared to usage of well-known-ports is now described. As each layer in a network provides services to higher layer(s) in the network, the ultimate objective is to provide the user of the highest-layer with advanced networking capabilities. Typically, the highest layer is offering services to processes, such as for example, but not limited to, application processes. In today's networks typically a point-to-point service or a point-to-multipoint service is offered between host processes. When we regard networking as inter-process communication (IPC), it is desirable however to allow these processes to establish their own network, consisting of host processes and switch processes. Resulting in IPC that does not distinguish between local and remote resources, only the incurred latency will differ. As an example, but not limited to, we consider the user of the SDN-Compiler to define a logical network between logical nodes mapped to layer 5 resources, such as application processes. This is illustrated for the example network of which network of which the physical representation is given in FIG. 38F, consisting of packet forwarding systems PH, PJ, PK and processes XA, XB, XC, XD, XE, XF.

The packet forwarding system PH is connected via a link at a PoA p201 to a PoA p202 at process XA. The packet forwarding system PH is connected via a link at a PoA p203 to a PoA p204 at process XD. The packet forwarding system PJ is connected via a link at a PoA p205 to a PoA p206 at process XB. The packet forwarding system PJ is connected via a link at a PoA p207 to a PoA p208 at process XE. The packet forwarding system PK is connected via a link at a PoA p209 to a PoA p210 at process XC. The packet forwarding system PK is connected via a link at a PoA p211 to a PoA p212 at process XF. In this example processes are connected to a packet forwarding system. As an example, but not limited to, the packet forwarding system could be a physical server with an OS (Operating System) kernel performing IP routing (referred to as layer 3 switching the above description) running application processes in user space, the application processes being at layer 5. We distinguish between layer 5 host and switch processes as per the generic definition of host node and switch node given above. As an example, but not limited to, PoAs p201 through p212 could be UNIX (Uniplexed Information and Computing Service) domain sockets.

Figure 38B:
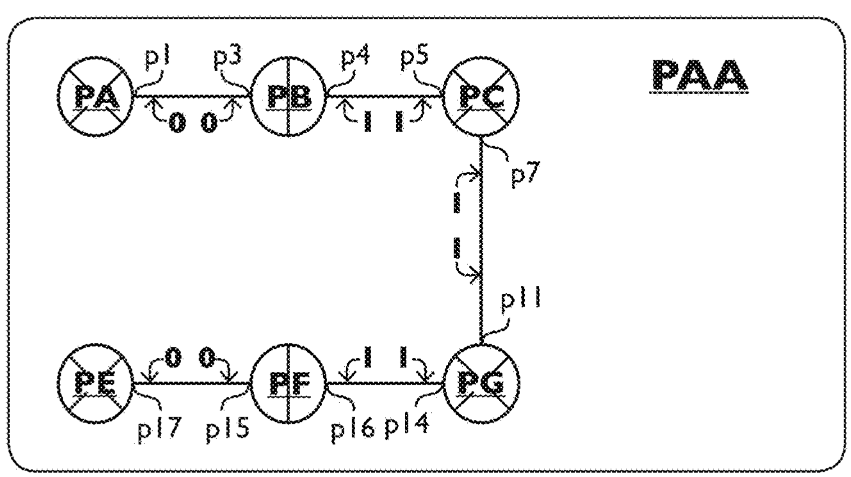
FIG. 38B is a diagram showing a functional representation of example physical network PAA at (d=0, n=0, h=1), consisting of networks PA at (d=0, n=0, h=0), PB at (d=0, n=0, h=0), PC at (d=0, n=0, h=0), PE at (d=0, n=0, h=0), PF at (d=0, n=0, h=0) PG at (d=0, n=0, h=0)
Figure 38C:
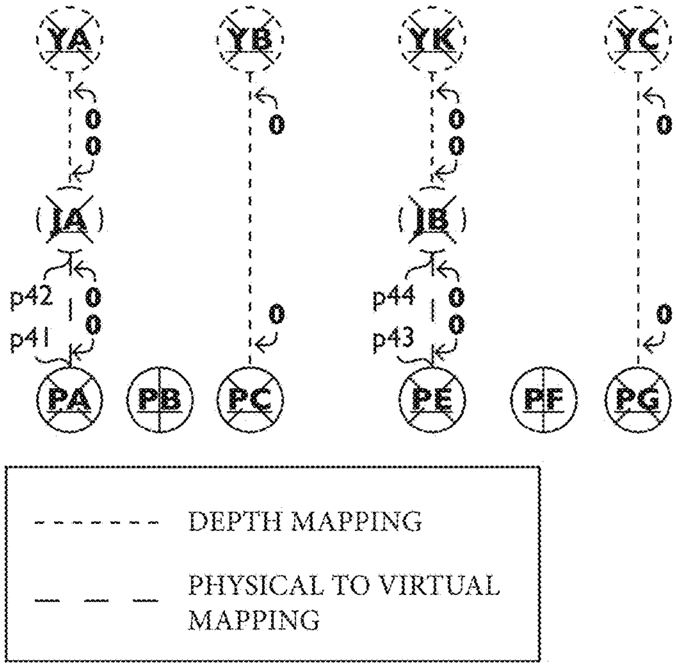
FIG. 38C is a diagram illustrating physical to virtual mappings between networks at (d=0, n=0, h=0) of network PAA at (d=0, n=0, h=2) and illustrating depth-mappings between networks at (d=0, n=0, h=0) of network PAA at (d=0, n=0, h=1) and networks at (d=1, n=0, h=0) of network YVV at (d=1, n=0, h=1).
Figure 38D:
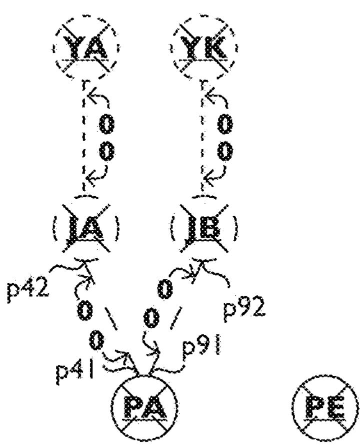
FIG. 38D is a diagram showing depth-mappings and physical to virtual mappings between nodes PA, PE, JA, JB, YA, YK after migration of a virtual machine represented by node JB
Figure 38E:
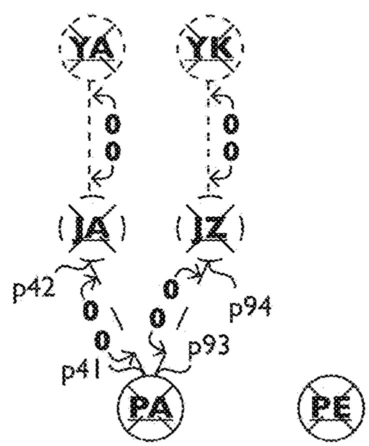
FIG. 38E is a diagram showing depth-mappings and physical to virtual mappings between nodes PA, PE, JA, JZ, YA, YK after deletion of virtual machine JB and creation of virtual machine JZ
Figure 38F:
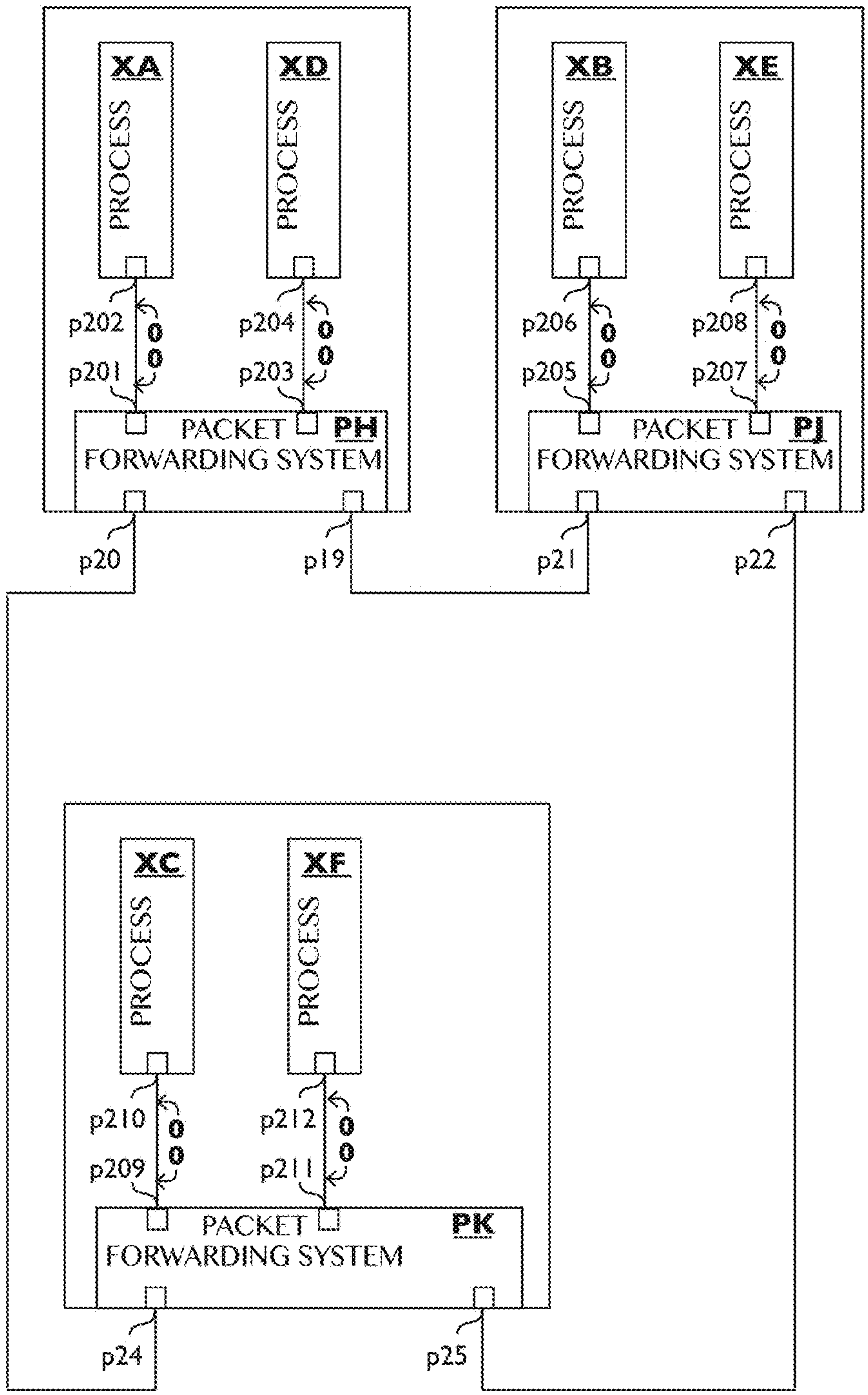
FIG. 38F is a diagram showing a physical representation of an example network consisting of packet forwarding systems and processes
Figure 38G:
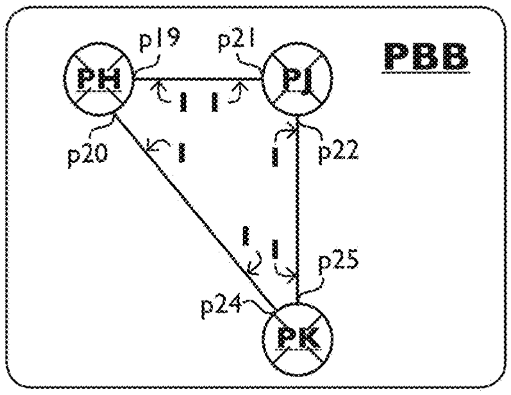
FIG. 38G is a diagram showing network of nodes PBB at (d=0, n=0, h=1), consisting of physical nodes PH, PJ, PK at (d=0, n=0, h=0)
Figure 38H:
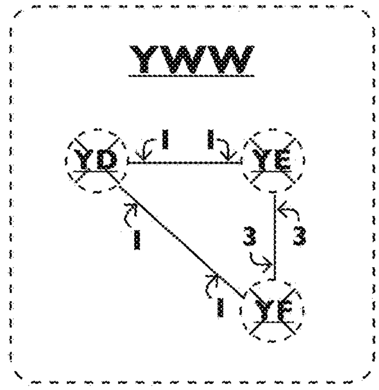
FIG. 38H is a diagram showing network of nodes YWW at (d=1, n=0, h=1), consisting of logical nodes YD, YE, YF at (d=1, n=0, h=0) with different cost values compared to FIG. 32A
Figure 38I:
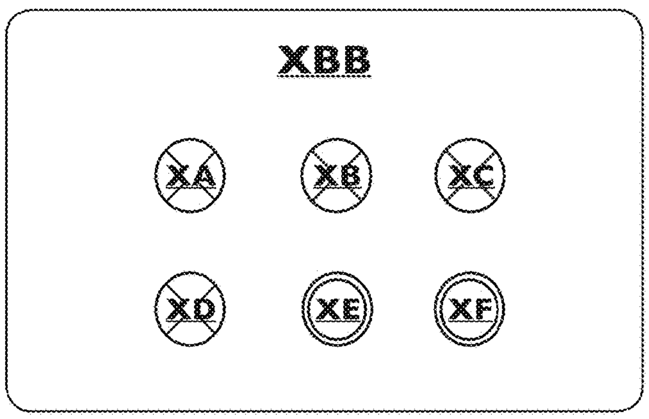
FIG. 38I is a diagram showing network of nodes XBB at (d=0, n=1, h=0), consisting of physical nodes XA, XB, XC, XD, XE, XF at (d=0, n=1, h=0) each representing a process
Figure 38J:
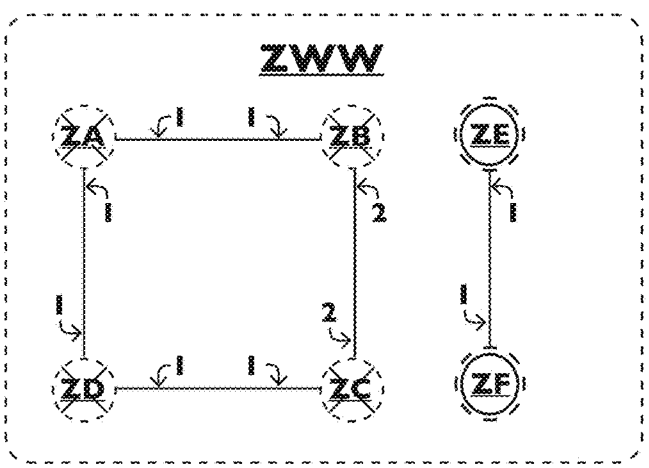
FIG. 38J is a diagram showing network of nodes ZWW at (d=1, n=1, h=1), consisting of logical nodes ZA, ZB, ZC, ZD, ZE, ZF at (d=1, n=1, h=0)
Figure 38K:
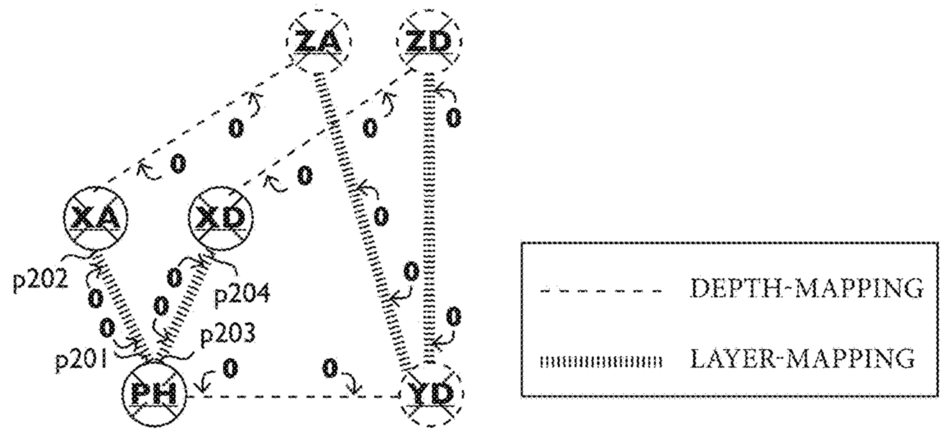
FIG. 38K is a diagram showing depth-mappings and layer-mappings between nodes PH, XA, XD, YD, ZA, ZD
Figure 38L:
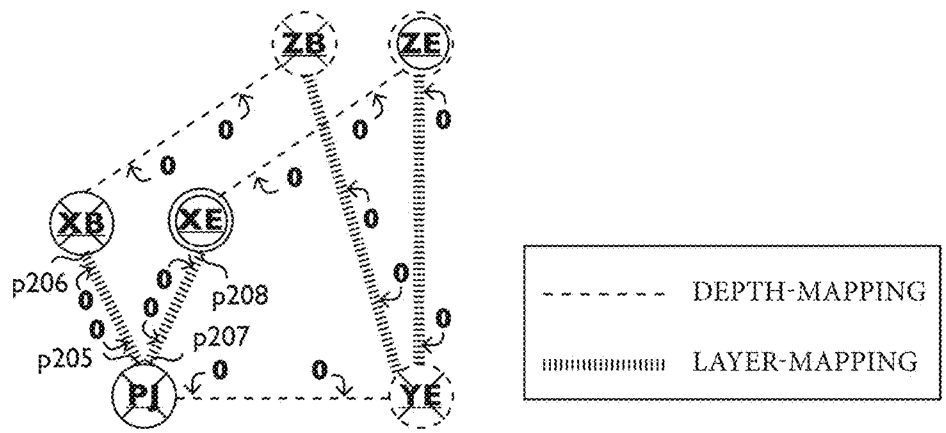
FIG. 38L is a diagram showing depth-mappings and layer-mappings between nodes PJ, XB, XE, YE, ZB, ZE
Figure 38M:
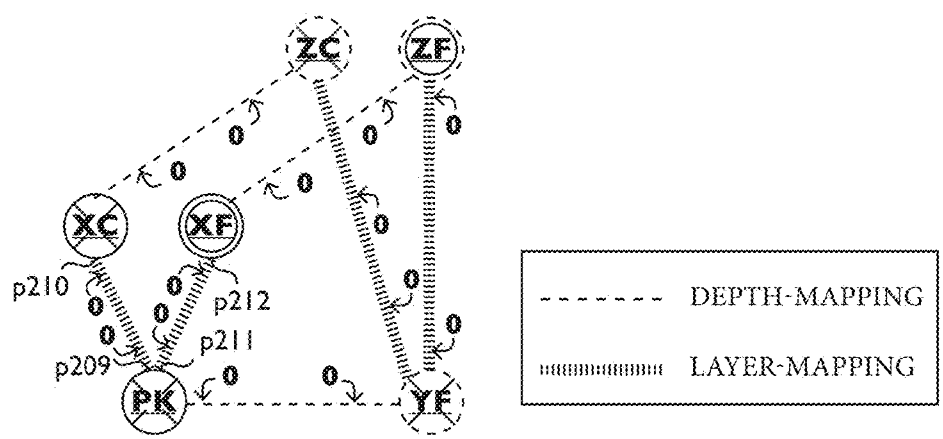
FIG. 38M is a diagram showing depth-mappings and layer-mappings between nodes PK, XC, XF, YF, ZC, ZF

We consider logical network of nodes YWW at (d=1,n=0, h=1) consisting of logical nodes YD, YE, YF at (d=1, n=0, h=0) and being part of logical network YYYY at (d=1,n=0, h=2) as shown in FIG. 32A. We have altered the cost value of the topology-mappings between node YD and node YE, node YE and node YF, node YF and YD to values given in FIG. 38H. We consider a physical network of nodes XBB at (d=0, n=1,h=1), consisting of physical nodes XA, XB, XC, XD, XE, XF at (d=0, n=1,h=0) each representing a process, as shown in FIG. 38I. We consider a logical network of nodes ZWW at (d=1, n=1,h=1) consisting of logical nodes ZA, ZB, ZC, ZD, ZE, ZF at (d=1, n=1,h=0), as shown in FIG. 38J, including the cost in each direction of each logical link shown. Physical network of nodes PBB at (d=0, n=0, h=1), consisting of physical nodes PH, PJ, PK at (d=0, n=0,h=0) and shown in FIG. 38G is mapped to physical network of nodes XBB at (d=0, n=1,h=1), consisting of physical nodes XA, XB, XC, XD, XE, XF at (d=0, n=1,h=0) through layer-mappings. The combination of network PBB and network XBB is an example of an overall network. Physical network of nodes PBB at (d=0, n=0,h=1), consisting of physical nodes PH, PJ, PK at (d=0, n=0,h=0) and shown in FIG. 38G is mapped to logical network of nodes YWW at (d=1, n=0,h=1), consisting of logical nodes YD, YE, YF at (d=1, n=0,h=0) through depth-mappings. Physical network of nodes XBB at (d=0, n=1,h=1), consisting of physical nodes XA, XB, XC, XD, XE, XF at (d=0, n=1,h=0) is mapped to logical network of nodes ZWW at (d=1, n=1,h=1) consisting of logical nodes ZA, ZB, ZC, ZD, ZE, ZF at (d=1, n=1,h=0) through depth-mappings. Logical network of nodes YWW at (d=1, n=0,h=1), consisting of logical nodes YD, YE, YF at (d=1, n=0,h=0) is mapped to logical network of nodes ZWW at (d=1, n=1,h=1) consisting of logical nodes ZA, ZB, ZC, ZD, ZE, ZF at (d=1, n=1,h=0) through layer-mappings. FIG. 38K shows depth-mappings and layer-mappings between nodes PH, XA, XD, YD, ZA, ZD. FIG. 38L shows depth-mappings and layer-mappings between nodes PJ, XB, XE, YE, ZB, ZE. FIG. 38M shows depth-mappings and layer-mappings between nodes PK, XC, XF, YF, ZC, ZF Applying the process given in the flowchart of FIGS. 37A through 37D to networks PBB, XBB, YWW, ZWW results in the topology-forwarding matrices given in FIGS. 38N through 38P. Forwarding-policy for all networks is based upon SPF. FIG. 38N shows PoA-type topology-forwarding matrix $F^{PoA}_{PBB\text{-}PBB}$. FIG. 38O shows PoA-type topology-forwarding matrix $F^{PoA}_{YWW\text{-}YWW}$. FIG. 38P shows PoA-type topology-forwarding matrix $F^{PoA}_{XBB\text{-}XBB}$ FIG. 38Q shows PoA-type topology-forwarding matrix $F^{PoA}_{ZWW\text{-}ZWW}$. As an example, but not limited to, note that the layer-mapping from node ZA to node YD is calculated as a concatenation of the depth-mapping from node ZA to node XA, the layer-mapping from node XA to node PH and the depth-mapping from node PH to node YD as per step 7.5 of the flowchart of FIG. 37, referenced to with c) at the description of step 7.1 above and shown in FIG. 38K, as each matrix multiplication results in a concatenation of mappings. Note that the layer-mapping from node YE to node ZB is calculated as a concatenation of the depth-mapping from node YE to node PJ, the layer-mapping from node PJ to node XB and the depth-mapping from node XB to node ZB as per step 7.5 of the flowchart of FIG. 37, referenced to with d) at the description of step 7.1 above and shown in FIG. 38L. Note that the topology-mapping from node YD to node YE is calculated as a concatenation of the depth-mapping from node YD to node PH, the topology-path from node PH to node PJ, comprising of a topology-mapping from node PH to node PJ, and the depth-mapping from node PJ to node YE as per step 7.4 of the flowchart of FIG. 37, referenced to with a) at the description of step 7.1 above and shown in FIGS. 38K, 38G, 38L. Note that the topology-mapping from node ZA to node ZB is calculated as a concatenation of the layer-mapping from node ZA to node YD, the topology-path from node YD to node YE, comprising of a topology-mapping from node YD to node YE, and the layer-mapping from node YE to node ZB as per step 11.1 of the flowchart of FIG. 37 and shown in FIGS. 38K, 38H, 38L. Therefore, using above relationships, the topology-path from node ZA to node ZB is a topology-mapping from node ZA to node ZB which comprises of nodes ZA, XA, PH, YD, PH, PJ, YE, PJ, XB, ZB and comprises of the sequence of PoAs p202(p201) p19(p21)p205(p206) as per element (ZA, ZB) of $F^{PoA}_{ZWW\text{-}ZWW}$ shown in FIG. 38Q. Note that as per step 11.1 described above, topology-mappings in network ZWW are based upon and calculated from the forwarding-policy of network YWW. This can be seen from the element (ZB, ZC) of $F^{PoA}_{ZWW\text{-}ZWW}$ which uses path p21(p19)p20(p24) as per element (YE, YF) of $F^{PoA}_{YWW\text{-}YWW}$. Note that this path is not present in $F^{PoA}_{PBB\text{-}PBB}$. This illustrates the SDN-Compiler method shown in flowcharts 37A through 37D and described above can created a multi-layer logical network in which a logical layer at a particular (d>=1) is depending on the topology and forwarding-policy of a lower layer at d. As described in the description of step 7.4 above, alternatively topology-mappings in network ZWW could be based upon and calculated from the forwarding-policy of network XBB. This would be useful in case no logical network has been created at a lower layer. As this example in case logical network YWW would not have been created.

We now choose to combine the logical naming of network YYYY and the logical naming of network ZWW into a single logical name address-space of the form:

. . . network-of-network-of-nodes. network-of-nodes. node. logical port

In which " . . . " denotes more optional hierarchy levels. E.g. we denote logical port ZA as YYYY.YWW.YD.ZA, being a logical port ZA within node YD, within network of nodes YWW, within network of networks of nodes YYYY. Note that the dot in the naming between the node and the logical port denotes a layer-mapping. Note that the other dots in the naming denote a level-mapping.

The resulting logical address-space allows for forwarding between distributed processes such as for example, but not limited to, application processes identified by a logical node name, the processes running within physical computing equipment and/or physical packet forwarding systems and/or virtual machines connected by a physical and/or virtual network.

FIG. 38R shows forwarding table entries derived from $F^{PoA}_{ZWW\text{-}ZWW}$ for logical source node ZA. Note that in case a PoA is a Point-of-Attachment performing Media Access Control (MAC) a Source PoA and a Destination PoA are added to the outgoing packet, such as for example PoAs p19, p21, p20, p24. The PoAs between a process and a packet-forwarding system typically do not perform MAC, in which case no Source PoA and a Destination PoA are added to the outgoing packet. The method however does not permit this and does allow for addition of Source PoA and a Destination PoA in case a PoA is a Point-of-Attachment performing MAC, at any layer.

In FIG. 38R note that traffic from logical node ZA to logical node ZC is forwarded via logical node ZD as per the cost figures shown in FIG. 38J. Therefore, traffic originating from process XA (mapped to logical node ZA) and send to process XC (mapped to logical node ZC) is traversing process XD (mapped to logical node ZD), creating inter-process communication (IPC) between physically distant processes, including the traversal of processes acting as a switch node. In FIG. 38R note that traffic from logical node ZA and logical node ZD are mapped to processes XA and XD respectively running on the same packet forwarding system PH. As such, as seen from the process' point-of-view there is no distinction between IPC between processes at the same physical location and IPC between processes that are at physically remote distance apart from latency. The SDN-compiler method as shown in FIGS. 37A through 37D allows for combining of logical naming of an arbitrary number of layers. Only 2 layers were shown in this example to illustrate the approach. The SDN-compiler method as shown in FIG. 37A through 37D allows for combining of logical naming of an arbitrary number of layers of networks of arbitrary number of levels h.

We now consider the topic of additional operations performed on a packet other than packet switching. As depicted in FIG. 18A and explained above, a physical or virtual switch node can perform additional operations on a packet before forwarding the packet to the appropriate output port. Performing these additional operations in virtual machines is referred to as Network Functions Virtualization (NFV). As a path can traverse multiple nodes, multiple additional operations can be performed in sequence on a packet. We illustrate this using a simple example based in which arithmetic operations are performed on the packet payload. We consider network DAA as described above, in which the following nodes perform additional operations:

- in virtual node HB the arithmetic operation "+3" is performed on the packet payload. As described above and shown in FIG. 16 virtual node HB is mapped to logical node UV through a depth-mapping, earlier referred to as a physical/virtual to logical mapping.
- in physical node DC the arithmetic operation "/2" is performed on the packet payload. As described above and shown in FIG. 16 physical node DC is mapped to logical node UX through a depth-mapping, earlier referred to as a physical/virtual to logical mapping.

We consider network UUU as described above and shown in FIG. 16. A packet with source node UU and destination node UZ with a payload value of 4 at source node UU will now have the following payload values at destination node UZ, based on the path taken from source node UU to destination node UZ:

- Destination payload value equals 7 in case path UU to UY to UW to UV to UZ is taken
- Destination payload value equals 5 in case path UU to UY to UX to UV to UZ is taken Note that the above additional operation in virtual HB is performed in a virtual machine, which can be created and deleted on an as-needed basis. Additional operations performed on a received packet includes monitoring a packet header, modifying said packet header, recording said packet header, buffering said packet header, monitoring a packet payload, modifying said packet payload, recording said packet payload, buffering said packet payload and buffering the packet and blocking the packet. Further, forwarding-policies which determine the forwarding within logical network UUU can be specified by the user of the SDN Compiler. As such the method creates very flexible and versatile programmability of the network. Note that the network performs both the transport of packets from one physical location to one or more physical location(s) and operation(s) on the packet header and/or payload during this transport. Another example of additional operations performed on a packet is included by reference P6044764EP1.

We now consider mobility of virtual and physical nodes. We consider an example network of which a physical representation is given in FIG. 38A consisting of 2 packet forwarding systems PC and PG and 2 virtualized computing equipments. The first virtualized computing equipment consisting of virtual switch PA, NIC PB and virtual machine JA. The second virtualized computing equipment consisting of virtual switch PE, NIC PF and virtual machine JB. The functional representation of all physical nodes is shown in FIG. 38B. In FIG. 38B, the weights of the various links have been added for each direction of the bi-directional link. The collection of the physical nodes PA, PB, PC, PE, PF, PG at (d=0, n=0, h=0) is referred to as physical network PAA at (d=0, n=0, h=1). Note that virtual switches PA and PE are physical switch nodes in the functional representation of FIG. 38B. As shown in FIG. 38C physical nodes PA and PE of physical network PAA are mapped to virtual nodes JA and JB respectively through physical to virtual mappings. Logical network YVV at (d=1, n=0, h=1), which is shown in FIG. 32A and was described above is mapped to network PAA at (d=0, n=0, h=1) through depth-mappings. FIG. 38C shows the depth mappings between the physical and virtual nodes of network PAA and the logical nodes of network YVV. Examples of mobility of virtual nodes include but are not limited to mobility of virtual machines from physical server(s) to another physical server(s). Examples of mobility of physical nodes include but are not limited to mobility of mobile phones, tablets and laptops. As more and more application run on virtual machines within virtualized physical servers and are accessed through mobile devices such as mobile phones, tablets and laptops importance of support for virtual and physical node mobility is increasing.

As an example we consider logical node YK, which is mapped to virtual node JB, which is mapped to physical node PE, as depicted in FIG. 38C. We consider the situation in which a virtual machine identified by virtual node JB is migrated from physical node PE to physical node PA. FIG. 38C depicts the starting situation and FIG. 38D depicts the situation after the migration of virtual node JB. The physical to virtual mapping between physical node PE and virtual node JB with virtual PoAs p43 and p44 is removed and a new physical to virtual mapping between physical node PA and virtual node JB with virtual PoAs p91 and p92 is created. Note that the physical/virtual to logical mapping between virtual node JB and logical node YK can be maintained in this example. As such the migration of virtual machine JB from physical node PE to physical node PA does not result in any changes in the logical network. Note that the logical name of node YK has not changed and YK is still part of logical network of nodes YXX. Note that therefore higher layers such as for example but not limited to an application running on virtual machine JB or connections to virtual machine JB that use logical node YK as node identifier will not perceive any change. Alternatively, instead of migrating virtual machine JB, a new virtual machine JZ could be created at physical node PA and virtual machine JB could be deleted. As an example an application running on virtual machine JB could be migrated to virtual machine JZ. This is depicted in FIG. 38E in which a physical to virtual mapping with virtual PoAs p93 and p94 is created between physical node PA and virtual node JZ. Note that logical node YK is mapped to virtual node JZ to maintain logical naming and logical topology. Note that the logical name of node YK has not changed and YK is still part of logical network of nodes YXX. Another example of mobility of virtual and physical nodes is included by reference P6044764EP1.

Now a more general method for the SDN Compiler is described.

As described above, we distinguish between the following mapping types:

- Depth-mapping: a mapping from a network at (d, n1, h) to a network at (d−x, n2, h) or a mapping from a network at (d−x, n1, h) to a network at (d, n2, h), with x being larger than zero and smaller than or equal to d, where n1 may be equal to n2.
- Layer-mapping: a mapping from a network at (d, n, h) to a network at (d, n−y, h) or a mapping from a network at (d, n−y, h) to a network at (d, n, h), with y being larger than zero and smaller than or equal to n−n_min (d), n_min(d) being the lowest layer at depth d.
- Topology-mapping: a mapping from a network at (d, n, h) to a network at (d, n, h)
- Physical-Virtual mapping: a topology-mapping from a physical network at (d, n, h) to a virtual network at (d, n, h) or a topology-mapping from a virtual network at (d, n, h) to a physical network at (d, n, h), which we will be referred to as a topology-mapping.
- Level-mapping: a mapping from a network at (d, n, h) to a network at (d, n, h−z) or a mapping from a network at (d, n, h−z) to a network at (d, n, h), with z larger than zero and smaller than or equal to h−h_min(d, n), h_min(d, n) being the lowest level at depth d and layer n.

Our objective is to find one or more topology-paths from a logical source network to a logical destination network requested by the user of the SDN Compiler and calculate the appropriate forwarding instructions, also referred to as forwarding entries, for physical and virtual nodes. We consider the networks KA, KB, KC, KD, LA, LB, LC, LD, KAA, KCC, LAA and LCC of FIG. 34A.

Figure 39A:
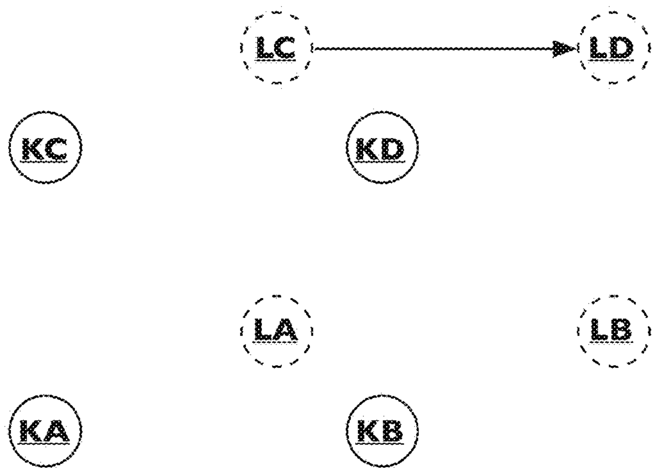
FIG. 39A is a diagram showing networks KA and KB at (d, n, h), networks KC and KD at (d, n+1, h), networks LA and LB at (d+1,n, h) and networks LC and LD at (d+1, n+1, h), which are shown in FIG. 34A and showing a topology-path from network LC to network LD.
Figure 41:
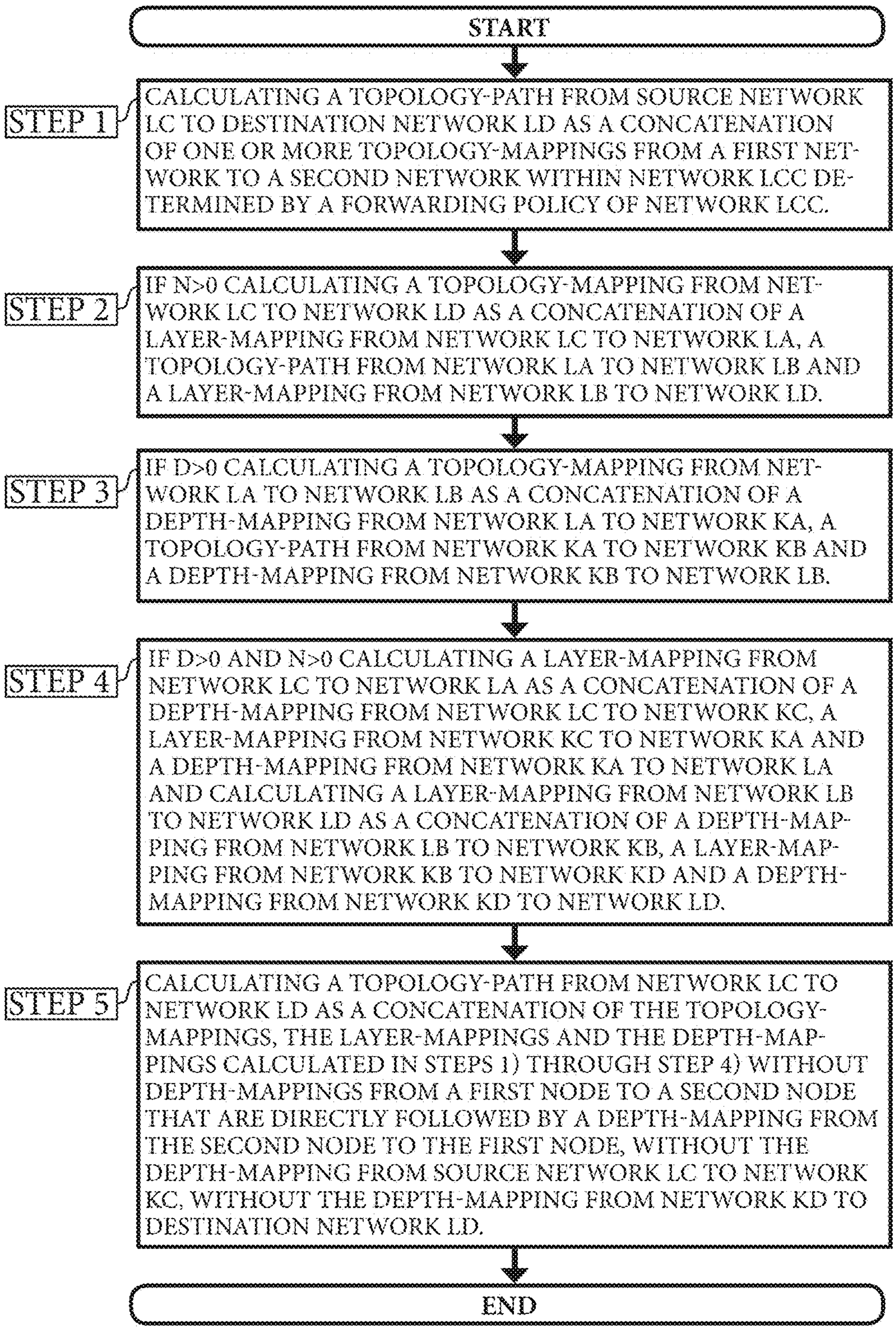
FIG. 41 is a diagram showing a flowchart of the 'method with depth-mappings' consisting of steps 1) through 5)

In order to find a topology-path from source network LC to destination network LD we perform the following steps as shown in the flowchart diagram in FIG. 41 and as illustrated in FIGS. 39A through 39F:

Step 1: Calculating a topology-path from source network LC at (d, n, h) to destination network LD at (d, n, h) as a concatenation of one or more topology-mappings from an arbitrary first network at (d, n, h) to an arbitrary second network at (d, n, h) within higher level network LCC at (d, n, h+1) determined by a forwarding policy of network LCC, as shown in FIGS. 34A and 39A. Note that the topology-path from network LC to network LD consists of a single topology-mapping from network LC to network LD. In general, this topology-path can consist of a concatenation of an arbitrary number of topology-mappings.

Figure 39B:
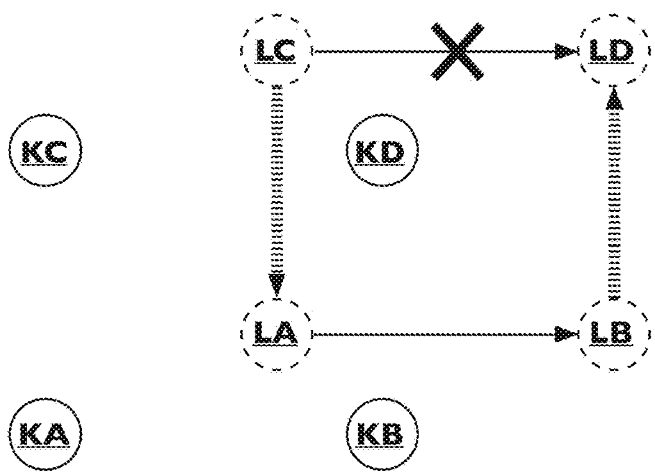
FIG. 39B is a diagram showing networks KA, KB, KC, KD, LA, LB, LC, LD and showing a topology-mapping from network LC to network LD being replaced by a concatenation of a layer-mapping from network LC to network LA, a topology-path from network LA to network LB and a layer-mapping from network LB to network LD.

Step 2: If n>0 calculating a topology-mapping from network LC at (d, n, h) to network LD at (d, n, h) as a concatenation of a layer-mapping from network LC at (d, n, h) to network LA at (d, n−1, h), a topology-path from network LA at (d, n−1, h) to network LB at (d, n−1, h) and a layer-mapping from network LB at (d, n−1, h) to network LD at (d, n, h), the topology-path from network LA at (d, n−1, h) to network LB at (d, n−1, h) being a concatenation of one or more topology-mappings from an arbitrary first network at (d, n−1, h) to an arbitrary second network at (d, n−1, h) within higher level network LAA at (d, n−1, h+1) determined by a forwarding policy of higher level network LAA, as shown in FIGS. 34A and 39B. The cross symbol at the topology-mapping from network LC to network LD denotes that the topology-mapping from network LC to network LD is replaced by above mentioned concatenation of a layer-mapping from network LC to network LA, a topology-path from network LA to network LB and a layer-mapping from network LB at to network LD. Note that the topology-path from network LA to network LB consists of a single topology-mapping from network LA to network LB. In general, this topology-path can consist of a concatenation of an arbitrary number of topology-mappings.

Figure 39C:
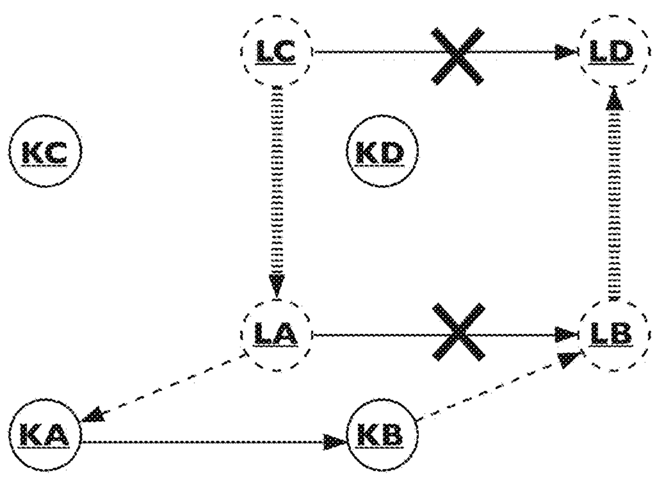
FIG. 39C is a diagram showing networks KA, KB, KC, KD, LA, LB, LC, LD and additional to FIG. 39B showing a topology-mapping from network LA to network LB being replaced by a concatenation of a depth-mapping from network LA to network KA, a topology-path from network KA to network KB and a depth-mapping from network KB to network LB.

Step 3: If d>0 calculating a topology-mapping from network LA at (d, n−1, h) to network LB at (d, n−1, h) as a concatenation of a depth-mapping from network LA at (d, n−1, h) to network KA at (d−1, n−1, h), a topology-path from network KA at (d−1, n−1, h) to network KB at (d−1, n−1, h) and a depth-mapping from network KB at (d−1, n−1, h) to network LB at (d, n−1, h), the topology-path from network KA at (d−1, n−1, h) to network KB at (d−1, n−1, h) being a concatenation of one or more topology-mappings from an arbitrary first network at (d−1, n−1, h) to an arbitrary second network at (d−1, n−1, h) within higher level network KAA at (d−1, n−1, h+1) determined by a forwarding policy of higher level network KAA, as shown in FIGS. 34A and 39C. The cross symbol at the topology-mapping from network LA to network LB denotes that the topology-mapping from network LA to network LB is replaced by above mentioned concatenation of a depth-mapping from network LA to network KA, a topology-path from network KA to network KB and a depth-mapping from network KB to network LB. Note that the topology-path from network KA to network KB consists of a single topology-mapping from network KA to network KB. In general, this topology-path can consist of a concatenation of an arbitrary number of topology-mappings.

Figure 39D:
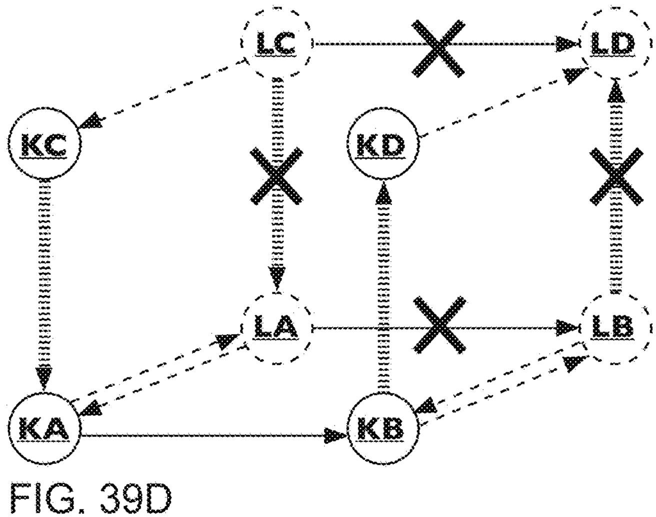
FIG. 39D is a diagram showing networks KA, KB, KC, KD, LA, LB, LC, LD and additional to FIG. 39C showing a layer-mapping from network LC to network LA being replaced by a concatenation of a depth-mapping from network LC to network KC, a layer-mapping from network KC to network KA and a depth-mapping from network KA to network LA, as well a layer-mapping from network LB to network LD being replaced by a concatenation of a depth-mapping from network LB to network KB, a layer-mapping from network KB to network KD and a depth-mapping from network KD to network LD.

Step 4: If d>0 and n>0 calculating a layer-mapping from network LC at (d, n, h) to network LA at (d, n−1, h) as a concatenation of a depth-mapping from network LC at (d, n, h) to network KC at (d−1, n, h), a layer-mapping from network KC at (d−1, n, h) to network KA at (d−1, n−1, h) and a depth-mapping from network KA at (d−1, n−1, h) to network LA at (d, n−1, h) and calculating a layer-mapping from network LB at (d, n−1, h) to network LD at (d, n, h) as a concatenation of a depth-mapping from network LB at (d, n−1, h) to network KB at (d−1, n−1, h), a layer-mapping from network KB at (d−1, n−1, h) to network KD at (d−1, n, h) and a depth-mapping from network KD at (d−1, n, h) to network LD at (d, n, h), as shown in FIG. 39D. The cross symbol at the layer-mapping from network LC to network LA denotes that the layer-mapping from network LC to network LA is replaced by above mentioned concatenation of a depth-mapping from network LC to network KC, a layer-mapping from network KC to network KA and a depth-mapping from network KA to network LA. The cross symbol at the layer-mapping from network LB to network LD denotes that the layer-mapping from network LB to network LD is replaced by above mentioned concatenation of a depth-mapping from network LB to network KB, a layer-mapping from network KB to network KD and a depth-mapping from network KD to network LD.

Steps 1) through 4) above results in a path from network LC to network LD traversing the following networks: LC, KC, KA, LA, KA, KB, LB, KB, KD, LD. This path traverses logical networks LA and LB resulting from step ii) above, resembling that networks at layer n consume a service from networks at layer n−1. This path traverses physical or virtual networks KA, KB, KC, KD for which the appropriate forwarding instructions can be calculated as will be explained below.

Figure 39E:
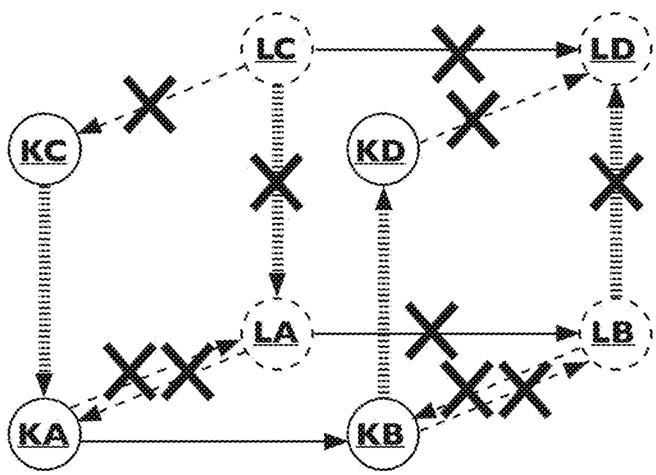
FIG. 39E is a diagram showing networks KA, KB, KC, KD, LA, LB, LC, LD and additional to FIG. 39D showing the removal of the depth-mapping from network KA to network LA, the depth-mapping from network LA to network KA, the depth-mapping from network KB to network LB, the depth-mapping from network LB to network KB, depth-mapping from network LC to network KC and the depth-mapping from network KD to network LD.

Step 5: As depicted in FIG. 39E, the depth-mapping from network KA to network LA is directly followed by a depth mapping from network LA to network KA, the net result being zero, therefore both mappings can be removed from the path from network LC to network LD. Also, the depth-mapping from network KB to network LB is directly followed by a depth mapping from network LB to network KB, the net result being zero, therefore both mappings can be removed from the path from network LC to network LD. In general, depth-mappings from a first node to a second node that are directly followed by a depth-mapping from the second node to the first node are removed from the path. Also the depth-mapping from source network LC to network KC and the depth-mapping from network KD to destination network LD are removed, as we are interested in the path through physical and virtual nodes to create forwarding instructions for.

Figure 39F:
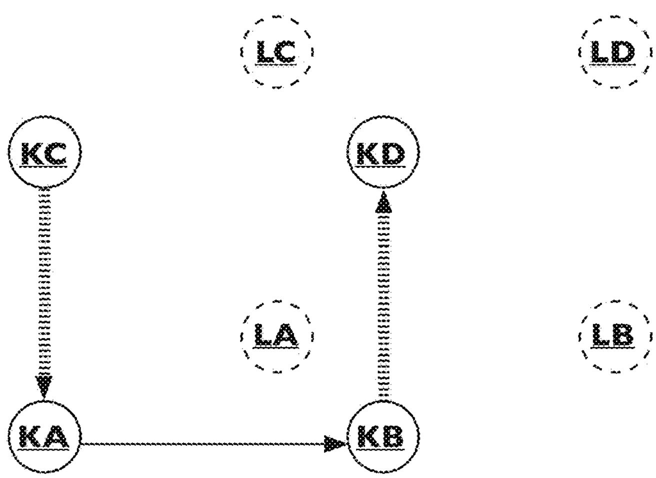
FIG. 39F is a diagram showing networks KA, KB, KC, KD, LA, LB, LC, LD and showing a path from network KC to network KD being a concatenation of a layer-mapping from network KC to network KA, a topology-path from network KA to network KB and a layer-mapping from network KB to network KD.

The above results in a path KC, KA, KB, KD, as illustrated in FIG. 39F. In FIG. 39F all topology-mappings, layer-mappings and depth-mappings with a cross-symbol in FIG. 39E have been removed. This path is a concatenation of a layer-mapping from network KC at (d−1, n, h) to network KA at (d−1, n−1, h), a topology-path from network KA at (d−1, n−1, h) to network KB at (d−1, n−1, h) and a layer-mapping from network KB at (d−1, n−1, h) to network KD at (d−1, n, h). The logical source network LC is mapped to the first network of this path, network KC, through a depth-mapping and the last network in this path, network KD, is mapped to the logical destination network, network LD, through a depth-mapping.

The above method consisting of steps 1) through 5) and shown in FIG. 41 can be applied to a set of networks at any level h.

Figure 40A:
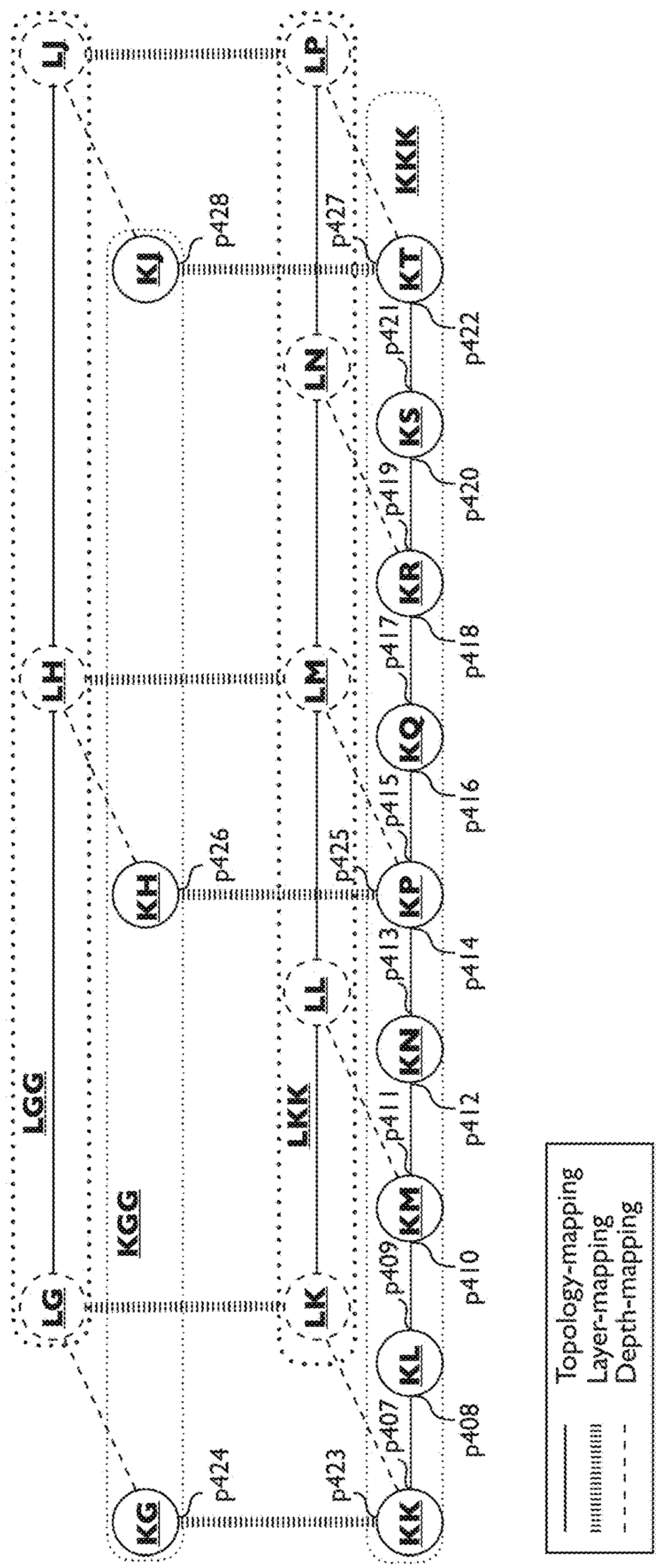
FIG. 40A is a diagram consisting of networks KK, KL, KM, KN, KP, KQ, KR, KS, KT at (d=0, n=0, h=0), network KKK at (d=0, n=0, h=1), networks KG, KH, KJ at (d=0, n=1, h=0), network KGG at (d=0, n=1, h=1), networks LK, LL, LM, LN, LP at (d=1, n=0, h=0), network LKK at (d=1, n=0, h=1), networks LG, LH, LJ at (d=1, n=1, h=0 and network LGG at (d=1, n=1, h=1), as well as topology-mappings, layer-mappings and depth-mappings between networks. Also the PoAs of the topology-mappings and layer-mappings between networks at (d=0, h=0) are shown. The cost of all topology-mappings and layer-mappings is 1 (one) in both directions. The cost of all depth-mappings is 0 (zero) in both directions.
Figure 40B:
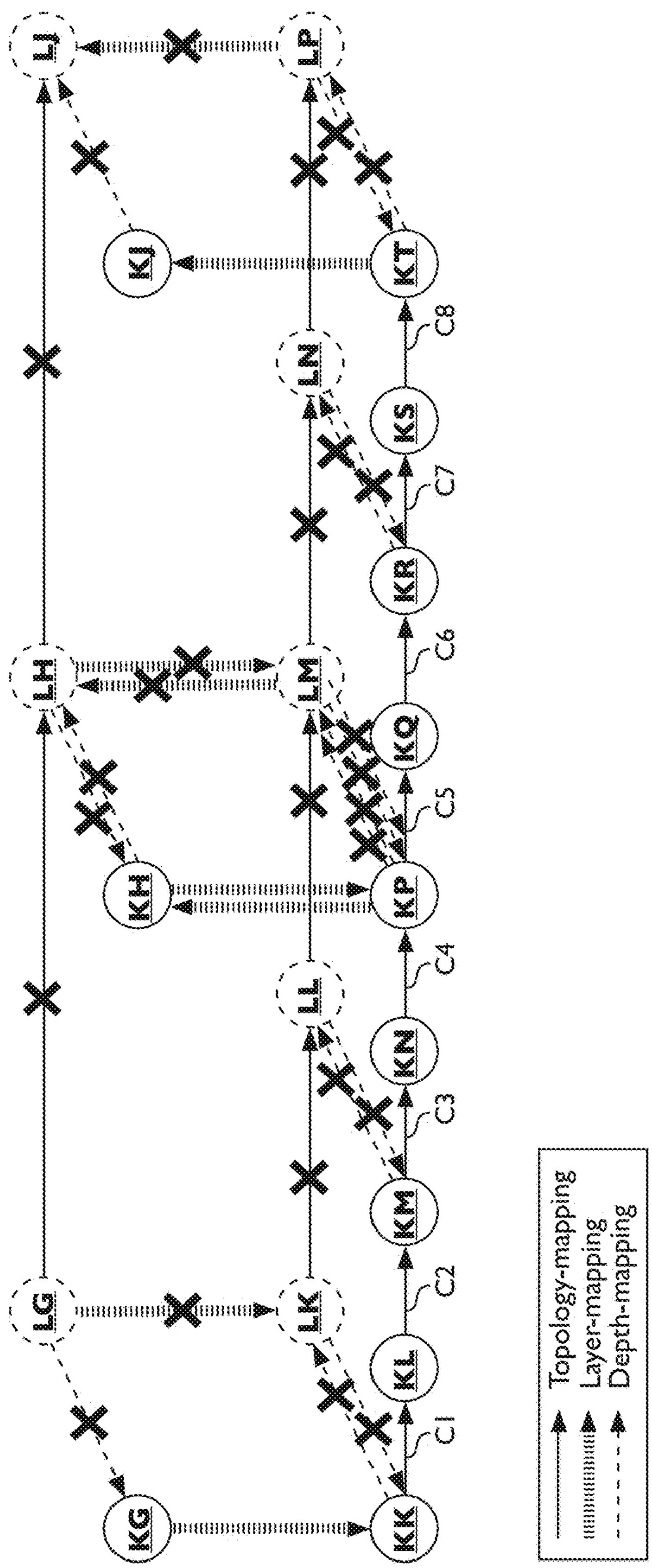
FIG. 40B is a diagram consisting of networks KK, KL, KM, KN, KP, KQ, KR, KS, KT at (d=0, n=0, h=0), network KKK at (d=0, n=0, h=1), networks KG, KH, KJ at (d=0, n=1, h=0), network KGG at (d=0, n=1, h=1), networks LK, LL, LM, LN, LP at (d=1, n=0, h=0), network LKK at (d=1, n=0, h=1), networks LG, LH, LJ at (d=1, n=1, h=0 and network LGG at (d=1, n=1, h=1), as well as topology-mappings, layer-mappings and depth-mappings between networks. Also channel identifiers C1 through C8 are shown as well as topology-mappings, layer-mappings and depth-mappings that have been replaced as depicted by the cross symbol. The path resulting from applying the 'method with depth-mappings' to the path from source network LG to destination network LJ results in path KG, KK, KL, KM, KN, KP, KH, KP, KQ, KR, KS, KT, KJ.

As an example, we apply the above 'method with depth-mappings' to the set of networks shown in FIG. 40A, consisting of networks KK, KL, KM, KN, KP, KQ, KR, KS, KT at (d=0, n=0, h=0), higher level network KKK at (d=0, n=0, h=1), networks KG, KH, KJ at (d=0, n=1, h=0), higher level network KGG at (d=0, n=1, h=1), networks LK, LL, LM, LN, LP at (d=1, n=0, h=0), higher level network LKK at (d=1, n=0, h=1), networks LG, LH, LJ at (d=1, n=1, h=0) and higher level network LGG at (d=1, n=1, h=1). The topology-mappings, layer-mappings and depth-mappings are shown as well. The topology-mappings, layer-mappings and depth-mappings are bi-directional. Also the PoAs of the topology-mappings and layer-mappings between networks at (d=0, h=0) are shown. The cost of all topology-mappings and layer-mappings is 1 (one) in both directions. The cost of all depth-mappings is 0 (zero) in both directions. Applying steps 1) through 5) of FIG. 41 to the path from source network LG to destination network LJ results in the following paths at each step:

Step 1): Applying forwarding policy in higher level network LGG to a path from source network LG to destination network LJ results in path LG, LH, LJ. This is illustrated in FIG. 40B. The identifiers C1 through C9 will be explained below and are not relevant for the explanation of steps 1) through 5).

Step 2): Applying step 2) to the topology-mapping from network LG to network LH results in path LG, LK, LL, LM, LH, replacing the topology-mapping from LG to LH. Applying step 2) to the topology-mapping from network LH to network LJ results in path LH, LM, LN, LP, LJ, replacing the topology-mapping from LH to LJ Step 3): Applying step 3) to the topology-mapping from network LK to network LL results in path LK, KK, KL, KM, LL, replacing the topology-mapping from LK to LL. Applying step 3) to the topology-mapping from network LL to network LM results in path LL, KM, KN, KP, LM, replacing the topology-mapping from LL to LM. Applying step 3) to the topology-mapping from network LM to network LN results in path LM, KP, KQ, KR, LN, replacing the topology-mapping from LM to LN. Applying step 3) to the topology-mapping from network LN to network LP results in path LN, KR, KS, KT, LP, replacing the topology-mapping from LN to LP.

Step 4): Applying step 4) to the layer-mapping from network LG to network LK results in path LG, KG, KK, LK, replacing the layer-mapping from LG to LK. Applying step 4) to the layer-mapping from network LH to network LM results in path LH, KH, KP, LM, replacing the layer-mapping from LH to LM. Applying step 4) to the layer-mapping from network LM to network LH results in path LM, KP, KH, LH, replacing the layer-mapping from LM to LH. Applying step 4) to the layer-mapping from network LP to network LJ results in path LP, KT, KJ, LJ, replacing the layer-mapping from LP to LJ.

Step 5): Applying step 5) results in the removal of the depth-mapping from network KK to network LK and the depth-mapping from network LK to network KK, the removal of the depth-mapping from network KM to network LL and the depth-mapping from network LL to network KM, the removal of a first depth-mapping from network KP to network LM and a first depth-mapping from network LM to network KP, as well as the removal of a second depth-mapping from network KP to network LM and a second depth-mapping from network LM to network KP, the removal of the depth-mapping from network KR to network LN and the depth-mapping from network LN to network KR, the removal of the depth-mapping from network KT to network LP, the removal of the depth-mapping from network LP to network KT, the removal of the depth-mapping from source network LG to network KG and the removal of the depth-mapping from network KJ to destination network LJ.

The above results in a path from network KG to network KJ consisting of the following networks KG, KK, KL, KM, KN, KP, KH, KP, KQ, KR, KS, KT, KJ. This path is a concatenation of a layer-mapping from network KG at (d=0, n=1, h=0) to network KK at (d=0, n=0, h=0), a topology-mapping from network KK at (d=0, n=0, h=0) to network KL at (d=0, n=0, h=0), a topology-mapping from network KL at (d=0, n=0, h=0) to network KM at (d=0, n=0, h=0), a topology-mapping from network KM at (d=0, n=0, h=0) to network KN at (d=0, n=0, h=0), a topology-mapping from network KN at (d=0, n=0, h=0) to network KP at (d=0, n=0, h=0), a layer-mapping from network KP at (d=0, n=0, h=0) to network KH at (d=0, n=1, h=0), a layer-mapping from network KH at (d=0, n=1, h=0) to network KP at (d=0, n=0, h=0), a topology-mapping from network KP at (d=0, n=0, h=0) to network KQ at (d=0, n=0, h=0), a topology-mapping from network KQ at (d=0, n=0, h=0) to network KR at (d=0, n=0, h=0), a topology-mapping from network KR at (d=0, n=0, h=0) to network KS at (d=0, n=0, h=0), a topology-mapping from network KS at (d=0, n=0, h=0) to network KT at (d=0, n=0, h=0) and a layer-mapping from network KT at (d=0, n=0, h=0) to network KJ at (d=0, n=1, h=0).

Using the above approach, a topology-path from logical source node LG (as h=0) to logical destination node LJ (as h=0) requested by the user of the SDN Compiler is translated into a path consisting of a concatenation of topology-mappings and layer-mappings between physical or virtual nodes (as h=0 for networks KG, KK, KL, KM, KN, KP, KH, KQ, KR, KS, KT, KJ), which will be used to derive forwarding instructions from as will be explained below.

The topology used in each network above has been a chain of networks in order to be able to explain the method within the limits of 3 dimensions. The method however is applicable to any topology. The layer-mappings in the above description have been 1:1 mappings from an arbitrary first network at layer n to an arbitrary second network at layer n+1 or from an arbitrary first network at layer n+1 to an arbitrary second network at layer n. These layer-mappings can also be N:1 or 1:N mappings. The depth-mappings in the above description have been 1:1 mappings from an arbitrary first network at depth d to an arbitrary second network at depth d+1 or from an arbitrary first network at depth d+1 to an arbitrary second network at depth d. These depth-mappings can also be N:1 or 1:N mappings.

In order for the SDN Compiler to be able to support both Packet Switched Networks (PSN) and Circuit Switched Networks (CSN) as well as a mix of PSNs and CSNs, the SDN Compiler should be instructed whether a particular layer n at d=0 is a PSN or a CSN. As an example this information could be provided by a network management system, a cloud management system or the physical node. Note that all networks at a particular n and d>0 are a PSN when the network at n, d=0 is a PSN and are a CSN when the network at n, d=0 is a CSN. A node within a PSN is referred to as a packet-switching node. A node within a CSN is referred to as a circuit-switching node. As a CSN does not use statistical multiplexing, as a PSN does, but another type of multiplexing such as but not limited to Frequency Division Multiplexing (FDM), Wavelength Division Multiplexing (WDM), Time Division Multiplexing (TDM), Code Division Multiplexing (CDM), Polarization Division Multiplexing (PDM) or Space Division Multiplexing (SDM).

We introduce the term 'channel identifier' to denote a particular channel in a multiplexed physical signal. Examples of channel identifiers include, but are not limited to:

- a frequency band in a Frequency Division Multiplexing (FDM) network, an Orthogonal Frequency Division Multiplexing (OFDM) network, for example an IEEE 802.11 Wireless Local Area Network (WLAN), for example an Orthogonal Frequency-Division Multiple Access (OFDMA) network such as a Long Term Evolution (LTE) network or a Worldwide Interoperability for Microwave Access (WiMAX) network, a Wavelength Division Multiplexing (WDM) or Dense Wavelength Division Multiplexing (DWDM) network, Coarse Wavelength Division Multiplexing (CWDM) network for example an Optical Fiber DWDM network.

a timeslot in a Time Division Multiplexing (TDM) network, for example a Synchronous Digital Hierarchy (SDH) network or a Synchronous Optical NETworking (SONET) network.

a code in a Code Division Multiplexing (CDM) network, for example a Code Division Multiple Access (CDMA) network, for example a Universal Mobile Telecommunications System (UMTS) network.

a polarization in a Polarization Division Multiplexing (PDM) network.

a physical medium such as a copper cable or optical fiber in a Space Division Multiplexing (SDM) network.

In a circuit-switched physical network for each topology-mapping a multiplexing channel should be available. Therefore, in a circuit-switched physical network each topology-mapping should be accompanied by a Channel Identifier. As such the Channel Identifier is a property of a topology-mapping. As an example but not limited to, in case a set of networks is represented by a graph, a topology-mapping from a first node to a second node is represented by a directed edge from a first node to a second node and the Channel Identifier is an attribute of that directed edge.

A person skilled in the art will understand that a forwarding instruction created for a circuit-switching node comprising of an input port, an input channel identifier, an output port and an output channel identifier denotes a cross-connect to be set within the node. As an example, but not limited to an incoming DWDM signal comprising multiple wavelengths is de-multiplexed within a ROADM. The physical input port is a physical fiber interface at which this DWDM signal is inputted into the ROADM. The input channel identifier is a wavelength within the incoming DWDM signal. The physical output port is a physical fiber interface at which this DWDM signal is outputted from the ROADM. The output channel identifier is a wavelength within the outgoing DWDM signal. A forwarding instruction states which input wavelength at which physical input port to cross-connect with which output wavelength at which physical output port.

As an example of logical addressing, but not limited to, we consider the networks shown in FIG. 40A all to be PSNs. Logical nodes (as h=0) LK, LL, LM, LN, LP are part of a packet-switched logical network of nodes LKK, hence there is a level-mapping between logical network of nodes LKK and logical nodes LK, LL, LM, LN, LP. The address of node LK, LL, LM, LN, LP therefore is respectively: LKK.LK, LKK.LL, LKK.LM, LKK.LN, LKK.LP, in which the "." (dot) represents a level-mapping. Logical nodes (as h=0) LG, LH, LJ are part of a packet-switched logical network of nodes LGG, hence there is a level-mapping between logical network of nodes LGG and logical nodes LG, LH, LJ. Logical node LG is mapped logical node LK through a layer-mapping, logical node LH is mapped logical node LM through a layer-mapping, logical node LJ is mapped logical node LP through a layer-mapping. Therefore, the address of node LG can either be LGG.LG, in which the "." (dot) represents a level-mapping, referred to as 'single-layer logical addressing structure' or can be LKK.LK.LG, in which the "." (dot) between LKK and LK represents a level-mapping and in which the "." (dot) between LK and LG represents a layer-mapping, referred to as 'multi-layer logical addressing structure'. In the former case, the addressing comprises only layer n=1, while in the latter case the addressing comprises both layer n=1 and layer n=0. The user of the SDN Compiler should specify the logical address format to use. In this example, we choose to use the latter, which uses a hierarchical addressing within network LKK improving scalability. The address of node LG is LKK.LK.LG, the address of node LH is LKK.LM.LH and the address of node LJ is LKK.LP.LJ.

The logical addressing of a PSN is present in a physical signal in a physical network as the source address and destination addresses within the packet header. In case of a CSN a logical circuit identifier could be added to the physical signal. As an example, but not limited to, an analogue modulation could be added to the physical signal to represent a logical circuit identifier of a logical CSN.

Nodes within a physical PSN at layer n provide a Media Access Control (MAC) function when layer n−1 is a CSN or when layer n is the lowest layer (n=0). An example, but not limited to, of a MAC function is Ethernet Media Access Control.

In case all networks in the path calculated at step 5) of the flowchart of FIG. 41 (using 'method with depth-mappings') above, referred to as the 'calculated path', are nodes, the forwarding table entries for physical and/or virtual nodes can be calculated by performing the following steps:

Step 1. For each node in the 'calculated path', calculate one or more forwarding instructions, each forwarding instruction comprising of:

Input port: the PoA of the topology-mapping or layer-mapping from the previous node in the calculated path, or "local" in case the node is the first node of the calculated path, indicating the packet is created by this node.

Output port: the PoA of the topology-mapping or layer-mapping to the next node in the calculated path, or "local" in case the node is the last node of the calculated path, indicating the packet should be received by this node.

Step 2. For each packet-switching node in the 'calculated path' include within the forwarding instructions calculated at step 1):

Logical source address: LCC.LC

Logical destination address: LCC.LD

Step 3. For each packet-switching node at layer n in the 'calculated path' and the next node in the calculated path being a circuit-switching node at layer n−1, include within the forwarding instructions calculated at step 1):

Source Media Access Control (MAC): the PoA of the layer-mapping to the next node in the calculated path.

Destination Media Access Control (MAC): the input port PoA of the next node at layer n in the calculated path Step 4. For each packet-switching node at n=0 and the next node in the calculated path being a node at layer n=0, include within the forwarding instructions calculated at step 1):

Source Media Access Control (MAC): the PoA of the topology-mapping to the next node in the calculated path.

Destination Media Access Control (MAC): the input port PoA of the next node at layer n in the calculated path.

Step 5. For each circuit-switching node at layer n include within the forwarding instructions calculated at step 1):

Channel In: if the previous node is at layer n include the channel identifier of the topology-mapping from the previous node in the calculated path Channel Out: if the next node is at layer n include the channel identifier of the topology-mapping to the next node in the calculated path To illustrate the above method, we now calculate the forwarding instructions for the set of networks shown in FIG. 40A. We distinguish between 2 cases:

Case A) Network KKK is a PSN and network KGG is a PSN. Note that therefore network LKK is a PSN and network LGG is a PSN. A multi-layer logical addressing structure as explained above is used. The address of source node LG is LKK.LK.LG and the address of destination node LJ is LKK.LP.LJ.

Case B) Network KKK is a CSN and network KGG is a PSN. Note that therefore network LKK is a CSN and network LGG is a PSN. In FIG. 40B channel identifiers C1 through C8 are shown. Channel identifier 'C1' is used for the topology-mapping from network KK to network KL. Channel identifier 'C2' is used for the topology-mapping from network KL to network KM. Channel identifier 'C3' is used for the topology-mapping from network KM to network KN. Channel identifier 'C4' is used for the topology-mapping from network KN to network KP. Channel identifier 'C5' is used for the topology-mapping from network KP to network KQ. Channel identifier 'C6' is used for the topology-mapping from network KQ to network KR. Channel identifier 'C7' is used for the topology-mapping from network KR to network KS. Channel identifier 'C8' is used for the topology-mapping from network KS to network KT. The address of source node LG is LGG.LG and the address of destination node LJ is LGG.LJ.

The forwarding instructions for case A) are given in FIG. 40C. The forwarding instructions for case B) are given in FIG. 40D. Note that "N/A" denotes "Not Applicable", indicating that this item is not part of the forwarding instruction send to the physical or virtual node.

Figure 40E:
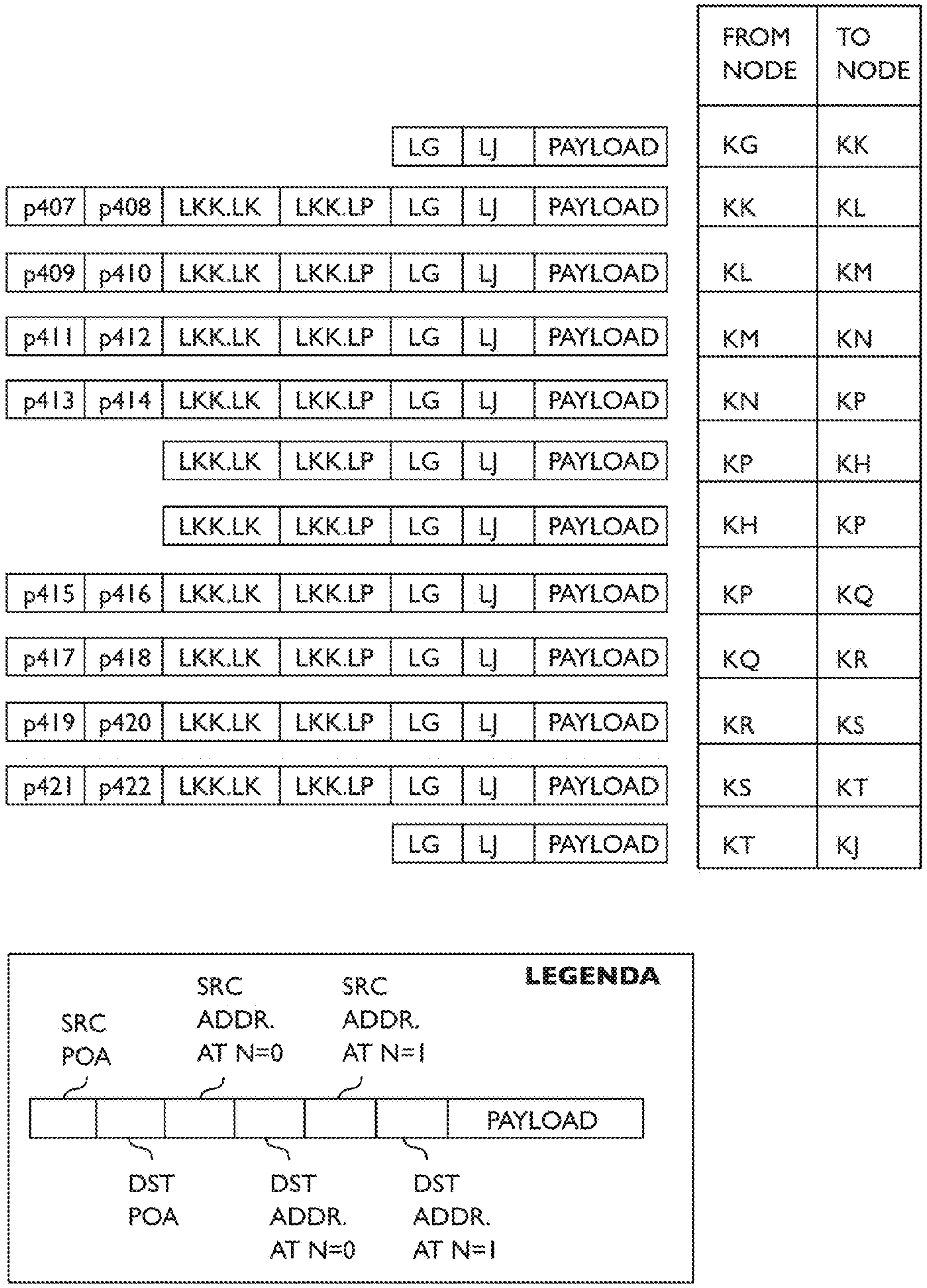
FIG. 40E is a diagram showing the packet content of the packet between each node for a path from logical source node LG to logical destination node LJ in the set of networks of FIG. 40A in which networks KKK, KGG, LKK, LGG are Packet Switched Networks (PSNs).
Figure 40F:
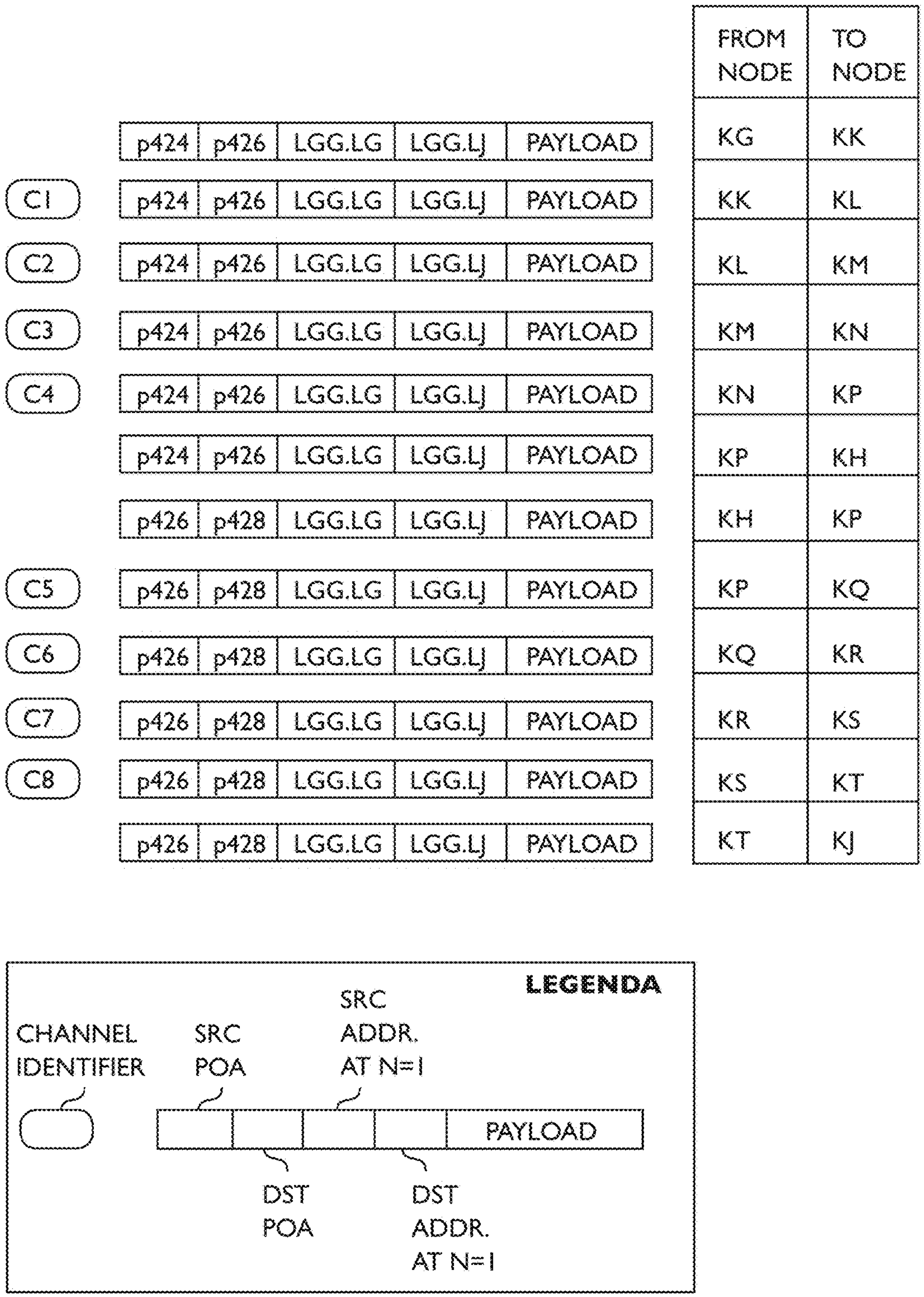
FIG. 40F is a diagram showing the packet content of the packet between each node for a path from logical source node LG to logical destination node LJ in the set of networks of FIG. 40A in which networks KKK and LKK are Circuit Switched Networks (CSNs) and networks KGG and LGG are Packet Switched Networks (PSNs).

The packet content of the packet between each node for case A) is given in FIG. 40E. The packet content of the packet as well as the channel identifier between each node for case B) is given in FIG. 40F, in which 'addr.' refers to 'address'.

Figure 40G:
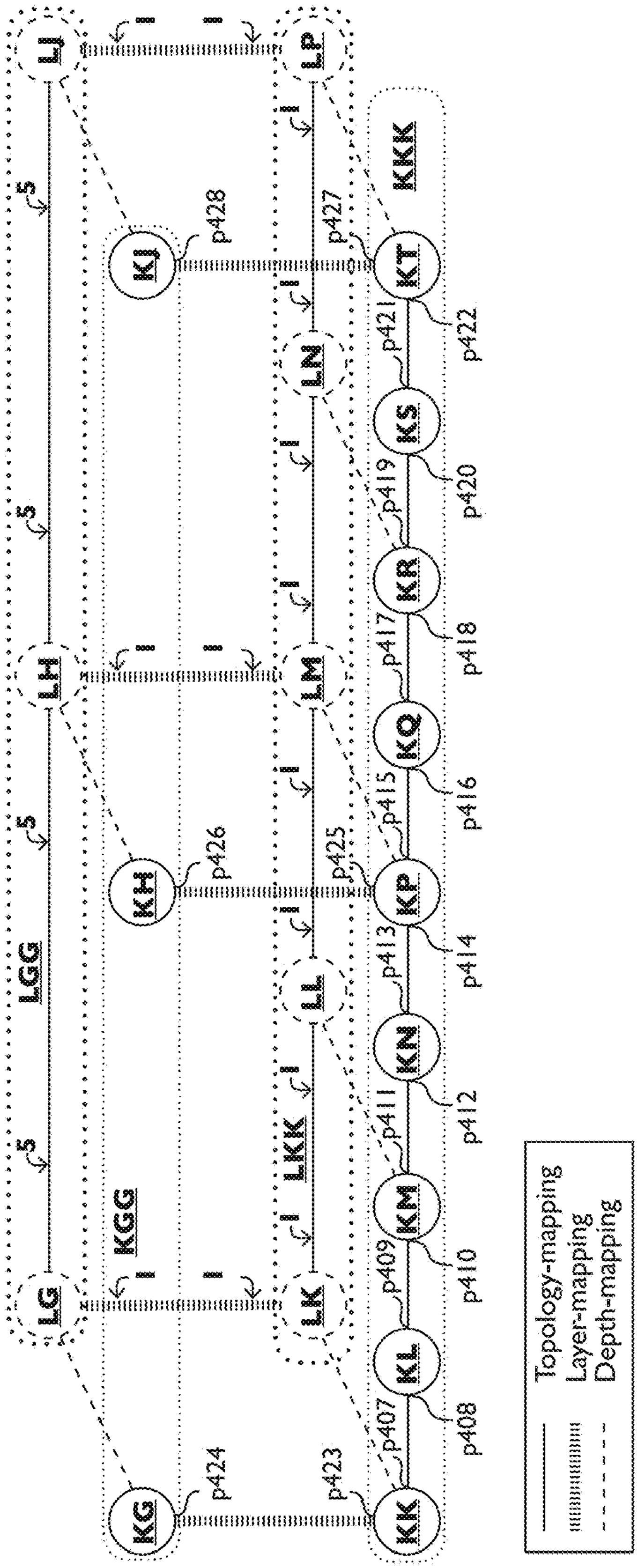
FIG. 40G is a diagram consisting of networks KK, KL, KM, KN, KP, KQ, KR, KS, KT at (d=0, n=0, h=0), network KKK at (d=0, n=0, h=1), networks KG, KH, KJ at (d=0, n=1, h=0), network KGG at (d=0, n=1, h=1), networks LK, LL, LM, LN, LP at (d=1, n=0, h=0), network LKK at (d=1, n=0, h=1), networks LG, LH, LJ at (d=1, n=1, h=0 and network LGG at (d=1, n=1, h=1), as well as topology-mappings, layer-mappings and depth-mappings between networks. Also the PoAs of the topology-mappings and layer-mappings between networks at (d=0, h=0) are shown. The cost of all topology-mappings and layer-mappings is 1 (one) in both directions, except for the cost of the topology-mapping between network LG and network LH is 5 in both directions and the cost of the topology-mapping between network LH and network LJ is 5 in both directions. The cost of all depth-mappings is 0 (zero) in both directions.
Figure 40H:
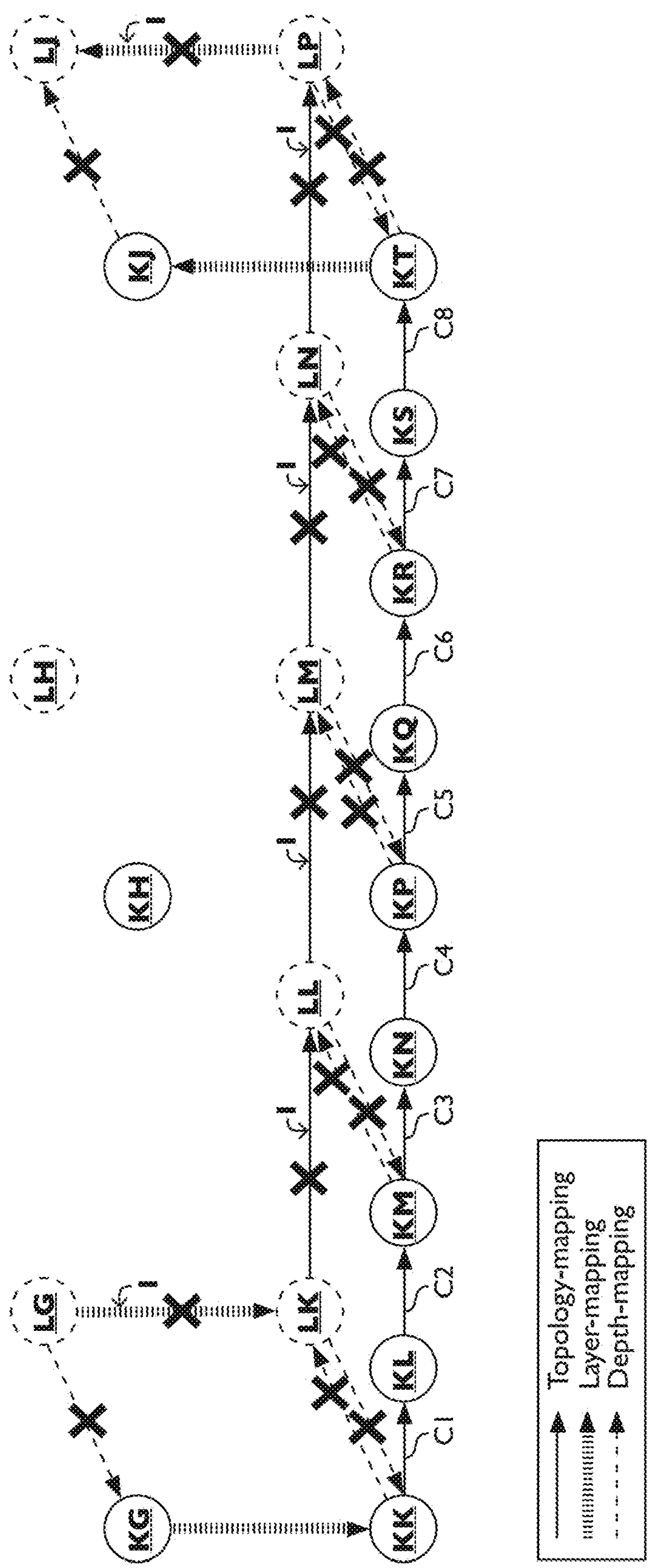
FIG. 40H is a diagram consisting of networks KK, KL, KM, KN, KP, KQ, KR, KS, KT at (d=0, n=0, h=0), network KKK at (d=0, n=0, h=1), networks KG, KH, KJ at (d=0, n=1, h=0), network KGG at (d=0, n=1, h=1), networks LK, LL, LM, LN, LP at (d=1, n=0, h=0), network LKK at (d=1, n=0, h=1), networks LG, LH, LJ at (d=1, n=1, h=0 and network LGG at (d=1, n=1, h=1), as well as topology-mappings and layer-mappings between networks. Also channel identifiers C1 through C8 are shown as well as topology-mappings and layer-mappings that have been replaced as depicted by the cross symbol. The path resulting from applying the 'method with depth-mappings' to the path from source network LG to destination network LJ results in path KG, KK, KL, KM, KN, KP, KQ, KR, KS, KT, KJ.

In the above example in step 1) of the flowchart of FIG. 41 (method with depth-mappings') a topology-path from source network LG to destination network LJ was calculated as a concatenation of one or more topology-mappings from an arbitrary first network to an arbitrary second network within network LGG determined by a forwarding policy of network LGG. As an alternative a multi-layer forwarding policy can be used to calculate a path in step 1) of the flowchart of FIG. 41. Instead of calculating a path based on a forwarding policy in a single layer, a forwarding policy across two or more layers is used. As an example, but not limited to, a Shortest Path First (SPF) calculation can be performed across multiple layers. As a typical example, but not limited to, consider a network consisting of a CSN at layer n=0, as an example but not limited to, a Dense Wavelength Division Multiplexing (DWDM) network and a PSN at layer n=1, as an example but not limited to, a routed IPv4 network. A typical question the operator of such network faces is: for a path from a source network at n=1 to a destination network at n=1 which intermediate routers to pass through. For large bandwidth demand it might be beneficial to establish a direct optical path between the source network and the destination network. For smaller bandwidth demand it is beneficial to pass thru one or more routers to aggregate traffic. This is typically a complex task depending not only on bandwidth requirements, but also, but not limited to, latency, Quality-of-Service (QoS), cost and security requirements. For a typical network with many paths this becomes a very complex task. Using a multi-layer forwarding policy in a SDN Compiler can help to reduce the complexity. Within the SDN Compiler or offline from the SDN Compiler optimization algorithms can be ran upon the data within the SDN Compiler such as all network and mapping information about a part or the entire set of networks. As an example we consider the network of FIG. 40A again, but with a change in cost as shown in FIG. 40G. Instead of the cost of all topology-mappings and layer-mappings being 1 (one) in both directions, the cost of the topology-mapping between network LG and network LH is 5 in both directions and the cost of the topology-mapping between network LH and network LJ is 5 in both directions. The networks at layer n=0 are CSNs, the networks at layer n=1 are PSNs. Applying a SPF policy on the combination of network LKK and network LGG results in path LG, LK, LL, LM, LN, LP, LJ as shown in FIG. 40H. Note that the packet-switching node LH is not traversed. Applying steps 2) through 5) of the flowchart of FIG. 41 (method with depth-mappings') results in path KG, KK, KL, KM, KN, KP, KQ, KR, KS, KT, KJ.

The above 'method with depth-mappings' consisting of steps 1) through 5) of the flowchart of FIG. 41 and described above can be applied to an arbitrary number of depths and an arbitrary number of layers.

Figure 40I:
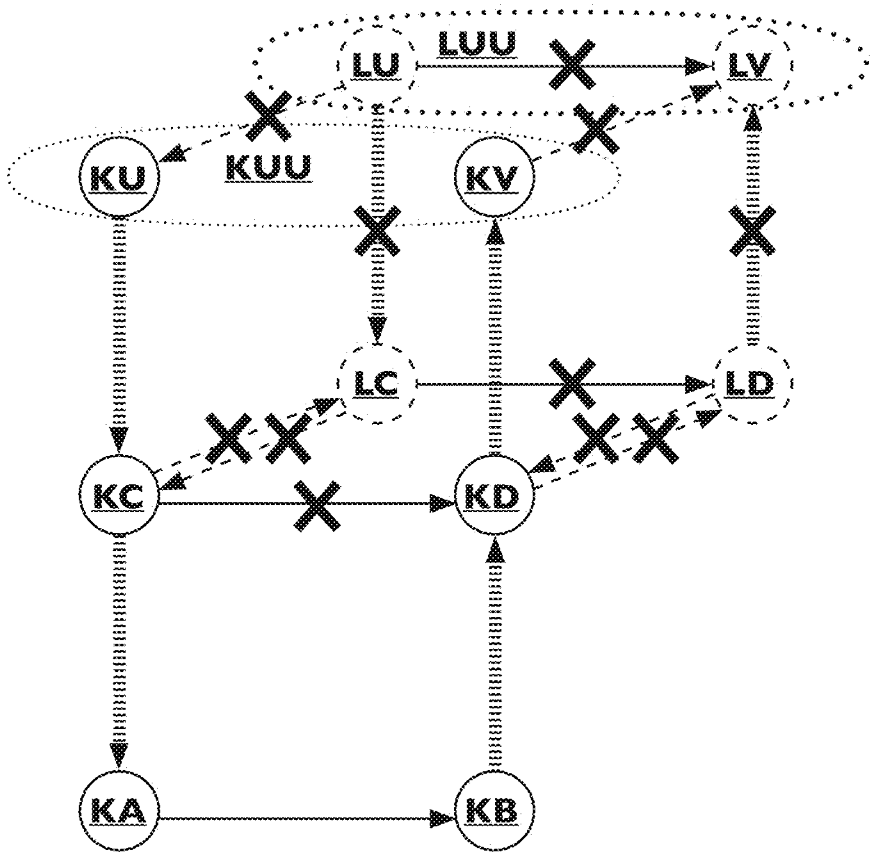
FIG. 40I is a diagram showing networks KA, KB, KC, KD, KU, KV, LC, LD, LU and LV. The path from network KU to network KV is shown, being a concatenation of a layer-mapping from network KU to network KC, a layer-mapping from network KC to network KA, a topology-path from network KA to network KB, a layer-mapping from network KB to network KD and a layer-mapping from network KD to network KV.

We now consider a set of networks in which the lowest layer n at a particular depth d is different for different depths d. An example of such a network is shown in FIG. 40I showing networks KA, KB, KC, KD, LC, LD, of FIG. 34A as well as network KUU at (d=0, n=2, h=1) comprising of network KU at (d=0, n=2, h=0) and network KV at (d=0, n=2, h=0) and network LUU at (d=1, n=2, h=1) comprising of network LU at (d=1, n=2, h=0), network LV at (d=1, n=2, h=0). Note that at d=0 the lowest layer n=0, while at d=1 the lowest layer n=1. Therefore, we introduce a n_min(d) at depth d being the lowest layer n at depth d. Therefore, n_min(d=0)=0, while n_min(d=1)=1 in the example shown in FIG. 40I. Note that in general n_min(d+1)>=n_min(d). A set of networks with n_min(d+1)<n_min(d) is not possible, as a network at (d, n) is required for a network at (d+1, n) to be created. We introduce a n_max(d) at depth d being the highest layer n at depth d. Note that in general n_max(d+1)<=n_min(d). A set of networks with n_max(d+1)>n_max(d) is not possible, as a network at (d, n) is required for a network at (d+1, n) to be created. FIG. 40I illustrates applying steps 1) through 5) of the flowchart of FIG. 41 (method with depth-mappings') for a path requested from network LU to network LV, resulting in a path from network KU to network KV as shown, being a concatenation of a layer-mapping from network KU to network KC, a layer-mapping from network KC to network KA, a topology-path from network KA to network KB, a layer-mapping from network KB to network KD and a layer-mapping from network KD to network KV.

Note that a network at depth d is offering services to a network at depth d+1 and the network at depth d+1 is consuming services from the network at depth d. This is similar to a network at layer n is offering services to a network at layer n+1 and the network at layer n+1 is consuming services from the network at layer n. Note that a set of networks at each depth d can be owned by a different owner. As an example, but not limited to, within a set of networks consisting of depths d=0, d=1 and d=2, depth d=0 could be owned by a Telecom Service Provider, depth d=1 could be owned by an Enterprise and depth d=2 could be owned by a department within the Enterprise. As an example, but not limited to, within a set of networks consisting of depths d=0, d=1 and d=2, depth d=0 could be owned by a Telecom Service Provider, depth d=1 could be owned by a Cloud Provider and depth d=2 could be owned by an Enterprise. As an example, but not limited to, within a set of networks consisting of depths d=0, d=1 and d=2, depth d=0 could be owned by a Cloud Provider, depth d=1 could be owned by an Application Provider and depth d=2 could be owned by the user of the application.

As shown in FIG. 40I not all layers n at d have to be offered to d+1. As an example, but not limited to, within a set of networks consisting of depths d=0 and d=1, depth d=0 could be owned by a Telecom Service Provider and depth d=1 could be owned by a Cloud Provider. The network at n=0 is a DWDM network, the network at n=1 is a layer 3 PSN and the network at n=2 is a layer 4 PSN. As depicted in FIG. 40I a Telecom Service Provider could have an arrangement with a Cloud Provider in which the Telecom Service Provider only offers services from depth d=0 at layer n=1 and layer n=2 to the Cloud Provider at d=1 and does not offer any services from depth d=0 at layer n=0. In other words, only layer 3 PSN and layer 4 PSN services are offered, but no wavelength services.

We now consider the capacity of topology-mappings and layer-mappings. Each topology-mapping and each layer-mapping between physical and/or virtual nodes has a certain capacity, or bandwidth, typically expressed in bits per second. Each topology-mapping and each layer-mapping between logical nodes has a certain capacity, or bandwidth, typically expressed in bits per second. When replacing a topology-mapping from network LC to network LD at step 2) of FIG. 41 capacity is claimed at the layer-mapping from network LC to network LA, at topology-path from network LA to network LB and therefore at the topology-mappings this topology-path consists of, at the layer-mapping from network LB to network LD. When replacing a topology-mapping from network LA to network LB at step 3) of FIG. 41 capacity is claimed at the topology-path from network KA to network KB and therefore at the topology-mappings this topology-path consists of. When replacing a layer-mapping from network LC to network LA at step 4) of FIG. 41 capacity is claimed at the layer-mapping from network KC to network KA. When replacing a layer-mapping from network LB to network LD at step 4) of FIG. 41 capacity is claimed at the layer-mapping from network KB to network KD. The user of the SDN Compiler specifies the capacity of a requested path. The capacity within topology-mappings and layer-mappings between physical and/or virtual nodes is a physical property that should not be exceeded. The SDN Compiler should check for each path that is requested whether the capacity of any topology-mappings and layer-mappings between physical and/or virtual nodes is exceeded. As such the SDN Compiler should administer the capacity claimed at each topology-mapping and layer-mapping between physical and/or virtual nodes. In case of a PSN statistical multiplexing is used and the allowed oversubscription should be specified for each path requested, which should be taken into account by the SDN Compiler when administering above capacity claimed at each topology-mapping and layer-mapping between physical and/or virtual nodes. In case such capacity is exceeded at any of the topology-mappings or layer-mappings, the SDN Compiler can either respond by, but not limited to:

- calculating an alternative, typically less optimal, path and notifying the user of the SDN Compiler
- rejecting the requested path and notifying the user of the SDN Compiler
- removing one or more existing paths to free capacity and create the requested path in case the requested path takes priority over one ore more existing paths and notifying the user of the SDN Compiler
- re-arrange existing paths to optimize capacity and create the requested path and optionally notifying the user of the SDN Compiler Note that in steps 2), 3) and 4) of FIG. 41 the claimed capacity can be a fraction of the total capacity of a topology-mapping of layer-mapping between physical and/or virtual nodes, can be the total capacity of a topology-mapping of layer-mapping between physical and/or virtual nodes, can exceed the total capacity of a topology-mapping by using multiple topology-mappings between physical and/or virtual nodes and can exceed the total capacity of a layer-mapping by using multiple layer-mappings between physical and/or virtual nodes.

We now consider the inputs required by the SDN Compiler. The SDN Compiler requires 3 types of inputs:

- network inputs
- mapping inputs
- requested path inputs

The following inputs are required by the SDN Compiler

- network instances:
  - network name
  - network depth d
  - network layer n
  - network level h
  - packet-switching network or circuit-switching network (identical for all networks at a layer n)
  - node type (host, switch or NIC) for each network that is a node
  - PoAs for each network that is a physical or virtual node
  - name of one or more networks at (d, n, h−1) network (d, n, h) consists of (note that this is a level mapping) for each network that is not a node
- mapping instances:
  - source network and destination network of each topology-mapping, including physical/virtual-mappings which are topology-mappings.
  - capacity of each topology-mapping
  - PoA at source network and PoA at destination network in case of a topology-mapping between physical and/or virtual nodes
  - source network and destination network of each layer-mapping
  - in case of CSN channel identifier(s) in physical multiplexed signal
  - in case of CSN capacity of each channel identified by a channel identifier
  - capacity of each layer-mapping
  - PoA at source network and PoA at destination network in case of a layer-mapping between physical and/or virtual nodes:
  - source network and destination network of each depth-mapping
- requested paths instances:
  - source network and destination network of path to calculate forwarding entries for
  - Capacity of requested path
  - In case of PSN allowed oversubscription of requested path
  - Logical addressing format, which can be specified for all forwarding within one or more networks and does not have to be specified on a per-path basis.

As an example, but not limited to, the above method of FIG. 41 can be implemented using the matrices. As an example, but not limited to, the above methods of FIG. 41 can be implemented using a graph database. Recent developments in graph databases have made it possible to store extremely large graphs consisting of over 1 billion edges and do relatively fast searches in these large graphs, much faster compared to traditional types of databases.

As the data stored in the SDN Compiler is consisting of weighted directed graphs in which the vertices are networks at various depth d, layer n and level h interconnected by edges which are topology-mappings, depth-mappings and layer mappings a possible implementation, but not limited to, of an SDN Compiler can be based on storing the network and mapping data in a graph database. A graph database is typically, but not limited to, based on a property graph model consisting of vertices having properties and directed edges having properties. The network properties within the SDN Compiler method can be stored as vertex properties. Such vertex properties, also referred to as vertex attributes, could comprise the network-related inputs of the SDN Compiler method described above as well as additional network information such as for example but not limited to geographic longitude of the physical or virtual node, geographic latitude of the physical or virtual node and uptime of the node. The topology-mapping, layer-mapping and depth-mapping properties within the SDN Compiler method can be stored as edge properties. Such edge properties, also referred to as edge attributes, could comprise the mapping-related inputs of the SDN Compiler method described above as well as additional mapping information such as for example but not limited to the physical duct a fiber is residing in and uptime of the physical link. As an example, but not limited to, in case of a hierarchical network a graph could be created for all or a subset of networks at a particular level h. Networks at level h−1 within a network at level h could be stored as vertex-properties.

Figure 42A:
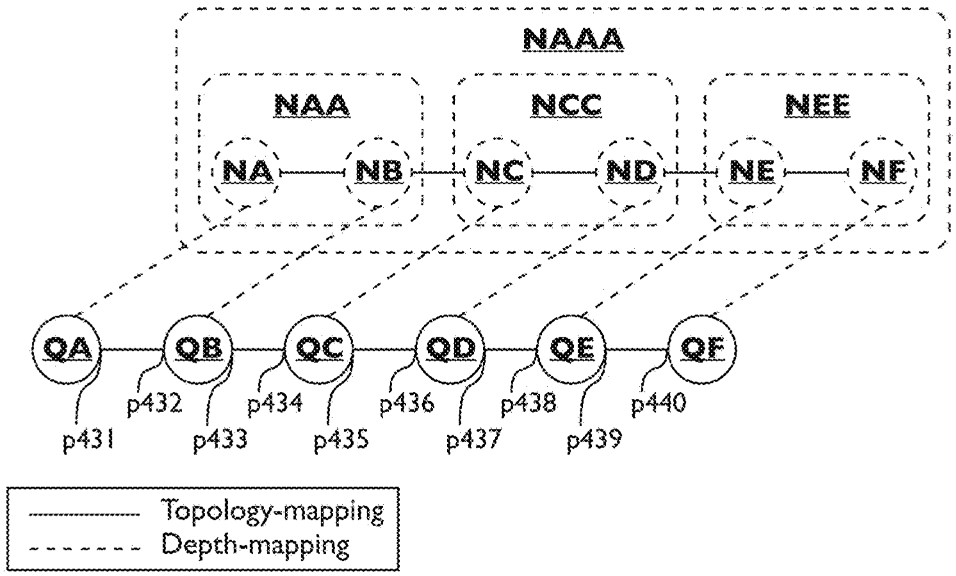
FIG. 42A is a diagram showing network NAAA at (d, n, h+2) consisting of networks NAA, NCC and NEE at (d, n, h+1). Network NAA consists of networks NA and NB at (d, n, h). Network NCC consists of networks NC and ND at (d, n, h). Network NEE consists of networks NE and NF at (d, n, h).
Figure 42B:
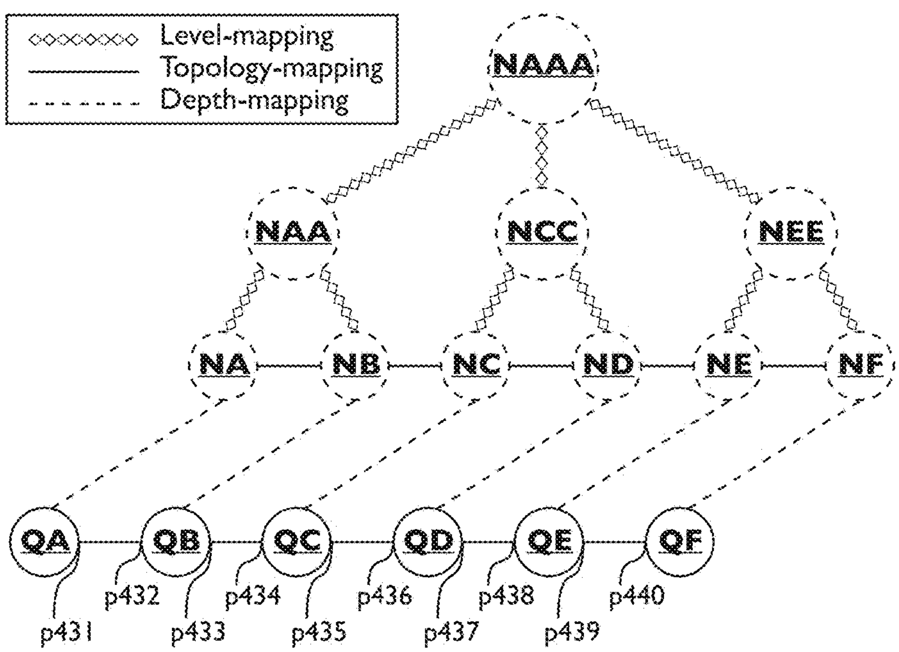
FIG. 42B is a diagram showing network NAAA at (d, n, h+2) consisting of networks NAA, NCC and NEE at (d, n, h+1). Network NAA consists of networks NA and NB at (d, n, h). Network NCC consists of networks NC and ND at (d, n, h). Network NEE consists of networks NE and NF at (d, n, h).
Figure 42C:
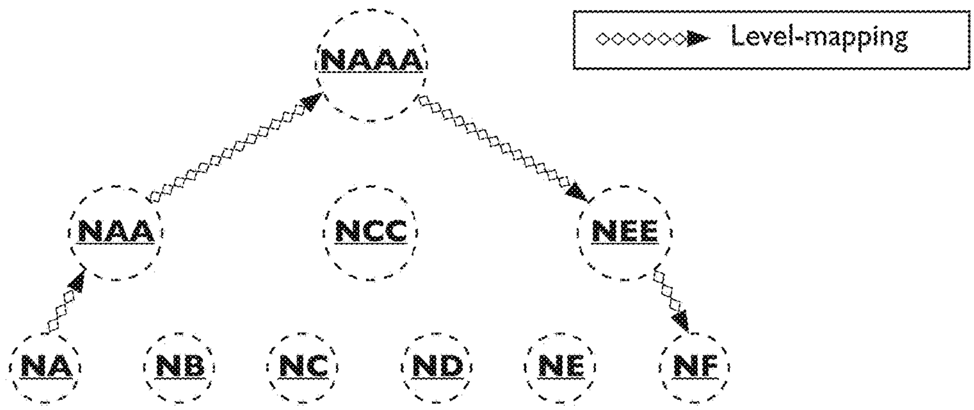
FIG. 42C is a diagram showing networks NAAA, NAA, NCC, NEE, NA, NB, NC, ND, NE and showing a level-path from network NA to network NF consisting of a concatenation of a level-mapping from network NA to network NAA, a concatenation of a level-mapping from network NAA to network NAAA, a concatenation of a level-mapping from network NAAA to network NEE and a concatenation of a level-mapping from network NEE to network NF.

We now consider a method to determine paths within a set of hierarchical networks. FIG. 42A shows network NAAA at (d, n, h+2) consisting of networks NAA, NCC and NEE at (d, n, h+1). Network NAA consists of networks NA and NB at (d, n, h). Network NCC consists of networks NC and ND at (d, n, h). Network NEE consists of networks NE and NF at (d, n, h). FIG. 42A also shows the topology-mappings between networks at (d, n, h). FIG. 42B shows an alternative representation of the set of networks NAAA, NAA, NCC, NEE, NA, NB, NC, ND, NE and NF of FIG. 42A by showing the level-mappings between networks at (d=1, n=0). As an example, network NAAA at (d=1, n=0, h=2) consists of networks NAA, NCC and NEE at (d=1, n=0, h=1). Therefore, a level-mapping is shown between network NAAA and network NAA, a level-mapping is shown between network NAAA and network NCC and a level-mapping is shown between network NAAA and network NEE. Note that in this way a hierarchical network, being a hierarchical graph, is represented as a non-hierarchical graph. Our objective is to find one or more topology-paths from a logical source network to a logical destination network. We consider the lowest hierarchy level to be h_min(d, n) at depth d and layer n. A network at level h_min(d, n) is a node. In order to find a topology-path from source network NAA to destination network NEE we perform the following steps as illustrated in FIGS. 42C through 42K:

Step 1: We refer to a level-path as a concatenation of level-mappings. As shown in FIG. 42C calculating a level-path from source network NA with source address NAAA.NAA.NA to destination network NF with destination address NAAA.NEE.NF consisting of a concatenation of a level-mapping from network NA at (d, n, h) to network NAA at (d, n, h+1), a level-mapping from network NAA at (d, n, h+1) to network NAAA at (d, n, h+2), a level-mapping from network NAAA at (d, n, h+2) to network NEE at (d, n, h+1) and a level-mapping from network NEE at (d, n, h+1) to network NF at (d, n, h). We refer to the level of NAAA as h_max.

Figure 42D:
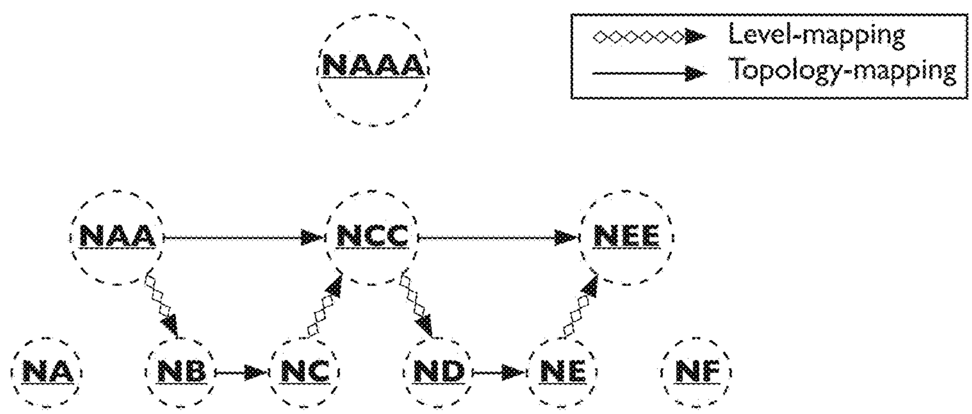
FIG. 42D is a diagram showing networks NAAA, NAA, NCC, NEE, NA, NB, NC, ND, NE and showing a topology-mapping from network NAA to network NCC being calculated as a concatenation of a level-mapping from network NAA to network NB, a topology-path from network NB to network NC and a level-mapping from network NC to network NCC in order to calculate the cost of the topology-mapping from network NAA to network NCC.

Step 2: As shown in FIG. 42D calculating the cost of a cost-type k of topology-mappings at level h_max−1. Calculating a topology-mapping from network NAA at (d, n, h+1) to network NCC at (d, n, h+1) as a concatenation of a level-mapping from network NAA at (d, n, h+1) to network NB at (d, n, h), a topology-mapping from network NB at (d, n, h) to network NC at (d, n, h) and a level-mapping from network NC at (d, n, h) to network NCC at (d, n, h+1). The cost of cost-type k of the topology-mapping from network NAA at (d, n, h+1) to network NCC at (d, n, h+1) is the sum of the cost of cost-type k of the level-mapping from network NAA at (d, n, h+1) to network NB at (d, n, h), the cost of cost-type k of the topology-path from network NB at (d, n, h) to network NC at (d, n, h) and the cost of cost-type k of the level-mapping from network NC at (d, n, h) to network NCC at (d, n, h+1). As an example, but not limited to, in case the cost of cost-type k of the level-mapping from network NAA at (d, n, h+1) to network NB at (d, n, h) is equal to zero and the cost of cost-type k of the level-mapping from network NC at (d, n, h) to network NCC at (d, n, h+1) is equal to zero, the cost of cost-type k of the topology-mapping from network NAA at (d, n, h+1) to network NCC at (d, n, h+1) is equal to the cost of cost-type k of the topology-path from network NB at (d, n, h) to network NC at (d, n, h). As an example, but not limited to, applying a non-zero cost to the level-mapping from network NC at (d, n, h) to network NCC at (d, n, h+1) and/or to the level-mapping from network NCC at (d, n, h+1) to network ND at (d, n, h) allows for taking a cost into account for the traversal of network NCC.

Figure 42E:
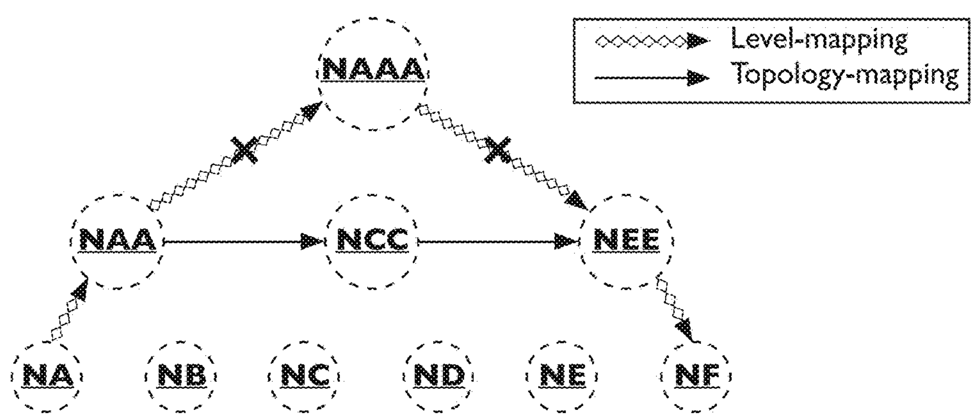
FIG. 42E is a diagram showing networks NAAA, NAA, NCC, NEE, NA, NB, NC, ND, NE and showing a concatenation of a level-mapping from network NAA to network NAAA and a level-mapping from network NAAA to network NEE being replaced by a topology-path from network NAA to network NEE.

Step 3: As shown in FIG. 42E replacing a level-path from source network NAA at (d, n, h+1) to destination network NEE at (d, n, h+1) by a concatenation of one or more topology-mappings from an arbitrary first network at (d, n, h+1) to an arbitrary second network at (d, n, h+1) within higher level network NAAA at (d, n, h+2) determined by a forwarding policy of network NAAA. Note that the topology-path from network NAA to network NEE consists of a concatenation of topology-mapping from network NAA to network NCC and a topology-mapping from network NCC to network NEE. In general, this topology-path can consist of a concatenation of an arbitrary number of topology-mappings.

Figure 42F:
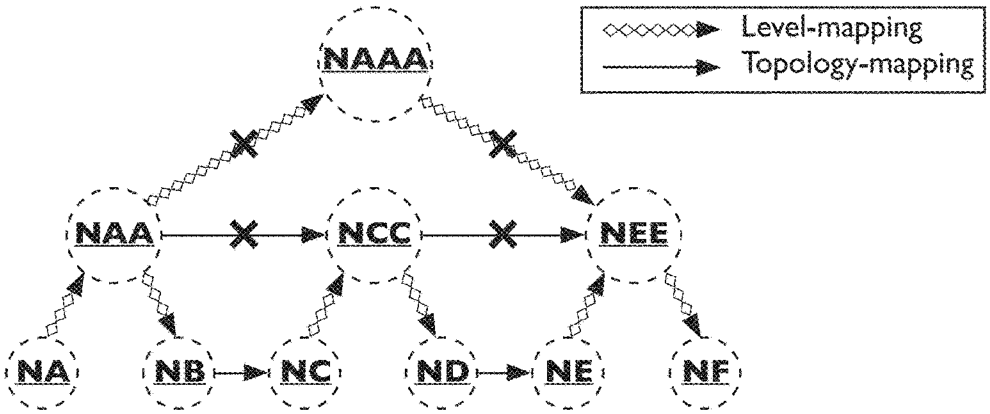
FIG. 42F is a diagram showing networks NAAA, NAA, NCC, NEE, NA, NB, NC, ND, NE and showing a topology-mapping from network NAA to network NCC being replaced by a concatenation of a level-mapping from network NAA to network NB, a topology-path from network NB to network NC and a level-mapping from network NC to network NCC.

Step 4: As shown in FIG. 42F replacing a topology-mapping from network NAA at (d, n, h+1) to network NCC at (d, n, h+1) by a concatenation of a level-mapping from network NAA at (d, n, h+1) to network NB at (d, n, h), a topology-mapping from network NB at (d, n, h) to network NC at (d, n, h) and a level-mapping from network NC at (d, n, h) to network NCC at (d, n, h+1). As shown in FIG. 42F calculating a topology-mapping from network NCC at (d, n, h+1) to network NEE at (d, n, h+1) as a concatenation of a level-mapping from network NCC at (d, n, h+1) to network ND at (d, n, h), a topology-mapping from network ND at (d, n, h) to network NE at (d, n, h) and a level-mapping from network NE at (d, n, h) to network NEE at (d, n, h+1).

Figure 42G:
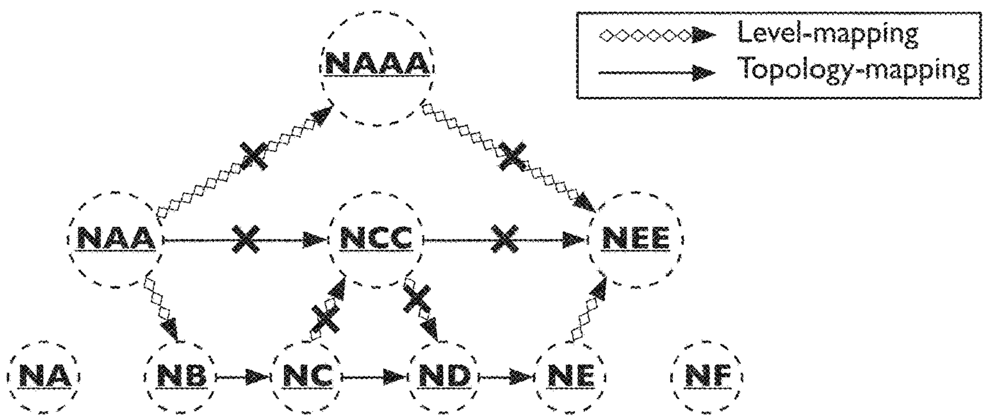
FIG. 42G is a diagram showing networks NAAA, NAA, NCC, NEE, NA, NB, NC, ND, NE and showing a concatenation of a level-mapping from network NC to network NCC and a level-mapping from network NCC to network ND being replaced by a topology-path from network NC to network ND.

Step 5: As shown in FIG. 42G replacing a level-path consisting of a level-mapping from network NC at (d, n, h) to network NCC at (d, n, h+1) and from network NCC at (d, n, h+1) to network ND at (d, n, h) by a topology-path from network NC at (d, n, h) to network ND at (d, n, h). Note that the topology-path from network NC to network ND consists of a single topology-mapping from network NC to network ND. In general, this topology-path can consist of a concatenation of an arbitrary number of topology-mappings. As shown in FIG. 42G steps 1) through 5) above results in a path from network NAA to network NEE consisting of a level-mapping from network NAA to network NB, a topology-mapping from network NB to network NC, a topology-mapping from network NC to network ND, a topology-mapping from network ND to network NE and a level-mapping from network NE to network NEE.

Figure 42H:
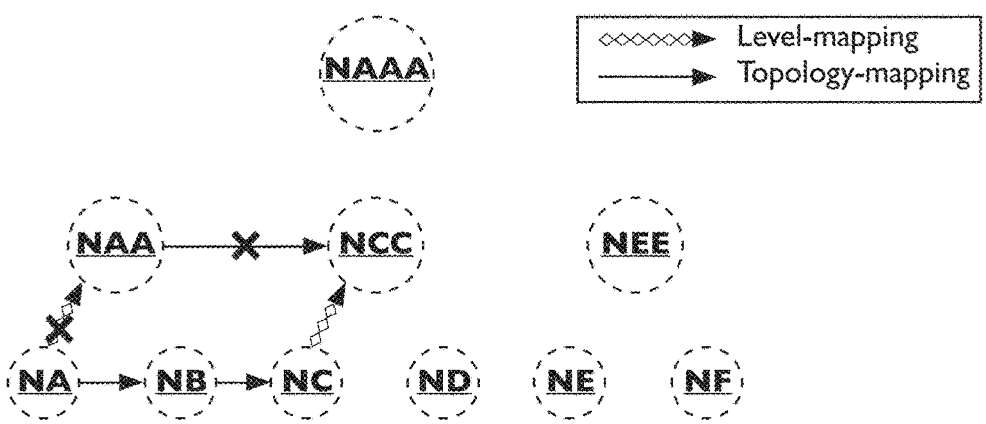
FIG. 42H is a diagram showing networks NAAA, NAA, NCC, NEE, NA, NB, NC, ND, NE and showing concatenation of the level-mapping from network NA at (d, n, h) to network NAA at (d, n, h+1) and the topology-mapping from network NAA at (d, n, h+1) to network NCC at (d, n, h+1) being replaced by a concatenation of a topology-path from network NA at (d, n, h) to network NC at (d, n, h) and a level-mapping from network NC at (d, n, h) to network NCC at (d, n, h+1).

Step 6: As shown in FIG. 42H replacing a concatenation of the level-mapping from network NA at (d, n, h) to network NAA at (d, n, h+1) and the topology-mapping from network NAA at (d, n, h+1) to network NCC at (d, n, h+1), as shown in FIG. 42E, by a concatenation of a topology-path from network NA at (d, n, h) to network NC at (d, n, h) and a level-mapping from network NC at (d, n, h) to network NCC at (d, n, h+1). Note that the topology-path from network NA to network NC consists of a concatenation of a topology-mapping from network NA to network NB and a topology-mapping from network NB to network NC. In general, this topology-path can consist of a concatenation of an arbitrary number of topology-mappings. Note that as shown in FIG. 42E a path from network NA to network NEE consists of a concatenation of a level-mapping from network NA to network NAA, a topology-mapping from network NAA to network NCC and a topology-mapping from network NCC to network NEE. In order to summarize routes in order to reduce the number of forwarding entries, it is sufficient to calculate the path from network NA to network NCC and use forwarding entries calculated in step 5 from network NCC to network NEE. The path calculated at this step has source network NA and destination network NEE.

Figure 42I:
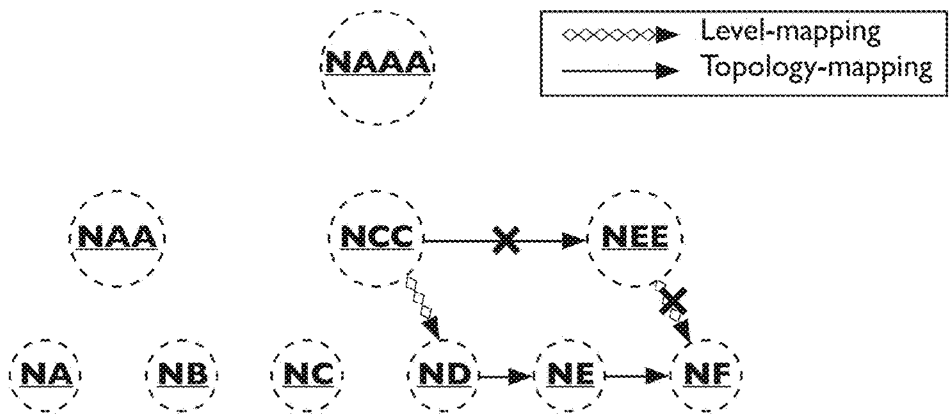
FIG. 42I is a diagram showing networks NAAA, NAA, NCC, NEE, NA, NB, NC, ND, NE and showing a concatenation of the topology-mapping from network NCC at (d, n, h+1) to network NEE at (d, n, h+1) and the level-mapping from network NEE at (d, n, h+1) to network NF at (d, n, h) being replaced by a concatenation of a level-mapping from network NCC at (d, n, h+1) to network ND at (d, n, h) and a topology-path from network ND at (d, n, h) to network NF at (d, n, h).

Step 7: As shown in FIG. 42I replacing a concatenation of the topology-mapping from network NCC at (d, n, h+1) to network NEE at (d, n, h+1) and the level-mapping from network NEE at (d, n, h+1) to network NF at (d, n, h), as shown in FIG. 42E, by a concatenation of a level-mapping from network NCC at (d, n, h+1) to network ND at (d, n, h) and a topology-path from network ND at (d, n, h) to network NF at (d, n, h). Note that the topology-path from network ND to network NF consists of a concatenation of a topology-mapping from network ND to network NE and a topology-mapping from network NE to network NF. In general, this topology-path can consist of a concatenation of an arbitrary number of topology-mappings. The path calculated at this step has source network NAA and destination network NF. Note that as shown in FIG. 42E a path from network NAA to network NF consists of a concatenation of a topology-mapping from network NAA to network NCC, a topology-mapping from network NCC to network NEE and a level-mapping from network NEE to network NF. In order to summarize routes in order to reduce the number of forwarding entries, it is sufficient to calculate the path from network NCC to network NF and use forwarding entries as calculated in step 5 from network NAA to network NCC. The path calculated at this step has source network NAA and destination network NF.

Figure 42J:
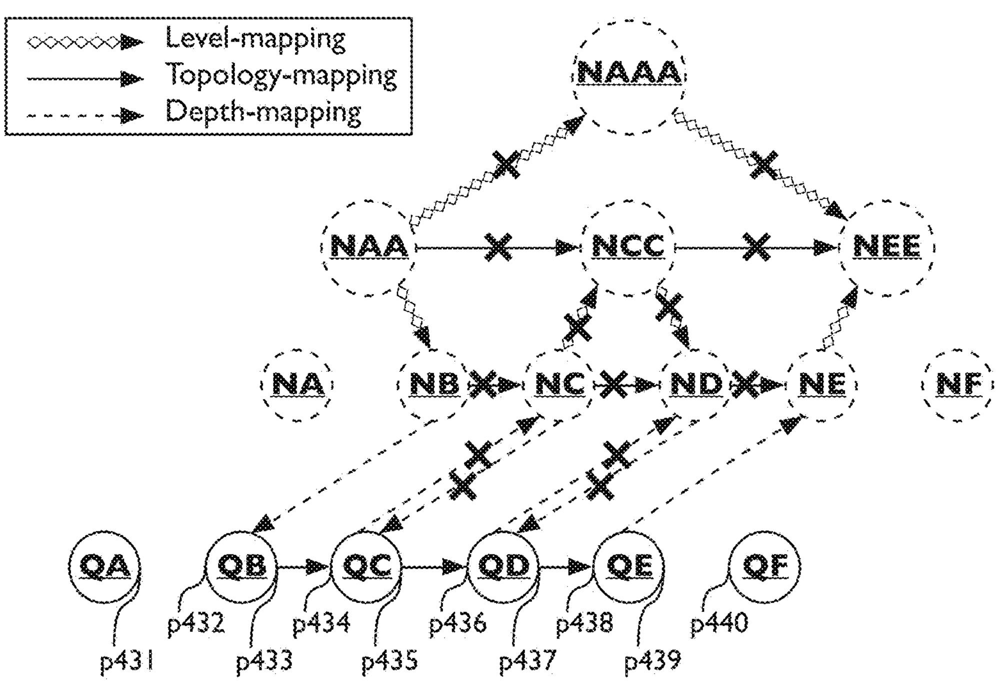
FIG. 42J is a diagram showing networks NAAA, NAA, NCC, NEE, NA, NB, NC, ND, NE and showing networks QA, QB, QC, QD, QE and QF at (d−1, n, h) as well as depth-mappings between networks at (d, n, h) and networks at (d−1, n, h).
Figure 42L:
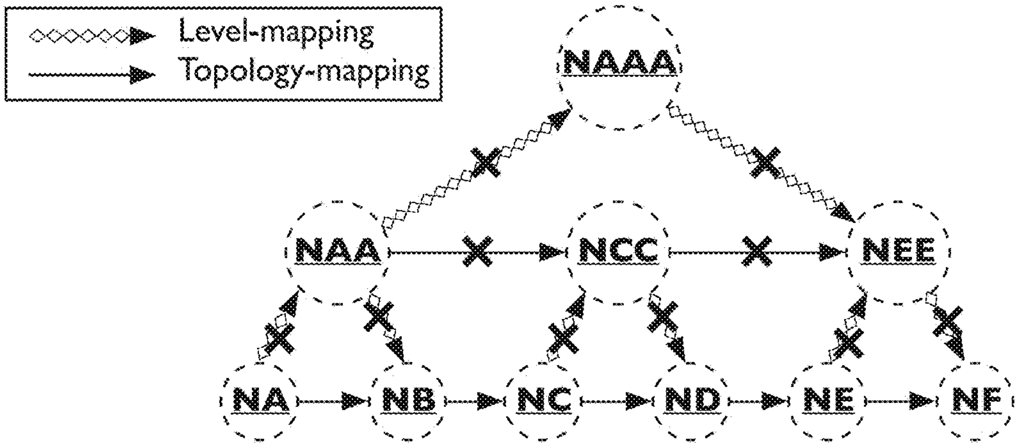
FIG. 42L is a diagram showing networks NAAA, NAA, NCC, NEE, NA, NB, NC, ND, NE, NF and showing a level-path from network NA to network NF being replaced by a topology-path from network NA to network NF traversing networks NB, NC, ND and NE.

We refer to the above method consisting of steps 1) through 7) as 'hierarchical path method'. The 'method with depth-mappings' can be applied to the topology-mappings at (d, n, h) resulting from the 'hierarchical path method'. FIG. 42J shows how the 'method with depth-mappings' is applied to the above calculated topology-path from network NB to network NE at (d, n, h) resulting from steps 1) through 5) of which the first node of the path, being node NB, is mapped to network NAA by a level-mapping and of which the last node of the path, being node NE, is mapping to network NEE by a level-mapping. The resulting path with source address NAAA.NAA.* and destination address NAAA.NEE.* is consisting of a topology-mapping from network QB at (d−1, n, h) to network QC at (d−1, n, h), a topology-mapping from network QC at (d−1, n, h) to network QD at (d−1, n, h), a topology-mapping from network QD at (d−1, n, h) to network QE at (d−1, n, h). The logical source network in the forwarding table entry specifies network-of-nodes NAA, therefore the logical source node of network-of-nodes NAA is given by '*' (asterisk), used as a wildcard symbol. Now the above described process to calculate forwarding instructions can be applied resulting in the forwarding entries shown in FIG. 42K. Forwarding entries are created for physical or virtual nodes having an input port PoA associated with a topology-mapping from a previous node in a topology-path and having an output port PoA associated with a topology-mapping to a next node the topology-path. As an example, but not limited to, the second forwarding entry in FIG. 42K for physical or virtual node QB with logical source address NAAA.NAA.NA and logical destination address NAAAA.NEE.* results from the topology-mapping from network QA to network QB and from the topology-mapping from network QB to network QC, which results from the topology-path from network NA to network NC as calculated in step 6 above. Also, forwarding entries are created for physical or virtual nodes being the first node in a path consisting of physical and/or virtual nodes being mapped to a logical source network through a depth-mapping and having an output port PoA associated with a topology-mapping to a next node in the topology-path. As an example, but not limited to, the first forwarding entry in FIG. 42K for physical or virtual node QA with logical source address NAAA.NAA.NA and logical destination address NAAAA.NEE.* results from the depth-mapping from network NA to network QA and the topology-mapping from network QA to network QB, which results from the topology-path from network NA to network NC as calculated in step 6 above. In the first row and fourth column of FIG. 42K 'LOCAL (NA)' denotes that the packet is created locally at physical or virtual node QA with network NA as logical source network. This is consistent with the logical source address shown in the second column of FIG. 42K. Also, forwarding entries are created for physical or virtual nodes being the last node in a path consisting of physical and/or virtual nodes having an input port PoA associated with a topology-mapping to a previous node in the topology-path and being mapped to a logical destination network through a depth-mapping. As an example, but not limited to, the sixth forwarding entry in FIG. 42K for physical or virtual node QF with logical source address NAAA.NAA.* and logical destination address NAAA.NEE.NF results from the topology-mapping from network QE to network QF and the depth-mapping from network QF to network NF, which results from the topology-path from network ND to network NF as calculated in step 7 above. In the sixth row and fifth column of FIG. 42K 'LOCAL (NF)' denotes that the packet is received locally at physical or virtual node QF with network NF as logical destination network. This is consistent with the logical destination address shown in the third column of FIG. 42K. The above approach allows for a significant reduction in the number of forwarding instructions to be calculated by the SDN Compiler, to be transmitted to physical or virtual nodes either directly or indirectly via a SDN Controller and to be stored in the physical or virtual node. This is particularly important as the Ternary Content-Addressable Memory (TCAM) of a node is typically limited in size and relatively expensive. The above approach is shown till level h+2, but can be extended to arbitrary number of levels. The above approach results in a tremendous reduction in the amount of forwarding entries compared to a non-hierarchical approach. As an example, but not limited to, in order to reduce the time to calculate new forwarding instructions and install the forwarding instructions in a physical or virtual node, one could calculate all forwarding entries for all networks at level h=1 using the above approach irrespective whether these paths have been requested by the user of the SDN Compiler. In other words, the method allows for proactive creation of forwarding entries while limiting the number of forwarding entries to be created. In case a new path is requested only the forwarding instructions for the path from the source node to a source-IDN, if not already created, and from a destination-IDN to the destination node, if not already created, have to be created. As shown in FIG. 42L, alternatively a level-path from network NA to network NF consisting of a concatenation of a topology-mapping from network NA to network NAA, a topology-mapping from network NAA to network NAAA, a topology-mapping from network NAAA to network NEE and a topology-mapping from network NEE to network NF could be replaced by a topology-path from network NA to network NF consisting of a topology-mapping from network NA to network NB, a topology-mapping from network NB to network NC, a topology-mapping from network NC to network ND, a topology-mapping from network ND to network NE, a topology-mapping from network NE to network NF. This path results from applying steps 1) through 5) described above and applying an alternative step 6*b*) instead of step 6) and an alternative step 7*b*) instead of step 7), as follows:

Step 6*b*: Replacing a level-path consisting of a level-mapping from network NA at (d, n, h) to network NAA at (d, n, h+1) and from network NAA at (d, n, h+1) to network NB at (d, n, h) by a topology-path from network NA at (d, n, h) to network NB at (d, n, h). Note that the topology-path from network NA to network NB consists of a single topology-mapping from network NA to network NB. In general, this topology-path can consist of a concatenation of an arbitrary number of topology-mappings.

Step 7*b*: Replacing a level-path consisting of a level-mapping from network NE at (d, n, h) to network NEE at (d, n, h+1) and from network NEE at (d, n, h+1) to network NF at (d, n, h) by a topology-path from network NE at (d, n, h) to network NF at (d, n, h). Note that the topology-path from network NE to network NF consists of a single topology-mapping from network NE to network NF. In general, this topology-path can consist of a concatenation of an arbitrary number of topology-mappings.

Figure 42M:
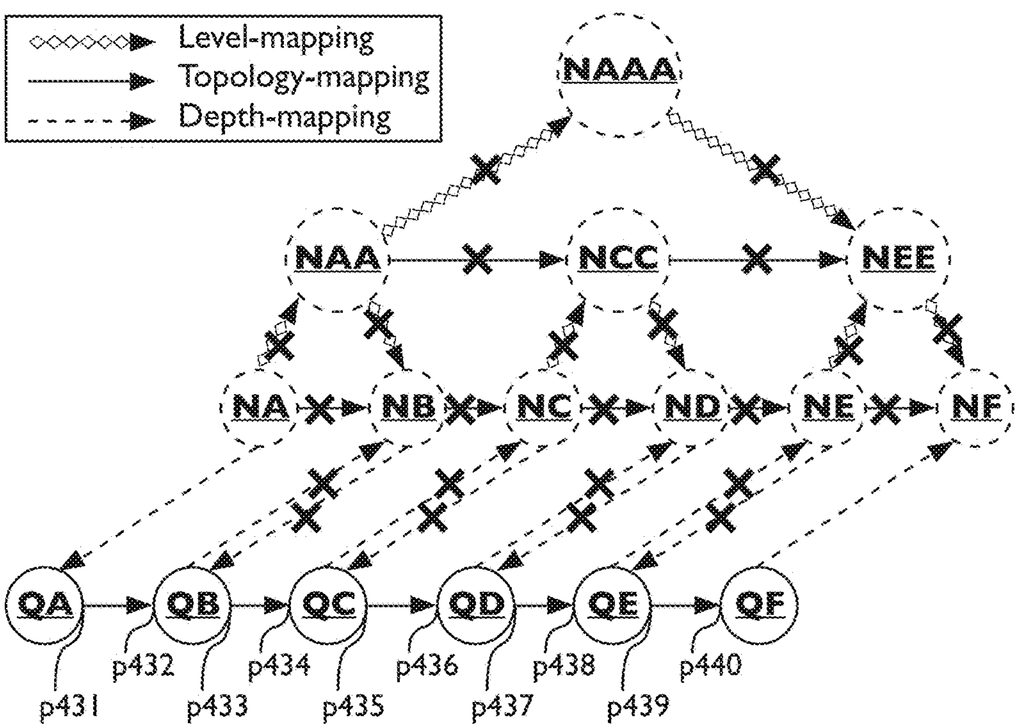
FIG. 42M is a diagram showing networks NAAA, NAA, NCC, NEE, NA, NB, NC, ND, NE, NF, QA, QB, QC, QD, QE, QF and showing a level-path from network NA to network NF being replaced by a topology-path from network NA to network NF traversing networks QA, QB, QC, QD, QE and QF.

Applying the 'method with depth-mappings' to the topology-path from network NA to network NF results in a path of physical and/or virtual nodes QA, QB, QC, QD, QE and QF as shown in FIG. 42M, from which forwarding entries can be calculated as per the method described above. This approach allows for creating a path without summarization at higher hierarchy levels h. As an example, but not limited to, this approach allows for forwarding traffic from network NA to network NF via a different route than other traffic from network NAA to network NEE. Note that in the example shown in FIG. 42L the path from network NA to network NF is calculated based on cost of a level-mappings and topology-mappings. The 'hierarchical path method' can be applied to an arbitrary number of hierarchy levels in a recursive manner.

Figure 43A:
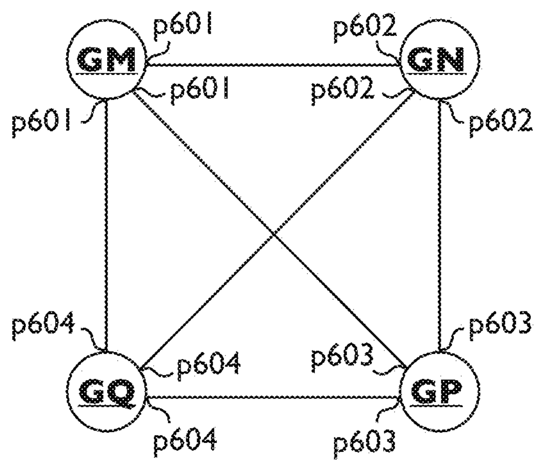
FIG. 43A is a diagram showing an example network consisting of physical and/or virtual nodes GM, GN, GP and GQ and topology-mappings between nodes representing connectivity to a shared medium.
Figure 43B:
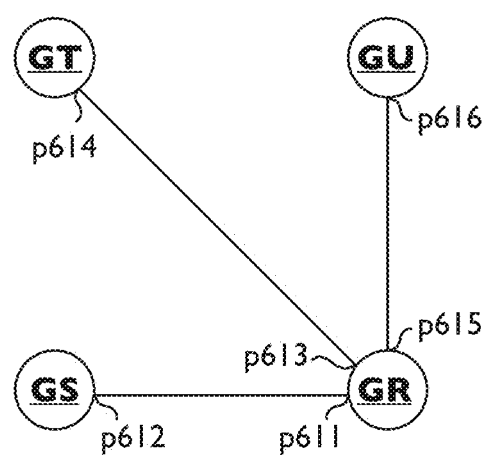
FIG. 43B is a diagram showing an example network consisting of physical and/or virtual nodes GR, GS, GT and GU and topology-mappings between nodes.

We now consider a shared medium. Within a shared medium each physical or virtual node connected to the shared medium has direct connectivity to each other physical or virtual node in the shared medium using a single physical or virtual interface. This can be represented as depicted in FIG. 43A, which shows physical and/or virtual nodes GM, GN, GP and GQ. Each of the nodes GM, GN, GP and GQ has a single PoA and has a topology-mapping to each other node. A person skilled in the art will understand that a wireless network such as, but not limited to, a Wireless Local Area Network (WLAN) based on IEEE 802.11, a Long-Term Evolution (LTE), also referred to as 4G (fourth Generation) network, a Worldwide Interoperability for Microwave Access (WiMAX) network are a hub-and-spoke topologies. An example hub-and-spoke network is shown in FIG. 43B consisting of physical and/or virtual nodes GR, GS, GT and GU, in which GR is the hub-node and GS, GT and GU are spoke-nodes. As an example, but not limited to, node GR could represent a wireless access point, also referred to as wireless base station, and nodes GS, GT and GU could represent wireless devices. The topology-mappings in FIG. 43B are wireless connections between hub-node GR and spoke-nodes GS, GT and GU.

We now consider forwarding policy. Note that forwarding policy applies to both PSN as well as CSNs. In a deployment it is beneficial to be able to specify a path based upon multiple requirements. As an example, but not limited to, a user would like to request a path from a source node to a destination node with 100 Mb/s (Megabit per second) bandwidth, with a latency below 5 ms (milliseconds) and with an packet loss smaller than 0.001%. This requires the SDN Compiler to calculate a path using the 'method with depth-mappings' from the requested source node to the requested destination node for which the capacity of each topology-mapping at d=0, the capacity of each layer-mapping at d=0 and the capacity at each node is larger or equal to 100 Mb/s, for which the sum of the latency of the topology-mappings, the layer-mappings and the nodes at d=0 is smaller than 5 ms and for which the sum of the packet losses of the topology-mappings, the layer-mappings and the nodes at d=0 is smaller than 0.001%. As an example, but not limited to, latency and packet loss figures could be obtained through measurement. Typical requirements for the characteristics of a topology-path include, but are not limited to, capacity (throughput), delay, jitter, packet loss, availability and packet sequence preservation. A capacity requirement requires each capacity to be available at each topology-mapping and layer-mapping at d=0 in the calculated path, which as an example, but not limited to, can be implemented by excluding topology-mappings and layer-mappings at d=0 that do not comply to the capacity requirement from the set of networks to which the 'method with depth-mappings' is applied. A requested path with a requirements involving one or more other characteristics such as, but not limited to, delay, jitter, packet loss, availability and packet sequence preservation require a calculation involving the required one or more characteristics at each topology-mapping and layer-mapping at d=0 in the calculated path. As an example, a requirements for a maximum delay requires the sum of the delay of the topology-mappings and layer-mappings at d=0 in the calculated path not the exceed the maximum delay. In case two or more characteristics other than capacity are requested as an example, but not limited, Constrained Short Path (CSP) algorithms can be used. CSP algorithms include, but are not limited to, algorithms based on Lagrangian Relaxation.

Figure 46A:
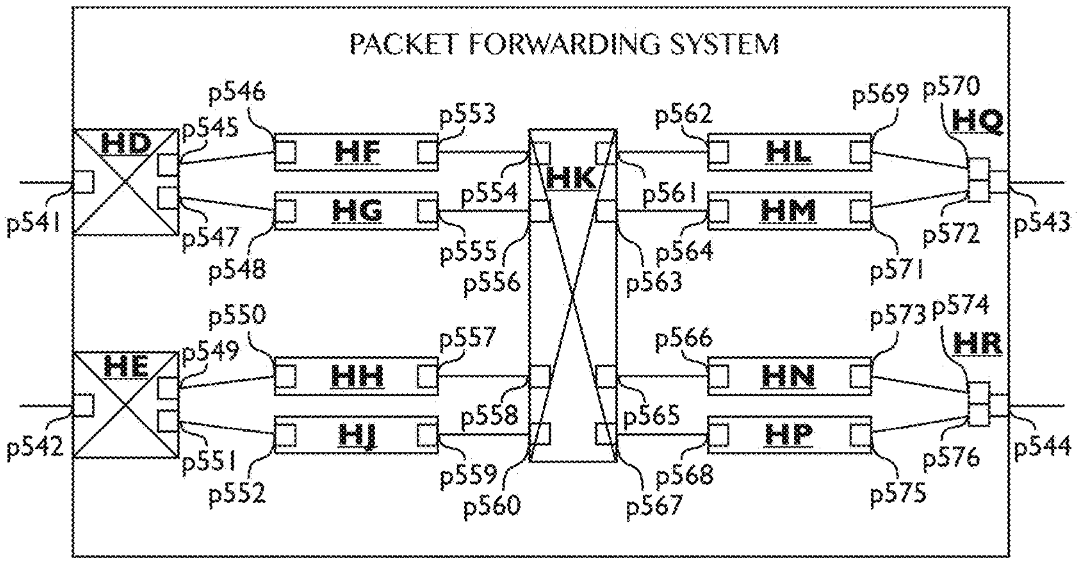
FIG. 46A is a diagram showing a physical representation of example Packet Forwarding System consisting of a central switch HK, input switches HD and HE, input-buffers HF, HG, HH and JH, output-buffers HL, HM, HN and HP, output couplers HQ and HR.
Figure 46B:
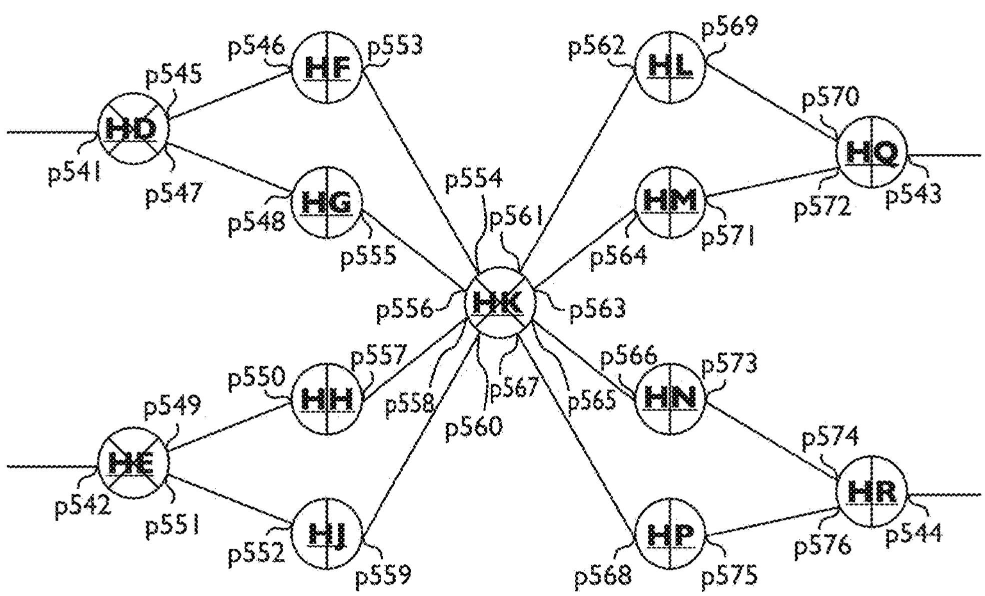
FIG. 46B is a diagram showing a functional representation of example Packet Forwarding System consisting of a central switch HK, input switches HD and HE, input-buffers HF, HG, HH and JH, output-buffers HL, HM, HN and HP, output couplers HQ and HR.
Figure 46C:
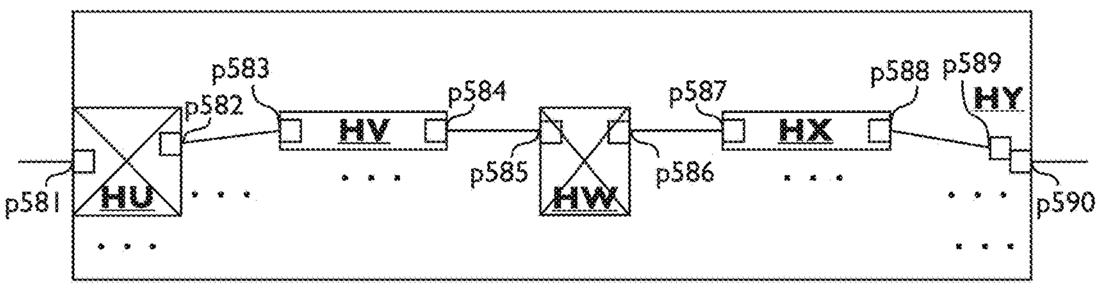
FIG. 46C is a diagram showing a generic physical representation of an example Packet Forwarding System with a single central switch, one or more input-buffers, one or more output-buffers, one or more input ports and one or more output ports.
Figure 46D:
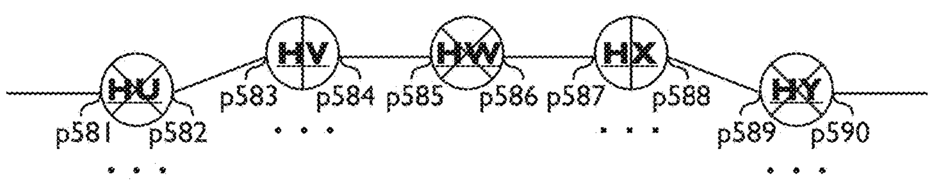
FIG. 46D is a diagram showing a generic functional representation of an example Packet Forwarding System with a single central switch, one or more input-buffers, one or more output-buffers, one or more input ports and one or more output ports.
Figure 46E:
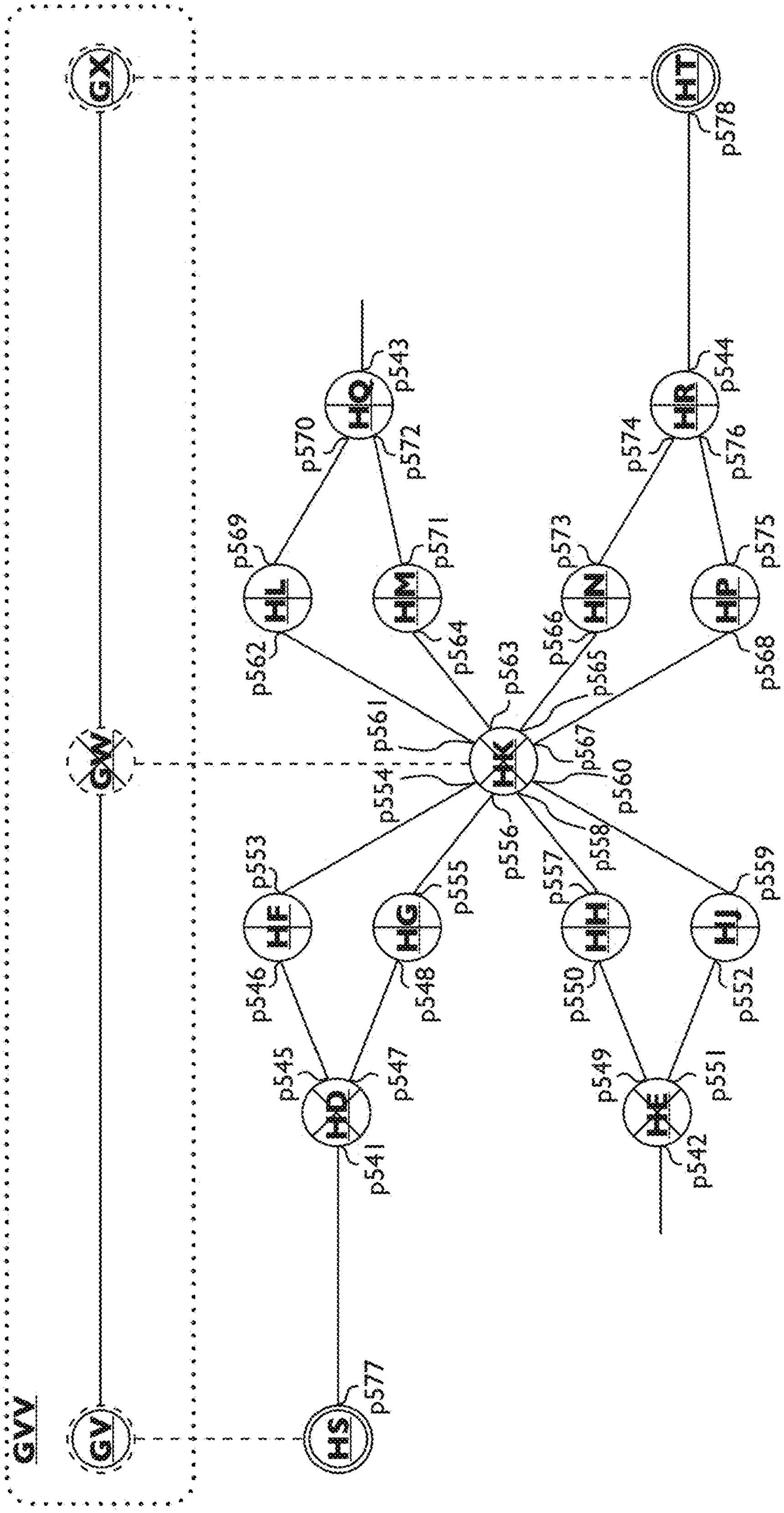
FIG. 46E is a diagram showing a network consisting of an example physical or virtual Packet Forwarding System at (d−1, n, h) with central switch node HK shown in FIGS. 46A and 46B, physical or virtual host node HS at (d−1, n, h) and physical or virtual host node HT at (d−1, n, h) as well as network GVV at (d, n, h+1) consisting of host node GV at (d, n, h), switch node GW at (d, n, h) and host node GX at (d, n, h) as well as topology-mappings between nodes at (d−1, n, h), topology-mappings between nodes at (d−1, n, h) and depth-mappings between nodes at (d, n, h) and nodes at (d−1, n, h).
Figure 46F:
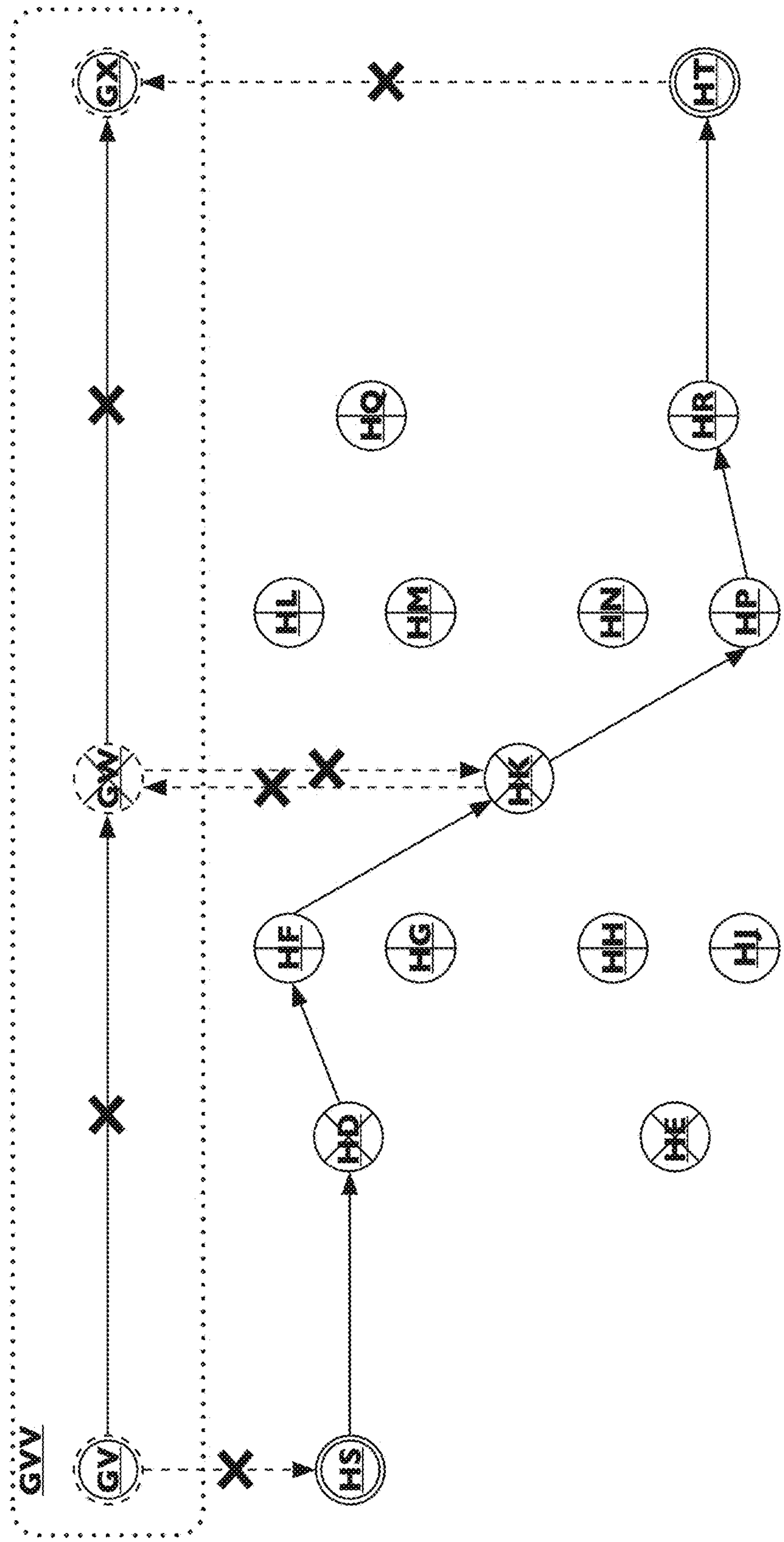
FIG. 46F is a diagram showing a network consisting of an example physical or virtual Packet Forwarding System at (d−1, n, h) with central switch node HK shown in FIGS. 46A and 46B, nodes HS, HT, GV, GW, GX and network GVV and applying steps 1 through 5 of the 'method with depth-mappings' to a path from logical source node GV to logical destination node GX.

We now consider absolute Quality-of-Service (QoS) using an Integrated Services (IS) approach. An example of, but not limited to, IS is IntServ and associated RSVP (Resource ReSerVation Protocol) in IPv4 and IPv6 networks. IS is based on resource assignment on a per-path, also referred to as 'per-flow', basis. Therefore, state has to be maintained for all resources in the network, which is difficult to implement at scale using a distributed control plane. As the SDN Compiler provides centralized control of a network and maintains network state on a per-flow basis we extend the SDN Compiler method to support IS. In order to support absolute QoS we include input-buffers and output-buffers in the modeling of a physical or virtual node. FIG. 46A shows a physical representation of example Packet Forwarding System consisting of a central switch HK, input switches HD and HE, input-buffers HF, HG, HH and JH, output-buffers HL, HM, HN and HP, output couplers HQ and HR. The PoA of a first input port is p541, the PoA of a second input port is p542, the PoA of a first output port is p542 and the PoA of a second output port is p544. PoAs p545 through p576 are internal to the packet forwarding system. As an example, but not limited to, an incoming packet at PoA p541 is switched by an input switch to PoA p545, enters the input-buffer HF at PoA p546 where it is buffered, leaves the input-buffer HF at PoA p553 and enters the central switch HK at PoA p554 and is switched to PoA p567 leaving the central switch, enters the output-buffer HP at PoA 568 where it is buffered, leaves the output-buffer HP at p575 and is multiplexed with packets from output-buffer HN at coupler HR and leaves the packet forwarding system at PoA p544. FIG. 46B shows a functional representation is shown of the example Packet Forwarding System consisting of a central switch HK, input switches HD and HE, input-buffers HF, HG, HH and JH, output-buffers HL, HM, HN and HP, output couplers HQ and HR. Note that input-buffers HF, HG, HH, HJ and output-buffers HL, HM, HN, HP are modelled as NICs with a minimum capability to 1) buffer a packet for a period of time and 2) drop a packet. Additional buffer capabilities could be modeled as well. FIG. 46C shows a generic physical representation of an example Packet Forwarding System with a single central switch, one or more input-buffers, one or more output-buffers, one or more input ports and one or more output ports. FIG. 46D shows a generic functional representation of an example Packet Forwarding System with a single central switch, one or more input-buffers, one or more output-buffers, one or more input ports and one or more output ports. More complex packet forwarding system can be modeled using this approach. In the same way buffering in host nodes could be modeled. An example, but not limited to, a host node is Computing Equipment. FIG. 46E shows a network consisting of the example physical or virtual Packet Forwarding System at (d−1, n, h) with central switch node HK shown in FIGS. 46A and 46B, as well as physical or virtual host node HS at (d−1, n, h) and physical or virtual host node HT at (d−1, n, h) as well as network GVV at (d, n, h+1) consisting of host node GV at (d, n, h), switch node GW at (d, n, h) and host node GX at (d, n, h) as well as topology-mappings between nodes at (d−1, n, h), topology-mappings between nodes at (d−1, n, h) and depth-mappings between nodes at (d, n, h) and nodes at (d−1, n, h). The 'method with depth-mappings' can be applied resulting in a path through physical and/or virtual nodes. Applying steps 1 through 5 of the 'method with depth-mappings' to a path from logical source node GV to logical destination node GX is shown in FIG. 46F resulting in an example path HS, HD, HF, HK, HP, HR, HT. A path through a packet forwarding device can be determined by applying a forwarding policy, as the packet forwarding devices is modeled as a set of nodes interconnected through topology-mappings. As an alternative, but not limited to, the SDN Compiler could provide instructions to the packet forwarding device which scheduler scheme to apply to which set of input-buffers and could provide instructions to the packet forwarding device which scheduler scheme to apply to which set of output-buffers. As an example, but not limited to, a scheduler scheme could be Weighted Round-Robin (WRR), Deficit Round-Robin (DRR) and Weighted Fair Queuing (WFQ). In an implementation of a packet forwarding devices, input-buffers and output-buffers might be implemented using a centralized or distributed and logically centralized memory, making it possible to program the size of each input-buffer and each output-buffer. The SDN Compiler could provide instructions to the packet forwarding device which buffer-size to use for one or more input-buffers and one or more output-buffers. As an example, but not limited to, the SDN Compiler or an separate tool could calculate optimal buffer-length settings for each input-buffer and/or each output-buffer, as well as which input-buffers to group in a single scheduling-group, as well as which output-buffers to group in a single scheduling-group, as well as an optimal scheduler scheme for each scheduling group depending on the SLA-requirements of one or more users. A scheduling-group being defined as a set of one or more physical or virtual buffers to which a scheduling scheme is applied.

We now consider Virtual Private Networks (VPNs). In essence, in the presented method for an SDN Compiler a VPN is logical network at d>0. This logical network can have it's own namespace used for addressing. This logical network can be mapped, through depth-mappings, to physical and/or virtual resources owned by one or more owners. In order to provide each VPN with its own address space, isolated from other VPNs, the network at the highest hierarchy level in the namespace for each VPN should be globally unique to ensure isolation from other tenants. As an example, but not limited to, the highest hierarchy level could be an IPv6 flow label or could be an IPv4 identification field repurposed to denote a tenant.

Figure 44A:
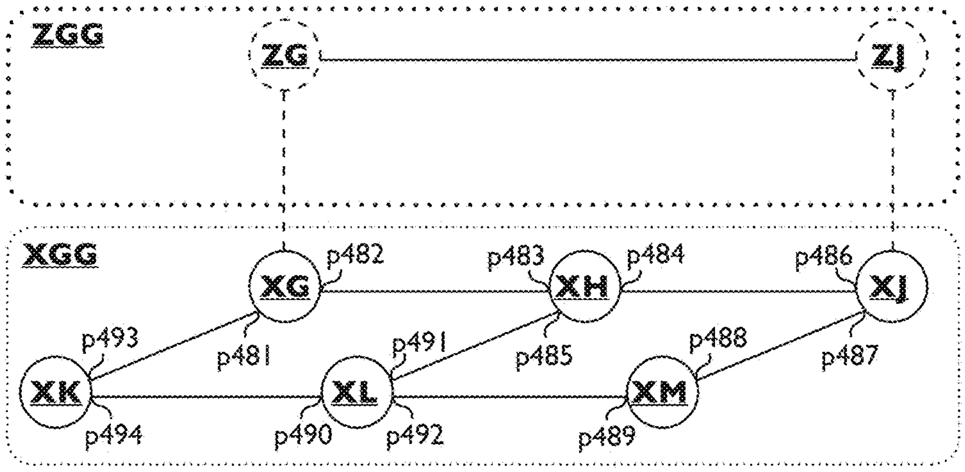
FIG. 44A is a diagram showing network XGG at (d−1, n, h+1) consisting of networks XG, XH, XJ, XK, XL and XM at (d−1, n, h) and network ZGG at (d, n, h+1) consisting of networks ZG and ZJ at (d, n, h) as well as topology-mappings and depth-mappings between networks.
Figure 44B:
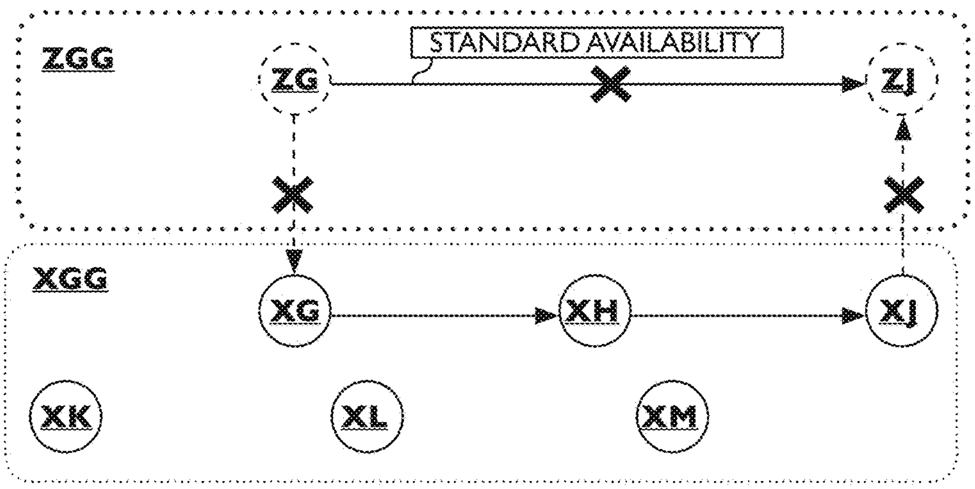
FIG. 44B is a diagram showing networks XGG, XG, XH, XJ, XK, XL, XM, ZGG, ZG and ZJ and applying steps 2 through 5 of the 'method with depth-mappings' to a topology-mapping from network ZG to network ZJ having 'standard availability'.
Figure 44C:
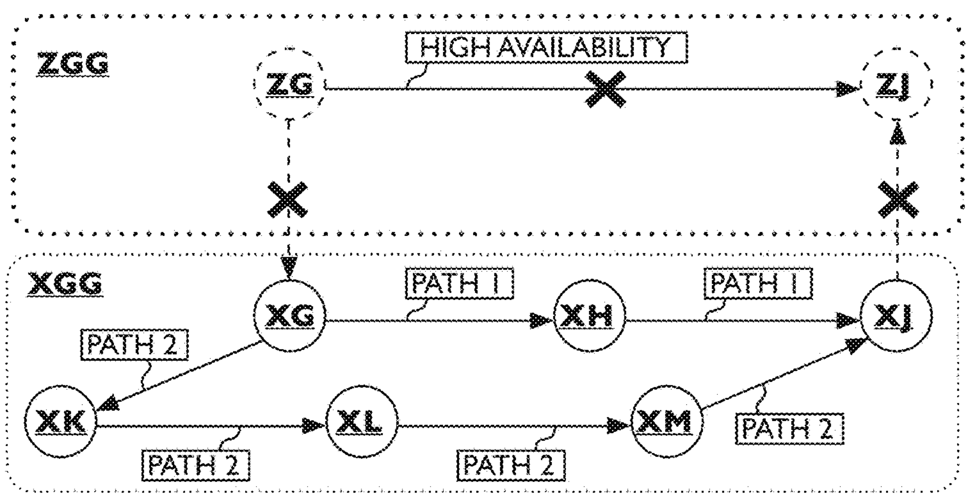
FIG. 44C is a diagram showing networks XGG, XG, XH, XJ, XK, XL, XM, ZGG, ZG and ZJ and applying steps 2 through 5 of the 'method with depth-mappings' to a topology-mapping from network ZG to network ZJ having 'high availability'.
Figure 44D:
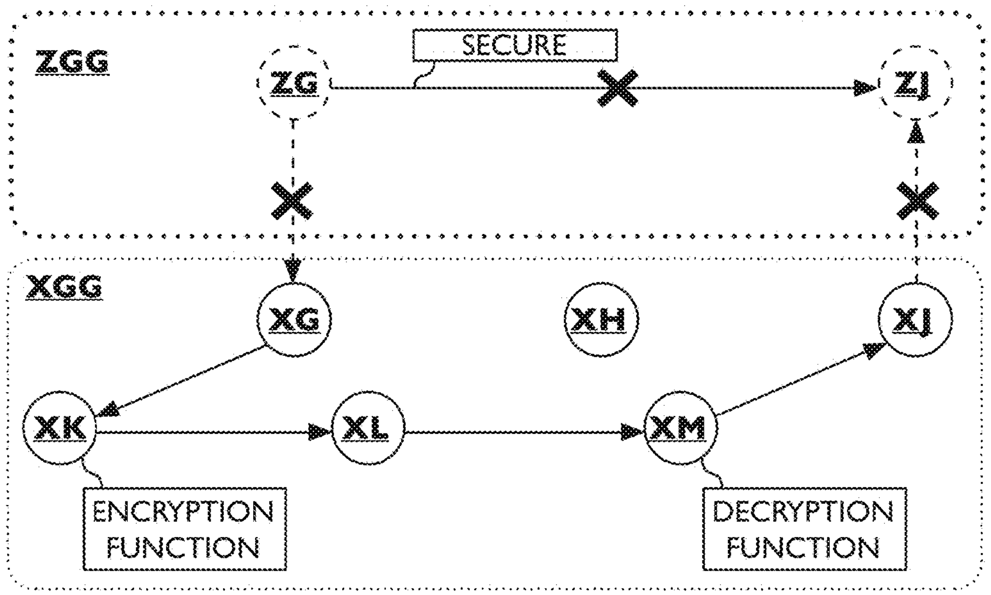
FIG. 44D is a diagram showing networks XGG, XG, XH, XJ, XK, XL, XM, ZGG, ZG and ZJ and applying steps 2 through 5 of the 'method with depth-mappings' to an encrypted topology-mapping from network ZG to network ZJ.
Figure 44E:
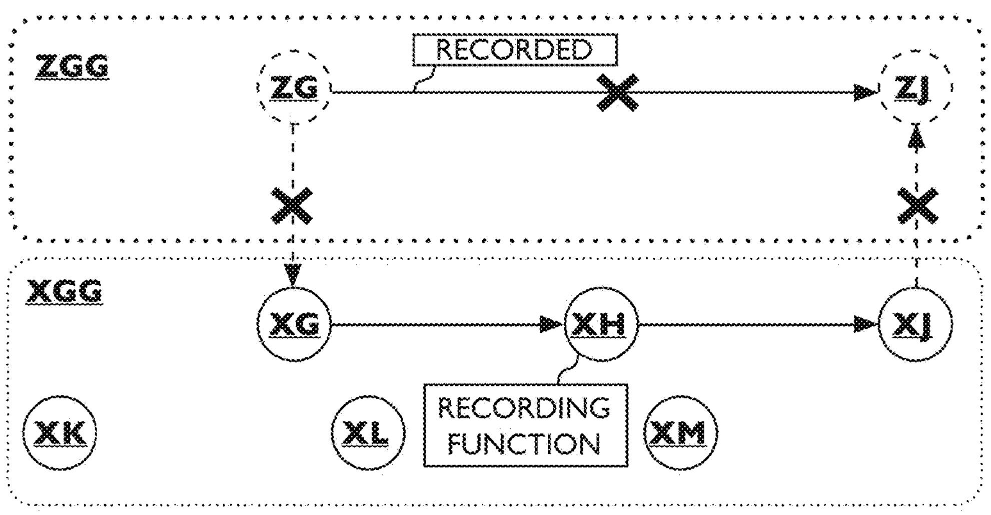
FIG. 44E is a diagram showing networks XGG, XG, XH, XJ, XK, XL, XM, ZGG, ZG and ZJ and applying steps 2 through 5 of the 'method with depth-mappings' to a recorded topology-mapping from network ZG to network ZJ.
Figure 44F:
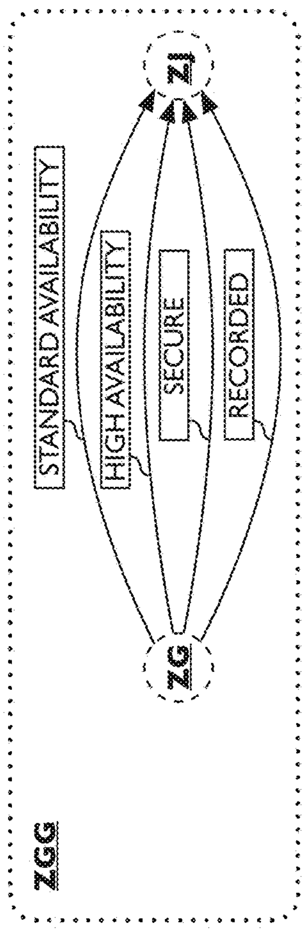
FIG. 44F is a diagram showing network ZGG at (d, n, h+1), network ZG at (d, n, h) and network ZJ at (d, n, h) and showing a topology-mapping from network ZG to network ZJ with 'standard availability', a topology-mapping from network ZG to network ZJ with 'high availability', an encrypted topology-mapping from network ZG to network ZJ and a recorded topology-mapping from network ZG to network ZJ.
Figure 44G:
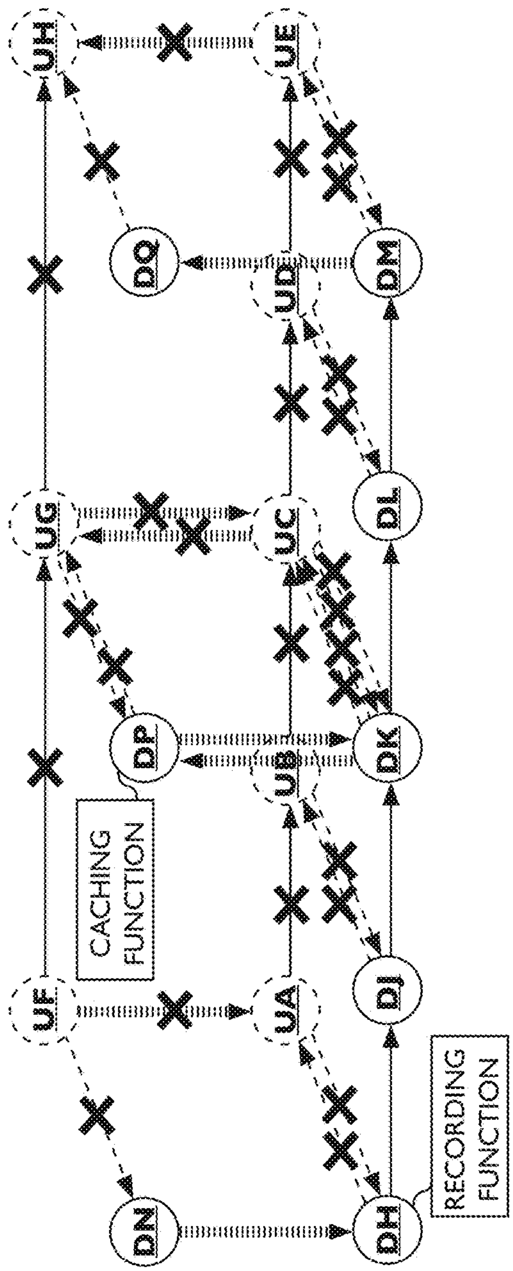
FIG. 44G is a diagram showing a networks DH, DJ, DK, DL, DM at (d−1, n, h), networks UA, UB, UC, UD, UE at (d, n, h), networks DN, DP, DQ at (d−1, n+1, h) and networks UF, UG, UH at (d, n+1, h) and applying steps 1 through 5 of the 'method with depth-mappings' to a path from source node UF to destination node UH. Node DH provides a recording and node DP provides a caching.

We now consider characteristics of topology-mappings from which a logical network can be created. FIG. 44A shows a network XGG at (d−1, n, h+1) consisting of networks XG, XH, XJ, XK, XL and XM at (d−1, n, h) and network ZGG at (d, n, h+1) consisting of networks ZG and ZJ at (d, n, h) as well as topology-mappings and depth-mappings between networks. Using the 'method with depth-mappings' we calculate four different topology-mappings from network ZG to network ZJ each having it's own characteristics. The calculation of a first topology-mapping having 'standard availability' from network ZG to network ZJ is shown in FIG. 44B and results in path consisting of physical and/or virtual nodes XG, XH, XJ. The calculation of a second topology-mapping having 'high availability' from network ZG to network ZJ is shown in FIG. 44C and results in a first path 'path 1' consisting of physical and/or virtual nodes XG, XH, XJ and a second path 'path 2' consisting of physical and/or virtual nodes XG, XK, XL, XM, XJ. A load-balancing identifier such as but not limited to a load-balancing hash is used to split the traffic network ZG to network ZJ over 'path 1' and 'path 2' resulting in a topology-mapping from network ZG to network ZJ having 'high-availability'. The calculation of a third topology-mapping being 'secure' from network ZG to network ZJ is shown in FIG. 44D and results in a path consisting of physical and/or virtual nodes XG, XK, XL, XM, XJ, with encryption being performed in node XK and decryption being performed in node XM. The calculation of a fourth topology-mapping being 'recorded' from network ZG to network ZJ is shown in FIG. 44E and results in a path consisting of physical and/or virtual nodes XG, XH, XJ, with recording being performed in node XH. We can combine the first, second, third and fourth topology-mapping from network ZG to network ZJ in a network ZGG as shown in FIG. 44F. The SDN Compiler, based upon user requirements, can now create paths in network ZGG using one or more of the first, second, third and fourth topology-mappings from network ZG to network ZJ. The SDN Compiler, based on user requirements, can now create one or more networks at depth d+1 using one or more of the first, second, third and fourth topology-mappings from network ZG to network ZJ at depth d. FIG. 44G shows networks DH, DJ, DK, DL, DM at (d−1, n, h), networks UA, UB, UC, UD, UE at (d, n, h), networks DN, DP, DQ at (d−1, n+1, h) and networks UF, UG, UH at (d, n+1, h). Node DH provides a recording and node DP provides a caching. Steps 1 through 5 of the 'method with depth-mappings' are applied to a path from source node UF to destination node UH resulting in path consisting of physical and/or virtual nodes DN, DH, DJ, DK, DP, DK, DL, DM, DQ. As shown in FIG. 44G topology-mappings involving particular functions at physical and/or virtual nodes can be performed at various layers. As shown in FIG. 44G topology-mappings can involve multiple physical and/or virtual nodes performing particular functions in a path. Also, topology-mappings based on multiple paths can be calculated in a multi-layer network.

Figure 45A:
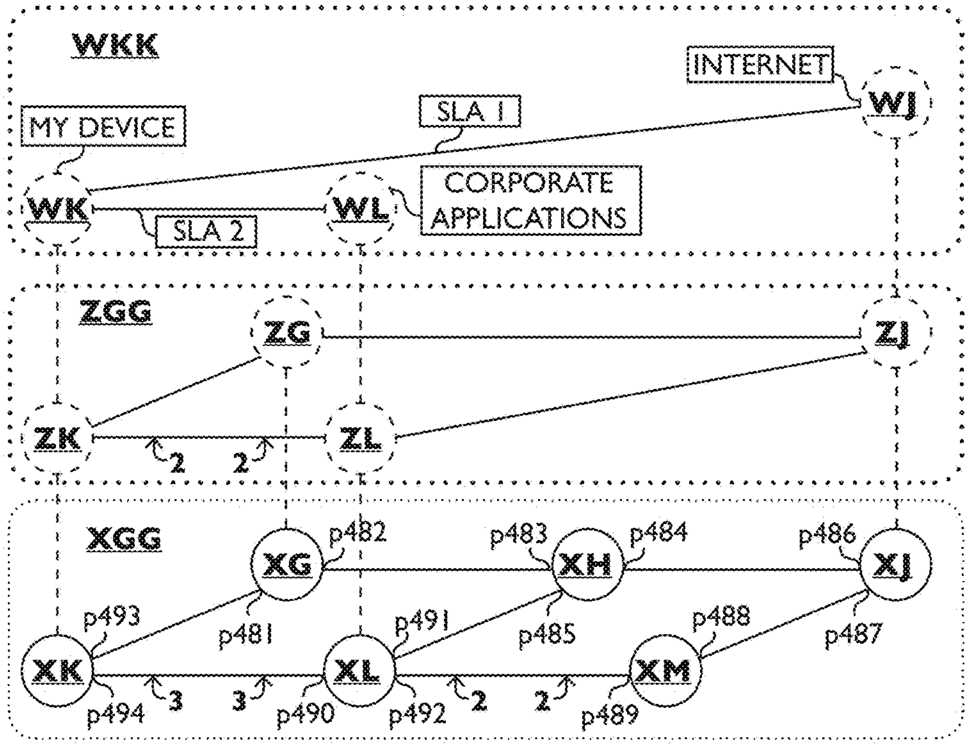
FIG. 45A is a diagram showing network XGG at (d−1, n, h+1) consisting of networks XG, XH, XJ, XK, XL and XM at (d−1, n, h), network ZGG at (d, n, h+1) consisting of networks ZG, ZJ, ZK and ZL at (d, n, h), network WKK at (d+1, n, h+1) consisting of networks WJ, WK and WL at (d+1, n, h) as well as topology-mappings and depth-mappings between networks.

We now consider logical networks that are an abstraction of end-user requirements. Thus far, we have considered logical networks to have addresses that are used for forwarding. We now introduce logical networks consisting of networks are not used in addresses for packet forwarding but are used to express user requirements. This is illustrated in FIG. 45A, which shows network XGG at (d−1, n, h+1) consisting of networks XG, XH, XJ, XK, XL and XM at (d−1, n, h), network ZGG at (d, n, h+1) consisting of networks ZG, ZJ, ZL and ZK at (d, n, h), network WKK at (d+1, n, h+1) consisting of networks WJ, WL and WK at (d+1, n, h) as well as topology-mappings and depth-mappings between networks. Networks XGG and ZGG were shown in FIG. 61D. Network XGG at depth d−1 consists of networks that are physical and/or virtual resources. Network ZGG at depth d consists of logical networks of which the addresses are used for forwarding. Network WKK at depth d+1 consists of logical networks, topology-mappings and topology-paths specifying business requirements. Network WK represents 'My Device' being a physical and/or virtual device of a user such as for example, but not limited to, a laptop, personal computer, mobile phone, tablet. Network WJ represents the 'Internet'. Network WL represents 'Corporate Applications'. The topology-path between network WK and network WJ, which is a topology-mapping, represents a user requirement to have Internet access from 'My Device' with a particular Service Level Agreement (SLA) 'SLA 1'. The topology-path between network WK and network WL, which is a topology-mapping, represents a user requirement to have access to Corporate Applications from 'My Device' with a particular SLA 'SLA 2'. Note that in case a topology-path or topology-mapping within network WKK is bi-directional the accompanying SLA should specify Service Levels in two directions. As an example, but not limited to, the set of requirements specified within network WKK could be specified by a business user stating his/her needs in high-level terms. Within network WKK logical networks and logical topology-mappings represent user requirements.

Figure 45B:
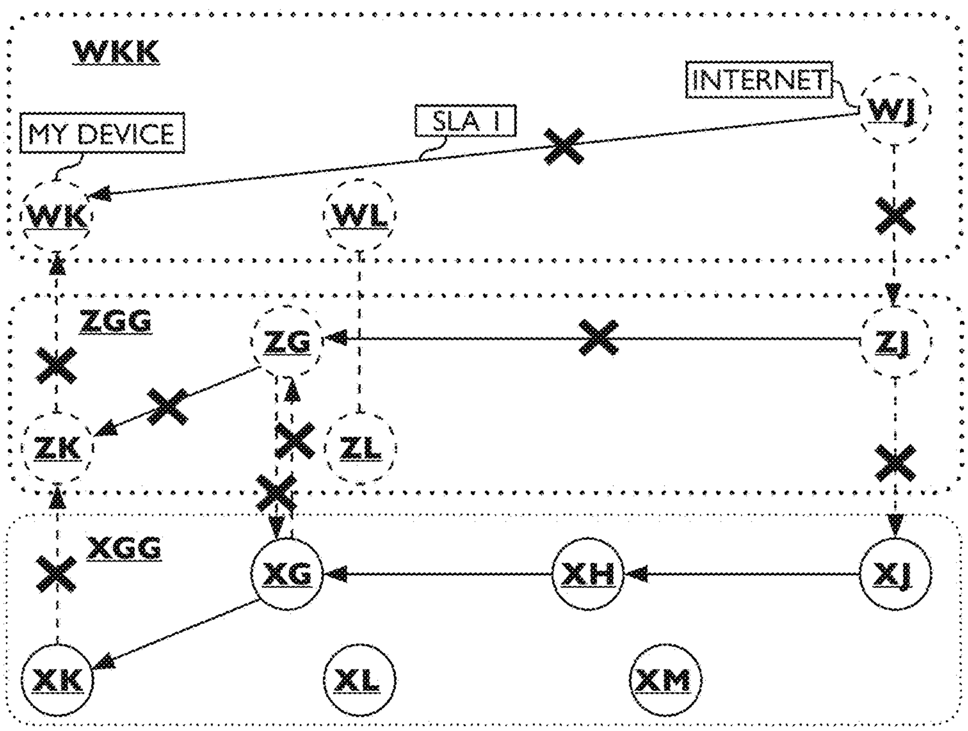
FIG. 45B is a diagram showing network XGG at (d−1, n, h+1) consisting of networks XG, XH, XJ, XK, XL and XM at (d−1, n, h), network ZGG at (d, n, h+1) consisting of networks ZG, ZJ, ZK and ZL at (d, n, h), network WKK at (d+1, n, h+1) consisting of networks WJ, WK and WL at (d+1, n, h) and applying steps 1 through 5 of the 'method with depth-mappings' from logical source network WJ to logical destination network WK.

As shown in FIG. 45B, applying the 'method with depth-mappings' to the topology-path from network WJ to network WK of the set of networks of FIG. 45A results in:

Step 1) The topology-path from network WJ to network WK consists of a topology-mapping from network WJ to network WK.

Step 3) The topology-mapping from network WJ to network WK being replaced by a concatenation of a depth-mapping from network WJ to network ZJ, a topology-path from network ZJ to network ZK and a depth-mapping from network ZK to network WK. The topology-path from network ZJ to network ZK consisting of a concatenation of a topology-mapping from network ZJ to network ZG and topology-mapping from network ZG to network ZK.

Step 3) The topology-mapping from network ZJ to network ZG being replaced by a concatenation of a depth-mapping from network ZJ to network XJ, a topology-path from network XJ to network XG and a depth-mapping from network XG to network ZG. The topology-path from network XJ to network XG consisting of a concatenation of a topology-mapping from network XJ to network XH and topology-mapping from network XH to network XG.

Step 3) The topology-mapping from network ZG to network ZK being replaced by a concatenation of a depth-mapping from network ZG to network XG, a topology-path from network XG to network XK and a depth-mapping from network XK to network ZK. The topology-path from network XG to network XK being a topology-mapping from network XG to network XK.

Step 5) Removing the depth-mappings from network WJ to network ZJ, from network ZK to network WK, from network ZJ to network XJ and from network XK to network ZK.

Above steps result in a topology-path at depth d−1 consisting of networks XJ, XH, XG and XK from which forwarding entries can be calculated using the method described above.

Figure 45C:
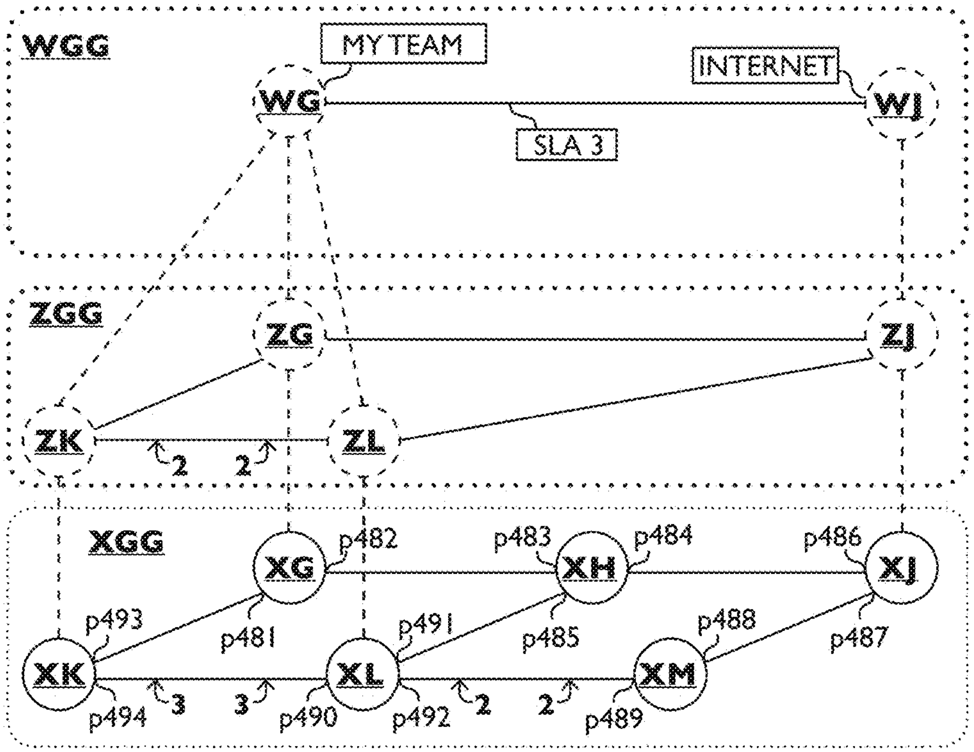
FIG. 45C is a diagram showing network XGG at (d−1, n, h+1) consisting of networks XG, XH, XJ, XK, XL and XM at (d−1, n, h), network ZGG at (d, n, h+1) consisting of networks ZG, ZJ, ZK and ZL at (d, n, h), network WGG at (d+1, n, h+1) consisting of networks WG and WJ at (d+1, n, h) as well as topology-mappings and depth-mappings between networks.
Figure 45D:
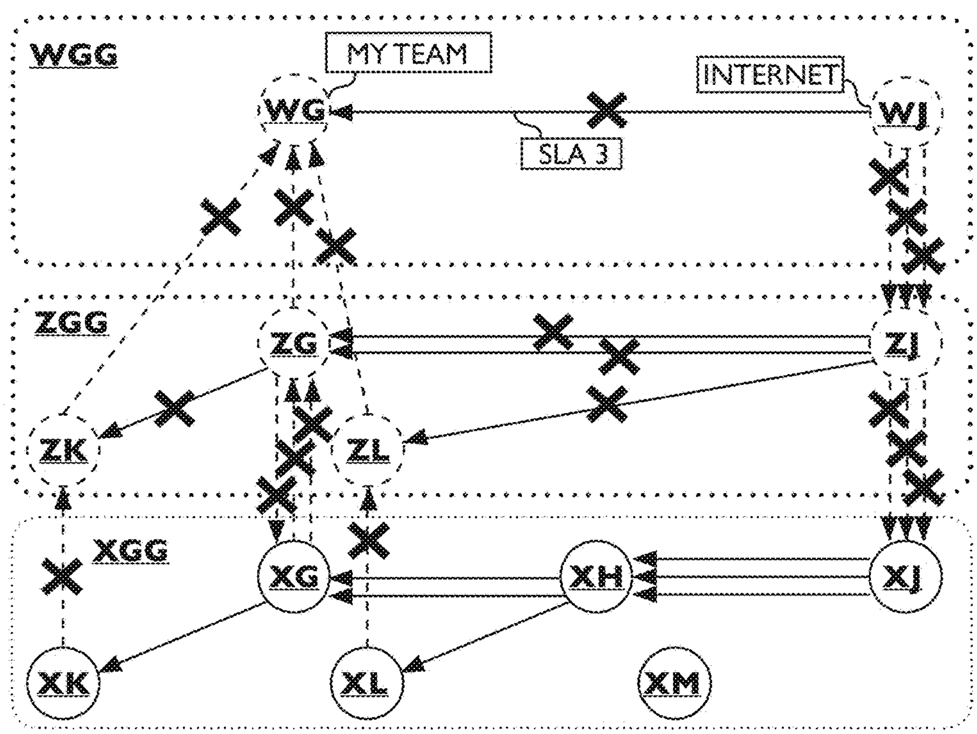
FIG. 45D is a diagram showing network XGG at (d−1, n, h+1) consisting of networks XG, XH, XJ, XK, XL and XM at (d−1, n, h), network ZGG at (d, n, h+1) consisting of networks ZG, ZJ, ZK and ZL at (d, n, h), network WGG at (d+1, n, h+1) consisting of networks WG and WJ at (d+1, n, h) and applying steps 1 through 5 of the 'method with depth-mappings' from logical source network WJ to logical destination network WG.

Note that network XK represents a physical or virtual device, network ZK represents a logical name ZK for this device, network ZGG combined with network ZK provides a logical address ZGG.ZK for this device that is used in packet forwarding and network WK represents a high-level name for this device such as 'My Device' used by the user of the device. Note that network XJ represents a physical or virtual device connected to the internet, such as for example but not limited to a gateway router, network ZJ represents a logical name ZJ for this device, network ZGG combined with network ZJ provides a logical address ZGG.ZJ for this device that is used in packet forwarding and network WJ represents a high-level abstraction for 'Internet'. Note that network XL represents a physical or virtual device connected to one or more devices providing 'Corporate Applications', such as for example but not limited to a router connected to set of servers, network ZL represents a logical name ZL for this device, network ZGG combined with network ZL provides a logical address ZGG.ZL for this device that is used in packet forwarding and network WL represents a high-level abstraction for 'Corporate Applications'. In the same manner other entities could be denoted by networks at layer d+1 such as, but not limited to, access to a particular application or a group of applications, intra-company voice calls, national and international voice calls, video conferencing and access to remote company sites. In essence, providing connectivity to a particular application or to a particular network. As an example, but not limited to, the characteristics of this connectivity can be agreed upon between the end-user and the person or organization providing network services such as a network administrator. The SLA can include, but is not limited to, capacity (throughput), delay, jitter (variation in delay), packet loss, availability, security and packet sequence preservation. As this results in many possibilities, as an example but not limited to, the network administrator can define one or more logical networks at depth d in which the topology-mappings have certain characteristics resulting in a particular SLA at depth d+1. As an example, but not limited to, network ZG could be a logical firewall node, which is mapped through a depth-mapping to physical or virtual firewall node XG. The end-user requesting Internet access from 'My Device' at depth d+1 is unaware of this firewall, as it does not exist in the topology of network WKK at depth d+1. The network administrator however has by design included a firewall in the logical network ZGG at depth d and a forwarding policy such that traffic from network ZJ to network ZK is forwarded via network ZG. In a deployment, as an example, but not limited to, the network administrator could create a network diagram depicting all possible services at depth d+1 from which an end-user or a representative of a group of end-users could select one or more services to use. Logical network instances at depth d can be created using the SDN Compiler method based on services selected by the end-user from the network diagram provided by the network administrator. As an example but not limited to, network WKK could be a network diagram provided by a network administrator to one or more end-users, from which end-users can select a first service being Internet access with SLA 'SLA 1' and a second service being access to Corporate Applications with SLA 'SLA 2'. Note that compliance to these SLA's could be monitored by correlating network monitoring data SLA of service and the end-user can be billed for the services provided. Also, as the SDN Compiler knows the path through physical and/or virtual resources resulting from each service provided to an end-user, information can be retrieved from the SDN Compiler about which physical and/or virtual nodes and links carry which services. The use of a network diagram provided by a network administrator from which end-users select services as input to the SDN Compiler provides a method allow for automated and agile creation, modification and deletion of services, as is the case already for server and storage resources in a cloud architecture. Note that a network at depth d+1 specified in end-user terminology could be mapped to an arbitrary layer at depth d. Note that a network at depth d+1 specified in end-user terminology could have an arbitrary topology. Note that a network at depth d+1 specified in end-user terminology could have an arbitrary forwarding policy. The example shown in FIG. 45A shows topology-paths at depth d+1 consisting of a single topology-mapping. In general, a topology-path at depth d+1 can consist of an arbitrary number of topology-mappings. Note that two or more networks at (d, h) could be represented as a single network at (d+1, h). As shown in FIG. 45C, as an example, but not limited to, we consider network XGG at depth d−1 and network ZGG at depth d again and a network WGG at (d+1, n, h+1) consisting of networks WG and WJ at (d+1, n, h). Network WG represents 'My Team' being a set of physical and/or virtual devices such as for example, but not limited to, a laptop, personal computer, mobile phone, tablet used by persons within a team. Network WJ represents the 'Internet'. The topology-mapping between network WG and network WJ represents that the set of devices represented by WG should be connected to the Internet as represented by network WJ. Network WG is mapped to network ZG through a depth-mapping, network WG is mapped to network ZK through a depth-mapping and network WG is mapped to network ZL through a depth-mapping. As shown in FIG. 45D, applying the 'method with depth-mappings' to the topology-path from network WJ to network WG of the set of networks of FIG. 45C results in:

Step 1) The topology-path from network WJ to network WG consists of a topology-mapping from network WJ to network WG.

Step 3) The topology-mapping from network WJ to network WG being replaced by a concatenation of a depth-mapping from network WJ to network ZJ, a topology-path from network ZJ to network ZG and a depth-mapping from network ZG to network WG and a concatenation of a depth-mapping from network WJ to network ZJ, a topology-path from network ZJ to network ZL and a depth-mapping from network ZL to network WG and a concatenation of a depth-mapping from network WJ to network ZJ, a topology-path from network ZJ to network ZK and a depth-mapping from network ZK to network WG. The topology-path from network ZJ to network ZG being a topology-mapping from network ZJ to network ZG. The topology-path from network ZJ to network ZK being a concatenation of a topology-mapping from network ZJ to network ZG and a topology-mapping from network ZG to network ZK. The topology-path from network ZJ to network ZL being a topology-mapping from network ZJ to network ZL.

Step 3) The first topology-mapping from network ZJ to network ZG being replaced by a concatenation of a depth-mapping from network ZJ to network XJ, a topology-path from network XJ to network XG and a depth-mapping from network XG to network ZG. The topology-path from network XJ to network XG consisting of a concatenation of a topology-mapping from network XJ to network XH and topology-mapping from network XH to network XG. The second topology-mapping from network ZJ to network ZG being replaced by a concatenation of a depth-mapping from network ZJ to network XJ, a topology-path from network XJ to network XG and a depth-mapping from network XG to network ZG. The topology-path from network XJ to network XG consisting of a concatenation of a topology-mapping from network XJ to network XH and topology-mapping from network XH to network XG. The topology-mapping from network ZG to network ZK being replaced by a concatenation of a depth-mapping from network ZG to network XG, a topology-path from network XG to network XK and a depth-mapping from network XK to network ZK. The topology-path from network XG to network XK being a topology-mapping from network XG to network XK. The topology-mapping from network ZJ to network ZL being replaced by a concatenation of a depth-mapping from network ZJ to network XJ, a topology-path from network XJ to network XL and a depth-mapping from network XL to network ZL. The topology-path from network XJ to network XL consisting of a concatenation of a topology-mapping from network XJ to network XH and topology-mapping from network XH to network XL.

Above steps result in a first path consisting of networks ZJ, XJ, XH, XG, ZG, a second path consisting of networks ZJ, XJ, XH, XG, ZG, XG, XK, ZK and a third path consisting of networks ZJ, XJ, XH, XL, ZL. The first path has source address ZGG.ZJ and destination address ZGG.ZG, the second path has source address ZGG.ZJ and destination address ZGG.ZK and the third path has source address ZGG.ZJ and destination address ZGG.ZL.

Step 5) Removing the depth-mappings from above three paths results in a first a topology-path at depth d−1 consisting of networks XJ, XH, XG having source address ZGG.ZJ and destination address ZGG.ZG, results in a second topology-path at depth d−1 consisting of networks XJ, XH, XG, XK having source address ZGG.ZJ and destination address ZGG.ZK and results in a third topology-path at depth d−1 consisting of networks XJ, XH, XL having source address ZGG.ZJ and destination address ZGG.ZL. From each of these 3 topology-paths at depth d−1 forwarding entries can be calculated using the method described above. Note a single network at (d+1, h) to which that two or more networks at (d, h) are mapped through depth-mappings can be a source network, a destination network (as in the example shown in FIGS. 45C and 45D) and can be an intermediate network in a path which is traversed.

In this example a subset of the networks at (d, h) that a network at (d, h+1) consists of are mapped to a network at (d+1, h). Alternatively, all networks at (d, h) that a network at (d, h+1) consists of could be mapped to a network at (d+1, h). In this example the network at depth d+1 is consisting of a single layer. In general, a set of networks at depth d+1 at which the user requirements are specified can consist of an arbitrary number of layers. In this example the set of networks at depth d+1 is a single network. In general, a set of networks at depth d+1 at which the user requirements are specified can consist of an arbitrary number networks which can be nested. In this example the user requirements are specified at depth d+1. Alternatively, the user requirements could be specified at depth d. This reduces flexibility however, as one or more networks representing user requirements at depth d are mapped, through depth-mappings, to one or more physical and/or virtual networks at depth d−1, rather than to one ore more logical networks. In general, user requirements can be specified as one or more networks at depth d>0, as one or more topology-mappings and/or layer-mappings and/or level-mappings at depth d>0 and as zero or more policies at depth d>0. Note that the namespace of the one or more networks at d>0 is not used in a forwarding decision by a physical or virtual node.

We now consider some security aspects. An important difference between a traditional IP-network and a SDN network is that forwarding in an IP-network is based on a destination address, while forwarding in a SDN network is based on a source address and a destination address representing a path, also referred to as a flow. Forwarding on a source address and a destination address compared to only a destination address inherently increases security, as an SDN Compiler can recognize a request for a path with a malicious source address and refuse to create forwarding entries for this path. Also the SDN Compiler could remove any existing paths with a malicious source address. Note that the SDN network is not limited to forwarding based on source address and destination address, as a SDN compiler could also create forwarding entries consisting of an asterisk '*' source address providing destination-based forwarding. Reactive path instantiation by an SDN Compiler in which a request is made by the physical or virtual node to the SDN Compiler to provide the relevant forwarding entry for a packet that does not match against a forwarding entry provides additional security over traditional networking, as the SDN Compiler explicitly has to provide forwarding entries for a requested path. An SDN Network allows for granular control of paths in the network, which allows for example but not limited to providing different levels of security for different paths from a source network to a destination network. As mentioned above besides the forwarding functionality a switch might provide additional operation(s) on the packet, such as but not limited to monitoring and/or recording and/or buffering and/or modifying of the incoming packet header and/or payload before forwarding the packet to one or more of it's output ports. This provides a method to encrypt a packet payload in a first node and decrypt a packet payload in a second node. As the SDN Compiler has an overview of one or more possibly nested networks, compared to the limited visibility a single node has in a current IP-network, traffic patterns that could become security threats could be detected earlier. As the SDN Compiler has an overview of one or more layers, impact of security threats within a first layer on a second layer could be detected. As the topology of a network at d>0, being a logical network, is independent from the topology of a network at d=0, being a physical and/or virtual network, security measures can be taken such as, but not limited to, including a node within a network at d>0 that is mapped, through a depth-mapping, to a physical or virtual node providing firewall functionality. As illustrated by the example network shown in FIG. 45A a network administrator can include security functionality such as, but not limited to, a firewall within a network at depth d against which a network defined by an end-user at depth d+1 can be compiled. The SDN Compiler method is based on forwarding policies in various networks as compared to a per-box approach in current IP-networks, providing a more consistent and therefore secure approach. The SDN Compiler as well as the SDN Controller are logically centralized in an SDN network and a security attack could have large implications. Although logically centralized, the SDN Compiler as well as the SDN Controller are typically implemented in a distributed way to increase availability and security. The vulnerability of the SDN Compiler and the SDN Controller is comparable to other important logically centralized components in the Internet architecture such as Domain Name System (DNS) Servers. Security measures used for DNS Servers could be used to protect SDN Compilers and SDN Controllers.

Figure 47A:
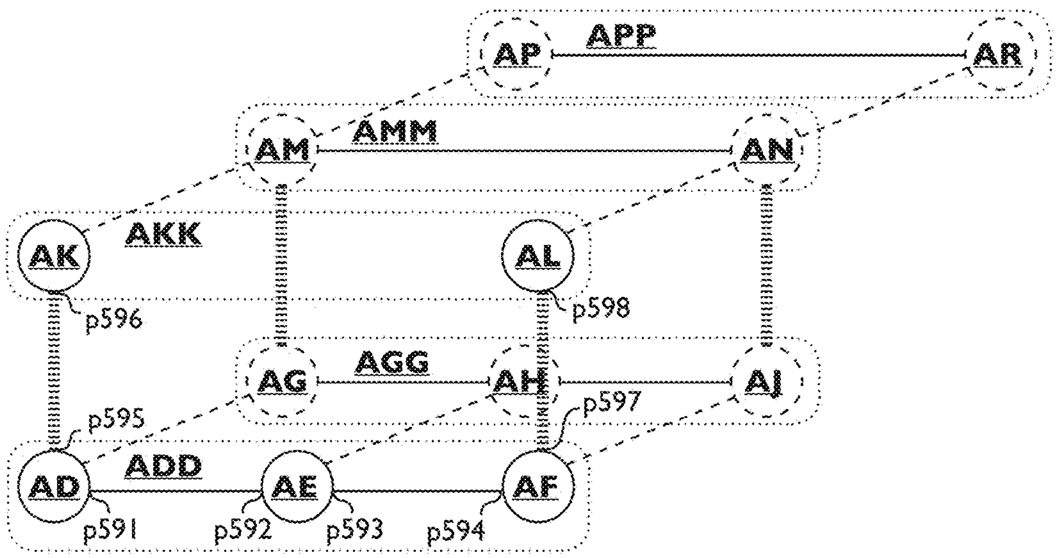
FIG. 47A is a diagram showing a network ADD at (d, n, h+1) consisting of networks AD, AE, AF at (d, n, h), network AGG at (d+1, n, h+1) consisting of networks AG, AH, AJ at (d+1, n, h), network AKK at (d, n+1, h+1) consisting of networks AK and AL at (d, n+1, h), network AMM at (d+1, n+1, h+1) consisting of networks AM and AN at (d+1, n+1, h) and network APP at (d+2, n+1, h+1) consisting of networks AP and AR at (d+2, n+1, h). Also topology-mappings, layer-mappings and depth-mappings between networks at level h are shown. Also the PoAs of the topology-mappings and layer-mappings between networks at depth d and level h are shown.

As an example, but not limited to, we now apply the SDN Compiler method to a user requesting access to a website by specifying the Uniform Resource Locator (URL) of the website in a web-browser. FIG. 47A shows a network ADD at (d, n, h+1) consisting of networks AD, AE, AF at (d, n, h), network AGG at (d+1, n, h+1) consisting of networks AG, AH, AJ at (d+1, n, h), network AKK at (d, n+1, h+1) consisting of networks AK and AL at (d, n+1, h), network AMM at (d+1, n+1, h+1) consisting of networks AM and AN at (d+1, n+1, h) and network APP at (d+2, n+1, h+1) consisting of networks AP and AR at (d+2, n+1, h). Also topology-mappings, layer-mappings and depth-mappings between networks at level h are shown. Also the PoAs of the topology-mappings and layer-mappings between networks at depth d and level h are shown. The various networks represent the following entities:

Network AD is a physical or virtual host, such as e.g. a tablet, mobile phone or Personal Computer (PC)

Network AE is a physical or virtual switch

Network AF is a physical or physical or virtual host, such as a server hosting the website Network AG is a logical network mapping through a depth-mapping to host AD Network AH is a logical network mapping through a depth-mapping to switch AE Network AJ is a logical network mapping through a depth-mapping to host AF Network AK is a web-browser application Network AL is a website-hosting application Network AM is a logical network mapping through a depth-mapping to web-browser application AK and being the logical identifier of the application, e.g. well-known-port 80 for Hypertext Transfer Protocol (HTTP)

Network AN is a logical network mapping through a depth-mapping to website-hosting application AL and being the logical identifier of the application, e.g. well-known-port 80 for Hypertext Transfer Protocol (HTTP)

Network AP is a a user requesting a URL

Network AR is a the URL requested by the user.

Figure 47B:
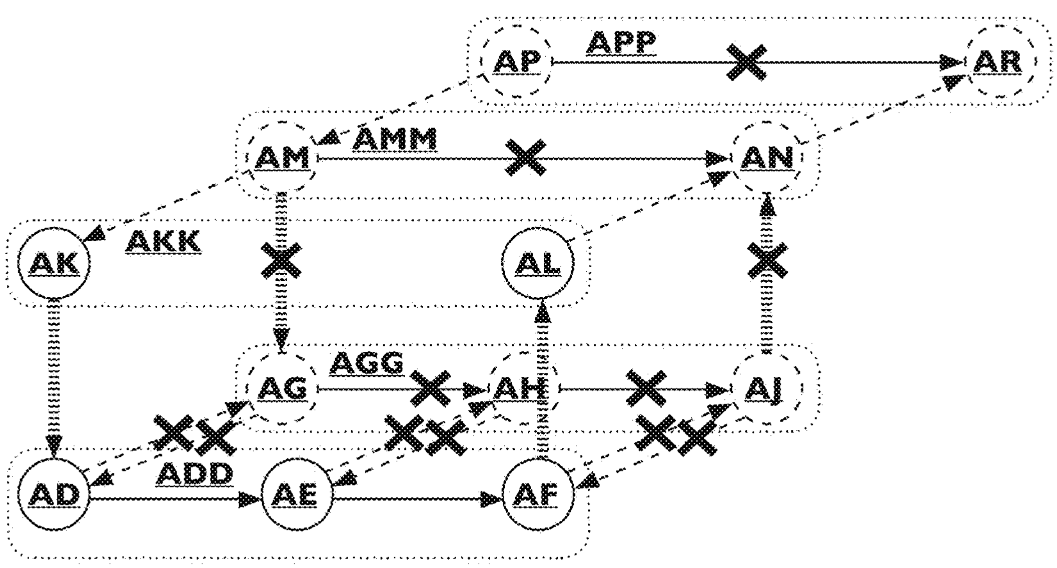

The URL-request is a topology-path from network AP to network AR, as illustrated in FIG. 47B which shows networks ADD, AGG, AKK, AMM, APP, AD, AE, AF, AG, AH, AJ, AK, AL, AM, AN, AP and AR. Applying steps 1 through 5 of the 'method with depth-mappings' to the path from source network AP to destination network AR results in the path shown consisting of network AP, AM, AK, AD, AE, AF, AL, AN, AR. The physical/virtual path consists of networks AK, AD, AE, AF, AL. Using a multi-layer logical address structure, the address of network AN is AGG.AJ.AN. A Domain Name Server (DNS) typically resolves a binding between a URL and an IP-address. In FIG. 47B the binding between the URL and it's address is the depth-mapping between network AR and network AN. As an example, but not limited to, network AGG could be the subnet part of an IPv4 address, network AJ could be the host part of an IPv4 address, mapped through a layer mapping to network AN being port 80, mapped through a depth-mapping to network AR being a URL. A SDN Compiler could retrieve the binding between a URL and an IP-address from a DNS server or could itself cache bindings of frequently used URLs. As a result, in comparison to current implementations, there is no need for network AG to contact a DNS server to resolve the binding between a URL and an IP-address, instead a URL can be requested by a user from the SDN Compiler which calculates the requested path as shown in FIG. 47B and sends after calculation the associated forwarding instructions to physical and/or virtual resources. As such networks can be specified at a depth d larger than the depth that provides the logical namespace used for packet forwarding. As an example, but not limited to, such networks can include human-friendly identifiers such as a URL, a Uniform Resource Identifier (URI), a Uniform Resource Name (URN) or an email address. Also, as an example, but not limited to, such networks can also represent user requirements, as shown in the example of FIGS. 45A through 45D.

Figure 48:
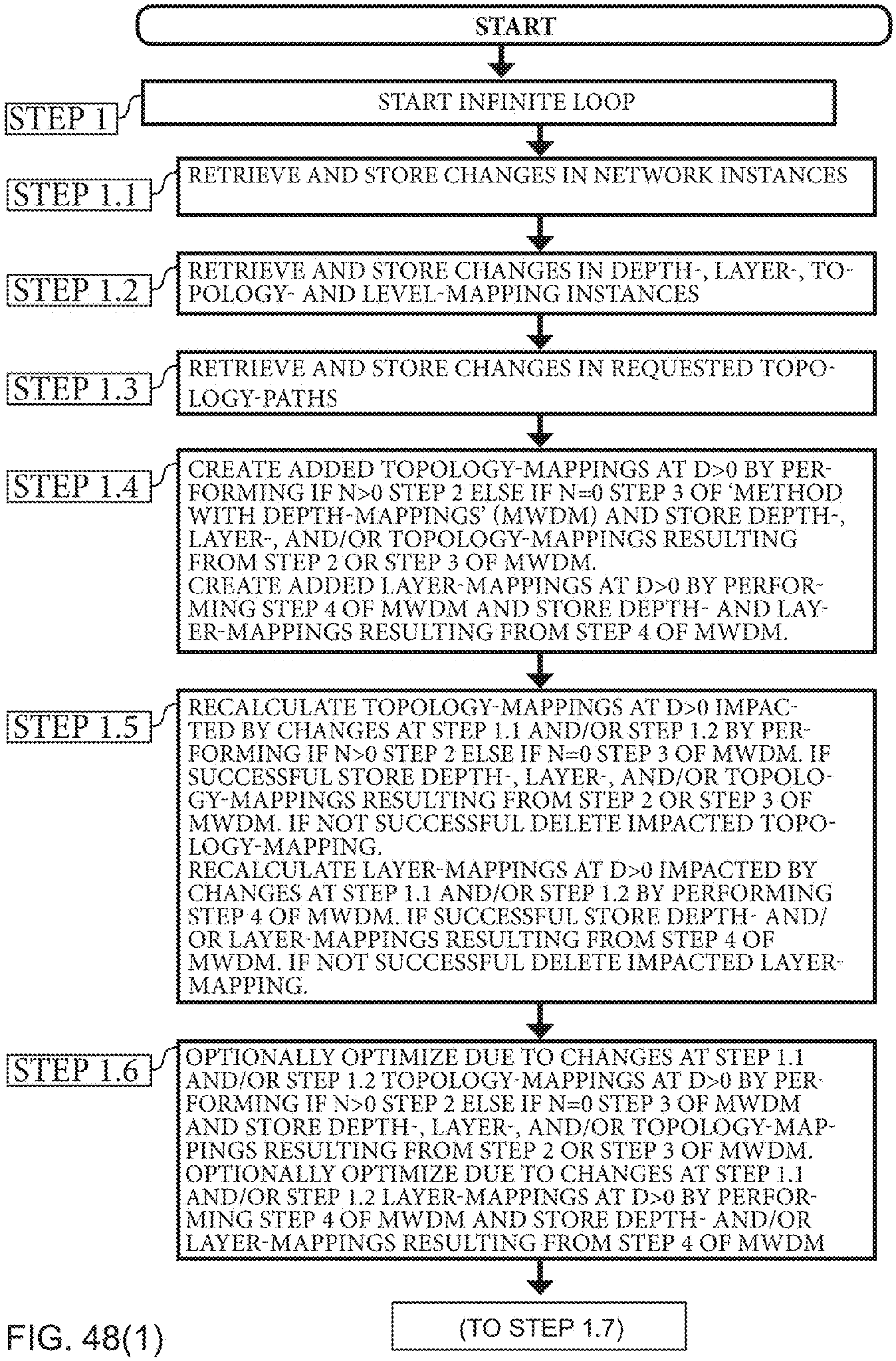
Figure 48:
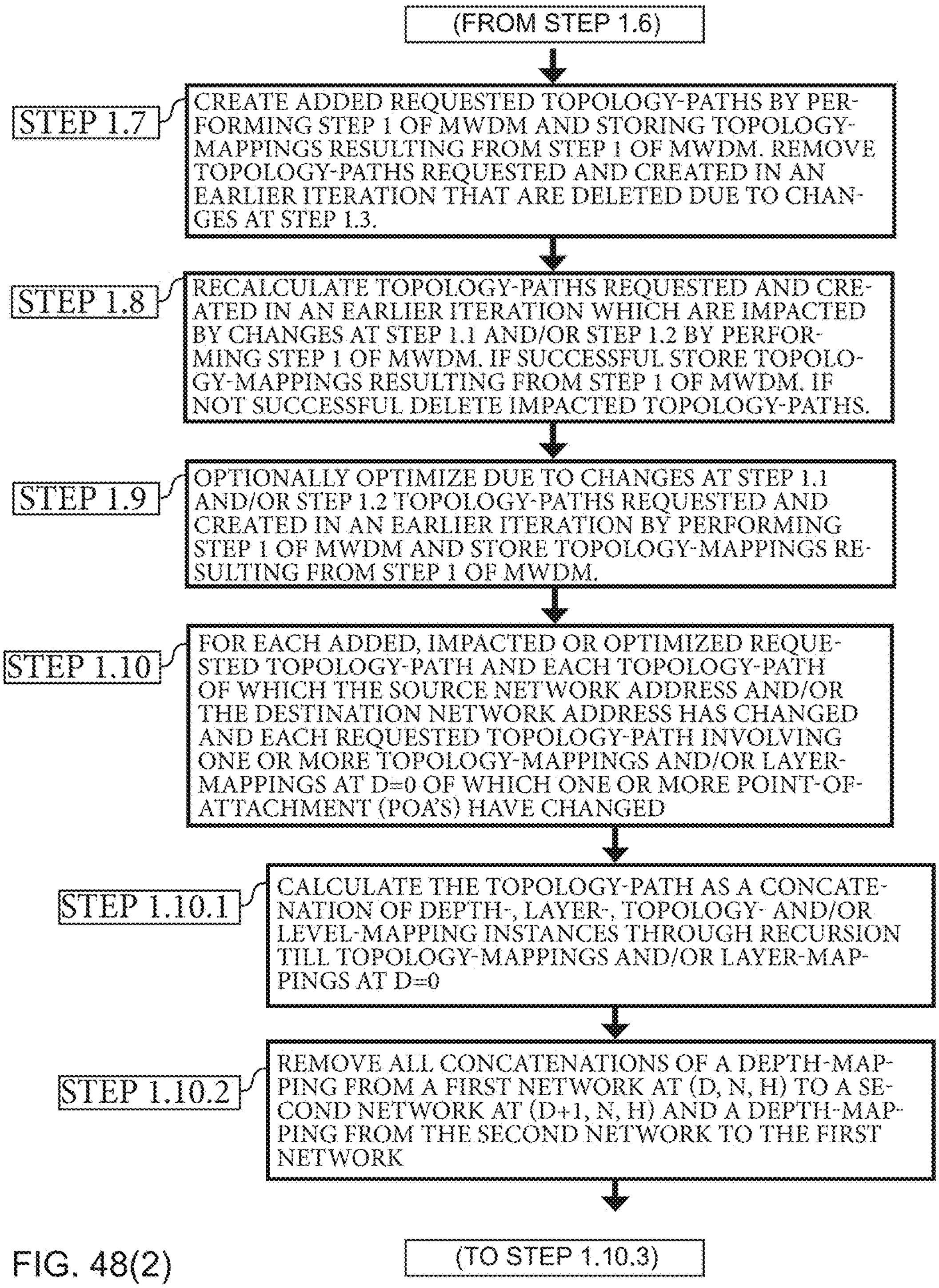
Figure 48:
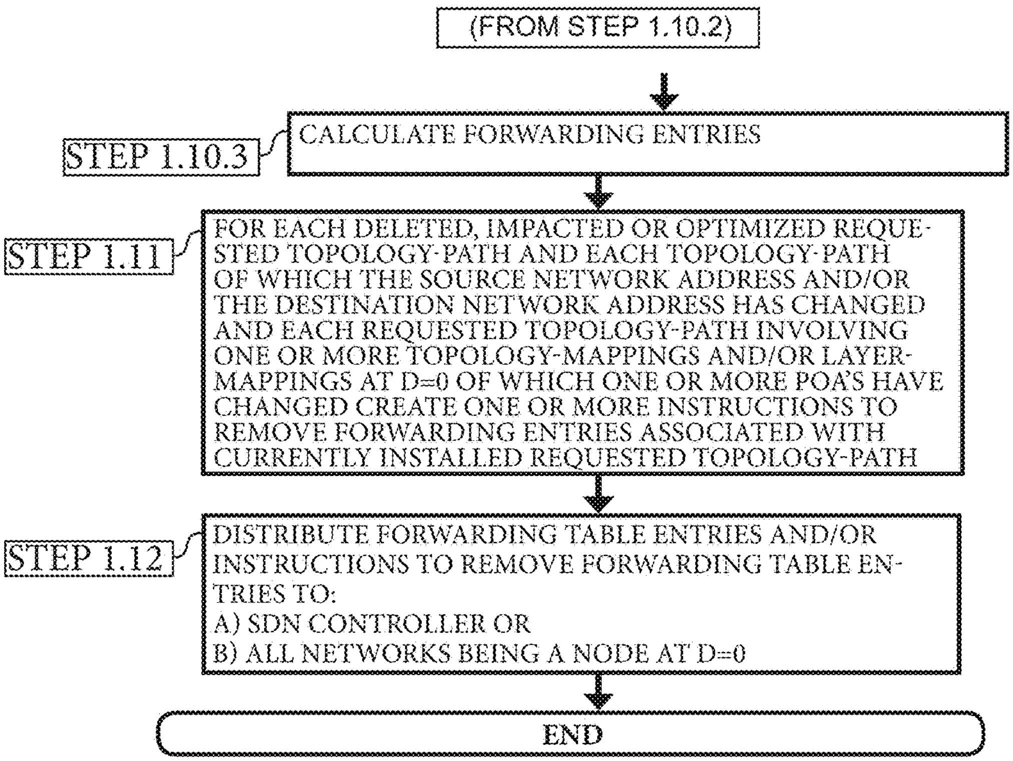

FIG. 48 shows a flowchart of an example SDN Compiler. The method comprises the following steps. Step 1 starts an infinite loop. Step 1.1 retrieves and stores changes in network instances. Changes in network instances include changes in, but not limited to, network name, network depth d, network layer n, network level h and forwarding policy of network. Step 1.2 retrieves and stores changes in depth-, layer-, topology- and level-mapping instances. Changes in depth-, layer-, topology- and level-mapping instances include changes in, but not limited to, source network and destination network of a depth-, layer-, topology- and level-mapping, cost value of a particular cost-type of a depth-, layer-, topology- and level-mapping, properties of a topology-mapping at d=0, properties of a layer-mapping at d=0, capacity of a topology-mapping (for example but not limited to: latency, frequency used for multiplexing), capacity of a layer-mapping, PoA of source network and PoA of destination network of a topology-mapping between networks at d=0, PoA of source network and PoA of destination network of a layer-mapping between networks at d=0. The SDN Compiler receives this information at d>0 from the user. In case depth d=0 depending on the implementation this information could be retrieved from, but is not limited to, a SDN controller, the nodes directly, a network management system, a network operations system, a cloud management system, other means or a combination of the above. Step 1.3 retrieves and stores changes in topology-paths requested by a user of the SDN Compiler. Changes in requested path instances include changes in, but not limited to, source network and destination network of path to calculate forwarding entries for, address of source network and address of destination network of path to calculate forwarding entries for, capacity of requested path. Steps 1.4 creates added topology-mappings at d>0 by performing if n>0 step 2 else if n=0 step 3 of 'method with depth-mappings' (MWDM) and stores depth-, layer-, and/or topology-mappings resulting from step 2 or step 3 of MWDM. As an example, but not limited to, the depth-, layer-, and/or topology-mappings resulting from step 2 or step 3 of MWDM could be stored as an attribute of a topology-mapping. Steps 1.4 creates added layer-mappings at d>0 by performing step 4 of MWDM and stores depth-, and layer-mappings resulting from step 4 of MWDM. Depth-mappings and level-mappings that have been created are stored in step 1.2 and do not require any calculation. Step 1.5 recalculates topology-mappings at d>0 impacted by changes at step 1.1 and/or step 1.2 by performing if n>0 step 2 else if n=0 step 3 of MWDM. If successful depth-, layer-, and/or topology-mappings resulting from step 2 or step 3 of MWDM are stored. If not successful the impacted topology-mapping is deleted. Optionally a user is be notified of the deletion of the topology-mapping. Step 1.5 recalculates layer-mappings at d>0 impacted by changes at step 1.1 and/or step 1.2 by performing step 4 of MWDM. If successful depth- and/or layer-mappings resulting from step 4 of MWDM are stored. If not successful the impacted layer-mapping is deleted. Optionally a user is be notified of the deletion of the topology-mapping. In case a network is deleted, depth-, layer-, topology-, and/or level-mappings of this network are deleted as well. Changes in network instances or depth-, layer-, topology-, and/or level-mapping instances might allow for a more optimal calculation of topology-mappings and/or layer mappings against their requirements. Therefore, step 1.6 optionally optimizes due to changes at step 1.1 and/or step 1.2 topology-mappings at d>0 by performing if n>0 step 2 else if n=0 step 3 of MWDM and stores depth-, layer-, and/or topology-mappings resulting from step 2 or step 3 of MWDM and optionally optimizes due to changes at step 1.1 and/or step 1.2 layer-mappings at d>0 by performing step 4 of MWDM and store depth- and/or layer-mappings resulting from step 4 of MWDM. Step 1.6 is optional and as an example, but not limited to, can be performed upon user request or at periodic intervals. Step 1.7 creates added requested topology-paths by performing step 1 of MWDM and stores topology-mappings resulting from step 1 of MWDM. As an example, but not limited to, the topology-mappings resulting from step 1 of MWDM could be stored as an attribute of a topology-path. Step 1.7 also removes topology-paths requested and created in an earlier iteration that are deleted due to changes at step 1.3. Step 1.8 recalculates topology-paths requested and created in an earlier iteration, which are impacted by changes at step 1.1 and/or step 1.2 by performing step 1 of MWDM. If successful topology-mappings resulting from step 1 of MWDM are stored. If not successful impacted topology-paths are deleted. Step 1.9 optionally optimizes due to changes at step 1.1 and/or step 1.2 topology-paths requested and created in an earlier iteration by performing step 1 of MWDM and storing topology-mappings resulting from step 1 of MWDM. As an alternative to the flowchart of FIG. 48, step 1.3 could be performed after step 1.6 and before step 1.7. In step 1.10 for each added, impacted or optimized requested topology-path and each topology-path of which the source network address and/or the destination network address has changed and each requested topology-path involving one or more topology-mappings and/or layer-mappings at d=0 of which one or more Point-of-Attachment (PoA's) have changed forwarding entries are calculated by performing steps 1.10.1, 1.10.2 and 1.10.3. Step 1.10.1 calculates the topology-path as a concatenation of depth-, layer-, topology- and/or level-mapping instances through recursion till topology-mappings and/or layer-mappings at d=0 using the depth-, layer- and/or topology-mappings stored at steps 1.4, 1.5 and/or 1.6. Step 1.10.2 removes all concatenations of a depth-mapping from a first network at (d, n, h) to a second network at (d+1, n, h) and a depth-mapping from the second network to the first network. Step 1.10.3 calculates forwarding entries by performing the following actions:

1.10.3.1 For each node at d=0 within the path of action 1.10.2) referred to as 'calculated path', calculating one or more forwarding instructions, each forwarding instruction comprising of:
- an input port: a point-of-attachment (PoA) of a topology-mapping or layer-mapping from a previous node in the calculated path, or "local" in case the node is a first node of the calculated path, indicating a packet is created by this node, optionally using the name of the source network instead of "local".
- an output port: a point-of-attachment (PoA) of a topology-mapping or layer-mapping to a next node in the calculated path, or "local" in case the node is a last node of the calculated path, indicating a packet should be received by this node, optionally using the name of the destination network instead of "local".

1.10.3.2 For each packet-switching node, including within the forwarding instructions calculated at 1.10.3.1):
- a logical source address: address of source network at action 1.10)
- a logical destination address: address of destination network at action 1.10)

1.10.3.3 For each packet-switching node at layer n and the next node in the calculated path being a circuit-switching node at layer n−1, including within the forwarding instructions calculated at 1.10.3.1):
- a Source Media Access Control (MAC): a point-of-attachment (PoA) of a layer-mapping to a next node in the calculated path,
- a Destination Media Access Control (MAC): a input port point-of-attachment (PoA) of the next node at layer n in the calculated path,

1.10.3.4 For each packet-switching node at n=n_min and the next node in the calculated path being a node at layer n=n_min, including within the forwarding instructions calculated at 1.10.3.1):
- a Source Media Access Control (MAC): a point-of-attachment (PoA) of a topology-mapping to a next node in the calculated path,
- a Destination Media Access Control (MAC): an input port point-of-attachment (PoA) of the next node at layer n in the calculated path,

1.10.3.5. For each circuit-switching node at layer n, including within the forwarding instructions calculated at 1.10.3.1):
- Channel In: if a previous node is at layer n, including a channel identifier of a topology-mapping from a previous node in the calculated path,
- Channel Out: if a next node is at layer n, including a channel identifier of a topology-mapping to a next node in the calculated path.

in which n_min at d is the lowest layer at a particular depth d

In step 1.11 for each deleted, impacted or optimized requested topology-path and each topology-path of which the source network address and/or the destination network address has changed and each requested topology-path involving one or more topology-mappings and/or layer-mappings at d=0 of which one or more PoA's have changed create one or more instructions to remove forwarding entries associated with currently installed requested topology-path. In step 1.12 Forwarding Table Entries and/or instructions to remove forwarding table entries are distributed to a) SDN controller or b) all networks being a node at d=0. An example of, but not limited to, creating an added topology-mapping at depth d>0 and layer n=0 in step 1.4 of the flowchart of FIG. 48 using step 3 of the 'method with depth-mappings', is the creation of a topology-mapping from network LA at (d, n−1, h) to network LB at (d, n−1, h) calculated as a concatenation of a depth-mapping from network LA at (d, n−1, h) to network KA at (d−1, n−1, h), a topology-path from network KA at (d−1, n−1, h) to network KB at (d−1, n−1, h) and a depth-mapping from network KB at (d−1, n−1, h) to network LB at (d, n−1, h), the topology-path from network KA at (d−1, n−1, h) to network KB at (d−1, n−1, h) being a topology-mapping from network KA to network KB, as shown in FIG. 39C. The resulting mappings to be stored according to step 1.4 of the flowchart of FIG. 48 are the depth-mapping from network LA to network KA, the topology-mapping from network KA to network KB and the depth-mapping from network KB to network LB at. An example of, but not limited to, creating an added layer-mapping at depth d>0 in step 1.4 of the flowchart of FIG. 48 using step 4 of the 'method with depth-mappings', is the creation of a layer-mapping from network LC at (d, n, h) to network LA at (d, n−1, h) calculated as a concatenation of a depth-mapping from network LC at (d, n, h) to network KC at (d−1, n, h), a layer-mapping from network KC at (d−1, n, h) to network KA at (d−1, n−1, h) and a depth-mapping from network KA at (d−1, n−1, h) to network LA at (d, n−1, h), as shown in FIG. 39D. The resulting mappings to be stored according to step 1.4 of the flowchart of FIG. 48 are the depth-mapping from network LC to network KC, the layer-mapping from network KC to network KA and the depth-mapping from network KA to network LA. An example of, but not limited to, of creating an added layer-mapping at depth d>0 in step 1.4 of the flowchart of FIG. 48 using step 4 of the 'method with depth-mappings', is the creation of a layer-mapping from network LB at (d, n−1, h) to network LD at (d, n, h) calculated as a concatenation of a depth-mapping from network LB at (d, n−1, h) to network KB at (d−1, n−1, h), a layer-mapping from network KB at (d−1, n−1, h) to network KD at (d−1, n, h) and a depth-mapping from network KD at (d−1, n, h) to network LD at (d, n, h), as shown in FIG. 39D. The resulting mappings to be stored according to step 1.4 of the flowchart of FIG. 48 are the depth-mapping from network LB to network KB, the layer-mapping from network KB to network KD and the depth-mapping from network to network LD. An example of, but not limited to, creating an added topology-mapping at depth d>0 and layer n>0 in step 1.4 of the flowchart of FIG. 48 using step 2 of the 'method with depth-mappings', is the creation of a topology-mapping from network LC at (d, n, h) to network LD at (d, n, h) calculated as a concatenation of a layer-mapping from network LC at (d, n, h) to network LA at (d, n−1, h), a topology-path from network LA at (d, n−1, h) to network LB at (d, n−1, h) and a layer-mapping from network LB at (d, n−1, h) to network LD at (d, n, h), the topology-path from network LA at (d, n−1, h) to network LB at (d, n−1, h) being a topology-mapping from network LA to network LB, as shown in FIG. 39B. The resulting mappings to be stored according to step 1.4 of the flowchart of FIG. 48 are the layer-mapping from network LC to network LA, the topology-mapping from network LA to network LB and the layer-mapping from network LB to network LD. An example of, but not limited to, of creating an added requested topology-path in step 1.7 of the flowchart of FIG. 48 using step 1 of the 'method with depth-mappings', is the creation of a topology-path from source network LC at (d, n, h) to destination network LD at (d, n, h) being a topology-mapping from network LC to network LD, as shown in FIG. 39A. Note that the topology-path from network LC to network LD consists of a single topology-mapping from network LC to network LD. In general, this topology-path can consist of a concatenation of an arbitrary number of topology-mappings. The resulting topology-mappings to be stored according to step 1.7 of the flowchart of FIG. 48 is the topology-mapping from network LC to network LD. An example of, but not limited to, calculating a topology-path in step 1.10.1 of the flowchart of FIG. 48 as a concatenation of depth-, layer-, topology- and/or level-mapping instances through recursion till topology-mappings and/or layer-mappings at d=0 using the depth-, layer- and/or topology-mappings stored at steps 1.4, 1.5 and/or 1.6 is the calculation of a path from network LC to network LD through recursion, using the mappings stored above, illustrated by the following steps, and illustrated in FIGS. 39A through 39D:

1) The topology-path from network LC to network LD comprises of a topology-mapping from network LC to network LD, as shown in FIG. 39A.
2) The topology-mapping from LC to LD comprises of a layer-mapping from network LC to network LA, the topology-mapping from network LA to network LB and the layer-mapping from network LB to network LD, as shown in FIG. 39B.
3) The layer-mapping from network LC to network LA comprises of the depth-mapping from network LC to network KC, the layer-mapping from network KC to network KA and the depth-mapping from network KA to network LA. The topology-mapping from network LA to network LB comprises of the depth-mapping from network LA to network KA, the topology-mapping from network KA to network KB and the depth-mapping from network KB to network LB. The layer-mapping from network LB to network LD comprises of the depth-mapping from network LB to network KB, the layer-mapping from network KB to network KD and the depth-mapping from network to network LD.
4) Therefore, the topology-path from network LC to network LD comprises of the depth-mapping from network LC to network KC, the layer-mapping from network KC to network KA, the depth-mapping from network KA to network LA, the depth-mapping from network LA to network KA, the topology-mapping from network KA to network KB, the depth-mapping from network KB to network LB, the depth-mapping from network LB to network KB, the layer-mapping from network KB to network KD and the depth-mapping from network KD to network LD, as illustrated in FIG. 39D and explained in the description of FIG. 39D. The topology-path from network LC to network LD traverses the following networks: LC, KC, KA, LA, KA, KB, LB, KB, KD, LD.

We refer to the path calculated at step 1.10.1 of the flowchart of FIG. 48 as a recursive-path, calculated from the requested topology-path of step 1.7 of the flowchart of FIG. 48. The forwarding entries for physical or virtual nodes in the recursive-path are calculated in steps 1.10.2 and 1.10.3 of the flowchart of FIG. 48.

Not considering layering, hierarchy levels, recalculation of topology-mappings, recalculation of layer-mappings, recalculation of topology-paths, optimization of topology-mappings, optimization of layer-mappings and optimization topology-paths, the method of FIG. 48 results in the following method of controlling an overall network by a compiler, based on a logical network model, the overall network comprising two or more physical nodes, the physical nodes being interconnected by physical links in accordance with a physical network layout, the logical network model comprising logical nodes, each logical node being indicated with a logical node name, each logical node name referring to at least one physical node in the network, the method as performed by the compiler comprising the following actions:

a) Storing physical node names, each physical node name being an unique identifier of one physical node, storing physical topology-mappings, each physical topology-mapping being one physical link in one direction, said physical topology-mapping being based on a directed graph representation, and storing point-of-attachment names of said physical nodes, each of the point-of-attachment names of a physical node concerned being an unique identifier of a point-of-attachment between the certain physical node concerned and a physical link connecting the physical node concerned to another physical node,
b) Storing logical node names for said logical nodes, each logical node name being an unique identifier of one logical node and storing depth-mappings, said depth mappings at least defining how logical nodes are mapped to physical nodes, said depth-mapping being based on a directed graph representation,
c) Creating and storing one or more logical topology-mappings, each logical topology-mapping being a directed graph representation from a first logical node to a second logical node, calculated as a concatenation of a first depth-mapping from the first logical node to a first physical node, a physical topology-path from the first physical node to a second physical node and a second depth-mapping from the second physical node to the second logical node, said physical topology-path being a concatenation of one or more physical topology-mappings, and storing for each of said logical topology-mappings edge-relationships comprising a first edge-relationship being a relationship between the first depth-mapping and said logical topology-mapping, one or more second edge-relationships each second edge-relationship being a relationship between one of said one or more physical topology-mappings in said physical topology-path and said logical topology-mapping, and a third edge-relationship being a relationship between the second depth-mapping and said logical topology-mapping, d) Creating and storing a requested-topology-path being a concatenation of one or more logical topology-mappings, and storing one or more further edge-relationships, each further edge-relationship concerned being a relationship between one logical topology-mapping within the requested-topology-path and said requested-topology-path, e) Calculating through recursion and storing a recursive-path for said requested-topology-path, comprising logical nodes as indicated by said logical node names, depth-mappings, physical nodes as indicated by said physical node names, physical topology-mappings, physical point-of-attachments as indicated by physical point-of-attachment names, said recursive-path being based on a directed graph representation, f) Creating forwarding table entries for physical nodes in said recursive-path from said recursive-path, g) Sending said forwarding table entries, either directly or indirectly, to physical nodes in said recursive-path.

As a topology-path is a concatenation of topology-mappings, a first topology-path can comprise of a second topology-path, creating a nesting of the first topology-path and the second topology-path. As a level-path is a concatenation of level-mappings, a first level-path can comprise of a second level-path, creating a nesting of the first level-path and the second level-path. As one or more topology-paths and one or more level-paths can be concatenated, we refer to a topology-level-path from a first network at (d, n, h1) to a second network at (d, n, h2) as a concatenation of zero or more topology-paths at (d, n) and zero or more level-paths at (d, n) and zero or more topology-level-paths at (d, n), said number of topology-paths and said number of level-paths and said number of topology-level-paths being such that their sum is at least one. Note that first a first topology-level-path can comprise of a second topology-level-path, creating a nesting of the first topology-level-path and the second topology-level-path. Note that a topology-level-path can be a single topology-path or can be a single level-path.

A topology-mapping can be created using any of the following methods:

A first method for calculating a topology-mapping, comprising the following actions:

Calculating and storing a topology-mapping from a first network at (d, n1, h) to a second network at (d, n1, h) as a concatenation of a depth-mapping from said first network to a third network at (d−x, n2, h), a topology-level-path from said third network to a fourth network at (d−x, n2, h) and a depth-mapping from said fourth network to said second network with x being larger than zero and smaller than or equal to d, where n1 may be equal to n2.

Step 3 of the “method with depth-mappings (MWDM)” is an example, but not limited to, the first method for calculating a topology-mapping.

A second method for calculating a topology-mapping, comprising the following actions:

Calculating and storing a topology-mapping from a first network at (d, n, h) to a second network at (d, n, h) as a concatenation of a layer-mapping from said first network to a third network at (d, n−y, h), a topology-level-path from said third network to a fourth network at (d, n−y, h) and a layer-mapping from said fourth network to said second network with y being larger than zero and smaller than or equal to n−n_min(d), n_min(d) being a lowest layer at particular depth d and n_min(d) being=>0.

Step 2 of the “method with depth-mappings (MWDM)” is an example, but not limited to, the second method for calculating a topology-mapping.

A third method for calculating a topology-mapping, comprising the following actions:

Calculating and storing a topology-mapping from a first network at (d, n, h) to a second network at (d, n, h) as a concatenation of one or more level-mappings with decreasing level from the first network to a third network at (d, n, h−z), a topology-path from the third network to a fourth network at (d, n, h−z) and one or more level-mappings with increasing level from the fourth network to the second network, with z larger than zero and smaller than or equal to h−h_min, h_min being the lowest level at depth d and layer n.

An example of, but not limited to, this method was used in FIG. 42D, in which a topology-mapping from network NAA at (d, n, h+1) to network NCC at (d, n, h+1) was replaced by a level-mapping from network NAA at (d, n, h+1) to network NB at (d, n, h), a topology-mapping from network NB at (d, n, h) to network NC at (d, n, h) and a level-mapping from network NC at (d, n, h) to network NCC at (d, n, h+1). The third method for calculating a topology-mapping will be described in more detail below.

Additionally, a topology-mapping at a layer n can be calculated using a topology-level-path at a higher layer, typically referred to as tunneling over a higher layer:

i. Calculating and storing a topology-mapping from a first network at (d, n, h) to a second network at (d, n, h) as a concatenation of a layer-mapping from said first network to a third network at (d, n+y, h), a topology-level-path from said third network to a fourth network at (d, n+y, h) and a layer-mapping from said fourth network to said second network with y larger than zero and smaller than or equal to n_max−n, n_max being the highest layer at particular depth d. This method is referred to as the fourth method for calculating a topology-mapping.

Additionally, a topology-mapping at a depth d can be calculated using a topology-level-path at a higher depth:

ii. Calculating and storing a topology-mapping from a first network at (d, n1, h) to a second network at (d, n1, h) as a concatenation of a depth-mapping from said first network to a third network at (d+x, n2, h), a topology-level-path from said third network to a fourth network at (d+x, n2, h) and a depth-mapping from said fourth network to said second network with x larger than zero and smaller than or equal to d_max-d, d_max being the highest depth. This method is referred to as the fifth method for calculating a topology-mapping.

The topology-level-path used in the first method, second method, fourth method and fifth method to calculate a topology-mapping can be a topology-level-path, a topology-path or a level-path, as a topology-level-path can comprise of a single topology-path and a topology-level-path can comprise of a single level-path. When creating a topology-mapping the topology-level-path used in the calculation of the topology-mapping can either a topology-level-path that is explicitly created or can be concatenation of topology-mappings and level-mappings. This is illustrated in FIG. 50G, in which topology-mapping named L14 is calculated as a concatenation of a depth-mapping named L12, a topology-mapping named L5 and a depth-mapping named L13. In comparison in FIG. 50C a topology-path L11 was explicitly created comprising of the topology-mapping named L5.

A layer-mapping can be created using any of the following methods:

A first method for calculating a layer-mapping, comprising the following actions:

Calculating and storing a layer-mapping from a first network at (d, n1, h) to a second network at (d, n1−y, h) as a concatenation of a depth-mapping from said first network to a third network at (d−x, n2, h), a layer-mapping from said third network to a fourth network at (d−x, n2−y, h) and a depth-mapping from said fourth network to said second network with x larger than zero and smaller than or equal to d, with y larger than zero and smaller than or equal to n1−n1_min and smaller than or equal to n2−n2_min, n1_min being the lowest layer at depth d, n2_min being the lowest layer at depth d−x, Step 4 of the "method with depth-mappings (MWDM)" for a first network to a second network, said first network at a higher layer than said second network, is an example, but not limited to, the first method for calculating a layer-mapping.

A second method for calculating a layer-mapping, comprising the following actions:

Calculating and storing a layer-mapping from a first network at (d, n1, h) to a second network at (d, n1+y, h) as a concatenation of a depth-mapping from said first network to a third network at (d−x, n2, h), a layer-mapping from said third network to a fourth network at (d−x, n2+y, h) and a depth-mapping from said fourth network to said second network with x larger than zero and smaller than or equal to d, with y larger than zero and smaller than or equal to n1_max−n1 and smaller than or equal to n2_max−n2, n1_max being the highest layer at depth d, n2_max being the highest layer at depth d−x.

Step 4 of the "method with depth-mappings (MWDM)" for a first network to a second network, said first network at a lower layer than said second network, is an example, but not limited to, the first method for calculating a layer-mapping. Note that in the first method for calculating a layer-mapping, the third and fourth network can be the same network at (d−x, n2, h) or at (d−x, n2−y, h). Note that in the second method for calculating a layer-mapping, the third and fourth network are the same network at (d−x, n2, h) or at (d−x, n2+y, h).

Topology-mappings, depth-mappings, layer-mappings and level-mappings can be created by the user of the SDN Compiler or by an SDN Controller. As an example, but not limited to topology-mappings are created by the SDN Compiler when a physical link is added, which for example, but not limited to, reported to the SDN Compiler by the physical node directly, by an SDN Controller or, by polling a physical node or by polling an SDN Controller. When creating a mapping from a first network at (d1, n1, h1) to second network at (d2, n2, h2), the value of d1, d2, n1, n2, h1, h2 determine the type of mapping, being a topology-mapping, a depth-mapping, a layer-mappings or a level-mapping. Therefore, the type of mapping does not have to be specified by the user of the SDN Compiler or by the SDN Controller, simplifying the method. Alternatively, the type of mapping could be specified by the user of the SDN Compiler or by the SDN Controller. As mentioned above, depth-mappings can be created directly between networks and are not using any other edges. Also, level-mappings can be created directly between networks and are not using any other edges, as they are a representation of the hierarchical structure of networks. Topology-mappings can be created using any of the first through fifth method for calculating a topology-mapping described above. Layer-mappings can be created using the first and second method for calculating a layer-mapping described above. This results in the following method for the creation of a mapping, as shown in FIG. 84, comprising the following actions:

creating a requested mapping from a first network at (d1, n3, h1) to second network at (d2, n4, h2) by:
- i. if d1< >d2 creating a depth-mapping directly,
- ii. else if d1=d2 and n3< >n4 creating a layer-mapping,
  - ii.i if d1=0 creating a layer-mapping directly,
  - ii.ii else if d1>0 and n3> creating a layer-mapping in accordance with the first method for calculating a layer-mapping,
  - ii.iii else if d1>0 and n3<n4 creating a layer-mapping in accordance with the second method for calculating a layer-mapping,
- iii. else if d1=d2 and n3=n4 and h1< >h2 creating a level-mapping directly,
- iv. else if d1=d2 and n3=n4 and h1=h2 creating a topology-mapping,
  - iv.i if d1=0 and h1=h_min and topology-mapping is a physical connection creating a topology-mapping directly,
  - iv.ii else if d1>0 and n3=n_min and h1=h_min creating a topology-mapping in accordance with the first method for calculating a topology-mapping, n_min being the lowest layer at depth d1, h_min being the lowest level at depth d1 and layer n3,
  - iv.iii else if n3>n_min and h1=h_min creating a topology-mapping in accordance with the second method for calculating a topology-mapping, n_min being the lowest layer at particular depth d1, h_min being the lowest level at depth d1 and layer n3,
  - iv.iv else if h1>h_min creating a topology-mapping in accordance with the third method for calculating a topology-mapping, h_min being the lowest level at depth d1 and layer n3.

Using above method a mapping from a first network at (d1, n1, h1) to second network at (d2, n2, h2) can be created by specifying the name of the first network and the name of the second network. Note that the depth, d1, layer n1 and level h1 of the first network and the depth d2, layer n2 and level h2 of the second network do not have to be specified in above method as the depth, d1, layer n1 and level h1 of the first network has been stored at the creation of the first network and the depth d2, layer n2 and level h2 of the second network has been stored at the creation of the second network. Note that the type of mapping, being topology-mapping, depth-mapping, layer-mapping, level-mapping does not have to be specified in above method as the type of mapping is determined from the values of, d1, n1, h1 and d2, n2, h2.

Optionally, the below steps iv.v, iv.vi, iv.vii, iv.viii can be added to the method:

iv.v else if d1>0 and n1>n_min and explicitly requested by the user of the SDN Compiler to create a topology-mapping per the first method to calculate a topology-mapping, creating a topology-mapping per method per the first method to calculate a topology-mapping, n_min being the lowest layer at depth, d1, h_min being the lowest level at depth d1 and layer n1, iv.vi else if n1>n_min and h1>h_min and explicitly requested by the user of the SDN Compiler to create a topology-mapping per the second method to calculate a topology-mapping creating a topology-mapping per the second method to calculate a topology-mapping, n_min being the lowest layer at particular depth, d1, h_min being the lowest level at depth d1 and layer n1, iv.vii else if n1<n_max and explicitly requested by the user of the SDN Compiler to create a topology-mapping per the fourth method to calculate a topology-mapping creating a topology-mapping per the fourth method to calculate a topology-mapping, n_max being the highest layer at particular depth, d1, h_min being the lowest level at depth d1 and layer n1, iv.viii else if d1<d_max and explicitly requested by the user of the SDN Compiler to create a topology-mapping per the fifth method to calculate a topology-mapping creating a topology-mapping per the fifth method to calculate a topology-mapping, d_max being the highest depth, h_min being the lowest level at depth d1 and layer n1.

Steps iv.v, iv.vi, iv.vii, iv.viii are optional in above method and are only created upon explicit request by the user of the SDN Compiler.

Optionally, the direction of a depth-mapping, a layer-mapping and a level-mapping can be stored as follows:

storing a depth-mapping from a first network at (d1, n1, h1) to a second network at (d2, n2, h2) with d1<d2 as an increasing-depth-mapping storing a depth-mapping from a first network at (d1, n1, h1) to a second network at (d2, n2, h2) with d1>d2 as a decreasing-depth-mapping storing a layer-mapping from a first network at (d1, n1, h1) to a second network at (d2, n2, h2) with n1<n2 as an increasing-layer-mapping storing a layer-mapping from a first network at (d1, n1, h1) to a second network at (d2, n2, h2) with n1>n2 as a decreasing-layer-mapping storing a level-mapping from a first network at (d1, n1, h1) to a second network at (d2, n2, h2) with h1<h2 as an increasing-level-mapping storing a level-mapping from a first network at (d1, n1, h1) to a second network at (d2, n2, h2) with h1>h2 as a decreasing-level-mapping Optionally, when a topology-mapping from a first network at (d, n, h1) to a second network at (d, n, h1) is created and a level-mapping from a third network at (d, n, h2) to the first network exists and a level-mapping from the second network to a fourth network at (d, n, h2) exists with h2>h1, a topology-mapping from the third network to the fourth network could be created using method iv) for creating a topology-mapping described above automatically instead of upon explicit request of a user of the SDN Compiler. As an example, but not limited to, as shown in FIG. 53A, upon creation of topology-mapping named J27 from network ND to network NE, topology-mapping named J31 from network NCC to network NEE could be created automatically instead of upon explicit requested of a user of the SDN Compiler as a concatenation of a level-mapping named J19 from network NCC to network ND a topology-mapping named J27 from network ND to network NE and a level-mapping named J20 from network NE to network NEE. This process can be repeated at an arbitrary number of hierarchy level h. As this process is automatic instead of upon explicit request of a user of the SDN Compiler this results in topology-mappings between networks at an arbitrary number of hierarchy levels h.

A topology-path can be created using the following method: Calculating and storing a topology-path from a first network at (d, n, h) to a second network at (d, n, h) as a concatenation of zero or more topology-mappings at (d, n, h) and zero or more topology-paths at (d, n, h), said number of topology-mappings and said number of topology-paths being such that their sum is at least one. This method is referred to as the method to calculate a topology-path. We refer to a topology-path for which forwarding entries are requested as a requested topology-path. We refer to a level-path for which forwarding entries are requested as a requested level-path. We refer to a topology-path, level-path and topology-level-path for which forwarding entries are requested as a requested topology-path, requested level-path and requested topology-level-path respectively. As an example, but not limited to, a requested topology-path could be requested by an SDN Controller, a physical node, a user of the SDN Compiler. Such request could be a proactive path-instantiation or a reactive path-instantiation, as explained above. A level-path can be created using the following method: Calculating and storing a level-path from a first network at (d, n, h1) to a second network at (d, n, h2) as a concatenation of zero or more level-mappings at (d, n) and zero or more level-paths at (d, n), said number of level-mappings and said number of level-paths being such that their sum is at least one. This method is referred to as the method to calculate a level-path. We refer to a level-path for which forwarding entries are requested by a user as a requested level-path.

A topology-level-path can be created using the following method: Calculating and storing a topology-level-path from a first network at (d, n, h1) to a second network at (d, n, h2) as a concatenation of zero or more topology-paths at (d, n) and zero or more level-paths at (d, n) and zero or more topology-level-paths at (d, n), said number of topology-paths and said number of level-paths and said number of topology-level-paths being such that their sum is at least one. This method is referred to as the method to calculate a topology-level-path. We refer to a topology-level-path for which forwarding entries are requested by a user as a requested topology-level-path. We refer to a topology-mapping, depth-mapping, layer-mapping, level-mapping, topology-path, level-path and topology-level-path as an edge. Note that as an example, but not limited to a topology-level-path can comprise of a single topology-path, a single level-path, a single topology-mapping or a single level-mapping.

In order to describe more complex examples, we name each edge and we use the notation shown in FIGS. 51A through 51D to denote mappings and topology-level-paths. FIG. 51A shows the notation used for a first mapping with a first edge name, the first mapping being of a first mapping-type, the first mapping-type being a topology-mapping, depth-mapping, layer-mapping or level-mapping from a first network to a second network. The first network and the first mapping interface at the first Point-of-Attachment (PoA), the second network and the first mapping interface at the second PoA. The first PoA and the second PoA are optional. The '-( )->' sign indicating the direction of the mapping. We illustrate the naming of edges and new notation with the example of FIG. 79, which shows networks KA, KB, KC, KD, LA, LB, LC, LD, as shown in FIG. 33C above and a topology-mapping between network KA and network KB, a layer-mapping between network KA and network KC and a layer-mapping between network KB and network KD. FIG. 50A also shows Point-of-Attachments (PoAs) p701 through p706. As networks KA, KB, KC and KD are physical networks, the topology-mapping between network KA and network KB is representing a physical link, the layer-mapping between network KA and network KC is representing a physical link and the layer-mapping between network KB and network KD is representing a physical link. As a physical link can be uni-directional or bi-directional we represent a topology-mapping, depth-mapping, layer-mapping, level-mapping, topology-path, level-path or topology-level-path from a first network to a second network by a directed edge in a graph. This is shown in FIG. 50B, which shows networks KA, KB, KC, KD, LA, LB, LC, LD, topology-mappings, layer-mappings and depth-mappings. FIG. 51E shows the mappings of FIG. 50B in the notation of FIG. 51A. As an example, the topology-mapping named L5 from network KA to network KB is represented by: L5=KA–(topmap p701::p702)->KB, in which 'topmap' refers to 'topology-mapping'. Similarly, 'depmap' refers to 'depth-mapping', 'laymap' refers to 'layer-mapping', 'levmap' refers to 'level-mapping', 'toppath' refers to 'topology-path' and 'levpath' refers to 'level-path' in the notation used. Using the same notation as FIG. 51A, FIG. 51B shows a second mapping with a second edge-name, the second mapping being of a second mapping-type from the second network to a third network. As shown in FIG. 50C, by applying step 3) of the method with depth-mappings or by applying the first method for calculating a topology-mapping described above, we calculate and store a topology-mapping named L14 from network LA to network LB as a concatenation of a depth-mapping named L12 from network LA to network KA, a topology-path named L11 from network KA network KB and a depth-mapping named L13 from network KB to network LB, the topology-path named L11 from network KA to network KB comprising of a single topology-mapping named L5 from network KA to network KB. Alternatively, creating the topology-path named L11 could also have been omitted and the topology-mapping named L14 could have been created from topology-mapping L5 directly as shown in FIG. 50G. In FIG. 50C the topology-mapping named L5 from network KA to network KB is labeled with L5/L11 indicating that topology-mapping L5 is used to calculate topology-path L11 or in other words that topology-path L11 is mapped to topology-mapping L5. We refer to a relationship between 2 edges as an edge-relationship, in which a second edge is multiplexed or mapped to a first edge and represent such edge-relationship by "first edge/second edge", using a forward-slash symbol. As an example, we refer to L5/L11 as shown in FIG. 50C as an edge-relationship between a topology-mapping indicated by edge name L5 and a topology-path indicated by edge name L11, in which topology-path named L11 is mapped to topology-mapping named L5, or in other words, in which topology-mapping L5 is used to calculate topology-path L11. In FIG. 50C the name of an edge is shown in bold when labeling such edge. Note that in FIG. 50G the edge-relationship L5/L14 is created as topology-mapping L5 is used to create topology-mapping L14. FIG. 51C shows the notation of a third edge with a third edge-name, the third edge being of a third edge-type and being concatenation of a first edge and a second edge, the plus symbol indicating the concatenation and the forward-slash symbol representing an edge-relationship. As an example FIG. 51F shows the creation of the topology-mapping named L14 as "topmap L14=L12/L14+L11/L14+L13/L14" and the topology-path named L11 as "toppath L11=L5/L11", using the notation of FIG. 51C.

As shown in FIG. 50D, by applying step 4) of the method with depth-mappings or by applying the first method and second method for calculating a layer-mapping, we calculate and store a layer-mapping named L19 from network LC to network LA as a concatenation of a depth-mapping named L17 from network LC to network KC, a layer-mapping named L7 from network KC network KA and a depth-mapping named L15 from network KA to network LA and we calculate and store a layer-mapping named L20 from network LB to network LD as a concatenation of a depth-mapping named L16 from network LB to network KB, a layer-mapping named L10 from network KB to network KD and a depth-mapping named L18 from network KD to network LD. As shown in FIG. 50E, by applying step 2) of the method with depth-mappings or by applying the second method for calculating a topology-mapping, we calculate and store a topology-mapping named L22 from network LC to network LD as a concatenation of a layer-mapping named L19 from network LC to network LA, a topology-path named L21 from network LA network LB and a layer-mapping named L20 from network LB to network LD, the topology-path named L21 from network LA to network LB comprising of a single topology-mapping named L14 from network LA to network LB. As shown in FIG. 50F, by applying step 1) of the method with depth-mappings, we calculate and store a topology-path named L23 from network LC to network LD as a single topology-mapping named L22 from network LC to network LD. FIG. 51F shows the creation of topology-paths L11, L21 and L23, topology-mappings L14 and L22 and layer-mappings L19 and L20 using the notation of FIG. 51C. The edge-relationships shown in FIG. 50F can be used to calculate a set of edge-relationships through recursion. Said set of edge-relationships comprises of nested edge-relationships. As an example but not limited to, the topology-mapping from network KA to network KB has edge-relationship L5/L11, the topology-path from network KA to network KB has edge-relationship L11/L14, the topology-mapping from network LA to network LB has edge-relationship L14/L21, the topology-path from network LA to network LB has edge-relationship L21/L22, the topology-mapping from network LC to network LD has edge-relationship L22/L23 and the topology-path from network LC to network LD has name L23, therefore the topology-mapping named L11 from network KA to network KB has an example set of edge-relationships L5/L11/L14/L21/L22/L23. We refer to a single edge-relationship and to two or more edge-relationships combined through recursion as a set of edge-relationships. A first example but not limited to of a set of edge-relationships of topology-mapping named L5 is L5/L11/L14/L21/L22/L23. A second example but not limited to of a set of edge-relationships of topology-mapping named L5 is L5/L14/L23. Note that the first edge name in a set of edge-relationships is the name of said edge. We calculate the recursive-path of the requested topology-path L23 through recursion and store the nested edge-relationships in a set of edge-relationships for each edge. FIG. 80H illustrates the calculation of the topology-path named L23 from network LC to network LD. As shown in FIG. 50F, above we calculated and stored a topology-path named L23 from network LC to network LD as the single topology-mapping named L22 from network LC to network LD, and represented the topology-path named L23 in FIG. 51F as "toppath L23=L22/L23", per the notation described above, shown in step 1.

Using the relationships shown in FIG. 51F we recursively calculate the recursive-path and a set of edge-relationships comprising nested edge-relationships for each edge as shown in step 5 of FIG. 51G. Steps 2 through 4 of FIG. 51G are intermediate steps in the calculation. In FIG. 51D a notation for a topology-path, level-path or topology-level-path is shown, using the notations of FIGS. 51A, 51B and 51C. In step 6 of FIG. 51G the recursive-path of step 5 is shown using the notation of FIG. 51D by combining step 5 of FIG. 51G with FIG. 51E. This recursive-path was also calculated above in the description of an example of the flowchart of FIG. 48 based on FIGS. 39A through 39D. Additionally we have now calculated a set of edge-relationships for each edge is described below. The usage of the set of edge-relationships will be described below.

Figure 49:
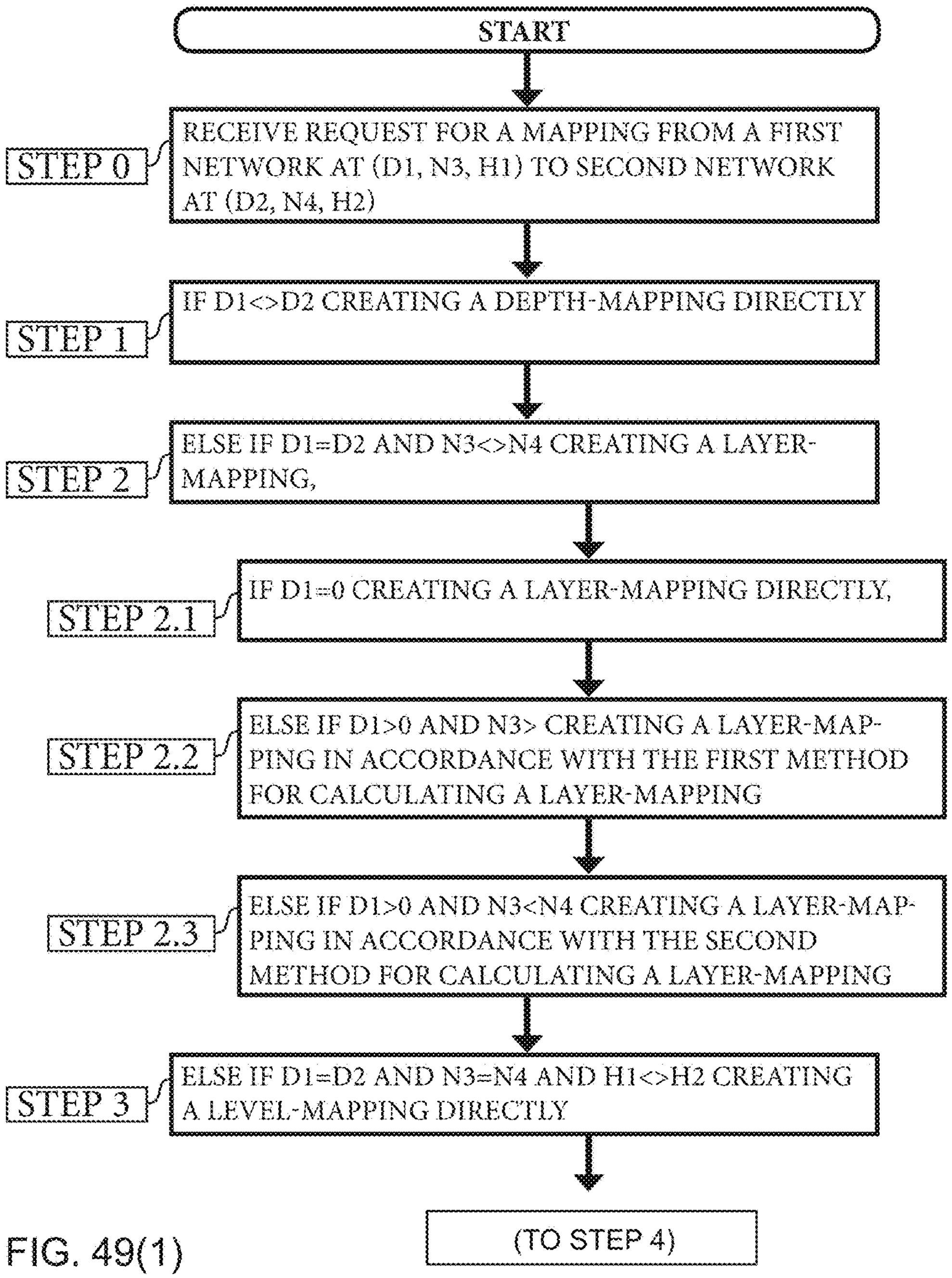
Figure 49:
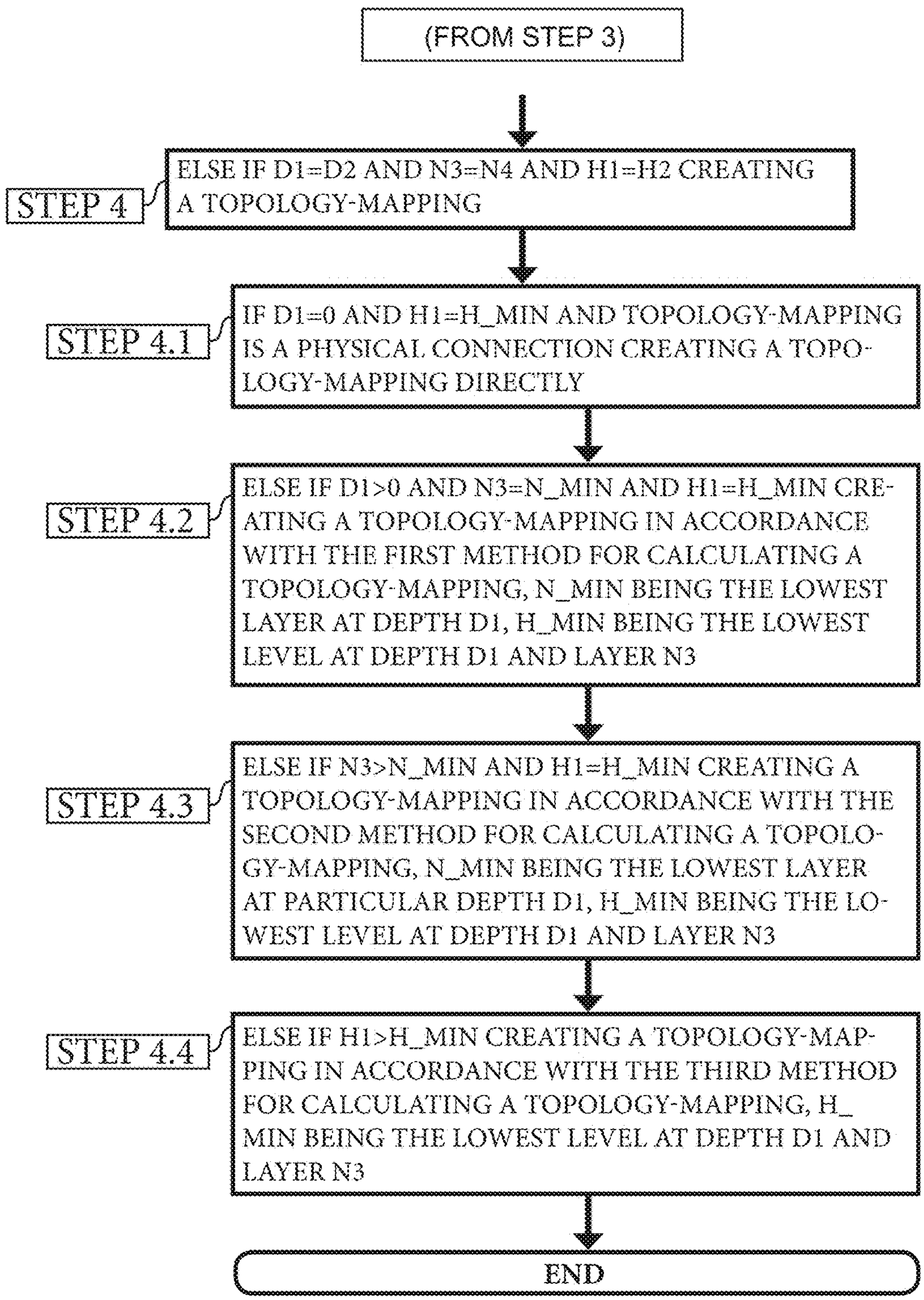

We now consider an example comprising of a first computing equipment, a second computing equipment and a first packet forwarding system. The first computing equipment is comprising of physical node EN at (d=0, n=0, h=0) representing a physical datalink layer Network Interface Card (NIC), physical node EU at (d=0, n=1, h=0) representing a network-layer process and physical node EX at (d=0, n=2, h=0) representing an application-layer process. The second computing equipment is comprising of physical node ER at (d=0, n=0, h=0) representing a Network Interface Card (NIC), physical node ES at (d=0, n=0, h=0) representing a Virtual Switch and a First Virtual Machine (VM). The First VM is comprising of a physical node ET at (d=0, n=0, h=0) representing a virtual NIC, physical node EW at (d=0, n=1, h=0) representing a network-layer process and physical node EY at (d=0, n=2, h=0) representing an application-layer process. Note that virtual nodes, such as a Virtual Machine are represented as physical nodes in the method, therefore we refer to physical nodes ET, EW and EY. The first packet forwarding system, such as for example but not limited to a router, is comprising of physical node EP at (d=0, n=0, h=0) being a physical NIC, physical node EQ at (d=0, n=0, h=0) being a physical NIC and physical node EV at (d=0, n=1, h=0) being a network-layer forwarding element, such as for example but not limited to a forwarding Application-Specific Integrated Circuit (ASIC). FIG. 52A also shows the topology-mappings and layer-mappings between physical nodes, being physical links. Physical Point-of-Attachment (PoAs) p618, p620, p627, p628, p629, p630, p631, p632 are interfaces at the datalink layer and as an example, but not limited to could be an Electrical and Electronics Engineers (IEEE) 802 Ethernet Media Access Control (MAC) address. PoA p633 as an example, but not limited to, could be an interface at a physical NIC, represented by physical node EN, internal to the first computing equipment. PoA p634 as an example, but not limited to, could be an interface at a network-layer process EU internal to the first computing equipment. PoA p641 as an example, but not limited to, could be a socket interface, as an example, but not limited to, UNIX (Uniplexed Information and Computing Service) domain sockets, from network-layer process EU to application-layer process EX internal to the first computing equipment. PoA p642 as an example, but not limited to, could be a socket interface from application-layer process EX to network-layer process EU internal to the first computing equipment. PoA p639 as an example, but not limited to, could be an interface at virtual NIC, represented by physical node ET internal to the first virtual machine. PoA p640 as an example, but not limited to, could be an interface at a network-layer process EW internal to the first virtual machine. PoA p643 as an example, but not limited to, could be a socket interface from network-layer process EW to application-layer process EY internal to the first virtual machine. PoA p644 as an example, but not limited to, could be a socket interface from application-layer process EY to network-layer process EW internal to the first virtual machine. FIG. 52B is a diagram showing physical nodes EN, EU, EX, ET, EW, EY, EP, EV, EQ and logical node VU at (d=1, n=1, h=0), VX at (d=1, n=2, h=0), VW at (d=1, n=1, h=0), VY at (d=1, n=2, h=0), VV at (d=1, n=1, h=0) and topology-mappings, depth-mappings, layer-mappings and topology-paths represented as directed edges in a graph. Logical nodes VU, VX, VW, VY, VV are mapped to physical node EU, EX, EW, EY, EV respectively, as represented by the depth-mappings shown in FIG. 52B. FIG. 52C shows topology-mappings named L71 through L74 per the notation of FIG. 51A, which are shown in FIG. 52B as well. FIG. 52C shows layer-mappings named L75 through L78, L90, L91 per the notation of FIG. 51A, which are shown in FIG. 52B as well. FIG. 52C shows depth-mappings named L81 through L86 L92, L93, L98, L99, which are shown in FIG. 52B as well. Using the method described above, the following topology-mappings are created, as shown in FIG. 52D:

- topology-mapping named L79 from node EU to node EV using the second method for calculating a topology-mapping
- topology-mapping named L80 from node EV to node EW using the second method for calculating a topology-mapping
- topology-mapping named L87 from node VU to node VV using the first method for calculating a topology-mapping
- topology-mapping named L88 from node VV to node VW using the first method for calculating a topology-mapping
- topology-path named L89 from node VU to node VW
- layer-mapping named L94 from node VX to node VU using the first method for calculating a layer-mapping
- layer-mapping named L95 from node VW to node VY using the second method for calculating a layer-mapping
- topology-mapping named L96 from node VX to node VY using the second method for calculating a topology-mapping
- topology-path named L97 from node VX to node VY Note that the mappings shown in FIG. 52D may be created by using the method for creation of mappings as shown in FIG. 49.

We consider the requested the topology-path L97 the requested topology-path for which forwarding entries should be created. Using the method described above, we calculate the recursive-path of the topology-path L97 through recursion and recursively calculate a set of edge-relationships for each edge comprising of nested edge-relationships, of which the result is shown in FIG. 52E.

In order to allow for packet forwarding or switching in a Packet Switched Network (PSN) comprising of packet-switching nodes or relaying or switching of a physical signal in a non-packet-switching network, above we assign zero or one switching-identifiers per topology-mapping, topology-path, level-path and topology-level-path. A switching-identifier depends on the depth d and layer n in which a topology is created comprising of networks and topology-mappings. Networks at a particular depth d and layer n are either all packet-switched networks or all non-packet-switched-networks. Nodes at a particular depth d and layer n are either all packet-switched nodes or all non-packet-switched-nodes. We distinguish between the following types, but not limited to, of switching-identifiers:

i switching-identifiers at depth d=0 and at arbitrary layer n comprising of a physical signal, the nodes at depth d and layer n being non-packet-switching nodes.

ii. switching-identifiers at depth d=0 and a layer performing Media Access Control (MAC), the nodes at depth d and layer n being packet-switching nodes.

iii. switching-identifiers at arbitrary depth d and at arbitrary layer n comprising of logical identifiers, the nodes at depth d and layer n being packet-switching nodes.

Examples of the first type of switching-identifiers include, but not limited to:

- the frequency of a physical signal
- the wavelength of a physical signal
- the frequency or the wavelength of a Wavelength Division Multiplexing (WDM) signal
- the timeslot of a Time Division Multiplexing (TDM) timeslot
- a Generalized Multi-Protocol Label Switching (GMPLS) Generalized Label
- a International Telecommunication Union (ITU) G.709 Optical Channel Payload Unit
- the name of a fiber, in a fiber-switching network Examples of the second type of switching-identifiers include, but not limited to:

- the name of a first Point-of-Attachment and the name of a second Point-of-Attachment
- a first Institute of Electrical and Electronics Engineers (IEEE) 802 Ethernet Media Access Control (MAC) address and a second IEEE 802 Ethernet Media Access Control (MAC) address In the example of FIG. 52B we assign a switching-identifier to the topology-mapping named L71 with value “source p618, destination p620”, we assign a switching-identifier to the topology-mapping named L72 with value “source p62'7, destination p628”, we assign a switching-identifier to the topology-mapping named L73 with value “source p629, destination p630”, we assign a switching-identifier to the topology-mapping named L74 with value “source p631, destination p632”, we assign a switching-identifier to the topology-mapping named L74 with value “source p631, destination p632” as shown in FIG. 52F. FIG. 52F also shows the depth d, layer n and level h of each edge. Note that in topology-mappings named L71 through L74 the PoAs of the topology-mappings, as shown in FIG. 52C, are used as switching-identifiers.

Examples of the third type of switching-identifiers include, but not limited to:

- the address of a first network and the address of a second network as a switching-identifier, as an example but not limited to, used in flow-based routing.
- the address of a second network as a switching-identifier, as an example but not limited to, used in destination-based routing.
- the name of a first network and the name of a second network as a switching-identifier, as an example but not limited to, used in flow-based routing.
- the name of a second network as a switching-identifier, as an example but not limited to, used in destination-based routing.
- an IPv4 address of a first network and an IPv4 address of a second network
- an IPv4 address of a first network and an IPv6 address of a second network
- an IPv6 address of a first network and an IPv4 address of a second network
- an IPv6 address of a first network and an IPv6 address of a second network
- an IPv6 flow label
- an IPv6 flow label combined with an IPv6 destination address
- an IPv6 flow label combined with an IPv6 source address and combined with an IPv6 destination address
- an IPv4 identification field repurposed to denote a VPN+IPv4 DST address
- an IPv4 identification field repurposed to denote a VPN+IPv4 SRC address+IPv4 DST address
- a logical label
- a Virtual-Local-Area-Network (VLAN)-identifier
- a Multi-Protocol Label Switching (MPLS) label
- a protocol identifier, representing a protocol such as but not limited to User Datagram Protocol (UDP) or Transmission Control Protocol (TCP)
- a port representing an application
- a well-known port representing an application
- a Differentiated Services (DS), Code Point (CP) identifier, representing a traffic class
- an Asynchronous Transfer Mode (ATM) Virtual Path Identifier (VPI)
- an Asynchronous Transfer Mode (ATM) Virtual Channel Identifier (VCI)
- Third Generation Partnership Project (3GPP) Long Term Evolution (LTE) Logical Channel Identifier (LCID)

In the example of FIG. 52B we assign a first switching-identifier to the topology-path named L89 with value “source VU, destination VW”, using flow-based routing, as shown in FIG. 52F. Alternatively, a value of “destination VW” could have been used for destination-based routing. We assign a second switching-identifier with value TCP (Transmission Control Protocol) to the topology-path named L89, as shown in FIG. 52F. Note that said second switching-identifier is used to indicate the usage of TCP by the topology-path L89. As will be understood by a person skilled in the art, alternatively an additional transport-layer could have been added in FIG. 52A in between the network-layer and the application-layer. In case a TCP/IP stack is used, there is no identifier to denote a node on the transport layer, therefore a second switching-identifier representing a particular protocol used on the transport-layer suffices and reduces the number of nodes and mappings to create in an implementation. In the example of FIG. 52B we assign a switching-identifier to the topology-path named L97 with value “source VX, destination VY”, using flow-based routing.

Note that in case of a second type of switching-identifiers at layer n, layer n=n_min(d), n_min(d) being the lowest layer at depth d, in other words layer n is the lowest layer at depth d, or layer n−1 at depth d comprises of non-packet-switching nodes.

Before or at creation a first network at a depth d, layer n the SDN Compiler should be instructed by a user, such as for example, but not limited to a network administrator:

i. whether networks at said depth d and said layer n are packet-switching networks or non-packet-switching networks ii. how to construct switching for said depth d and said layer n This is done at initialization of said depth d and said layer n, as this information identical for each network at said depth d and said layer n. This is done at initialization of said depth d and said layer n, therefore a user of an SDN Compiler will not have to specify this information with each network that is created. The information at i) above is is used by the SDN Compiler to select the method for creation of forwarding entries for a physical packet-switching node or of forwarding entries for a physical non-packet-switching node, as described above. An example of the second type of switching-identifiers includes, but not limited to, Ethernet nodes, such as but not limited to Ethernet Network Interface Cards (NICs) or Ethernet Switches at a depth d and layer n, the SDN Compiler is instructed that said depth d and said layer n comprises of packet-switching nodes, allowing the SDN Compiler to select the method for creation of forwarding entries for a physical packet-switching node, as described above. Also, the SDN Compiler should be instructed that a first IEEE 802 Ethernet MAC address and a second IEEE 802 Ethernet MAC address is the switching-identifier at said depth d and layer n. When using said switching-identifier for Ethernet Media Access Control, said switching-identifier is assigned to topology-mappings, as said Media Access Control is performed on a link basis.

In the method we calculate from said recursive-path forwarding entries for a requested topology-level-path. The recursive-path contains the following information for each node at d=0, h=h_min being a physical node:

- an input port, being a PoA between the physical or virtual node and a topology-mapping or a layer-mapping, with the exception of the first node in the recursive-path which does not have an input port as the packet or signal is created by the first node in the recursive-path
- an output port, being a PoA between the physical or virtual node and a topology-mapping or a layer-mapping, with the exception of the last node in the recursive-path which does not have an output port as the packet or signal is received by the last node in the recursive-path Additionally, when a set of edge-relationships has been calculated for each edge, the recursive-path also contains:

- a set of incoming edge-relationships at the incoming topology-mapping or layer-mapping with the exception of the first node in the recursive-path which does not have an incoming topology-mapping or a layer-mapping
- a set of outgoing edge-relationships at the outgoing topology-mapping or layer-mapping with the exception of the last node in the recursive-path which does not have an outgoing topology-mapping or a layer-mapping In order to create appropriate forwarding instructions we distinguish between a physical node in a Packet-Switching Network (PSN) and a physical node in a non-PSN. A physical node in a PSN, referred to as a physical packet-switching node, performs forwarding and statistical multiplexing of packets. A physical node in a non-PSN, referred to as physical non-packet-switching node, performs relaying and multiplexing of physical signals. An example, but not limited to, of a non-PSN is a Circuit-Switching Node (CSN). An example, but not limited to, of a non-PSN is a node in a wireless network performing multiplexing of physical signals. Forwarding entries are calculated for a physical packet-switching node, referred to as node in below method, within the recursive-path of a requested topology-path, level-path or topology-level-path by performing the below method comprising the following actions:

i. if the recursive-path does not contain an incoming topology-mapping or an incoming layer-mapping for said node, and said node is mapped to the source network of the recursive-path through one or more depth-mappings, creating for each outgoing topology-mapping and each outgoing layer-mapping of said node in said recursive-path a forwarding entry instructing said physical packet-switching node to create a packet with a packet overhead containing the switching-identifiers of the outgoing set of edge-relationships of said outgoing topology-mapping or said outgoing layer-mapping at depth, layer, level of said node and at depth, layer, level of all networks in the recursive-path mapped to said node through one or more depth-mappings, and send said packet out of an output port, said output port being a point-of-attachment between said node and said outgoing topology-mapping or said outgoing layer-mapping, ii. else if the recursive-path does not contain an outgoing topology-mapping or an outgoing layer-mapping for said node, and said node is mapped to the destination network of the recursive-path through one or more depth-mappings, creating for each incoming topology-mapping and each incoming layer-mapping of said node in said recursive-path a forwarding entry instructing said node to receive at an input port a packet in accordance with the switching-identifiers of the incoming set of edge-relationships of said incoming topology-mapping or said incoming layer-mapping at depth, layer, level of said node and at depth, layer, level of all networks in the recursive-path mapped to said node through one or more depth-mappings, said input port being a point-of-attachment of between said node and said incoming topology-mapping or said incoming layer-mapping, iii. else if the recursive-path does contain one incoming topology-mapping or one incoming layer-mapping for said node and the recursive-path does contain one or more outgoing topology-mappings or outgoing layer-mappings for said node, creating for each outgoing topology-mapping and each outgoing layer-mapping of said node in said recursive-path a forwarding entry instructing said node to receive an incoming packet at an input port, said input port being a point-of-attachment between said node and said incoming topology-mapping or said incoming layer-mapping specified by the recursive-path, said packet in accordance with the switching-identifiers of the incoming set of edge-relationships of said incoming topology-mapping or said incoming layer-mapping at depth, layer, level of said node and at depth, layer, level of all networks in the recursive-path mapped to said node through one or more depth-mappings and modify said packet in accordance with the switching-identifiers of the outgoing set of edge-relationships of said outgoing topology-mapping or said outgoing layer-mapping at depth, layer, level of said node and at depth, layer, level of all networks in the recursive-path mapped to said node through one or more depth-mappings, and forward said packet out of an output port, said output port being a point-of-attachment between said node and said outgoing topology-mapping or said outgoing layer-mapping.

We refer to a physical packet-switching node at action i) above as a sending host node. We refer to a physical packet-switching node at action ii) above as a receiving host node. We refer to a physical packet-switching node at action iii) above as a switching node. For a topology-mapping from a first network to a second network, we refer to said topology-mapping as an outgoing topology-mapping of the first network and we refer to said topology-mapping as an incoming topology-mapping of the second network. For a layer-mapping from a first network to a second network, we refer to said layer-mapping as an outgoing layer-mapping of the first network and we refer to said layer-mapping as an incoming layer-mapping of the second network.

Forwarding entries are calculated for a physical non-packet-switching node, referred to as node in below method, within the recursive-path of a requested topology-path, level-path or topology-level-path by performing the below method comprising the following actions:

i. if the recursive-path does not contain an incoming topology-mapping or an incoming layer-mapping for said node, and said node is mapped to the source network of the recursive-path through one or more depth-mappings, creating for each outgoing topology-mapping and each outgoing layer-mapping of said node in said recursive-path an instruction instructing said node to create a signal in accordance with the switching-identifiers of the outgoing set of edge-relationships of said outgoing topology-mapping or said outgoing layer-mapping at depth, layer, level of said node and at depth, layer, level of all networks in the recursive-path mapped to said node through one or more depth-mappings, and send said signal out of an output port, said output port being a point-of-attachment between said node and said outgoing topology-mapping or said outgoing layer-mapping, ii. else if the recursive-path does not contain an outgoing topology-mapping or an outgoing layer-mapping for said node, and said node is mapped to the destination network of the recursive-path through one or more depth-mappings, creating for each incoming topology-mapping and each incoming layer-mapping of said node in said recursive-path an instruction instructing said node to receive at an input port a signal in accordance with the switching-identifiers of the incoming set of edge-relationships of said incoming topology-mapping or said incoming layer-mapping at depth, layer, level of said node and at depth, layer, level of all networks in the recursive-path mapped to said node through one or more depth-mappings, said input port being a point-of-attachment of between said node and said incoming topology-mapping or said incoming layer-mapping, iii. else if the recursive-path does contain one incoming topology-mapping or one incoming layer-mapping for said node and the recursive-path does contain one or more outgoing topology-mappings or outgoing layer-mappings for said node, creating for each outgoing topology-mapping and each outgoing layer-mapping of said node in said recursive-path an instruction instructing said node to receive an incoming signal at an input port, said input port being a point-of-attachment between said node and said incoming topology-mapping or said incoming layer-mapping specified by the recursive-path, said signal in accordance with the switching-identifiers of the incoming set of edge-relationships of said incoming topology-mapping or said incoming layer-mapping at depth, layer, level of said node and at depth, layer, level of all networks in the recursive-path mapped to said node through one or more depth-mappings and modify said signal in accordance with the switching-identifiers of the outgoing set of edge-relationships of said outgoing topology-mapping or said outgoing layer-mapping at depth, layer, level of said node and at depth, layer, level of all networks in the recursive-path mapped to said node through one or more depth-mappings, and forward said signal out of an output port, said output port being a point-of-attachment between said node and said outgoing topology-mapping or said outgoing layer-mapping.

Reference is made to forwarding entries also in the case of a non-packet-switching network as the SDN Compiler provides a uniform approach to create instructions for both packet-switching nodes and non-packet-switching nodes. A forwarding entry in case of a non-packet-switching network is an instruction specifying how an incoming signal at an input port should be relayed to an output port after optional modification of said incoming signal. As an example but not limited to, in case of a WDM ROADM, the SDN Compiler creates an instruction specifying how an incoming wavelength at an input port should be relayed, also referred to as cross-connected, to an output port after optional modification of said incoming wavelength, such as for example changing the frequency of the incoming wavelength. Note that in case of action iii) and more than one output port, the incoming signal is duplicated and send out of more than one output ports. Note that at action iii) an incoming signal can be modified according to the switching-identifiers of the outgoing set of edge-relationships of said outgoing topology-mapping or said outgoing layer-mapping at depth d, layer n, level h of said physical non-packet-switching node and at depth, layer, level of all networks in the recursive-path mapped to said physical packet-switching node through one or more depth-mappings. In step i) and step iii) of the method to create forwarding entries for a physical non-packet-switching node described above, in case of two or more outgoing topology-mappings or outgoing layer-mappings, an instruction is created for each outgoing topology-mapping or outgoing layer-mapping. As will be understood by a person skilled in the art, alternatively a single instruction can be created specifying output port and switching-identifiers of two or more outgoing topology-mappings or outgoing layer-mappings. The above method to create forwarding entries for physical device comprising of a set-of-nodes described above for a packet-switching network can also be applied to a non-packet-switching network.

FIG. 52G shows for each physical node in the recursive-path calculated from the requested topology-path named L97 an input port, an output port, relevant incoming set of edge-relationships and relevant outgoing set of edge-relationships. Also the equipment is shown for each physical node. For a node, the relevant incoming set of edge-relationships are the set of edge-relationships of an incoming topology-mapping or an incoming layer-mapping at depth, layer, level of said node and at depth, layer, level of all networks in the recursive-path mapped to said node through one or more depth-mappings. For a node, the relevant outgoing set of edge-relationships are the set of edge-relationships of an outgoing topology-mapping or an outgoing layer-mapping at depth, layer, level of said node and at depth, layer, level of all networks in the recursive-path mapped to said node through one or more depth-mappings. As an example, but not limited to, for physical node EN (d=0, n=0, h=0), we consider switching-identifiers at (d=0, n=0, h=0) in the outgoing set of edge-relationships shown in FIG. 52E which is the switching-identifier of topology-mapping named L71 with value "source p618, destination p620". As an example, but not limited to, for physical node EU (d=0, n=1, h=0), which is mapped to logical node VU at (d=1, n=1, h=0) we consider switching-identifiers at (d=0, n=1, h=0) and at (d=1, n=1, h=0) in the outgoing set of edge-relationships shown in FIG. 52E which is the switching-identifier of topology-path named L89 with value "source VU, destination VW". As only a subset of the set of switching-identifiers is used, not all nested edge-relationships have to be calculated. For clarity all nested edge-relationships have been shown in FIG. 52E. We apply the method described above for creating forwarding entries for a physical packet-switching to physical node EX, EU, EN, EP, EV, EQ, ER, ES, ET, EW and EY. As an example, this results in a forwarding instruction for node EX to create a packet with packet overhead "SRC VX, DST VY" and send said packet out of output port p642. As an example, this results in a forwarding instruction for node EP to receive an incoming packet at input port p620 with incoming packet overhead "SRC p618, DST p620" remove said overhead and forward said packet out of port p635.

Above forwarding entries, are send to the physical nodes in the recursive-path, either directly or indirectly, as an example but not limited to, through an SDN Controller.

In step i) and step iii) of the method to create forwarding entries for a physical packet-switching node described above, in case of two or more outgoing topology-mappings or outgoing layer-mappings, a forwarding entry is created for each outgoing topology-mapping or outgoing layer-mapping. As will be understood by a person skilled in the art, alternatively a single forwarding entry can be created specifying output port and switching-identifiers of two or more outgoing topology-mappings or outgoing layer-mappings. In FIG. 52G forwarding instructions have been created for each physical node, which allows the user of the SDN Compiler control over subcomponents of a physical system. In case a single forwarding entry is to be created for a physical equipment comprising of two or more physical nodes, we combine a set of physical nodes a physical equipment comprises of and refer to said set of physical nodes as set-of-nodes. As an example, but not limited to, physical equipment named first computing equipment comprises of physical nodes EN, EU, EX. We combine the set of physical nodes EN, EU, EX said first computing equipment comprises of to a first set-of-nodes. As an example, but not limited to, physical equipment named first packet forwarding system comprises of physical nodes EP, EQ, EV. We combine the set of physical nodes EP, EQ, EV said first packet forwarding system comprises of to a second set-of-nodes. As an example, but not limited to, physical equipment named first virtual machine comprises of physical nodes ET, EW, EY. We combine the set of physical nodes ET, EW, EY said first virtual machine comprises of to a third set-of-nodes. A physical input port, a physical output port, an incoming set of edge-relationships, switching-identifiers of said incoming set of edge-relationships, an outgoing set of edge-relationships and switching-identifiers of said outgoing set of edge-relationships are calculated for a set-of-nodes according to the following method:

- Physical input port of the set-of-nodes being the input port of an incoming topology-mapping or an incoming layer-mapping of the first node in the recursive-path being an element of the set-of-nodes
- Physical output port of the set-of-nodes being the physical output port of an outgoing topology-mapping or an outgoing layer-mapping of the last node in the recursive-path being an element of the set-of-nodes
- Incoming set of edge-relationships of the set-of-nodes being the set of edge-relationships of an incoming topology-mapping or an incoming layer-mapping of the first node in the recursive-path being an element of the set-of-nodes
- Switching-identifier of said incoming set of edge-relationships being the switching-identifier at depth, layer, level of any node in the set-of-nodes in the recursive-path and at depth, layer, level of all networks in the recursive-path mapped to any node in the set-of-nodes through one or more depth-mappings
- Outgoing set of edge-relationships of the set-of-nodes being the set of edge-relationships of an outgoing topology-mapping or an outgoing layer-mapping of the last node in the recursive-path being an element of the set-of-nodes
- Switching-identifier of said outgoing set of edge-relationships being the switching-identifier at depth, layer, level of any node in the set-of-nodes in the recursive-path and at depth, layer, level of all networks in the recursive-path mapped to any node in the set-of-nodes through one or more depth-mappings As an example, but not limited to, applying the above method to the first set-of-nodes comprising of physical nodes EN, EU, EX as described above results in:

- Physical input port "NONE", as the first (in sequence) node in the recursive-path being an element of the set-of-nodes, being node EX, has no incoming topology-mapping or incoming layer-mapping
- Physical output port "p618", as the last node in the recursive-path being an element of the set-of-nodes, being node EN, has an outgoing topology-mapping with physical output port, being a PoA, of p618.
- Incoming set of edge-relationships of the set-of-nodes "NONE, as the first (in sequence) node in the recursive-path being an element of the set-of-nodes, being node EX, has no incoming topology-mapping or incoming layer-mapping
- Switching-identifier of said incoming set of edge-relationships "NONE, as the incoming set of edge-relationships of the set-of-nodes is "NONE"-Outgoing set of edge-relationships of the set-of-nodes "L71/L79/L87/L89/L96/L97" as the last node in the recursive-path being an element of the set-of-nodes, being node EN has an outgoing topology-mapping with outgoing set of edge-relationships "L71/L79/L87/L89/L96/L97
- Switching-identifier of said outgoing set of edge-relationships "L71/L89/L97" being the switching-identifier of the first set-of-nodes at depth d=0, layer n=0, level h=0 of node EN, resulting in switching-identifier L71, at depth d=0, layer n=1, level h=0 of node EU, not resulting in any switching-identifier, at depth d=0, layer n=2, level h=0 of node EX, not resulting in any switching-identifier, at depth d=1, layer n=1, level h=0 of node VU, node VU being mapped to node EU through one depth-mapping, resulting in switching-identifier L89 and at depth d=1, layer n=2, level h=0 of node VX, node VX being mapped to node EX through one depth-mapping, resulting in switching-identifier L97. The resulting forwarding instruction for the first computing equipment, calculated from the first set-of-nodes is shown in FIG. 52H.

Note that the nodes within the set-of-nodes have to be on consecutive layers and have to appear as consecutive physical nodes in the recursive-path. A consequence of the above method, being an abstraction, is the disappearance of physical layer-mappings and topology-mappings, which are internal within a device, within the forwarding instructions. FIG. 52H shows for each physical equipment in the recursive-path calculated from the requested topology-path named L97 an input port, an output port, relevant incoming set of edge-relationships and relevant outgoing set of edge-relationships. As an example, but not limited to, the first computing equipment is instructed to create a packet with overhead "SRC p618, DST p620/SRC VU, DST VW/TCP/

SRC VX, DST VY". Note that in FIG. 81I the second computing equipment contains physical node ER, being a physical NIC, physical node ES, being a virtual switch and contains said first virtual machine. As a virtual switch typically resides in a hypervisor a forwarding instruction has been created for physical node ER, being the physical NIC of the second computing equipment and a separate forwarding instruction has been created for physical node ES being a virtual switch, typically residing in a hypervisor (not shown). As an example, but not limited to, Internet Protocol version 4 (IPv4) addresses are assigned to the example network of FIG. 52B. As will be understood by a person skilled in the art logical nodes and logical networks could be named by logical names creating a logical namespace as described above. In order to allow for the SDN Compiler method to operate in current network environments an example, but not limited to, of IPv4 addresses assigned to the example network of FIG. 52B is given. As an IP address denotes a subnet Point-of-Attachment and comprises of a subnet-part and a PoA-part, we assign a subnet-identifier to the topology-mapping named L87 with as an example but not limited to value "111.111.111/24" and we assign a subnet-identifier to the topology-mapping named L88 with as an example but not limited to value "111.111.112/24" as shown in FIGS. 521 and 52J. We assign a PoA named "10" to the interface between the logical node VU and the topology-mapping named L87, assign a PoA named "11" to the interface between the logical node VV and the topology-mapping named L87, assign a PoA named "12" to the interface between the logical node VV and the topology-mapping named L88, assign a PoA named "13" to the interface between the logical node VW and the topology-mapping named L88, as illustrated in FIG. 52I, resulting in the following IPv4 addresses:

- 111.111.111.10, denoting the PoA named 10 of node VU with the topology-mapping named L87
- 111.111.111.11, denoting the PoA named 11 of node VV with the topology-mapping named L87
- 111.111.112.12, denoting the PoA named 12 of node VV with the topology-mapping named L88
- 111.111.112.13, denoting the PoA named 13 of node VW with the topology-mapping named L88

The switching-identifier of the topology-path named L89 using IPv4 addressing is determined as follows. Note that topology-path L89 comprises of a concatenation of topology-mapping L87 and topology-mapping L88 as shown in FIG. 52D. The source address of a switching-identifier of a topology-path using IPv4 addresses comprises of the subnet-identifier of the first (in sequence) topology-mapping of said topology-path, being the subnet part of the IPv4 address, combined with the PoA denoting the interface between the source node and said first topology-mapping. As an example, but not limited to, the source address of the switching-identifier of the topology-path L89 using IPv4 addresses comprises of the subnet-identifier of the first (in sequence) topology-mapping named L87 with subnet-identifier 111.111.111/24 of said topology-path L89, being the subnet part of the IPv4 address, combined with the PoA denoting the interface between the source node VU and said first topology-mapping named L87, being the PoA named 10. Resulting in the source address of the switching-identifier of the topology-path L89 using IPv4 addresses "111.111.111.10". The destination address of a switching-identifier of a topology-path using IPv4 addresses comprises of the subnet-identifier of the last topology-mapping of said topology-path, being the subnet part of the IPv4 address, combined with the PoA denoting the interface between the destination node and said last topology-mapping. As an example, but not limited to, the destination address of the switching-identifier of the topology-path L89 using IPv4 addresses comprises of the subnet-identifier of the last topology-mapping named L88 with subnet-identifier 111.111.112/24 of said topology-path L89, being the subnet part of the IPv4 address, combined with the PoA denoting the interface between the destination node VW and said last topology-mapping named L88, being the PoA named 13. Resulting in the destination address of the switching-identifier of the topology-path L89 using IPv4 addresses "111.111.112.13". Therefore, the switching-identifier of the topology-path named L89 changes from "SOURCE VU, DESTINATION VW" TO "SOURCE 111.111.111.10, DESTINATION 111.111.112.13". As will be understood by a person skilled in the art instead of Internet Protocol version 6 (IPv6) addresses can be used using the same approach. As shown in FIG. 52L, instead of using transport-identifier TCP, transport-identifier "PROTOCOL=6" is used, denoting the TCP protocol. In IP-based networks applications are typically denoted by an identifier known as a "port". The combination of the transport-layer identifier such as for example but not limited to TCP or UDP and said port number identifies a particular application type. Widely used applications are identified by so-called "well-known ports". An example of a well-known port is port 80, well-known port 80 in combination with transport-layer identifier TCP denotes the Hypertext Transfer Protocol (HTTP). We assign a port name to nodes at the application-layer. As an example, but not limited to, said port name could be stored as an attribute of a node. As an example, but not limited to, we assign the port name "80" to node VX and port name "80" to node VY and use the name of the port in the switching-identifier of topology-path L97 instead of the name of the node, resulting in the value "SOURCE PORT=80, DESTINATION PORT=80" to the switching-identifier named L97 as shown in FIG. 52K. As an example, but not limited to, an IEEE 802 Ethernet MAC address is used for PoAs p618, p620, p627, p628, p629, p630, p631, p632. Now, the example network of FIG. 52B can be implemented using identifiers used in current networks. We now consider physical nodes EU, EV, EW to support label-switching. An example, but not limited to, of label-switching is Multi-Protocol Label Switching (MPLS). As a first example of label-switching, we assign switching-identifier "LABEL-1" to topology-path L89, instead of the first switching-identifier "source VU, destination VW" and assign no second switching-identifier. As a result, node EU has no relevant incoming set of edge-relationships, node EU has a relevant outgoing set of edge-relationships containing L89 with value "LABEL-1", node EV has a relevant incoming set of edge-relationships containing L89 with value "LABEL-1" and node EV has a relevant outgoing set of edge-relationships containing L89 with value "LABEL-1", node EW has a relevant incoming set of edge-relationships containing L89 with value "LABEL-1", node EW has no relevant outgoing set of edge-relationships. Therefore, node EU is instructed to add to an incoming packet overhead "LABEL-1", also referred to as pushing said label, node EV is instructed to forward a packet based on "LABEL-1" in the incoming packet and retain "LABEL-1" as label value and node EW is instructed to receive an incoming packet with packet overhead "LABEL-1" and remove "LABEL-1", also referred to as popping said label. As will be understood by a person skilled in the art, label pushing and label popping can be performed in switching nodes rather than host nodes as in this example. As a second example of label-switching, we assign switching-identifier "LABEL-2" to topology-mapping L87 and we assign switching-identifier "LABEL-3" to topology-mapping L88. We assign no switching-identifier to topology-path L89. As a result, node EU has no relevant incoming set of edge-relationships, node EU has a relevant outgoing set of edge-relationships containing L87 with value "LABEL-2", node EV has a relevant incoming set of edge-relationships containing L87 with value "LABEL-2" and node EV has a relevant outgoing set of edge-relationships containing L88 with value "LABEL-3", node EW has a relevant incoming set of edge-relationships containing L88 with value "LABEL-3", node EW has no relevant outgoing set of edge-relationships. Therefore, node EU is instructed to add to an incoming packet an overhead "LABEL-2", also referred to as pushing said label, node EV is instructed to forward a packet based on "LABEL-2" in the incoming packet and change the packet overhead to "LABEL-3", also referred to as swapping said label, and node EW is instructed to receive an incoming packet with packet overhead "LABEL-3" and remove "LABEL-3", also referred to as popping said label. As illustrated by the first example above, but not limited to, the method supports label-switching by assigning a switching-identifier being a logical label to a topology-path from a first logical network to a second logical network. As illustrated by the second example above, but not limited to, the method supports label-switching by assigning a switching-identifier being a logical label to one or more topology-mappings from a first logical network to a second logical network. The example shown in FIG. 52A comprises of a first computing equipment, a first packet forwarding system and a second computing equipment. As will be understood by a person skilled in the art instead of a computing equipment a storage equipment could have been used as a host node. As an example, but not limited to, storage equipment supporting Fibre Channel over Ethernet (FCoE) or storage equipment supporting Fibre Channel over IP (FCIP) could be supported by the method. Therefore, the SDN Compiler can provide orchestration for compute, storage and networking resources. Note that in the example of FIG. 52B no logical nodes were created at (d=1, n=0, h=0). Alternatively, logical nodes could have been created at (d=1, n=0, h=0) creating a logical datalink layer. Virtual Local Area Networks (VLANs) can be created by creating topology-mappings between nodes at (d=1, n=0, h=0). The example shown in FIG. 52A comprises of a first computing equipment, a first packet forwarding system and a second computing equipment. As will be understood by a person skilled in the art, a host node does not necessarily have to be under the control of an SDN Compiler. The method allows for creating a network between applications as described above in the example set of networks of FIG. 38F. We now consider another example of networking between applications by adding an application process named physical node EZ to the first packet forwarding system of FIG. 52A. FIG. 52M shows physical nodes EN, EU, EX, ER, ES, ET, EW, EY, EP, EV, EQ and additionally to FIG. 52B physical node EZ representing said application process. FIG. 52M shows logical nodes VU, VX, VW, VY, VV and additionally to FIG. 52B logical node VZ. FIG. 52M shows a layer-mapping named L171 from physical node EV to physical node EZ, a PoA p645 interconnecting physical node EV and layer-mapping L171 and a PoA 646 interconnecting physical node EZ and layer-mapping L171. FIG. 52M also shows a layer-mapping named L172 from physical node EZ to physical node EV, a PoA p645 interconnecting physical node EV and layer-mapping L172 and a PoA 646 interconnecting physical node EZ and layer-mapping L172. FIG. 52M also shows a depth-mapping named L173 from physical node EZ to logical node VZ and a depth-mapping named L174 from logical node VZ to physical node EZ. FIG. 52M also shows a layer-mapping named L175 calculated using the second method to calculate a layer-mapping, comprising of a concatenation of depth-mapping L84, layer-mapping L171 and depth-mapping L173. FIG. 52M also shows a layer-mapping named L176 calculated using the first method to calculate a layer-mapping, comprising of a concatenation of depth-mapping L174, layer-mapping L172 and depth-mapping L83. The edges between brackets '[ ]' in FIG. 52M denote that multiple edges are related by an edge-relationship to a first edge. For example, but not limited to, the notation "L83/[L87, L176]" in FIG. 52M denotes that topology-mapping named L87 is related to depth-mapping L83 through edge-relationship L83/L87 and that layer-mapping named L176 is related to depth-mapping L83 through edge-relationship L83/L176. FIG. 52M also shows a topology-mapping named L177 calculated using the second method to calculate a topology-mapping, comprising of a concatenation of layer-mapping L94, topology-mapping L87 and layer-mapping L175. Note that the topology-mapping named L177 is a topology-mapping from logical node VX to logical node VZ at the application layer. FIG. 52M also shows a topology-mapping named L178 calculated using the second method to calculate a topology-mapping, comprising of a concatenation of layer-mapping L176, topology-mapping L88 and layer-mapping L95. Note that the topology-mapping named L178 is a topology-mapping from logical node VZ to logical node VY at the application layer. FIG. 52M also shows a topology-path named L179 comprising of a concatenation of topology-mapping L177 and topology-mapping L178. Note that the topology-path named L179 is a topology-path from logical node VX to logical node VY at the application layer. The method allows for the creation of a topology between nodes at the application layer by creating topology-mappings from a first node at the application layer to a second node at the application layer. In current networks applications are viewed as hosts or end-systems, resulting in a topology-path from a first application to a second application in a point-to-point relationship. The method allows for creating complex topologies at application layer. Other edges shown in FIG. 52M were shown in FIG. 52B as well. The topology-path named L89, the topology-mapping named L96 and the topology-path named L97 which were shown in FIG. 52B are not shown in FIG. 52M. Calculating the recursive-path of a requested topology-path named L179 as per the method described above results in a recursive-path containing: " . . . EV-(laymap p645: L171/L175/L177/L179:p646)->EZ-(depmap L173/L175/L177/L179)->VZ-(depmap L174/L176/L178/L179)->EZ-(laymap p646: L172/L176/L178/L179:p645)->EV-(depmap L83/L176/L178/L179)-> . . . " In other words, a packet enters physical application node EZ at port p646 and is forwarded out of port p646 by physical application node EZ, therefore traversing physical application node EZ. As a port denoting an application in a TCP/IP network is not a unique identifier, in a TCP/IP based network networking at the application layer could be implemented as an example but not limited to:

a combination of an IPv4 or IPv6 address, protocol number and port number could be used to denote an application and a physical application node could be instructed directly by the SDN Compiler.

the physical application node could be set to default behavior to forward a packet entering a physical application node at a first input port denoted by a PoA to an output port denoted by said PoA.

a particular application-layer port number could be used to denote that a packet entering a physical application node at a first input port denoted by a PoA should be forwarded to an output port denoted by said PoA Note that in some cases it is not strictly necessary to create switching-identifiers of the third type. As described above, and used prior to the description of switching-identifiers, the logical source address and the logical destination address can be used in the forwarding tables created. As an example, in case of a requested topology-path named L89, shown in FIG. 52B, the switching-identifier of topology-path named L89 results in a packet with "source VU, destination VW" which is identical to using the source address of logical node VU, being VU as no network has been named that VU is part of, and the destination address of logical node VW, being VW as no network has been named that VW is part of Note that it is not strictly necessary to create switching-identifiers of the second type for topology-mappings between physical nodes, as outgoing source PoA and destination PoA were determined above using a method without switching-identifiers. The method presented here provides a common approach however to all switching-identifiers and allows for a broader applicability. Note that the channel-identifier used in the description of FIG. 40B is an example of a first type of switching-identifier.

In the example of FIG. 52B a topology-path named L89 has been created from logical node VU to logical node VW. As shown in FIG. 52N, alternatively, as an example but not limited to, a topology-path named L102 could be created comprising of a concatenation of the topology-mapping named L79 and the topology-mapping named L80. Using the notation of FIG. 51C the topology-path named L102 is represented by "toppath L102=L79/L102+L80/L102". The creation of the topology-path named L102 does not require the creation of logical nodes VU, VV, VW, VX, VY and does not require the creation of depth-mappings named L81, L82, L83, L85, L86. Therefore, the creation of logical nodes VU, VV, VW, VX, VY and of depth-mappings named L81, L82, L83, L85, L86 can be omitted. The recursive-path of the requested topology-path named L102 can be calculated through recursion as described above. From the recursive-path of the requested topology-path named L102 forwarding entries can be created for physical nodes EN, EP, EQ, ER, ES, ET, EU, EV, EW as per the method to create forwarding entries for a packet-switching node. In order to forward on a logical name space, a logical name is assigned to physical resources. A logical name is assigned to a physical node and/or a physical topology-mapping and/or a physical PoA. As an example, but not limited to an IPv4 subnet could be assigned to the topology-mapping named L79. As an example, but not limited to an IPv4 address could be assigned to the PoA denoting the interface between node EU and the topology-mapping named L79. As an example, but not limited to an IPv4 address could be assigned to node EU. In case of an overall network in which no logical nodes and networks are created the following method can be applied:

Method of controlling an overall network by a compiler, the overall network comprising two or more physical nodes, the physical nodes being interconnected by physical links in accordance with a physical network layout, the method as performed by the compiler comprising the following actions:

a) Storing physical node names, each physical node name being an unique identifier of one physical node, storing physical topology-mappings, each physical topology-mapping being one physical link in one direction, said physical topology-mapping being based on a directed graph representation, and storing point-of-attachment names of said physical nodes, each of the point-of-attachment names of a physical node concerned being an unique identifier of a point-of-attachment between the certain physical node concerned and a physical link connecting the physical node concerned to another physical node, b) Storing logical names for said physical nodes and/or for said physical topology-mappings and/or for said point-of-attachment, c) Creating and storing a requested-topology-path being a concatenation of one or more physical topology-mappings, and storing one or more further edge-relationships, each further edge-relationship concerned being a relationship between one physical topology-mapping within the requested-topology-path and said requested-topology-path, d) Calculating through recursion and storing a recursive-path for said requested-topology-path, comprising physical nodes as indicated by said physical node names, physical topology-mappings, physical point-of-attachments as indicated by physical point-of-attachment names, said recursive-path being based on a directed graph representation, e) Creating forwarding table entries for physical nodes in said recursive-path from said recursive-path and/or from logical names for said physical nodes and/or from said physical topology-mappings and/or from said point-of-attachment, f) Sending said forwarding table entries, either directly or indirectly, to physical nodes in said recursive-path.

Physical resources in action b) above include physical nodes, physical topology-mappings and physical point-of-attachments. Alternatively action b) could be performed after action c) or after action d). As an example of action b), but not limited to, an IPv4 subnet 125.125.125/24 could be assigned to the topology-mapping named L79 and an IPv4 address 125.125.125.1 could be assigned to the PoA denoting the interface between node EU and the topology-mapping named L79. As an example, but not limited to an IPv4 subnet 125.125.126/24 could be assigned to the topology-mapping named L80 and an IPv4 address 125.125.126.3 could be assigned to the PoA denoting the interface between node EW and the topology-mapping named L80. The logical source address of the requested topology-path named L102 is 125.125.125.1 and the logical destination address of the requested topology-path named L102 is 125.125.126.3. In action d) the recursive-path of a requested topology-path is calculated through recursion. In action e) forwarding entries for physical nodes in said recursive-path are created from said recursive-path and from logical names of physical resources. Note that topology-mapping L79 and L80 are shown in FIG. 52D in the representation of FIG. 51C. For example but not limited to the recursive-path of the requested topology-path named L102 comprises of the layer-mapping named L75, the topology-mapping named L71, the layer-mapping named L76, the layer-mapping named L77, the topology-mapping named L72, the topology-mapping named L73, the topology-mapping named L74 and the layer-mapping named L78. The requested topology-path named L102 has logical source address 125.125.125.1 and logical destination address 125.125.126.3, used as logical source address and logical destination address in the forwarding entries resulting from the recursive-path of the requested topology-path named L102. Alternatively, a switching-identifier could be created for the topology-path named L102 with value "source 125.125.125.1, destination 125.125.126.3".

Optionally, after action a) or action b) above one or more physical topology-mappings can be created and stored, by performing the following action:

After action a) or after action b) above, creating and storing one or more first physical topology-mappings, each first physical topology-mapping being a directed graph representation from a first physical node to a second physical node, calculated as a physical topology-path from the first physical node to a second physical node, said physical topology-path being a concatenation of one or more second physical topology-mappings, As an example, but not limited to, a topology-mapping named L103 from physical node EU to physical node EW could be created comprising of the topology-path named L102 used in the above example. Using the notation of FIG. 51C the topology-mapping named L103 is represented by "topmap L103=L102/L103". This method allows for altering the topology of a physical network.

Optionally, edge-relationships can be stored, by performing the following actions:

storing for each of said first physical topology-mappings edge-relationships comprising one or more first edge-relationships each first edge-relationship being a relationship between one of said one or more first physical topology-mappings in said physical topology-path and said first physical topology-mapping or a first edge-relationships being a relationship between said physical topology-path and said first physical topology-mapping and one or more second edge-relationships each second edge-relationship being a relationship between one of said one or more second physical topology-mappings and said physical topology-path at action c) storing one or more further edge-relationships, each further edge-relationship concerned being a relationship between one logical topology-mapping within the requested-topology-path and said requested-topology-path, Optionally, nested edge-relationships can be calculated and stored resulting in a set of edge-relationships, by performing the following actions:

at action d) calculating and storing nested edge-relationships,

In the example of FIG. 52B a topology-path named L97 has been created from logical node VX to logical node VY. As shown in FIG. 52N, alternatively, as an example but not limited to, a topology-mapping from physical node EX to physical node EY named L104 could be created comprising of a concatenation of the layer-mapping named L90, the topology-path named L102 and the layer-mapping named L91 using the second method to create topology-mappings described above. Using the notation of FIG. 51C the topology-mapping named L104 is represented by "topmap L104=L90/L104+L102/L104+L91/L104". As an example but not limited to, a requested topology-path from physical node EX to physical node EY named L105 could be created comprising of the topology-mapping named L104. Using the notation of FIG. 51C the topology-path named L105 is represented by "toppath L105=L104/L105". In order to forward on a logical name space, a logical name is assigned to physical resources. As physical node EX and physical node EY are application processes as an example, but not limited to, a logical port number "port80" is assigned to physical node EX and a logical port number "port80" is assigned to physical node EY. The recursive-path of the requested topology-path named L105 can be calculated through recursion as described above. The logical address of physical node EX being 125.125.125.1.port80 and the logical address of physical node EY being 125.125.126.3.port80 denote the logical source address and the logical destination address respectively of the requested topology-path named L105. Note that in an overall network in which no logical nodes and networks are created, to which above methods apply, one or more topology-mappings can be created using the second method to create topology-mappings, a hierarchical network can be created, one or more topology-mappings can be created using the third method to create topology-mappings, forwarding entries can be created using the method to calculate forwarding entries described above, edges can be recalculated, a service can be requested in accordance with a set of requirements. As an example, but not limited to, the above methods can be implemented using a graph database.

We now include the naming of edges in a set of hierarchical networks. FIG. 53A shows networks NAAA, NAA, NCC, NEE, NA, NB, NC, ND, NE, NF, QA, QB, QC, QD, QE, QF and the topology-mappings at (d=0, n=0, h=0), the topology-mappings at (d=1, n=0, h=0) and the depth-mappings, being a representation using directed edges of the network shown in FIGS. 42A and 42B. Note that each a level-mapping of FIG. 42B being a relationship between a first network at level h and a second network at level h+1, such as but not limited to, the level-mapping between network NAA and network NAAA, is represented by a pair of level-mappings being directed edges, such as but not limited to, a level-mapping from network NAA to network NAAA and a level-mapping from network NAAA to network NAA. The level-mapping from network NAA to network NAAA is named J22 and is shown in FIG. 53A. The level-mapping from network NAAA to network NAA is named J47 and is shown in FIG. 53A. FIG. 53E shows physical topology-mappings, depth-mappings and level-mappings shown in FIG. 53A, per the notation of FIG. 51A. We create the topology-mappings named J24, J25, J26, J27 and J28 using the first method for calculating topology-mappings described above as shown in FIGS. 53A and 53F. As shown in FIGS. 53A and 53F we calculate and store a topology-mapping named J30 from network NAA to network NCC as a concatenation of a level-mapping named J17 from network NAA to network NB, a topology-path named J29 from network NB network NC and a level-mapping named J18 from network NC to network NCC, the topology-path named J29 from network NB to network NC comprising of a single topology-mapping named J25 from network NB to network NC, using the third method for calculating topology-mappings described above. We calculate and store a topology-mapping named J31 from network NCC to network NEE as a concatenation of a level-mapping named J19 from network NCC to network ND, a topology-mapping named J27 from network ND network NE and a level-mapping named J20 from network NE to network NEE, using the third method for calculating topology-mappings described above. By creating the topology-mappings named J30 and J31 we can specify forwarding behavior between networks-of-nodes NAA, NCC and NEE. As will be understood by a person skilled in the art, the creation of topology-mappings can be repeated at arbitrary number of hierarchy levels. We show an example of calculating a path from network NA to network NB. Instead of creating forwarding entries for topology-paths between nodes, we intend to create forwarding entries between networks at h>h_min (d, n), in other words networks that are not nodes, which can be used to forward packets with a source address and/or destination address at h=h_min(d, n) using the hierarchy in the source and/or destination address. As an example, we intend to create forwarding entries for a level-path from network NA to network NEE and forwarding entries for a level-path from network NAA to network NF, which can be used for forwarding from network NA to network NE, from network NA to network NF, from network NA to network NF and from network NB to network NF. As will be understood by a person skilled in the art this results in a significant number of forwarding entries for typical networks. Also, as the number of forwarding entries is significantly reduces, these forwarding entries could be created pro-actively. In other words, the method allows for proactive creation of forwarding entries while limiting the number of forwarding entries to be created. As an example, but not limited to, we create forwarding entries for a level-path from network NAA to network NEE, which can be used to forward packets from a first node within network NAA, such as node NA or node NB, to a second node within network NEE, such as node NE or node NF. As shown in FIG. 53B we calculate and store a requested level-path named J32 from network NAA to network NEE as a concatenation of a level-mapping named J22 from network NAA to network NAAA and a level-mapping named J23 from network NAAA to network NEE. FIG. 53G shows the level-path named J32 in the representation of FIG. 51C. The calculation of the recursive-path of the requested level-path named J32 is shown in FIG. 53H. Step 1 is the start of the calculation showing level-path named J32 as per FIG. 53G. In step 2 we replace the level-path comprising of the level-mapping J22 and level-mapping J23 by a topology-path comprising of the topology-mapping named J30 and the topology-mapping named J31. As shown in FIG. 53B the edge-mapping J30/J32 is now added to the topology-mapping named J30 as J32 is the first, reading from left to right, common edge in the set of edge-relationships of the level-mapping J22, being J22/J32, and the level-mapping named J23, being J23/J32. The level-path J32 now uses the topology-mapping named J30 and the topology-mapping named J31 instead of the level-mapping named J22 and the level-mapping named J23. We are using a method, referred to as the first method to change a level-path to a topology-path, comprising the following actions:

Replacing a level-path from a first network at (d, n, h) to a second network at (d, n, h) by a topology-path from the first network to the second network and storing such topology-path.

In the example shown in FIG. 53B and the method presented the level h of the first network is identical to the second network. This method was used in the description of FIG. 42E above as well.

To allow for a first network at (d, n, h) and a second network at (d, n, h−z), we use the following method, referred to as the second method to change a level-path to a topology-path, comprising the following actions:

Replacing a level-path from a first network at (d, n, h) to a second network at (d, n, h−z) by a concatenation of zero or more level-mappings with decreasing level from the first network to a third network at (d, n, h−z) and storing such level-mappings, a topology-path from the third network to the second network and storing such topology-path, with z equal to or larger than zero and smaller than or equal to h−h_min, h_min being the lowest level at particular depth d and particular layer n.

Note that in case z=0 in the second method to change a level-path to a topology-path, the method is identical to the first method to change a level-path to a topology-path.

To allow for a first network at (d, n, h) and a second network at (d, n, h+z), we use the following method, referred to as the third method to change a level-path to a topology-path comprising the following actions:

Replacing a level-path from a first network at (d, n, h) to a second network at (d, n, h+z) by a concatenation of a topology-path from the first network to a third network at (d, n, h) and storing such topology-path and zero or more level-mappings with increasing level from the third network to the second network and storing such level-mappings, with z equal to or larger than zero and smaller than or equal to h_max-h−1, h_max being the highest level at particular depth d and particular layer n.

Note that in case z=0 in the third method to change a level-path to a topology-path, the method is identical to the first method to change a level-path to a topology-path.

In the example in FIG. 53B an explicitly named topology-path from network NAA to network NCC has not been created. Alternatively, an explicitly named topology-path from network NAA to network NCC could have been created and stored.

In steps 3 and 4 of FIG. 53H the calculation of the recursive-path is continued through recursion. In the notation used "(A+B)/C" is equal to "A/C+B/C", in which A, B, C are edges. In step 5 of FIG. 53H brackets "( )" are removed. In step 6 of FIG. 53H the first method to change a level-path to a topology-path is applied to the level-path from network NC to network ND consisting of a level-mapping named J18 from network NC to network NCC and a level-mapping named J19 from network NCC to network ND and replace the level-path from network NC to network ND by a topology-path from network NC to network ND consisting of the topology-mapping named J26 from network NC to network ND. As shown in FIG. 53B the edge-mapping J26/J32 is now added to the topology-mapping named J26, since J32 is the first, reading from left to right, common edge in the set of edge-relationships of the level-mapping named J18 from network NC to network NCC, being J18/J30/J32, and the level-mapping named J19 from network NCC to network ND, being J19/J31/J32, as shown in FIG. 53B. The first method to change a level-path to a topology-path was used in the description of FIG. 42G above as well. The storing of an edge-relationship described above is performed by a method comprising the following actions:

When performing the first, second or third method to change a level-path to a topology-path, storing an edge-relationship between the zero or more level-mappings and the name of the common level-path in the set of edge-relationships of the level-mappings the level-path from the first network to the second network comprises of and storing an edge-relationship between said topology-path or one or more topology-mappings said topology-path comprises of and the name of the common level-path in the set of edge-relationships of the level-mappings the level-path from the first network to the second network comprises of As an example, but not limited to, when performing the first method to change a level-path to a topology-path, storing an edge-relationship J26/J32 between one topology-mapping named J26 said topology-path comprises of and the name of the common level-path J32 in the set of edge-relationships of the level-mappings J18 and J19 the level-path from the first network NC to the second network ND comprises of.

In steps 7 and 8 the recursive-path is calculated through recursion, resulting in the recursive-path shown in step 9. From the recursive-path we determine the input port and set of incoming edge-relationships of a topology-mapping or layer-mapping, output port and set of outgoing edge-relationships of a topology-mapping or layer-mapping for the level-path named J32 for physical nodes QC and QD, as shown in FIG. 53L, from which forwarding entries for nodes QC and QD can be determined. Please refer to FIG. 53K for the value of the switching-identifiers J32, J33, J34 in FIG. 53L. Note that no forwarding entry is created for node QB as the source network of the recursive-path of the level-path named J32, being network NAA, is not mapped to node QB through one or more depth-mappings and that no forwarding entry is created for node QE as the destination network of the recursive-path of the level-path named J32, being network NEE, is not mapped to node QE through one or more depth-mappings. The forwarding entries resulting from the recursive-path for physical nodes QC and QD are shown in FIG. 42K. The logical source address NAAA.NAA is the address of logical source network NAA, the logical destination address NAAA.NEE is the address of logical destination network NEE of the requested level-path named J32. Optionally, a switching-identifier with value "source NAAA.NAA, destination NAAA.NEE" could be assigned to the level-path named J32 and the source network and destination network can be determined from said switching-identifier as described above. The logical source address of source network NAA is NAAA.NAA, as network NAA at (d, n, h+1) is connected to network NAAA at (d, n, h+2) through a level-mapping. In FIG. 42K we use the notation NAAA.NAA.* to denote any node within network NAA by the asterisk (*) sign which is used as a wildcard symbol. The logical destination address of destination network NEE is NAAA.NEE, as network NEE at (d, n, h+1) is connected to network NAAA at (d, n, h+2) through a level-mapping. In FIG. 42K we use the notation NAAA.NEE.* to denote any node within network NEE by the asterisk (*) sign which is used as a wildcard symbol. The input port and output port are PoAs from the recursive-path as described above. The switching-identifiers assigned to topology-mappings named J3 and J4, as shown in FIG. 53K, can be used to determine the "source PoA in outgoing packet" and "destination PoA in outgoing packet", as described above. Alternatively, the "source PoA in outgoing packet" and "destination PoA in outgoing packet" are determined by removing the depth-mappings from the recursive-path, resulting in a calculated-path, and performing the following actions as described above:

i. For each packet-switching node at layer n and the next node in the calculated path being a circuit-switching node at layer n−1, including within the forwarding instructions calculated at i):
   - a Source Media Access Control (MAC): a point-of-attachment (PoA) of a layer-mapping to a next node in the calculated path,
   - a Destination Media Access Control (MAC): a input port point-of-attachment (PoA) of the next node at layer n in the calculated path, ii. For each packet-switching node at n=n_min and the next node in the calculated path being a node at layer n=n_min, including within the forwarding instructions calculated at i):
   - a Source Media Access Control (MAC): a point-of-attachment (PoA) of a topology-mapping to a next node in the calculated path,
   - a Destination Media Access Control (MAC): an input port point-of-attachment (PoA) of the next node at layer n in the calculated path, in which n_min(d) at d is the lowest layer at a particular depth d.

As shown in FIG. 53C we calculate and store a requested level-path named J33 from network NA to network NEE as a concatenation of the level-mapping named J16 from network NA to network NAA and the level-path named J32 from network NAA to network NEE. FIG. 53I shows the level-path named J32 and the requested level-path named J33 in the representation of FIG. 51C. The calculation of the recursive-path of the requested level-path named J33 is shown in FIG. 53J. Step 1 is the start of the calculation showing level-path named J33 as per FIG. 53I. In step 2 we replace J32 in step 1 of FIG. 53J by the level-path J32 as defined in FIG. 53I. In step 3 we replace the level-path comprising of the level-mapping J22 and level-mapping J23 by a topology-path comprising of the topology-mapping named J30 and the topology-mapping named J31 as described above. In step 4 the calculation of the recursive-path is continued through recursion. In step 5 a new method is introduced. As the level-path named J32 is a requested level-path, forwarding entries have been created already for the level-path named J32 as described above. Therefore, the calculation of the recursive-path of the level-path J33, which uses the level-path named J32, as per the edge-relationship J32/J33, can be shortened, reducing calculation time. If the level of the source network of a first requested level-path is larger than the level of the source network of a second requested level-path and the destination network of the first requested level-path is equal to the destination network of the second requested level-path and the first requested level-path and the second requested level-path are related per edge-relationship "first requested level-path/second requested level-path", do not perform, in other words skip, the calculation of the recursive-path of the second requested level-path following a level-mapping decreasing in level containing said edge-relationship "first requested level-path/second requested level-path" concatenated with a topology-mapping containing said edge-relationship "first requested level-path/second requested level-path". A level-mapping decreasing in level is a level-mapping from a first network at (d, n, h1) to a second network at (d, n, h2) with h1>h2. As an example, but not limited to, as shown in FIG. 53J if the level of the source network NAA of a first requested level-path named J32 is larger than the level of the source network NA of a second requested level-path named J33 and the destination network NEE of the first requested level-path named J32 is equal to the destination network NEE of the second requested level-path named J33 and the first requested level-path named J32 and the second requested level-path named J33 are related per edge-relationship "J32/J33", do not perform, in other words skip, the calculation of the recursive-path of the second requested level-path named J33 following a level-mapping named J17 decreasing in level containing said edge-relationship "J32/J33" concatenated with a topology-mapping named J25 containing said edge-relationship "J32/J33". Steps 6 through 10 of FIG. 53J are calculated as described above, resulting in the recursive-path shown in step 10. From the recursive-path we determine the input port and set of incoming edge-relationships of a topology-mapping or layer-mapping, output port and set of outgoing edge-relationships of a topology-mapping or layer-mapping for the level-path named J33 for physical nodes QA and QB, as shown in FIG. 53L, from which forwarding entries for nodes QA and QB can be determined. Note that no forwarding entry is created for node QC as the destination network of the recursive-path of the level-path named J33, being network NEE, is not mapped to node QC through one or more depth-mappings. The forwarding entries resulting from the recursive-path for physical nodes QA and QB are shown in FIG. 42K. The logical source address NAAA.NAA.NA is the address of logical source network NA, the logical destination address NAAA.NEE is the address of logical destination network NEE of the requested level-path named J33. Optionally, a switching-identifier with value "source NAAA.NAA.NA, destination NAAA.NEE" could be assigned to the level-path named J33. In case of nested level-paths having an edge-relationship "first level-path/second level-path", the switching-identifier denoting the second level-path is used. In this example as level-path J32 and level-path J33 are related by the edge-relationship J32/J33, the switching-identifier of level-path J33, being "source NAAA.NAA.NA, destination NAAA.NEE" is used in node QB. Similarly, we calculate and store a requested level-path named J34 from network NAA to network NF as a concatenation of the requested level-path named J32 from network NAA to network NEE and the level-mapping named J21 from network NEE to network NF as shown in FIG. 53D. In the calculation of the recursive-path a new method is introduced. As the level-path named J32 is a requested level-path, forwarding entries have been created already for the level-path named J32 as described above. Therefore, the calculation of the recursive-path of the level-path J34, which uses the level-path named J32, as per the edge-relationship J32/J34, can be shortened, reducing calculation time. If the source network of a first requested level-path is equal to the source network of a second requested level-path and the level of the destination network of the first requested level-path is larger than the level of the destination network of the second requested level-path and the first requested level-path and the second requested level-path are related per edge-relationship "first requested level-path/second requested level-path", do not perform, in other words skip, the calculation of the recursive-path of the second requested level-path before a topology-mapping containing said edge-relationship "first requested level-path/second requested level-path" concatenated with a level-mapping increasing in level containing said edge-relationship "first requested level-path/second requested level-path". A level-mapping increasing in level is a level-mapping from a first network at (d, n, h1) to a second network at (d, n, h2) with h1<h2. As an example, but not limited to, if the source network NAA of a first requested level-path named J32 is equal to the source network NAA of a second requested level-path named J34 and the level of the destination network NEE of the first requested level-path J32 is larger than the level of the destination network NF of the second requested level-path named J34 and the first requested level-path named J32 and the second requested level-path named J34 are related per edge-relationship "J32/J34", do do not perform, in other words skip, the calculation of the recursive-path of the second requested level-path named J34 before a topology-mapping named J27 containing said edge-relationship "J32/J34" concatenated with a level-mapping named J20 increasing in level containing said edge-relationship "J32/J34". From the recursive-path we determine the input port and set of incoming edge-relationships of a topology-mapping or layer-mapping, output port and set of outgoing edge-relationships of a topology-mapping or layer-mapping for the level-path named J34 for physical nodes QE and QF, as shown in FIG. 53L, from which forwarding entries for nodes QE and QF can be determined. Note that no forwarding entry is created for node QD as the source network of the recursive-path of the level-path named J34, being network NAA, is not mapped to node QD through one or more depth-mappings. The forwarding entries resulting from the recursive-path for physical nodes QE and QF are shown in FIG. 42K. The logical source address NAAA.NAA is the address of logical source network NAA, the logical destination address NAAA.NEE.NF is the address of logical destination network NF of the requested level-path named J34. Optionally, a switching-identifier with value "source NAAA.NAA, destination NAAA.NEE.NF" could be assigned to the level-path named J34. In case of nested level-paths having an edge-relationship "first level-path/second level-path", the switching-identifier denoting the second level-path is used. In this example as level-path J32 and level-path J34 are related by the edge-relationship J32/J34, the switching-identifier of level-path J34, being "source NAAA.NAA, destination NAAA.NEE.NF" is used in node QE. As will be understood by a person skilled in the art, instead of using the hierarchical naming used in the example of FIGS. 53B, 53C, 53D IPv4 or IPv6 addresses containing hierarchy can be assigned to networks and used to forward upon. As an example, but not limited to, IPv4 address 128.128.128/22 could be assigned to network NAAA, IPv4 address 128.128.128/24 could be assigned to network NAA, IPv4 address 128.128.144/24 could be assigned to network NCC and IPv4 address 128.128.160/24 could be assigned to network NEE. This method can be applied to networks of arbitrary number of hierarchy levels. The above approach allows for a significant reduction in the number of forwarding instructions to be calculated by the SDN Compiler, to be transmitted to physical nodes either directly or indirectly via a SDN Controller and to be stored in the physical or virtual node. This is particularly important as the Ternary Content-Addressable Memory (TCAM) of a node is typically limited in size and relatively expensive. As will be understood by a person skilled in the art using the above method a variety of hierarchical forwarding schemes can be created. As another example, a requested level-path J32 could be created. Logical node NB will be the inter-domain node for network NAA. Forwarding entries could be created in for all nodes in network NAA, in this example only node NA, to forward all traffic with destination outside of network NAA to node NB. Logical node NE will be the inter-domain node for network NEE. Forwarding entries could be created for all nodes in network NEE, in this example only node NF, specifying how to forward packets with a source outside NEE to nodes in network NEE. These 3 types of forwarding entries could be combined significantly reducing the number of forwarding entries needed. In the example given we created the topology-mappings named J30 and J31 to allow for control such as specifying forwarding behavior between networks-of-nodes NAA, NCC and NEE. Alternatively, the method presented above resulting in the forwarding entries shown in FIG. 53L can also be created without first creating the topology-mappings named J30 and J31. The method described above to create forwarding entries with a source network at h>h_min(d, n) and/or a destination network at h>h_min(d, n) can combined with layering. As an example, but not limited to, by adding a logical node to named VN to the set of networks shown in FIG. 53C, logical node VN connected through a layer-mapping to logical network NAA and adding a logical node to named VO to the set of networks shown in FIG. 53C, logical node VO connected through a layer-mapping to logical network NEE, a topology-mapping from network VN to network VO can be created comprising of a concatenation of a layer-mapping from network VN to network NAA, a level-path from network NAA to network NEE and a layer-mapping from network NEE to network VO. A requested topology-path from logical node VN to logical node VO can be created comprising of the topology-mapping from network VN to network VO, with a logical source address NAAA.NAA.*.VN and logical destination address NAAA.NEE.*.VO. As an example, but not limited to, logical nodes VO and VN could represent a particular type of application denoted by a well-known port, the forwarding entries resulting from the requested topology-path from logical node VN to logical node VO specifying forwarding for traffic from source node NA or source node NB of said particular type of application to destination node NE or destination node NF. Using layer-mappings allows for specifying forwarding policy of traffic from a source network at h>h_min(d, n) to a destination network at h>h_min(d, n) or for specifying forwarding policy of traffic from a source network at h=h_min(d, n) to a destination network at h>h_min(d, n) or for specifying forwarding policy of traffic from a source network at h>h_min(d, n) to a destination network at h=h_min(d, n) for a particular type of application. As will be understood by a person skilled in the art, the SDN Compiler method can be applied to arbitrary topologies comprising of networks and topology-mappings and can be applied to arbitrary network structures comprising of networks, topology-mappings, depth-mappings, layer-mappings and level-mappings, not limited to the examples shown.

When creating a topology-mapping, layer-mapping, topology-path, level-path or topology-level-path per above described method, optionally one or more requirements are taken into account when creating said topology-mapping, layer-mapping, topology-path, level-path or topology-level-path. Only if said topology-mapping, layer-mapping, topology-path, level-path or topology-level-path complies with said one or more requirements, said topology-mapping, layer-mapping, topology-path, level-path or topology-level-path is created. In other words, a topology-mapping, layer-mapping, topology-path, level-path or topology-level-path is only created when requirements for said topology-mapping, layer-mapping, topology-path, level-path or topology-level-path are met by the calculated said topology-mapping, layer-mapping, topology-path, level-path or topology-level-path. As an example, but not limited to, at the creation of topology-mapping L14 from network LA to network LB in FIG. 50F a requirement could be that 100 Mb/s of capacity is available for topology-mapping L14. As an example, but not limited to, at the creation of topology-mapping L22 from network LC to network LD in FIG. 50F a requirement could be that the latency from network LC to network LD is less than 1 millisecond (ms). As an example, but not limited to, at the creation of topology-path L23 from network LC to network LD in FIG. 50F a requirement could be that the recursive-path comprises of equipment in a single datacenter. As will be understood by a person skilled in the art, by storing properties of networks and edges, by using this information in the creation of a topology-mapping, layer-mapping, topology-path, level-path or topology-level-path, by having the ability to calculate a recursive-path at any point in time, by having this information centrally stored, much more complex requirements can be created than in current networking implementations. As an example, but not limited to, a topology-path could be created with the following set of requirements:

- avoid any physical topology-mappings and layer-mappings carrying a specific type of traffic,
- avoid any physical topology-mappings and layer-mappings having a utilization above 80 percent, to avoid an impact due to statistical multiplexing of bursty traffic
- avoid a specified type of physical equipment, A requested topology-path, level-path or topology-level-path can be considered as a service for a user. An example, but not limited to, of said user being a person, an organization, an application. Typically, the requirements of said service are stored in a contract, being a Service-Level-Agreement (SLA) between said user and the provider of said service. As will be understood be a person skilled in the art, the above method allows said provider of said service to offer much richer services, based on said more complex requirements that can be used when establishing said service.

Edge-relationships are used to determine the impact of any changes in a set of networks. As an example, but not limited to, FIG. 54 shows the relationships between a changed first edge and an impacted second edge for the set of networks shown in FIG. 50F. The list of FIG. 54 is a list of edge-relationships. As an example, as shown in FIG. 50C the topology-mapping named L5 from network KA to network KB is with edge-relationship L5/L11, therefore if the first edge named L5 is changed, the second edge named L11 is impacted, as per the first row of FIG. 54. In case the topology-mapping named L5 is deleted, for example but not limited to, the topology-mapping L5 being a physical fiber link which is cut, the topology-mapping named L11 is impacted, as per the edge-relationship L5/L11, and will have to be recalculated by the SDN Compiler. Note that in case the topology-path named L11 can not be recalculated, as in the example of FIG. 50F, topology-mapping L14 is impacted, as per the edge-relationship L11/L14, and will have to be recalculated by the SDN Compiler. Note that in case the topology-mapping named L14 can not be recalculated, as in the example of FIG. 50F, topology-path L21 is impacted, as per the edge-relationship L14/L21, and will have to be recalculated by the SDN Compiler. Note that in case the topology-path named L21 can not be recalculated, as in the example of FIG. 50F, topology-mapping L22 is impacted, as per the edge-relationship L21/L22, and will have to be recalculated by the SDN Compiler. Note that in case the topology-mapping named L22 can not be recalculated, as in the example of FIG. 50F, topology-path L23 is impacted, as per the edge-relationship L22/L23, and will have to be recalculated by the SDN Compiler. In case the topology-path L23 is a requested topology-path and the topology-path named L23 can not be recalculated, as in the example of FIG. 50F, the Service-Level-Agreement (SLA) of said requested topology-path is violated. Note that the described method allows for multi-layer survivability in a set of networks. Note that multi-layer survivability using above method creates a more simple approach compared to a current implementation based on various delay timers at various layers or complex management orchestration dealing with multi-layer survivability. Note that the described method allows for a much deeper analysis of SLA's. As an example but not limited to a large number of failure scenario's could be simulated from the information stored by the method and the impact on one or more SLA's could be determined. As an example but not limited to this allows for checking SLA violation probability versus incurred penalties of said SLA violation. Note that the described method allows for storing each SLA violation, therefore building a record for said SLA. Note that the described method allows for an SLA with fallback requirements. In case the requirements of said SLA cannot be met, a requested path can be calculated and created based on said fallback requirements, said fallback requirements being different and typically less stringent than said SLA requirements. The impact of a deleted network, for example but not limited to a physical node that is powered down, can be determined in a number of ways:

- by determining the mappings to and from said deleted network, and using edge-relationships between said mappings and zero or more impacted edges.
- by determining the mappings to and from said deleted network and deleting said mappings, and use above described method to determine impacted edge.
- by using a network-edge-relationship, being a relationship between a network used in the calculation of an edge and said edge and determining impacted edges using said network-edge-relationship We now consider modification of names and properties of networks and edges. Examples, but not limited to, of a property of a network are: name of PoA's, capacity of ports, geographical location of a virtual machine, a node being security vulnerability or not. Examples, but not limited to, of a property of a mapping are: name of PoA's, capacity of a physical link, condition of a link. A modification of names and properties of networks and edges can result in a requirement violation of an edge. As an example, but not limited to, when a virtual machine is moved from a first datacenter to a second datacenter and a requested topology-path has been created with a requirement that the physical and virtual nodes in the recursive-path of said requested topology-path should be within said first datacenter and said virtual machine is a node in the recursive-path of said requested topology-path, the requirement of said requested topology-path is violated.

We extend the method with the following actions:

i. Recalculating the second edge in an edge-relationship when the first edge in the edge-relationship is deleted or when a modification of said first edge results in a violation of the requirements of said second edge.
ii. Recalculating the second edge in the edge-relationship when a network being a first network or a second network of the first edge in the edge-relationship is deleted or when a modification of said network results in a violation of the requirements of said second edge.
iii. Recalculating a second edge at position x+y in the set of edge-relationships when modification of a first edge at position x in the set of edge-relationships results in a violation of the requirements of said second edge, y being larger than 0.
iv. Recalculating a second edge at position x+y in the set of edge-relationships when modification of a network being a first network or a second network of a first edge at position x in the set of edge-relationships of results in a violation of the requirements of said second edge, y being larger than 0.
v. Recalculating a topology-mapping, layer-mapping, topology-path, level-path or topology-level-path when requirements for said topology-mapping, said layer-mapping or said topology-path, level-path or topology-level-path are changed.

As an example, but not limited to, of action iii) we consider a set of edge-relationships L5/L11/L14/L21/L22/L23, of the topology-mapping named L5 from network KA to network KB, of FIG. 50F. A second edge L22 at position x+y=5 in the set of edge-relationships L5/L11/L14/L21/L22/L23 when modification of a first edge L5 at position x=1 in the set of edge-relationships results in a violation of the requirements of said second edge L22, y being equal to 4. In other words a modification at a first position in the set of edge-relationships can result in a requirement violation at a higher position in the set of edge-relationships. A modification is propagated through the edges according to the stored the edge-relationships.

We consider an additional optional condition for the creation of a topology-path: a topology-path traversing a node is only created when a switch action from an input port of said node to an output port of said node is possible or allowed. As an example, but not limited to, an Ethernet Network Interface Card (NIC) which has static relationships between input ports and output ports. We now extend our method to include a novel manner to express a policy describing which topology-paths, level-path or topology-level-path are allowed in a set of networks, referred to as a path-allowed-policy. In the below description when reference is made to a topology-level-path, said topology-level-path includes a topology-path or level-path as a topology-level-path can comprise of a single topology-path or a single level-path. Instead of using Access Control Lists (ACLs) to specify on per equipment basis, such as but not limited to, a router, which topology-level-paths are allowed, we take a network-wide approach by extending the method presented above. Applying a path-allowed-policy is optional. The starting point of the path-allowed-policy is that no topology-path, level-path or topology-level-path can be created in a set of networks. A topology-level-path can only be created if a policy exists that allows for the creation of the considered topology-level-path. We introduce 2 new edges. We introduce a path-allowed edge, as shown in FIG. 55C, specifying that a topology-level-path from a first network to a second network is allowed. FIG. 55C shows logical networks NAAA, NAA, NCC, NEE and path-allowed L157, L158, L159, specifying that a topology-level-path from network NAA to network NCC is allowed, a topology-level-path from network NCC to network NAA is allowed, a topology-level-path from network NAA to network NEE is allowed, respectively. We introduce a level-mapping-allowed edge, as shown in FIG. 55A, specifying that a topology-level-path from a first network to a second networks is allowed if a topology-level-path can be created from the first network to the second network consisting of a concatenation of level-mapping-allowed edges. Note that the level-mappings-allowed edge does not specify which level-mappings are allowed, but as a result of a concatenation of level-mappings-allowed edges, certain topology-level-paths are allowed in a set of networks. Leveraging the hierarchy in the network this approach provides for an efficient manner to specify a path-allowed-policy. FIG. 55A shows logical network NAAA at (d=1, n=0, h=2) consisting of logical networks NAA, NCC and NEE at (d=1, n=0, h=1) and also shows level-mapping-allowed L151 through L156. The results of the level-mapping-allowed L151 through L156 is that network NAA, network NCC and network NEE can created topology-level-paths between each other. FIG. 55B shows logical networks NAAA, NAA, NCC, NEE and level-mapping-allowed L151, L154, L155, L156. The results of the level-mapping-allowed L151, L154, L155, L156 is that a topology-level-path can be created from network NAA to network NCC, a topology-level-path can be created from network NAA to network NCC, a topology-level-path can be created from network NAA to network NEE and a topology-level-path can be created from network NEE to network NCC. As an example, but not limited to, shown in FIG. 55D, we intend to created a topology-path named L162 from network NAA to network NEE being a concatenation of a topology-mapping named L160 from network NAA to network NCC an a topology-mapping named L161 from network NCC to network NEE. This topology-path is allowed by the concatenation of the level-mapping-allowed edge named L151 and the level-mapping-allowed edge named L155. We create an edge-mapping L151/L162 and edge-mapping L155/L162 as the topology-path named L162 uses the level-mapping-allowed edge named L151 and the level-mapping-allowed edge named L155. In case a level-mapping-allowed is modified which is used by a topology-level-path, the topology-level-path is recalculated. As an example, but not limited, if the level-mapping-allowed edge named L155 is deleted, topology-path L162 is impacted and will have to be recalculated. This recalculation will not be successful as there is not path-allowed-policy, which allows for this topology-level-path, therefore the topology-path L162 will be deleted and optionally the user of the SDN compiler will be notified. In FIG. 55E another example is shown, consisting of logical networks NAAA, NAA, NCC, NEE and path-allowed edges L157, L158 and L159. As an example, but not limited to, shown in FIG. 55E, we intend to created a topology-path named L162 from network NAA to network NEE being a concatenation of a topology-mapping named L160 from network NAA to network NCC an a topology-mapping named L161 from network NCC to network NEE. This topology-path is allowed by the path-allowed edge named L159. An edge-mapping L159/L162 is created as the topology-path named L162 uses the path-allowed edge named L159. In case a path-allowed edge is modified, which is used by a topology-level-path, the topology-level-path is recalculated. As an example, but not limited, if the path-allowed edge named L159 is deleted, topology-path L162 is impacted and will have to be recalculated. This recalculation will not be successful as there is no path-allowed-policy which allows for this topology-level-path, therefore the topology-path L162 will be deleted and optionally the user of the SDN compiler will be notified. The path-allowed policy is used to express a policy which topology-paths, level-paths and topology-level-paths are allowed to be created. Similarly, a topology-mapping-allowed policy could be used to express a policy which topology-mappings are allowed to be created. Similarly, a layer-mapping-allowed policy could be used to express a policy which layer-mappings are allowed to be created. The above description of policy is an example of describing a policy.

We consider an additional condition for the creation of an edge in the method: a topology-mapping, layer-mapping or topology-level-path is only created when a policy allows for the creation of said topology-mapping, said layer-mapping or said topology-level-path. We extend the method with the following actions:

i. Storing a policy-edge-relationship comprising of a relationship between the name of a policy allowing for the creation of an edge and the name of said edge.
ii. Recalculating an edge in the edge-relationship when the policy allowing for the creation of an edge is deleted or changed.

We now consider the capacity of edges. When creating a second edge with a specified capacity, said capacity required for the second edge in an edge-relationship is allocated at the first edge in said edge-relationship. As an example, but not limited to, when creating a second edge with a capacity of 100 Mb/s, being the topology-path named L11 from network KA to network KB, as shown in FIG. 50F, said capacity required for the topology-path named L11 is allocated at the first edge, being topology-mapping named L5 from network KA to network KB in said edge-relationship L5/L11. As understood by a person skilled in the art, in case of a packet-switching network statistical multiplexing can be used, therefore the capacity allocated at the topology-mapping named L5 can be less than 100 Mb/s due to statistical multiplexing. Similarly, when recalculating a second edge with a specified capacity, said capacity required for the second edge in an edge-relationship is allocated at the first edge in said edge-relationship. In case a second edge is deleted, the capacity required for the second edge in the edge-relationship is de-allocated at the first edge in the edge-relationship. As an example, but not limited to, when deleting a second edge with a capacity of 100 Mb/s, being the topology-path named L11 from network KA to network KB, as shown in FIG. 50F, said capacity required for the topology-path named L11 is de-allocated, or freed, at the first edge, being topology-mapping named L5 from network KA to network KB in said edge-relationship L5/L11. Note that allocation of capacity at a topology-mapping from a first logical network to a second logical network is optional. As an example, when allocating a first capacity at a topology-mapping from a first logical network to a second logical network, and creating a topology-path comprising of said topology-mapping, a second capacity for said topology-path is allocated from the first capacity. Alternatively, as an example, when allocating no capacity at a topology-mapping from a first logical network to a second logical network, and creating a topology-path comprising of said topology-mapping, a second capacity for said topology-path is allocated the one or more edges from which said topology-mapping was calculated.

As per the method described above, the following edge information is stored:

- storing the name of a topology-mapping,
- storing the name of a layer-mapping,
- storing the name of a topology-path,
- storing the name of a level-path,
- storing the name of a topology-level-path,
- optionally storing the name of a depth-mapping,
- optionally storing the name of a level-mapping,
- optionally storing the type of edge, being a topology-mapping, depth-mapping, layer-mapping, level-mapping, topology-path, level-path or topology-level-path,
- optionally storing the direction of a depth-mapping, either increasing in depth or decreasing in depth,
- optionally storing the direction of a layer-mapping, either increasing in layer or decreasing in layer,
- optionally storing the direction of a level-mapping, either increasing in level or decreasing in level,
- optionally storing an edge-relationship of using the name of the first topology-mapping or the first depth-mapping or the first layer-mapping or the first level-mapping or the first topology-path or the first level-path and the name of the second topology-mapping or the second layer-mapping or the second topology-path or the second level-path when storing such relationship,
- optionally storing an edge-relationship of as a property of the first topology-mapping or the first depth-mapping or the first layer-mapping or the first level-mapping or the first topology-path or the first level-path,

- optionally storing an edge-relationship of as a property of the second topology-mapping or the second layer-mapping or the second topology-path or the second level-path,
- optionally storing a switching-identifier of a topology-mapping, a topology-path, a level-path or a topology-level-path,
- optionally storing a Double Address identifier of a topology-path,
- optionally storing a Network Address Translation (NAT) identifier of a topology-path
- optionally storing a subnet-identifier representing an IPv4 or IPv6 subnet of a topology-mapping
- optionally storing a load-balancing-identifier of a topology-mapping, a topology-path calculated, a level-path or a topology-level-path, The method described can be implemented using a graph database, wherein networks, mappings, topology-paths, level-paths and topology-level-paths are stored in a graph database, wherein a network is stored as a named vertex in a graph database, wherein a mapping, being a topology-mapping, depth-mapping, layer-mapping or level-mapping is stored as a named and directed edge in a graph database, wherein a topology-path, level-path or topology-level-path is stored as a named and directed edge in a graph database, wherein properties of said networks are stored as vertex attributes in said graph database, wherein properties of said mappings are stored as edge attributes in said graph database, wherein properties of said topology-paths, level-paths or topology-level-paths are stored as edge attributes in said graph database. The type of mapping and the direction of said mapping can be stored as an edge type in said graph database. The type of topology-level-path, being a topology-path, level-path or topology-level-path can be stored as an edge type in said graph database. An example of a type of mapping and a direction of said mapping is an increasing depth-mapping. A graph database supporting more than one edge type is typically referred to as a graph database supporting property graphs.

The first method to calculate a topology-mapping, the second method to calculate a topology-mapping, the third method to calculate a topology-mapping, the fourth method to calculate a topology-mapping, the fifth method to calculate a topology-mapping, the first method to calculate a layer-mapping, the second method to calculate a layer-mapping, the method to calculate a topology-path, the method to calculate a level-path and the method to calculate a topology-level-path, used to create or recalculate a mapping or a topology-path, level-path or topology-level-path, can be implemented as a query in a graph database. Additional requirements as described above can be included in such query. As an example, but not limited to, a query of the first method to calculate a topology-mapping could be a graph database query for a path from a first node to a second node matching a depth-mapping decreasing in depth from said first node to a third node, matching a depth-mapping increasing in depth from a fourth node to said second node, matching a topology-path from said third node to a fourth node. Optionally, additional requirements could be specified in said example query.

In FIG. 56 a diagram shown of a flowchart of an example SDN Compiler method based on 12 input, being declarative requests:

- CREATE-NETWORK resulting in the creation of a network
- DELETE-NETWORK resulting in the deletion of a network.
- CREATE-MAPPING resulting in the creating of a mapping by using the method shown in the flowchart of FIG. 49
- DELETE-MAPPING resulting in the deletion of a mapping
- RECALCULATE-MAPPING resulting in the recalculation of a mapping
- OPTIMIZE-MAPPING resulting in the optimization of a mapping. In case the mapping topology-path, level-path or topology-level-path is more optimal than the existing mapping, for example, but not limited to, requiring less resources the existing mapping is replaced by a new mapping.
- CREATE-PATH resulting in the creating of a topology-path, level-path or topology-level-path. In case of a requested topology-path, level-path or topology-level-pathresulting forwarding entries will be created.
- DELETE-PATH resulting in the deletion of a topology-path, level-path or topology-level-path
- RECALCULATE-PATH resulting in the recalculation of a topology-path, level-path or topology-level-path
- OPTIMIZE-PATH resulting in the optimization of a topology-path, level-path or topology-level-path. In case the new topology-path, level-path or topology-level-path is more optimal than the existing topology-path, level-path or topology-level-path, for example, but not limited to, requiring less resources the existing topology-path, level-path or topology-level-path is replaced by a new topology-path, level-path or topology-level-path. In case said topology-path, level-path or topology-level-path is a requested topology-path, level-path or topology-level-path forwarding entries are calculated for the topology-path, level-path or topology-level-path and an instruction is created to delete forwarding entries of the existing topology-path, level-path or topology-level-path.
- MODIFY resulting in the modification of names and properties of networks and edges
- GET returning requested data to a user. As an example, but not limited to, for graphical representation of information or for offline analysis.

As described above, edge-relationships are used to determine the impact of any changes in a set of networks, as shown in step 7.2 and 11.5. As shown in step 7.4 in case the impacted edge is a mapping, a recalculate-mapping request is created and inputted into step 1 of the flowchart. Alternatively, step 7.4 of the flowchart could point to 6 RECALCULATE-MAPPING. As shown in step 7.5 in case the impacted edge is a topology-path, level-path or topology-level-path, a recalculate-path request is created and inputted into step 1 of the flowchart. Alternatively, step 7.4 of the flowchart could point to 10 RECALCULATE-PATH. In case a network is deleted in step 3.1 a DELETE-MAPPING request is created for all mappings to and from the deleted network, being one of three alternatives described above to determine the impact of a deleted network.

We now consider an example SDN Compiler apparatus comprising of a Database, an Event Handler and an Instructor, as shown in FIG. 57. FIG. 57 also shows the USER of the SDN Compiler, one ore more SDN Controllers and one or more physical SDN nodes. All information of the networks, topology-mappings, depth-mappings, layer-mappings, level-mappings, topology-paths, level-paths, topology-level-paths in stored in a database. An example, but not limited to, such a database is a graph database. The event handler handles all incoming events from the USER, one ore more SDN Controllers and from the database. Alternatively, the database could directly query itself, but to allow for event-handling and prioritization database requests from to database to the database flow through the event-handler. The event-handler allows for event prioritization and protects the database from query attacks. The instructor is responsible for creating forwarding entries for a user-requested topology-path, level-path or topology-level-path after this topology-path, level-path or topology-level-path is created in the database. One or more SDN controllers can send requests to the event handler. Alternatively, an additional monitor could be used that polls one or more SDN Controllers. In FIG. 57 the following message flows are shown:

51 USER to EVENT HANDLER, for example for GET request, scripting, command interface, GUI.

52 SDN CONTROLLER to EVENT HANDLER

53 DATABASE to EVENT HANDLER, for example for requirement violations triggering recalculation and error reporting.

54 DATABASE QUERY+ACTION from EVENT HANDLER TO DATABASE

55 DATABASE to INSTRUCTOR, comprising of requested topology-path, level-path or topology-level-path information

56 INSTRUCTOR to CONTROLLER, comprising forwarding instructions

57 EVENT HANDLER to USER, for example for error reporting

58 DATABASE to USER, for example for viewing, error reporting

59 INSTRUCTOR to USER, for example for error reporting, for statistics

60 NODE to CONTROLLER for example for error reporting, for status reporting

61 SDN CONTROLLER to NODE, comprising forwarding instructions

The example SDN Compiler apparatus shown in FIG. 57 uses the 12 inputs shown in the flowchart of FIG. 93: CREATE-NETWORK, DELETE-NETWORK, CREATE-MAPPING, DELETE-MAPPING, RECALCULATE-MAPPING, OPTIMIZE-MAPPING, CREATE-PATH, DELETE-PATH, RECALCULATE-PATH, OPTIMIZE-PATH, MODIFY, GET. As an example, but not limited to, in an application these inputs could be Application Programming Interface (API) calls. FIG. 58 shows which inputs are used by the USER of the SDN Compiler, referred to as 'USER' in FIG. 58, by a SDN CONTROLLER and by a database internal to the SDN Compiler.

We now consider an example of a non-packet-switching network. Examples, of non-packet switching networks include Wavelength Division Multiplexing (WDM) networks, Time Division Multiplexing (TDM) networks, such as but not limited to Synchronous Digital Hierarchy (SDH) networks or Synchronous Optical NETwork (SONET) networks, a GMPLS network, a ITU G.709 network, a fiber-switching network. FIG. 59A shows a first WDM multiplexer comprising of physical nodes EC at (d=0, n=0, h=0), EJ at (d=0, n=1, h=0), a first WDM Optical Add/Drop Multiplexer (OADM) comprising of physical nodes ED at (d=0, n=0, h=0), EE at (d=0, n=0, h=0) and EK at (d=0, n=1, h=0), a second WDM Optical Add/Drop Multiplexer (OADM) comprising of physical nodes EF at (d=0, n=0, h=0), EG at (d=0, n=0, h=0) and EL at (d=0, n=1, h=0), and a second WDM multiplexer comprising of physical nodes EH at (d=0, n=0, h=0), EM at (d=0, n=1, h=0). We will refer to the first WDM multiplexer, the first WDM OADM, the second WDM OADM and the second WDM multiplexer as a WDM system. PoAs p801 through p806 are fiber-optic interfaces external to each WDM system, connecting a first WDM system to a second WDM system through optical fiber. PoAs p807 through p818 are optical interfaces internal to each WDM system. FIG. 59B shows physical nodes EC, EJ, ED, EE, EK, EF, EG, EL, EH, EM, logical nodes VJ, VK, VM and topology-mappings, layer-mappings, depth-mappings and a topology-path named K19 represented as directed edges in a graph. Only the topology-mappings, layer-mapping and depth-mappings relevant for this example are shown. In FIG. 59C the physical topology-mappings named K1, K2 and K3, the physical layer-mappings K4 through K9 and the depth-mappings K13 through K16 per the notation of FIG. 51A are shown. Using the method described above, the following topology-mappings are created, as shown in FIG. 59D:

- topology-mapping named K10 from node EJ to node EK using the second method for calculating a topology-mapping
- topology-mapping named K11 from node EK to node EL using the second method for calculating a topology-mapping
- topology-mapping named K12 from node EL to node EM using the second method for calculating a topology-mapping
- topology-mapping named K17 from node VJ to node VK using the first method for calculating a topology-mapping
- topology-mapping named K18 from node VK to node VM using the first method for calculating a topology-mapping
- topology-path named K19 from node VJ to node VM Note that the mappings shown in FIG. 59D may be created by using the method for creation of mappings as shown in FIG. 49. We assign type i) switching-identifiers at depth d=0 and layer n=1 comprising of a physical signal, as described above. We assign a switching-identifier with value "195.70", specifying a central frequency of a WDM system in TeraHerz (THz), to the topology-mappings named K10 and K11 and assign a switching-identifier with value "195.80" to the topology-mapping named K12, as shown in FIG. 59F. Above example wavelengths are wavelengths typically used in a WDM system per ITU recommendation G.694.1. Note that such wavelength-assignment could be performed as an example but not limited to by the SDN Compiler, a WDM network management system or an Operations Support System (OSS). The recursive-path is calculated for a requested topology-path K19 from source node VJ to destination node VM using the method described above, resulting in the recursive-path shown in FIG. 59E. FIG. 59G shows for each physical node in the recursive-path calculated from the requested topology-path named K19 an input port, an output port, relevant incoming set of edge-relationships and relevant outgoing set of edge-relationships. From the information shown in FIG. 59G forwarding instructions for a non-packet-switching node can be created as per the method described above. As an example, but not limited to, the forwarding instruction for physical node EL is created as follows: the recursive-path does contain one incoming layer-mapping named K7 for node EL and the recursive-path does contain one outgoing layer-mapping named K8 for node EL, creating for each outgoing outgoing layer-mapping K8 for node EL in said recursive-path an instruction instructing node EL to receive an incoming signal at input port p814, said signal in accordance with the switching-identifier with value "195.70", being the switching-identifier of the topology-mapping named K11, of the incoming set of edge-relationships "K7/K11/K18/K19" of said incoming layer-mapping named K7 and modify said signal in accordance with the switching-identifier with value "195.80", being the switching-identifier of the topology-mapping named K12, of the outgoing set of edge-relationships "K8/K12/K18/K19" of said outgoing layer-mapping named K8 and forward said signal out of output port p816. FIG. 59G specifies instructions for physical nodes EJ, EC, ED, EK, EE, EF, EL, EG, EH, EM individually. As explained above, alternatively instructions can be created for physical equipment comprising of multiple physical nodes. We combine the set of physical nodes EJ, EC of the first WDM multiplexer to a fourth set-of-nodes. We combine the set of physical nodes ED, EK, EE of the first WDM OADM to a fifth set-of-nodes. We combine the set of physical nodes EF, EL, EG of the second WDM OADM to a sixth set-of-nodes. We combine the set of physical nodes EH, EM of the second WDM multiplexer to a seventh set-of-nodes. Using the method described above to calculate a physical input port, a physical output port, an incoming set of edge-relationships, switching-identifiers of said incoming set of edge-relationships, an outgoing set of edge-relationships and switching-identifiers of said outgoing set of edge-relationships are calculated for a set-of-nodes for said fourth set-of-nodes, said fifth set-of-nodes, said sixth set-of-nodes and said seventh set-of-nodes results in the instructions shown in FIG. 59H for a requested topology-path named K19. Note that, as per FIG. 59H, in this example, the second WDM OADM is instructed to receive a first optical signal with a frequency of 195.70 Thz at input port p804, convert said first optical signal to a second optical signal with a frequency of 195.80 Thz and send said second optical signal out of output port p805. Note that the instructions shown in FIG. 59H do not specify how a signal should be routed internal in the equipment, such as for example but not limited to the second WDM OADM. Therefore, the SDN Compiler can send forwarding instructions to for example but not limited to WDM equipment specifying the expected behavior, but without specifying the internals of the WDM equipment by using a generic model of a WDM system, such as for example but not limited to, used in the example described. Note that a layer-mapping from a first node at layer n to a second node at layer (n−1) followed by a topology-mapping results in a multiplexing action, such as for example but not limited to in node EC. Note that a layer-mapping from a third node at layer (n−1) to a fourth node at layer (n−1) followed by a topology-mapping results in a de-multiplexing action, such as for example but not limited to in node ED. Therefore, the SDN Compiler should be aware of the multiplexing and de-multiplexing capabilities of physical nodes when providing forwarding entries on component level rather than equipment level. As an example, but not limited to, the multiplexing and de-multiplexing capabilities could be provided to the SDN Compiler by an Element Management System (EMS). As will be understood by a person skilled in the art the method can be applied to more complex WDM systems such but not limited to Remotely Configurable Optical Add/Drop Multiplexers (ROADMs), having two or more aggregate optical interfaces, Optical Cross-Connects (OXCs) having two or more aggregate optical interfaces. Colorless ROADMs in which the assignment of add/drop wavelengths is automated. Directionless ROADMs in which any wavelength can be routed to any direction served by the ROADM through automation. ROADMs that use an architecture to avoid collision or blocking of wavelengths. Gridless ROADMs which utilize a flexible channel grid. As will be understood by person skilled in the art more complex topologies than the 3 node linear chain shown in FIG. 59A that served as an example can be created. In this example a logical non-packet-switched network is created comprising of nodes VJ, VK and VM at (d=1, n=1, h=0) with a topology that is different than the physical non-packet-switched network. Note that as the logical network comprising of nodes VJ, VK and VM is an abstraction alternatively other technologies than WDM such as for example but not limited to TDM could have been used. As will be understood by a person skilled in the art the method can also be applied to a first non-packet-switching physical node using a service offered by a second non-packet-switching physical node, by interconnecting the first physical node and the second physical node by one or more topology-mappings, representing physical links. As an example, but not limited to, said first non-packet-switching physical node could be a TDM system and said second non-packet-switching physical node could be a WDM systems, the TDM system and the WDM system being interconnected by one or more topology-mappings, being one or more physical links, the TDM system using a service, being for example a wavelength or for example a wavelength-path comprising of a concatenation of wavelengths, offered by the WDM system. We refer to a physical topology-mappings being a topology-mappings from a first physical node to a physical node. We refer to a logical topology-mappings being a topology-mappings from a first logical node to a second logical node. In the example described topology-mapping K17 is mapped to a single wavelength, therefore the topology-mappings K17 will have at maximum the capacity of the topology-mapping K10. As will be understood by a person skilled in the art a logical topology-mapping, could be mapped to more than one physical topology-mappings in parallel, referred to as a set of physical topology-mappings. The capacity of said logical topology-mapping would be at maximum the aggregate capacity of the topology-mappings in said set of physical topology-mappings. As an example, but not limited to, in case topology-mapping K10 representing a first WDM wavelength would have a capacity of 10 Gb/s and a second topology-mapping K20 (not shown in FIG. 59B) from node EJ to node EK representing a second WDM wavelength would have a capacity of 10 Gb/s and topology-mapping K17 would be mapped to both the topology-mapping named K10 and to the topology-mapping named K20 being parallel wavelengths, the maximum capacity of topology-mapping K17 would be 20 Gb/s. When referring to a forwarding entry in the context of a non-packet-switched physical node, reference is made to an instruction to relay a physical signal. As an example, but not limited to, said relaying could be a cross-connect operation in for example a physical WDM or TDM node. As will be understood by a person skilled in the art typically another system such as for example but not limited to a router provides an input signal to a non-packet switching system such as for example but not limited to a WDM system. As an example, but not limited to physical packet-switching node EU, shown in FIG. 52B, could be connected to physical non-packet-switching node EJ, shown in FIG. 59B, by a layer-mapping, physical packet-switching node EV, shown in FIG. 52B, could be connected to physical non-packet-switching node EM, shown in FIG. 59B, by a layer-mapping, logical node VU shown in FIG. 52B could be connected to logical node VJ shown in FIG. 59B, by a layer-mapping, logical node VV shown in FIG. 52B could be connected to logical node VM shown in FIG. 59B, by a layer-mapping. The above described method can be used to calculate a recursive-path of a requested topology-path from a first logical node to a second logical and calculate forwarding entries for both packet-switching nodes and non-packet-switching-nodes. Therefore, the method allows for controlling a network consisting of both packet-switching and non-packet-switching nodes. The SDN Compiler method applied to a non-packet-switched network provides advantages of current operations of non-packet-switched networks. First, as an abstraction is created for the physical signal by the creation of a topology-mapping from a first logical node to a second logical node, the user of the SDN Compiler is only working with an abstraction not with characteristics of the physical signal. For example, but not limited to, in case of an optical signal, the user of the SDN Compiler does not have to know any physical details such as bitrate of the physical signal, optical fiber type, optical fiber quality, modulation scheme used, dispersion compensation. The user of the SDN compiler simply puts a declarative request to the SDN Compiler to create a topology-mapping from a first logical node to a second logical node according to certain requirements, but is not concerned with an physical characteristics of the network. As an example, but not limited to, such requirements could include bitrate, Bit-Error-Rate (BER), latency. Second, applying the SDN Compiler method to both packet-switched networks and non-packet-switched networks allows for tight integration between these two types of networks. Integrating packet-switched networks and non-packet-switched networks has proven hard and as a result still most operators operate separate management systems for for example an IP-network and an WDM-network. As will be understood by a person skilled in the art, in case the SDN Compiler operates in a non-packet-switched network, the role of the SDN Controller shown in FIG. 1 could for example be performed by an Element Management System (EMS). Said EMS reports status, changes, statistics and errors of physical resources to the SDN Compiler and confirms instructions received from the SDN Compiler are distributed to physical nodes. Said EMS receives instructions from the SDN Compiler, such as for example but not limited to, making an optical cross-connect. Various protocols could be used between the SDN Compiler and the EMS, such as for example Common Object Request Broker Architecture (CORBA) or extensions of OpenFlow. As will be understood by a person skilled in the art the method can also be applied to a non-WDM system with colored optics, being optics capable of sending and receiving WDM signals, such as for example, but not limited to a router. As the method can be applied to an overall network comprising of packet-switched networks and non-packet-switched networks the method allows for orchestration of a combined packet-switched network and non-packet-switched network providing an operations benefit over the prior art.

In the example of FIG. 59B a topology-path named K19 has been created from logical node VJ to logical node VM. Alternatively, as an example but not limited to, a topology-path named K21 could be created comprising of a concatenation of the topology-mapping named K10, representing a wavelength with a frequency of 195.70 Thz, the topology-mapping named K11, representing a wavelength with a frequency of 195.70 Thz, and the topology-mapping named K12, representing a wavelength with a frequency of 195.80 Thz. Using the notation of FIG. 51C the topology-path named K21 is represented by "toppath K21=K10/K21+K11/K21+K12/K21". Note that the topology-mappings named K10, K11 and K12 are shown in FIG. 59D using the notation of FIG. 51C. The creation of the topology-path named K21 does not require the creation of logical nodes VJ, VK, VM and does not require the creation of depth-mappings named K13, K14, K15, K16. Therefore, the creation of logical nodes VJ, VK, VM and of depth-mappings named K13, K14, K15, K16 can be omitted. The recursive-path of the requested topology-path named K21 can be calculated through recursion as described above. From the recursive-path of the requested topology-path named K21 forwarding entries can be created for physical nodes EC, ED, EE, EF, EG, EH, EJ, EK, EL, EM as per the method to create forwarding entries for a non-packet-switching node. In case of a non-packet-switched network in which no logical nodes and networks are created the following method can be applied:

Method of controlling an overall network by a compiler, the overall network comprising two or more physical nodes, the physical nodes being interconnected by physical links in accordance with a physical network layout, the method as performed by the compiler comprising the following actions:

a) Storing physical node names, each physical node name being an unique identifier of one physical node, storing physical topology-mappings, each physical topology-mapping being one physical link in one direction, said physical topology-mapping being based on a directed graph representation, and storing point-of-attachment names of said physical nodes, each of the point-of-attachment names of a physical node concerned being an unique identifier of a point-of-attachment between the certain physical node concerned and a physical link connecting the physical node concerned to another physical node, b) Creating and storing a requested-topology-path being a concatenation of one or more physical topology-mappings, and storing one or more further edge-relationships, each further edge-relationship concerned being a relationship between one physical topology-mapping within the requested-topology-path and said requested-topology-path, c) Calculating through recursion and storing a recursive-path for said requested-topology-path, comprising physical nodes as indicated by said physical node names, physical topology-mappings, physical point-of-attachments as indicated by physical point-of-attachment names, said recursive-path being based on a directed graph representation, and calculating and storing nested edge-relationships, d) Creating forwarding entries for physical nodes in said recursive-path from said recursive-path, e) Sending said forwarding entries, either directly or indirectly, to physical nodes in said recursive-path.

Reference is made to forwarding entries also in the case of a non-packet-switching network as the SDN Compiler provides a uniform approach to create instructions for both packet-switching nodes and non-packet-switching nodes. A forwarding entry in case of a non-packet-switching network is an instruction specifying how an incoming signal at an input port should be relayed to an output port after optional modification of said incoming signal. Note that in a non-packet-switched network in which no logical nodes and networks, to which above method applies, one or more topology-mappings can be created using the second method to create topology-mappings, forwarding entries can be calculated using the method to calculate forwarding entries for non-packet-switching nodes, edges can be recalculated, a service can be requested in accordance with a set of requirements. As an example, but not limited to, the above method can be implemented using a graph database.

As illustrated in FIGS. 60A and 60B in some cases the number of nodes to be used in the method can be reduced. FIG. 60A shows physical nodes EN, EP, EU, EV and logical nodes VU and VV that are shown in FIG. 52B, as well as the topology-mappings named L71, L79, L87, layer-mappings L75, L76 and depth-mappings L82, L83. As explained above, the set of edge-relationships of the topology-mapping named L71 is L71/L79/L87/L89/L96/L97 as shown in FIG. 52E, or L71/L79/L87 when limiting to the edges shown in FIG. 60A. As in the example described above no switching-identifier was assigned to the topology-mapping named L79, physical nodes EU and EV can be omitted as shown in FIG. 60B. Note that in FIG. 60B logical node VU at (d=1, n=1, h=0) is mapped to physical node EN at (d=0, n=0, h=0) through a depth-mapping named L100. A depth-mapping in the other direction from node EN to node VU is not shown in this example. Note that in FIG. 60B physical node EP at (d=0, n=0, h=0) is mapped to logical node VV at (d=1, n=1, h=0) through a depth-mapping named L101. A depth-mapping in the other direction from node VV to node EP is not shown in this example. As an example, FIG. 61A shows a third computing equipment, a second packet forwarding system, a third packet forwarding system, a fourth packet forwarding system, a fifth packet forwarding system and a fourth computing equipment interconnected by physical links. FIG. 61A also shows PoAs p431 through p440. Using the representation used in FIG. 60B node QA represents the third computing equipment comprising of a datalink-layer and network-layer, node QB represents the second packet forwarding system comprising of a datalink-layer and network-layer, node QC represents the third packet forwarding system comprising of a datalink-layer and network-layer, node QD represents the fourth packet forwarding system comprising of a datalink-layer and network-layer, node QE represents the fifth packet forwarding system comprising of a datalink-layer and network-layer and node QF represents the fourth computing equipment comprising of a datalink-layer and network-layer. Note that in this example the third computing equipment and fourth computing equipment do not have an application-layer to simplify the example. Alternatively, an application-layer could have been added to the third computing equipment by adding a first physical node representing the application-layer process, said first physical node being interconnected to node QA through a layer-mapping. Alternatively, an application-layer could have been added to the fourth computing equipment by adding a second physical node representing the application-layer process, said second physical node being interconnected to node QF through a layer-mapping. FIG. 61B shows physical nodes QA, QB, QC, QD, QE, QF and shows logical nodes NA, NB, NC, ND, NE, NF mapped to physical nodes QA, QB, QC, QD, QE, QF respectively through depth-mappings. Depth-mappings named J6 through J15 are shown in FIG. 61B. A depth-mapping from node QA to node NA is not shown in FIG. 61B and a depth-mapping from node NF to node QF is not shown in FIG. 61B as these depth-mappings are not relevant for the example. The topology-mappings J1 through J5 and depth-mappings J6 through J15 are shown in FIG. 61C using the notation of FIG. 51A. Topology-mappings J24 through J28 are created using the first method to create topology-mappings described above, as shown in FIG. 93 and as shown in FIG. 61D using the notation of FIG. 51A. Note that a topology-path can comprise of a concatenation of one or more topology-mappings and one or more topology-paths, creating a nesting of topology-paths. The nesting of topology-paths creates a tunnel. As an example, but not limited to, FIG. 61B shows a topology-path named J51 comprising of the topology-mapping named J26 and the topology-mapping named J27. As an example, but not limited to, FIG. 61B shows a topology-path named J52 comprising of the topology-mapping named J24, the topology-mapping named J25, the topology-path named J51 and the topology-mapping named J28. FIG. 61D shows the topology-path named J51 and the topology-path named J52 in the notation of FIG. 51A. Using the above method to calculate a recursive-path of requested topology-path J52 results in the recursive-path shown in FIG. 61E. As a switching-identifier has been assigned to both topology-path J51 and to requested topology-path J52, topology-path J51 becomes a tunnel. The method described above is used to create forwarding entries. As an example, but not limited to, we consider the packet overhead of a packet at topology-mapping J3, being a physical link, from physical node QC to physical node QD. As shown in FIG. 61E, the set of edge-relationships of the topology-mapping named J3 is J3/J26/J51/J52, resulting in a packet overhead shown in FIG. 61G. The inner source address is NA, the inner destination address is NF. The outer, also referred to as tunnel, source address is NC, the outer destination address is NE. In this example node QC is the ingress tunnel nodes adding a so-called 'outer header' "Source NC, Destination NE" and therefore encapsulating the incoming packet with a so-called 'inner-header' "Source NA, Destination NF". The above presented method can also be used to tunnel a non-SDN network over an SDN-network. As an example, but not limited to, the tunnel with switching-identifier J51 shown in the example above could be used to provide a tunnel to a non-SDN network, connecting a first node of the non-SDN network to the ingress tunnel node QC at PoA p434 and connecting a second node of the non-SDN network to the egress tunnel node QE at PoA p439. The presented SDN Compiler method can also be used to tunnel an SDN network over a non-SDN network. As an example, but not limited to, a topology-mapping at (d=0, n=0, h=0) can be a physical medium such as, but not limited to, a fiber-optic cable, a copper cable, air, but can also be a tunnel provided by another network. As an example, but not limited to, this tunnel could be provided by a non-SDN network, resulting in an SDN network being tunneled over a non-SDN network. Also, a first SDN-network could tunnel over a second SDN-network. The use of tunnels provides a possible, but not limited to, migration method from an existing non-SDN network to an SDN network. As a person skilled in the art will understand that above presented tunneling method can be used to provide security by encrypting and/or authenticating an incoming packet in a tunnel ingress network and decrypting an incoming packet in a tunnel egress network. As a person skilled in the art will understand existing tunneling packet overhead formats can be used such as but not limited to VXLAN (Virtual Extensible Local Area Network), GRE (Generic Routing Encapsulation), NVGRE (Network Virtualization using Generic Routing Encapsulation), STT (Stateless Transport Tunneling) and a L2TP (Layer 2 Tunneling Protocol), or using MPLS.

By creating a first topology-path and assigning a switching-identifier not using addressing, and creating a requested topology-path comprising of one or more topology-mappings and the first topology-path, additional actions can be performed. An example, but not limited to, of said switching-identifier not using addressing is a Differentiated Services (DS) Code Point (CP). DS provides a relative Quality-of-Service (QoS) mechanism in networks. By creating a first topology-path and assigning a switching-identifier with a first DS CP value, and creating a second topology-path being a requested topology-path comprising of one or more topology-mappings and the first topology-path, physical nodes are instructed to perform forwarding according to said first DS CP value. An example of, but not limited to, DS is DiffServ in IPv4 and IPv6 networks. As an example, but not limited to, we consider physical nodes QC, QD, QE to support DS. By assigning a switching-identifier to topology-path J51 with value "DS-CP-1", instead of value "Source NC, Destination NE", compared to the previous example described above, the requested topology-path J52 traverses a DS-domain with Code Point value DS-CP-1 comprising of the topology-mapping named J26 and the topology-mapping named J27. Forwarding instructions are created using the method described above. As an example, but not limited to, the Differentiated Services Code Point CP DS-CP-1 could have been specified by a user of the SDN Compiler. As an example, but not limited to, we consider the packet overhead of a packet at topology-mapping J3, being a physical link, from physical node QC to physical node QD. As shown in FIG. 61E, the set of edge-relationships of the topology-mapping named J3 is J3/J26/J51/J52, resulting in a packet overhead shown in FIG. 61H, which includes DS-CP-1 added to the packet header by physical node QC. Physical node QC is typically referred to as the ingress DS node and would typically perform packet classification and marking A DS region consisting of one or more DS domains can be realized using above method. In a DS region a first DS domain is connected to a second DS domain through a topology-mapping from an egress DS network in the first DS domain to an ingress DS network in the second DS domain. Note that above DS method is based on a topology-path from a source network to a destination network, contrasted with destination-only forwarding in current IPv4 or IPv6 networks. Also, the SDN Compiler has a complete view of the network, which an ingress DS node in current IPv4 of IPv6 networks does not have. Therefore, DS traffic classification can be based on the capabilities of physical and virtual resources along a topology-path as known by the SDN Compiler providing a more advanced DS classification than in current IPv4 or IPv6 networks. Further, since the SDN Compiler has a complete view of the network including DS when assigned to a topology-path from a source network to a destination network, the SDN Compiler can verify expected behavior by comparing measurement of packet forwarding along a topology-path with the DS of the topology-path.

As described above an example virtual switch node HB of FIG. 14A illustrates Network Functions Virtualization (NFV), in which a virtual switch node could perform optional operations such as but not limited to monitoring and/or recording and/or buffering and/or modifying of the incoming packet header and/or payload before forwarding the packet to one or more of it's output ports, or blocking an incoming packet. Said additional optional operations could be specified by a user of the SDN Compiler. As an example, but not limited to, we consider a logical network comprising of logical nodes NA, NB, NE, NF as shown in FIG. 61I. Logical nodes NA, NB, NE, NF are mapped to physical nodes QA, QB, QE, QF respectively through depth-mappings. Topology-mappings named J24 and J28 were FIG. 61B as well. Topology-mapping J53 is created using the first method to create topology-mappings and comprises of a concatenation of the depth-mapping named J8, the topology-mappings named J2, J3, J4 and the depth-mapping named J13. Topology-path J54 comprises of a concatenation of topology-mappings J24, J53, J28. Physical node QB performs "action 1" on an incoming packet, physical node QC performs "action 2" on an incoming packet, physical node QE performs "action 3" and "action 4" on an incoming packet. In order to apply action in accordance with the logical network layout an action should only be performed by a physical node if the logical node mapped to said physical node through a depth-mapping is traversed, in other words if the recursive-path comprises said logical node. In such case the SDN Compiler will have to specify said action as part of the forwarding instructions. As an example, but not limited to, in the network of FIG. 61I for a requested topology-path named J54 the SDN Compiler will instruct physical node QB to perform "action 1" and instruct physical node QE to perform "action 3" and "action 4". Alternatively, as an example, but not limited to, an action could only be performed by a physical node if the logical node mapped to said physical node through a depth-mapping is traversed and the user of the SDN Compiler has specified an action associated with a logical node which will be performed by a physical node mapped to said logical node. In such case the SDN Compiler will have to specify said action as part of the forwarding instructions. As an example, but not limited to, in the network of FIG. 61I for a requested topology-path named J54 and "action 1" of logical node NB and "action 3" of logical node NE specified by the user of the SDN Compiler, the SDN Compiler will instruct physical node QB to perform "action 1" and instruct physical node QE to perform "action 3". Note that the ability to specify an action to be performed by a physical node results in more control over a network than current networks. Note that the above described actions are performed directly based on instructions from the SDN Compiler and not on the packet overhead of an incoming packet, such as in the case of Differentiated Services.

As understood by a person skilled in the art, the IPv4 and the IPv6 addressing scheme, being in widespread use, put some significant constraints on node mobility as both IPv4 and IPv6 use a single identifier to denote both a subnet, typically referred to as the subnet part of the IPv4- or IPv6-address and a point-of-attachment between a subnet and a node, typically referred to as the host part of the IPv4-address or the Interface Identifier of the IPv6-address. When using the logical naming hierarchy presented above to support a hierarchy of networks, as an example, but not limited to, a host part of an IPv4 (Internet Protocol version 4) address could be used to identify a logical node at h=0, while a network at h=1, a network-of-networks at h=2, etc could be denoted by Classless Inter-Domain Routing (CIDR) notation of the subnet of the IPv4 address. When using the logical naming hierarchy presented above to support a hierarchy of networks, the Interface Identifier of an IPv6 (Internet Protocol version 6) address could be used to identify the logical node, while a network at h=1, a network-of-networks at h=2, etc could be denoted by subnetting of the IPv6 Global Routing Prefix and/or Subnet Identifier address. This approach has severe limitations on mobility as it will only allow a node to migrate on it's subnet. In case a node is moved to another subnet it's IPv4 or IPv6 address will change causing any TCP/IP (Transmission Control Protocol/Internet Protocol) to break. Also, although not considered good practice, applications might use IPv4 of IPv6 addresses, therefore a migration resulting in a change of IPv4 or IPv6 address might impact applications. In order to support mobility of logical nodes within the network(s) controlled by the SDN Compiler, the logical node should be identified by a name unique within the network(s) being controlled by the SDN Compiler, or be globally unique to support global mobility. As an example, but not limited to, this can be realized in any of the followings ways:

a) Splitting the IPv6 address space into a part that denotes the network, network-of-networks, network-of-network-of-networks, etc. and a part that denotes the node b) Splitting the IPv4 address space into a part that denotes the network, network-of-networks, network-of-network-of-networks, etc. and a part that denotes the node c) Introducing an IPv4 or IPv6 address to denote the node and a second IPv4 or IPv6 address to denote the network, network-of-networks, network-of-network-of-networks, Approach c) is illustrated in FIG. 62A in which network NAAA has IPv4 subnet address 100.100.128/24, using CIDR notation, network NAA has IPv4 address 100.100.128.1, network NCC has IPv4 address 100.100.128.2, network NEE has IPv4 address 100.100.128.4. Node NA has IP address 200.200.200.1, node NB has IP address 200.200.200.2, node NC has IP address 200.200.200.3, node ND has IP address 200.200.200.4, node NE has IP address 200.200.200.5, node NF has IP address 200.200.200.6. Note that using CIDR results in a hierarchical addressing. As an example, but not limited, network NAAA at h=2 uses IP subnet address 100.100.128/24, when allowing for a maximum of 256 networks at h=2 connected to network NAAA through level-mappings addresses in the range 100.100.128.0 through 100.100.128.255 should be used. Note that in this example logical nodes NA, NB, NC, ND, NE, NF have been assigned an IP address to denote a node, not an subnet point-of-attachment. Alternatively, a subnet point-of-attachment could be denoted as illustrated in FIG. 52I and described above. As an example, but not limited to, in order to allow for interoperability with existing networking systems, computing systems and applications it is beneficial, in some cases mandatory, for a host node to have a single IP address denoting the node and not have a double address comprising of a first address denoting the network part and a second address denoting the node part. As an example, but not limited to, we would like logical node NA, which is mapped through a depth-mapping to physical node QA, physical node QA representing a third computing equipment, to use a single IPv4 address 200.200.200.1, while the complete address of node NA is 100.100.128.1 and 200.200.200.1 combined. Forwarding packets from node NA within network NAA to a node outside of network NAA will require the identifier of the source network, being 100.100.128.1, and the identifier of the destination network to be added to the packet. As an example, but not limited to, these two identifiers could be added in an IDN (Inter-Domain Node), interconnecting two domains. In the example network of FIG. 62A logical node NB is the only IDN of network NAA and logical node NE is the only IDN of network NEE. When sending a packet from node NA to a node NF, physical or virtual node QB, which is mapped to logical node NB through a depth-mapping, will have to add the source network address being 100.100.128.1 to an incoming packet and will have to add the destination network address 100.100.128.4. Also, when sending a packet from node NA to a node NF, physical or virtual node QE, which is mapped to logical node NE through a depth-mapping, will have to remove the source network address being 100.100.128.1 from an incoming packet and will have to remove the destination network address 100.100.128.4. In general, for a requested topology-level-path from a logical source node to a logical destination node our objective is the SDN Compiler to provide an instructions to add a source network address and/or a destination network address to the packet overhead in a first physical node and to remove said source network address and/or said destination network address from said packet overhead in a second physical node. As an example, but not limited to, this objective can be realized by creating a topology-path from a first logical node to a second logical node. Said first logical node being the logical node in which the first and/or second network has to be added, said second logical node being the logical node in which the first and/or second network has to be removed. By assigning an identifier to a topology-path which we will refer to as a double-addressing-identifier, the SDN Compiler can create additional actions for physical nodes to add a network address, to remove a network address or to forward upon a network address. FIG. 62B shows 4 actions to be added to the forwarding instructions of a physical node depending on the value of the relevant incoming set of edge-relationships and of the relevant outgoing set of edge-relationships, ER denoting Edge-Relationship. Relevant denoting that a double-addressing-identifier has been assigned to an edge at depth d, layer n, level h of a physical node for which the forwarding entry is created or at depth d, layer n, of a logical node which is mapped to said physical node through one or more depth-mappings. In case 1 a double-addressing-identifier is not present in the relevant incoming set of ER and is not present in the relevant outgoing set of ER no action has to be performed by the physical node. The physical node will forward packets based on source node and destination node address. In case 2 a double-addressing-identifier is not present in the relevant incoming set of ER and is present in the relevant outgoing set of ER an action to add a source network address and/or a destination network address has to be performed by the physical node. In case 3 a double-addressing-identifier is present in the relevant incoming set of ER and is present in the relevant outgoing set of ER an action to forward on a source network address and/or a destination network address has to be performed by the physical node. Alternatively, said physical node might have been instructed to always forward on an outer packet. In case 4 a double-addressing-identifier is present in the relevant incoming set of ER and is not present in the relevant outgoing set of ER an action to remove a source network address and/or a destination network address has to be performed by the physical node. The instruction to perform said actions is send from the SDN Compiler to said physical nodes. FIG. 62A illustrates this method. The recursive-path of topology-path J52 was calculated above and is shown in FIG. 61E. We assign a double-addressing-identifier to the topology-path named J51 with a value "source 100.100.128.1, destination 100.100.128.4", indicating that network address 100.100.128.1 should be added as a source network and network address 100.100.128.4 should be added as a destination network. We assign a switching-identifier to the topology-path named J52 with value "source 200.200.200.1, destination 200.200.200.6". FIG. 62C shows the relevant incoming set of edge-relationships, the relevant outgoing set of edge-relationships, ER denoting Edge-Relationship, and the action to be performed by each physical node. In this example, node QA, QB and QF forwarding packets on source address 200.200.200.1, denoting a node and destination address 200.200.200.6. Node QC adds source network address 100.100.128.1 and destination network address 100.100.128.4 to an incoming packet from source node NA to destination node NF. Node QD forwards an incoming packet from source node NA to destination node NF on source address 100.100.128.1 and 200.200.200.1, and destination address 100.100.128.4 and 200.200.200.6. Node QE removes source network address 100.100.128.1 and destination network address 100.100.128.4 from an incoming packet from source node NA to destination node NF. Note that within physical node QC incoming packets are encapsulated and in physical node QE incoming packets are decapsulated. Note that this approach looks similar to tunneling. It is not tunneling however, but rather completing and incomplete address with a network part of the address that is missing. As an alternative an IPv6 address can be used to identify a node and an IPv6 address can be used to identify a network which is not a node. As another alternative an IPv4 address can be used to identify a node and an IPv6 address can be used to identify a network which is not a node. As another alternative an IPv6 address can be used to identify a node and an IPv4 address can be used to identify a network which is not a node. The above combinations of IPv4 and IPv6 addressing could be used in migration scenarios from IPv4 to IPv6. Various existing packet formats can be used to implement the above methods. A packet format is needed that allows for encapsulating an IPv4 or IPv6 packet with an outer header containing an IPv4 or IPv6 source and destination address. Examples of such packets formats, but not limited to, are GRE (Generic Routing Encapsulation), NVGRE (Network Virtualization using Generic Routing Encapsulation), LISP (Locator/Identifier Separation Protocol), VXLAN (Virtual eXtensible Local Area Network) and STT (Stateless Transport Tunneling Protocol). As another alternative as mentioned under a) above the IPv6 address space could be split into a part that denotes a network which is not a node and a part that denotes a node. Within an IPv6 address the Interface Identifier of an IPv6 address could be used to identify the logical node, while the remainder of the address, consisting of networks that are not nodes, could be denoted by subnetting of the IPv6 Global Routing Prefix and/or Subnet Identifier address. To allow for mobility a node could use as its IPv6 address an IPv6 Interface Identifier identifying the node and a special value denoting 'unspecified' as IPv6 Global Routing Prefix or Subnet Identifier. In other words, the address only specifies the node, not the network the node is residing in. Therefore, higher layer protocols such as, but not limited to, TCP as well as applications are not impacted in case of migration of the node to another network. When sending packets from a source node to a destination node, an IDN in the source network and in the topology-level-path from the source node to the destination node can complete the IPv6 address source address of an incoming packet by overwriting the special value denoting 'unspecified' of the IPv6 Global Routing Prefix or Subnet Identifier, which was put in the packet by the source node, by a value denoting the source network. Also, the IDN can complete the IPv6 address destination address of the incoming packet by overwriting the special value denoting 'unspecified' of the IPv6 Global Routing Prefix or Subnet Identifier by a value denoting the destination network. Also, an IDN in the destination network can overwrite the value of the source IPv6 Global Routing Prefix or Subnet Identifier of an incoming packet by a value denoting 'unspecified' and can overwrite the value of the destination IPv6 Global Routing Prefix or Subnet Identifier of an incoming packet by a value denoting 'unspecified'. The destination node will receive a packet containing a source IPv6 Interface Identifier identifying the source node and a special value denoting 'unspecified' as source IPv6 Global Routing Prefix or Subnet Identifier. The destination node will receive a packet containing a destination IPv6 Interface Identifier identifying the destination node, being itself, and a special value denoting 'unspecified' as destination IPv6 Global Routing Prefix or Subnet Identifier. This approach allows for mobility of both the source node and the destination node. The same set of actions shown in FIG. 62B are to be performed by a physical node, only the format of the address has changed. Note that the above method allows for introducing mobility on the network layer and does not depend on VLANs or tunneling protocols. As the SDN Compiler has a complete view of a network it can calculate and send actions to physical devices to perform additional actions. By assigning identifiers with a specific purpose to a topology-path being a tunnel and by defining a set of actions based on the presence of said identifier at an incoming set of edge-relationships of incoming topology-mapping and on the presence of said identifier at an outgoing set of edge-relationships of an outgoing topology-mapping instructions for physical nodes to perform additional actions can be created by the SDN Compiler. This method has broader applicability than the double-address-identifier example given above. As an example, but not limited to, Network Address Translation (NAT) could be implement using this method. By naming a node instead of a point-of-attachment of a subnet as for example but not limited to, in case of a double-address-identifier, mobility can be supported as a node is identified by a node name, independent of the network said node is connect to through a level-mapping. By naming a node instead of a point-of-attachment of a subnet as for example but not limited to, in case of a double-address-identifier, multi-homing is supported. In case of multi-homing a node, typically but not limited to a host node, has a topology-mapping to two or more nodes, which typically reside in different networks. As the node is named packets can be sent over two or more topology-mappings using the same source address in packets at each of said topology-mappings. Also, as the node is named packets can be received from two or more topology-mappings using the same destination address in packets at each of said topology-mappings. The ability to provide multi-homing is an important property of a network as multi-homing improves availability and allows for load-balancing. Multi-homing in current IPv4 or IPv6 networks requires Border Gateway Protocol (BGP), leading to significant scaling issues in the current Internet. The above method allows for multi-homing without BGP and could reverse the trend of an ever-growing global routing table in the Internet. Above multi-homing of nodes has been explained. Note that networks at arbitrary level h can be multi-homed in the same manner as described above for nodes. Load-balancing can be implemented by creating multiple parallel topology-mappings or topology-paths and assigning a load-balancing identifier to each of said topology-mappings or topology-paths. As an example, but not limited to, each load-balancing identifier could be hash-value. The SDN Compiler can instruct a physical node to perform load-balancing on a particular hash-value. As will be understood by a person skilled in the art, various methods described above, such as for example but not limited to, forwarding in a hierarchy of networks, using policies specifying which paths are allowed, tunneling, label-switching, Differentiated Services based QoS, Integrated Services based QoS, performing additional actions in physical nodes, Double Addressing can also be applied to an overall network in which no logical nodes and networks are created.

We now consider multicasting and broadcasting. In the context of a packet-switched network we define multicasting as the sending of the same packet(s) from a single source network to two or more destination networks. In the context of a packet-switched network we define broadcasting within a network at level h+1 as the sending of the same packet(s) from a single source network at level h to all networks at level h within the network at level h+1 except the source network. As such, broadcasting is multicasting to all networks except the source network within a packet-switched network. In the context of a circuit-switched network we define multicasting as the sending of the same signal from a single source network to two or more destination networks. In the context of a circuit-switched network we define broadcasting within a network at level h+1 as the sending of the same signal from a single source network at level h to all networks at level h within the network at level h+1 except the source network. As such, broadcasting is multicasting to all networks except the source network within a circuit-switched network. Multicasting is an important function in current networks, e.g. but not limited to distribution of live video streaming, live audio streaming and video-conferencing. In current packet-switched networks, multicasting and broadcasting require protocols that are inherently complex to operate due to their distributed nature such as for example Protocol Independent Multicast (PIM) and Internet Group Management Protocol (IGMP). A centralized control of networks such as in SDN allows for a much simpler approach. The SDN Compiler method can be applied to create a multicast path by mapping multiple physical nodes to a single logical node. As an example, but not limited to, said logical node could be a destination node of a topology-path. FIG. 63A shows physical nodes QA, QB, QC, QD, QE, QF and logical nodes NA, NB, NC, NZ, depth-mappings, topology-mappings and topology-paths. Note that logical node NZ is mapped to physical node QD through a depth-mapping, logical node NZ is mapped to physical node QE through a depth-mapping and logical node NZ is mapped to physical node QF through a depth-mapping, In FIG. 63A only the depth-mappings relevant for the example are shown. FIG. 63B shows topology-mappings J1 through J5 and depth-mappings J6 through J10, J61, J62, J63 using the notation of FIG. 51A. The topology-mappings named J24, J25, J64 are created using the first method to create topology-mappings and are shown in FIG. 63C. As logical node NZ is mapped to physical node QD and to physical node QE and to physical node QF, topology-mapping J64 comprises of a first concatenation of the depth-mapping named J10, a first topology-path comprising of the topology-mapping named J3 and the depth-mapping named J61, and of a second concatenation of the depth-mapping named J10, a second topology-path comprising of the topology-mapping named J3 and the topology-mapping named J4, and the depth-mapping named J62, and of a third concatenation of the depth-mapping named J10, a third topology-path comprising of the topology-mapping named J3, the topology-mapping named J4 and the topology-mapping named J5, and the depth-mapping named J63. In FIG. 63C the "&" sign indicates the first concatenation, the second concatenation and the third concatenation. The first concatenation between brackets follows after the first "&" sign in FIG. 63C, the second concatenation between brackets follows after the second "&" sign and the third concatenation between brackets follows after the third "&" sign. In general, and not limited to this example, the "&" sign denotes a start of concatenation, said concatenation shown between brakes "( )", that is parallel to one or more other concatenations. FIG. 63D shows the notation used for a fourth edge with a fourth edge name, the fourth edge being of a fourth edge-type, and comprising of a first concatenation and a second concatenation in parallel. The series of dots in FIG. 63D indicating an arbitrary number of concatenations equal to or higher than two. Note that the first concatenation and the second concatenation or not limited to the concatenations shown in FIG. 63D but can be any concatenation of edges. The usage of the "&" sign is not limited to the example of FIG. 63C but can be used in general. Examples of the usage of the "&" sign include multicasting, broadcasting, load-balancing, a pre-calculated backup topology-level-path, multiple parallel circuits, such as for example but not limited to, a single topology-mapping from a first logical node to a second logical node comprising of multiple physical wavelengths in parallel using the first method to calculate topology-mappings. As shown in FIG. 63C a requested topology-path named J65 is created comprising of a concatenation of the topology-mapping named J24, the topology-mapping named J25 and the topology-mapping named J26. Using the above described method to calculate the recursive-path of the requested topology-path named J65 results in the recursive-path shown in FIG. 63E. Forwarding entries can be calculated from said recursive-path using the method described above to calculate forwarding entries for a physical packet-switching node or the method described above to calculate forwarding entries for a physical non-packet-switching node. As physical nodes QA, QB, QC, QD, QE, QF are packet-switching nodes the method described above to calculate forwarding entries for a physical packet-switching node is used in this example. FIG. 63F shows for each physical node in the recursive-path calculated from the requested topology-path named J65 an input port, an output port, relevant incoming set of edge-relationships and relevant outgoing set of edge-relationships. Note that the recursive-path contains one time "QC-(topmap p435:J3/J64/J65:p436)->QD-(depmap J61/J64/J65)->NZ)" resulting in a first forwarding entry, and contains two times "QC-(topmap p435:J3/J64/J65:p436)->QD-(topmap p437:J4/J64/J65:p438)->" resulting in a second forwarding entry. In other words an incoming packet at input port p436 matching switching-identifiers of the set of edge-relationships J3/J64/J65 is both dropped locally and forwarded to output port p437 in accordance with switching-identifiers of the set of edge-relationships J4/J64/J65. In case of a non-packet-switching physical node a physical signal is duplicated or splitted, such as for example, but not limited to, a WDM ROADM supporting drop-and-continue functionality, in which an incoming optical wavelength is splitted into a first signal and a second signal, said first signal being received locally and said second signal being multiplexed into an outgoing WDM signal, optionally after wavelength conversion. The method supports multicasting in packet-switched-networks, multicasting in non-packet-switched networks, broadcasting in packet-switched-networks and broadcasting in non-packet-switched networks. Broadcasting is realized by multicasting to all nodes in a network, except for the sending node. The method provides significant benefits over current multicast implementations based on a distributed control plane, such as for example but not limited to PIM.

In order to support multi-tenancy and to provide each tenant with its own address space, isolated from other tenants, the network at the highest hierarchy level in the namespace for each tenant should be globally unique to ensure isolation from other tenants. As an example, but not limited to, the highest hierarchy level could be an IPv6 flow label or could be an IPv4 identification field repurposed to denote a tenant. As will be understood by a person skilled in the art, much more complex topologies are supported by the SDN Compiler than the relatively simple topologies used in the examples above used to describe the SDN Compiler method. As will be understood by a person skilled in the art, various methods described above, such as for example but not limited to, multicasting, tunneling, label-switching, Differentiated Services based QoS, Integrated Services based QoS, performing additional actions in physical nodes, Double Addressing can be combined in a set of networks supported by the SDN Compiler.

It is to be understood that the invention is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

One aspect of the invention can for instance be worded as follows.

Method of controlling an overall network by a compiler based on a logical network model, the overall network comprising a first number of physical nodes and a second number of virtual nodes, said first number being equal to or larger than one, said second number being equal to or larger than zero, but said first and second numbers being such that their sum is at least two, the physical nodes being interconnected by physical links in accordance with a physical network layout, the logical network model comprising a third number of logical nodes, each logical node being indicated with a logical node name, each logical node name referring to at least one physical or at least one virtual node in the network, the method as performed by the compiler comprising the following actions:

a) Storing physical node names, each physical node name being an unique identifier of one physical node, and storing point-of-attachment names of said physical nodes, each of the point-of-attachment names of a physical node concerned being an unique identifier of a point-of-attachment between the certain physical node concerned and a physical link connecting the physical node concerned to another physical node;
b) Storing a physical forwarding point-of-attachment relation based on a directed graph representation and defining physical paths of said physical network in dependence on a physical forwarding policy of said physical network, on said physical node names, and on said point-of-attachment names of said physical nodes, a physical path denoting a physical route a packet follows from a physical source node to a physical destination node,
c) Storing virtual node names, storing a first mapping relation defining how said virtual nodes and said physical nodes are mapped to one another, and storing a second mapping relation defining how said logical nodes are mapped to the physical nodes and the virtual nodes, both said first and second mapping relations also being based on a directed graph representation and,
d) Transforming paths in said physical network to paths between a set of nodes comprising said physical nodes and virtual nodes in dependence on said physical forwarding point-of-attachment relation and on said first mapping relation, as well as transforming paths between said set of physical nodes and virtual nodes to possible link relationships between said logical nodes in dependence on said paths between said set of physical nodes and virtual nodes and on said second mapping relation;
e) Storing logical node names for said logical nodes and a set of logical links between said logical nodes;
f) Calculating a logical forwarding point-of-attachment relation based on a directed graph and defining logical paths in said logical network in dependence on a logical forwarding policy of said logical network, on said logical node names, and on said set of logical links between said logical nodes, a logical path denoting a logical route a packet follows from a logical source node to a logical destination node,
g) Creating forwarding table entries for said physical nodes and said virtual nodes from said logical forwarding point-of-attachment relation;
h) Sending said forwarding table entries, either directly or indirectly, to selected physical nodes and selected virtual nodes.

SUMMARY DEFINITIONS OF THE INVENTION

Now, summary definitions of the invention are provided, by quoting definitions as provided in the original PCT application.

The scope of the present invention is defined in the annexed claims. In a first aspect, the invention relates to the following method:

method of controlling an overall network by a compiler, based on a logical network model, the overall network comprising two or more physical nodes, the physical nodes being interconnected by physical links in accordance with a physical network layout, the logical network model comprising logical nodes, each logical node being indicated with a logical node name, each logical node name referring to at least one physical node in the network, the method as performed by the compiler comprising the following actions:

a) Storing physical node names, each physical node name being an unique identifier of one physical node, storing physical topology-mappings, each physical topology-mapping being one physical link in one direction, said physical topology-mapping being based on a directed graph representation, and storing point-of-attachment names of said physical nodes, each of the point-of-attachment names of a physical node concerned being an unique identifier of a point-of-attachment between the certain physical node concerned and a physical link connecting the physical node concerned to another physical node,
b) Storing logical node names for said logical nodes, each logical node name being an unique identifier of one logical node and storing depth-mappings, said depth-mappings at least defining how logical nodes are mapped to physical nodes, said depth-mapping being based on a directed graph representation,
c) Creating and storing one or more logical topology-mappings, each logical topology-mapping being a directed graph representation from a first logical node to a second logical node, calculated as a concatenation of a first depth-mapping from the first logical node to a first physical node, a physical topology-path from the first physical node to a second physical node and a second depth-mapping from the second physical node to the second logical node, said physical topology-path being a concatenation of one or more physical topology-mappings, d) Creating and storing a requested-topology-path being a concatenation of one or more logical topology-mappings, e) Calculating through recursion and storing a recursive-path for said requested-topology-path, comprising logical nodes as indicated by said logical node names, depth-mappings, physical nodes as indicated by said physical node names, physical topology-mappings, physical point-of-attachments as indicated by physical point-of-attachment names, said recursive-path being based on a directed graph representation, f) Creating forwarding table entries for physical nodes in said recursive-path from said recursive-path, g) Sending said forwarding table entries, either directly or indirectly, to physical nodes in said recursive-path.

In this first aspect, the method may comprise the following actions in a first example:

at action c) storing for each of said logical topology-mappings edge-relationships comprising a first edge-relationship being a relationship between the first depth-mapping and said logical topology-mapping, one or more second edge-relationships each second edge-relationship being a relationship between one of said one or more physical topology-mappings in said physical topology-path and said logical topology-mapping or a second edge-relationship being a relationship between said physical topology-path and said logical topology-mapping and one or more fourth edge-relationships each fourth edge-relationship being a relationship between one of said one or more physical topology-mappings and said physical topology-path, and a third edge-relationship being a relationship between the second depth-mapping and said logical topology-mapping, at action d) storing one or more further edge-relationships, each further edge-relationship concerned being a relationship between one logical topology-mapping within the requested-topology-path and said requested-topology-path, In this first example of the first aspect, the method may comprise the following actions:

at action e) of calculating and storing nested edge-relationships.

In a second example method of the first aspect said overall network may comprise a plurality of networks, said plurality of networks comprising a first set of networks comprising one or more networks (KA, KB, KC, KD) and said logical network model comprising a second set of networks comprising one or more networks (LA, LB, LC, LD), said first set of networks being grouped in one or more layers (n) and said second set of networks (LA, LB, LC, LD) being grouped in one or more layers n and at one or more depths d from said first set of networks (KA, KB, KC, KD), wherein each one of those networks (KA, KB, KC, KD) of said first set which are at a same layer n are related to one another by a topology-mapping, each one of those networks (KC, KD) of said first set which are at a higher layer than a minimum layer n=n_min(d), n_min(d) being a lowest layer at particular depth d and n_min(d) being=>0, are related to zero or more networks of said first set of networks at a preceding layer n−y with 0<y<=n−n_min(d), by a layer-mapping, each one of those networks of said second set of networks (LA, LB, LC, LD) which are at a first depth d=1 from said first set of networks (KA, KB, KC, KD) are related to one or more of said networks of said first set of networks (KA, KB, KC, KD) by a first depth-mapping, each one of those networks (LC, LD) of said second set of networks which are at a higher layer than minimum layer n=n_min are related to zero or more networks of said second set of networks at a preceding layer n−y with 0<y<=n−n_min, n_min being the lowest layer at particular depth d by a layer-mapping, and each one of those networks of said second set of networks which are at a second or higher depth d>=2 from said first set of networks (KA, KB, KC, KD) are related to one or more networks of said second set of networks at a preceding depth d−x with x larger than zero and smaller than or equal to d by a depth-mapping and/or are related to one or more networks of said first set of networks (KA, KB, KC, KD) by a depth-mapping, where each network of said first set of networks comprises one or more physical nodes and each network of said second set of networks comprises logical nodes.

In this second example method of the first aspect, at least one network of said first set of networks may be arranged as a first nested configuration of one or more networks at one or more levels h relating to one another by first level-mappings, networks of said first set of networks at a lowest level h=h_min being either a physical node or a virtual node, and networks at higher levels than lowest level h=h_min possibly being either a physical node or a virtual node, where h_min=<h=<h_max, h_max being a maximum level.

Also in this second example of the first aspect, at least one network of said second set of networks may be arranged as a second nested configuration of one or more networks at one or more levels h relating to one another by second level-mappings, networks of said second set of networks at a lowest level h=h_min being a logical node, and networks at higher levels than lowest level h=h_min possibly being a logical node, where h_min=<h=<h_max, h_max being a maximum level.

Here, calculating and storing a level-path may be a concatenation of level-mappings.

Alternatively, here, the following actions may be performed:

i. Calculating a topology-path from a source network LC at (d, n, h) to a destination network LD at (d, n, h) as a concatenation of one or more topology-mappings from an arbitrary first network at (d, n, h) to an arbitrary second network at (d, n, h) within a first higher level network LCC at (d, n, h+1) determined by a forwarding policy of said higher level network LCC, ii. If n>0 calculating a topology-mapping from said source network LC at (d, n, h) to said destination network LD at (d, n, h) as a concatenation of a layer-mapping from said source network LC at (d, n, h) to a first network LA at (d, n−1, h), a topology-path from said first network LA at (d, n−1, h) to a second network LB at (d, n−1, h) and a layer-mapping from said second network LB at (d, n−1, h) to said destination network LD at (d, n, h), the topology-path from said first network LA at (d, n−1, h) to said second network LB at (d, n−1, h) being a concatenation of one or more topology-mappings from an arbitrary first network at (d, n−1, h) to an arbitrary second network at (d, n−1, h) within a second higher level network LAA at (d, n−1, h+1) determined by a forwarding policy of said second higher level network LAA, iii. If d>0 calculating a topology-mapping from said first network LA at (d, n−1, h) to said second network LB at (d, n−1, h) as a concatenation of a depth-mapping from said first network LA at (d, n−1, h) to a third network KA at (d−1, n−1, h), a topology-path from said third network KA at (d−1, n−1, h) to a fourth network KB at (d−1, n−1, h) and a depth-mapping from said fourth network KB at (d−1, n−1, h) to said second network LB at (d, n−1, h), the topology-path from said third network KA at (d−1, n−1, h) to said fourth network KB at (d−1, n−1, h) being a concatenation of one or more topology-mappings from an arbitrary first network at (d−1, n−1, h) to an arbitrary second network at (d−1, n−1, h) within a third higher level network KAA at (d−1, n−1, h+1) determined by a forwarding policy of said third higher level network KAA, iv. If d>0 and n>0 calculating a layer-mapping from said source network LC at (d, n, h) to said first network LA at (d, n−1, h) as a concatenation of a depth-mapping from said source network LC at (d, n, h) to a fifth network KC at (d−1, n, h), a layer-mapping from said fifth network KC at (d−1, n, h) to said third network KA at (d−1, n−1, h) and a depth-mapping from said third network KA at (d−1, n−1, h) to said first network LA at (d, n−1, h) and calculating a layer-mapping from said second network LB at (d, n−1, h) to said destination network LD at (d, n, h) as a concatenation of a depth-mapping from said second network LB at (d, n−1, h) to said fourth network KB at (d−1, n−1, h), a layer-mapping from said fourth network KB at (d−1, n−1, h) to a sixth network KD at (d−1, n, h) and a depth-mapping from said sixth network KD at (d−1, n, h) to said destination network LD at (d, n, h), In a third example method of the first aspect, the method may comprise the following actions:

Calculating and storing a topology-mapping from a first network at (d, n1, h) to a second network at (d, n1, h) as a concatenation of a depth-mapping from said first network to a third network at (d−x, n2, h), a topology-level-path from said third network to a fourth network at (d−x, n2, h) and a depth-mapping from said fourth network to said second network with x being larger than zero and smaller than or equal to d, where n1 may be equal to n2.

In an alternative to this third example method, the method may comprise the following actions:

Calculating and storing a topology-mapping from a first network at (d, n, h) to a second network at (d, n, h) as a concatenation of a layer-mapping from said first network to a third network at (d, n−y, h), a topology-level-path from said third network to a fourth network at (d, n−y, h) and a layer-mapping from said fourth network to said second network with y being larger than zero and smaller than or equal to n−n_min(d).

In a further alternative to this third example, the method may comprise the following actions:

Calculating and storing a layer-mapping from a first network at (d, n1, h) to a second network at (d, n1−y, h) as a concatenation of a depth-mapping from said first network to a third network at (d−x, n2, h), a layer-mapping from said third network to a fourth network at (d−x, n2−y, h) and a depth-mapping from said fourth network to said second network with x larger than zero and smaller than or equal to d, with y larger than zero and smaller than or equal to n1−n1_min and smaller than or equal to n2−n2_min, n1_min being the lowest layer at depth d, n2_min being the lowest layer at depth d−x.

In a still further alternative to this third example, the method may comprise the following actions:

Calculating and storing a layer-mapping from a first network at (d, n1, h) to a second network at (d, n1+y, h) as a concatenation of a depth-mapping from said first network to a third network at (d−x, n2, h), a layer-mapping from said third network to a fourth network at (d−x, n2+y, h) and a depth-mapping from said fourth network to said second network with x larger than zero and smaller than or equal to d, with y larger than zero and smaller than or equal to n1_max−n1 and smaller than or equal to n2_max−n2, n1_max being the highest layer at depth d, n2_max being the highest layer at depth d−x.

In the second example method of the first aspect, the method may comprise the following actions:

Calculating and storing a topology-mapping from a first network at (d, n, h) to a second network at (d, n, h) as a concatenation of one or more level-mappings with decreasing level from the first network to a third network at (d, n, h−z), a topology-path from the third network to a fourth network at (d, n, h−z) and one or more level-mappings with increasing level from the fourth network to the second network, with z larger than zero and smaller than or equal to h−h_mind, n), h_mind, n) being the lowest level at depth d and layer n.

Also, in the second example of the first aspect, the method may comprise the following actions:

Replacing a level-path from a first network at (d, n, h) to a second network at (d, n, h−z) by a concatenation of zero or more level-mappings with decreasing level from the first network to a third network at (d, n, h−z) and storing such level-mappings, a topology-path from the third network to the second network and storing such topology-path, with z equal to or larger than zero and smaller than or equal to h−h_min, h_min being the lowest level at particular depth d and particular layer n.

Also, in the second example of the first aspect, the method may comprise the following actions:

Replacing a level-path from a first network at (d, n, h) to a second network at (d, n, h+z) by a concatenation of a topology-path from the first network to a third network at (d, n, h) and storing such topology-path and zero or more level-mappings with increasing level from the third network to the second network and storing such level-mappings, with z equal to or larger than zero and smaller than or equal to h_max−h−1, h_max being the highest level at particular depth d and particular layer n.

In the third example of the first aspect, the method may comprise the following actions:

creating a requested mapping from a first network at (d1, n3, h1) to second network at (d2, n4, h2) by:

i. if d1< >d2 creating a depth-mapping directly, ii. else if d1=d2 and n3< >n4 creating a layer-mapping, ii.i if d1=0 creating a layer-mapping directly, ii.ii else if d1>0 and n3>n4 creating a layer-mapping, ii.iii else if d1>0 and n3<n4 creating a layer-mapping, iii. else if d1=d2 and n3=n4 and h1< >h2 creating a level-mapping directly, iv. else if d1=d2 and n3=n4 and h1=h2 creating a topology-mapping, iv.i if d1=0 and h1=h_min and topology-mapping is a physical connection creating a topology-mapping directly, iv.ii else if d1>0 and n3=n_min and h1=h_min creating a topology-mapping, n_min being the lowest layer at depth d1, h_min being the lowest level at depth d1 and layer n3, iv.iii else if n3>n_min and h1=h_min creating a topology-mapping, n_min being the lowest layer at particular depth d1, h_min being the lowest level at depth d1 and layer n3, iv.iv else if h1>h_min creating a topology-mapping, h_min being the lowest level at depth d1 and layer n3.

In the third example of the first aspect, the method may also comprise the following actions:

When performing the method, storing an edge-relationship between the zero or more level-mappings and the name of the common level-path in the set of edge-relationships of the level-mappings the level-path from the first network to the second network comprises of and storing an edge-relationship between the topology-path or one or more topology-mappings said topology-path comprises of and the name of the common level-path in the set of edge-relationships of the level-mappings the level-path from the first network to the second network.

Here, the method may comprise the following actions:

Recalculating the second edge in an edge-relationship when the first edge in said edge-relationship is deleted or when a modification of said first edge results in a violation of the requirements of said second edge.

Alternatively, here, the method may comprise the following actions:

If the level of the source network of a first requested level-path is larger than the level of the source network of a second requested level-path and the destination network of the first requested level-path is equal to the destination network of the second requested level-path and the first requested level-path and the second requested level-path are related per edge-relationship "first requested level-path/second requested level-path", do not perform the calculation of the recursive-path of the second requested level-path following a level-mapping decreasing in level containing said edge-relationship "first requested level-path/second requested level-path" concatenated with a topology-mapping containing said edge-relationship "first requested level-path/second requested level-path", a level-mapping decreasing in level being a level-mapping from a first network at (d, n, h1) to a second network at (d, n, h2) with h1>h2.

As a further alternative, here, the method may comprise the following actions:

If the source network of a first requested level-path is equal to the source network of a second requested level-path and the level of the destination network of the first requested level-path is larger than the level of the destination network of the second requested level-path and the first requested level-path and the second requested level-path are related per edge-relationship "first requested level-path/second requested level-path", do not perform the calculation of the recursive-path of the second requested level-path before a topology-mapping containing said edge-relationship "first requested level-path/second requested level-path" concatenated with a level-mapping increasing in level containing said edge-relationship "first requested level-path/second requested level-path", a level-mapping increasing in level being a level-mapping from a first network at (d, n, h1) to a second network at (d, n, h2) with h1<h2.

In all examples, the method may comprise:

Calculating forwarding entries for a physical packet-switching node, referred to as node in below method, within the recursive-path of a requested-path by performing the below method comprising the following actions:

i. if the recursive-path does not contain an incoming topology-mapping or an incoming layer-mapping for said node, and said node is mapped to the source network of the recursive-path through one or more depth-mappings, creating for each outgoing topology-mapping and each outgoing layer-mapping of said node in said recursive-path a forwarding entry instructing said physical packet-switching node to create a packet with a packet overhead containing the switching-identifiers of the outgoing set of edge-relationships of said outgoing topology-mapping or said outgoing layer-mapping at depth, layer, level of said node and at depth, layer, level of all networks in the recursive-path mapped to said node through one or more depth-mappings, and send said packet out of an output port, said output port being a point-of-attachment between said node and said outgoing topology-mapping or said outgoing layer-mapping, ii. else if the recursive-path does not contain an outgoing topology-mapping or an outgoing layer-mapping for said node, and said node is mapped to the destination network of the recursive-path through one or more depth-mappings, creating for each incoming topology-mapping and each incoming layer-mapping of said node in said recursive-path a forwarding entry instructing said node to receive at an input port a packet in accordance with the switching-identifiers of the incoming set of edge-relationships of said incoming topology-mapping or said incoming layer-mapping at depth, layer, level of said node and at depth, layer, level of all networks in the recursive-path mapped to said node through one or more depth-mappings, said input port being a point-of-attachment of between said node and said incoming topology-mapping or said incoming layer-mapping, iii. else if the recursive-path does contain one incoming topology-mapping or one incoming layer-mapping for said node and the recursive-path does contain one or more outgoing topology-mappings or outgoing layer-mappings for said node, creating for each outgoing topology-mapping and each outgoing layer-mapping of said node in said recursive-path a forwarding entry instructing said node to receive an incoming packet at an input port, said input port being a point-of-attachment between said node and said incoming topology-mapping or said incoming layer-mapping specified by the recursive-path, said packet in accordance with the switching-identifiers of the incoming set of edge-relationships of said incoming topology-mapping or said incoming layer-mapping at depth, layer, level of said node and at depth, layer, level of all networks in the recursive-path mapped to said node through one or more depth-mappings and modify said packet in accordance with the switching-identifiers of the outgoing set of edge-relationships of said outgoing topology-mapping or said outgoing layer-mapping at depth, layer, level of said node and at depth, layer, level of all networks in the recursive-path mapped to said node through one or more depth-mappings, and forward said packet out of an output port, said output port being a point-of-attachment between said node and said outgoing topology-mapping or said outgoing layer-mapping.

Alternatively, in all examples of the first aspect, the method may comprise:

Calculating forwarding entries for a physical non-packet-switching node, referred to as node in below method, within the recursive-path of a requested-path by performing the below method comprising the following actions:

i. if the recursive-path does not contain an incoming topology-mapping or an incoming layer-mapping for said node, and said node is mapped to the source network of the recursive-path through one or more depth-mappings, creating for each outgoing topology-mapping and each outgoing layer-mapping of said node in said recursive-path an instruction instructing said node to create a signal in accordance with the switching-identifiers of the outgoing set of edge-relationships of said outgoing topology-mapping or said outgoing layer-mapping at depth, layer, level of said node and at depth, layer, level of all networks in the recursive-path mapped to said node through one or more depth-mappings, and send said signal out of an output port, said output port being a point-of-attachment between said node and said outgoing topology-mapping or said outgoing layer-mapping, ii. else if the recursive-path does not contain an outgoing topology-mapping or an outgoing layer-mapping for said node, and said node is mapped to the destination network of the recursive-path through one or more depth-mappings, creating for each incoming topology-mapping and each incoming layer-mapping of said node in said recursive-path an instruction instructing said node to receive at an input port a signal in accordance with the switching-identifiers of the incoming set of edge-relationships of said incoming topology-mapping or said incoming layer-mapping at depth, layer, level of said node and at depth, layer, level of all networks in the recursive-path mapped to said node through one or more depth-mappings, said input port being a point-of-attachment of between said node and said incoming topology-mapping or said incoming layer-mapping, iii. else if the recursive-path does contain one incoming topology-mapping or one incoming layer-mapping for said node and the recursive-path does contain one or more outgoing topology-mappings or outgoing layer-mappings for said node, creating for each outgoing topology-mapping and each outgoing layer-mapping of said node in said recursive-path an instruction instructing said node to receive an incoming signal at an input port, said input port being a point-of-attachment between said node and said incoming topology-mapping or said incoming layer-mapping specified by the recursive-path, said signal in accordance with the switching-identifiers of the incoming set of edge-relationships of said incoming topology-mapping or said incoming layer-mapping at depth, layer, level of said node and at depth, layer, level of all networks in the recursive-path mapped to said node through one or more depth-mappings and modify said signal in accordance with the switching-identifiers of the outgoing set of edge-relationships of said outgoing topology-mapping or said outgoing layer-mapping at depth, layer, level of said node and at depth, layer, level of all networks in the recursive-path mapped to said node through one or more depth-mappings, and forward said signal out of an output port, said output port being a point-of-attachment between said node and said outgoing topology-mapping or said outgoing layer-mapping Here, the method may comprise the following actions:

Assigning an identifier to a topology-path by a user and defining actions based on the presence of said identifier at an incoming set of edge-relationships of incoming topology-mapping and on the presence of said identifier at an outgoing set of edge-relationships of an outgoing topology-mapping by a user and instructing physical nodes to perform said actions by the SDN Compiler.

In the first aspect, the method may include in action g), sending said forwarding table entries to a software defined network, SDN, controller arranged to control said network.

In the method a requested topology-level-path from a first network at h>h_min(d, n) to a second network may result in forwarding entries for nodes connected to said first network through one or more level-mappings.

In the method a requested topology-level-path from a first network to a second network at h>h_min(d, n) may result in forwarding entries for nodes connected to said second network through one or more level-mappings.

The method may comprise the following actions:

Performing an additional operation on a packet by a physical node if a recursive-path contains a first depth-mapping from said physical node to a logical node directly followed by a second depth-mapping from said logical node to said physical node.

In the method the topology-mappings may be created between nodes at the application layer.

In the method an overall network may comprise of packet-switching nodes and non-packet-switching nodes.

In the method a service may be specified as a topology-level-path from a first network to a second network, said topology-level-path complying with a set of requirements.

In the method a physical node may be mapped to more than one logical node through a depth-mapping resulting in multicasting.

In the method a first topology-mapping between a first physical node and a second physical node may be removed and a second topology-mapping between said second physical node and a third physical node may be created resulting in mobility of said second physical node.

In all examples of the method networks, mappings and topology-level-paths may be stored in a graph database, said networks being stored as a named vertex in said graph database, said mappings being stored as a named and directed edge in said graph database, said topology-level-paths being stored as a named and directed edge in said graph database, properties of said networks being stored as vertex attributes in said graph database, properties of said mappings being stored as edge attributes in said graph database, properties of said topology-level-paths being stored as edge attributes in said graph database, types of mapping being stored as an edge type in said graph database, and types of topology-level-paths being stored as an edge type in said graph database.

In this latter embodiment, in the method the creation and recalculation of mappings and topology-level-paths may be implemented by querying a graph database.

In a second aspect, the invention relates to a method of controlling an overall network by a compiler based on a logical network model, the overall network comprising two or more physical nodes, the physical nodes being interconnected by physical links in accordance with a physical network layout, the logical network model comprising logical nodes, each logical node being indicated with a logical node name, each logical node name referring to at least one physical node in the network, the method as performed by the compiler comprising the following actions:

a) Storing physical node names, each physical node name being an unique identifier of one physical node, and storing point-of-attachment names of said physical nodes, each of the point-of-attachment names of a physical node concerned being an unique identifier of a point-of-attachment between the certain physical node concerned and a physical link connecting the physical node concerned to another physical node;

b) Storing logical node names for said logical nodes and storing a second mapping relation, said second mapping relation at least defining how logical nodes are mapped to physical nodes, said second mapping relation being based on a directed graph representation;

c) Transforming paths between physical nodes to logical link relationships between said logical nodes in dependence on a physical forwarding point-of-attachment relation and on said second mapping relation, said physical forwarding point-of-attachment relation based on a directed graph representation and defining physical paths of said physical network in dependence on a physical forwarding policy of said physical network, on said physical node names, and on said point-of-attachment names of said physical nodes, said logical link relationships also being based on a directed graph representation;

d) Calculating a logical forwarding point-of-attachment relation based on a directed graph and defining logical paths in said logical network in dependence on a logical forwarding policy of said logical network, on said logical node names, and on said set of logical links between said logical nodes, said logical forwarding point-of-attachment relation also being based on a directed graph representation;

e) Creating forwarding table entries for said physical nodes from said logical forwarding point-of-attachment relation, using logical node names for forwarding;

f) Sending said forwarding table entries, either directly or indirectly, to selected physical nodes.

In a first example of the second aspect, the method includes:

said overall network comprising a first number of physical nodes and a second number of virtual nodes, each logical node name referring to at least one physical or at least one virtual node in the network storing virtual node names, storing a first mapping relation defining how said virtual nodes and said physical nodes are mapped to one another said first mapping relation being based on a directed graph representation;

in action b) storing a second mapping relation defining how said logical nodes are mapped to the physical nodes and the virtual nodes, said second mapping relation also being based on a directed graph representation;

in action c) Transforming paths between said set of physical nodes and virtual nodes to logical link relationships between said logical nodes in dependence on paths between said set of physical nodes and virtual nodes and on said second mapping relation, said paths between a set of nodes comprising said physical nodes and virtual nodes in dependence on said physical forwarding point-of-attachment relation and on said first mapping relation, in action c) a physical path denoting a physical route a packet follows from a physical source node to a physical destination node, in action d) a logical path denoting a logical route a packet follows from a logical source node to a logical destination node in action e) creating forwarding table entries for said virtual nodes from said logical forwarding point-of-attachment relation, in action f) Sending said forwarding table entries, either directly or indirectly, to selected virtual nodes.

In a second example of the second aspect, the method comprises the following actions:

at action c) storing for each of said logical topology-mappings edge-relationships comprising a first edge-relationship being a relationship between the first depth-mapping and said logical topology-mapping, one or more second edge-relationships each second edge-relationship being a relationship between one of said one or more physical topology-mappings in said physical topology-path and said logical topology-mapping or a second edge-relationship being a relationship between said physical topology-path and said logical topology-mapping and one or more fourth edge-relationships each fourth edge-relationship being a relationship between one of said one or more physical topology-mappings and said physical topology-path, and a third edge-relationship being a relationship between the second depth-mapping and said logical topology-mapping, at action d) storing one or more further edge-relationships, each further edge-relationship concerned being a relationship between one logical topology-mapping within the requested-topology-path and said requested-topology-path, In the second example of the second aspect, the method may comprise the following action:

calculating and storing nested edge-relationships,

In a third example of the second aspect, in action h), said forwarding table entries are sent to a software defined network, SDN, controller arranged to control said network.

In the method of the second aspect said action b) may comprise calculating said physical forwarding point-of-attachment relation by said compiler before storing said physical forwarding point-of-attachment relation.

In the method of the second aspect said overall network may comprise a plurality of networks, said plurality of networks comprising a first set of networks comprising one or more networks (KA, KB, KC, KD) and said logical network model comprising a second set of networks comprising one or more networks (LA, LB, LC, LD), said first set of networks being grouped in one or more layers (n) and said second set of networks (LA, LB, LC, LD) being grouped in one or more layers n and at one or more depths d from said first set of networks (KA, KB, KC, KD), wherein each one of those networks (KA, KB, KC, KD) of said first set which are at a same layer n are related to one another by a topology-mapping, each one of those networks (KC, KD)

of said first set which are at a higher layer than a minimum layer n=n_min(d), n_min(d) being a lowest layer at particular depth d and n_min(d) being=>0, are related to zero or more networks of said first set of networks at a preceding layer n−y with 0<y<=n−n_min(d), by a layer-mapping, each one of those networks of said second set of networks (LA, LB, LC, LD) which are at a first depth d=1 from said first set of networks (KA, KB, KC, KD) are related to one or more of said networks of said first set of networks (KA, KB, KC, KD) by a first depth-mapping, each one of those networks (LC, LD) of said second set of networks which are at a higher layer than minimum layer n=n_min are related to zero or more networks of said second set of networks at a preceding layer n−y with 0<y<=n−n_min, n_min being the lowest layer at particular depth d by a layer-mapping, and each one of those networks of said second set of networks which are at a second or higher depth d>=2 from said first set of networks (KA, KB, KC, KD) are related to one or more networks of said second set of networks at a preceding depth d−x with x larger than zero and smaller than or equal to d by a depth-mapping and/or are related to one or more networks of said first set of networks (KA, KB, KC, KD) by a depth-mapping, where each network of said first set of networks comprises one or more physical nodes and each network of said second set of networks comprises logical nodes.

Here, in the method of the second aspect at least one network of said first set of networks may be arranged as a first nested configuration of one or more networks at one or more levels h relating to one another by first level-mappings, networks of said first set of networks at a lowest level h=h_min being either a physical node or a virtual node, and networks at higher levels than lowest level h=h_min possibly being either a physical node or a virtual node, where h_min=<h=<h_max, h_max being a maximum level.

In the method of the second aspect at least one network of said second set of networks may be arranged as a second nested configuration of one or more networks at one or more levels h relating to one another by second level-mappings, networks of said second set of networks at a lowest level h=h_min being a logical node, and networks at higher levels than lowest level h=h_min possibly being a logical node, where h_min=<h=<h_max, h_max being a maximum level.

Here, the method of the second aspect may comprise the following actions:

i. Calculating a topology-path from a source network LC at (d, n, h) to a destination network LD at (d, n, h) as a concatenation of one or more topology-mappings from an arbitrary first network at (d, n, h) to an arbitrary second network at (d, n, h) within a first higher level network LCC at (d, n, h+1) determined by a forwarding policy of said higher level network LCC, ii. If n>0 calculating a topology-mapping from said source network LC at (d, n, h) to said destination network LD at (d, n, h) as a concatenation of a layer-mapping from said source network LC at (d, n, h) to a first network LA at (d, n−1, h), a topology-path from said first network LA at (d, n−1, h) to a second network LB at (d, n−1, h) and a layer-mapping from said second network LB at (d, n−1, h) to said destination network LD at (d, n, h), the topology-path from said first network LA at (d, n−1, h) to said second network LB at (d, n−1, h) being a concatenation of one or more topology-mappings from an arbitrary first network at (d, n−1, h) to an arbitrary second network at (d, n−1, h) within a second higher level network LAA at (d, n−1, h+1) determined by a forwarding policy of said second higher level network LAA, iii. If d>0 calculating a topology-mapping from said first network LA at (d, n−1, h) to said second network LB at (d, n−1, h) as a concatenation of a depth-mapping from said first network LA at (d, n−1, h) to a third network KA at (d−1, n−1, h), a topology-path from said third network KA at (d−1, n−1, h) to a fourth network KB at (d−1, n−1, h) and a depth-mapping from said fourth network KB at (d−1, n−1, h) to said second network LB at (d, n−1, h), the topology-path from said third network KA at (d−1, n−1, h) to said fourth network KB at (d−1, n−1, h) being a concatenation of one or more topology-mappings from an arbitrary first network at (d−1, n−1, h) to an arbitrary second network at (d−1, n−1, h) within a third higher level network KAA at (d−1, n−1, h+1) determined by a forwarding policy of said third higher level network KAA, iv. If d>0 and n>0 calculating a layer-mapping from said source network LC at (d, n, h) to said first network LA at (d, n−1, h) as a concatenation of a depth-mapping from said source network LC at (d, n, h) to a fifth network KC at (d−1, n, h), a layer-mapping from said fifth network KC at (d−1, n, h) to said third network KA at (d−1, n−1, h) and a depth-mapping from said third network KA at (d−1, n−1, h) to said first network LA at (d, n−1, h) and calculating a layer-mapping from said second network LB at (d, n−1, h) to said destination network LD at (d, n, h) as a concatenation of a depth-mapping from said second network LB at (d, n−1, h) to said fourth network KB at (d−1, n−1, h), a layer-mapping from said fourth network KB at (d−1, n−1, h) to a sixth network KD at (d−1, n, h) and a depth-mapping from said sixth network KD at (d−1, n, h) to said destination network LD at (d, n, h), In this latter embodiment, the method may comprise the following action after action iv:

v. Calculating a topology-path from said source network LC at (d, n, h) to said destination network LD at (d, n, h) as a concatenation of the topology-mappings, the layer-mappings and the depth-mappings calculated in actions i) till iv) while deleting any first specific depth-mapping from any first specific network to any second specific network that is directly followed by a second specific depth-mapping from said second specific network to said first specific network, and deleting any second specific depth-mapping from any second specific network to any first specific network that is directly preceded by a first specific depth-mapping from said first specific network to said second specific network, deleting the depth-mapping from said source network LC at (d, n, h) to said fifth network KC at (d−1, n, h), deleting the depth-mapping from said sixth network KD at (d−1, n, h) to said destination network LD, resulting in a concatenation of a layer-mapping from said fifth network KC at (d−1, n, h) to said third network KA at (d−1, n−1, h), a topology-path from said third network KA at (d−1, n−1, h) to said fourth network KB at (d−1, n−1, h) and a layer-mapping from said fourth network KB at (d−1, n−1, h) to said sixth network KD at (d−1, n, h).

The method of the first aspect may comprise the following action after action e):

Deleting depth-mappings from said recursive-path.

The method of the second aspect may comprise the following action after action d):

Deleting depth-mappings from said logical forwarding point-of-attachment relation.

The method of the second aspect may comprise:

in case all networks in the path calculated at action v) above referred to as 'calculated path', are nodes, calculating forwarding table entries for physical and virtual nodes by performing the following actions:

i1. For each node within the path of action v) referred to as 'calculated path', calculating one or more forwarding instructions, each forwarding instruction comprising of:
   - an input port: a point-of-attachment (PoA) of a topology-mapping or layer-mapping from a previous node in the calculated path, or "local" in case the node is a first node of the calculated path, indicating a packet is created by this node,
   - an output port: a point-of-attachment (PoA) of a topology-mapping or layer-mapping to a next node in the calculated path, or "local" in case the node is a last node of the calculated path, indicating a packet should be received by this node, Here, the method of the second aspect may comprise:

i2. For each packet-switching node, including within the forwarding instructions calculated at i1):
   - a logical source address: address of source network at action i) and at action e) above and at action d)
   - a logical destination address: address of destination network at action i) and at action e) and at action d).

Here, the method of the second aspect may also comprise:

i3. For each packet-switching node at layer n and the next node in the calculated path being a circuit-switching node at layer n−1, including within the forwarding instructions calculated at i1):
   - a Source Media Access Control (MAC): a point-of-attachment (PoA) of a layer-mapping to a next node in the calculated path,
   - a Destination Media Access Control (MAC): a input port point-of-attachment (PoA) of the next node at layer n in the calculated path, i4. For each packet-switching node at n=n_min and the next node in the calculated path being a node at layer n=n_min, including within the forwarding instructions calculated at i1):
   - a Source Media Access Control (MAC): a point-of-attachment (PoA) of a topology-mapping to a next node in the calculated path,
   - a Destination Media Access Control (MAC): an input port point-of-attachment (PoA) of the next node at layer n in the calculated path, in which n_min at d is the lowest layer at a particular depth d.

The method of the second aspect may also comprise:

i5. For each circuit-switching node within the path of action v) at layer n, including within the forwarding instructions calculated at i1):
   - Channel In: if a previous node is at layer n, including a channel identifier of a topology-mapping from a previous node in the calculated path,
   - Channel Out: if a next node is at layer n, including a channel identifier of a topology-mapping to a next node in the calculated path.

in which n_min at d is the lowest layer at a particular depth d.

The method of the second aspect may also comprise the following actions:

j1. Calculating a level-path from source network NA with source address NAAA.NAA.NA to destination network NF with destination address NAAA.NEE.NF consisting of a concatenation of a level-mapping from network NA at (d, n, h) to network NAA at (d, n, h+1), a level-mapping from network NAA at (d, n, h+1) to network NAAA at (d, n, h+2), a level-mapping from network NAAA at (d, n, h+2) to network NEE at (d, n, h+1) and a level-mapping from network NEE at (d, n, h+1) to network NF at (d, n, h), where the level of NAAA is referred to as h_max.

j2. Calculating cost of a cost-type k of topology-mappings at level h_max−1, replacing a topology-mapping from network NAA at (d, n, h+1) to network NCC at (d, n, h+1) by a concatenation of a level-mapping from network NAA at (d, n, h+1) to network NB at (d, n, h), a topology-mapping from network NB at (d, n, h) to network NC at (d, n, h) and a level-mapping from network NC at (d, n, h) to network NCC at (d, n, h+1).

j3. Replacing a topology-path from source network NAA at (d, n, h+1) to destination network NEE at (d, n, h+1) by a concatenation of one or more topology-mappings from an arbitrary first network at (d, n, h+1) to an arbitrary second network at (d, n, h+1) within higher level network NAAA at (d, n, h+2) determined by a forwarding policy of network NAAA.

j4. Replacing a topology-mapping from network NAA at (d, n, h+1) to network NCC at (d, n, h+1) by a concatenation of a level-mapping from network NAA at (d, n, h+1) to network NB at (d, n, h), a topology-mapping from network NB at (d, n, h) to network NC at (d, n, h) and a level-mapping from network NC at (d, n, h) to network NCC at (d, n, h+1).

j5. Replacing a level-path consisting of a level-mapping from network NC at (d, n, h) to network NCC at (d, n, h+1) and from network NCC at (d, n, h+1) to network ND at (d, n, h) by a topology-path from network NC at (d, n, h) to network ND at (d, n, h), creating a path from network NAA to network NEE consisting of a level-mapping from network NAA to network NB, a topology-mapping from network NB to network NC, a topology-mapping from network NC to network ND, a topology-mapping from network ND to network NE and a level-mapping from network NE to network NEE.

j6. Replacing a concatenation of the level-mapping from network NA at (d, n, h) to network NAA at (d, n, h+1) and the topology-mapping from network NAA at (d, n, h+1) to network NCC at (d, n, h+1) by a concatenation of a topology-path from network NA at (d, n, h) to network NC at (d, n, h) and a level-mapping from network NC at (d, n, h) to network NCC at (d, n, h+1) a path calculated at this step having source network NA and destination network NEE.

j7. Replacing a concatenation of the topology-mapping from network NCC at (d, n, h+1) to network NEE at (d, n, h+1) and the level-mapping from network NEE at (d, n, h+1) to network NF at (d, n, h) by a concatenation of a level-mapping from network NCC at (d, n, h+1) to network ND at (d, n, h) and a topology-path from network ND at (d, n, h) to network NF at (d, n, h), a path calculated at this step having source network NAA and destination network NF.

The method of the second aspect may comprise the following actions:

k. Start infinite loop.
   - k.i. Retrieve and store changes in network instances
      - k.ii. Retrieve and store changes in depth-, layer-, topology- and level-mapping instances k.iii. Retrieve and store changes in requested topology-paths k.iv. Create added topology-mappings at d>0 by performing if n>0 step ii else if n=0 step i3 and store depth-, layer-, and/or topology-mappings resulting from step ii. Create added layer-mappings at d>0 by performing step i4 and store depth- and/or layer-mappings resulting from step i4.

k.v. Recalculate topology-mappings at d>0 impacted by changes at step k.i and/or step k.ii by performing if n>0 step i2 else if n=0 step i3; if successful store depth-, layer-, and/or topology-mappings resulting from step i2 or step i3; if not successful delete impacted topology-mapping; recalculate layer-mappings at d>0 impacted by changes at step k.i and/or step k.ii by performing step i4; if successful store depth- and/or layer-mappings resulting from step i4; if not successful delete impacted layer-mapping.

k.vi. Optionally optimize due to changes at step k.i and/or step k.ii topology-mappings at d>0 by performing if n>0 step i2 else if n=0 step i3 and store depth-, layer-, and/or topology-mappings resulting from step i2 or step i3; optionally optimize due to changes at step k.i and/or step k.ii layer-mappings at d>0 by performing step i4 and store depth- and/or layer-mappings resulting from step i4 k.vii. Create added requested topology-paths by performing step i1 and store topology-mappings resulting from step i1. Remove topology-paths requested and created in an earlier iteration that are deleted due to changes at step k.iii.

k.viii. Recalculate topology-paths requested and created in an earlier iteration which are impacted by changes at step k.i and/or step k.ii by performing step i1; if successful store topology-mappings resulting from step i1; if not successful delete impacted topology-paths k.ix. Optionally optimize due to changes at step k.i and/or step k.ii topology-paths requested and created in an earlier iteration by performing step i1 and store topology-mappings resulting from step i1.

k.x. For each added, impacted or optimized requested topology-path and each topology-path of which the source network address and/or the destination network address has changed and each requested topology-path involving one or more topology-mappings and/or layer-mappings at d=0 of which one or more Point-of-Attachment (PoA's) have changed k.x.i Calculate the topology-path as a concatenation of depth-, layer-, topology- and/or level-mapping instances through recursion till topology-mappings and/or layer-mappings at d=0 k.x.ii Remove all concatenations of a depth-mapping from a first network at (d, n, h) to a second network at (d+1, n, h) and a depth-mapping from the second network to the first network k.x.iii Calculating forwarding entries by performing the following actions:

k.x.iii.i For each node at d=0 within the path of action k.x.ii) referred to as 'calculated path', calculating one or more forwarding instructions, each forwarding instruction comprising of:

an input port: a point-of-attachment (PoA) of a topology-mapping or layer-mapping from a previous node in the calculated path, or "local (source network)" in case the node is a first node of the calculated path, indicating a packet is created by this node, optionally using the name of the source network instead of "local".

an output port: a point-of-attachment (PoA) of a topology-mapping or layer-mapping to a next node in the calculated path, or "local (destination network)" in case the node is a last node of the calculated path, indicating a packet should be received by this node, optionally using the name of the destination network instead of "local".

k.x.iii.ii For each packet-switching node, including within the forwarding instructions calculated at k.x.iii.i):

a logical source address: address of source network at action k.x)

a logical destination address: address of destination network at action k.x)

k.x.iii.iii For each packet-switching node at layer n and the next node in the calculated path being a circuit-switching node at layer n−1, including within the forwarding instructions calculated at k.x.iii.i):

a Source Media Access Control (MAC): a point-of-attachment (PoA) of a layer-mapping to a next node in the calculated path, a Destination Media Access Control (MAC): a input port point-of-attachment (PoA) of the next node at layer n in the calculated path, k.x.iii.iv. For each packet-switching node at n=n_min and the next node in the calculated path being a node at layer n=n_min, including within the forwarding instructions calculated at k.x.iii.i):

a Source Media Access Control (MAC): a point-of-attachment (PoA) of a topology-mapping to a next node in the calculated path, a Destination Media Access Control (MAC): an input port point-of-attachment (PoA) of the next node at layer n in the calculated path, k.x.iii.v. For each circuit-switching node at layer n, including within the forwarding instructions calculated at k.x.iii.i):

Channel In: if a previous node is at layer n, including a channel identifier of a topology-mapping from a previous node in the calculated path, Channel Out: if a next node is at layer n, including a channel identifier of a topology-mapping to a next node in the calculated path.

in which n_min at d is the lowest layer at a particular depth d k.xi. For each deleted, impacted or optimized requested topology-path and each topology-path of which the source network address and/or the destination network address has changed and each requested topology-path involving one or more topology-mappings and/or layer-mappings at d=0 of which one or more PoA's have changed create one or more instructions to remove forwarding entries associated with currently installed requested topology-path k.xii. Distribute Forwarding Table Entries and/or instructions to remove forwarding table entries to:

at least one of a SDN controller and all networks being a node at d=0.

In the method of the second aspect physical/virtual networks and logical networks may be represented by nested matrices, in which an element of a matrix is a matrix itself representing a network.

In the method of the second aspect, multiplication of matrices in which a value of each element is a name of one of a point-of-attachment type mapping matrix, a point-of-attachment type forwarding matrix, a cost type mapping matrix and a cost type forwarding matrix may be carried out by standard matrix multiplication, using the following rules:

a result of a matrix multiplication is a sum of matrix multiplications at each element of a resulting matrix, as names of nested matrices are multiplied, each element of this sum of matrix multiplications resulting is stored in a separate row at an element of the resulting matrix, in case any operand in the matrix multiplication of at least one of point-of-attachment type mapping matrices and forwarding matrices is 0 (zero) a result of the matrix multiplication is 0 (zero), in case any operand in the matrix multiplication of at least one of cost type mapping matrices and forwarding matrices is ∞ (infinity) a result of the matrix multiplication is ∞ (infinity).

The method of the second aspect may comprise storing networks and topology-mappings, layer-mappings and depth-mappings in a graph database, in which each network is stored as a vertex, in which properties of each network are stored as a vertex-property, in which each topology-mapping, layer-mapping and depth-mapping is stored as an edge, in which properties of each topology-mapping, layer-mapping and depth-mapping are stored as an edge-property.

In all methods of the invention said physical node and virtual node in each layer may be either a packet-switching node or a circuit-switching node.

The method of the second aspect may further comprise storing a load-balancing identifier per set of logical source network and logical destination network and wherein action g) further comprises calculating the forwarding table entries using the load-balancing identifiers.

In all methods of the invention, an SDN Compiler may provide instructions to one or more packet forwarding devices and/or computing equipment regarding buffer-size of one or more input-buffers, buffer-size of one or more output-buffers, which one or more input-buffers to include in a scheduling group, which one or more output-buffers to include in a scheduling group and one or more scheduler schemes for one or more scheduling groups, a scheduling group being a set of one or more physical or virtual buffers to which a scheduling scheme is applied.

In all methods of the invention, one or more networks at depth d>0 may represent user requirements, in which one or more topology-mappings and/or layer-mappings and/or level-mappings represent user requirements, in which zero or more policies represent user requirements, in which the namespace of the one or more networks at depth d>0 is not used in a forwarding decision by a physical or virtual node.

In a third aspect, the invention relates to a method of controlling an overall network by a compiler, the overall network comprising two or more physical nodes, the physical nodes being interconnected by physical links in accordance with a physical network layout, the method as performed by the compiler comprising the following actions:

a) Storing physical node names, each physical node name being an unique identifier of one physical node, storing physical topology-mappings, each physical topology-mapping being one physical link in one direction, said physical topology-mapping being based on a directed graph representation, and storing point-of-attachment names of said physical nodes, each of the point-of-attachment names of a physical node concerned being an unique identifier of a point-of-attachment between the certain physical node concerned and a physical link connecting the physical node concerned to another physical node, b) Storing logical names for said physical nodes and/or for said physical topology-mappings and/or for said point-of-attachment, c) Creating and storing a requested-topology-path being a concatenation of one or more physical topology-mappings, and storing one or more further edge-relationships, each further edge-relationship concerned being a relationship between one physical topology-mapping within the requested-topology-path and said requested-topology-path, d) Calculating through recursion and storing a recursive-path for said requested-topology-path, comprising physical nodes as indicated by said physical node names, physical topology-mappings, physical point-of-attachments as indicated by physical point-of-attachment names, said recursive-path being based on a directed graph representation, e) Creating forwarding table entries for physical nodes in said recursive-path from said recursive-path and/or from logical names for said physical nodes and/or from said physical topology-mappings and/or from said point-of-attachment, f) Sending said forwarding table entries, either directly or indirectly, to physical nodes in said recursive-path.

In the third aspect, the method may comprise the following actions:

after action a) or action b), creating and storing one or more first physical topology-mappings, each first physical topology-mapping being a directed graph representation from a first physical node to a second physical node, calculated as a physical topology-path from the first physical node to a second physical node, said physical topology-path being a concatenation of one or more second physical topology-mappings, In the third aspect, the method may comprise the following actions:

storing for each of said first physical topology-mappings edge-relationships comprising one or more first edge-relationships each first edge-relationship being a relationship between one of said one or more first physical topology-mappings in said physical topology-path and said first physical topology-mapping or a first edge-relationships being a relationship between said physical topology-path and said first physical topology-mapping and one or more second edge-relationships each second edge-relationship being a relationship between one of said one or more second physical topology-mappings and said physical topology-path at action c) storing one or more further edge-relationships, each further edge-relationship concerned being a relationship between one logical topology-mapping within the requested-topology-path and said requested-topology-path, Here, the method may comprise the following action:

at action d) calculating and storing nested edge-relationships,

In a fourth aspect, the invention relates to a method of controlling an overall network by a compiler, the overall network comprising two or more physical nodes, the physical nodes being interconnected by physical links in accordance with a physical network layout, the method as performed by the compiler comprising the following actions:

a) Storing physical node names, each physical node name being an unique identifier of one physical node, storing physical topology-mappings, each physical topology-mapping being one physical link in one direction, said physical topology-mapping being based on a directed graph representation, and storing point-of-attachment names of said physical nodes, each of the point-of-attachment names of a physical node concerned being an unique identifier of a point-of-attachment between the certain physical node concerned and a physical link connecting the physical node concerned to another physical node, b) Creating and storing a requested-topology-path being a concatenation of one or more physical topology-mappings, and storing one or more further edge-relationships, each further edge-relationship concerned being a relationship between one physical topology-mapping within the requested-topology-path and said requested-topology-path, c) Calculating through recursion and storing a recursive-path for said requested-topology-path, comprising physical nodes as indicated by said physical node names, physical topology-mappings, physical point-of-attachments as indicated by physical point-of-attachment names, said recursive-path being based on a directed graph representation, and calculating and storing nested edge-relationships, d) Creating forwarding entries for physical nodes in said recursive-path from said recursive-path, e) Sending said forwarding entries, either directly or indirectly, to physical nodes in said recursive-path.

In the method of both the third and the fourth aspect said overall network may comprise a plurality of networks, said plurality of networks comprising a set of networks comprising one or more networks (KA, KB, KC, KD), said set of networks being grouped in one or more layers (n), wherein each one of those networks (KA, KB, KC, KD) of said set which are at a same layer n are related to one another by a topology-mapping, each one of those networks (KC, KD) of said set which are at a higher layer than a minimum layer n=n_min(d), n_min(d) being a lowest layer at particular depth d and n_min(d) being=>0, are related to zero or more networks of said set of networks at a preceding layer n−y with 0<y<=n−n_min(d), by a layer-mapping, where each network of said set of networks comprises one or more physical nodes.

In a fifth aspect, the invention relates to a compiler arranged to perform the method of any of the first to fourth aspects.

In a sixth aspect, the invention relates to an overall network comprising such a compiler.

In such an overall network, at least comprising at least one of a physical switch node and a virtual switch node, said at least one of said physical switch node and said virtual switch node being arranged to perform an additional operation on a received packet apart from forwarding said packet to an output port, said additional operation including at least one of a set of predetermined additional operations including monitoring a packet header, modifying said packet header, recording said packet header, monitoring a packet payload, modifying said packet payload, recording said packet payload, buffering the packet and blocking the packet.

The invention claimed is:

1. A method of controlling an overall network by a compiler, based on a logical network model, the overall network comprising two or more physical nodes, the two or more physical nodes being interconnected by physical links in accordance with a physical network layout, the logical network model comprising logical nodes, each logical node being indicated with a logical node name, each logical node name referring to at least one physical node in the network, the method as performed by the compiler comprising the following actions:

a) Storing physical node names, each physical node name being a unique identifier of one physical node, storing physical topology-mappings, each physical topology-mapping being one physical link in one direction, said physical topology-mapping being based on a directed graph representation, and storing point-of-attachment names of said physical nodes, each of the point-of-attachment names of a particular physical node being a unique identifier of a point-of-attachment between the particular physical node and a physical link connecting the particular physical node to another physical node, b) Storing logical node names for said logical nodes, each logical node name being a unique identifier of one logical node and storing depth-mappings, said depth-mappings at least defining how logical nodes are mapped to physical nodes, said depth-mapping being based on a directed graph representation, c) Creating and storing one or more logical topology-mappings, each logical topology-mapping being a directed graph representation from a first logical node to a second logical node, the one or more logical topology-mappings calculated as a concatenation of a first depth-mapping from the first logical node to a first physical node, a physical topology-path from the first physical node to a second physical node and a second depth-mapping from the second physical node to the second logical node, said physical topology-path being a concatenation of one or more physical topology-mappings, d) Creating and storing a requested-topology-path being a concatenation of one or more logical topology-mappings, e) Calculating a recursive-path as a concatenation of depth- and topology-mapping instances through recursion using the stored depth-mappings, logical topology-mappings, and physical topology-mappings, and storing said recursive-path for said requested-topology-path, said recursive-path comprising logical nodes as indicated by said logical node names, depth-mappings, physical nodes as indicated by said physical node names, physical topology-mappings, physical point-of-attachments as indicated by physical point-of-attachment names, said recursive-path being based on a directed graph representation, f) Creating forwarding table entries for physical nodes in said recursive-path from said recursive-path, g) Sending said forwarding table entries, either directly or indirectly, to physical nodes in said recursive-path.

2. The method according to claim 1, comprising the following actions:

at action c) storing for each of said logical topology-mappings edge-relationships comprising a first edge-relationship being a relationship between the first depth-mapping and said logical topology-mapping, one or more second edge-relationships each second edge-relationship being either i) a relationship between one of said one or more physical logical topology-mapping, or ii) a relationship between said physical topology-path and said logical topology-mapping and, when said second edge-relationship is said relationship between said physical topology-path and said logical topology-mapping, then, said edge-relationships also comprise one or more third edge-relationships, each third edge-relationship being a relationship between one of said one or more physical topology-mappings and said physical topology-path, and a fourth edge-relationship being a relationship between the second depth-mapping and said logical topology-mapping, at action d) storing one or more further edge-relationships, each further edge-relationship concerned being a relationship between one logical topology-mapping within the requested-topology-path and said requested-topology-path.

3. The method according to claim 2, comprising the following actions:

at action e) calculating and storing nested edge-relationships.

4. The method according to claim 3, wherein said overall network comprises a plurality of networks, said plurality of networks comprising a first set of networks comprising one or more networks (KA, KB, KC, KD) and said logical network model comprising a second set of networks comprising one or more networks (LA, LB, LC, LD), said first set of networks being grouped in one or more layers (n) and said second set of networks (LA, LB, LC, LD) being grouped in one or more layers n and at one or more depths d from said first set of networks (KA, KB, KC, KD), wherein each one of the networks (KA, KB, KC, KD) of said first set which are at a same layer n are related to one another by a topology-mapping, each one of the networks (KC, KD) of said first set which are at a higher layer than a minimum layer n=n_min(d), n_min(d) being a lowest layer at particular depth d and n_min(d) being=>0, are related to zero or more networks of said first set of networks at a preceding layer n−y with 0<y<=n−n_min(d), by a layer-mapping, each one of the networks of said second set of networks (LA, LB, LC, LD) which are at a first depth d=1 from said first set of networks (KA, KB, KC, KD) are related to one or more of said networks of said first set of networks (KA, KB, KC, KD) by a first depth-mapping, each one of the networks (LC, LD) of said second set of networks which are at a higher layer than minimum layer n=n_min are related to zero or more networks of said second set of networks at a preceding layer n−y with 0<y<=n−n_min, n_min being the lowest layer at particular depth d by a layer-mapping, and each one of the networks of said second set of networks which are at a second or higher depth d>=2 from said first set of networks (KA, KB, KC, KD) are related to one or more networks of said second set of networks at a preceding depth d−x with x larger than zero and smaller than or equal to d by a depth-mapping and/or are related to one or more networks of said first set of networks (KA, KB, KC, KD) by a depth-mapping, where each network of said first set of networks comprises one or more physical nodes and each network of said second set of networks comprises logical nodes.

5. The method according to claim 3, comprising the following actions:

Performing an additional operation on a packet by a physical node if a recursive-path contains a first depth-mapping from said physical node to a logical node directly followed by a second depth-mapping from said logical node to said physical node.

6. The method according to claim 2, wherein said overall network comprises a plurality of networks, said plurality of networks comprising a first set of networks comprising one or more networks (KA, KB, KC, KD) and said logical network model comprising a second set of networks comprising one or more networks (LA, LB, LC, LD), said first set of networks being grouped in one or more layers (n) and said second set of networks (LA, LB, LC, LD) being grouped in one or more layers n and at one or more depths d from said first set of networks (KA, KB, KC, KD), wherein each one of the networks (KA, KB, KC, KD) of said first set which are at a same layer n are related to one another by a topology-mapping, each one of the networks (KC, KD) of said first set which are at a higher layer than a minimum layer n=n_min(d), n_min(d) being a lowest layer at particular depth d and n_min(d) being=>0, are related to zero or more networks of said first set of networks at a preceding layer n−y with 0<y<=n−n_min(d), by a layer-mapping, each one of the networks of said second set of networks (LA, LB, LC, LD) which are at a first depth d=1 from said first set of networks (KA, KB, KC, KD) are related to one or more of said networks of said first set of networks (KA, KB, KC, KD) by a first depth-mapping, each one of the networks (LC, LD) of said second set of networks which are at a higher layer than minimum layer n=n_min are related to zero or more networks of said second set of networks at a preceding layer n−y with 0<y<=n−n_min, n_min being the lowest layer at particular depth d by a layer-mapping, and each one of the networks of said second set of networks which are at a second or higher depth d>=2 from said first set of networks (KA, KB, KC, KD) are related to one or more networks of said second set of networks at a preceding depth d−x with x larger than zero and smaller than or equal to d by a depth-mapping and/or are related to one or more networks of said first set of networks (KA, KB, KC, KD) by a depth-mapping, where each network of said first set of networks comprises one or more physical nodes and each network of said second set of networks comprises logical nodes.

7. The method according to claim 2, comprising the following actions:

Performing an additional operation on a packet by a physical node if a recursive-path contains a first depth-mapping from said physical node to a logical node directly followed by a second depth-mapping from said logical node to said physical node.

8. The method according to claim 1, wherein said overall network comprises a plurality of networks, said plurality of networks comprising a first set of networks comprising one or more networks (KA, KB, KC, KD) and said logical network model comprising a second set of networks comprising one or more networks (LA, LB, LC, LD), said first set of networks being grouped in one or more layers (n) and said second set of networks (LA, LB, LC, LD) being grouped in one or more layers n and at one or more depths d from said first set of networks (KA, KB, KC, KD), wherein each one of the networks (KA, KB, KC, KD) of said first set which are at a same layer n are related to one another by a topology-mapping, each one of the networks (KC, KD) of said first set which are at a higher layer than a minimum layer n=n_min(d), n_min(d) being a lowest layer at particular depth d and n_min(d) being=>0, are related to zero or more networks of said first set of networks at a preceding layer n−y with 0<y<=n−n_min(d), by a layer-mapping, each one of the networks of said second set of networks (LA, LB, LC, LD) which are at a first depth d=1 from said first set of networks (KA, KB, KC, KD) are related to one or more of said networks of said first set of networks (KA, KB, KC, KD) by a first depth-mapping, each one of the networks (LC, LD) of said second set of networks which are at a higher layer than minimum layer n=n_min are related to zero or more networks of said second set of networks at a preceding layer n−y with 0<y<=n−n_min, n_min being the lowest layer at particular depth d by a layer-mapping, and each one of the networks of said second set of networks which are at a second or higher depth d>=2 from said first set of networks (KA, KB, KC, KD) are related to one or more networks of said second set of networks at a preceding depth d−x with x larger than zero and smaller than or equal to d by a depth-mapping and/or are related to one or more networks of said first set of networks (KA, KB, KC, KD) by a depth-mapping, where each network of said first set of networks comprises one or more physical nodes and each network of said second set of networks comprises logical nodes.

9. The method according to claim 8, comprising the following actions:

Calculating and storing a topology-mapping from a first network at a depth d, a first layer n1 and a level h to a second network at said depth d, said first layer n1 and said level has a concatenation of a depth-mapping from said first network to a third network at a second depth d−x, a second layer n2 and said level h, a topology-level-path from said third network to a fourth network at said second depth d−x, said second layer n2 and said level h and a depth-mapping from said fourth network to said second network, with x being larger than zero and smaller than or equal to d, and wherein said first layer n1 may be equal to said second layer n2.

10. The method according to claim 8, comprising the following actions:

Calculating and storing a topology-mapping from a first network at a depth d, a first layer n and a level h to a second network at said depth d, said first layer n and said level has a concatenation of a layer-mapping from said first network to a third network at said depth d, a second layer n−y and said level h, a topology-level-path from said third network to a fourth network at said depth d, said second layer n−y and said level h and a layer-mapping from said fourth network to said second network, with y being larger than zero and smaller than or equal to n−n_min(d), wherein n_min(d) is a lowest layer at said depth d.

11. The method according to claim 8 wherein an overall network comprises of packet-switching nodes and non-packet-switching nodes.

12. The method according to claim 1, comprising the following actions:

Performing an additional operation on a packet by a physical node if a recursive-path contains a first depth-mapping from said physical node to a logical node directly followed by a second depth-mapping from said logical node to said physical node.

13. The method according to claim 1, wherein networks, mappings and topology-level-paths are stored in a graph database, said networks are stored as a named vertex in said graph database, said mappings are stored as a named and directed edge in said graph database, said topology-level-paths are stored as a named and directed edge in said graph database, properties of said networks are stored as vertex attributes in said graph database, properties of said mappings are stored as edge attributes in said graph database, properties of said topology-level-paths are stored as edge attributes in said graph database, types of mapping are stored as an edge type in said graph database, and types of topology-level-paths are stored as an edge type in said graph database.

14. The method according to claim 13, wherein the creation and recalculation of mappings and topology-level-paths is implemented by querying a graph database.

15. The method according to claim 1 in which one or more networks at depth d>0 represent user requirements, in which one or more topology-mappings and/or layer-mappings and/or level-mappings represent user requirements, in which zero or more policies represent user requirements, in which the namespace of the one or more networks at depth d>0 is not used in a forwarding decision by a physical or virtual node.

16. A method of controlling an overall network by a compiler based on a logical network model, the overall network comprising two or more physical nodes, the two or more physical nodes being interconnected by physical links in accordance with a physical network layout, the logical network model comprising logical nodes, each logical node being indicated with a logical node name, each logical node name referring to at least one physical node in the network, the method as performed by the compiler comprising the following actions:

a) Storing physical node names, each physical node name being a unique identifier of one physical node, and storing point-of-attachment names of said physical nodes, each of the point-of-attachment names of a particular physical node being a unique identifier of a point-of-attachment between the particular physical node and a physical link connecting the particular physical node to another physical node;

b) Storing logical node names for said logical nodes and storing a first mapping relation, said first mapping relation at least defining how logical nodes are mapped to physical nodes, said first mapping relation being based on a directed graph representation;

c) Transforming paths between physical nodes to logical link relationships between said logical nodes, said transforming based on a physical forwarding point-of-attachment relation and on said first mapping relation, said physical forwarding point-of-attachment relation based on a directed graph representation and defining physical paths of said physical network based on a physical forwarding policy of said physical network, on said physical node names, and on said point-of-attachment names of said physical nodes, said logical link relationships also being based on a directed graph representation, and storing for each of said logical link relationships edge-relationships comprising a first edge-relationship being a relationship between the first mapping relation in the direction from one of said logical nodes to one of said physical nodes and said logical link relationship, one or more second edge-relationships each second edge-relationship being either a relationship between one of said physical links in one of said physical paths and said logical link relationship or a relationship between one of said physical paths and said logical link relationship and, in said latter case, also one or more third edge-relationships each third edge-relationship being a relationship between one of said physical links in one of said physical paths and said one of said physical paths, and a fourth edge-relationship being a relationship between the first mapping relation in the direction from one of said physical nodes to one of said logical nodes and said logical link relationship;

d) Calculating a logical forwarding point-of-attachment relation based on a directed graph and defining logical paths in said logical network based on a logical forwarding policy of said logical network, on said logical node names, and on said set of logical links between said logical nodes, said logical forwarding point-of-attachment relation also being based on a directed graph representation, and storing one or more further edge-relationships, each further edge-relationship concerned being a relationship between one logical link within one of said logical paths and said one of said logical paths;

e) Creating forwarding table entries for said physical nodes from said logical forwarding point-of-attachment relation, using logical node names for forwarding;

f) Sending said forwarding table entries, either directly or indirectly, to selected physical nodes.

17. The method according to claim 16, wherein:

said overall network comprising a first number of physical nodes and a second number of virtual nodes, each logical node name referring to at least one physical or at least one virtual node in the network, storing virtual node names, storing a second mapping relation defining how said virtual nodes and said physical nodes are mapped to one another said second mapping relation being based on a directed graph representation, in action b) storing a third mapping relation defining how said logical nodes are mapped to the physical nodes and the virtual nodes, said third mapping relation also being based on a directed graph representation, in action c) Transforming paths between said set of physical nodes and virtual nodes to logical link relationships between said logical nodes based on paths between said set of physical nodes and virtual nodes and on said third mapping relation, said paths between a set of nodes comprising said physical nodes and virtual nodes based on said physical forwarding point-of-attachment relation and on said second mapping relation, in action c) a physical path denoting a physical route a packet follows from a physical source node to a physical destination node, in action d) a logical path denoting a logical route a packet follows from a logical source node to a logical destination node, in action e) creating forwarding table entries for said virtual nodes from said logical forwarding point-of-attachment relation, in action f) Sending said forwarding table entries, either directly or indirectly, to selected virtual nodes.

18. The method according to claim 16, comprising the following action:

at action e) calculating and storing nested edge-relationships.

19. A compiler comprising a processor and a plurality of memory components connected to the processor and storing a computer program comprising instructions and data arranged to be read by the processor and, after being read by the processor allowing said processor to perform the method of claim 1.

20. A network comprising the compiler according to claim 19.

21. A compiler comprising a processor and a plurality of memory components connected to the processor and storing a computer program comprising instructions and data arranged to be read by the processor and, after being read by the processor allowing said processor to perform the method of claim 16.

22. A network comprising the compiler according to claim 21.

23. A method of controlling an overall network by a compiler based on a logical network model, the overall network comprising two or more physical nodes, the two or more physical nodes being interconnected by physical links in accordance with a physical network layout, the logical network model comprising logical nodes, each logical node being indicated with a logical node name, each logical node name referring to at least one physical node in the network, wherein said overall network comprises a plurality of networks, said plurality of networks comprising a first set of networks comprising one or more networks (KA, KB, KC, KD) and said logical network model comprising a second set of networks comprising one or more networks (LA, LB, LC, LD), said first set of networks being grouped in one or more layers (n) and said second set of networks (LA, LB, LC, LD) being grouped in one or more layers n and at one or more depths d from said first set of networks (KA, KB, KC, KD), wherein each one of the networks (KA, KB, KC, KD) of said first set which are at a same layer n are related to one another by a physical link, each one of the networks (KC, KD) of said first set which are at a higher layer than a minimum layer n=n_min(d), n_min(d) being a lowest layer at particular depth d and n_min(d) being=>0, are related to zero or more networks of said first set of networks at a preceding layer n-y with 0<y<=n−n_min(d), by a layer-mapping, each one of the networks of said second set of networks (LA, LB, LC, LD) which are at a first depth d=1 from said first set of networks (KA, KB, KC, KD) are related to one or more of said networks of said first set of networks (KA, KB, KC, KD) by a first mapping relation, each one of the networks (LC, LD) of said second set of networks which are at a higher layer than minimum layer n=n_min are related to zero or more networks of said second set of networks at a preceding layer n−y with 0<y<=n−n_min, n_min being the lowest layer at particular depth d by a layer-mapping, and each one of the networks of said second set of networks which are at a second or higher depth d>=2 from said first set of networks (KA, KB, KC, KD) are related to one or more networks of said second set of networks at a preceding depth d−x with x larger than zero and smaller than or equal to d by a second mapping relation and/or are related to one or more networks of said first set of networks (KA, KB, KC, KD) by a third mapping relation, where each network of said first set of networks comprises one or more physical nodes and each network of said second set of networks comprises logical nodes, the method as performed by the compiler comprising the following actions:

a) Storing physical node names, each physical node name being a unique identifier of one physical node, and storing point-of-attachment names of said physical nodes, each of the point-of-attachment names of a particular physical node being a unique identifier of a point-of-attachment between the particular physical node and a physical link connecting the particular physical node to another physical node;

b) Storing logical node names for said logical nodes and storing said first mapping relation, said first mapping relation at least defining how logical nodes are mapped to physical nodes, said first mapping relation being based on a directed graph representation;

c) Transforming paths between physical nodes to logical link relationships between said logical nodes, said transforming based on a physical forwarding point-of-attachment relation and on said first mapping relation, said physical forwarding point-of-attachment relation based on a directed graph representation and defining physical paths of said physical network based on a physical forwarding policy of said physical network, on said physical node names, and on said point-of-attachment names of said physical nodes, said logical link relationships also being based on a directed graph representation;

d) Calculating a logical forwarding point-of-attachment relation based on a directed graph and defining logical paths in said logical network based on a logical forwarding policy of said logical network, on said logical node names, and on said set of logical links between said logical nodes, said logical forwarding point-of-attachment relation also being based on a directed graph representation;

e) Creating forwarding table entries for said physical nodes from said logical forwarding point-of-attachment relation, using logical node names for forwarding;

f) Sending said forwarding table entries, either directly or indirectly, to selected physical nodes.

24. A compiler comprising a processor and a plurality of memory components connected to the processor and storing a computer program comprising instructions and data arranged to be read by the processor and, after being read by the processor allowing said processor to perform the method of claim 23.

25. A network comprising the compiler according to claim 24.

* * * * *